US007267630B2

(12) United States Patent
Tabata et al.

(10) Patent No.: US 7,267,630 B2
(45) Date of Patent: Sep. 11, 2007

(54) MULTISTAGE TRANSMISSION

(75) Inventors: Atsushi Tabata, Okazaki (JP); Akira Hoshino, Aichi-ken (JP); Terufumi Miyazaki, Toyota (JP); Atsushi Honda, Seto (JP); Akiharu Abe, Toyota (JP); Hirofumi Ota, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/832,422

(22) Filed: Apr. 27, 2004

(65) Prior Publication Data

US 2005/0003924 A1 Jan. 6, 2005

(30) Foreign Application Priority Data

May 27, 2003 (JP) ............................ 2003-149539
Oct. 3, 2003 (JP) ............................ 2003-346250
Dec. 5, 2003 (JP) ............................ 2003-408270

(51) Int. Cl.
*F16H 3/62* (2006.01)

(52) U.S. Cl. ...................................................... 475/275

(58) Field of Classification Search ................ 475/271, 475/272, 275, 276, 280, 282, 284, 286, 296, 475/269, 311, 313, 317, 319, 323, 325
See application file for complete search history.

(56) References Cited

U.S. PATENT DOCUMENTS 3,267,769 A * 8/1966 Tuck et al. ................... 475/68
5,378,208 A * 1/1995 Hall, III ..................... 475/276
6,634,980 B1 10/2003 Ziemer
2004/0082428 A1* 4/2004 Usoro et al. ................ 475/296
2004/0110596 A1* 6/2004 Usoro et al. ................ 475/284
2004/0242366 A1 12/2004 Tabata et al.
2004/0242368 A1 12/2004 Tabata et al.
2005/0003924 A1 1/2005 Tabata et al.

FOREIGN PATENT DOCUMENTS

| | | |
|---|---|---|
| DE | 101 15 983 | 10/2002 |
| FR | 2735549 | 12/1996 |
| JP | 8-105496 | 4/1996 |
| JP | 2956173 | 10/1999 |
| JP | 2000-199549 | 7/2000 |
| JP | 2000-266138 | 9/2000 |
| JP | 2001-41296 | 2/2001 |

(Continued)

*Primary Examiner*—Saul Rodriguez
*Assistant Examiner*—Justin K. Holmes
(74) *Attorney, Agent, or Firm*—Oblon, Spivak, McClelland, Maier & Neustadt, P.C.

(57) ABSTRACT

With the automatic transmission 10-1 for vehicle according to the present embodiment, since multistage transmission of eight forward gear stages can be obtained by means of four sets of planetary gear sets 12, 16, 18 and 20, four clutches C1 through C4 and three brakes B1 through B3, the transmission can be fabricated to be light in weight and made compact, wherein the mountability thereof in a vehicle can be improved. Further, as has been made clear in FIG. 1(*b*), since speed change in the respective gear stages can be carried out only by a shifting action of any two of the clutches C1 through C4 and brakes B1 through B3, the speed change control can be facilitated and it is possible to prevent a shock to the transmission from occurring.

8 Claims, 287 Drawing Sheets

FOREIGN PATENT DOCUMENTS

| | | |
|---|---|---|
| JP | 2001-82555 | 3/2001 |
| JP | 2001-182785 | 7/2001 |
| JP | 2002-206601 | 7/2002 |
| JP | 2002-213545 | 7/2002 |
| JP | 2002-227940 | 8/2002 |
| JP | 2002-295609 | 10/2002 |
| JP | 2002-323098 | 11/2002 |

* cited by examiner

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL |
| Rev2 | | | | ○ | | | ○ | 3.611 | 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL |
| Rev2 | | | | ○ | | | ○ | 3.611 | 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL |
| Rev2 | | | | ○ | | | ○ | 3.611 | 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | TOTAL |
| Rev1 | | ○ | | | | ○ | | 2.644 | |
| Rev2 | | | | ○ | | | ○ | 3.611 | 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | TOTAL |
| Rev1 | | ○ | | | | ○ | | 2.425 | |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL |
| Rev2 | | | | ○ | | | ○ | 3.186 | 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |
| Rev2 | | | | ○ | | | ○ | 3.611 | |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |
| Rev2 | | | | ○ | | | ○ | 3.611 | |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |
| Rev2 | | | | ○ | | | ○ | 3.611 | |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev1 | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL 7.343 |
| Rev2 | | | | ○ | | | ○ | 3.186 | |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | TOTAL 7.343 |
| Rev1 | | ○ | | | | ○ | | 2.425 | |
| Rev2 | | | | ○ | | | ○ | 3.186 | |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |
| Rev2 | | | | ○ | | | ○ | 3.186 | |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |
| Rev2 | | | | ○ | | | ○ | 3.186 | |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| 2nd | ○ | | | | | ○ | | 3.181 | 1.340 |
| 3rd | ○ | | | | ○ | | | 2.353 | 1.352 |
| 4th | ○ | ○ | | | | | | 1.754 | 1.341 |
| 5th | ○ | | ○ | | | | | 1.311 | 1.338 |
| 6th | | | ○ | ○ | | | | 1.000 | 1.311 |
| 7th | | ○ | ○ | | | | | 0.763 | 1.311 |
| 8th | | | ○ | | ○ | | | 0.580 | 1.315 |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.261 | |
| | | | | | | | | | 1.340 |
| 2nd | ○ | | | | | ○ | | 3.181 | |
| | | | | | | | | | 1.352 |
| 3rd | ○ | | | | ○ | | | 2.353 | |
| | | | | | | | | | 1.341 |
| 4th | ○ | ○ | | | | | | 1.754 | |
| | | | | | | | | | 1.338 |
| 5th | ○ | | ○ | | | | | 1.311 | |
| | | | | | | | | | 1.311 |
| 6th | | | ○ | ○ | | | | 1.000 | |
| | | | | | | | | | 1.311 |
| 7th | | ○ | ○ | | | | | 0.763 | |
| | | | | | | | | | 1.315 |
| 8th | | | ○ | | ○ | | | 0.580 | |
| Rev1 | | ○ | | | | ○ | | 2.425 | TOTAL 7.343 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| Rev | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.232 |
| 7th | | ○ | | ○ | | | | 0.811 | |
| | | | | | | | | | 1.253 |
| 8th | | | | ○ | ○ | | | 0.648 | |
| Rev | | ○ | | | | ○ | | 2.644 | TOTAL 6.433 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | ○ | | | 0.602 | |
| Rev | | ○ | | | | ○ | | 2.644 | TOTAL 6.921 |

| | C1 | C2 | C3 | C4 | B1 | B2 | B3 | SPEED RATIO | STEP |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | ○ | | | | | 1.321 | |
| | | | | | | | | | 1.321 |
| 6th | | | ○ | ○ | | | | 1.000 | |
| | | | | | | | | | 1.308 |
| 7th | | ○ | | ○ | | | | 0.765 | |
| | | | | | | | | | 1.316 |
| 8th | | | | ○ | ○ | | | 0.581 | |
| Rev | | ○ | | | | ○ | | 2.644 | TOTAL 7.175 |

| | C1 | C2 | C3 | C4 | B1 | B2 | B3 | SPEED RATIO | STEP | STEP |
|---|---|---|---|---|---|---|---|---|---|---|
| 1st | ○ | | | | | | ○ | 4.169 | | |
| 2nd | ○ | | | | | ○ | | 3.067 | 1.359 | |
| 3rd | ○ | | | | ○ | | | 2.271 | 1.351 | |
| 4th | ○ | ○ | | | | | | 1.745 | 1.301 | |
| 5th | ○ | | ○ | | | | | 1.321 | 1.321 | |
| 5.5th | ○ | | | ○ | | | | 1.218 | 1.321 | |
| 6th | | | ○ | ○ | | | | 1.000 | | |
| 7th-1 | | ○ | ○ | | | | | 0.780 | 1.282 | |
| 8th-1 | | | ○ | | ○ | | | 0.602 | 1.295 | 1.118 |
| 7th-2 | | ○ | | ○ | | | | 0.894 | TOTAL 6.921 | 1.142 |
| 8th-2 | | | | ○ | ○ | | | 0.783 | | |
| Rev1 | | ○ | | | | ○ | | 2.644 | | |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |
| Rev2 | | | | ○ | | | ○ | 4.804 | |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL |
| Rev2 | | | | ○ | | | ○ | 4.804 | 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| 2nd | ○ | | | | | ○ | | 3.363 | 1.558 |
| 3rd | ○ | | | | ○ | | | 2.367 | 1.421 |
| 4th | ○ | ○ | | | | | | 1.769 | 1.338 |
| 5th | ○ | | ○ | | | | | 1.297 | 1.365 |
| 6th | | | ○ | ○ | | | | 1.000 | 1.297 |
| 7th | | ○ | ○ | | | | | 0.793 | 1.261 |
| 8th | | | ○ | | ○ | | | 0.625 | 1.269 |
| Rev1 | | ○ | | | | ○ | | 2.949 | TOTAL 8.381 |

| | C1 | C2 | C3 | C4 | B1 | B2 | B3 | SPEED RATIO | STEP |
|---|---|---|---|---|---|---|---|---|---|
| 1st | ○ | | | | | | ○ | 5.238 | |
| | | | | | | | | | 1.558 |
| 2nd | ○ | | | | | ○ | | 3.363 | |
| | | | | | | | | | 1.421 |
| 3rd | ○ | | | | ○ | | | 2.367 | |
| | | | | | | | | | 1.338 |
| 4th | ○ | ○ | | | | | | 1.769 | |
| | | | | | | | | | 1.365 |
| 5th | ○ | | ○ | | | | | 1.297 | |
| | | | | | | | | | 1.297 |
| 6th | | | ○ | ○ | | | | 1.000 | |
| | | | | | | | | | 1.261 |
| 7th | | ○ | ○ | | | | | 0.793 | |
| | | | | | | | | | 1.269 |
| 8th | | | ○ | | ○ | | | 0.625 | |
| Rev1 | | ○ | | | | ○ | | 2.949 | TOTAL 8.381 |

MULTISTAGE TRANSMISSION

This application is based on Japanese Patent Application Nos. 2003-408270, 2003-346250 and 2003-149539 filed Dec. 5, 2003, Oct. 3, 2003 and May 27, 2003, respectively, the contents of which are incorporated hereinto by reference.

BACKGROUND OF THE INVENTION

1. Field of the invention

The present invention relates to improvements of a multistage transmission capable of carrying out seven or more forward gear stages.

2. Discussion of the Related Art

A multistage transmission in which a plurality of planetary gear sets, clutches and brakes are employed has been widely used as an automatic transmission for a vehicle. And, a multistage transmission capable of providing multistage forward transmission of seven or more stages has been proposed as such an automatic transmission. An automatic transmission described in Patent Documents 1-8 are examples thereof, which are capable of providing multistage forward transmission of 9 stages through 12 stages by employing three or four planetary gear sets.

[Patent Document 1]
Japanese Patent Publication No. 2002-206601

[Patent Document 2]
Japanese Patent Publication No. H8-105496

[Patent Document 3]
Japanese Patent Publication No. 2000-199549

[Patent Document 4]
Japanese Patent Publication No. 2000-266138

[Patent Document 5]
Japanese Patent Publication No. 2001-82555

[Patent Document 6]
Japanese Patent Publication No. 2002-227940

[Patent Document 7]

Japanese Patent Publication No. 2002-295609

[Patent Document 8]
Japanese Patent No. 2956173

In such a multistage transmission, although it is preferable that (a) the overall range of a transmission ratio is sufficiently wide, (b) steps of respective transmission ratios are arranged to be as equal as possible, (c) the number of engagement elements (such as clutches and brakes) is as small as possible, (d) changes in engagement of respective engagement elements in shifting actions are easy, (e) the number of planetary gear sets is as small as possible, and (f) a gear ratio ρ (number of teeth of sun gear/number of teeth of ring gear) of planetary gear sets is, for example, in a range of 0.3 through 0.6 in view of making the transmission compact, it is difficult to meet all these requirements, wherein the requirements are not necessarily sufficiently satisfied. For example, in a multistage transmission described in Patent Document 1, it is necessary to change a gripping engagement of four engagement elements at most when shifting a gear stage, wherein complicated and accurate shifting action control of a transmission is required, and at the same time there is a possibility for a shock to occur in speed change. Further, there is a problem in that, since the gear ratio ρ of planetary gear sets is 0.273 through 0.778, it is difficult to compactly construct the transmission.

SUMMARY OF THE INVENTION

The invention was developed in view of the above-described situations, and it is therefore an object of the invention to provide a multistage transmission which is capable of meeting transmission ratio characteristics such as transmission ratio steps and the overall range of a transmission ratio, speed-changing control performance and other requirements such as compactness at a high level, and is capable of carrying out seven or more forward gear stages.

The above object may be achieved according to a first aspect of this invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion in which five rotary elements are composed of parts of respective sun gears, carriers and ring gears of a second planetary gear set, a third planetary gear set and a fourth planetary gear set connected to each other and in which, while parts of the five rotary elements are selectively connected to the first intermediate output path via a clutch, the second intermediate output path or to each other, the parts thereof are selectively brought to a stationary state by a brake; (3) wherein a plurality of gear stages are established by changing engagement and disengagement of the clutch and brake.

The object indicated above may also be achieved according to a second aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion in which five rotary elements are composed of parts of respective sun gears, carriers and ring gears of a second planetary gear set, a third planetary gear set and a fourth planetary gear set connected to each other and in which, where it is assumed that the five rotary elements are first, second, third, fourth and fifth rotary elements from one end thereof to the other end thereof in order in a collinear chart in which rotation speeds of the five rotary elements can be represented by straight lines, the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

In a preferd form of the multistage transmission according to a third aspect of the invention having all elements of the second aspect of the invention, wherein at least 7 forward gear stages are established by changing engagement and disengagement of the clutch and brake.

The object indicated above may also be achieved according to a fourth aspect of this invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion in which five rotary elements are composed of parts of respective sun gears, carriers and ring gears of a second planetary gear set, a third planetary gear set and a fourth planetary gear set connected to each other and in which, where it is assumed that the five rotary elements are first, second, third, fourth and fifth rotary elements from one end thereof to the other end thereof in order in a collinear chart in which rotation speeds of the five rotary elements can be represented by straight lines, the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a first gear stage of the highest transmission ratio is established by engaging the first clutch with the third brake; (4) a second gear stage having a smaller transmission ratio than the first gear stage is established by engaging the first clutch with the second brake; (5) a third gear stage having a smaller transmission ratio than the second gear stage is established by engaging the first clutch with the first brake; (6) a fourth gear stage having a smaller transmission ratio than the third gear stage is established by engaging the first clutch with the second clutch; (7) a fifth gear stage having a smaller transmission ratio than the fourth gear stage is established by engaging the first clutch with the third clutch; (8) a sixth gear stage having a smaller transmission ratio than the fifth gear stage is established by engaging the third clutch with the fourth clutch; (9) a seventh gear stage having a smaller transmission ratio than the sixth gear stage is established by engaging the second clutch with the third clutch; and (10) an eighth gear stage having a smaller transmission ratio than the seventh gear stage is established by engaging the third clutch with the first brake; and (11) wherein a drive speed is changed by using seven or more gear stages of the first through eighth gear stages.

In a preferd form of the multistage transmission according to the fifth aspect of the invention having all elements of any one of the second aspect through the fourth aspect of the invention, wherein the fourth clutch selectively connects any one of the first, third and fifth rotary elements to the first intermediate output path.

In a preferd form of the multistage transmission according to the sixth aspect of the invention having all elements of any one of the second aspect through the fourth aspect of the invention, wherein the fourth clutch selectively connects any two of the five rotary elements to each other.

Here, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is a sun gear of the fourth planetary gear set, the second rotary element is a ring gear of the second planetary gear set, the third rotary element is composed of a carrier of the second planetary gear set and a carrier of the third planetary gear set, which are connected to each other, the fourth rotary element is composed of a ring gear of the third planetary gear set and a carrier of the fourth planetary gear set, and the fifth rotary element is composed of a sun gear of the second planetary gear set, a sun gear of the third planetary gear set and a ring gear of the fourth planetary gear set, which are connected to each other. Also, the same multistage transmission is featured in that a carrier and a sun gear of the second planetary gear set and the third planetary gear set are, respectively, composed of a common member, the carrier has a stepped pinion having a minor-diameter portion and a major-diameter portion disposed therein, the minor-diameter portion is engaged with a ring gear of the second planetary gear set, and the major-diameter portion is engaged with the common sun gear and a second pinion of the third planetary gear set.

Also, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is a sun gear of the fourth planetary gear set, the second rotary element is a ring gear of the second planetary gear set, the third rotary element is composed of a carrier of the second planetary gear set and a sun gear of the third planetary gear set, which are connected to each other, the fourth rotary element is composed of a ring gear of the third planetary gear set and a carrier of the fourth planetary gear set, and the fifth rotary element is composed of a sun gear of the second planetary gear set, a carrier of the third planetary gear set and a ring gear of the fourth planetary gear set, which are connected to each other.

In addition, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of a sun gear of the third planetary gear set and a sun gear of the fourth planetary gear set, which are connected to each other, the second rotary element is a ring gear of the second planetary gear set, the third rotary element is composed of a carrier of the second planetary gear set and a ring gear of the third planetary gear set, which are connected to each other, the fourth rotary element is a carrier of the fourth planetary gear set, and the fifth rotary element is composed of a sun gear of the second planetary gear set, a carrier of the third planetary gear set and a ring gear of the fourth planetary gear set, which are connected to each other.

Also, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of a sun gear of the second planetary gear set, a carrier of the third planetary gear set and a sun gear of the fourth planetary gear set, which are connected to each other, the second rotary element is composed of a carrier of the second planetary gear set and a ring gar of the third planetary gear set, which are connected to each other, the third rotary element is a ring gear of the second planetary gear set, the fourth rotary element is a carrier of the fourth planetary gear set, and the fifth rotary element is composed of a sun gear of the third planetary gear set and a ring gear of the fourth planetary gear set, which are connected to each other.

In addition, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is a sun gear of the second planetary gear set, the second rotary element is a ring gear of the third planetary gear set and a carrier of the fourth planetary gear set, which are connected to each other, the third rotary element is composed of a carrier of the second planetary gear set, a carrier of the third planetary gear set and a ring gear of the fourth planetary gear set, which are connected to each other, the fourth rotary element is composed of a ring gear of the second planetary gear set and a sun gear of the fourth planetary gear set, which are connected to each other, and the fifth rotary element is a sun gear of the third planetary gear set.

Further, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of a carrier of the third planetary gear set and a sun gear of the fourth planetary gear set, the second rotary element is a ring gear of the second planetary gear set, the third rotary element is a carrier of the second planetary gear set, a ring gear of the third planetary gear set and a carrier of the fourth planetary gear set, which are connected to each other, the fourth rotary element is a ring gear of the fourth planetary gear set, and the fifth rotary element is composed of a sun gear of the second planetary gear set and a sun gear of the third planetary gear set, which are connected to each other.

Further, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of a sun gear of the third planetary gear set and a sun gear of the fourth planetary gear set, the second rotary element is a ring gear of the second planetary gear set, the third rotary element is a carrier of the second planetary gear set, a ring gear of the third planetary gear set and a carrier of the fourth planetary gear set, which are connected to each other, the fourth rotary element is a ring gear of the fourth planetary gear set, and the fifth rotary element is composed of a sun gear of the second planetary gear set and a carrier of the third planetary gear set, which are connected to each other.

Further, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the second planetary gear set and a sun gear of the fourth planetary gear set, which are connected to each other, the second rotary element is composed of a ring gear of the second planetary gear set and a ring gear of the third planetary gear set, which are connected to each other, the third rotary element is composed of a carrier of the third planetary gear set and a carrier of the fourth planetary gear set, which are connected to each other, the fourth rotary element is a ring gear of the fourth planetary gear set, and the fifth rotary element is composed of a carrier of the second planetary gear set and a sun gear of the third planetary gear set, which are connected to each other.

Further, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the third planetary gear set and a sun gear of the fourth planetary gear set, which are connected to each other, the second rotary element is a sun gear of the second planetary gear set, the third rotary element is a carrier of the fourth planetary gear set, the fourth rotary element is composed of a ring gear of the second planetary gear set, a carrier of the third planetary gear set and a ring gear of the fourth planetary gear set, which are connected to each other, and the fifth rotary element is composed of a carrier of the second planetary gear set and a ring gear of the third planetary gear set.

In addition, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the second planetary gear set, a sun gear of the third planetary gear set and a sun gear of the fourth planetary gear set, which are connected to each other, the second rotary element is a ring gear of the second planetary gear set, the third rotary element is a carrier of the fourth planetary gear set, the fourth rotary element is composed of a carrier of the third planetary gear set and a ring gear of the fourth planetary gear set, which are connected to each other, and the fifth rotary element is composed of a carrier of the second planetary gear set and a ring gear of the third planetary gear set.

Further, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the third planetary gear set and a sun gear of the fourth planetary gear set, which are connected to each other, the second rotary element is composed of a carrier of the second planetary gear set and a carrier of the third planetary gear set, which are connected to each other, the third rotary element is composed of a ring gear of the third planetary gear set and a carrier of the fourth planetary gear set, which are connected to each other, the fourth rotary element is composed of a ring gear of the second planetary gear set and a ring gear of the fourth planetary gear set, and the fifth rotary element is a sun gear of the second planetary gear set.

Also, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of a sun gear of the second planetary gear set, a carrier of the third planetary gear set and a sun gear of the fourth planetary gear set, which are connected to each other, the second rotary element is a carrier of the second planetary gear set, the third rotary element is composed of a ring gear of the second planetary gear set, a ring gear of the third planetary gear set and a carrier of the fourth planetary gear set, which are connected to each other, the fourth rotary element is a ring gear of the fourth planetary gear set, and the fifth rotary element is a sun gear of the third planetary gear set.

Also, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of a sun gear of the second planetary gear set, a carrier of the third planetary gear set and a sun gear of the fourth planetary gear set, which are connected to each other, the second rotary element is composed of a carrier of the second planetary gear set and a ring gear of the third planetary gear set, which are connected to each other, the third rotary element is composed of a ring gear of the second planetary gear set and a carrier of the fourth planetary gear set, which are connected to each other, the fourth rotary element is a ring gear of the fourth planetary gear set, and the fifth rotary element is a sun gear of the third planetary gear set.

Also, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the second planetary gear set, a sun gear of the third planetary gear set and a sun gear of the fourth planetary gear set, which are connected to each other, the second rotary element is composed of a ring gear of the second planetary gear set and a carrier of the third planetary gear set, which are connected to each other, the third rotary element is composed of a ring gear of the third planetary gear set and a carrier of the fourth planetary gear set, which are connected to each other, the fourth rotary element is a ring gear of the fourth planetary gear set, and the fifth rotary element is a carrier of the second planetary gear set.

Also, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of a sun gear of the second-planetary gear set, a sun gear of the third planetary gear set and a sun gear of the fourth planetary gear set, which are connected to each other, the second rotary element is a ring gear of the third planetary gear set, the third rotary element is a carrier of the fourth planetary gear set, the fourth rotary element is composed of a carrier of the second planetary gear set, a carrier of the third planetary gear set and a ring gear of the fourth planetary gear set, which are connected to each other, and the fifth rotary element is a ring gear of the second planetary gear set.

Also, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the third planetary gear set and a sun gear of the fourth planetary gear set, which are connected to each other, the second rotary element is composed of a carrier of the second planetary gear set and a carrier of the third planetary gear set, which are connected to each other, the third rotary element is composed of a ring gear of the second planetary gear set and a ring gear of the third planetary gear set, which are connected to each other, the fourth rotary element is a sun gear of the second planetary gear set and a carrier of the fourth planetary gear set, which are connected to each other, and the fifth rotary element is a ring gear of the fourth planetary gear set.

Also, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of sun gear of the second planetary gear set, a sun gear of the third planetary gear set and a sun gear of the fourth planetary gear set, which are connected to each other, the second rotary element is composed of a carrier of the second planetary gear set and a ring gear of the third planetary gear set, which are connected to each other, the third rotary element is a ring gear of the second planetary gear set, the fourth rotary element is composed of a carrier of the third planetary gear set and a carrier of the fourth planetary gear set, which are connected to each other, and the fifth rotary element is a ring gear of the fourth planetary gear set.

Further, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is composed of a sun gear of the third planetary gear set and a sun gear of the fourth planetary gear set, which are connected to each other, the second rotary element is composed of a ring gear of the second planetary gear set and a ring gear of the fourth planetary gear set, which are connected to each other, the third rotary element is a carrier of the second planetary gear set, the fourth rotary element is composed of a carrier of the third planetary gear set and a carrier of the fourth planetary gear set, which are connected to each other, and the fifth rotary element is composed of a sun gear of the second planetary gear set and a ring gear of the third planetary gear set, which are connected to each other.

Also, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of a sun gear of the second planetary gear set and a sun gear of the fourth planetary gear set, which are connected to each other, the second rotary element is composed of a carrier of the second planetary gear set and a carrier of the third planetary gear set, which are connected to each other, the third rotary element is composed of a ring gear of the second planetary gear set and a ring gear of the third planetary gear set, which are connected to each other, the fourth rotary element is composed of a sun gear of the third planetary gear set and a carrier of the fourth planetary gear set, which are connected to each other, and the fifth rotary element is a ring gear of the fourth planetary gear set.

Also, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is composed of a sun gear of the second planetary gear set and a sun gear of the fourth planetary gear set, which are connected to each other, the second rotary element is composed of a carrier of the second planetary gear set and a sun gear of the third planetary gear set, which are connected to each other, the third rotary element is composed of a ring gear of the second planetary gear set and a ring gear of the third planetary gear set, which are connected to each other, the fourth rotary element is composed of a carrier of the third planetary gear set and a carrier of the fourth planetary gear set, which are connected to each other, and the fifth rotary element is a ring gear of the fourth planetary gear set.

Further, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is a sun gear of the second planetary gear set, the second rotary element is composed of a carrier of the second planetary gear set and a ring gear of the third planetary gear set, which are connected to each other, the third rotary element is composed of a ring gear of the second planetary gear set, a carrier of the third planetary gear set and a carrier of the fourth planetary gear set, which are connected to each other, the fourth rotary element is a ring gear of the fourth planetary gear set, and the fifth rotary element is composed of a sun gear of the third planetary gear set and a sun gear of the fourth planetary gear set, which are connected to each other.

Further, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is a sun gear of the third planetary gear set, the second rotary element is composed of a ring gear of the second planetary gear set, a carrier of the third planetary gear set, and a carrier of the fourth planetary gear set, which are connected to each other, the third rotary element is composed of a carrier of the second planetary gear set, a ring gear of the third planetary gear set and a ring gear of the fourth planetary gear set, which are connected to each other, the fourth rotary element is a sun gear of the fourth planetary gear set, and the fifth rotary element is a sun gear of the second planetary gear set.

Also, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is composed of a sun gear of the second planetary gear set and a sun gear of the third planetary gear set, which are connected to each other, the second rotary element is composed of a carrier of the fourth planetary gear set, the third rotary element is composed of a carrier of the third planetary gear set and a ring gear of the fourth planetary gear set, which are connected to each other, the fourth rotary element is a carrier of the second planetary gear set, a ring gear of the third planetary gear set and a sun gear of the fourth planetary gear set, which are connected to each other, and the fifth rotary element is a ring gear of the second planetary gear set.

Further, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is composed of a sun gear of the second planetary gear set and a sun gear of the third planetary gear set, which are connected to each other, the second rotary element is a sun gear of the fourth planetary gear set, the third rotary element is composed of a carrier of the third planetary gear set and a ring gear of the fourth planetary gear set, which are connected to each other, the fourth rotary element is composed of a carrier of the second planetary gear set, a ring gear of the third planetary gear set and a carrier of the fourth planetary gear set, which are connected to each other, and the fifth rotary element is a ring gear of the second planetary gear set.

Further, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is composed of a sun gear of the second planetary gear set and a sun gear of the third planetary gear set, which are connected to each other, the second rotary element is a carrier of the second planetary gear set, the third rotary element is composed of a ring gear of the second planetary gear set, a carrier of the third planetary gear set and a sun gear of the fourth planetary gear set, which are connected to each other, the fourth rotary element is composed of a ring gear of the third planetary gear set and a ring gear of the fourth planetary gear set, which are connected to each other, and the fifth rotary element is a carrier of the fourth planetary gear set.

Further, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the second planetary gear set, a sun gear of the third planetary gear set and a sun gear of the fourth planetary gear set, which are connected to each other, the second rotary element is a carrier of the fourth planetary gear set, the third rotary element is composed of a ring gear of the second planetary gear set, a carrier of the third planetary gear set, and a ring gear of the fourth planetary gear set, which are connected to each other, the fourth rotary element is a ring gear of the third planetary gear set, and the fifth rotary element is a carrier of the second planetary gear set.

Further, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is composed of a sun gear of the second planetary gear set and a sun gear of the third planetary gear set, which are connected to each other, the second rotary element is composed of a carrier of the second planetary gear set, the third rotary element is composed of a ring gear of the second planetary gear set, a carrier of the third planetary gear set and a carrier of the fourth planetary gear set, which are connected to each other, the fourth rotary element is composed of a ring gear of the third planetary gear set and a ring gear of the fourth planetary gear set, which are connected to each other, and the fifth rotary element is a sun gear of the fourth planetary gear set.

Further, preferably, a multistage transmission according to any one of the first aspect through the sixth aspect of the invention is featured in that (a) the second planetary gear set is a single-pinion type, the third planetary gear set is a single-pinion type, and the fourth planetary gear set is a single-pinion type, and (b) the first rotary element is composed of a sun gear of the second planetary gear set, a sun gear of the third planetary gear set and a sun gear of the fourth planetary gear set, which are connected to each other, the second rotary element is a carrier of the second planetary gear set, the third rotary element is composed of a ring gear of the second planetary gear set and a carrier of the third planetary gear set, which are connected to each other, the fourth rotary element is composed of a ring gear of the third planetary gear set and a carrier of the fourth planetary gear set, which are connected to each other, and the fifth rotary element is a ring gear of the fourth planetary gear set.

Further, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is a sun gear of the fourth planetary gear set, the second rotary element is composed of a carrier of the second planetary gear set and a ring gear of the third planetary gear set, which are connected to each other, the third rotary element is composed of a carrier of the third planetary gear set and a carrier of the fourth planetary gear set, which are connected to each other, the fourth rotary element is composed of a ring gear of the second planetary gear set and a ring gear of the fourth planetary gear set, which are connected to each other, and the fifth rotary element is composed of a sun gear of the second planetary gear set and a sun gear of the third planetary gear set, which are connected to each other.

In addition, preferably, a multistage transmission according to anyone of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is composed of a sun gear of the second planetary gear set and a sun gear of the third planetary gear set, which are connected to each other, the second rotary element is composed of a carrier of the second planetary gear set, a carrier of the third planetary gear set and a carrier of the fourth planetary gear set, which are connected to each other, the third rotary element is a ring gear of the second planetary gear set, the fourth rotary element is composed of a ring gear of the third planetary gear set and a ring gear of the fourth planetary gear set, which are connected to each other, and the fifth rotary element is a sun gear of the fourth planetary gear set.

Also, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a carrier of the second planetary gear set and a sun gear of the third planetary gear set, which are connected to each other, the second rotary element is a ring gear of the second planetary gear set, the third rotary element is a ring gear of the fourth planetary gear set, the fourth rotary element is composed of a carrier of the third planetary gear set and a carrier of the fourth planetary gear set, which are connected to each other, and the fifth rotary element is composed of a sun gear of the second planetary gear set, a ring gear of the third planetary gear set and a sun gear of the fourth planetary gear set, which are connected to each other.

Further, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a carrier of the second planetary gear set, a sun gear of the third planetary gear set and a sun gear of the fourth planetary gear set, which are connected to each other, the second rotary element is composed of a ring gear of the second planetary gear set, a carrier of the third planetary gear set and a carrier of the fourth planetary gear set, which are connected to each other, the third rotary element is a ring gear of the third planetary gear set, the fourth rotary element is a ring gear of the fourth planetary gear set, and the fifth rotary element is a sun gear of the second planetary gear set.

Further, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the second planetary gear set and a sun gear of the third planetary gear set, the second rotary element is composed of a ring gear of the second planetary gear set and a ring gear of the fourth planetary gear set, which are connected to each other, the third rotary element is a carrier of the fourth planetary gear set, the fourth rotary element is a carrier of the third planetary gear set, and the fifth rotary element is composed of a carrier of the second planetary gear set, a ring gear of the third planetary gear set and a sun gear of the fourth planetary gear set, which are connected to each other.

Also, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is a sun gear of the third planetary gear set, the second rotary element is composed of a ring gear of the second planetary gear set, a carrier of the third planetary gear set and a sun gear of the fourth planetary gear set, which are connected to each other, the third rotary element is composed of a carrier of the second planetary gear set and a ring gear of the fourth planetary gear set, which are connected to each other, the fourth rotary element is composed of a ring gear of the third planetary gear set and a carrier of the fourth planetary gear set, which are connected to each other, and the fifth rotary element is a sun gear of the second planetary gear set.

In addition, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the second planetary gear set, a sun gear of the third planetary gear set and a sun gear of the fourth planetary gear set, which are connected to each other, the second rotary element is composed of a ring gear of the second planetary gear set, a carrier of the third planetary gear set and a carrier of the fourth planetary gear set, which are connected to each other, the third rotary element is a ring gear of the third planetary gear set, the fourth rotary element is a ring gear of the fourth planetary gear set, and the fifth rotary element is a carrier of the second planetary gear set.

Also, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is a sun gear of the second planetary gear set, the second rotary element is composed of a ring gear of the second planetary gear set and a ring gear of the third planetary gear set, which are connected to each other, the third rotary element is composed of a carrier of the third planetary gear set and a ring gear of the fourth planetary gear set, which are connected to each other, the fourth rotary element is a carrier of the fourth planetary gear set, and the fifth rotary element is composed of a carrier of the second planetary gear set, a sun gear of the third planetary gear set and a sun gear of the fourth planetary gear set, which are connected to each other.

Also, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is a sun gear of the fourth planetary gear set, the second rotary element is a carrier of the second planetary gear set, the third rotary element is a ring gear of the third planetary gear set, the fourth rotary element is composed of a ring gear of the second planetary gear set, a carrier of the third planetary gear set and a carrier of the fourth planetary gear set, which are connected to each other, and the fifth rotary element is composed of a sun gear of the second planetary gear set, a sun gear of the third planetary gear set and a ring gear of the fourth planetary gear set, which are connected to each other.

Also, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is a sun gear of the second planetary gear set, the second rotary element is a sun gear of the fourth planetary gear set, the third rotary element is a ring gear of the third planetary gear set, the fourth rotary element is composed of a carrier of the second planetary gear set, a carrier of the third planetary gear set and a ring gear of the fourth planetary gear set, which are connected to each other, and the fifth rotary element is composed of a ring gear of the second planetary gear set, a sun gear of the third planetary gear set and a carrier of the fourth planetary gear set, which are connected to each other.

Further, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is a sun gear of the fourth planetary gear set, the second rotary element is a carrier of the second planetary gear set, the third rotary element is composed of a ring gear of the second planetary gear set and a ring gear of the third planetary gear set, which are connected to each other, the fourth rotary element is composed of a sun gear of the second planetary gear set, a carrier of the third planetary gear set and a carrier of the fourth planetary gear set, which are connected to each other, and the fifth rotary element is composed of a sun gear of the third planetary gear set and a ring gear of the fourth planetary gear set, which are connected to each other.

In addition, preferably, a multistage transmission according to any one of the first aspect through the sixth aspect of the invention is featured in that (a) the second planetary gear set is a double-pinion type, the third planetary gear set is a single-pinion type, and the fourth planetary gear set is a single-pinion type, and (b) the first rotary element is composed of a sun gear of the second planetary gear set and a sun gear of the third planetary gear set, which are connected to each other, the second rotary element is a ring gear of the second planetary gear set, the third rotary element is a ring gear of the fourth planetary gear set, the fourth rotary element is composed of a carrier of the third planetary gear set and a carrier of the fourth planetary gear set, which are connected to each other, and the fifth rotary element is composed of a carrier of the second planetary gear set, a ring gear of the third planetary gear set and a sun gear of the fourth planetary gear set, which are connected to each other.

Also, preferably, a multistage transmission according to any one of the first aspect through the sixth aspect of the invention is featured in that (a) the second planetary gear set is a single-pinion type, the third planetary gear set is a single-pinion type, and the fourth planetary gear set is a double-pinion type, and (b) the first rotary element is a sun gear of the second planetary gear set, the second rotary element is a sun gear of the fourth planetary gear set, the third rotary element is composed of a ring gear of the third planetary gear set and a ring gear of the fourth planetary gear set, which are connected to each other, the fourth rotary element is composed of a carrier of the second planetary gear set, a carrier of the third planetary gear set and a carrier of the fourth planetary gear set, which are connected to each other, and the fifth rotary element is composed of a ring gear of the second planetary gear set and a sun gear of the third planetary gear set, which are connected to each other.

Also, preferably, a multistage transmission according to any one of the first aspect through the sixth aspect of the invention is featured in that (a) the second planetary gear set is a single-pinion type, the third planetary gear set is a double-pinion type, and the fourth planetary gear set is a single-pinion type, and (b) the first rotary element is a sun gear of the fourth planetary gear set, the second rotary element is a ring gear of the second planetary gear set, the third rotary element composed of a carrier of the second planetary gear set and a carrier of the third planetary gear set, which are connected to each other, the fourth rotary element is composed of a ring gear of the third planetary gear set and a carrier of the fourth planetary gear set, which are connected to each other, and the fifth rotary element is composed of a sun gear of the second planetary gear set, a sun gear of the third planetary gear set and a ring gear of the fourth planetary gear set, which are connected to each other.

Also, preferably, a multistage transmission according to any one of the first aspect through the sixth aspect of the invention is featured in that (a) the second planetary gear set is a single-pinion type, the third planetary gear set is a single-pinion type, and the fourth planetary gear set is a single-pinion type, and (b) the first rotary element is a sun gear of the fourth planetary gear set, the second rotary element is a ring gear of the second planetary gear set, the third rotary element is composed of a carrier of the second planetary gear set and a ring gear of the third planetary gear set, which are connected to each other, the fourth rotary element is composed of a carrier of the third planetary gear set and a carrier of the fourth planetary gear set, which are connected to each other, and the fifth rotary element is composed of a sun gear of the second planetary gear set, a sun gear of the third planetary gear set and a ring gear of the fourth planetary gear set, which are connected to each other.

The object indicated above may also be achieved according to a seventh aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set and a single-pinion type fourth planetary gear set, in which a first rotary element being composed of a sun gear of the fourth planetary gear set, a second rotary element being composed of a ring gear of the second planetary gear set, a third rotary element is composed of a carrier of the second planetary gear set and a carrier of the third planetary gear set connected to each other, a fourth rotary element are composed of a ring gear of the third planetary gear set and a carrier of the fourth planetary gear set connected to each other, a fifth rotary element is composed of a sun gear of the second planetary gear set, a sun gear of the third planetary gear set, and a ring gear of the fourth planetary gear set connected to each other, wherein the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

In a preferd form of the multistage transmission according to a eight aspect of the invention having all elements of the seventh aspect of the invention, which provides a multistage transmission according to claim 7, wherein a carrier and a sun gear of the second planetary gear set and the third planetary gear set are, respectively, composed of a common member, a stepped pinion having a minor-diameter portion and a major-diameter portion is rotatably disposed in the carrier, the minor-diameter portion is engaged with a ring gear of the second planetary gear set, and the major-diameter portion is engaged with the common sun gear and a second pinion of the third planetary gear set.

The object indicated above may also be achieved according to a ninth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set and a single-pinion type fourth planetary gear set, in which a first rotary element being composed of a sun gear of the fourth planetary gear set, a second rotary element being composed of a ring gear of the second planetary gear set, a third-rotary element is composed of a carrier of the second planetary gear set and a sun gear of the third planetary gear set connected to each other, a fourth rotary element is composed of a ring gear of the third planetary gear set and a carrier of the fourth planetary gear set connected to each other, a fifth rotary element is composed of a sun gear of the second planetary gear set, a carrier of the third planetary gear set, and a ring gear of the fourth planetary gear set connected to each other, wherein the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a tenth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set and a single-pinion type fourth planetary gear set, in which a first rotary element being composed of a sun gear of the third planetary gear set and a sun gear of the fourth planetary gear set connected to each other, a second rotary element being composed of a ring gear of the second planetary gear set, a third rotary element being composed of a carrier of the second planetary gear set and a ring gear of the third planetary gear set connected to each other, a fourth rotary element being composed of a carrier of the fourth planetary gear set, a fifth rotary element being composed of a sun gear of the second planetary gear set, carrier of the third planetary gear set and a ring gear of the fourth planetary gear set connected to each other, and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a eleventh aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a sun gear of the second planetary gear set, a carrier of the third planetary gear set and a sun gear of the fourth planetary gear set connected to each other, a second rotary element being composed of a carrier of the second planetary gear set and a ring gear of the third planetary gear set connected to each other, a third rotary element being composed of a ring gear of the second planetary gear set, a fourth rotary element being composed of a carrier of the fourth planetary gear set, a fifth rotary element being composed of a sun gear of the third planetary gear set and a ring gear of the fourth planetary gear set connected to each other, and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twelfth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the second planetary gear set, a second rotary element being composed of a ring gear of the third planetary gear set and a carrier of the fourth planetary gear set connected to each other, a third rotary element being composed of a carrier of the second planetary gear set, a carrier of the third planetary gear set and a ring gear of the fourth planetary gear set connected to each other, a fourth rotary element being composed of a ring gear of the second planetary gear set and a sun gear of the fourth planetary gear set connected to each other, a fifth rotary element being composed of a sun gear of the third planetary gear set, and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirteenth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a carrier of the third planetary gear set and a sun gear of the fourth planetary gear set connected to each other, a second rotary element being composed of a ring gear of the second planetary gear set, a third rotary element being composed of a carrier of the second planetary gear set, a ring gear of the third planetary gear set and a carrier of the fourth planetary gear set connected to each other, a fourth rotary element being composed of a ring gear of the fourth planetary gear set, a fifth rotary element being composed of a sun gear of the second planetary gear set and a sun gear of the third planetary gear set connected to each other, and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a fourteenth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a sun gear of the third planetary gear set and a sun gear of the fourth planetary gear set connected to each other, a second rotary element being composed of a ring gear of the second planetary gear set, a third rotary element being composed of a carrier of the second planetary gear set, a ring gear of the third planetary gear set and a carrier of the fourth planetary gear set connected to each other, a fourth rotary element being composed of a ring gear of the fourth planetary gear set, and a fifth rotary element being composed of a sun gear of the second planetary gear set and a carrier of the third planetary gear set connected to each other, and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a fifteenth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the second planetary gear set and a sun gear of the fourth planetary gear set connected to each other, a second rotary element being composed of a ring gear of the second planetary gear set and a ring gear of the third planetary gear set connected to each other, a third rotary element being composed of a carrier of the third planetary gear set and a carrier of the fourth planetary gear set connected to each other, a fourth rotary element being composed of a ring gear of the fourth planetary gear set, an fifth rotary element being composed of a carrier of the second planetary gear set and a sun gear of the third planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path-via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a sixteenth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the third planetary gear set and a sun gear of the fourth planetary gear set connected to each other, a second rotary element being composed of a sun gear of the second planetary gear set, a third rotary element being composed of a carrier of the third planetary gear set, a fourth rotary element being composed of a ring gear of the second planetary gear set, a carrier of the third planetary gear set and a ring gear of the fourth planetary gear set connected to each other, and a fifth rotary element being composed of a carrier of the second planetary gear set and a ring gear of the third planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a seventeenth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the second planetary gear set, a sun gear of the third planetary gear set and a sun gear of the fourth planetary gear set connected to each other, a second rotary element being composed of a ring gear of the second planetary gear set, a third rotary element being composed of a carrier of the fourth planetary gear set, a fourth rotary element being composed of a carrier of the third planetary gear set and a ring gear of the fourth planetary gear set connected to each other, and a fifth rotary element being composed of a carrier of the second planetary gear set and a ring gear of the third planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a eighteenth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the third planetary gear set and a sun gear of the fourth planetary gear set connected to each other, a second rotary element being composed of a carrier of the second planetary gear set and a carrier of the third planetary gear set connected to each other, a third rotary element being composed of a ring gear of the third planetary gear set and a carrier of the fourth planetary gear set connected to each other, a fourth rotary element being composed of a ring gear of the second planetary gear set and a ring gear of the fourth planetary gear set connected to each other, a fifth rotary element being composed of a sun gear of the second planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a nineteenth aspect of the present invention, which provides a multistage transmission comprising: (1) a first transmission portion including a first intermediate output path for outputting rotations of an input member at a fixed transmission ratio determined in advance and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a sun gear of the second planetary gear set, a carrier of the third planetary gear set and a sun gear of the fourth planetary gear set connected to each other, a second rotary element being composed of a carrier of the second planetary gear set, a third rotary element being composed of a ring gear of the second planetary gear set, a ring gear of the third planetary gear set and a carrier of the fourth planetary gear set connected to each other, a fourth rotary element being composed of a ring gear of the fourth planetary gear set, a fifth rotary element being composed of a sun gear of the third planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twentieth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a sun gear of the second planetary gear set, a carrier of the third planetary gear set and a sun gear of the fourth planetary gear set connected to each other, a second rotary element being composed of a carrier of the second planetary gear set and a ring gear of the third planetary gear set connected to each other, a third rotary element being composed of a ring gear of the second planetary gear set and a carrier of the fourth planetary gear set connected to each other, a fourth rotary element being composed of a ring gear of the fourth planetary gear set, a fifth rotary element being composed of a sun gear of the third planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twenty-first aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the second planetary gear set, a sun gear of the third planetary gear set and a sun gear of the fourth planetary gear set connected to each other, a second rotary element being composed of a ring gear of the second planetary gear set and a carrier of the third planetary gear set connected to each other, a third rotary element being composed of a ring gear of the third planetary gear set and a carrier of the fourth planetary gear set connected to each other, a fourth rotary element being composed of a ring gear of the fourth planetary gear set, and a fifth rotary element being composed of a carrier of the second planetary gear set, and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twenty second aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a sun gear of the second planetary gear set, a sun gear of the third planetary gear set and a sun gear of the fourth planetary gear set connected to each other, a second rotary element being composed of a ring gear of the third planetary gear set, a third rotary element being composed of a carrier of the fourth planetary gear set, a fourth rotary element being composed of a carrier of the second planetary gear set, a carrier of the third planetary gear set and a ring gear of the fourth planetary gear set connected to each other, a fifth rotary element being composed of a ring gear of the second planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twenty-third aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the third planetary gear set and a sun gear of the fourth planetary gear set connected to each other, a second rotary element being composed of a carrier of the second planetary gear set and a carrier of the third planetary gear set connected to each other, a third rotary element being composed of a ring gear of the second planetary gear set and a ring gear of the third planetary gear set connected to each other, a fourth rotary element being composed of a sun gear of the second planetary gear set and a carrier of the fourth planetary gear set connected to each other, a fifth rotary element being composed of a ring gear of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twenty-fourth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a sun gear of the second planetary gear set, a sun gear of the third planetary gear set and a sun gear of the fourth planetary gear set connected to each other, a second rotary element being composed of a carrier of the second planetary gear set and a ring gear of the third planetary gear set connected to each other, a third rotary element being composed of a ring gear of the second planetary gear set, a fourth rotary element being composed of a carrier of the third planetary gear set and a carrier of the fourth planetary gear set connected to each other, a fifth rotary element being composed of a ring gear of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twenty-fifth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the third planetary gear set and a sun gear of the fourth planetary gear set connected to each other, a second rotary element being composed of a ring gear of the second planetary gear set and a ring gear of the fourth planetary gear set connected to each other, a third rotary element being composed of a carrier of the second planetary gear set, a fourth rotary element being composed of a carrier of the third planetary gear set and a carrier of the fourth planetary gear set connected to each other, a fifth rotary element being composed of a sun gear of the second planetary gear set and a ring gear of the third planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twenty-sixth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a sun gear of the second planetary gear set and a sun gear of the fourth planetary gear set connected to each other, a second rotary element being composed of a carrier of the second planetary gear set and a carrier of the third planetary gear set connected to each other, a third rotary element being composed of a ring gear of the second planetary gear set and a ring gear of the third planetary gear set connected to each other, a fourth rotary element being composed of a sun gear of the third planetary gear set and a carrier of the fourth planetary gear set connected to each other, a fifth rotary element being composed of a ring gear of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twenty-seventh aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a sun gear of the second planetary gear set and a sun gear of the fourth planetary gear set connected to each other, a second rotary element being composed of a carrier of the second planetary gear set and a sun gear of the third planetary gear set connected to each other, a third rotary element being composed of a ring gear of the second planetary gear set and a ring gear of the third planetary gear set connected to each other, a fourth rotary element being composed of a carrier of the third planetary gear set and a carrier of the fourth planetary gear set connected to each other, a fifth rotary element being composed of a ring gear of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twenty-eighth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the second planetary gear set, a second rotary element being composed of a carrier of the second planetary gear set and a ring gear of the third planetary gear set connected to each other, a third rotary element being composed of a ring gear of the second planetary gear set, a carrier of the third planetary gear set and a carrier of the fourth planetary gear set connected to each other, a fourth rotary element being composed of a ring gear of the fourth planetary gear set, a fifth rotary element being composed of a sun gear of the third planetary gear set and a sun gear of the fourth planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a twenty-nineth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the third planetary gear set, a second rotary element being composed of a ring gear of the second planetary gear set, a carrier of the third planetary gear set and a carrier of the fourth planetary gear set connected to each other, a third rotary element being composed of a carrier of the second planetary gear set, a ring gear of the third planetary gear set and a ring gear of the fourth planetary gear set connected to each other, a fourth rotary element being composed of a sun gear of the fourth planetary gear set, a fifth rotary element being composed of a sun gear of the second planetary gear set and a sun gear of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirtieth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the second planetary gear set and a sun gear of the third planetary gear set connected to-each other, a second rotary element being composed of a carrier of the fourth planetary gear set, a third rotary element being composed of a carrier of the third planetary gear set and a ring gear of the fourth planetary gear set connected to each other, a fourth rotary element being composed of a carrier of the second planetary gear set, a ring gear of the third planetary gear set and a sun gear of the fourth planetary gear set connected to each other, a fifth rotary element being composed of a ring gear of the second planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirty-first aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the second planetary gear set and a sun gear of the third planetary gear set connected to each other, a second rotary element being composed of a sun gear of the fourth planetary gear set, a third rotary element being composed of a carrier of the third planetary gear set and a ring gear of the fourth planetary gear set connected to each other, a fourth rotary element being composed of a carrier of the second planetary gear set, a ring gear of the third planetary gear set and a carrier of the fourth planetary gear set connected to each other, a fifth rotary element being composed of a ring gear of the second planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirty-second aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the second planetary gear set and a sun gear of the third planetary gear set connected to each other, a second rotary element being composed of a carrier of the second planetary gear set, a third rotary element being composed of a ring gear of the second planetary gear set, a carrier of the third planetary gear set and a sun gear of the fourth planetary gear set connected to each other, a fourth rotary element being composed of a ring gear of the third planetary gear set and a ring gear of the fourth planetary gear set connected to each other, a fifth rotary element being composed of a carrier of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirty-third aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the second planetary gear set, a sun gear of the third planetary gear set and a sun gear of the fourth planetary gear set connected to each other, a second rotary element being composed of a carrier of the fourth planetary gear set, a third rotary element being composed of a ring gear of the second planetary gear set, a carrier of the third planetary gear set and a ring gear of the fourth planetary gear set connected to each other, a fourth rotary element being composed of a ring gear of the third planetary gear set, a fifth rotary element being composed of a carrier of the second planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirty-fourth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the second planetary gear set and a sun gear of the third planetary gear set connected to each other, a second rotary element being composed of a carrier of the second planetary gear set, a third rotary element being composed of a ring gear of the second planetary gear set, a carrier of the third planetary gear set and a carrier of the fourth planetary gear set connected to each other, a fourth rotary element being composed of a ring gear of the third planetary gear set and a ring gear of the fourth planetary gear set connected to each other, a fifth rotary element being composed of a sun gear of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirty-fifth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a single-pinion type fourth planetary gear set, in which a first rotary element being composed of a sun gear of the second planetary gear set, a sun gear of the third planetary gear set and a sun gear of the fourth planetary gear set connected to each other, a second rotary element being composed of a carrier of the second planetary gear set, a third rotary element being composed of a ring gear of the second planetary gear set and a carrier of the third planetary gear set connected to each other, a fourth rotary element being composed of a ring gear of the third planetary gear set and a carrier of the fourth planetary gear set connected to each other, a fifth rotary element being composed of a ring gear of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirty-sixth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the fourth planetary gear set, a second rotary element being composed of a carrier of the second planetary gear set and a ring gear of the third planetary gear set connected to each other, a third rotary element being composed of a carrier of the third planetary gear set and a carrier of the fourth planetary gear set connected to each other, a fourth rotary element being composed of a ring gear of the second planetary gear set and a ring gear of the fourth planetary gear set connected to each other, a fifth rotary element being composed of a sun gear of the second planetary gear set and a sun gear of the third planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirty-seventh aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the second planetary gear set and a sun gear of the third planetary gear set connected to each other, a second rotary element being composed of a carrier of the second planetary gear set, a carrier of the third planetary gear set and a carrier of the fourth planetary gear set connected to each other, a third rotary element being composed of a ring gear of the second planetary gear set, a fourth rotary element being composed of a ring gear of the third planetary gear set and a ring gear of the fourth planetary gear set connected to each other, a fifth rotary element being composed of a sun gear of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirty-eighth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a carrier of the second planetary gear set and a sun gear of the third planetary gear set connected to each other, a second rotary element being composed of a ring gear of the second planetary gear set, a third rotary element being composed of a ring gear of the fourth planetary gear set, a fourth rotary element being composed of a carrier of the third planetary gear set and a carrier of the fourth planetary gear set connected to each other, a fifth rotary element being composed of a sun gear of the second planetary gear set, a ring gear of the third planetary gear set and a sun gear of the fourth planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a thirty-nineth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a carrier of the second planetary gear set, a sun gear of the third planetary gear set and a sun gear of the fourth planetary gear set connected to each other, a second rotary element being composed of a ring gear of the second planetary gear set, a carrier of the third planetary gear set and a carrier of the fourth planetary gear set connected to each other, a third rotary element being composed of a ring gear of the third planetary gear set, a fourth rotary element being composed of a ring gear of the fourth planetary gear set, a fifth rotary element being composed of a sun gear of the second planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a fortieth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the second planetary gear set and a sun gear of the third planetary gear set connected to each other, a second rotary element being composed of a ring gear of the second planetary gear set and a ring gear of the fourth planetary gear set connected to each other, a third rotary element being composed of a carrier of the fourth planetary gear set, a fourth rotary element being composed of a carrier of the third planetary gear set, a fifth rotary element being composed of a carrier of the second planetary gear set, a ring gear of the third planetary gear set and a sun gear of the fourth planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a forty-first aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the third planetary gear set, a second rotary element being composed of a ring gear of the second planetary gear set, a carrier of the third planetary gear set and a sun gear of the fourth planetary gear set connected to each other, a third rotary element being composed of a carrier of the second planetary gear set and a ring gear of the fourth planetary gear set connected to each other, a fourth rotary element being composed of a ring gear of the third planetary gear set and a carrier of the fourth planetary gear set connected to each other, a fifth rotary element being composed of a sun gear of the second planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a forty-second aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the second planetary gear set, a sun gear of the third planetary gear set and a sun gear of the fourth planetary gear set connected to each other, a second rotary element being composed of a ring gear of the second planetary gear set, a carrier of the third planetary gear set and a carrier of the fourth planetary gear set connected to each other, a third rotary element being composed of a ring gear of the third planetary gear set, a fourth rotary element being composed of a ring gear of the fourth planetary gear set, a fifth rotary element being composed of a carrier of the second planetary gear set; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a forty-third aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the second planetary gear set, a second rotary element being composed of a ring gear of the second planetary gear set and a ring gear of the third planetary gear set connected to each other, a third rotary element being composed of a carrier of the third planetary gear set and a ring gear of the fourth planetary gear set connected to each other, a fourth rotary element being composed of a carrier of the fourth planetary gear set, a fifth rotary element being composed of a carrier of the second planetary gear set, a sun gear of the third planetary gear set and a sun gear of the fourth planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a forty-fourth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the fourth planetary gear set, a second rotary element being composed of a carrier of the second planetary gear set, a third rotary element being composed of a ring gear of the third planetary gear set, a fourth rotary element being composed of a ring gear of the second planetary gear set, a carrier of the third planetary gear set and a carrier of the fourth planetary gear set connected to each other, a fifth rotary element being composed of a sun gear of the second planetary gear set, a sun gear of the third planetary gear set and a ring gear of the fourth planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a forty-fifth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the second planetary gear set, a second rotary element being composed of a sun gear of the fourth planetary gear set, a third rotary element being composed of a ring gear of the third planetary gear set, a fourth rotary element being composed of a carrier of the second planetary gear set, a carrier of the third planetary gear set and a ring gear of the fourth planetary gear set connected to each other, a fifth rotary element being composed of a ring gear of the second planetary gear set, a sun gear of the third planetary gear set and a carrier of the fourth planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a forty-sixth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the fourth planetary gear set, a second rotary element being composed of a carrier of the second planetary gear set, a third rotary element being composed of a ring gear of the second planetary gear set and a ring gear of the third planetary gear set connected to each other, a fourth rotary element being composed of a sun gear of the second planetary gear set, a carrier of the third planetary gear set and a carrier of the fourth planetary gear set connected to each other, a fifth rotary element being composed of a sun gear of the third planetary gear set and a ring gear of the fourth planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a forty-seventh aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a double-pinion type second planetary gear set, a single-pinion type third planetary gear set, and a single-pinion type fourth planetary gear set, in which a first rotary element being composed of a sun gear of the second planetary gear set and a sun gear of the third planetary gear set connected to each other, a second rotary element being composed of a ring gear of the second planetary gear set, a third rotary element being composed of a ring gear of the fourth planetary gear set, a fourth rotary element being composed of a carrier of the third planetary gear set and a carrier of the fourth planetary gear set connected to each other, a fifth rotary element being composed of a carrier of the second planetary gear set, a ring gear of the third planetary gear set and a sun gear of the fourth planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a forty-eighth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a single-pinion type third planetary gear set, and a double-pinion type fourth planetary gear set, in which a first rotary element being composed of a sun gear of the second planetary gear set, a second rotary element being composed of a sun gear of the fourth planetary gear set, a third rotary element being composed of a ring gear of the third planetary gear set and a ring gear of the fourth planetary gear set connected to each other, a fourth rotary element being composed of a carrier of the second planetary gear set, a carrier of the third planetary gear set and a carrier of the fourth planetary gear set connected to each other, a fifth rotary element being composed of a ring gear of the second planetary gear set and a sun gear of the third planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a forty-nineth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a single-pinion type second planetary gear set, a double-pinion type third planetary gear set, and a single-pinion type fourth planetary gear set, in which a first rotary element being composed of a sun gear of the fourth planetary gear set, a second rotary element being composed of a ring gear of the second planetary gear set, a third rotary element being composed of a carrier of the planetary gear set and a carrier of the third planetary gear set connected to each other, a fourth rotary element being composed of a ring gear of the third planetary gear set and a carrier of the fourth planetary gear set connected to each other, a fifth rotary element being composed of a sun gear of the second planetary gear set, a sun gear of the third planetary gear set and a ring gear of the fourth planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

The object indicated above may also be achieved according to a fiftieth aspect of the present invention, which provides a multistage transmission comprising: (1) a first transmission portion including a first intermediate output path for outputting rotations of an input member at a fixed transmission ratio determined in advance, and a second intermediate output path for outputting rotations of the input member after reducing the rotations at a greater transmission ratio than the first intermediate output path; and (2) a second transmission portion having a singe-pinion type second planetary gear set, a single-pinion type third planetary gear set, and a single-pinion type fourth planetary gear set, in which a first rotary element being composed of a sun gear of the fourth planetary gear set, a second rotary element being composed of a ring gear of the second planetary gear set, a third rotary element being composed of a carrier of the second planetary gear set and a ring gear of the third planetary gear set connected to each other, a fourth rotary element being composed of a carrier of the third planetary gear set and a carrier of the fourth planetary gear set connected to each other, a fifth rotary element being composed of a sun gear of the second planetary gear set, a sun gear of the third planetary gear set and a ring gear of the fourth planetary gear set connected to each other; and the first rotary element being selectively brought to a stationary state by a first brake, the second rotary element being selectively brought to a stationary state by a second brake, the third rotary element being selectively brought to a stationary state by a third brake, the fifth rotary element being selectively connected to the second intermediate output path via a first clutch, the first rotary element being selectively connected to the second intermediate output path via a second clutch, the second rotary element being selectively connected to the first intermediate output path via a third clutch; and having a fourth clutch for causing the five rotary elements to rotate integral with the first intermediate output path by being engaged with the third clutch; and outputting rotations by the fourth rotary element being connected to an output member; (3) wherein a plurality of gear stages are established by changing engagement and disengagement of the clutches and brakes.

In a preferred form of a fifty-first aspect of the invention including all elements of any one of the seventh aspect through the fiftieth aspect of the invention, the fourth clutch selectively connects any one of the first, third and fifth rotary elements to the first intermediate output path.

In a preferred form of a fifty-second aspect of the invention including all elements of any one of the seventh aspect through fiftieth aspect of the invention, the fourth clutch selectively connects any two of the five rotary elements.

In a preferred form of a fifty-third aspect of the invention including all elements of any one of the seventh aspect through the fifty-second aspect of the invention, at least seven forward gear stages are established by changing engagement and disengagement of the clutches and brakes.

In a preferred form of a fifty-fourth aspect of the invention including all elements of any one of the seventh aspect through the fifty-third aspect of the invention, (1) a first gear stage having the highest transmission ratio is established by engaging the first clutch and the third brake with each other; (2) a second gear stage having a smaller transmission ratio than the first gear stage is established by engaging the first clutch and the second brake with each other; (3) a third gear stage having a smaller transmission ratio than the second gear stage is established by engaging the first clutch and the first brake with each other; (4) a fourth gear stage having a smaller transmission ratio than the third gear stage is established by engaging the first clutch and the second clutch with each other; (5) a fifth gear stage having a smaller transmission ratio than the fourth gear stage is established by engaging the first clutch and the third clutch with each other; (6) a sixth gear stage having a smaller transmission ratio than the fifth gear stage is established by engaging the third clutch and the fourth clutch with each other; (7) a seventh gear stage having a smaller transmission ratio than the sixth gear stage is established by engaging the second clutch and the third clutch with each other; (8) an eighth gear stage having a smaller transmission ratio than the seventh gear stage is established by engaging the third clutch and the first brake with each other; and (9) a drive speed is changed by using seven or more gear stages of the first gear stage to the eighth gear stage.

In a preferred form of a fifty-fifth aspect of the invention including all elements of any one of the first aspect through the fifty-fourth aspect of the invention, the first transmission portion includes a first planetary gear set in which any one of three rotary elements is connected to the input member and the first intermediate output path, another one thereof is fixed to be non-rotatable, and the remaining one thereof is connected to the second intermediate output path.

The multistage transmission according to the present invention can be constructed to be light in weight and compact since multistage transmission of seven or more forward stages can be obtained by the first transmission portion having two intermediate output paths whose transmission ratios differ from each other, the second transmission portion including three planetary gear sets, four clutches and three brakes, and further since transmission can be carried out by changes in engagement of two engagement elements (clutches and brakes), shifting action control for transmission can be facilitated and it is possible to prevent a shock from being brought about due to speed change.

In the seventh aspect through the fifty-fourth aspect of the invention, in which the first to the fifth rotary elements are defined in detail, since the gear ratio ρ of four planetary gear sets is appropriately established in a range of, for example, 0.3 through 0.6, it is possible to use comparatively small-sized (small-diameter) planetary gear sets as such planetary gear sets, and the transmission ratio of seven or more gear stages can be established in a form close to equal ratios. Simultaneously, it is possible to secure a large range of transmission ratio of, for example, 6 through 8 in total.

The invention is preferably applied to an automatic transmission for a vehicle, wherein rotation is inputted from a drive source for running such as, for example, an internal combustion engine, electric motor, etc., through a fluid joint such as a torque converter, its speed is changed at an appropriate transmission rate and is transmitted from an output member such as an output gear and an output shaft to left and right drive wheels via a differential gear set. Herein, the invention may be applicable to an automatic transmission for other equipment other than vehicles. The input member is, for example, a turbine shaft of a torque converter.

The direction of mounting the automatic transmission with respect to a vehicle may be lateral for FF (front engine and front drive) and RR (rear engine and rear drive) in which the axial line of the automatic transmission is the width direction of the vehicle, and may be longitudinal for FR (front engine and rear drive) in which the axial direction thereof is the longitudinal direction of the vehicle.

The automatic transmission may be such that it automatically changes a gear stage in response to drive conditions such as an operating amount of the accelerator and vehicle speed. Further the automatic transmission may be such that it changes a gear stage in accordance with switching operations (Speed-up and speed-down operations) of a driver. A multistage transmission according to the invention is capable of carrying out multistage transmission of seven or more forward gear stages and may be preferably applied to a multistage transmission of eight forward stages. Further, as in the first aspect and second aspects and seventh through fifty-second aspects of the invention, the multistage transmission may be used for transmission of seven or less forward gear stages. In addition, a reverse gear stage can be established by engaging the second clutch and the second brake with each other. The reverse transmission may be of one stage or may be composed of two or more stages which can be changed by drive conditions or a driver's choice. For example, a second reverse gear stage can be established by engaging the clutch and the third brake with each other. That is, where the fourth clutch is composed so that the first rotary element is selectively connected to the first intermediate output path, the second reverse gear stage may be established by engaging the fourth clutch and the third brake with each other.

Although eight forward gear stages can be established in the fourth aspect and the fifty-fourth aspect of the invention, where seven forward gear stages are established when embodying the invention, seven forward gear stages may be established with any one of the eight forward gear stages omitted. For example, various modes of gear stages are available, in which the first through the seventh gear stages are used with the eight gear stage omitted, the second through the eighth gear stages are used with the first gear stage omitted, or the first through sixth gear stages and the eighth gear stage are used with the seventh gear stage omitted.

Also, engaging operations of the first through the fourth clutches with the first through the third brakes to establish eight forward gear stages, which are shown in the fourth aspect and the fifty-fourth aspect of the invention are only examples. Various modes are available with respect to combinations of other engaging operations of clutches and brakes to establish the eight forward gear stages. For example, where the fourth clutch is composed so that the third rotary element is selectively connected to the first intermediate output path, (a) another seventh gear stage having a smaller transmission ratio than that of the sixth gear stage may be established by engaging the second clutch and the fourth clutch with each other, (b) another eighth gear stage having a smaller transmission ratio than that of the above-described other seventh gear stage may be established by engaging the fourth clutch and the first brake with each other, and (c) the 5-6th gear stage having a transmission ratio between the fifth and the sixth gear stages may be established by engaging the first clutch and the fourth clutch with each other. The above-described other seventh, other eighth and 5-6th gear stages may be, respectively, used for the seventh, the eighth and the fifth or the sixth gear stages, which are shown in the fourth aspect and the fifty-fourth aspect of the invention or may be used in addition to the eight forward gear stages shown in the fourth and the fifty-fourth aspects. Further, still another mode is available, in which these gear stages may be changed as necessary in accordance with drive conditions or a driver's choice.

As described in the fifth aspect, the sixth aspect, the fifty-first aspect or the fifty-second aspect of the invention, the fourth clutch selectively connects any one of the first, the third and the fifth rotary members to the first intermediate output path or selectively connects any two of the five rotary members thereto. However, instead of these constructions, a multistage transmission according to any one of the second through the fourth aspects and the seventh through the fiftieth aspects of the invention maybe constructed so that (a) a fifth planetary gear set is provided, and while (b) the sixth rotary element is composed of any one of the sun gear, carrier and ring gear of the fifth planetary gear set so that it comes between the first and the second rotary elements or between the second and the third rotary elements, (c) the fourth clutch may be composed so that it selectively connects the sixth rotary element to the first intermediate output path.

Further, as described above, where the fourth clutch is composed so that it selectively connects the sixth rotary element to the first intermediate output path, the fourth clutch is engaged instead of the third clutch which is engaged to establish the seventh and the eighth gear stages described in the fourth and the fifty-fourth aspects of the invention, that is, (a) another seventh gear stage having a smaller transmission ratio than that of the sixth gear stage is established by engaging the second clutch and the fourth clutch with each other, and (b) another eighth gear stage having a smaller transmission ratio than that of the above-described other seventh gear stage may be established by engaging the fourth clutch and the first brake with each other. In addition, the above-described other seventh and other eighth gear stages may be, respectively, used in addition to the eight forward gear stages described in the fourth and the fifty-fourth aspects of the invention, and another mode may be available, in which these gear stages may be changed as necessary in accordance with drive conditions or a driver's choice.

A multiple-plate or single-plate type or belt-type hydraulic friction engagement unit which is friction-engaged by a hydraulic cylinder may be preferably employed as the first through the fourth clutches and the first through the third brakes. Also, other types of engagement units such as an electromagnetic type, etc., may be employed. In order to facilitate shifting action control, a one-way clutch may be provided in parallel to these clutches and brakes. For example, if a one-way clutch is provided in parallel to the third brake, the first gear stage can be established only by engaging the one-way clutch with the first clutch. Further, shifting to the second gear stage can be enabled only by engaging it with the second brake. Where no engine brake is required, it is sufficient that only the one-way clutch is provided instead of the third brake. The one-way clutch can bring about the same function as a brake at the point in time when rotation is stopped. In addition, various modes are available, in which, for example, a brake and a one-way clutch connected in parallel to or in series with the second brake are provided.

In the fifty-fifth aspect of the invention, while the first transmission portion is composed to have the first planetary gear set, the transmission ratio (=the input rotation speed of the first transmission portion/output rotation speed) of the second intermediate output path of the first transmission portion is greater than 1.0 and rotation of the input member is transmitted after being reduced, the first intermediate output path transmits the rotation of the input member as it is (the transmission ratio =1.0), however, in embodying other modes of the invention, it is not necessary that the transmission ratio of the first intermediate output path is 1.0, wherein various modes are available, for example, the rotation of the input member may be transmitted as it is with the transmission ratio of the second intermediate output path set to 1.0 while rotation of the input member is transmitted after being accelerated with the transmission ratio of the first intermediate output path set to a smaller ratio than 1.0. The first planetary gear set is disposed coaxially with, for example, the second transmission portion.

A double-pinion type or a single-pinion type planetary gear set having a sun gear, a carrier and a ring gear as three rotary elements is preferably used as the first planetary gear set in the fifty-fifth aspect of the invention, and the planetary gear set is composed so that rotation of the input member is reduced and outputted in a state where any one of the sun gear, carrier and ring gear is connected to the input member and rotated, another one thereof is fixed to be non-rotatable, and the remaining one thereof is connected to the intermediate output path.

Where the single-pinion type planetary gear set is used, a pinion gear including a stepped portion having a major-diameter portion and a minor-diameter portion may be employed as the pinion geard is posed in the carrier. In such a case, the three rotary elements are composed of a sun gear and a ring gear, which are engaged respectively with one of the major-diameter portion and minor-diameter portion of the pinion gear, and a carrier. In addition thereto, the rotary members may be composed of a pair of a minor-diameter portion and major-diameter portion, which are respectively engaged with the major-diameter portion and minor-diameter portion of the pinion gear, and a carrier or may be composed of a pair of a major-diameter ring gear and minor-diameter ring gear, which are respectively engaged with the major-diameter portion and minor-diameter portion of the pinion gear, and a carrier.

A description is given below of another mode of the above-described first transmission portion which is provided with the first planetary gear set and composed so that it outputs (transmits) rotation of the input member to the second transmission portion via the first intermediate output path and the second intermediate output path caused to rotate with its speed reduced with respect to the first intermediate output path.

For example, in a multistage transmission described in any one of the first aspect through the fifty-fourth aspects of the invention, the multistage transmission may be constructed so that rotation of the input member is outputted (transmitted) to the second transmission portion on the second axis center parallel to the first axis center via the first intermediate output path consisting of two sets of power transmission members juxtaposed to each other and the second intermediate output portion. In detail, for example, the multistage transmission is constructed so that rotation of an input shaft connected to one of two axes is outputted to the second transmission portion secured on the other one of the two axes at two different rotation speeds via the two sets of counter gear pairs by the two axes disposed in parallel to each other like a counter-gear type of a parallel-axis type transmission and two sets of counter gear pairs operating as the two sets of power transmission members. In this case, one of the above-described two sets of counter gear pairs composes the first intermediate output path while the other thereof composes the second intermediate output path, wherein it is possible to obtain a multistage transmission which makes the range of transmission ratios large and has adequate transmission ratio steps. In addition, since only three planetary gear sets (the second transmission portion) are used on one axis center, the overall length, that is, the dimension in the axial direction can be further shortened than in the case where four planetary gear sets are disposed on one axis as in a case where the first transmission portion is a planetary gear set, and the multistage transmission can be preferably used in a lateral installation for an FF vehicle and an RR vehicle.

A counter gear pair is illustrated as an example with respect to the above-described power transmission member. For example, one set of a power transmission member may be composed of a pulley disposed on the first axis center and the second axis center, respectively, a belt applied to these pulleys or a sprocket and a chain.

The second transmission portion is composed, for example, as in the seventh aspect through the fifty-second aspect of the invention. Also, other connection modes may be employed.

There is no particular limitation in the positional relationship between the first transmission portion and the second transmission portion and in the positional relationship with respect to the second planetary gear set through the fourth planetary gear set of the second transmission portion. However, various modes are possible, for example, where the first transmission portion has the first planetary gear set, the third planetary gear set may be disposed between the first planetary gear set and the second planetary gear set. With respect to the clutches and brakes, various modes are available, in which, for example, the clutches and brakes may be centralized and disposed at one end.

BRIEF DESCRIPTION OF DRAWINGS

FIGS. 90(*a*) and 90(*b*) are views illustrating further another embodiment of the invention, in which a case is shown where the fourth clutch C4 differs in the arrangement position thereof in comparison with the embodiment in FIG. 87, and corresponding to FIG. 87;

FIG. 119 is a collinear chart of the embodiment in FIG. 117;

FIG. 120 is a view illustrating further another embodiment of the invention, in which a case is shown where the fourth clutch C4 differs in the arrangement position thereof in comparison with the embodiment in FIG. 117, and is a schematic view corresponding to FIG. 117;

FIG. 121 is an operation table of the embodiment in FIG. 120;

FIG. 122 is a collinear chart of the embodiment in FIG. 120;

FIG. 123 is a view illustrating further another embodiment of the invention, in which a case is shown where the fourth clutch C4 differs in the arrangement position thereof in comparison with the embodiment in FIG. 117, and is a schematic view corresponding to FIG. 117;

FIG. 124 is an operation table of the embodiment in FIG. 123;

FIG. 125 is a collinear chart of the embodiment in FIG. 123;

FIG. 126 is a view illustrating still another embodiment of the invention, in which a case is shown where the second transmission portion differs in the construction thereof in comparison with the embodiment in FIG. 105, and is a schematic view corresponding to FIG. 105;

FIG. 127 is an operation table of the embodiment in FIG. 126;

FIG. 128 is a collinear chart of the embodiment in FIG. 126;

FIG. 129 is a view illustrating further another embodiment of the invention, in which a case is shown where the fourth clutch C4 differs in the arrangement position thereof in comparison with the embodiment in FIG. 126, and is a schematic view corresponding to FIG. 126;

FIG. 130 is an operation table of the embodiment in FIG. 129;

Figure 126:
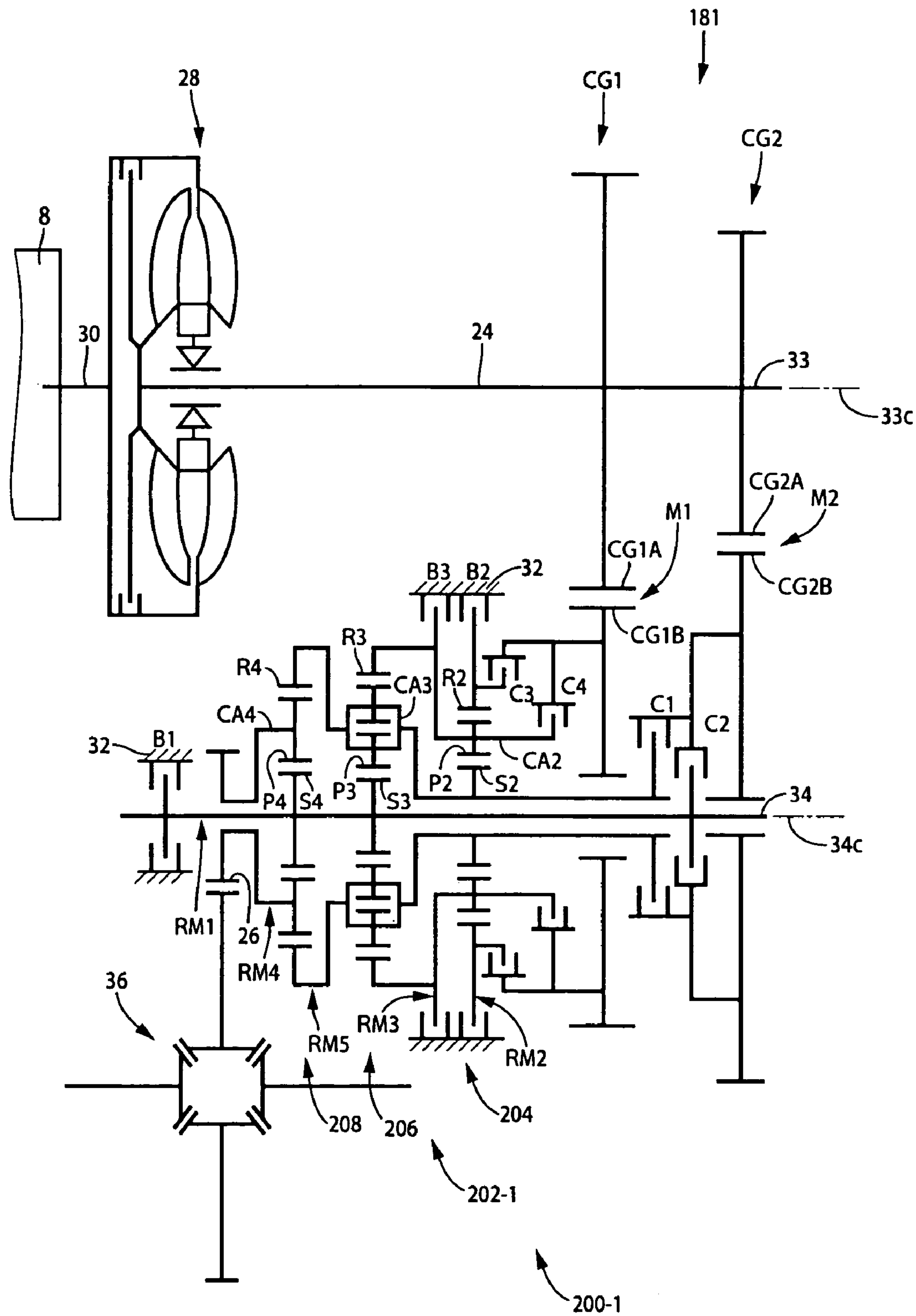
Figure 129:
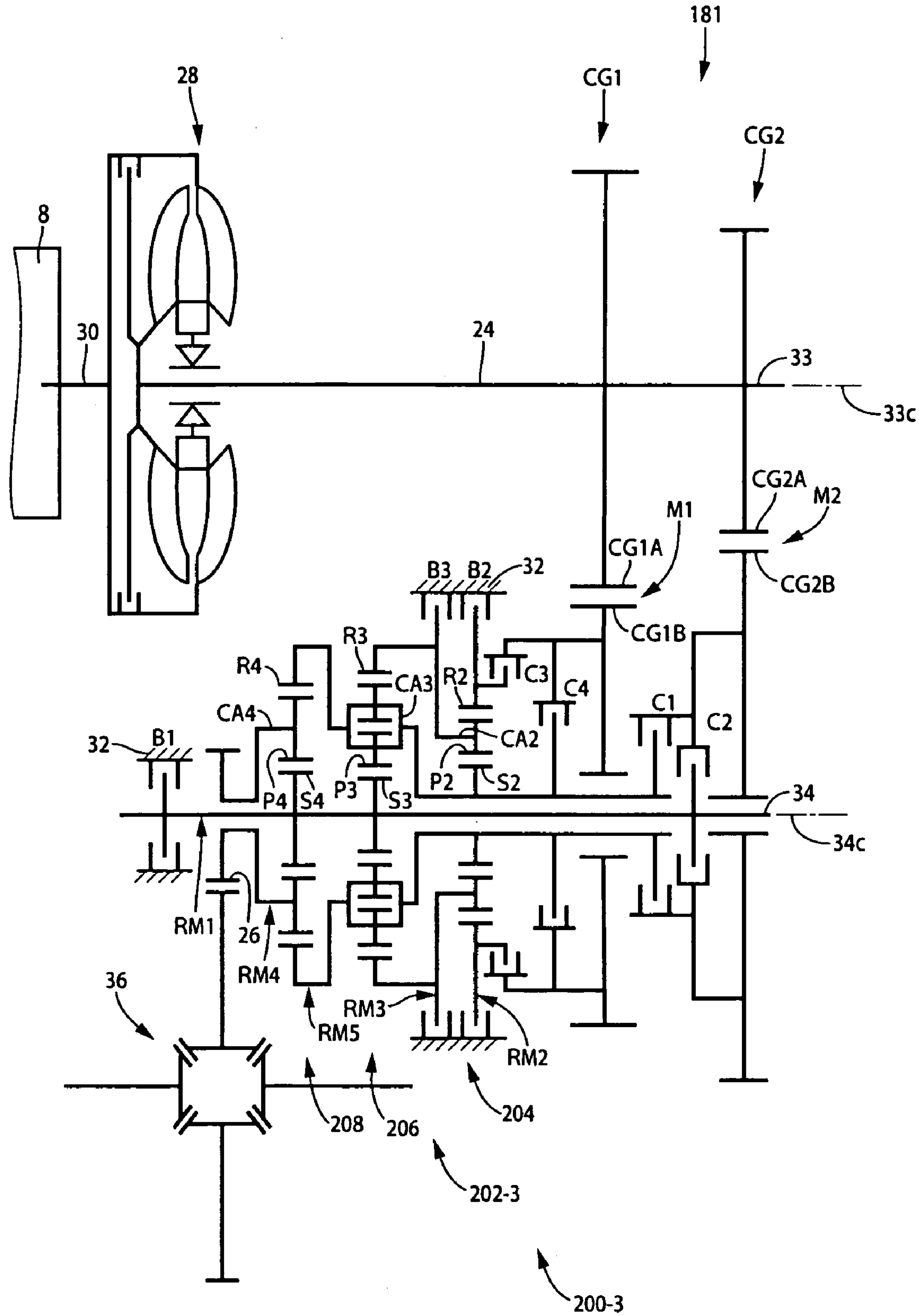
Figures 130, 131:
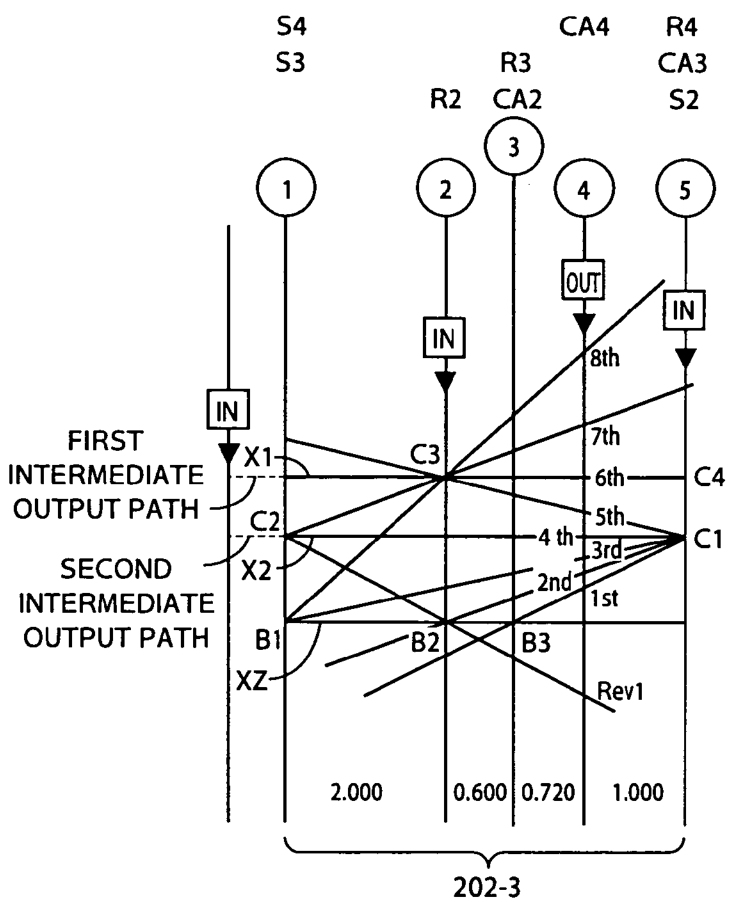
Figure 132:
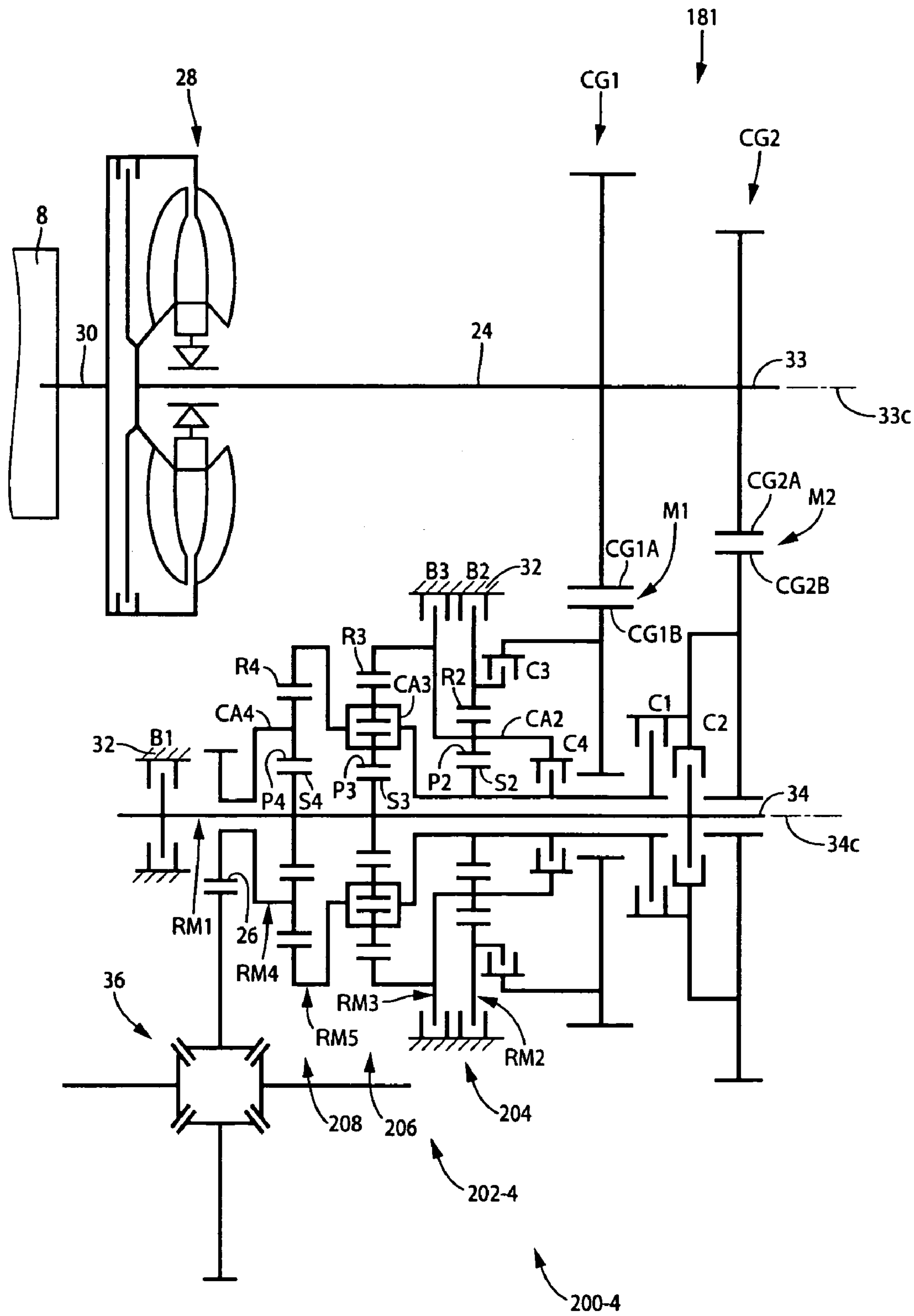
Figures 133, 134:
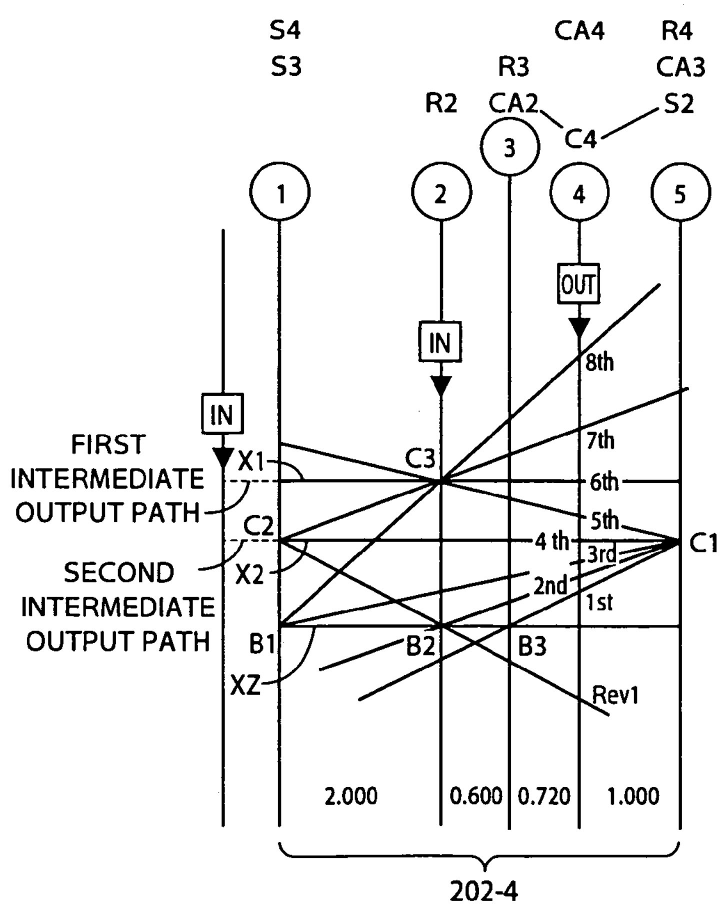

FIG. 131 is a collinear chart of the embodiment in FIG. 129;

FIG. 132 is a view illustrating further another embodiment of the invention, in which a case is shown where the fourth clutch C4 differs in the arrangement position thereof in comparison with the embodiment in FIG. 126, and is a schematic view corresponding to FIG. 126;

FIG. 133 is an operation table of the embodiment in FIG. 132

Figures 1A, 1B:
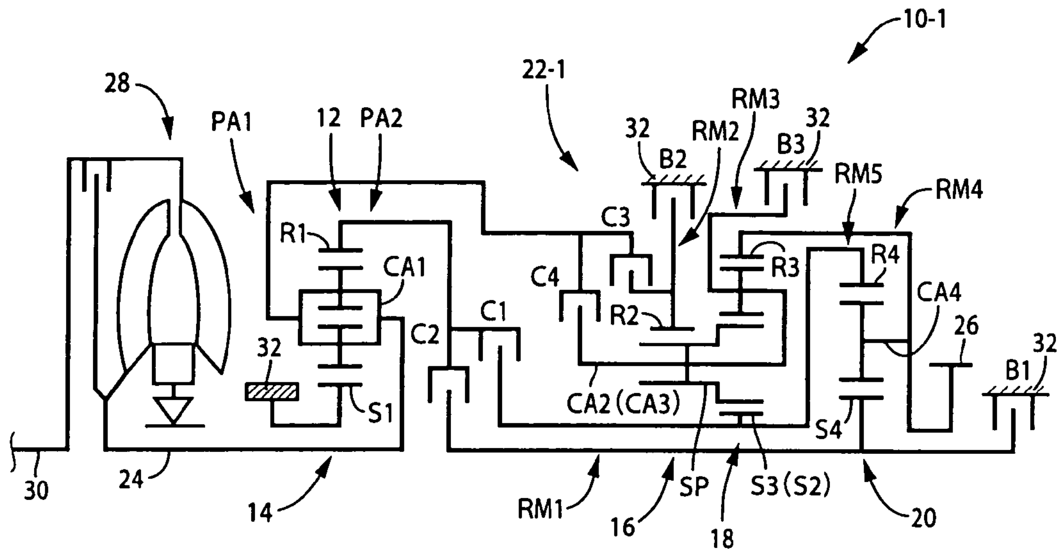
FIG. 1 is a view illustrating an automatic transmission for vehicle according to one embodiment of the invention, in which (a) is a schematic view thereof, and (b) is an operation table for establishing respective gear stages.
Figures 3A, 3B:
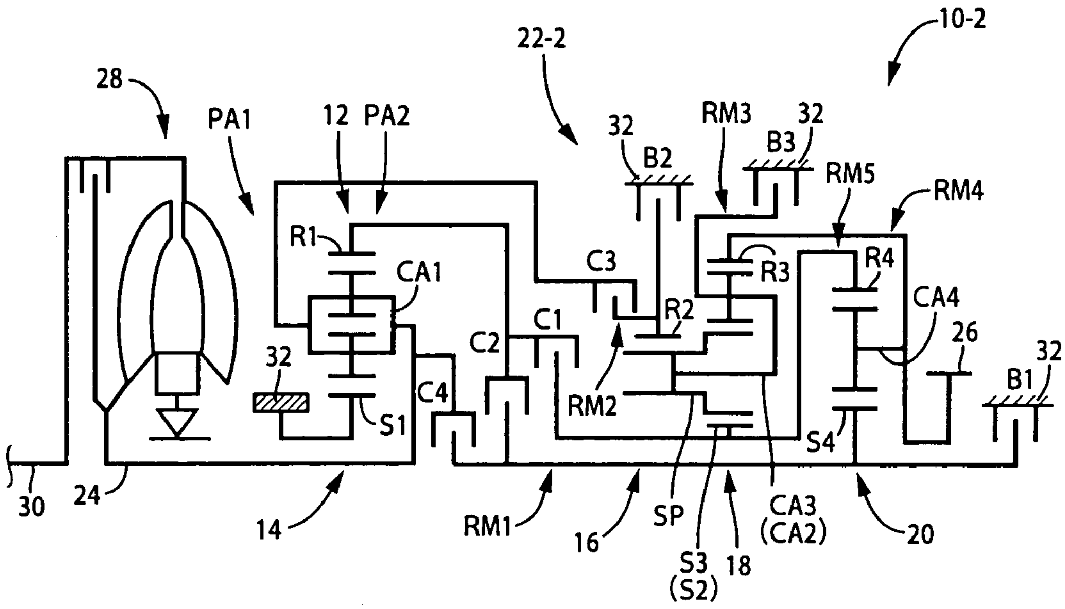
FIGS. 3(*a*) and 3(*b*) are views illustrating another embodiment of the invention, in which a case is shown where the fourth clutch C4 differs in the arrangement position thereof in comparison with the embodiment in FIG. 1, and corresponding to FIG. 1.
Figures 25A, 25B:
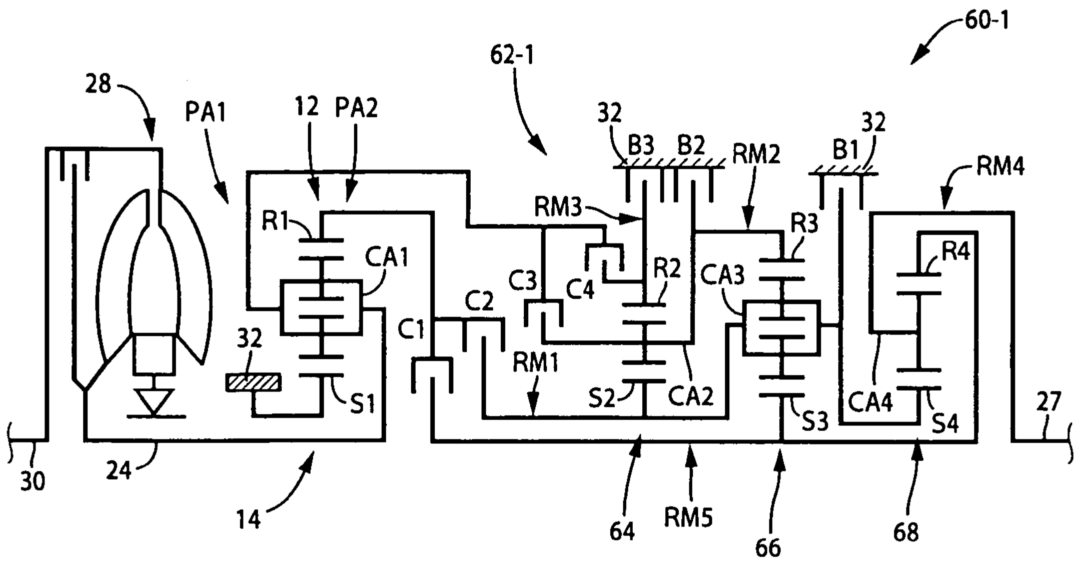
FIGS. 25(*a*) and 25(*b*) are views illustrating still another embodiment of the invention, in which a case is shown where the second transmission portion differs in the construction thereof in comparison with the embodiment in FIG. 1, and corresponding to FIG. 1.
Figure 105:
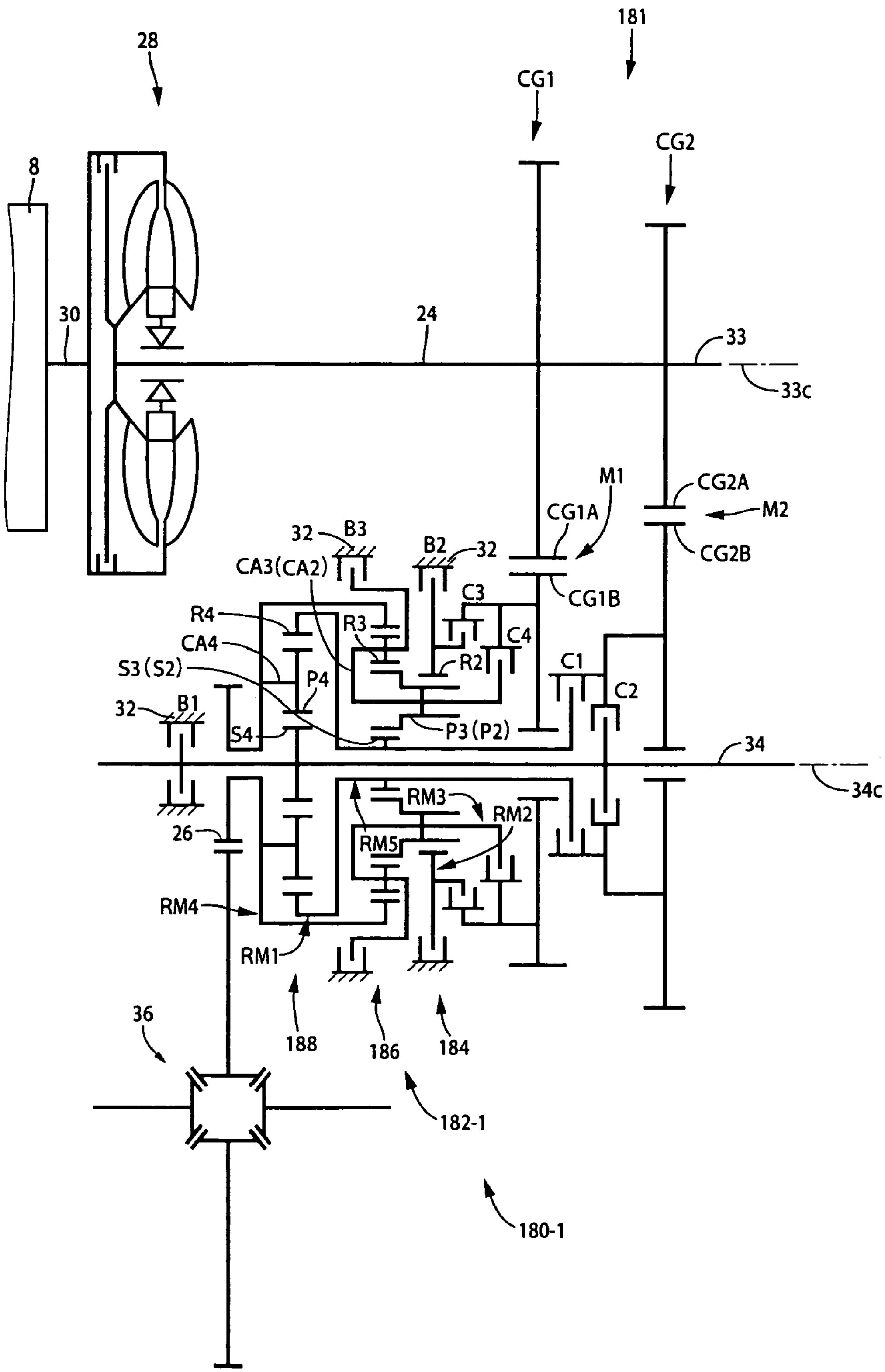
FIG. 105 is a view illustrating still another embodiment of the invention, which is a schematic view showing a counter-gear type automatic transmission for vehicle in which the first transmission portion is disposed over two parallel axes in comparison with the embodiment shown in FIG. 1.
Figure 111:
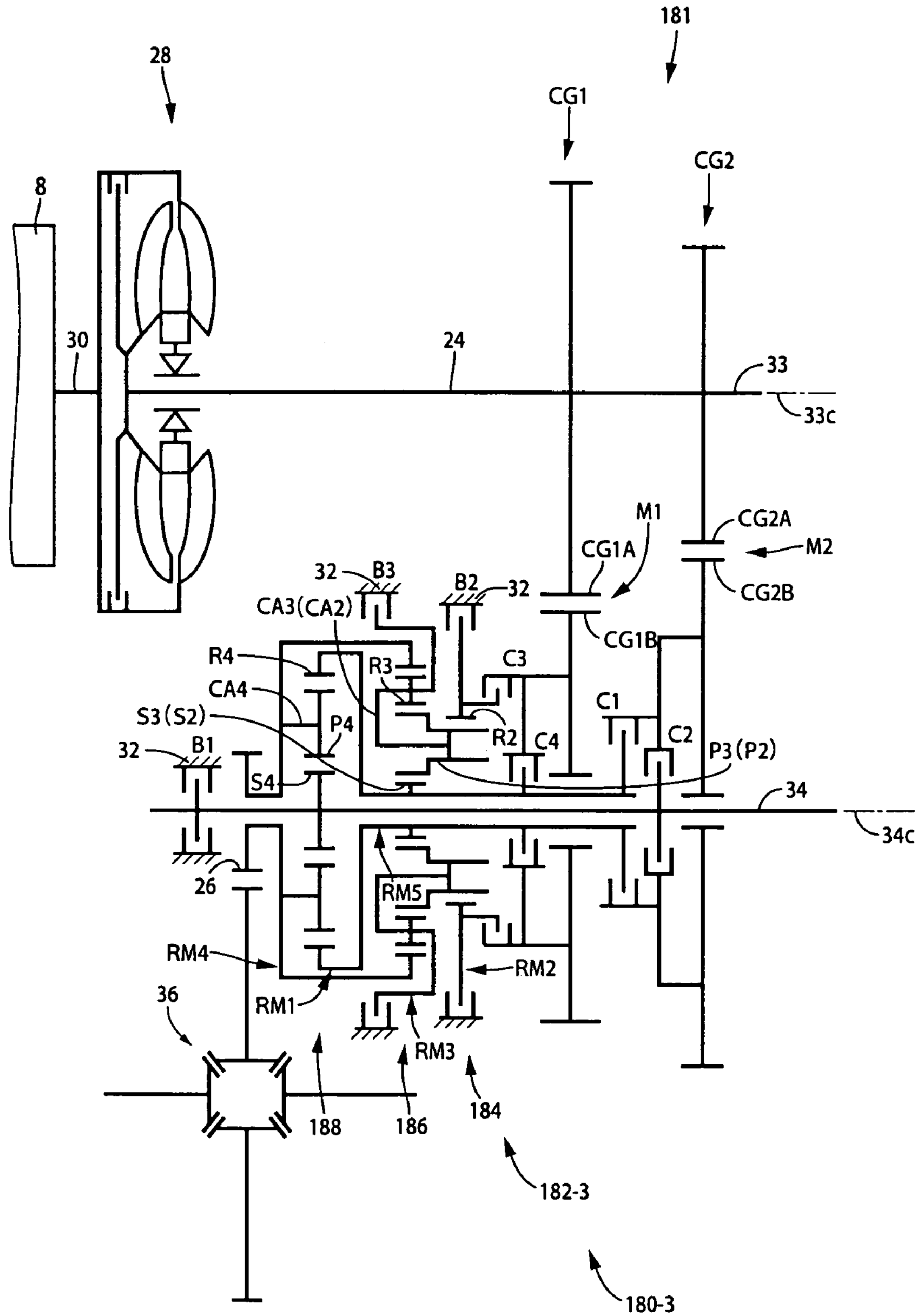
FIG. 111 is a view illustrating further another embodiment of the invention, in which a case is shown where the fourth clutch C4 differs in the arrangement position thereof in comparison with the embodiment in FIG. 105, and is a schematic view corresponding to FIG 105.
Figure 135:
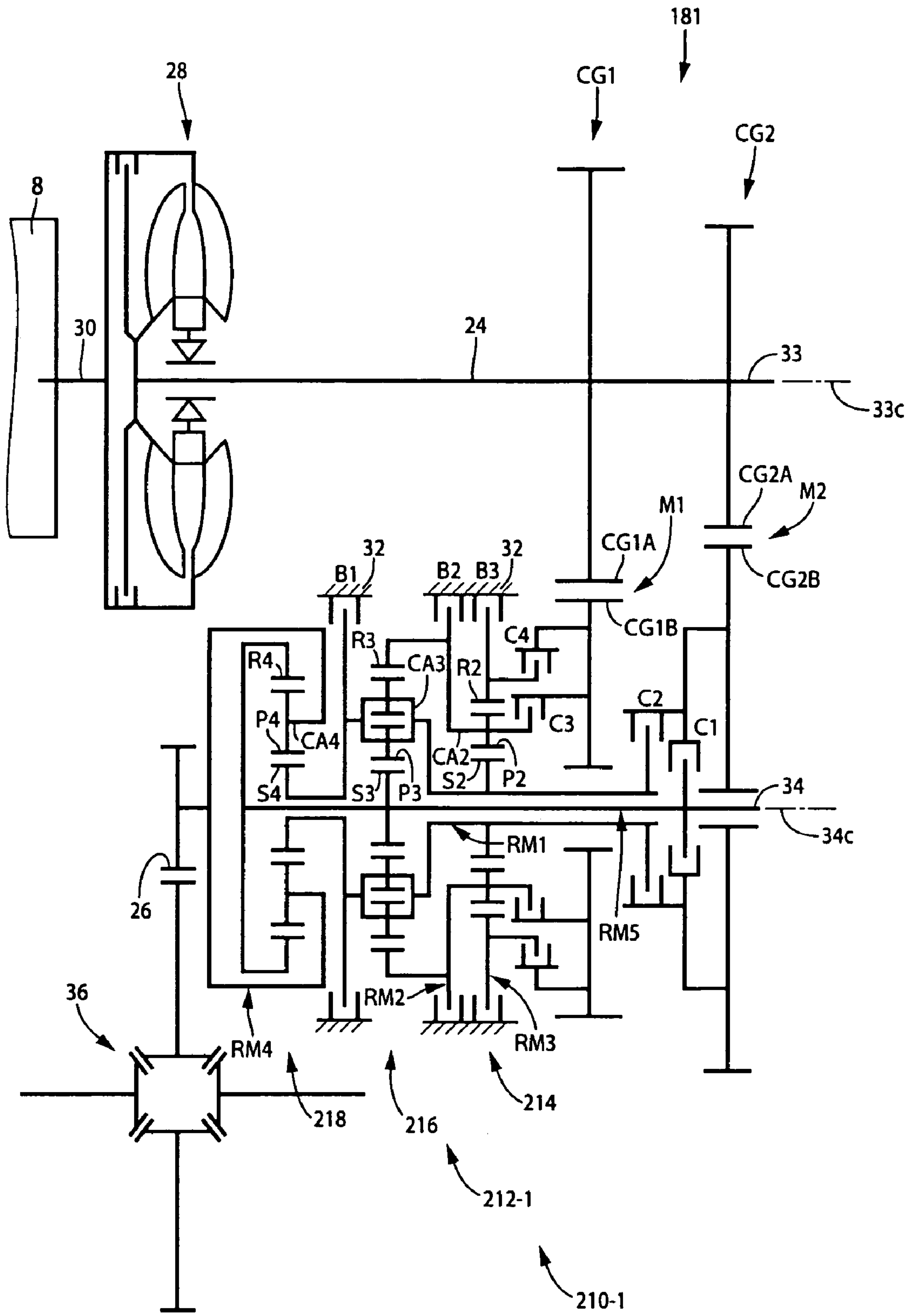
Figures 136, 137:
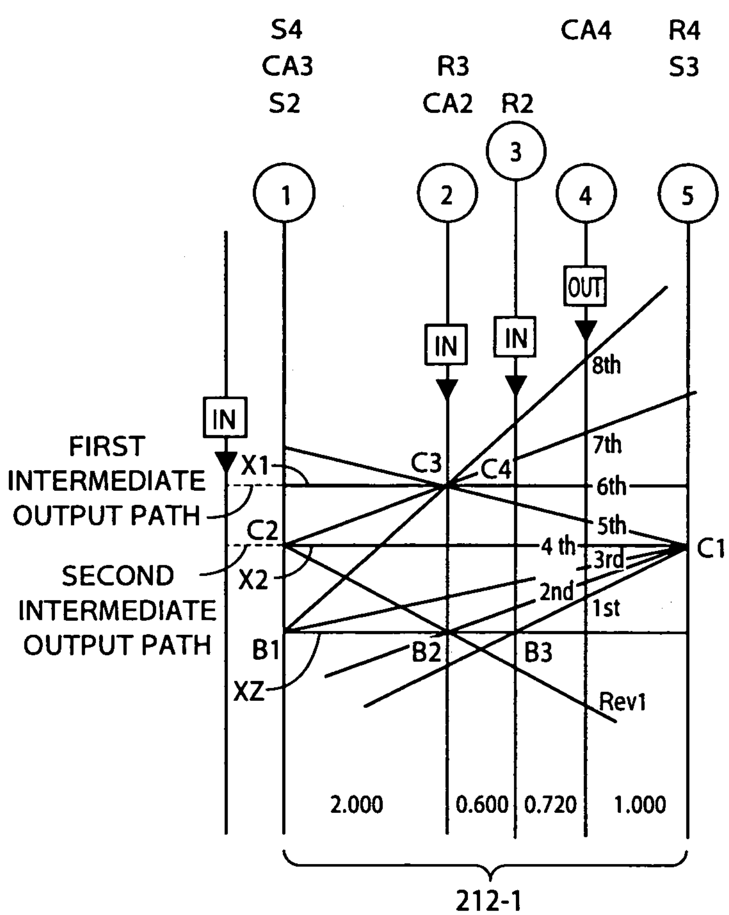
Figure 138:
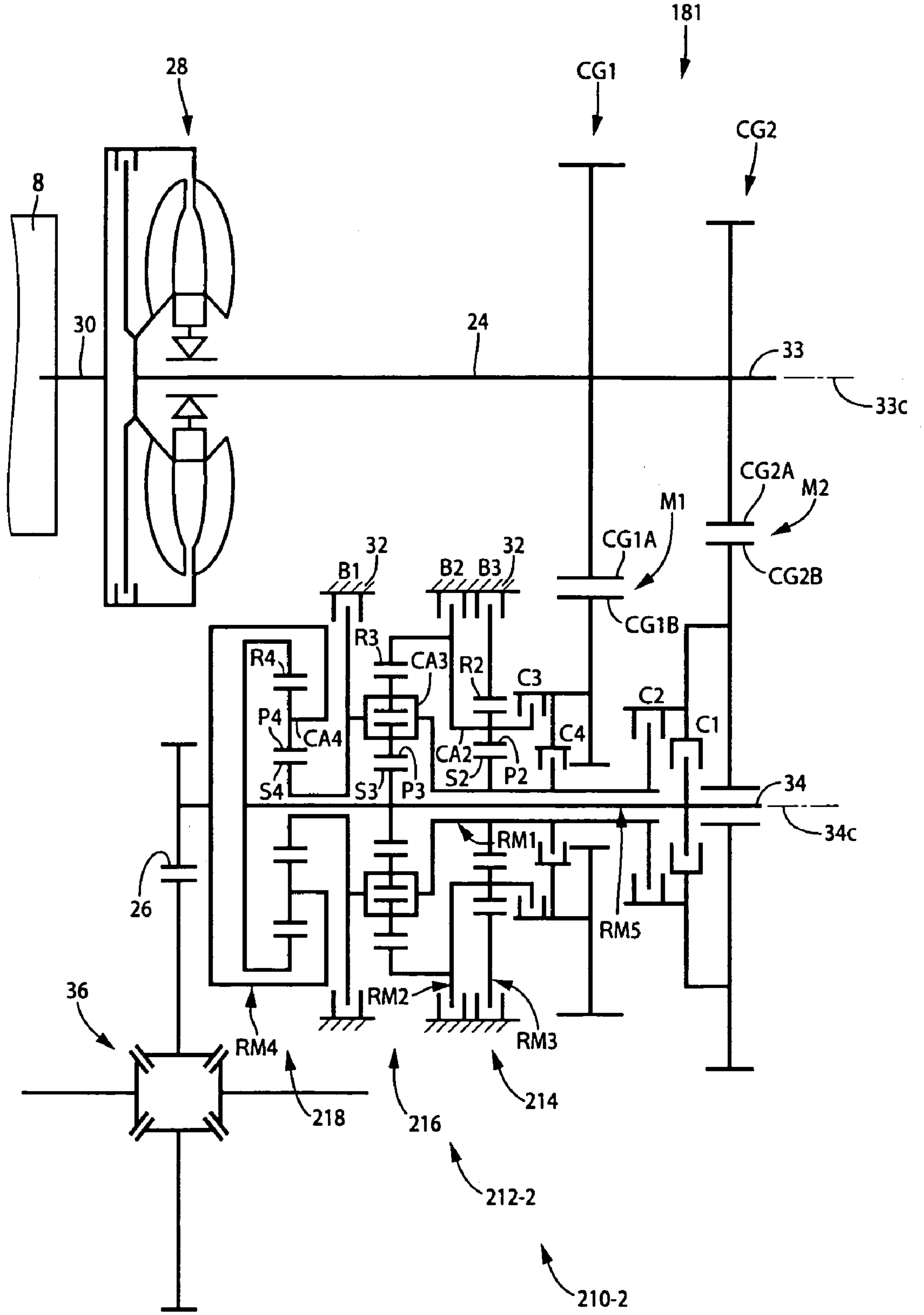
Figures 139, 140:
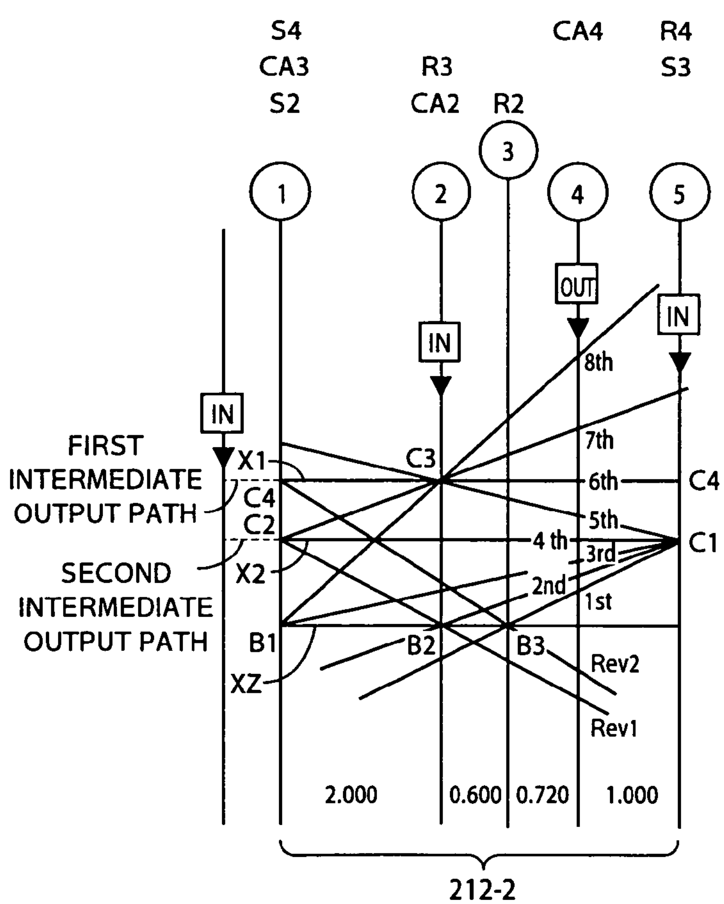
Figure 141:
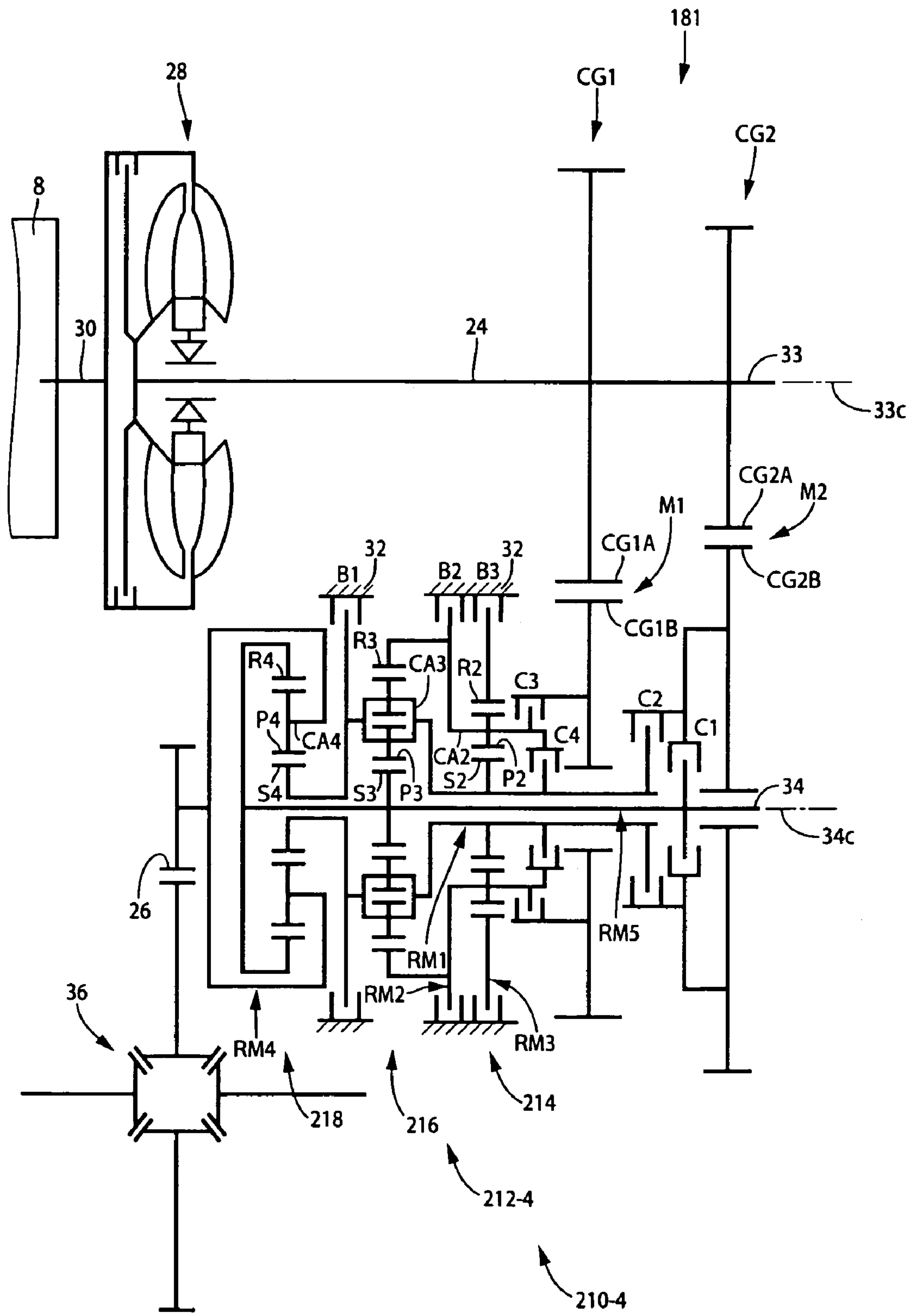
Figures 142, 143:
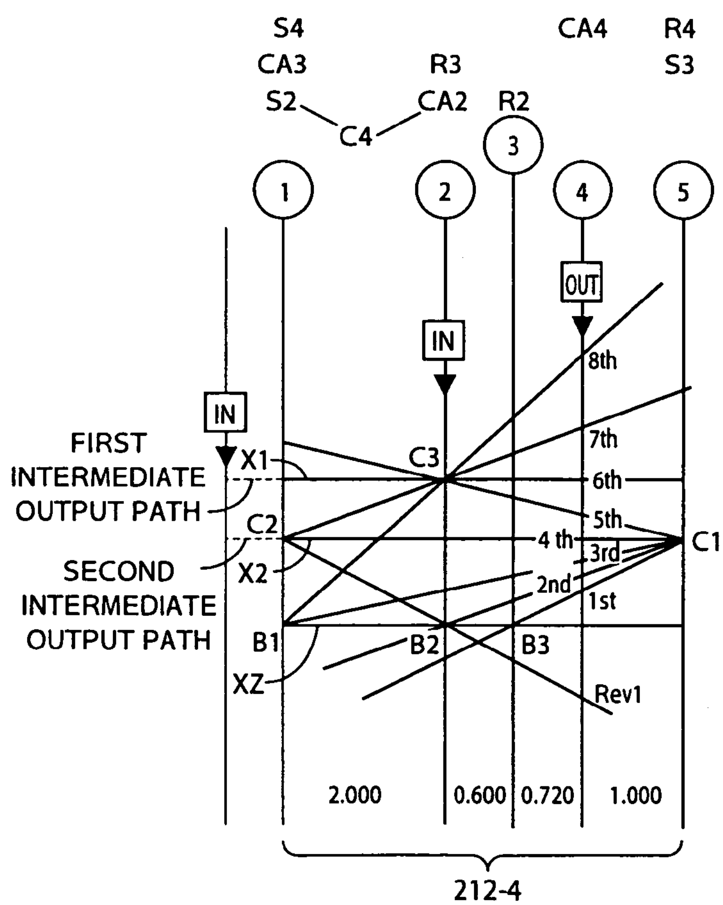
Figure 144:
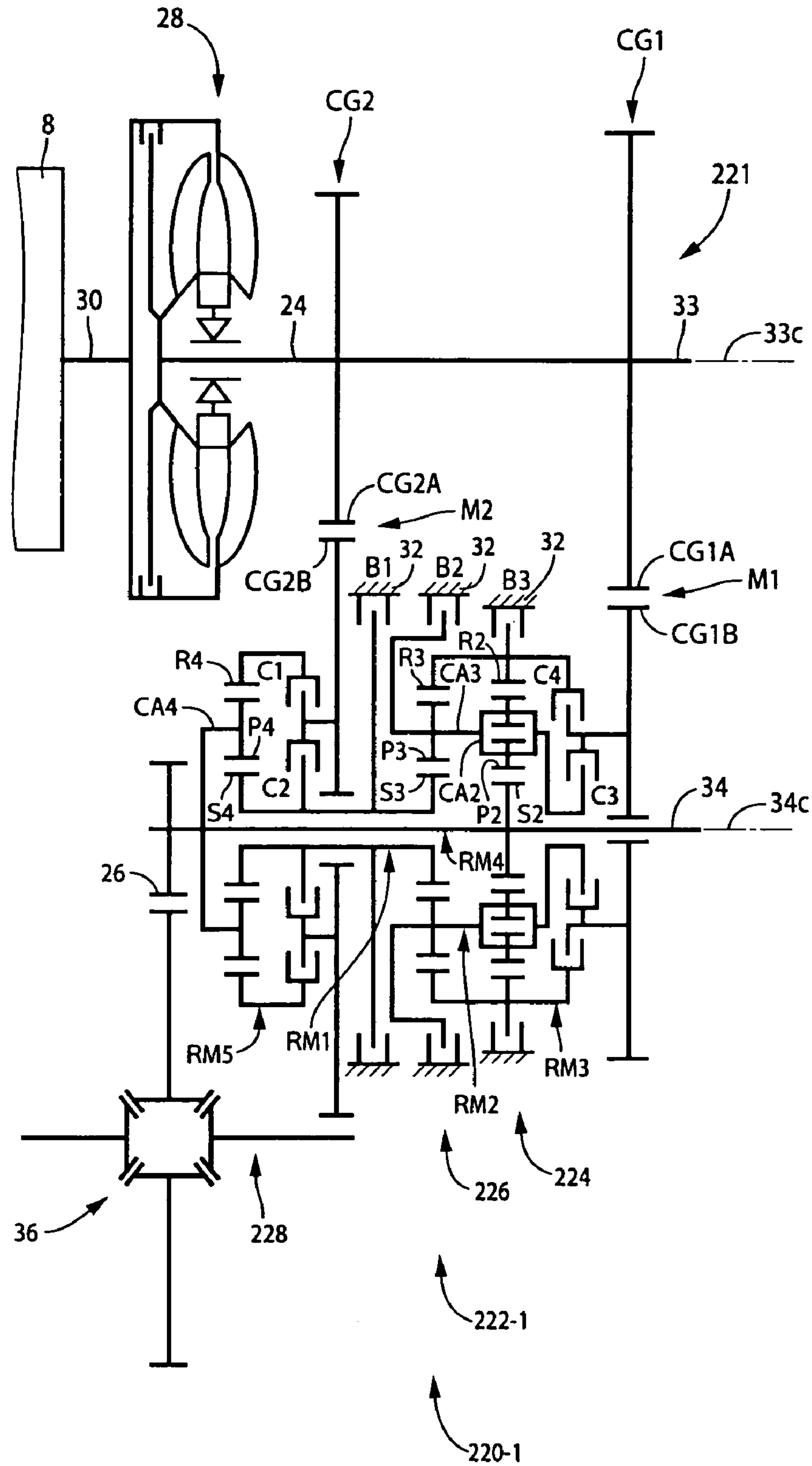
Figures 145, 146:
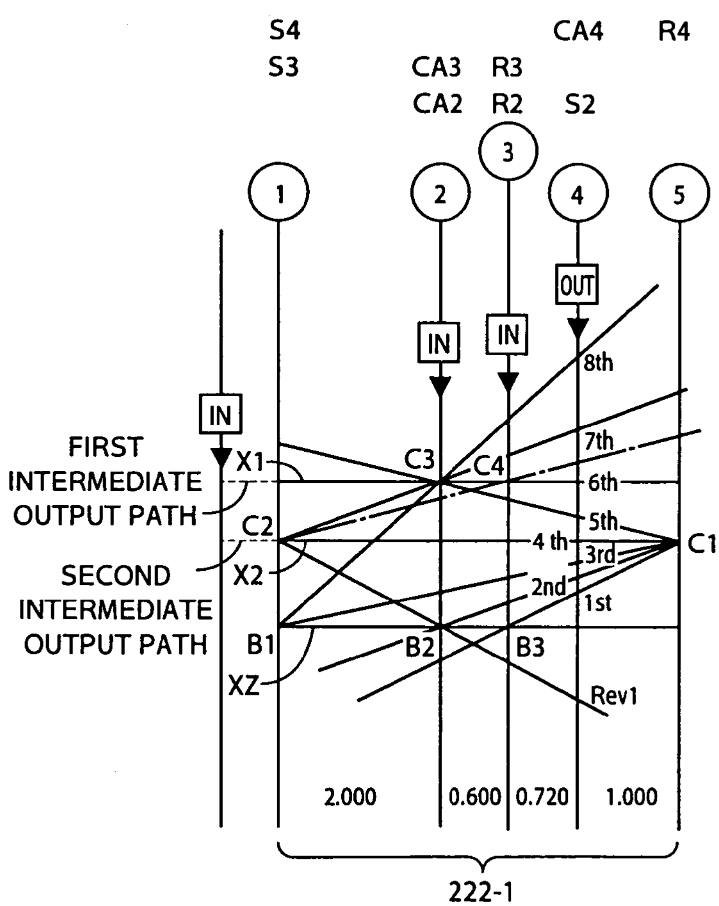
Figure 147:
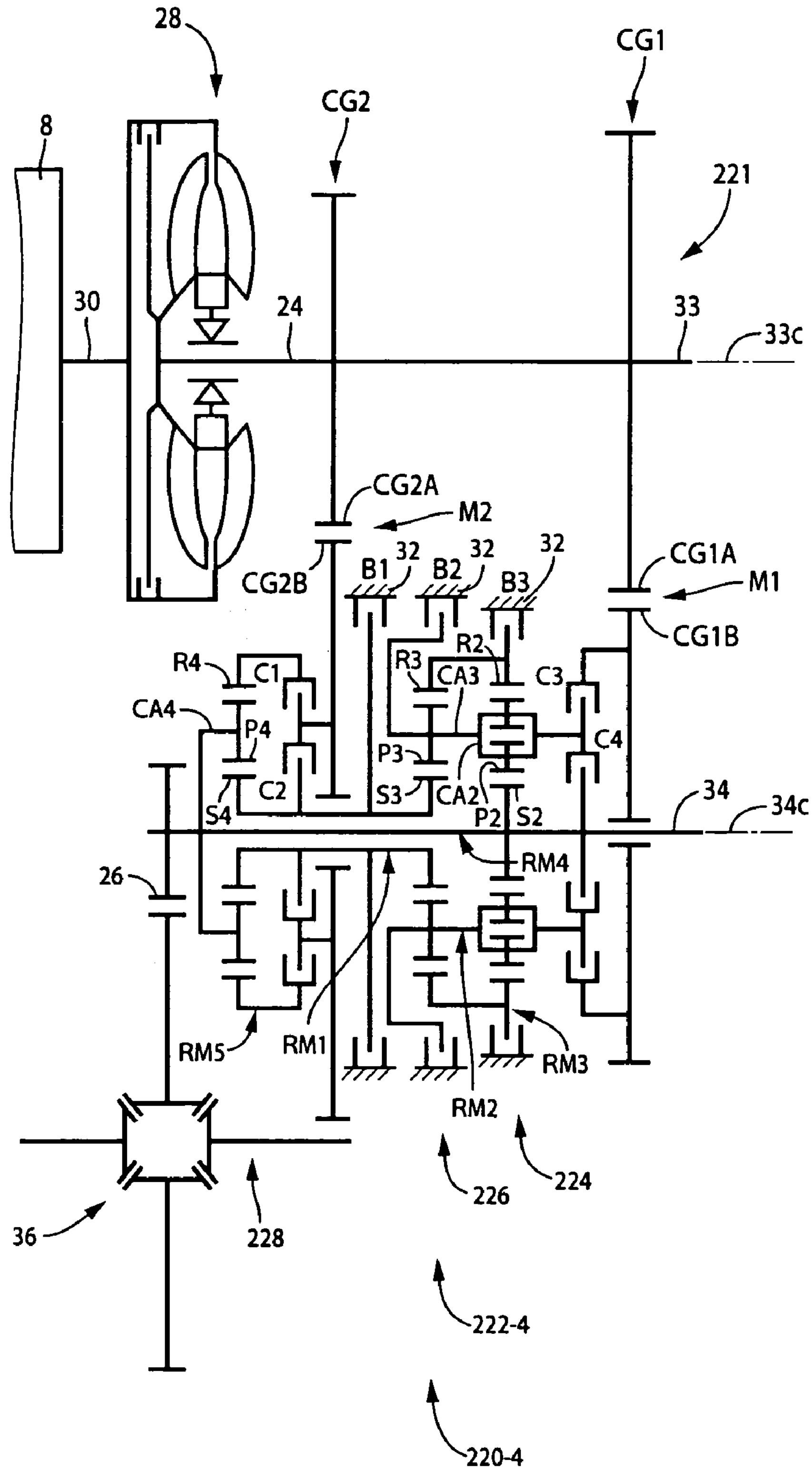
Figures 148, 149:
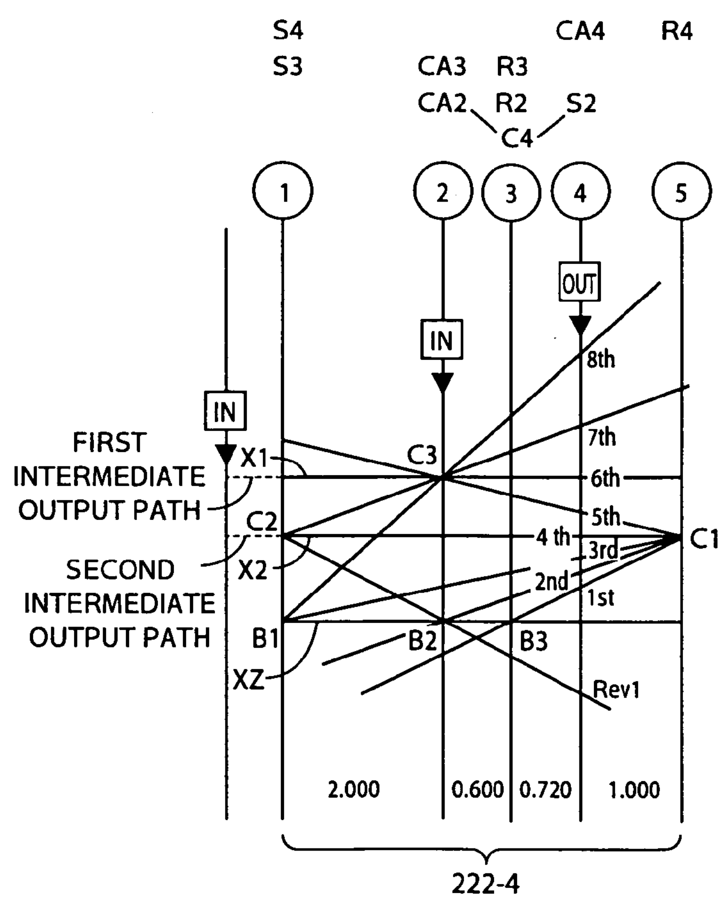
Figure 150:
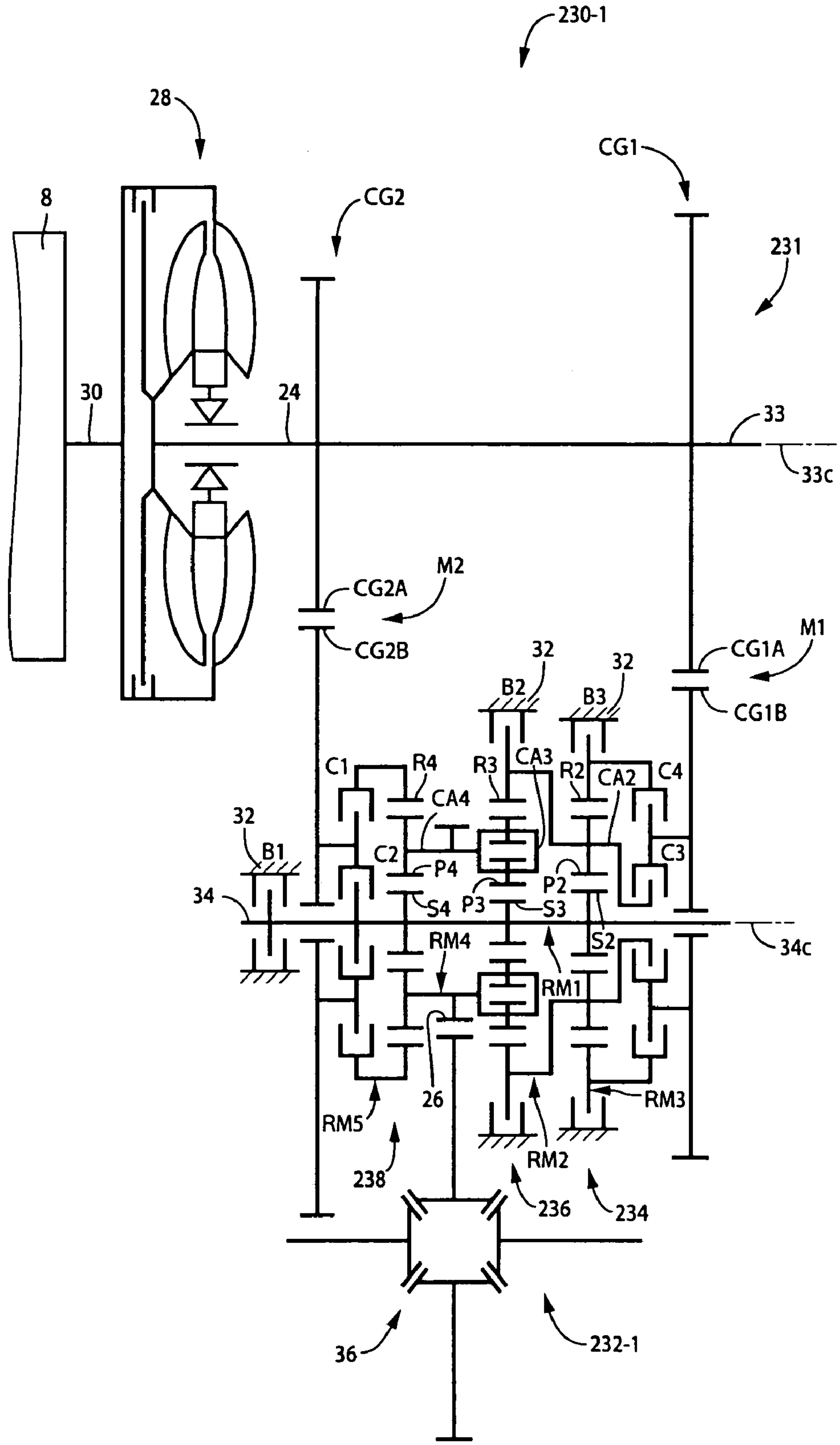
Figures 151, 152:
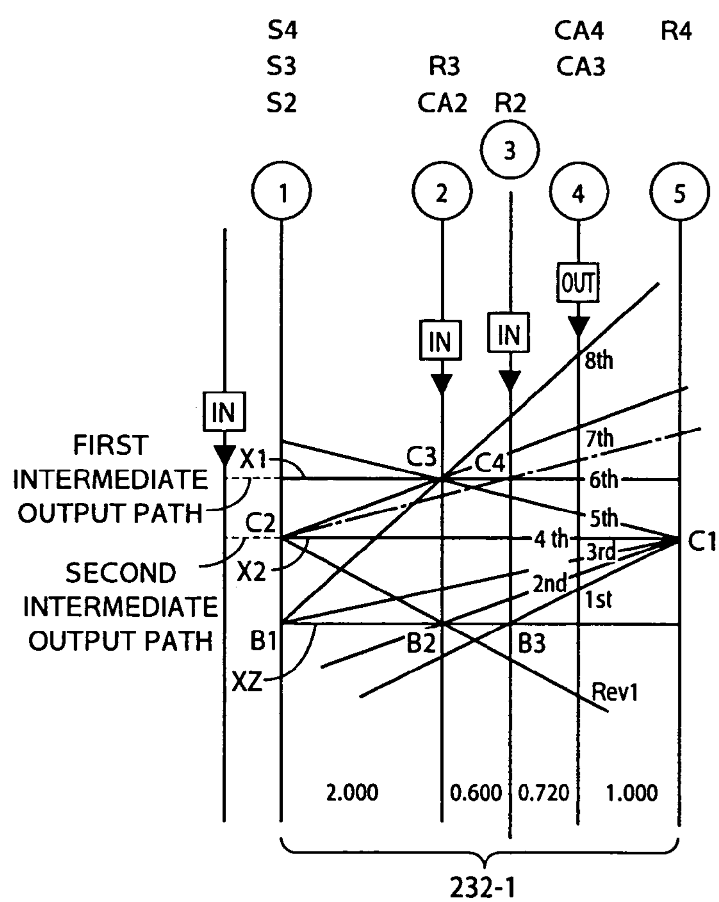
Figure 153:
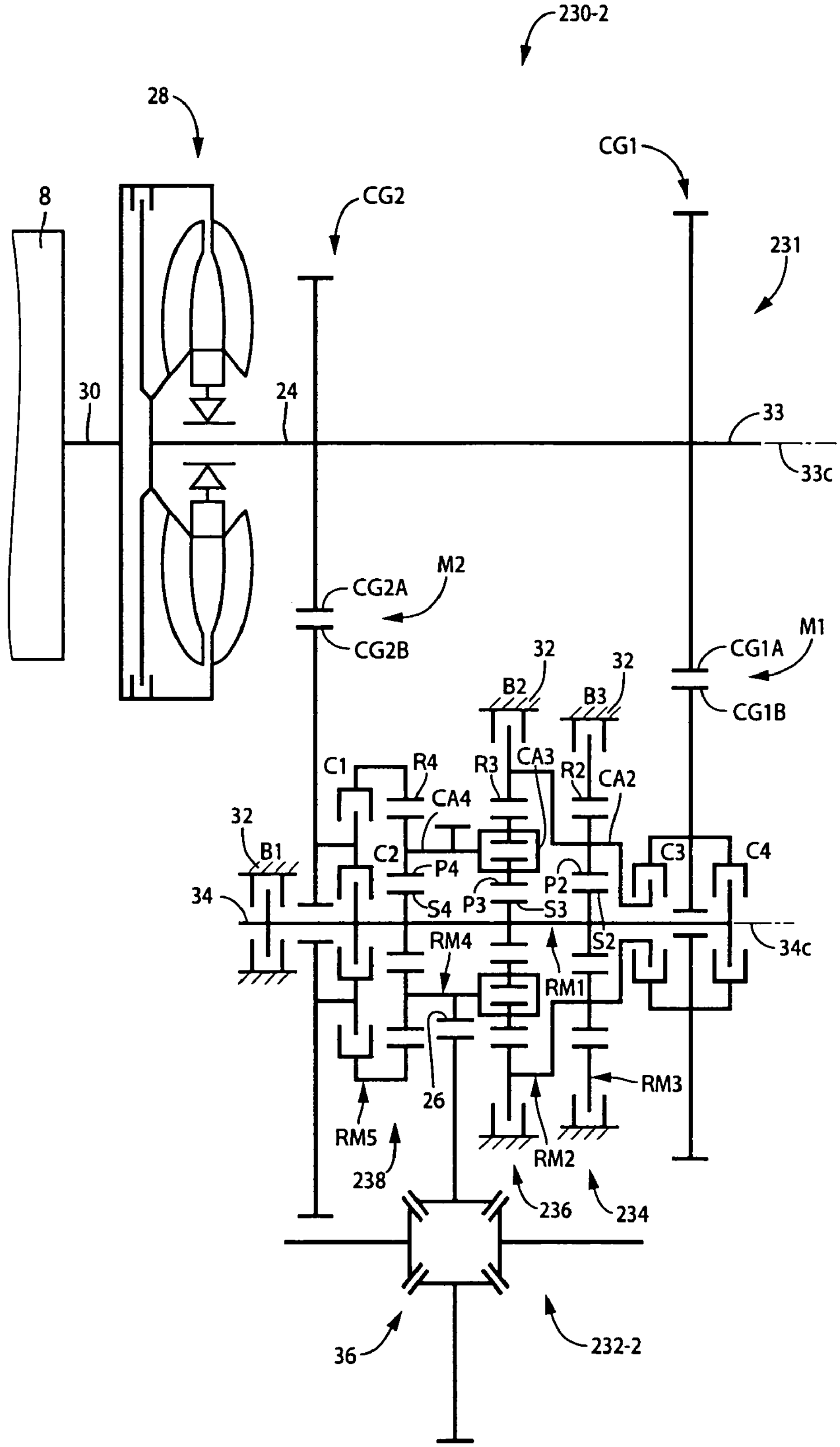
Figures 154, 155:
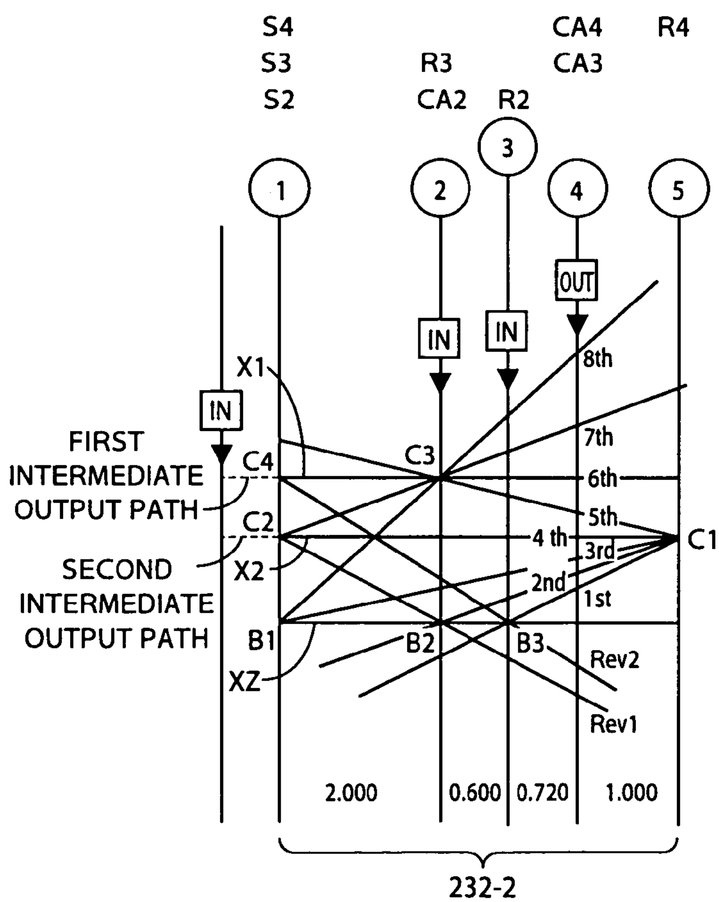
Figure 156:
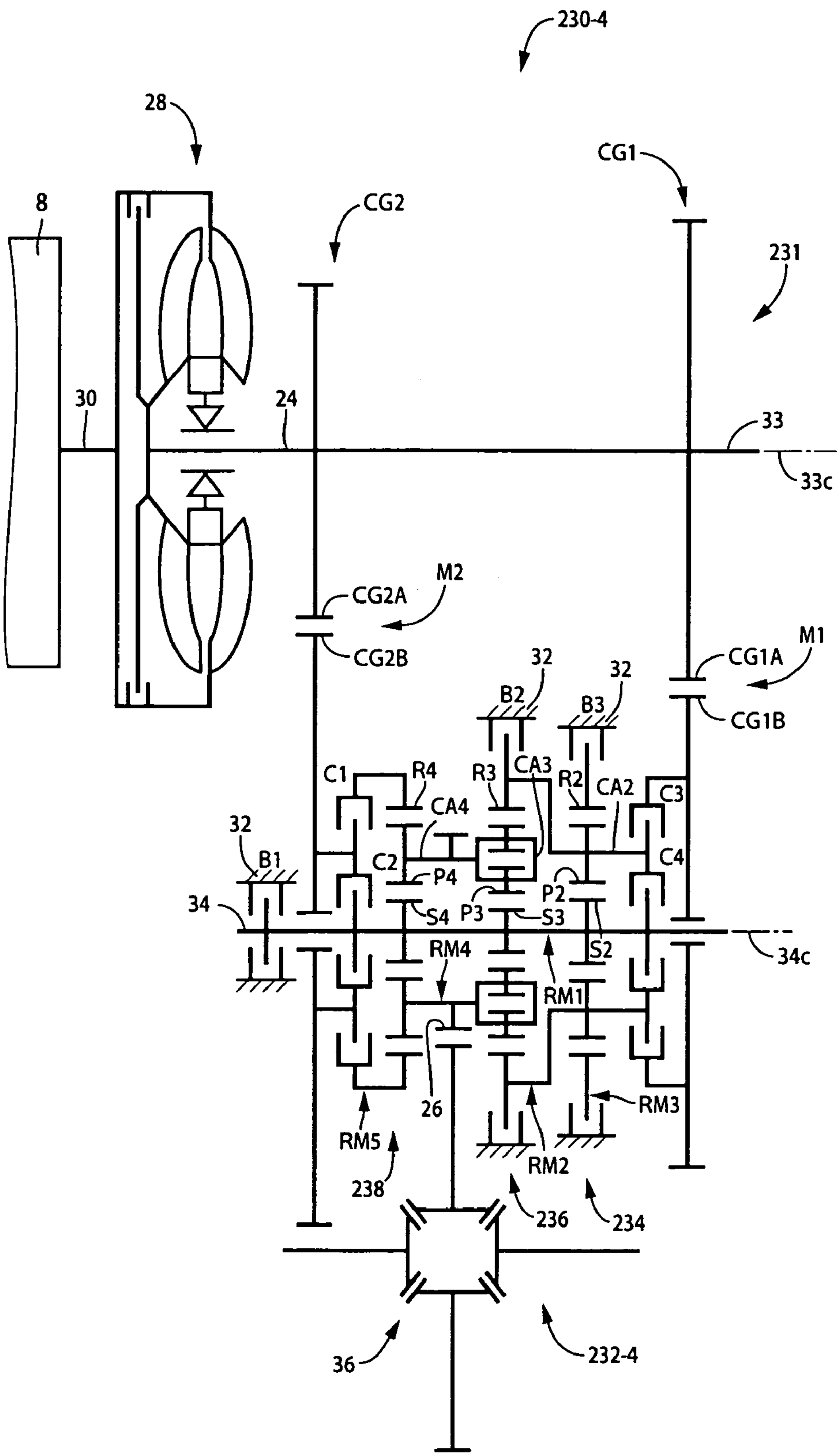
Figures 157, 158:
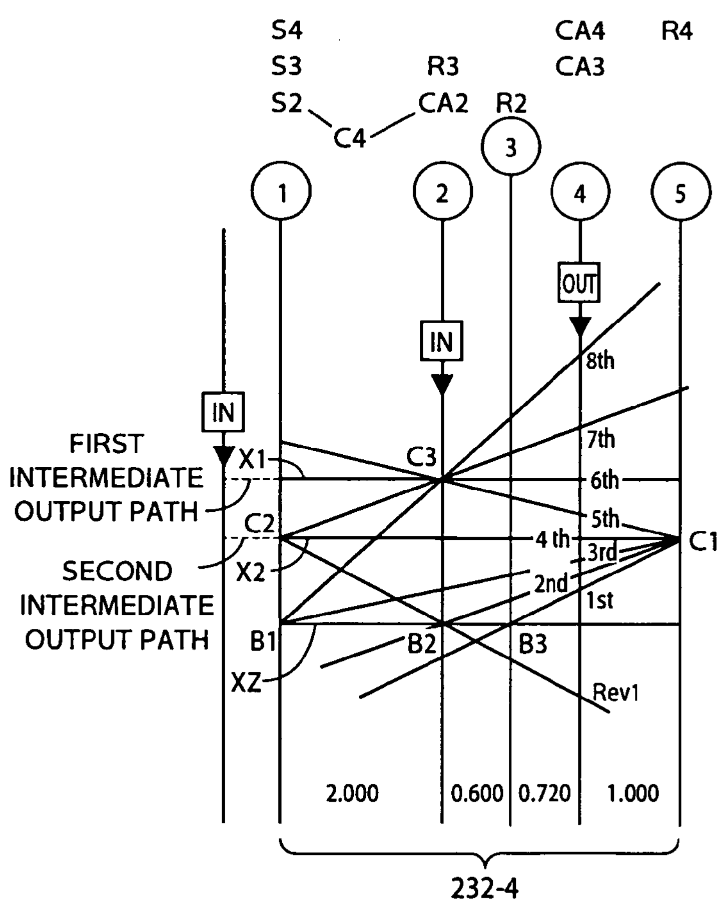
Figure 159:
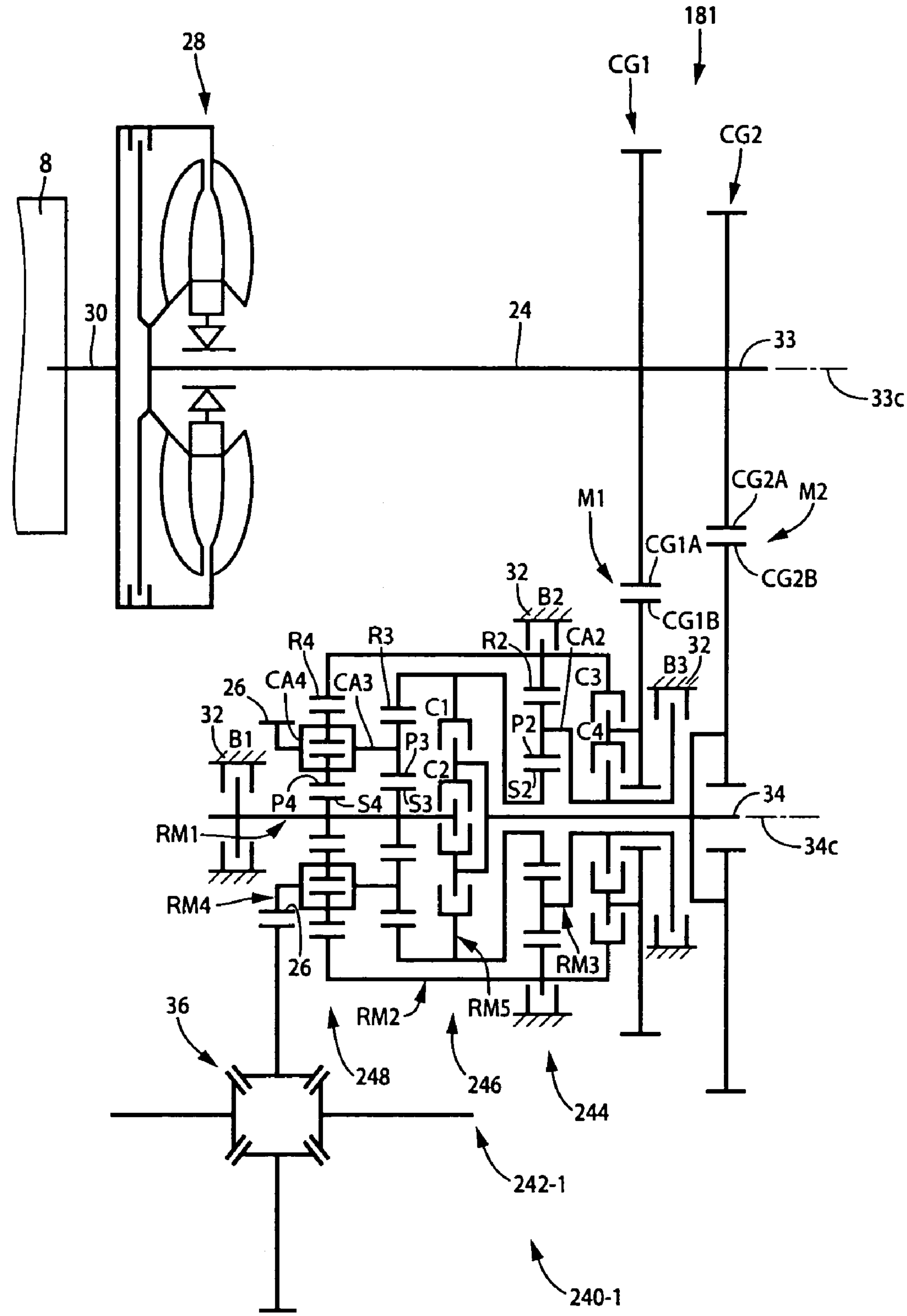
Figures 160, 161:
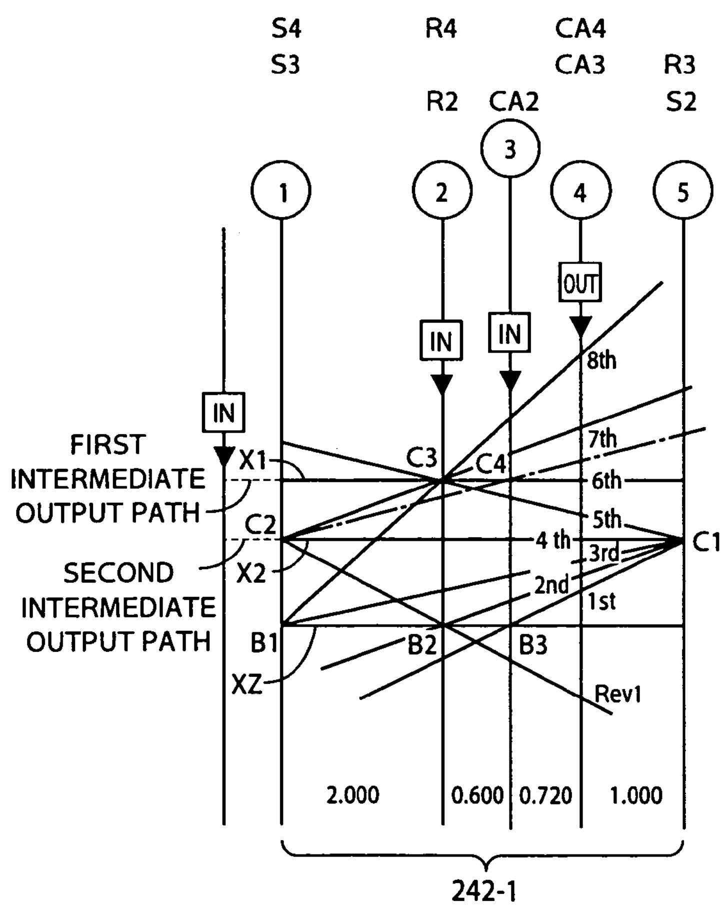
Figure 162:
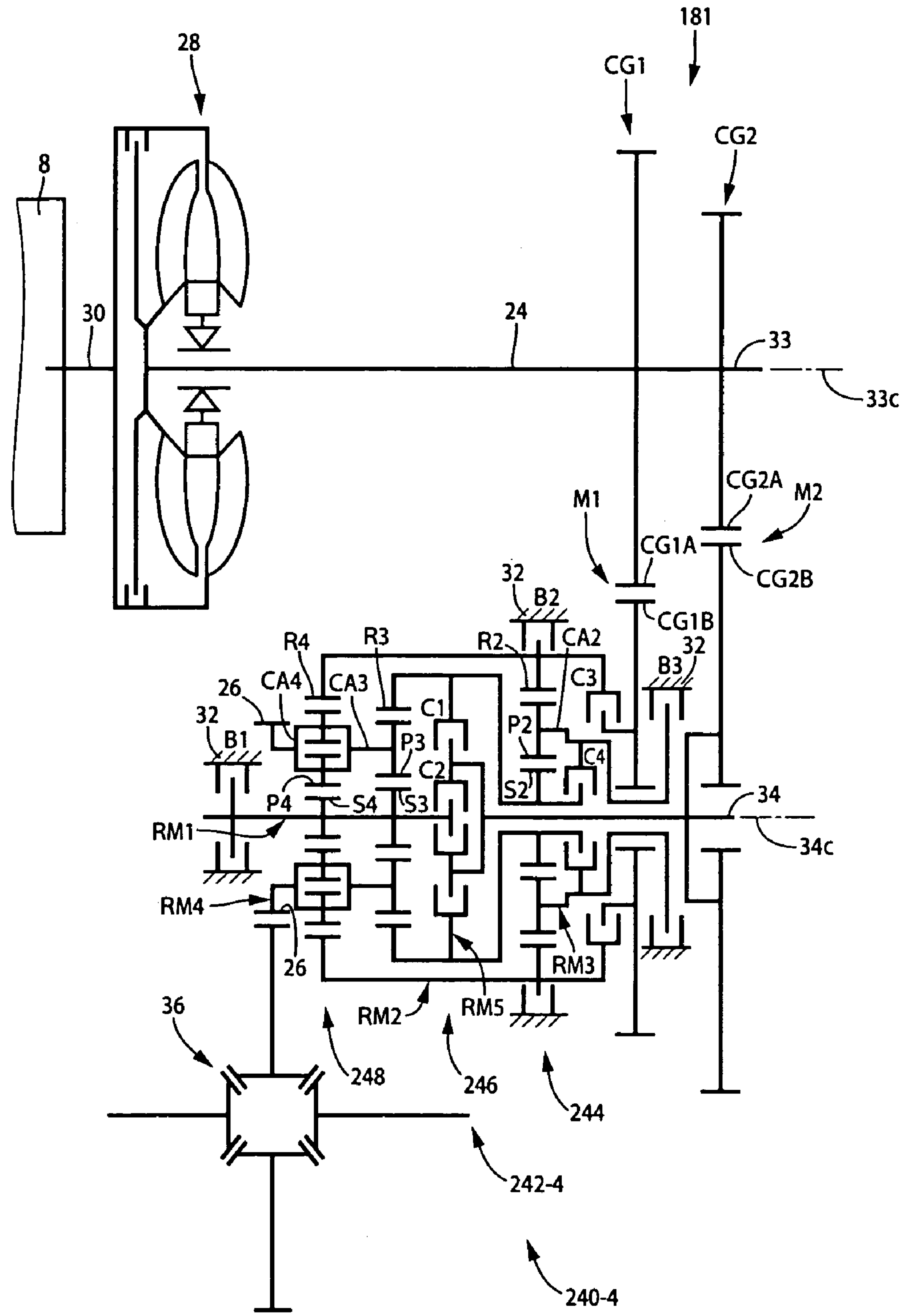
Figures 163, 164:
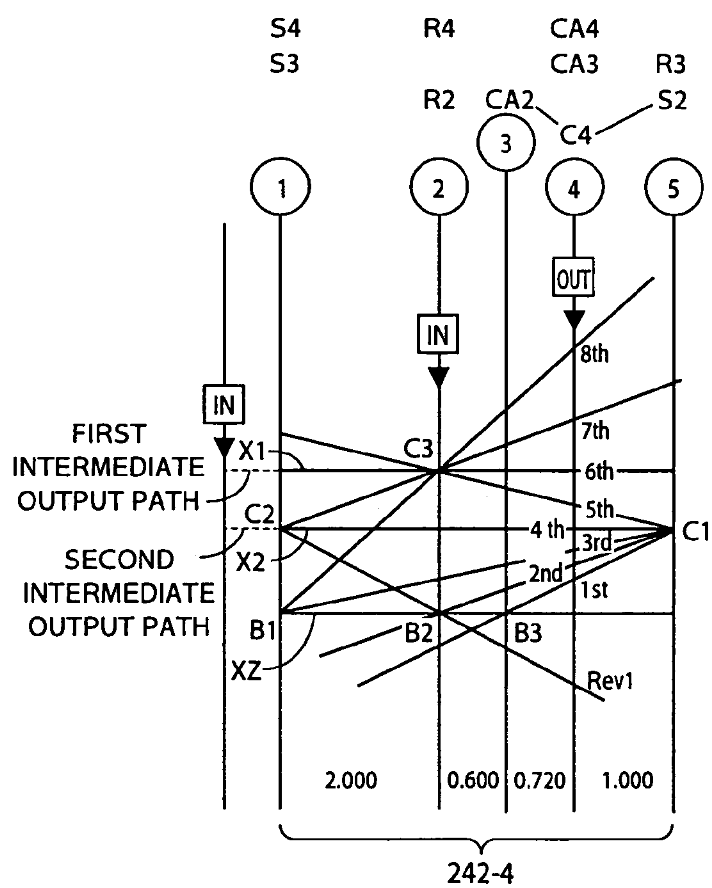
Figure 165:
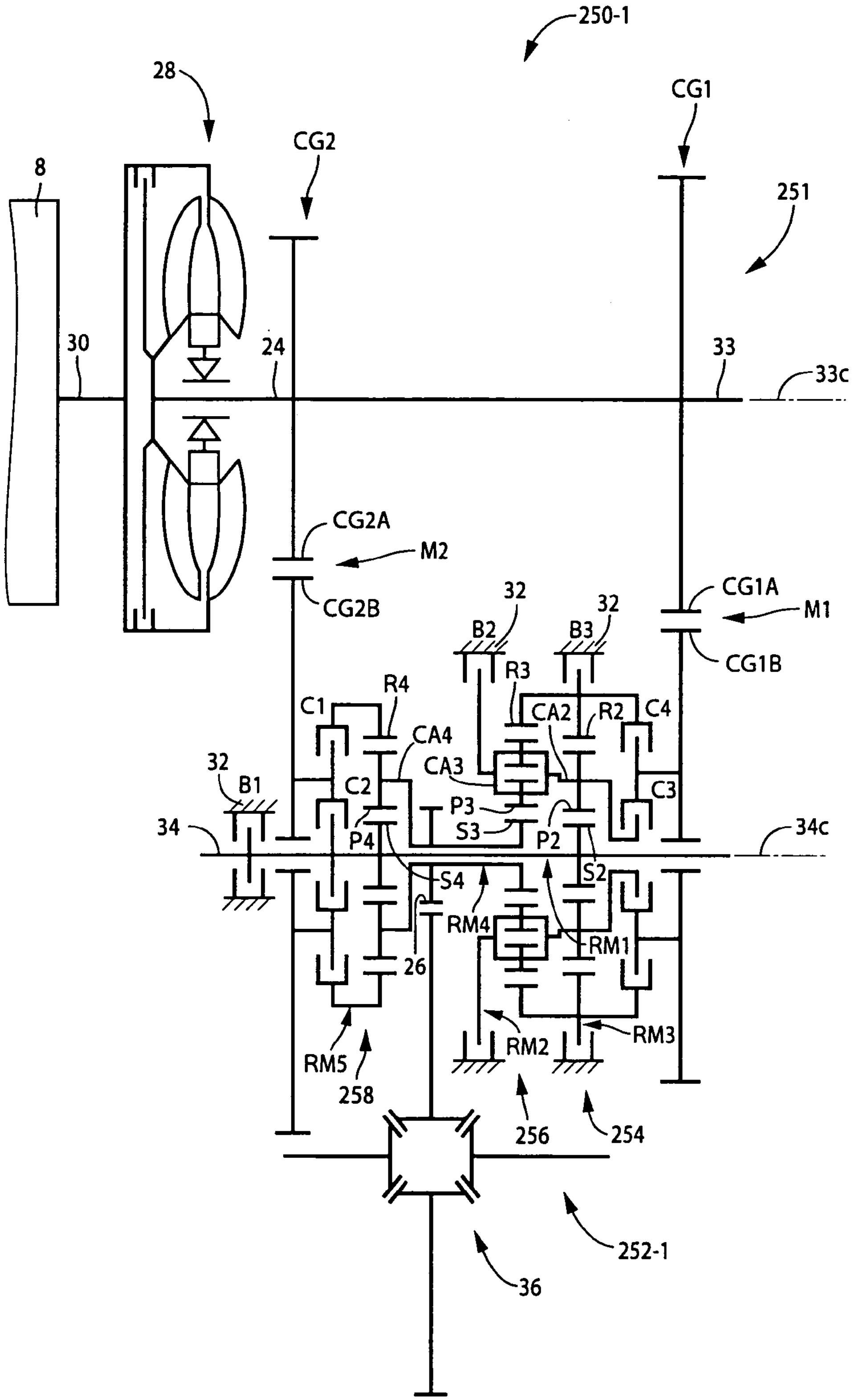
Figures 166, 167:
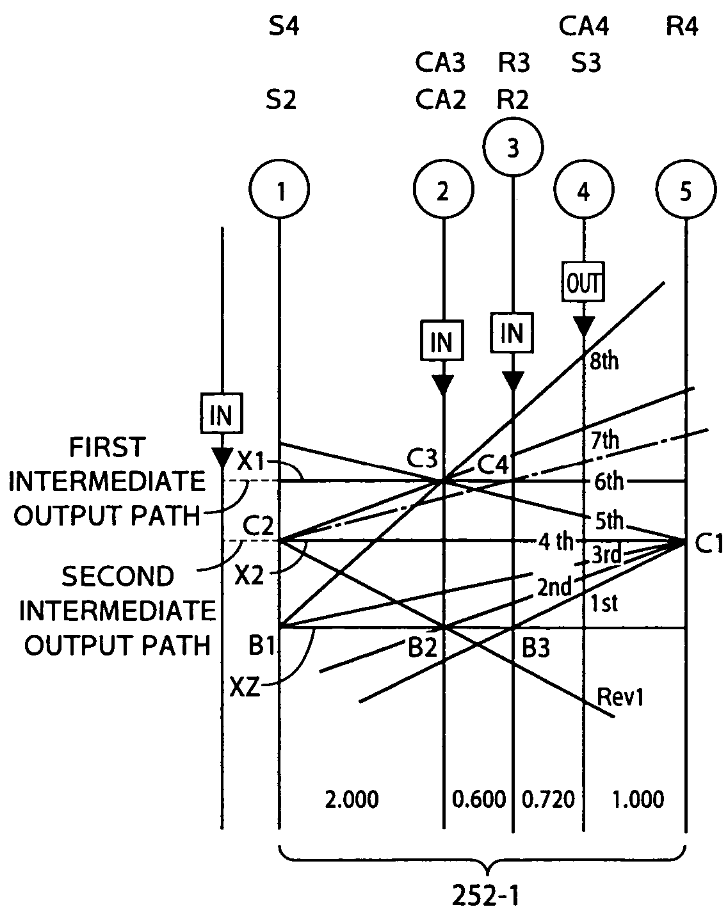
Figure 168:
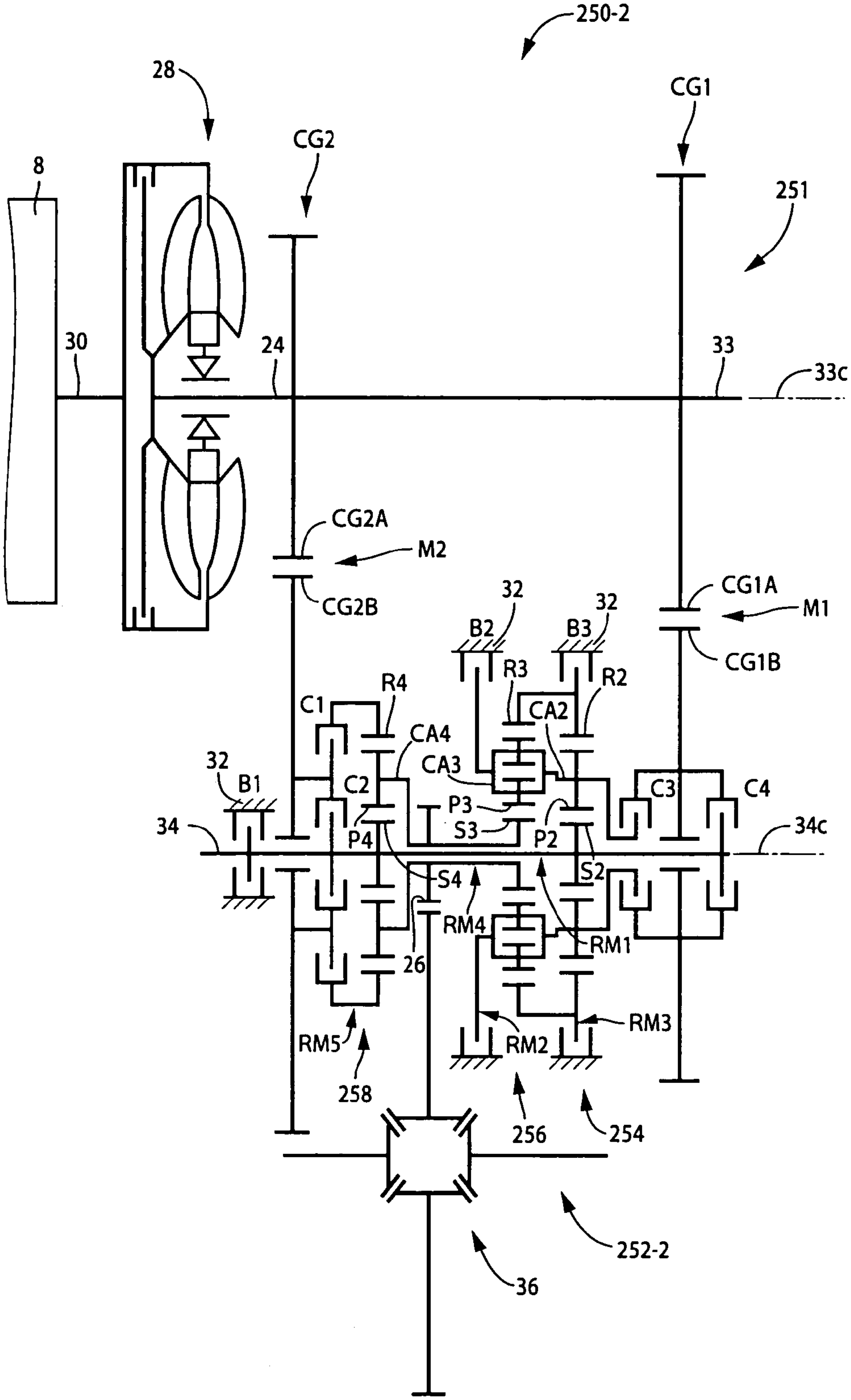
Figures 169, 170:
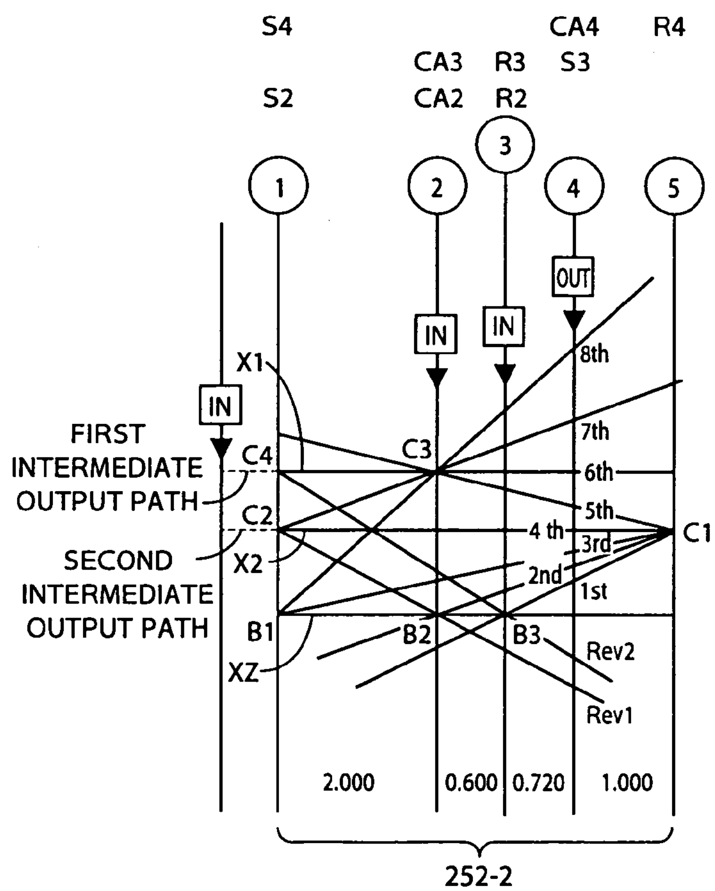
Figure 171:
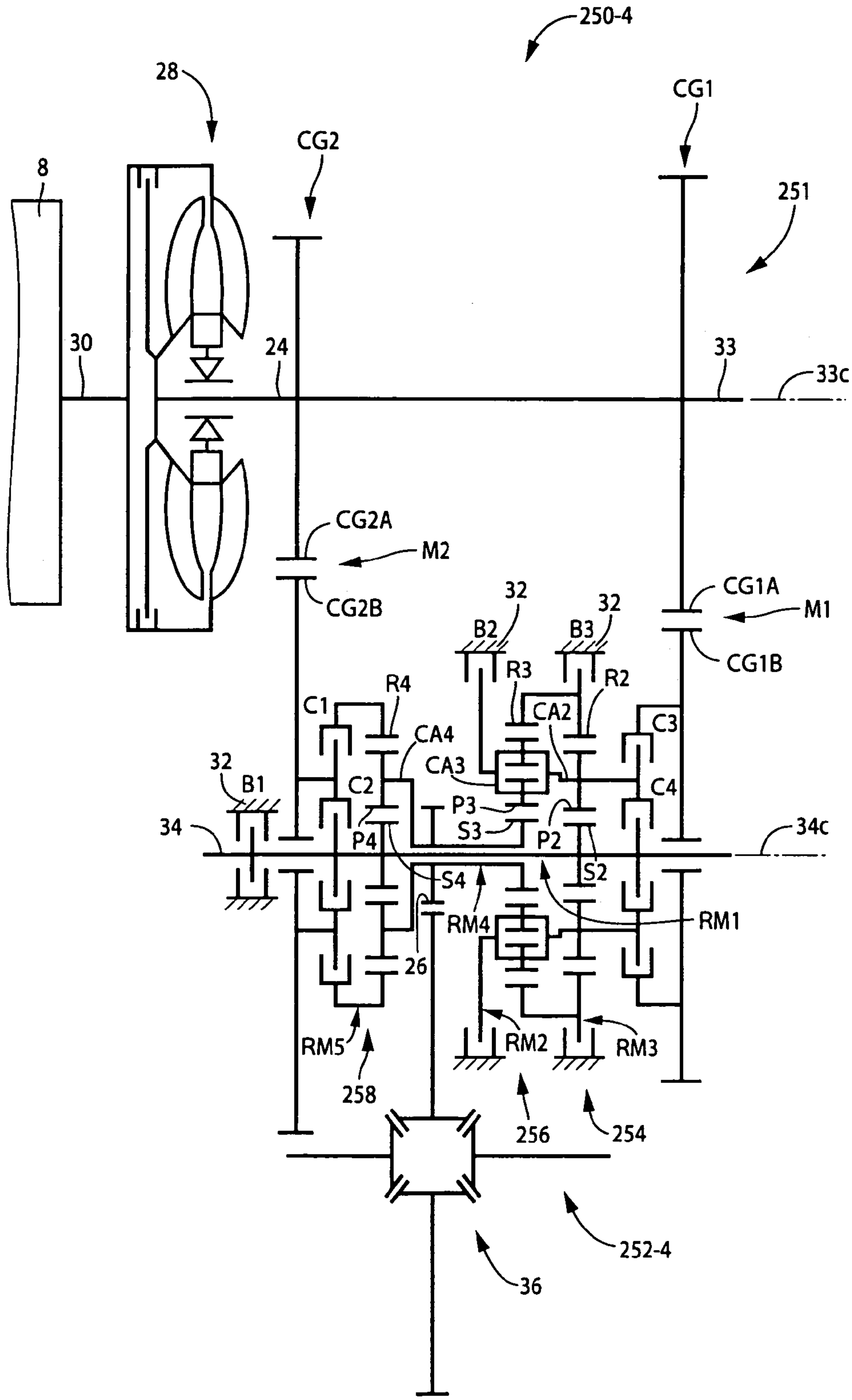
Figures 172, 173:
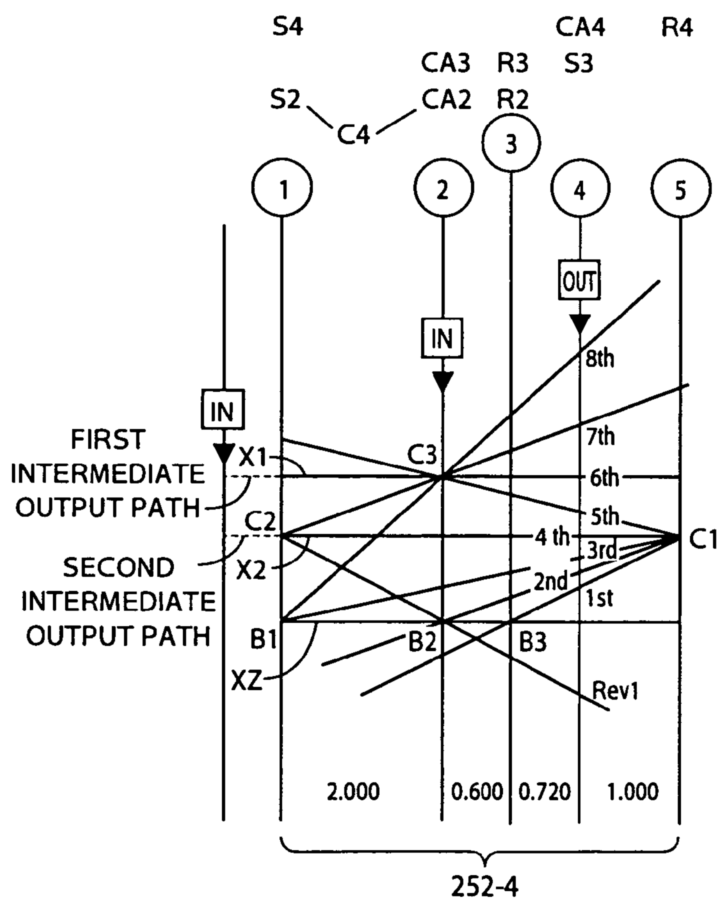
Figure 174:
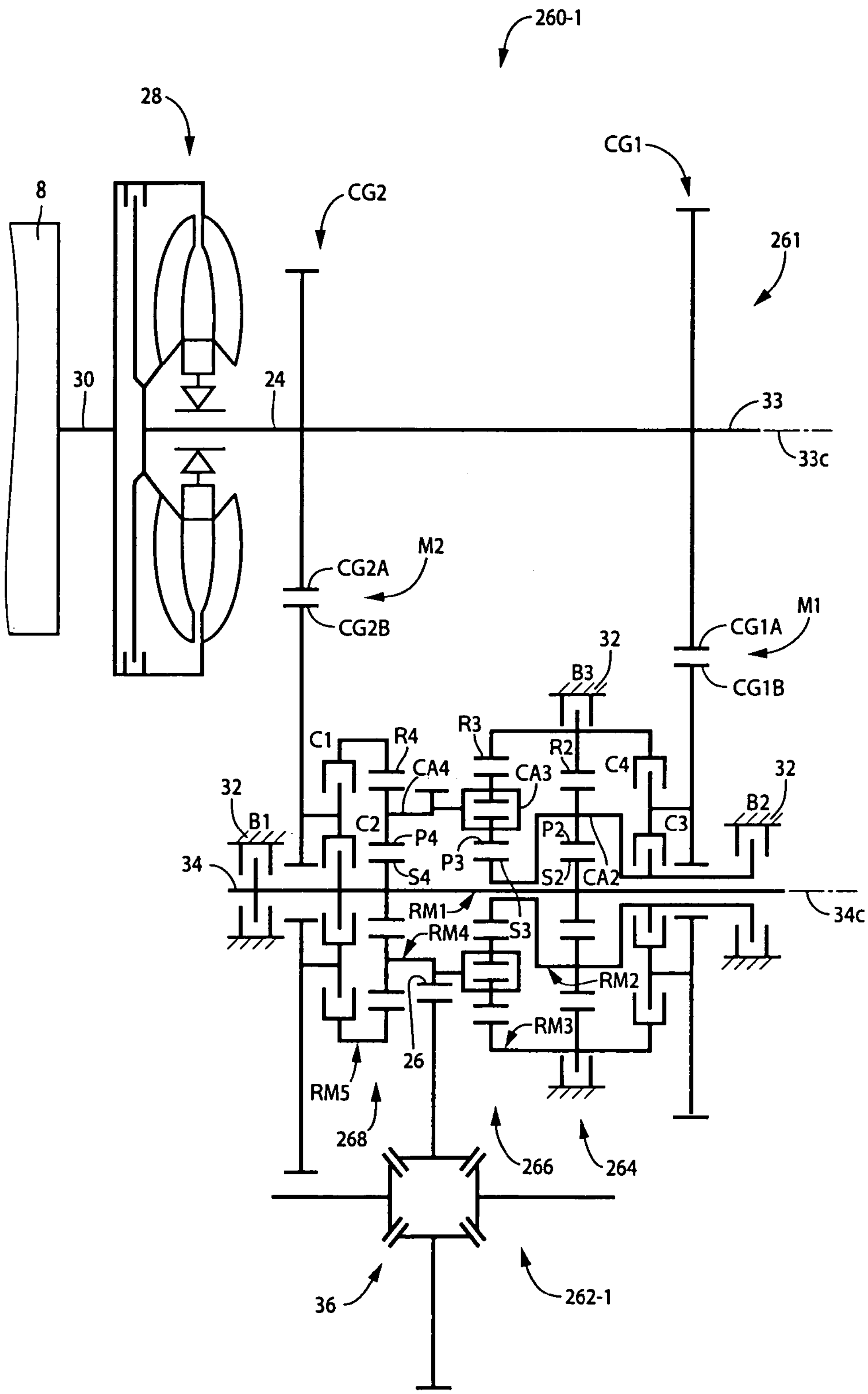
Figures 175, 176:
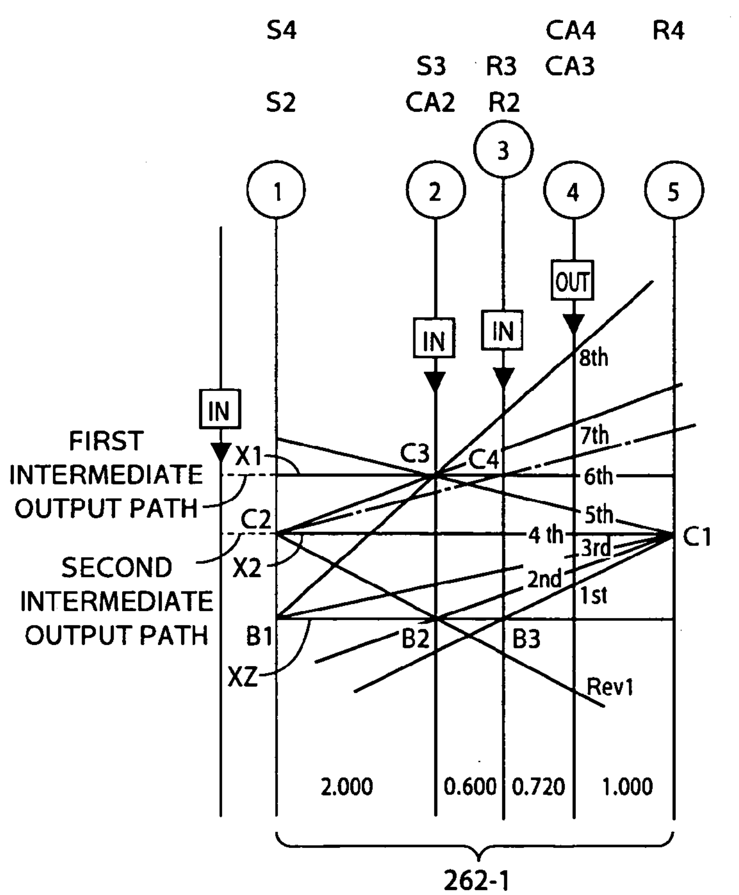
Figure 177:
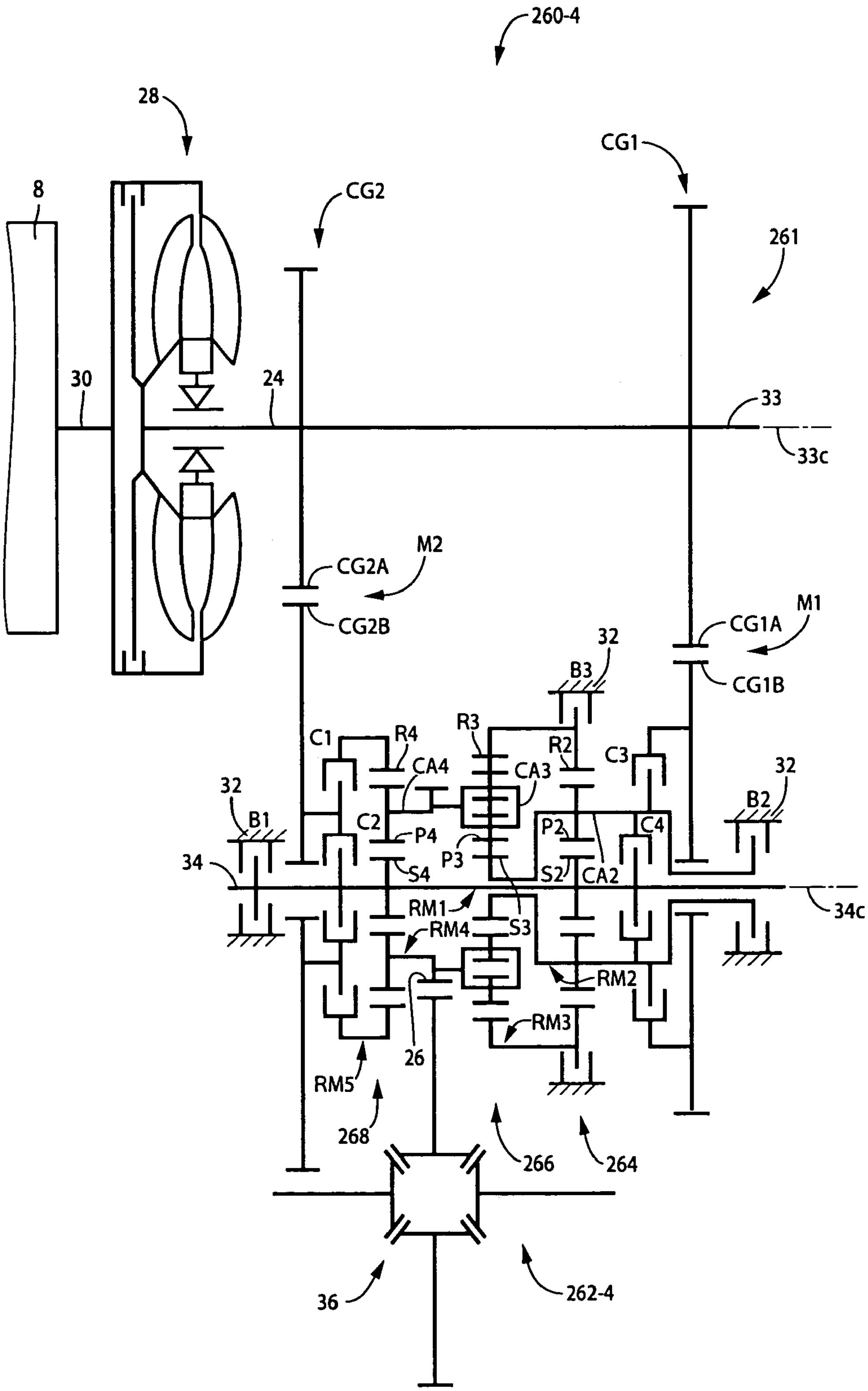
Figures 178, 179:
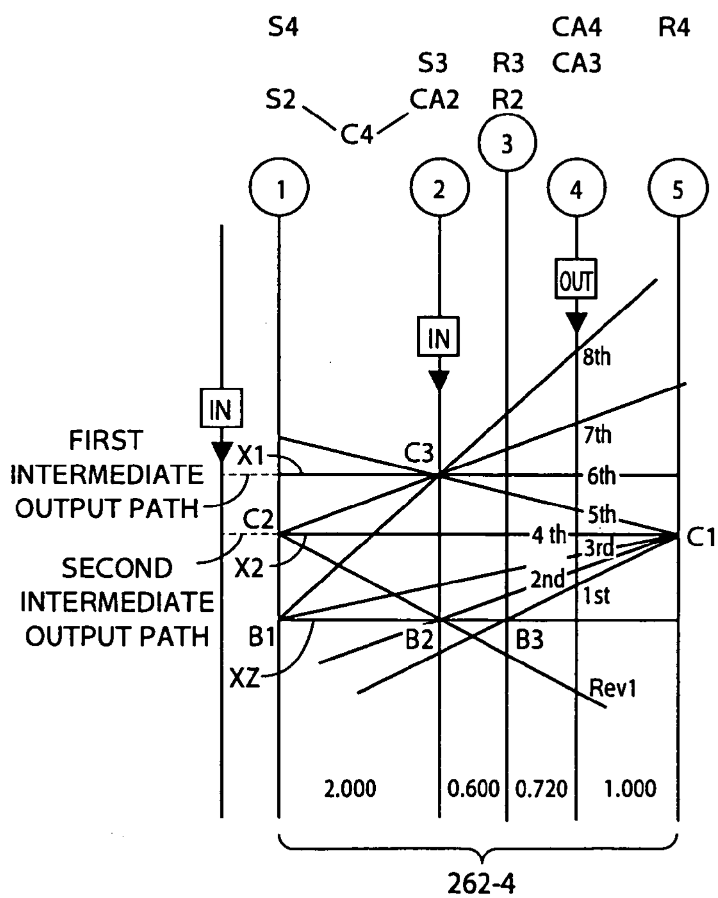
Figure 180:
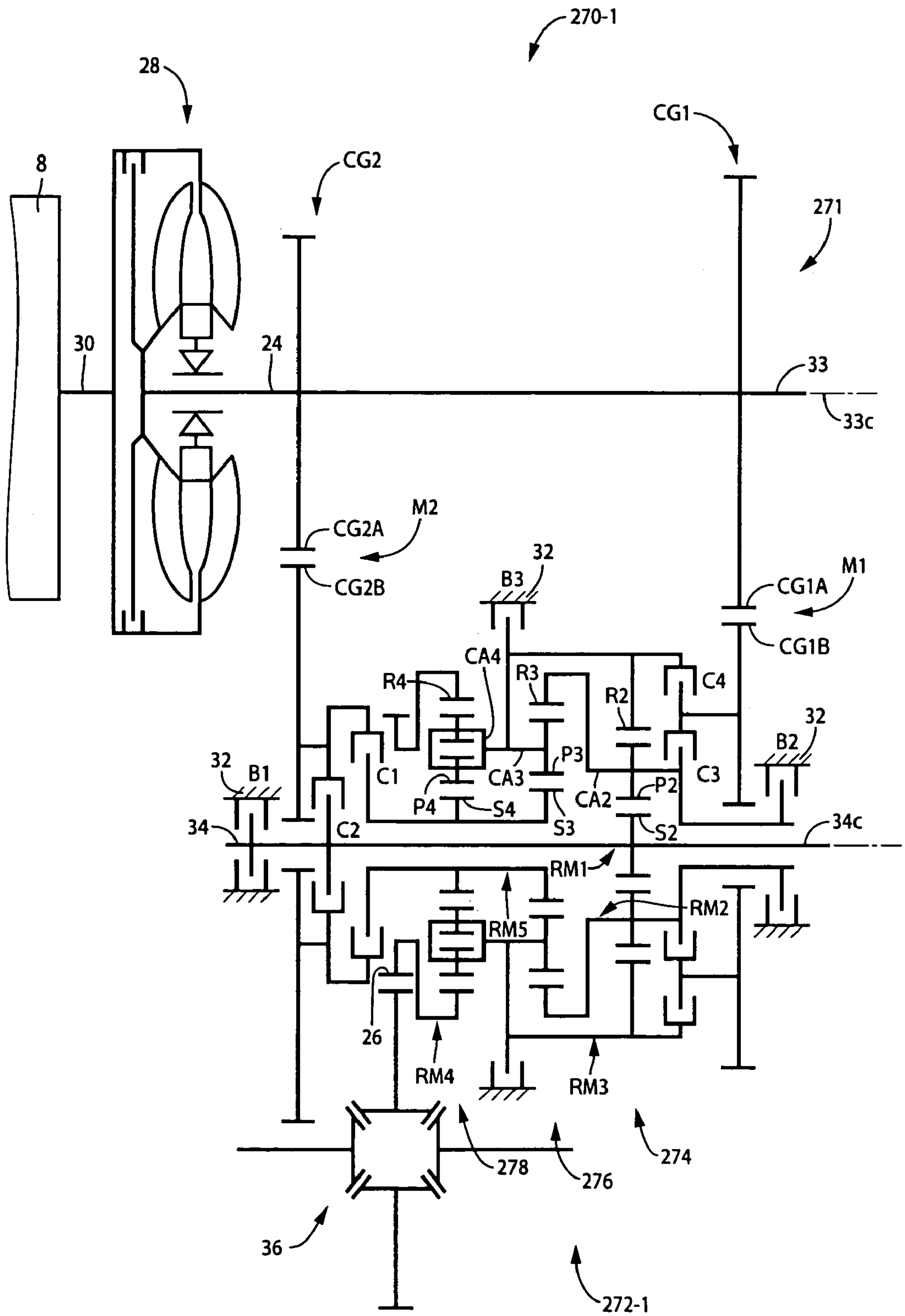
Figures 181, 182:
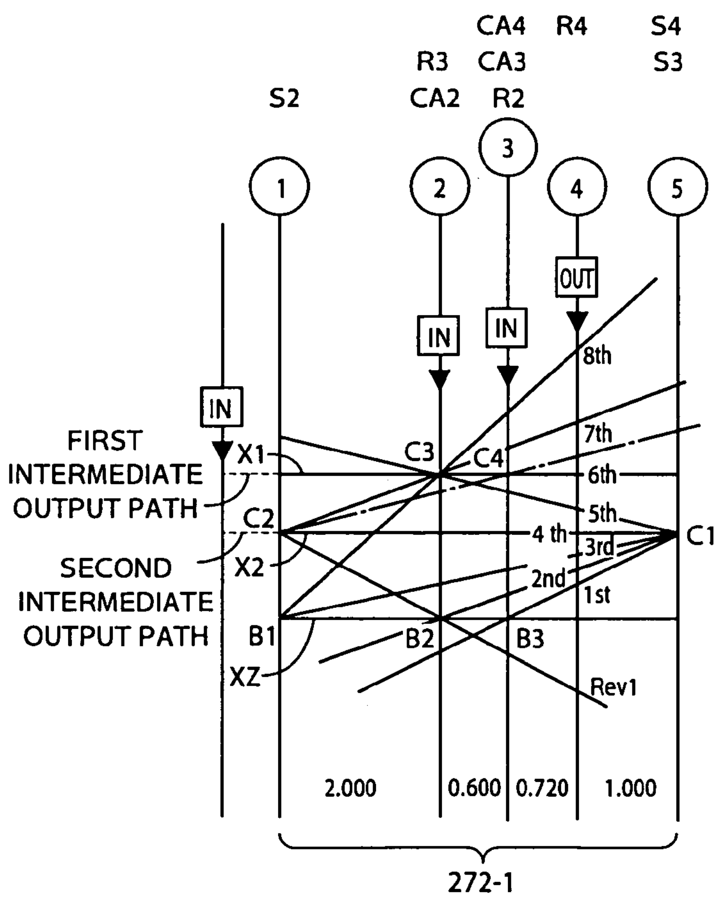
Figure 183:
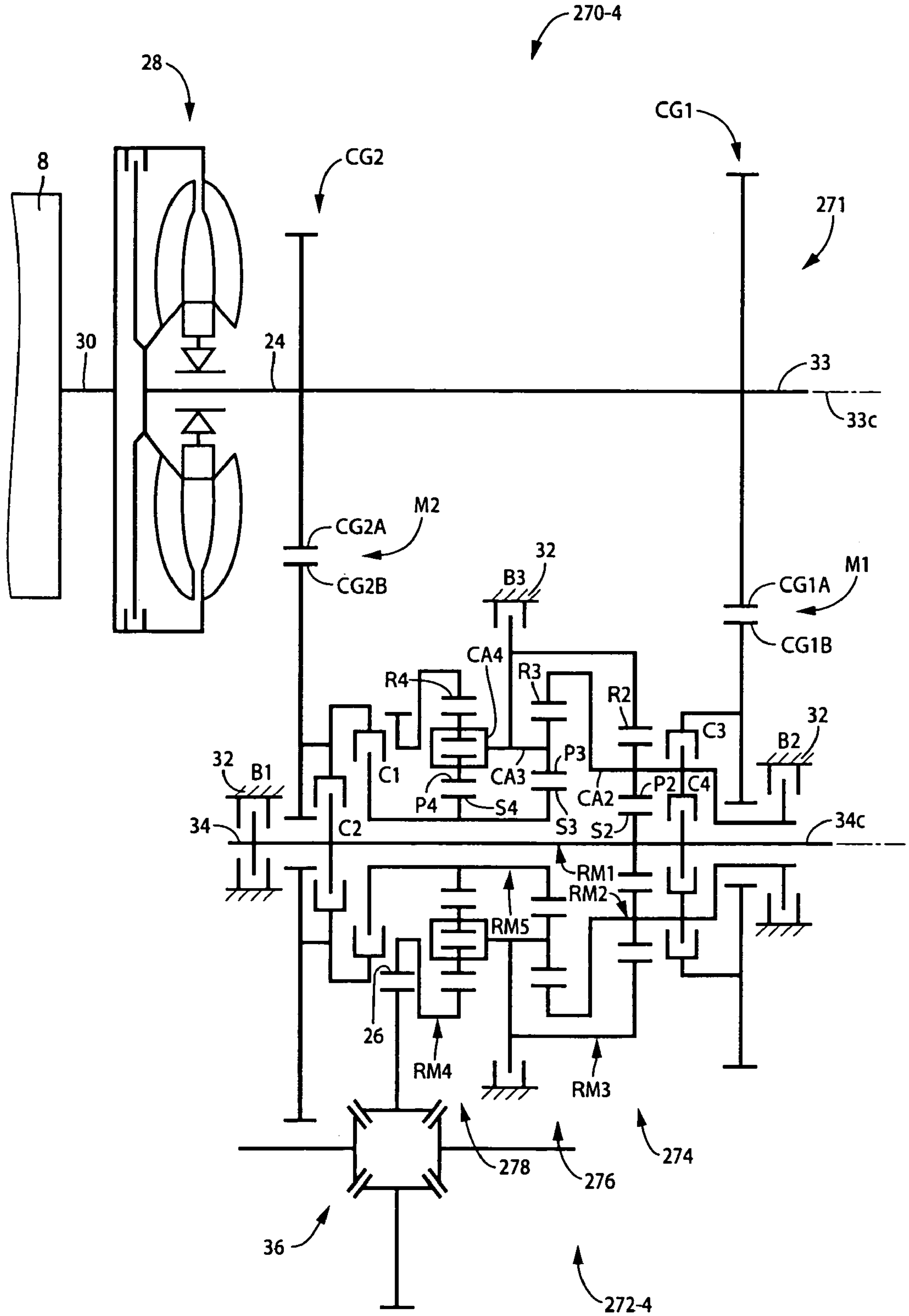
Figures 184, 185:
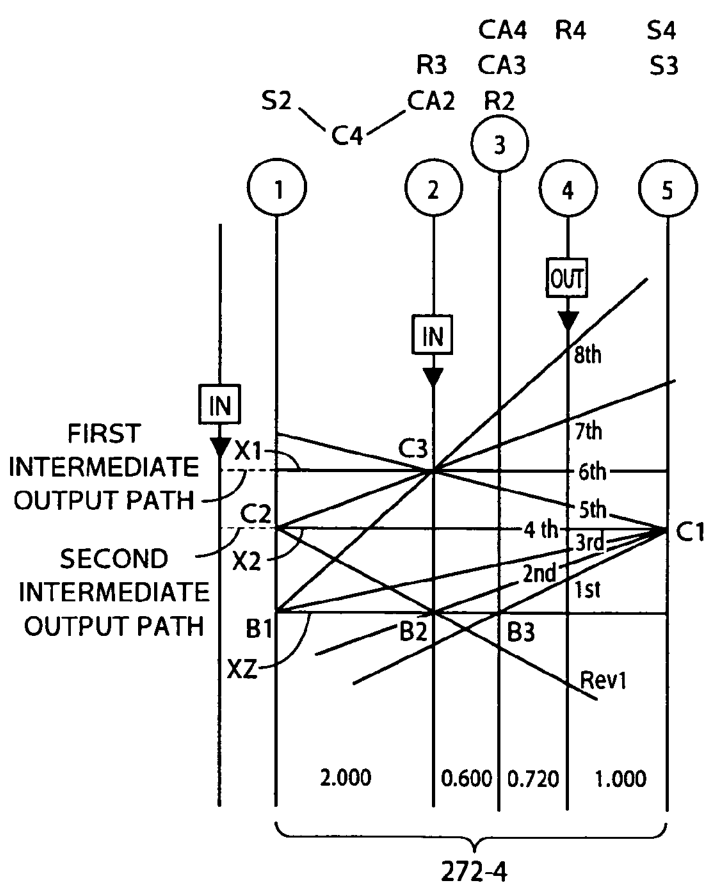
Figure 186:
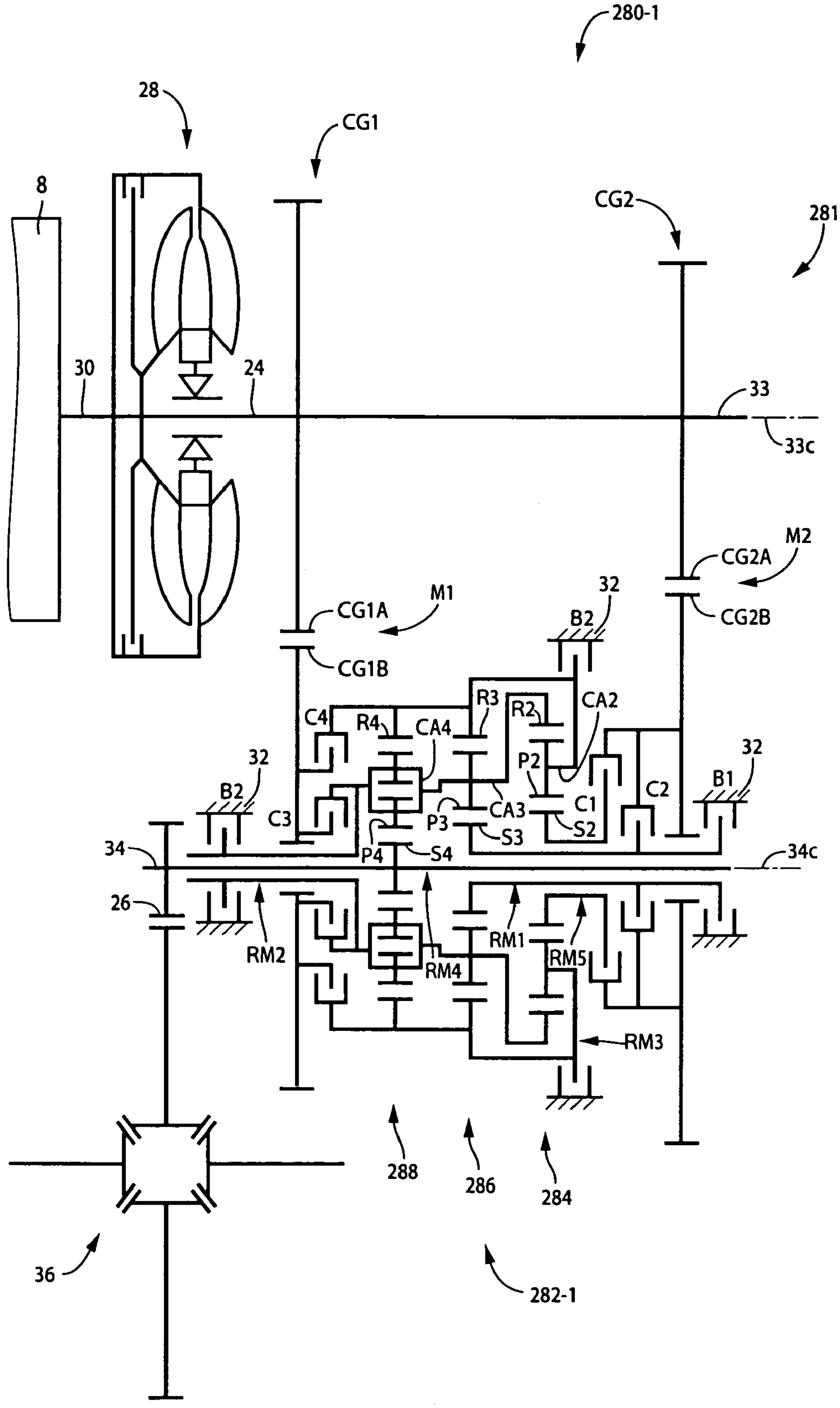
Figures 187, 188:
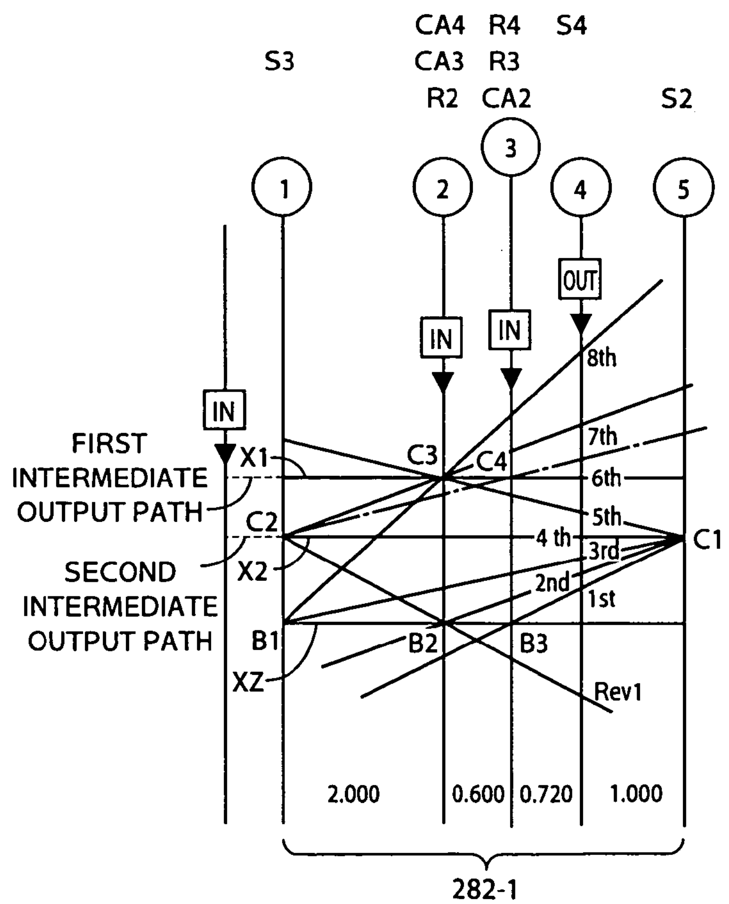
Figure 189:
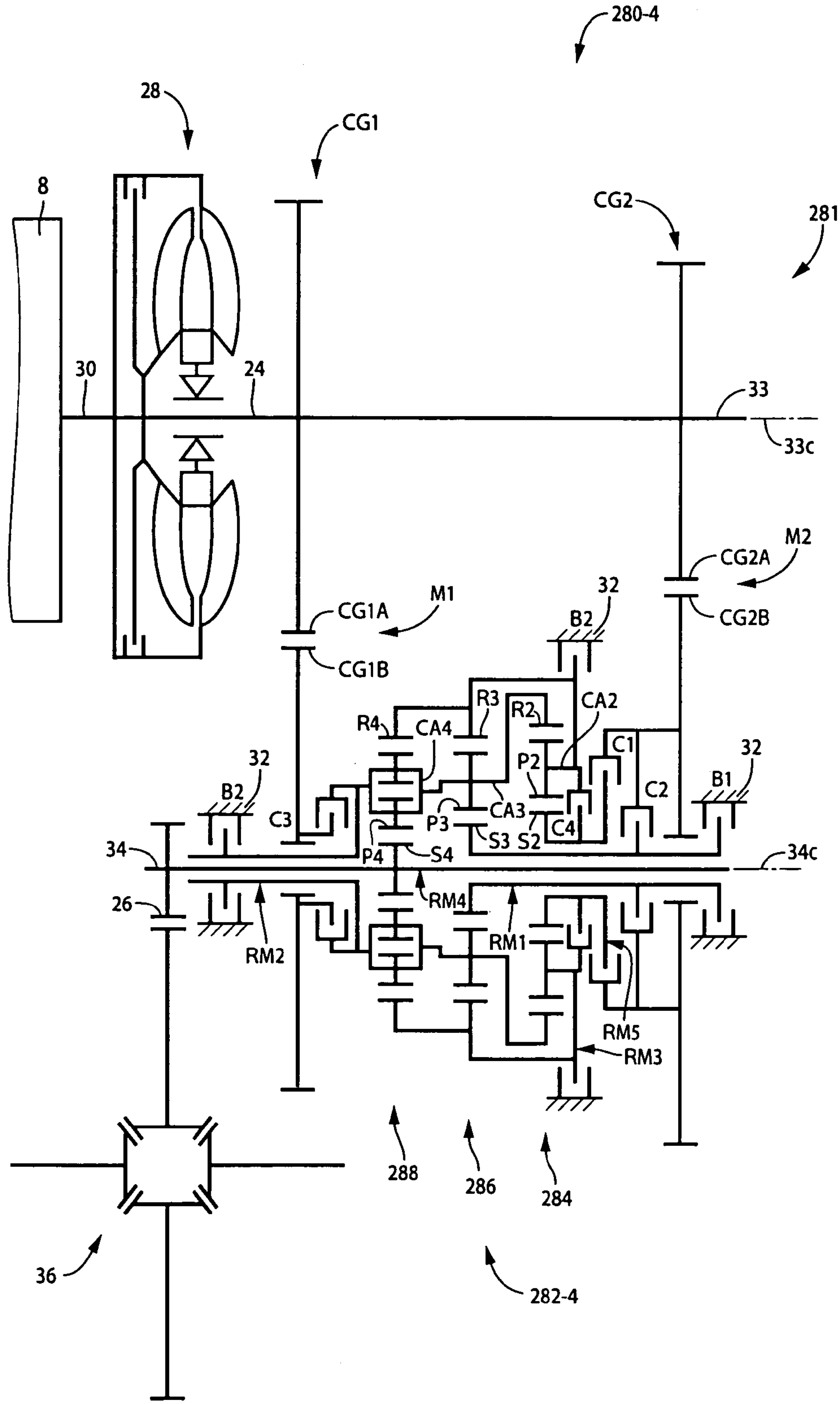
Figures 190, 191:
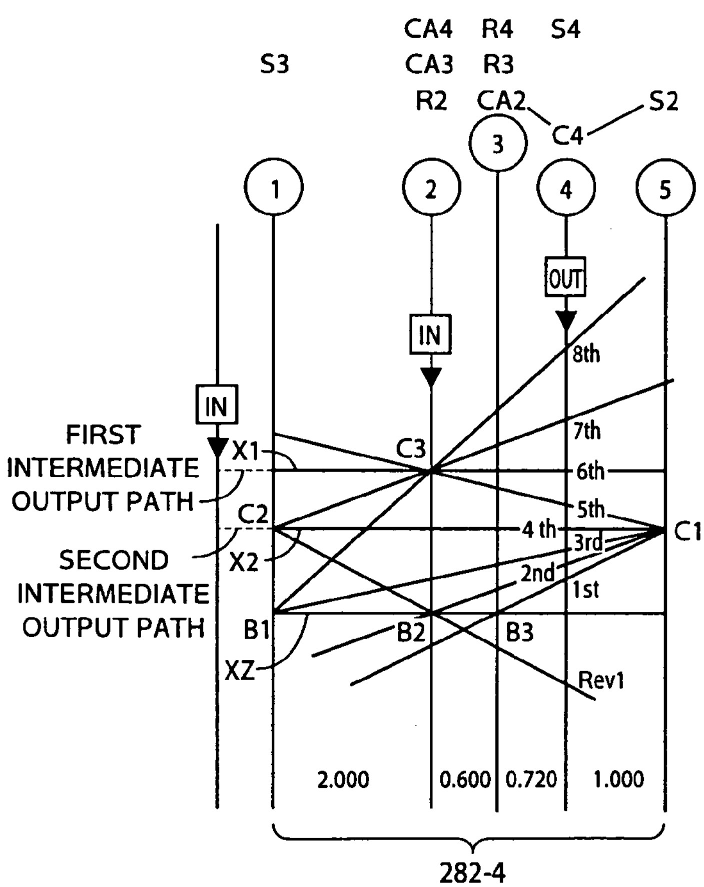
Figure 192:
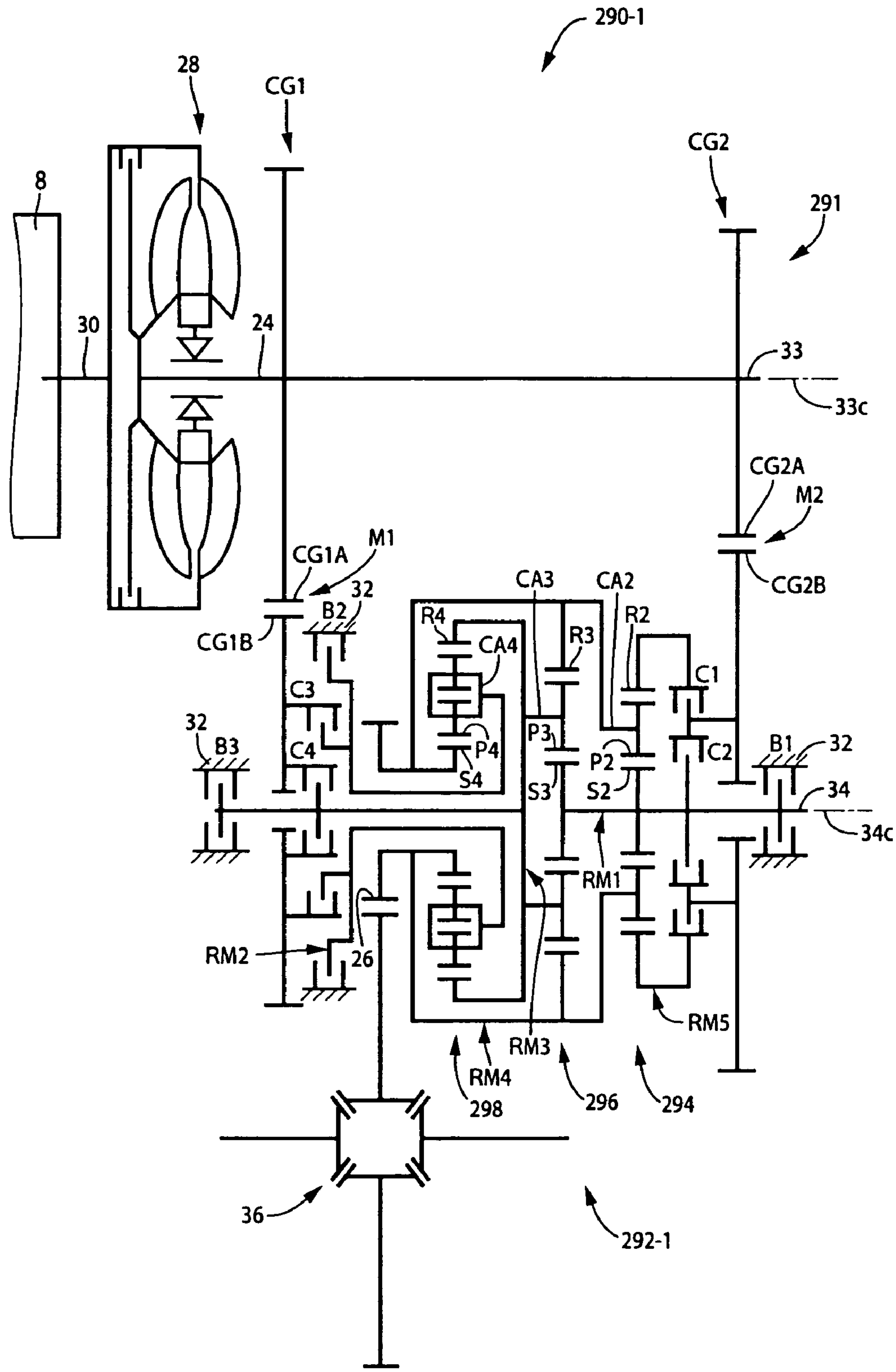
Figures 193, 194:
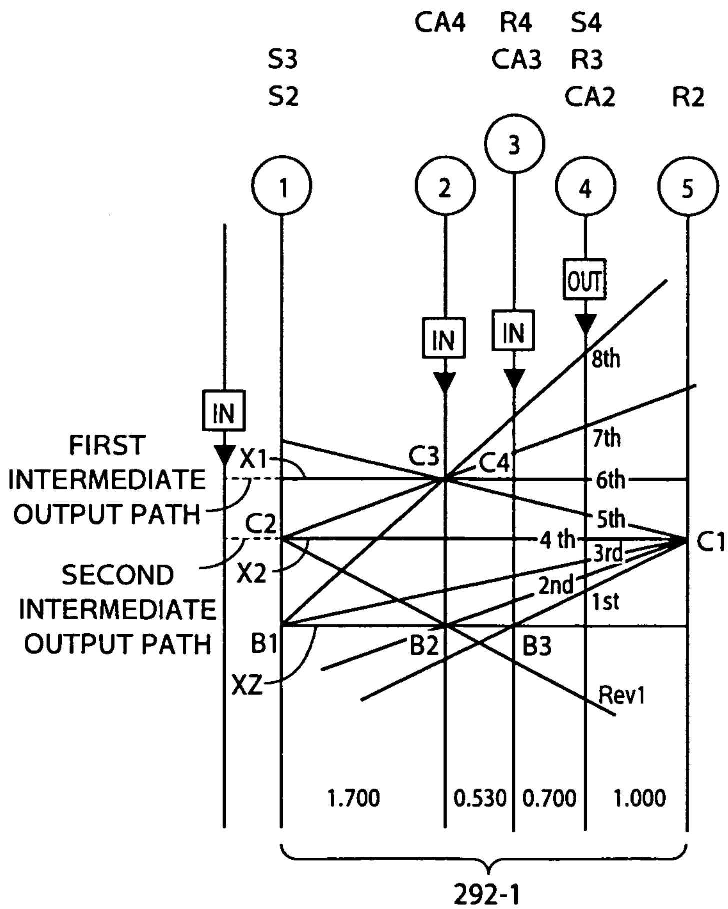
Figure 195:
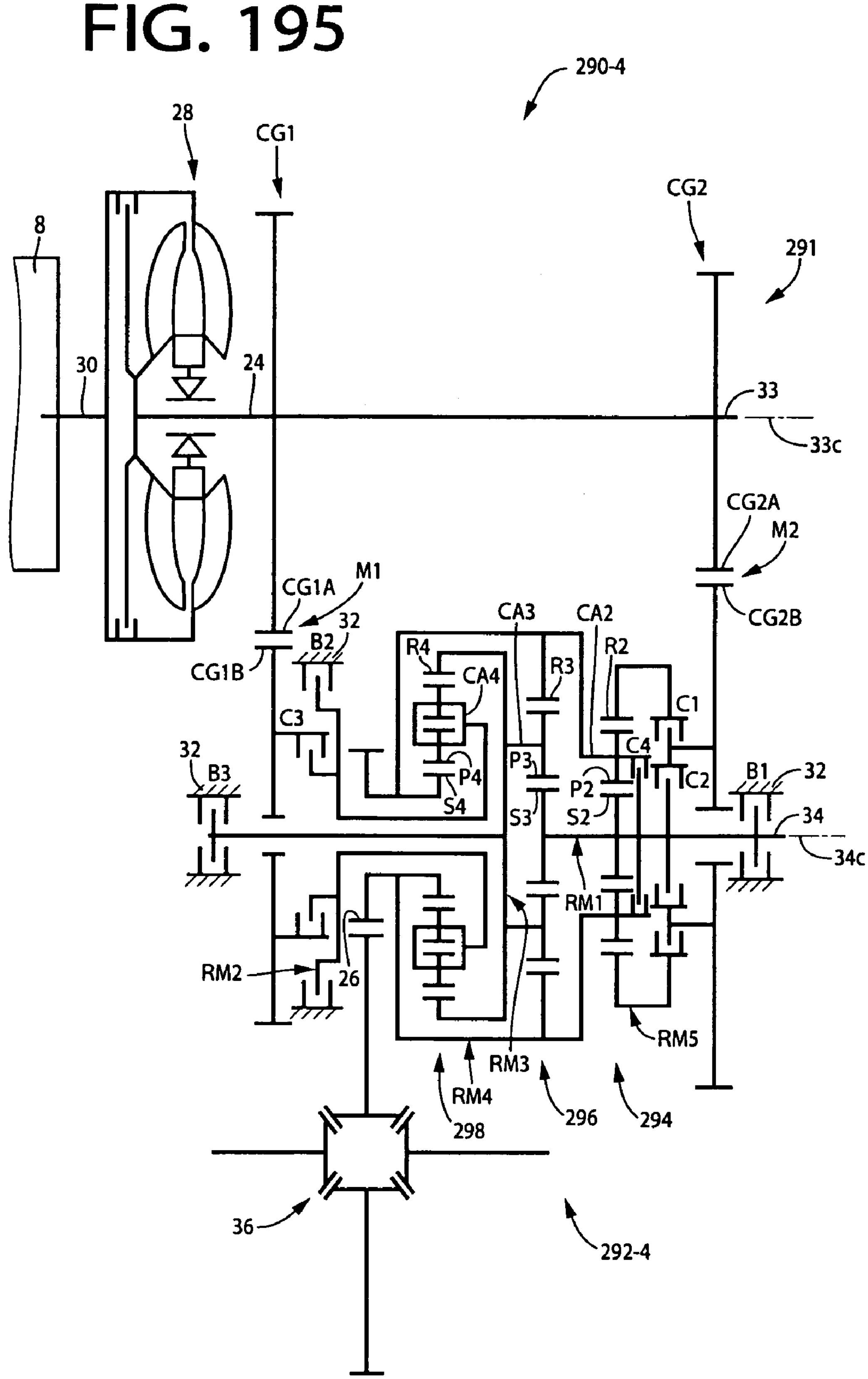
Figures 196, 197:
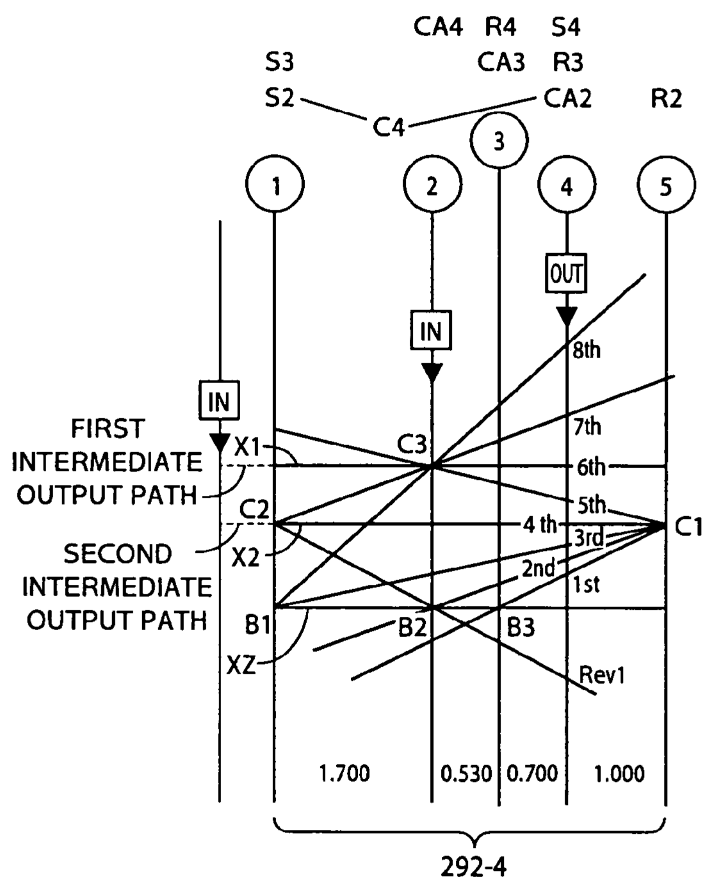
Figure 198:
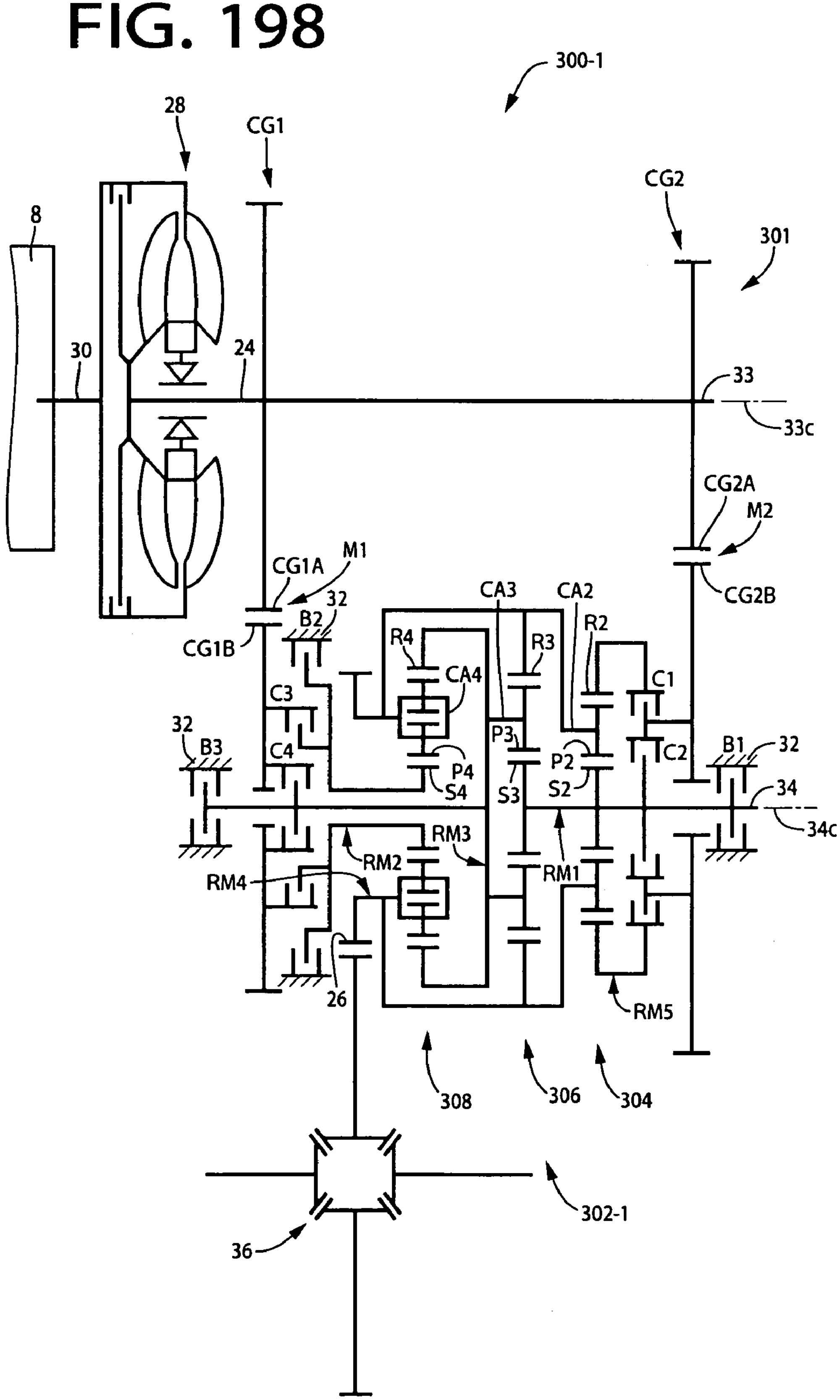
Figures 199, 200:
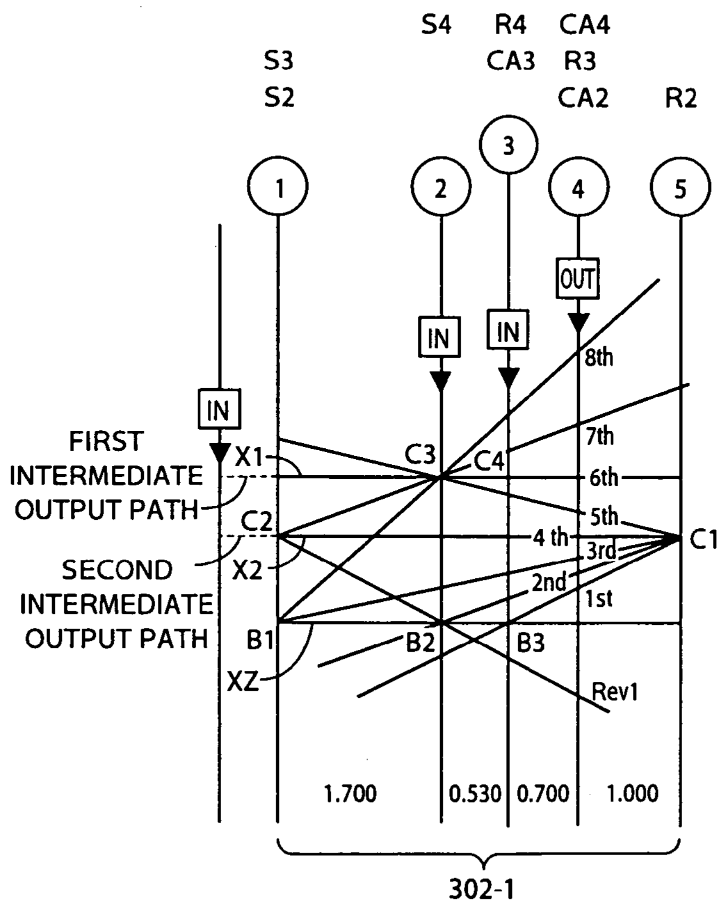
Figure 201:
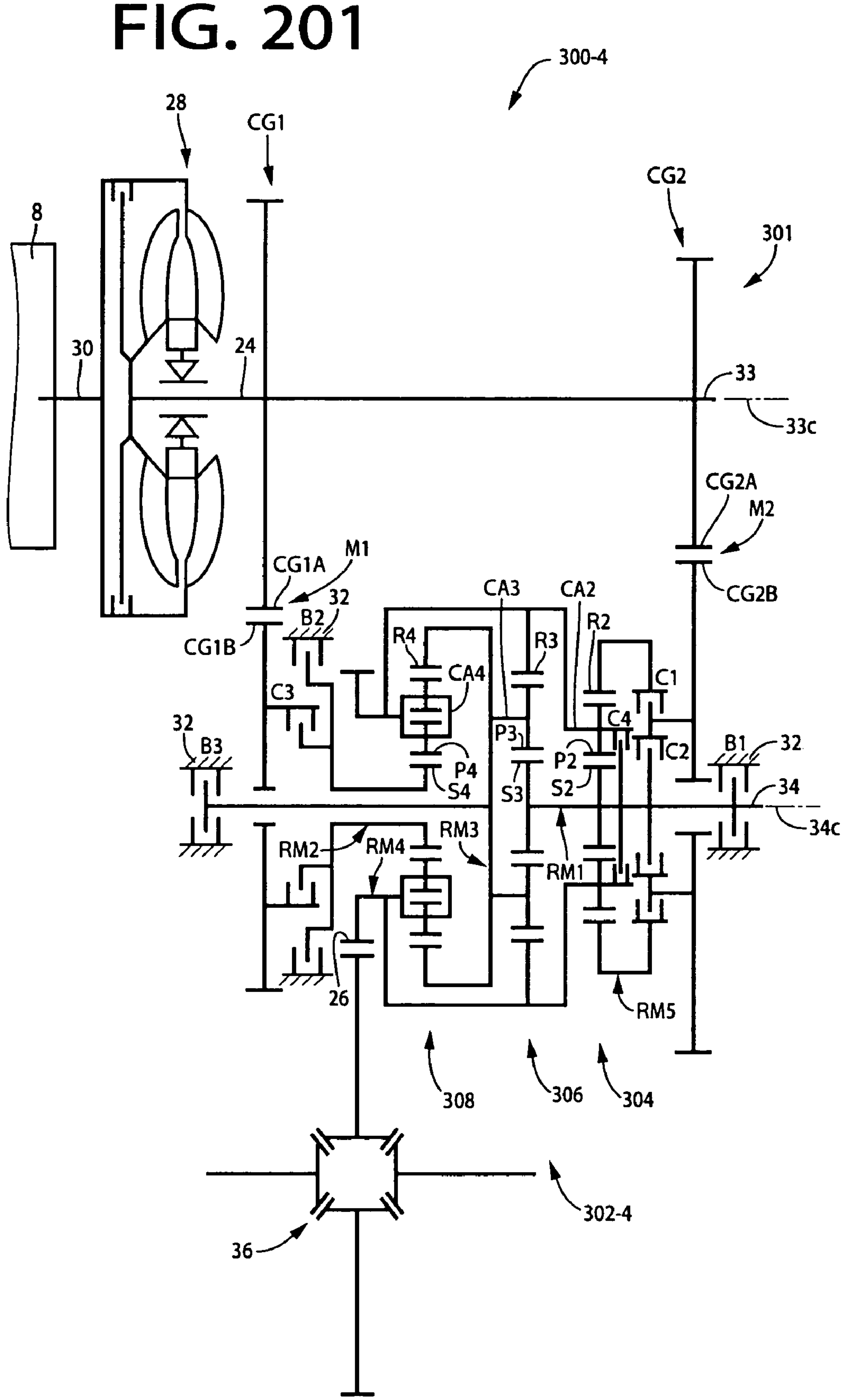
Figures 202, 203:
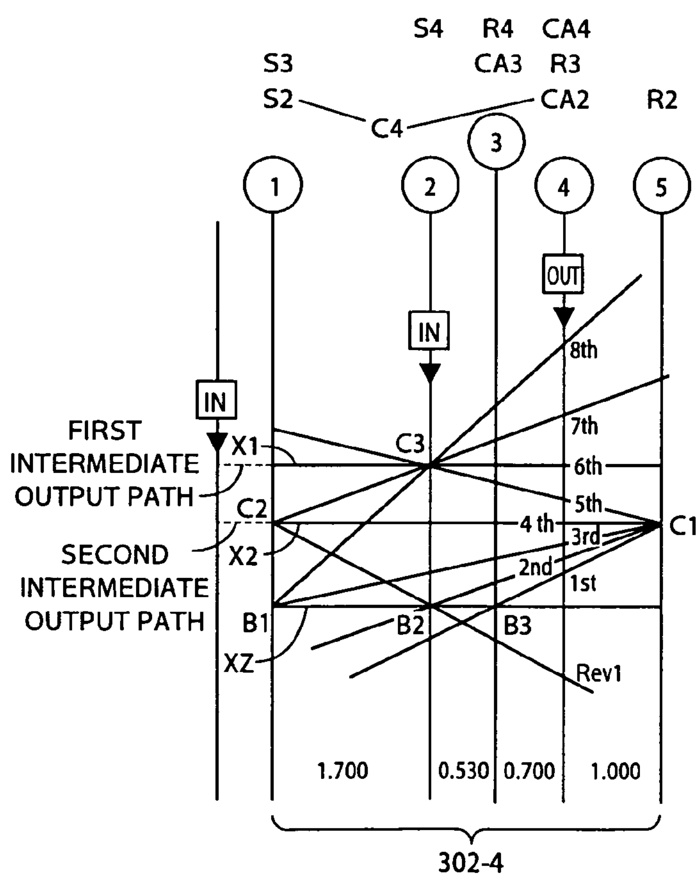
Figure 204:
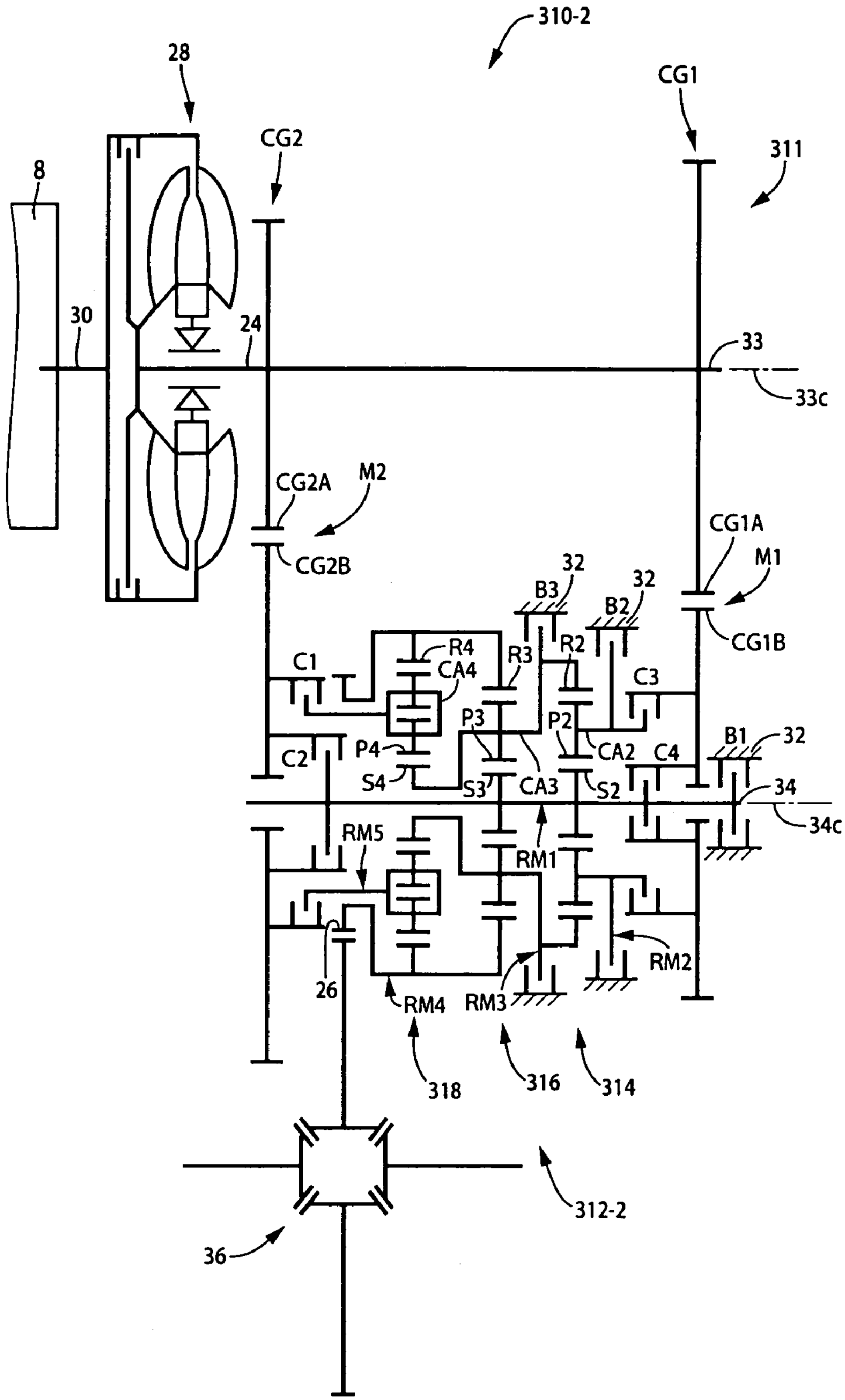
Figures 205, 206:
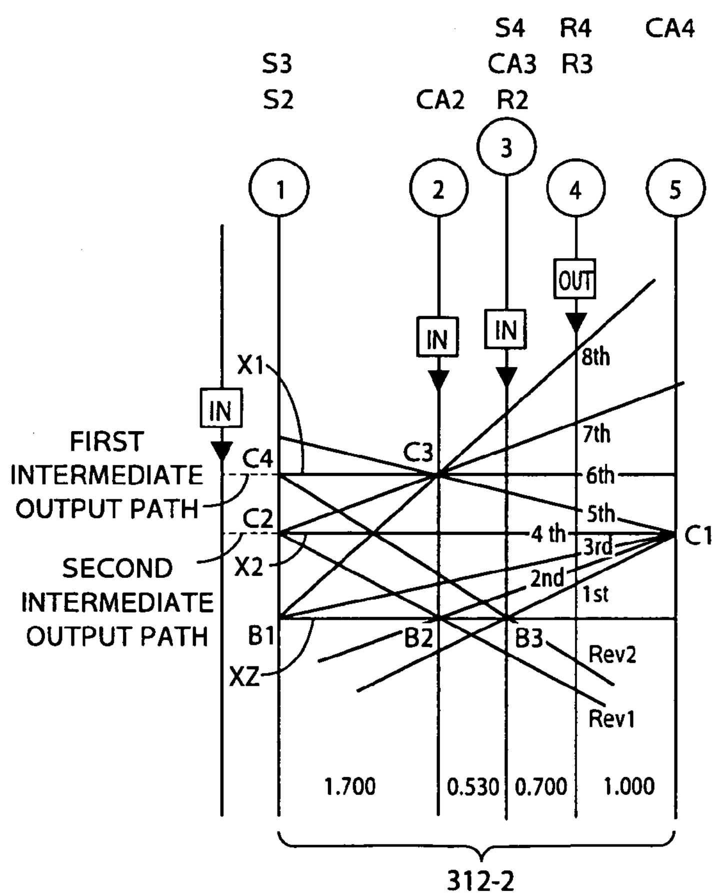
Figure 207:
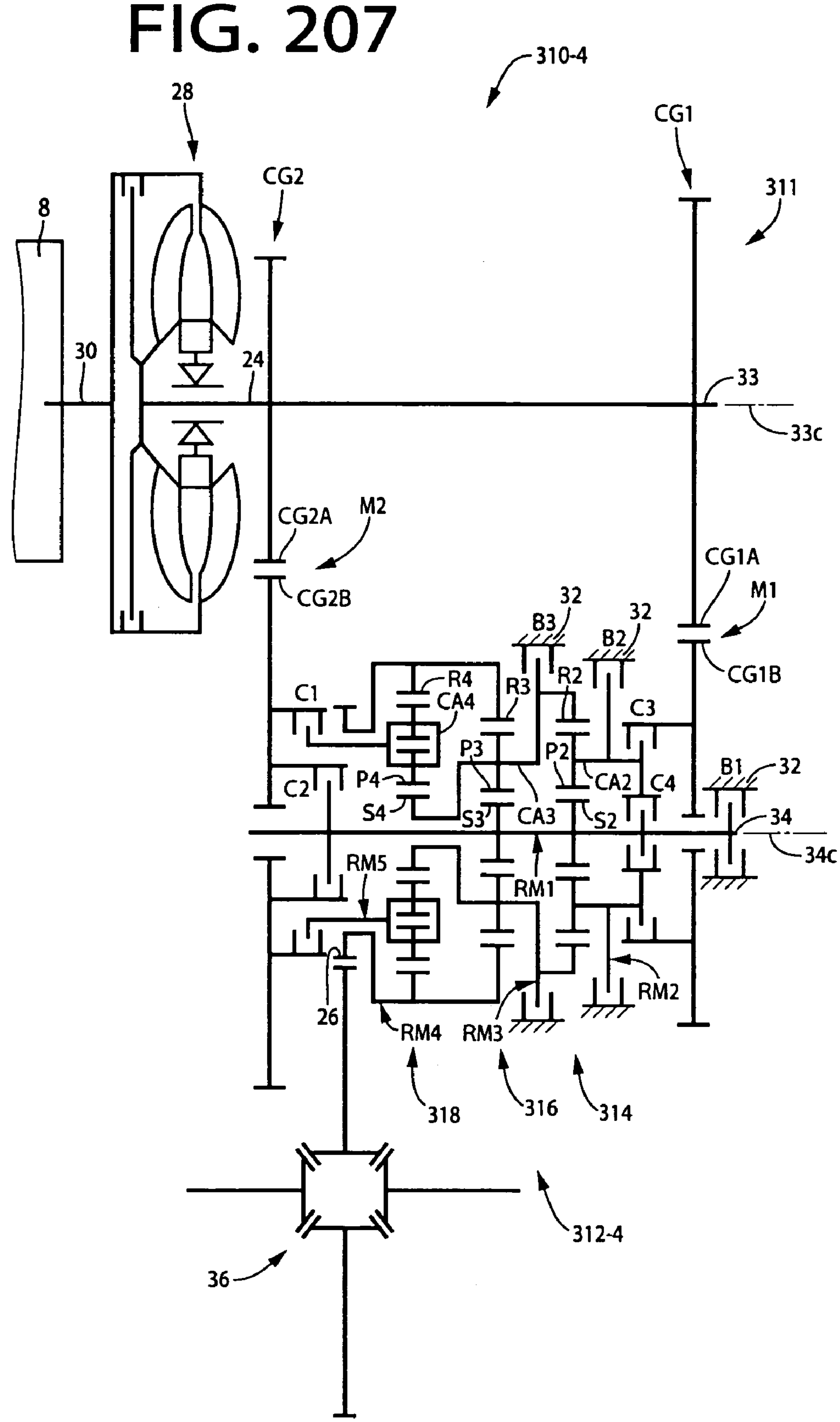
Figures 208, 209:
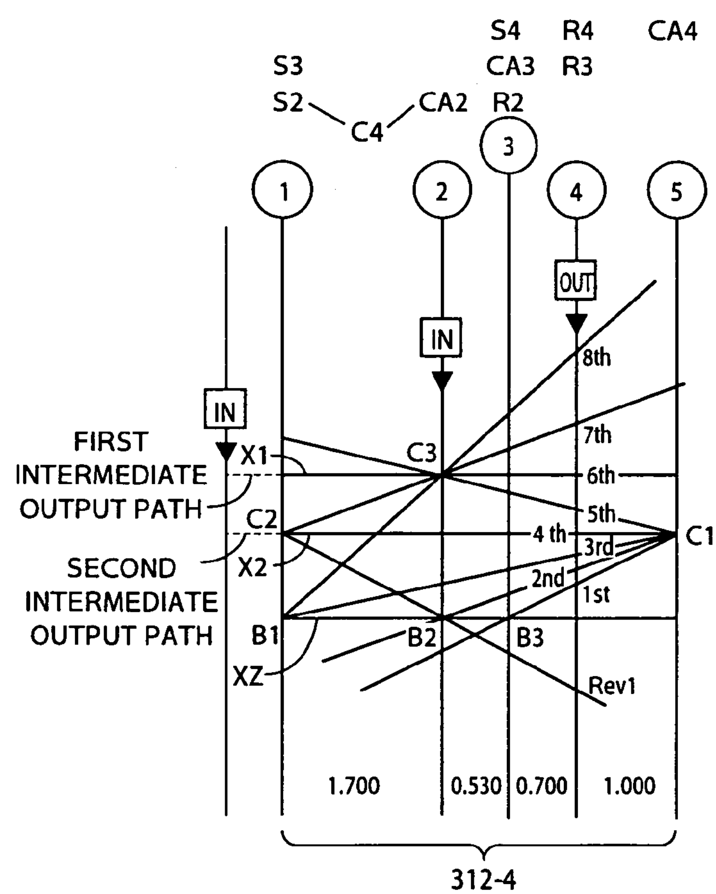
Figure 210:
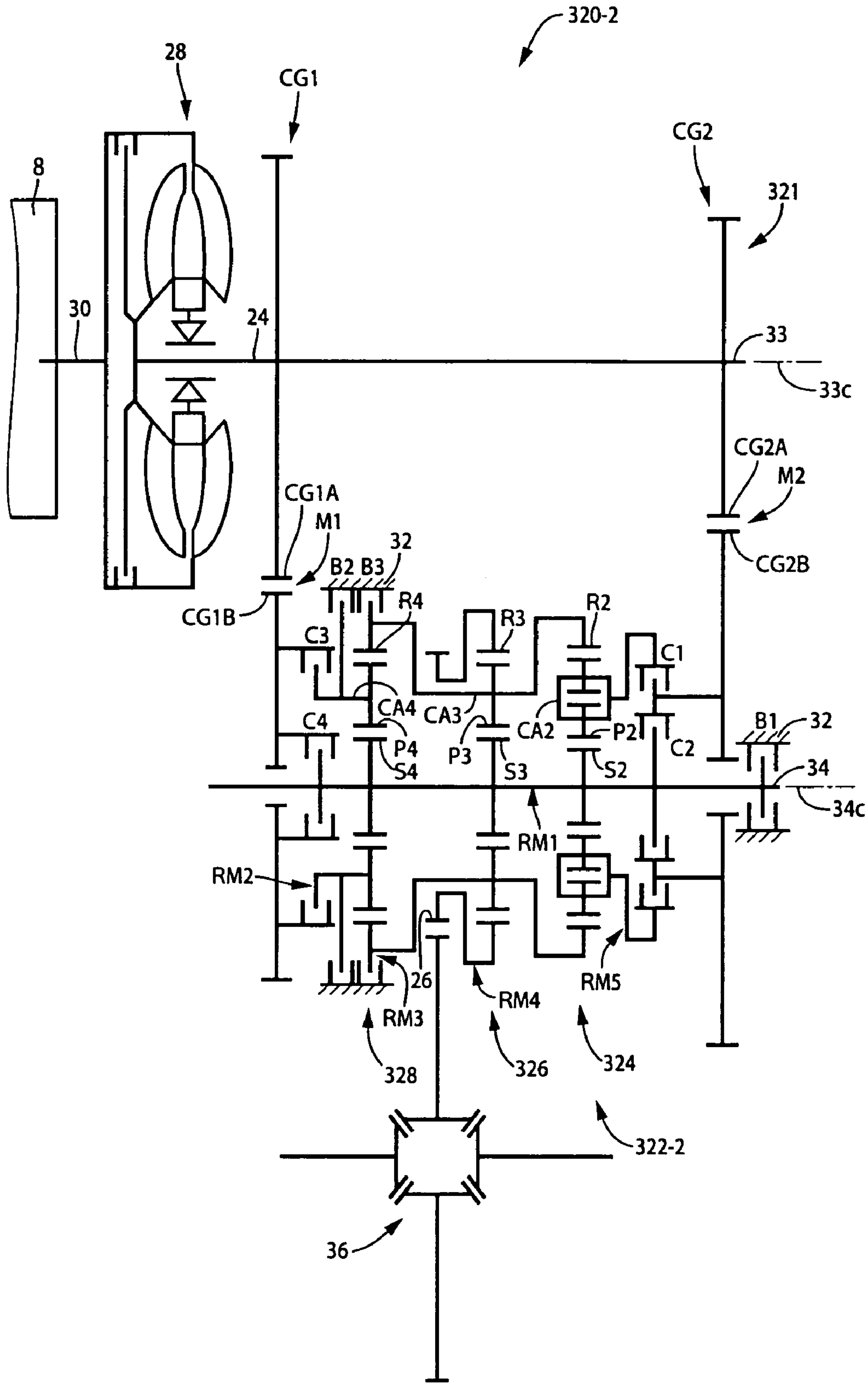
Figures 211, 212:
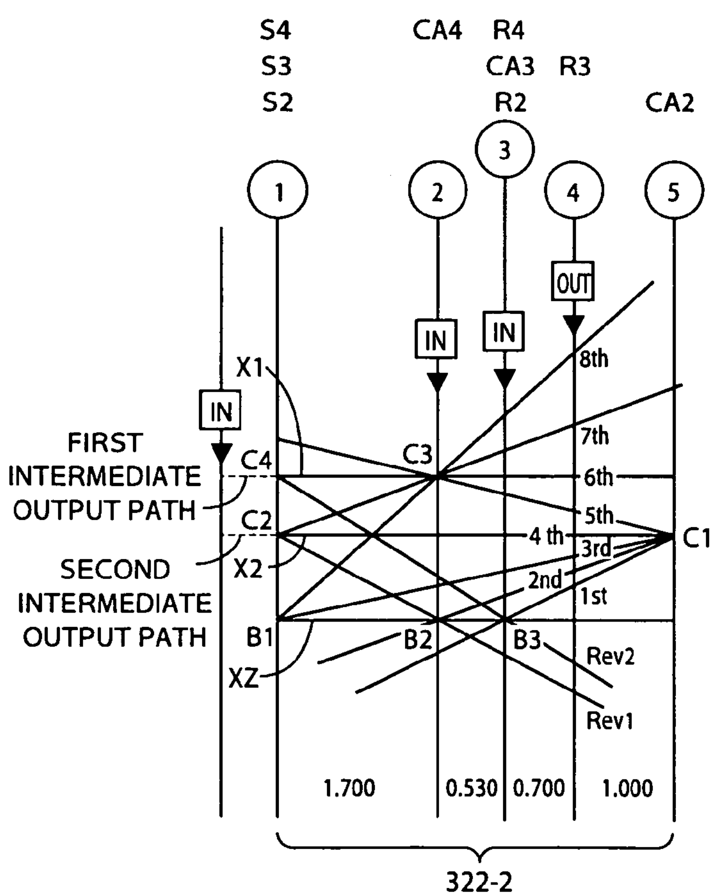
Figure 213:
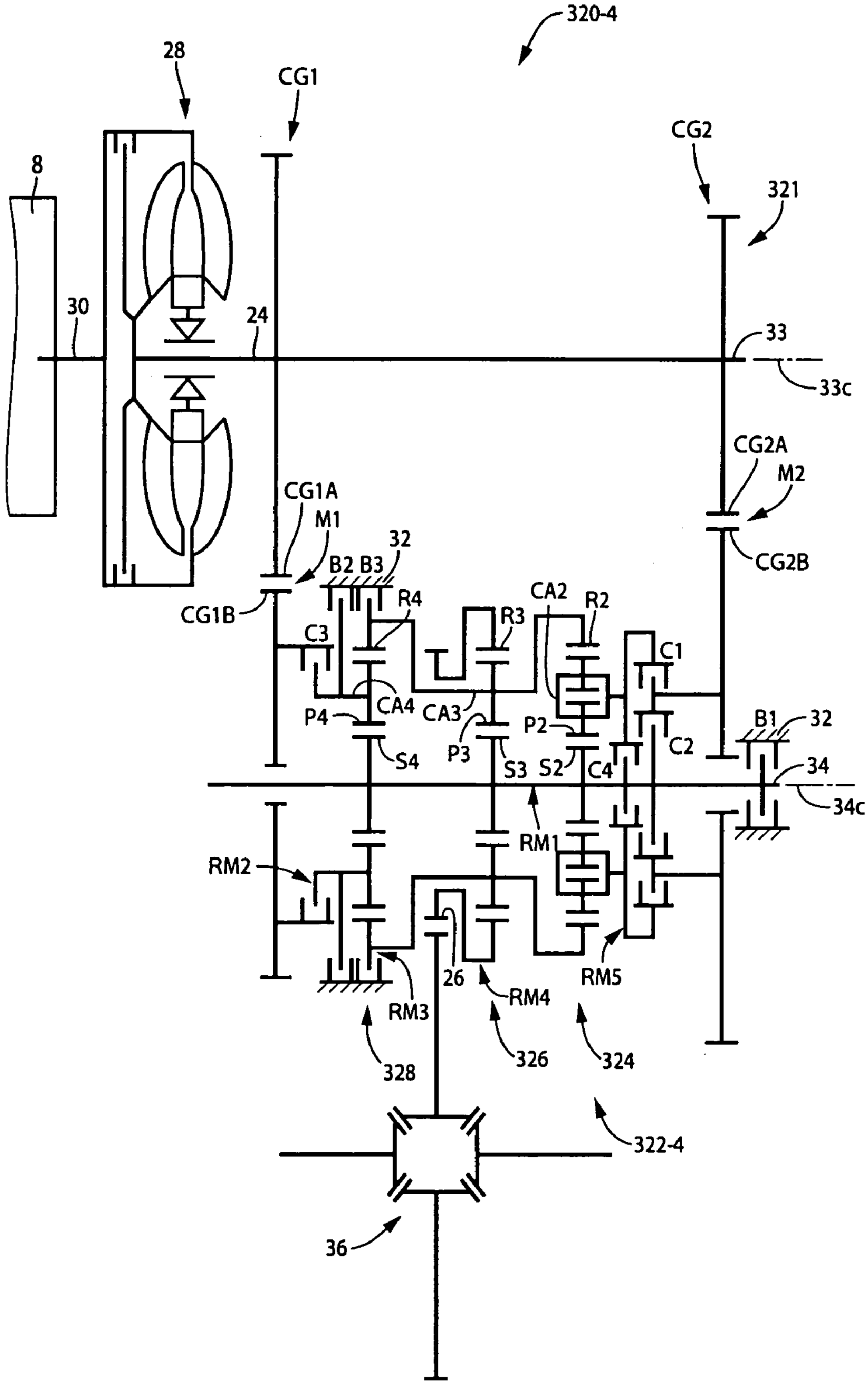
Figures 214, 215:
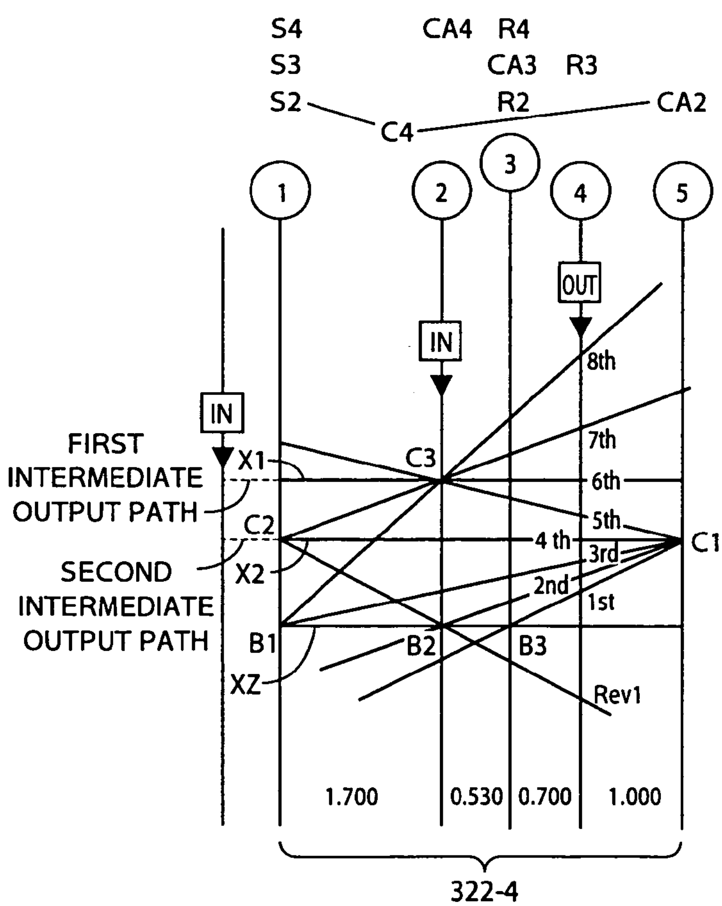
Figure 216:
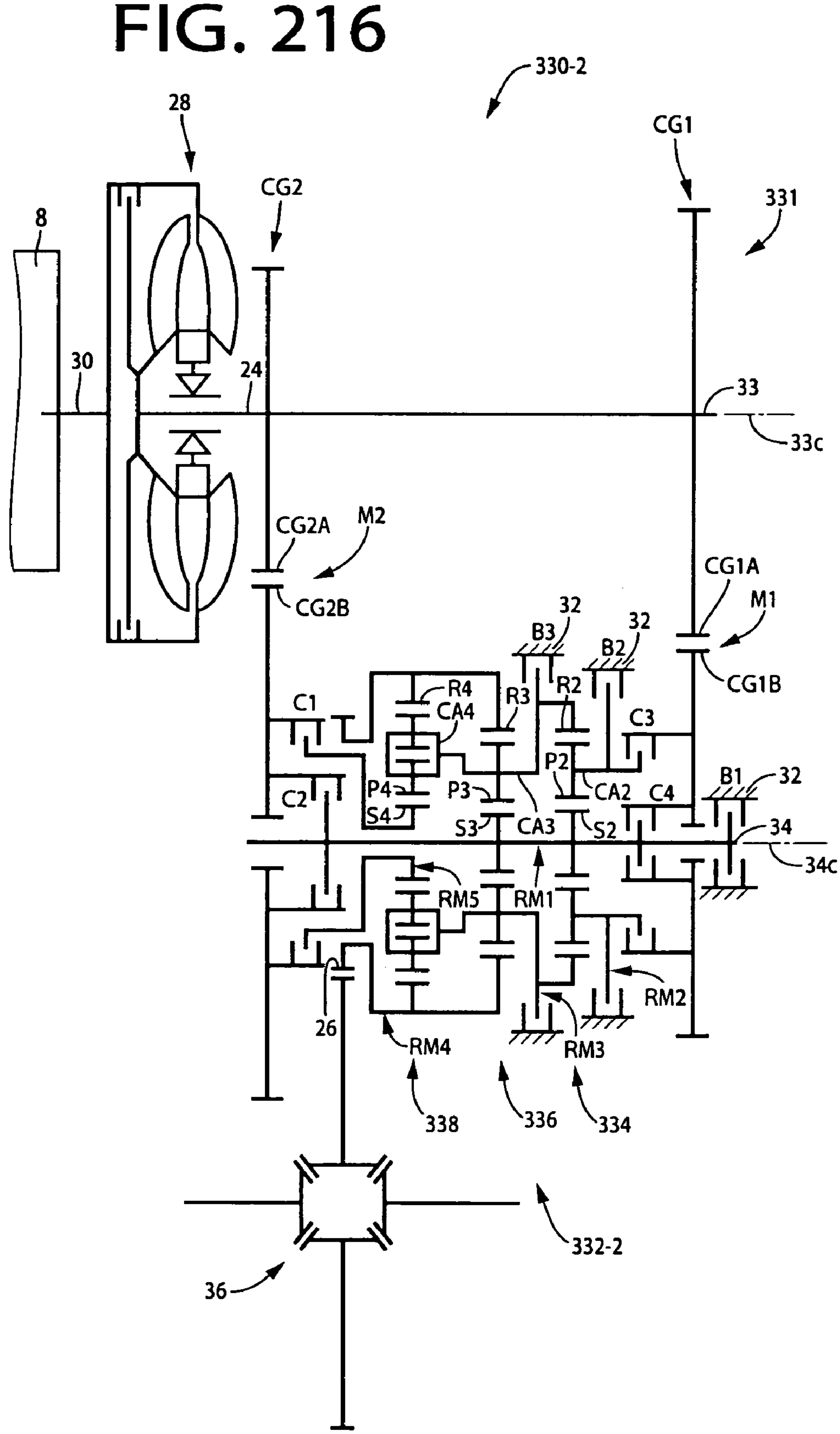
Figures 217, 218:
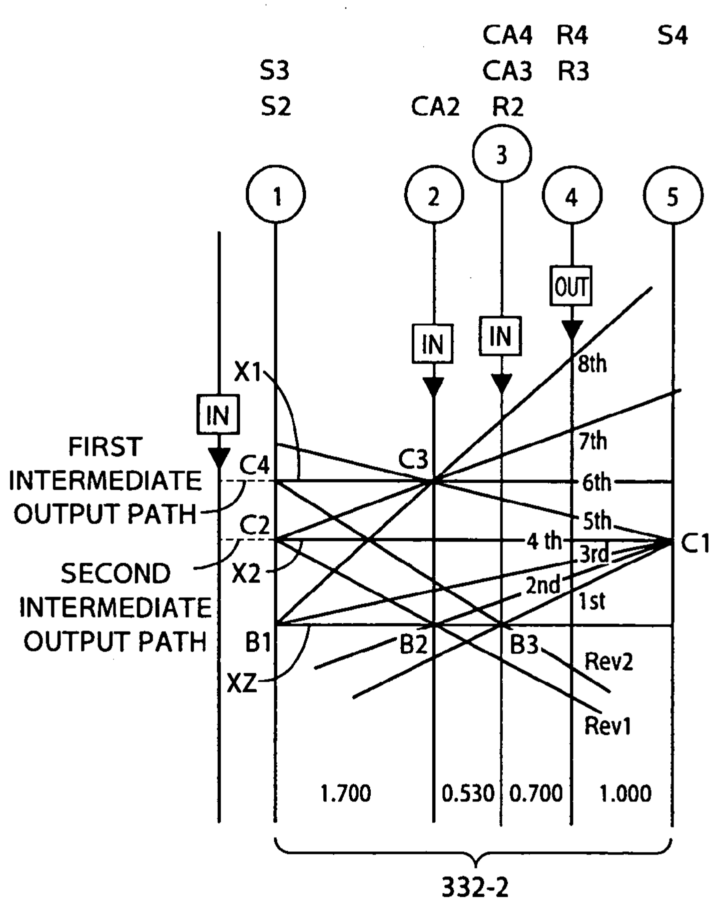
Figure 219:
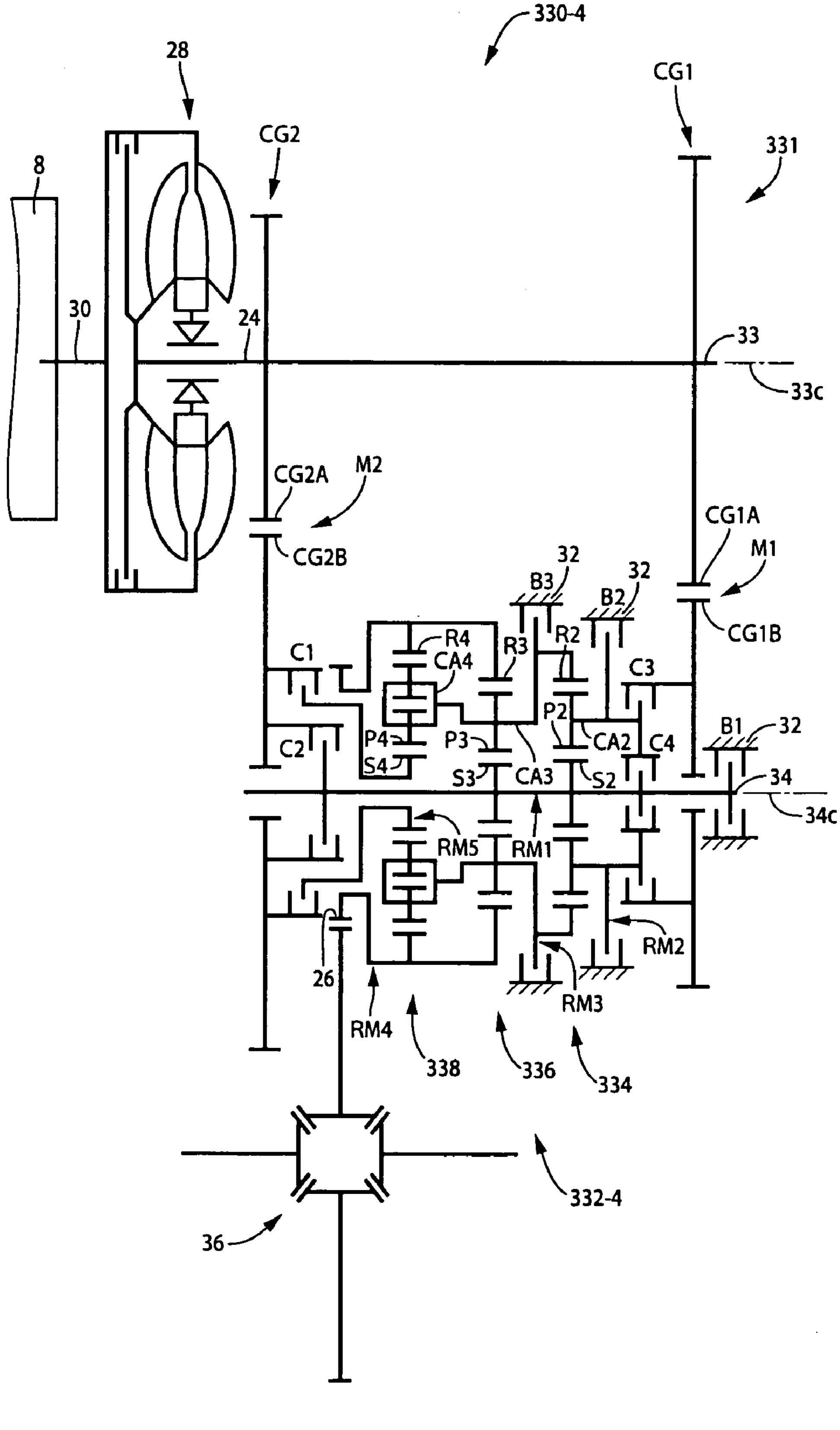
Figures 220, 221:
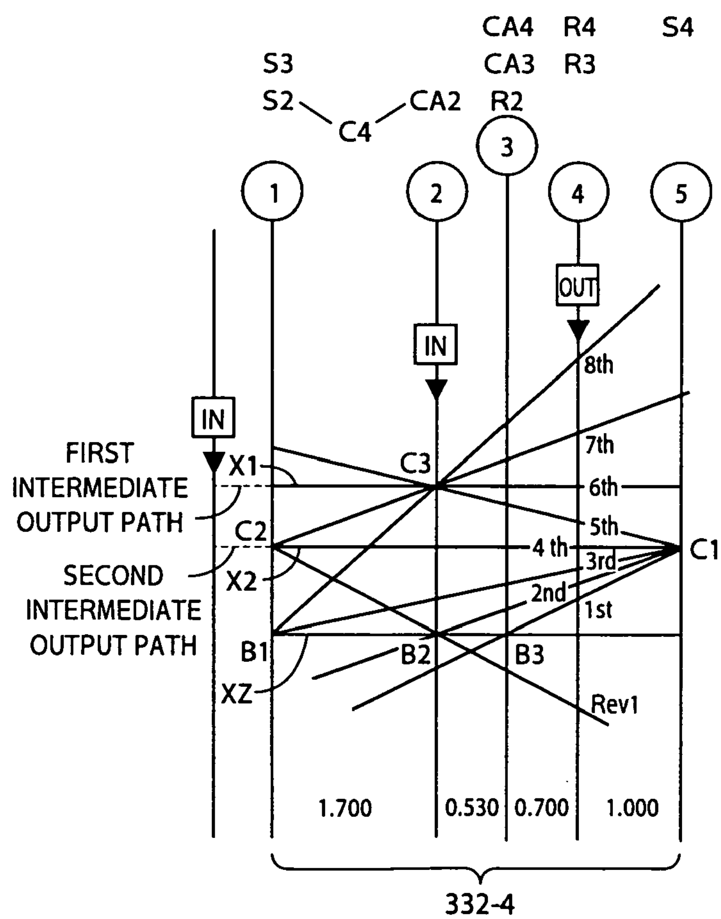
Figure 222:
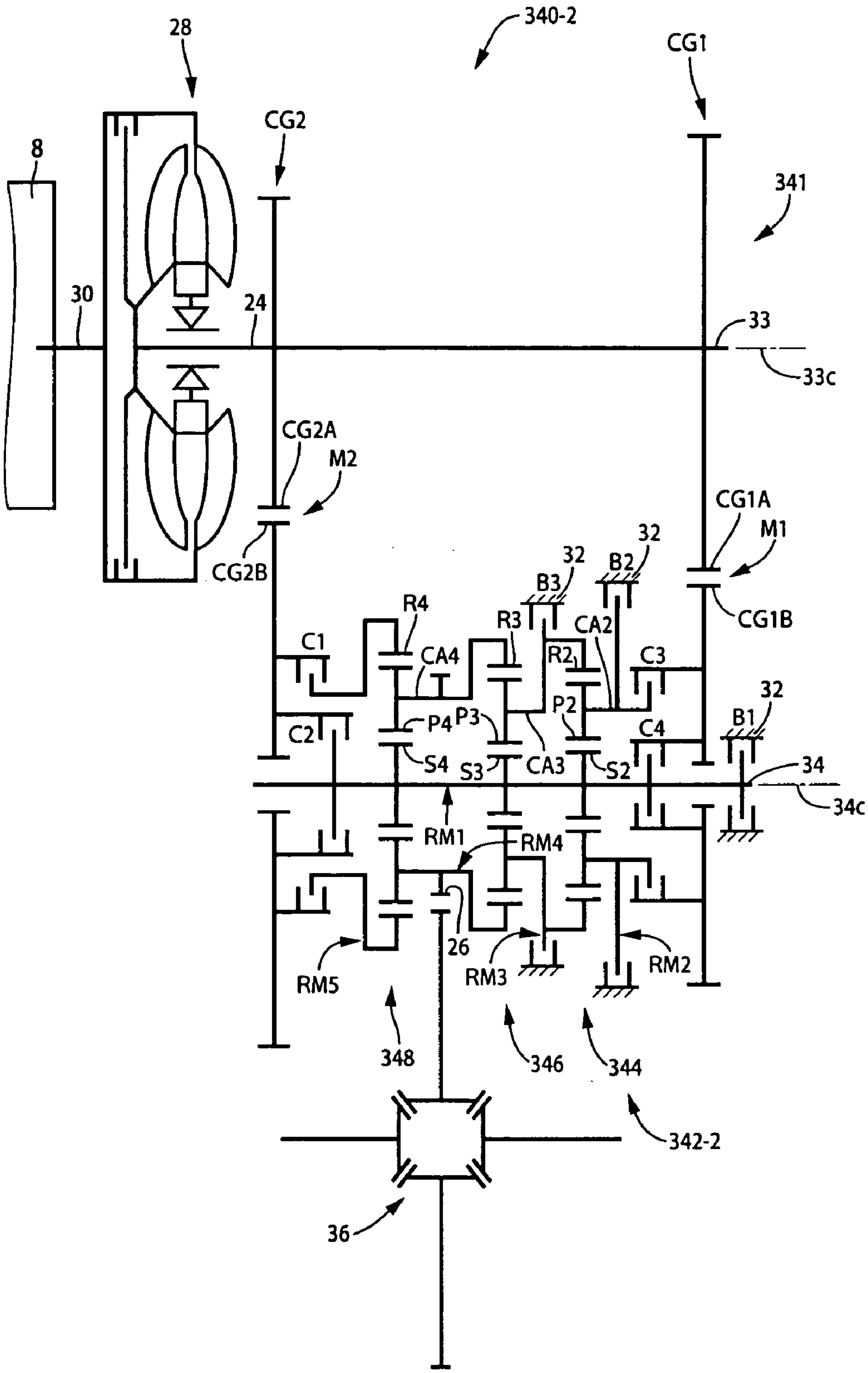
Figures 223, 224:
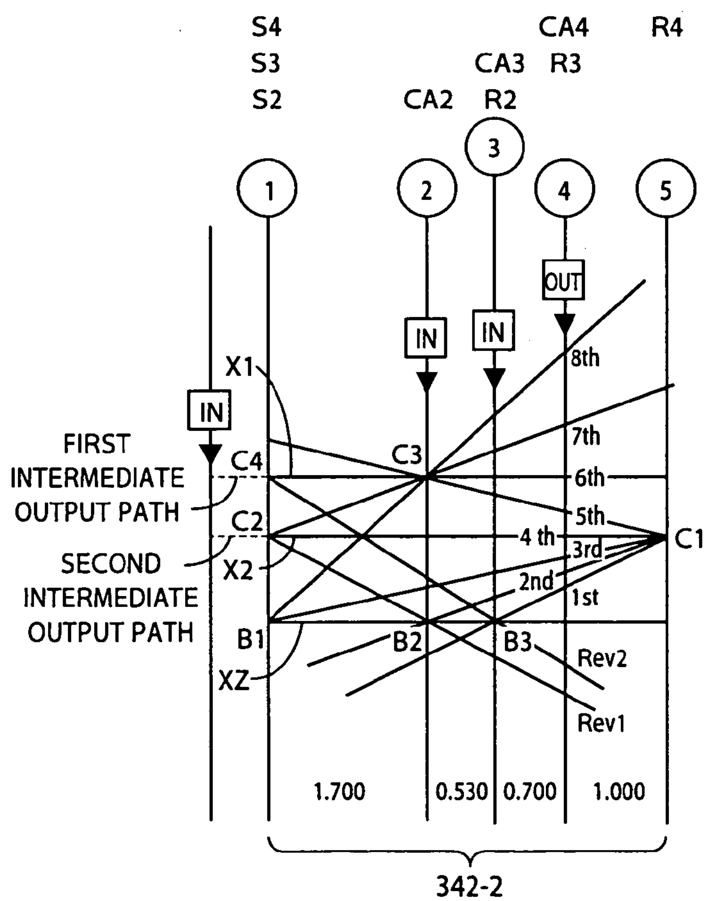
Figure 225:
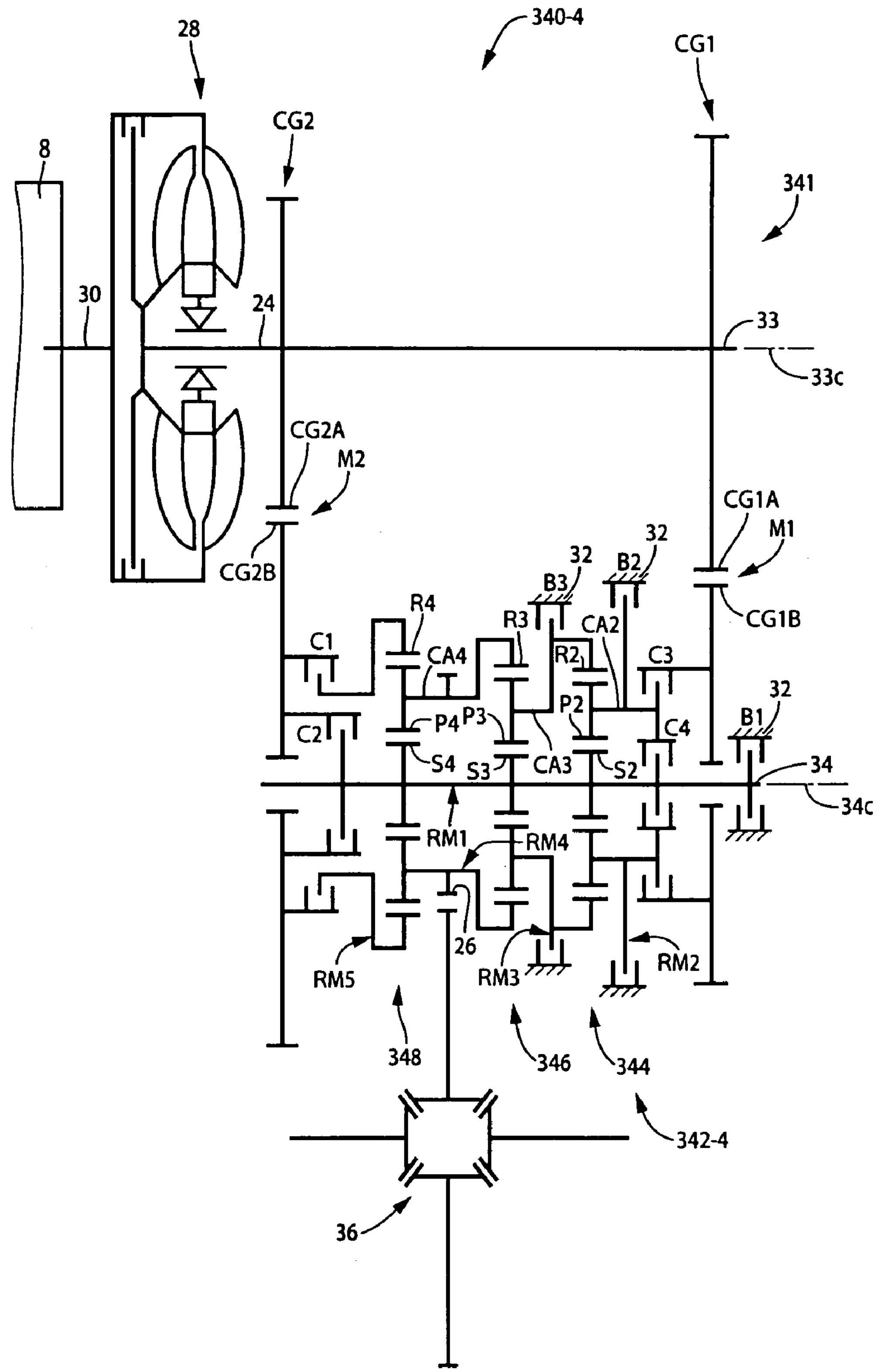
Figures 226, 227:
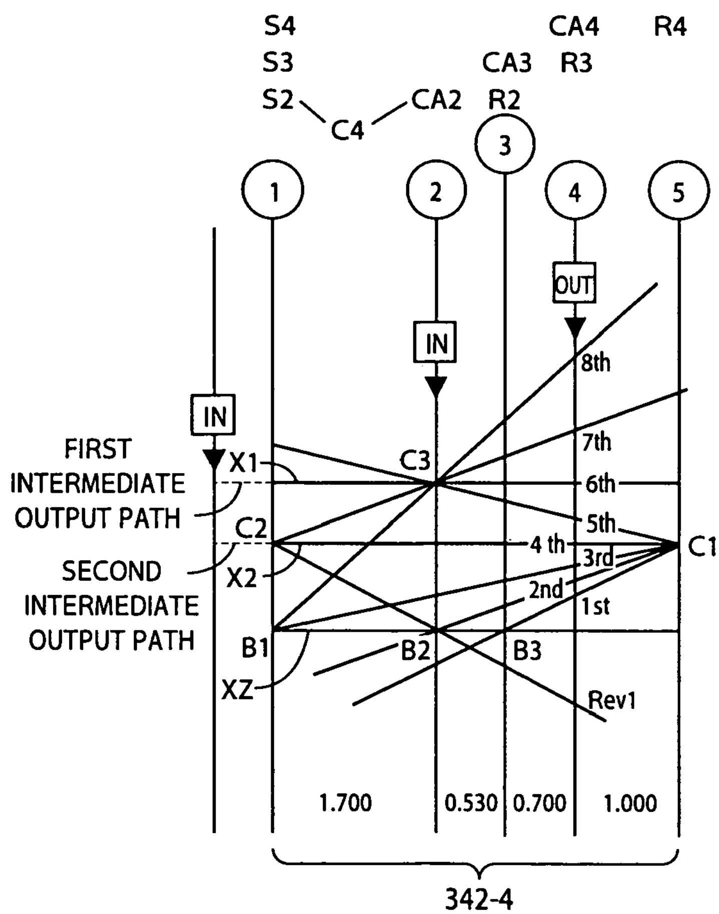
Figure 228:
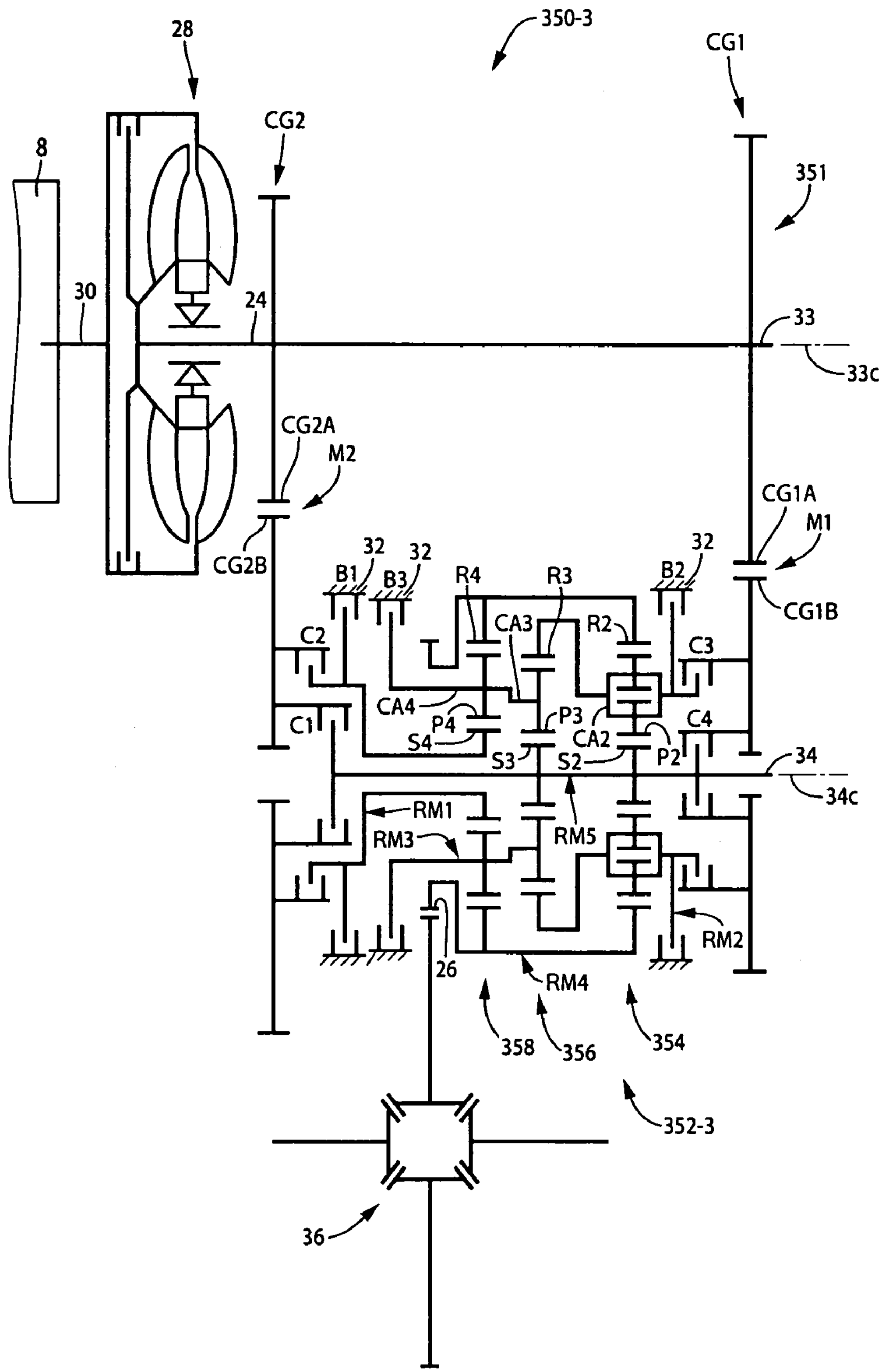
Figures 229, 230:
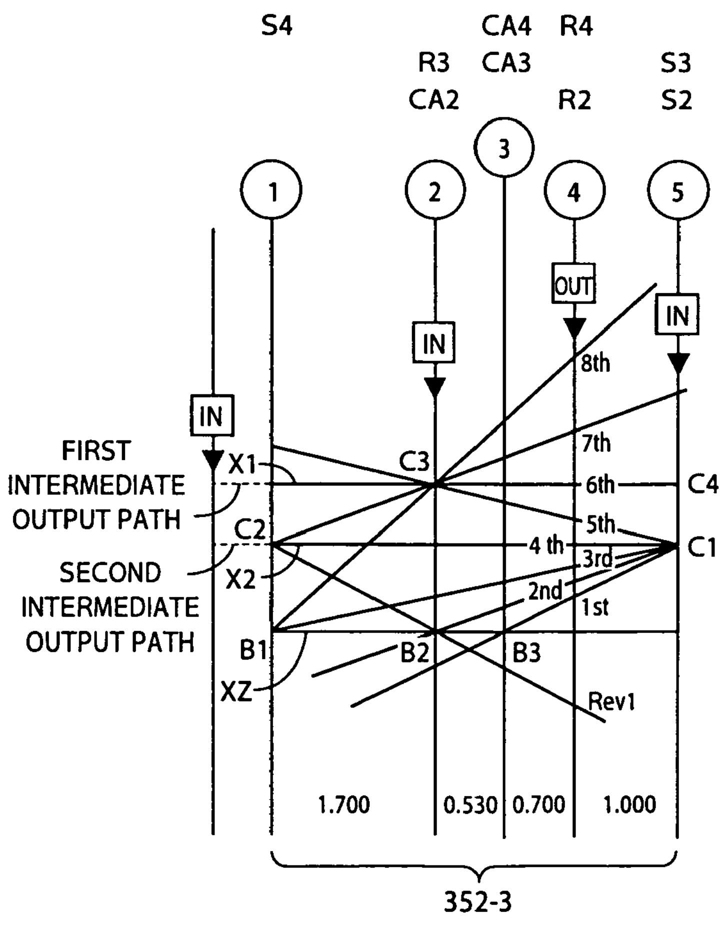
Figure 231:
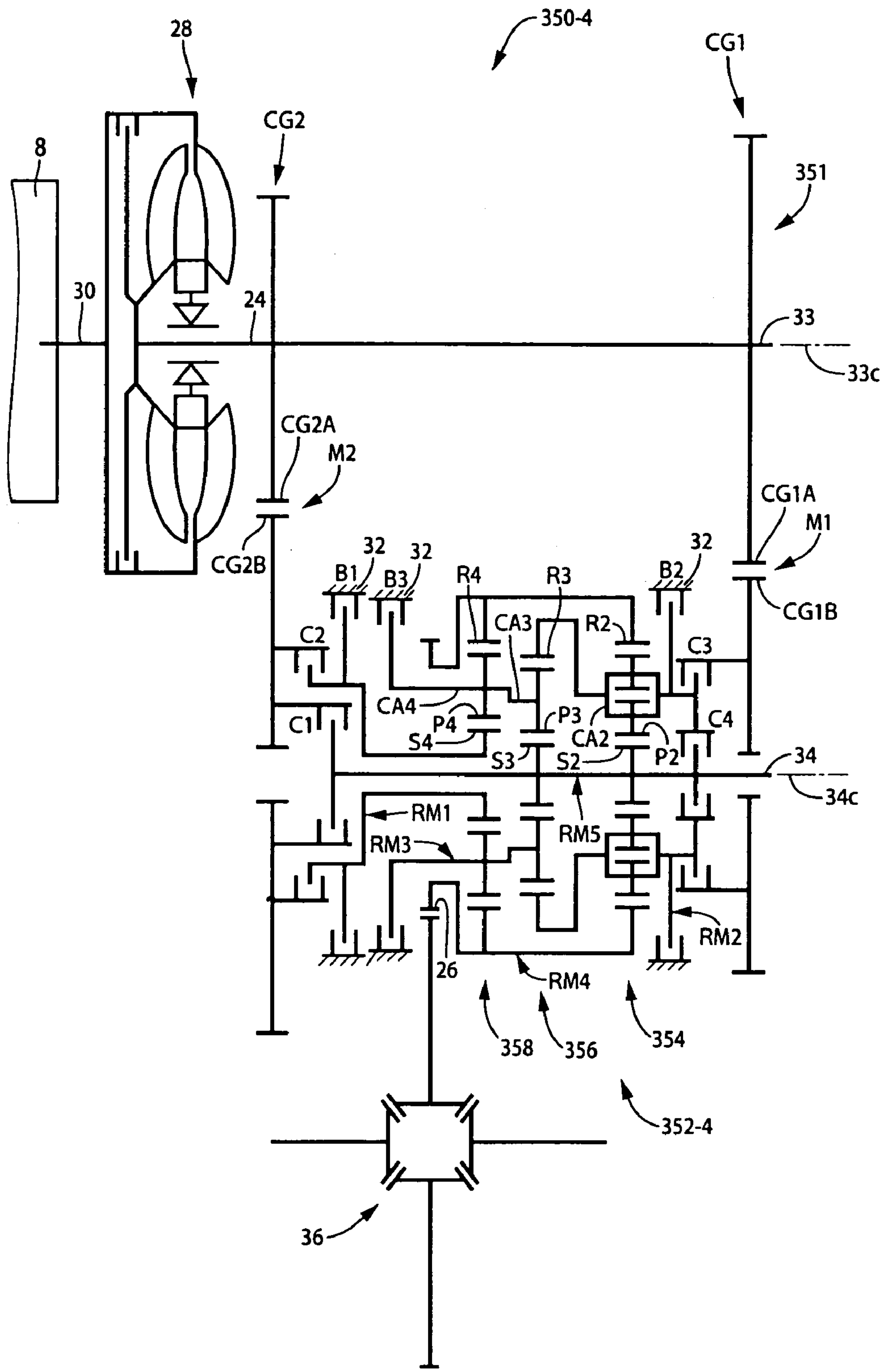
Figures 232, 233:
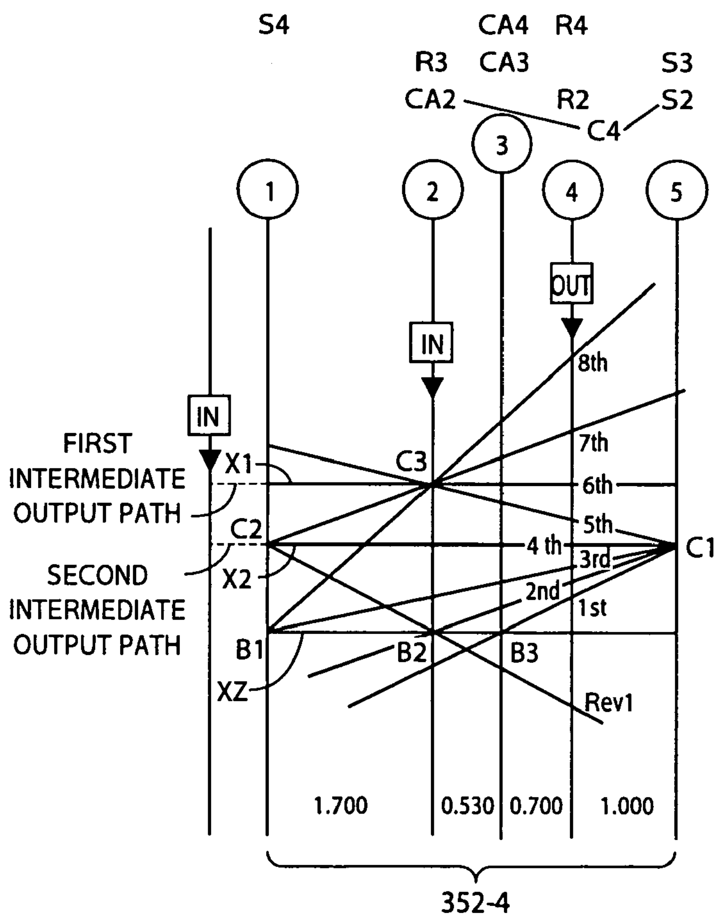
Figure 234:
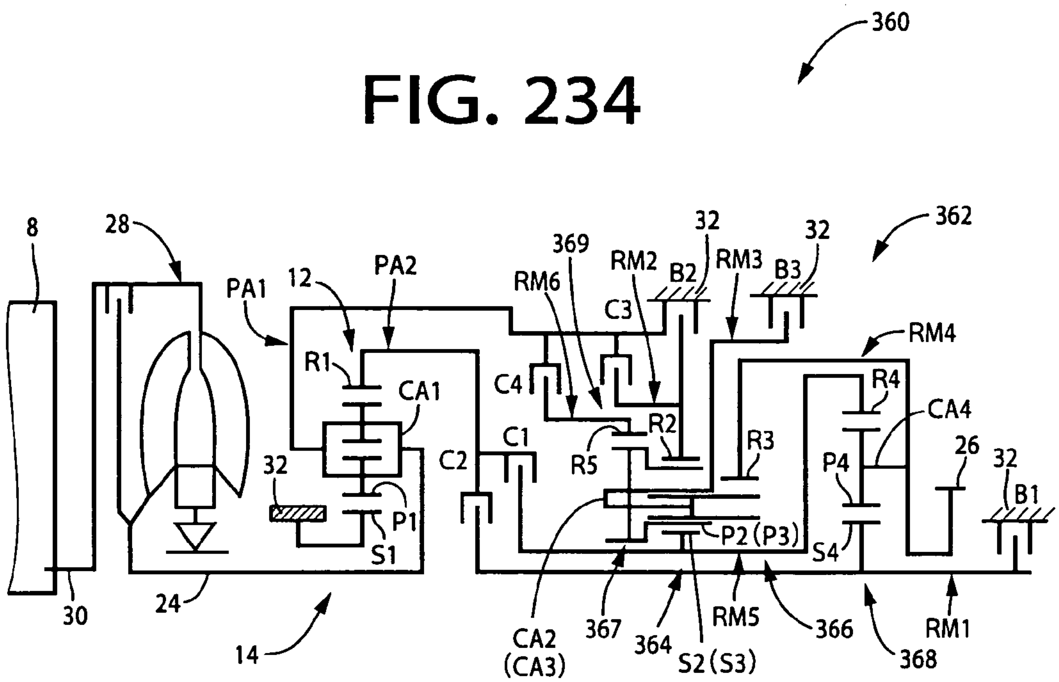
Figures 235, 236:
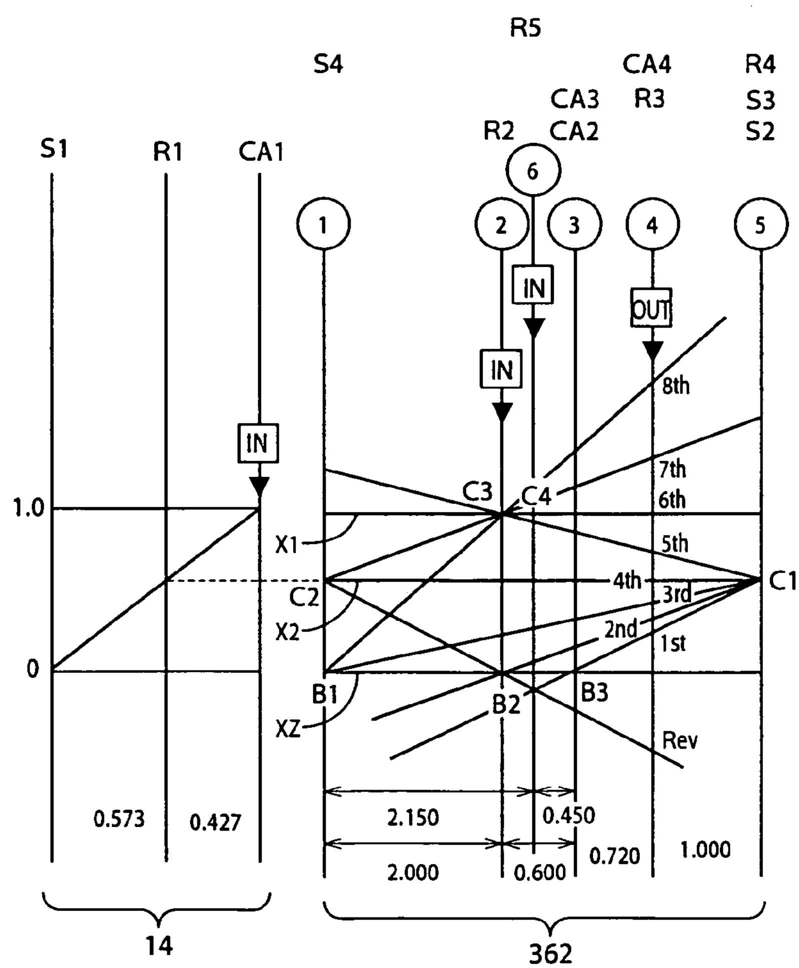
Figures 237, 238:
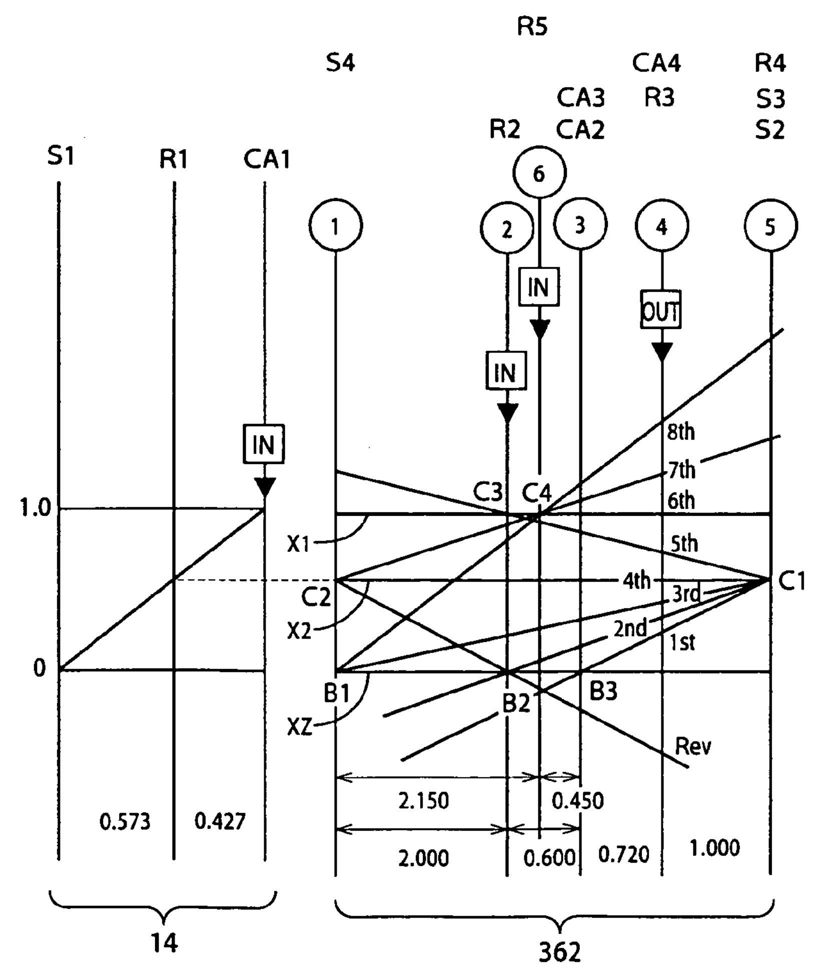
Figures 239, 240:
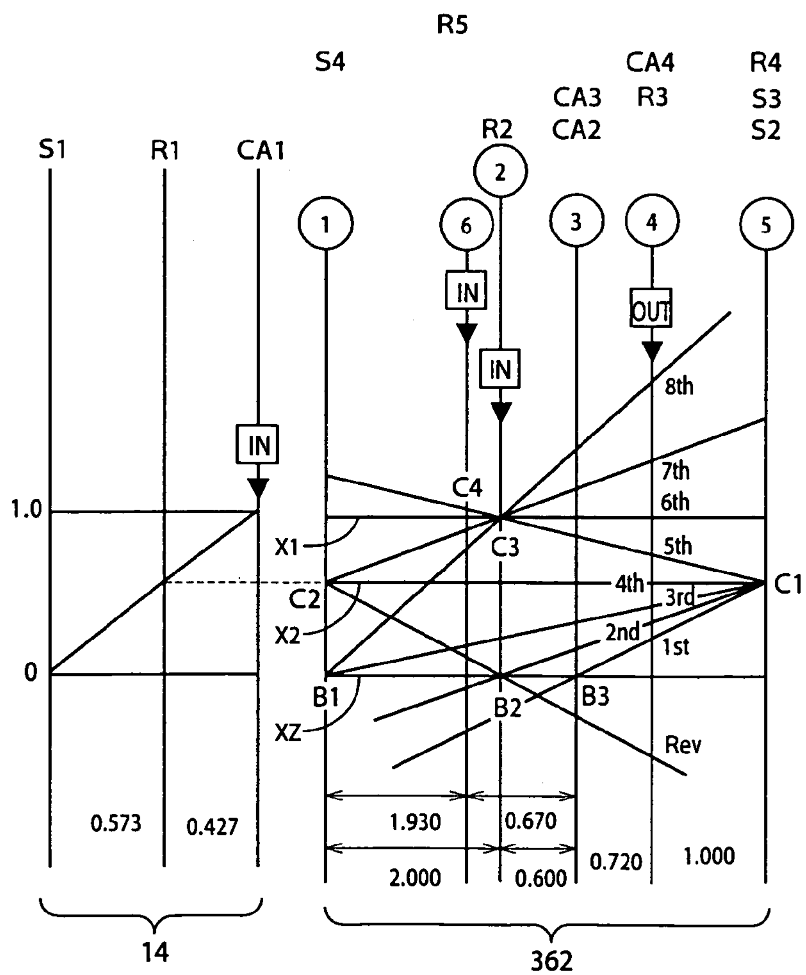
Figures 241, 242:
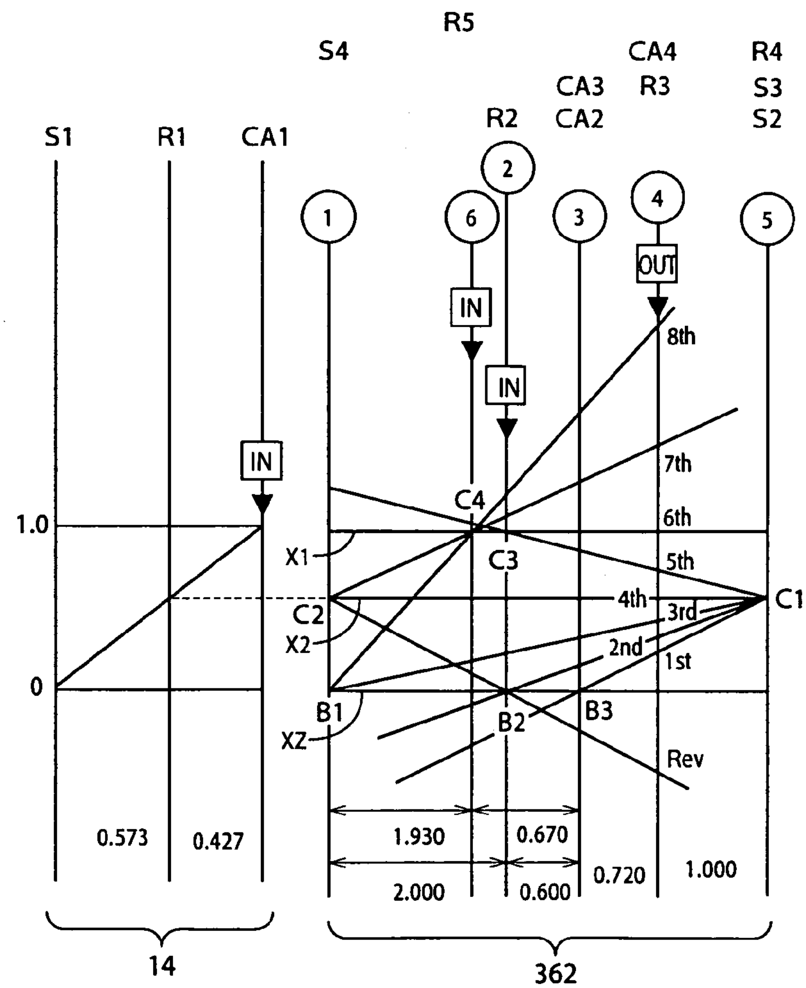
Figures 243A, 243B:
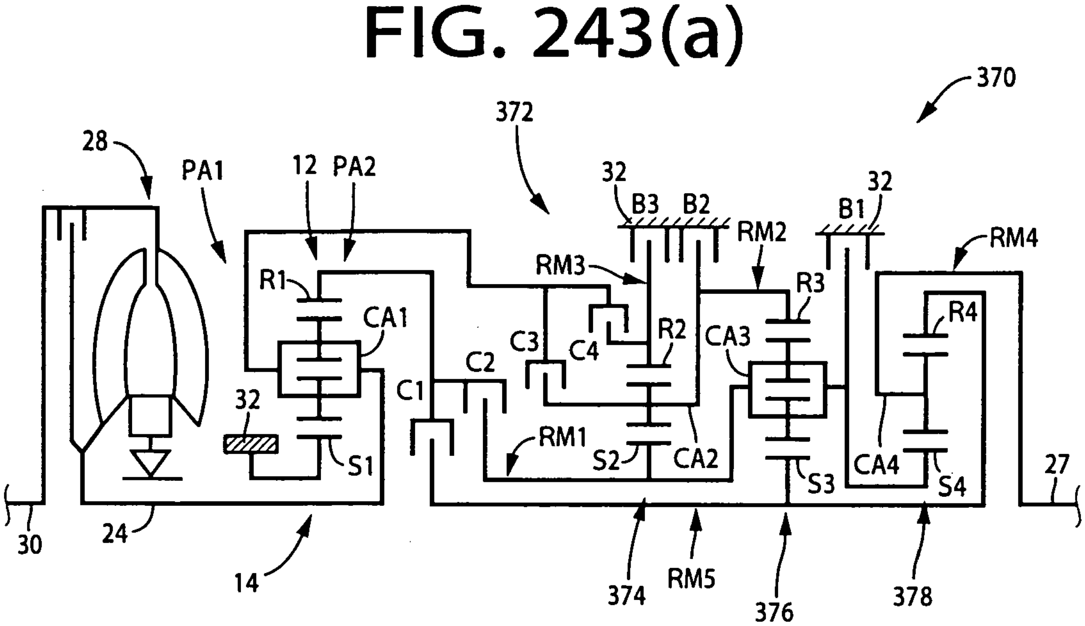
Figure 244:
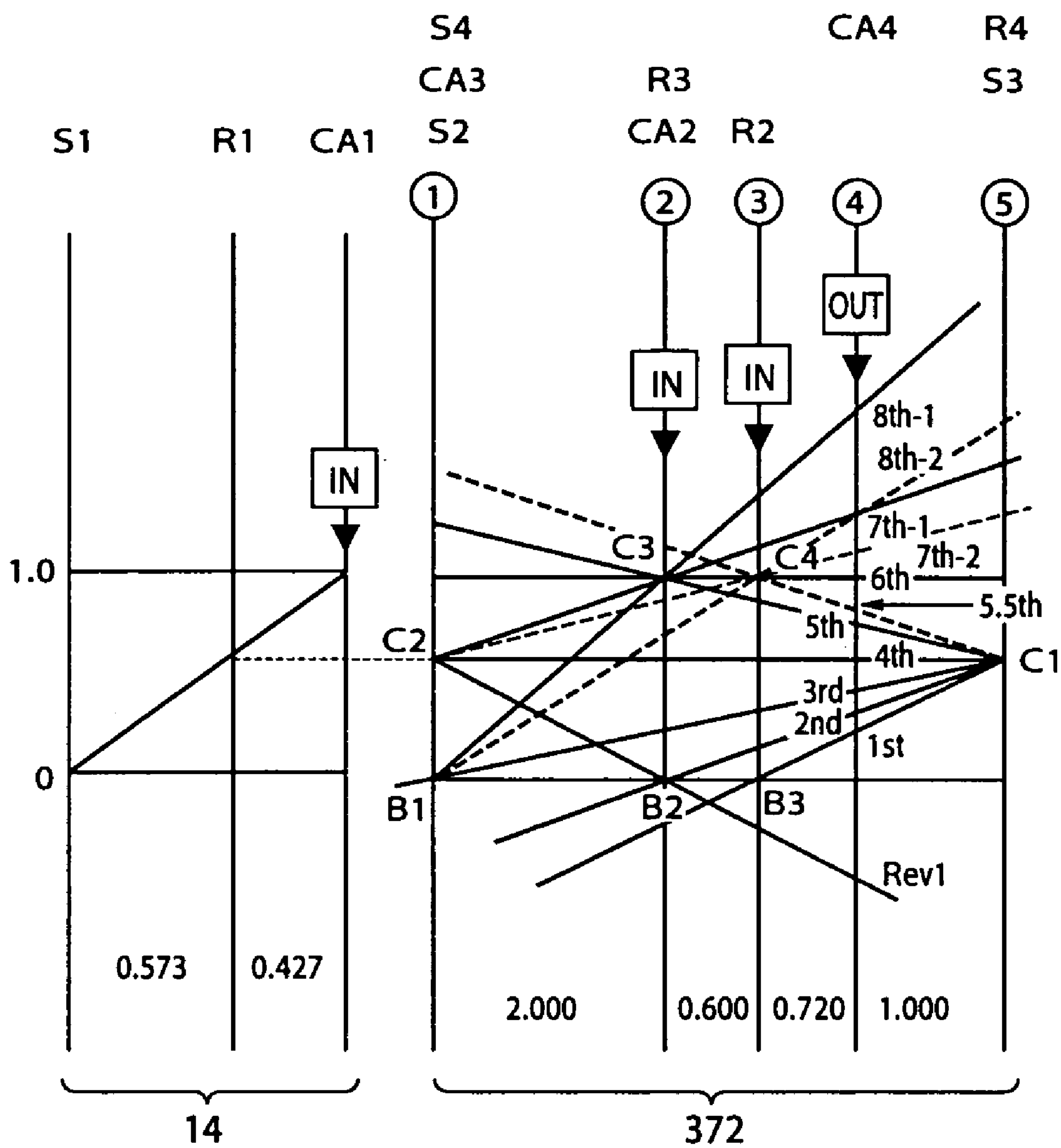
Figures 245A, 245B:
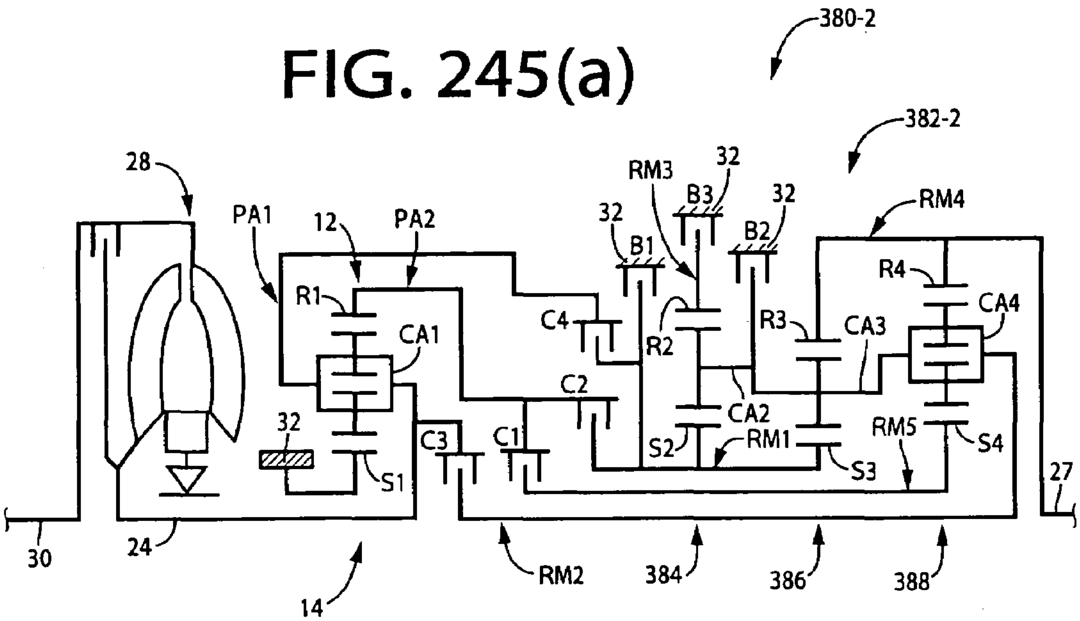
Figure 246:
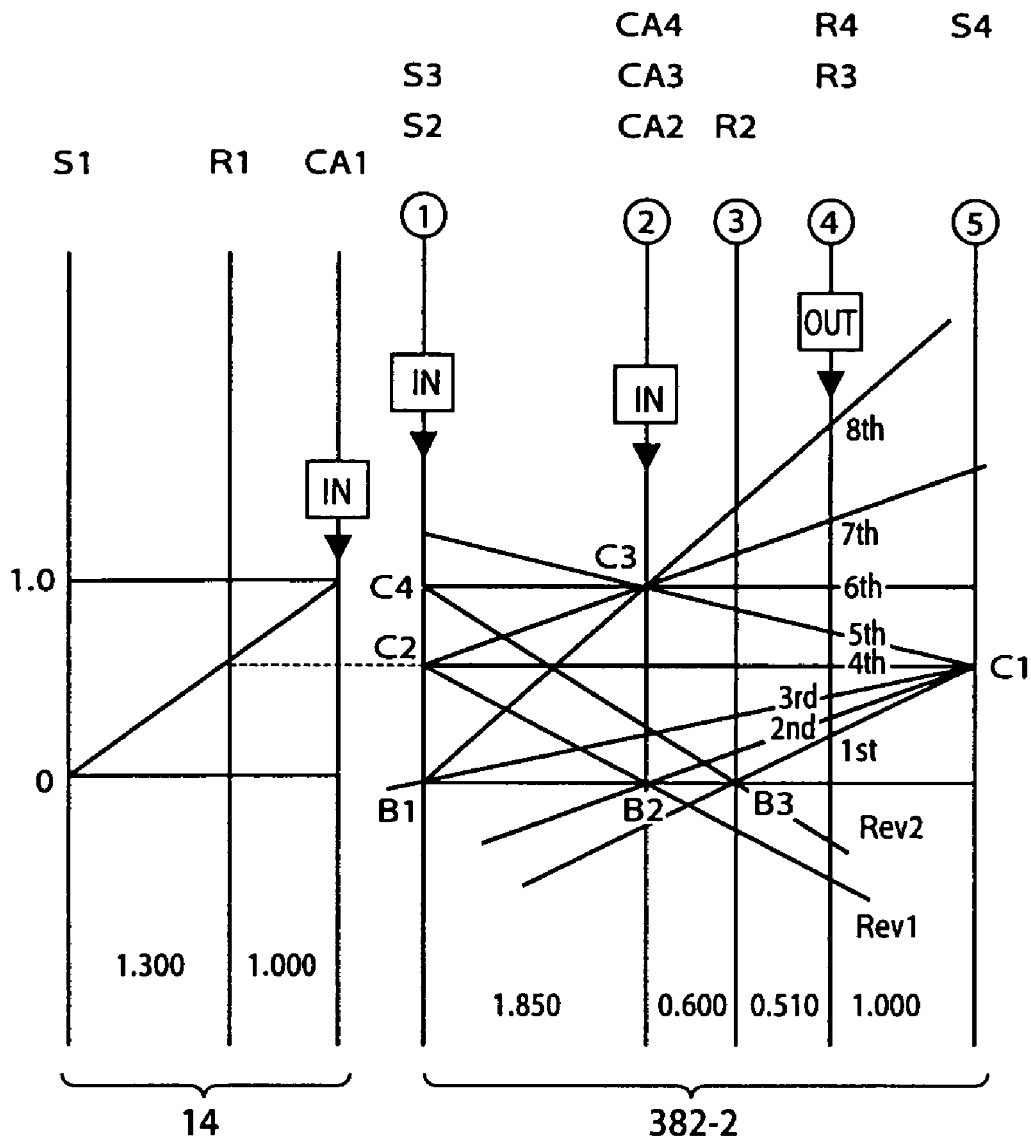
Figures 247A, 247B:
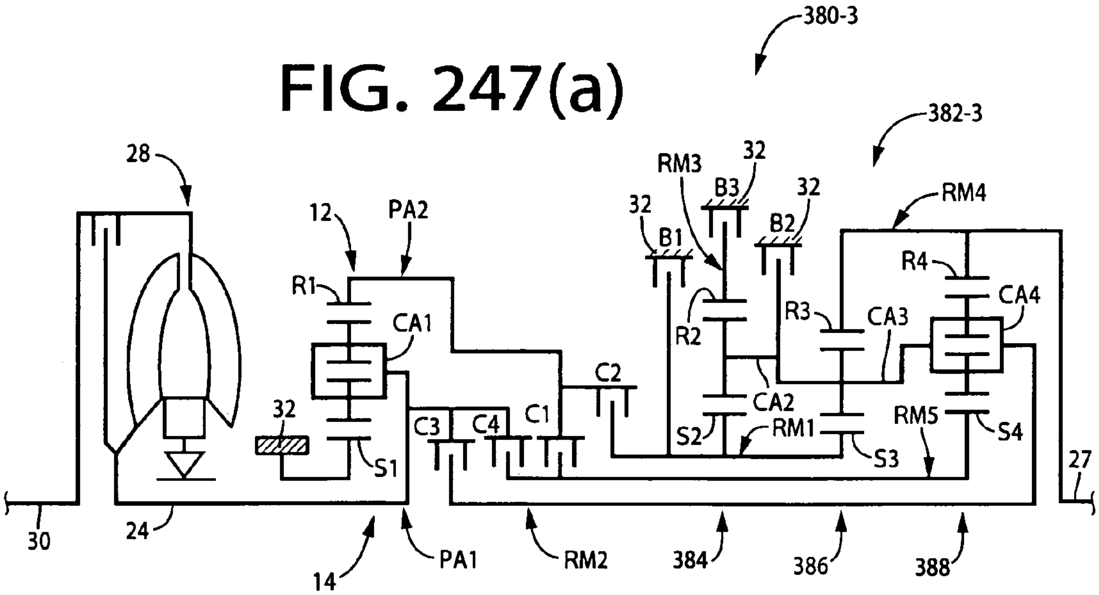
Figure 248:
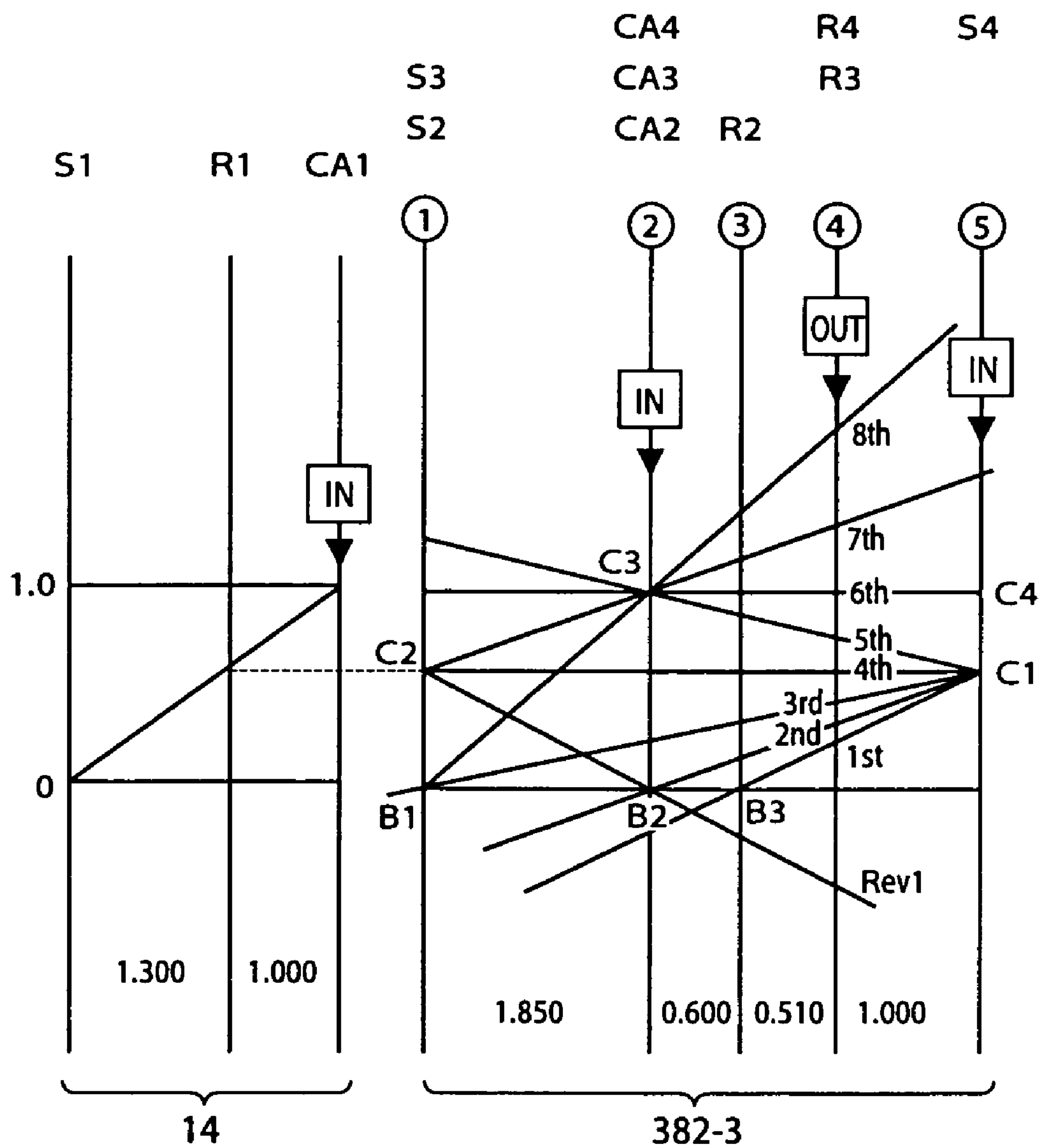
Figures 249A, 249B:
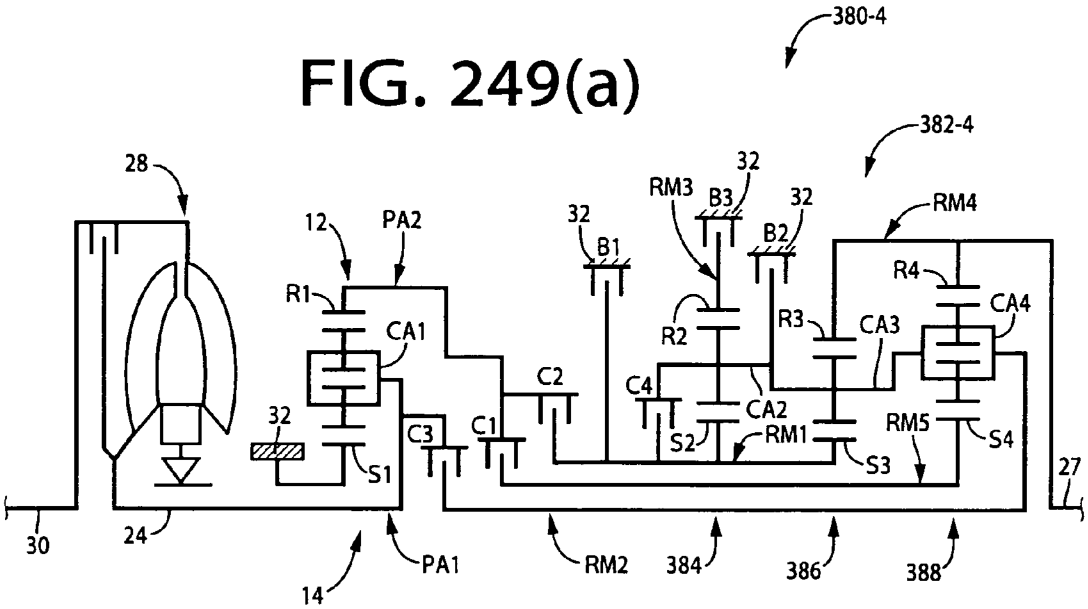
Figure 250:
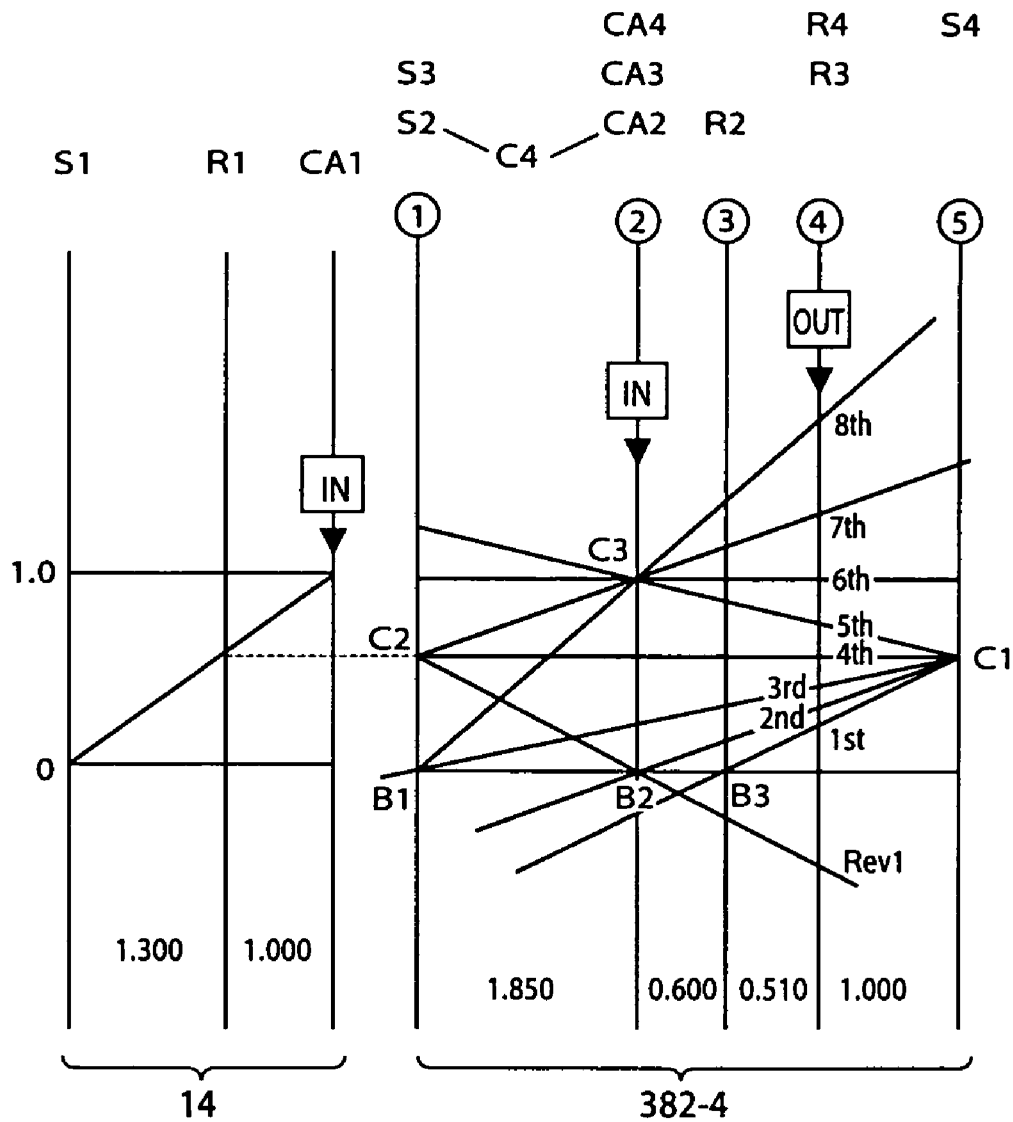
Figures 251A, 251B:
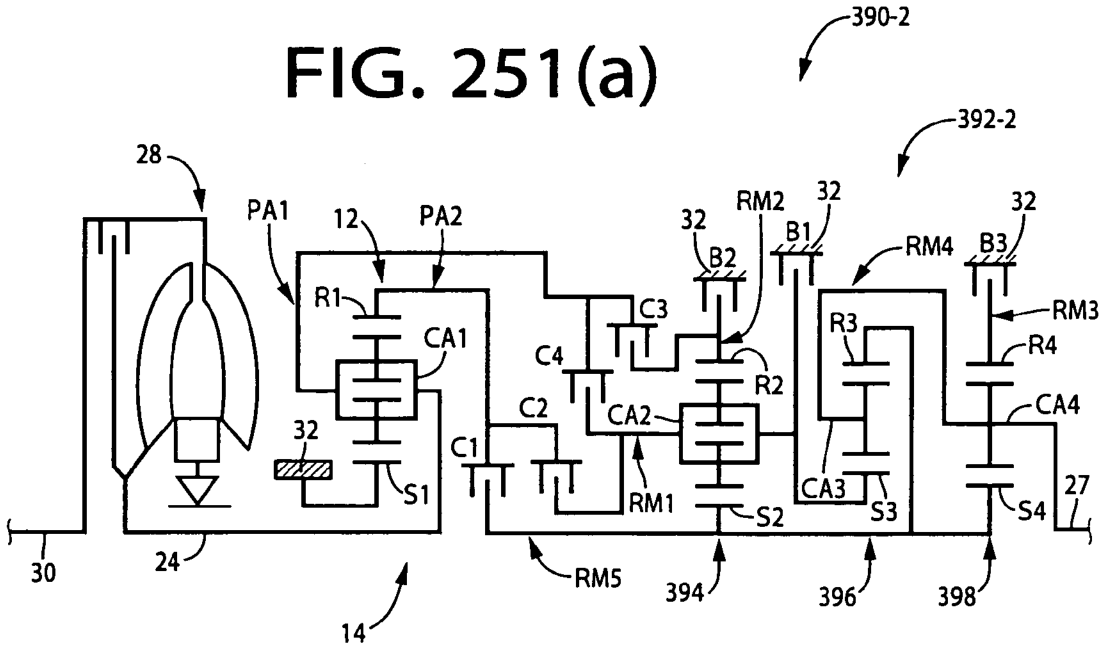
Figure 252:
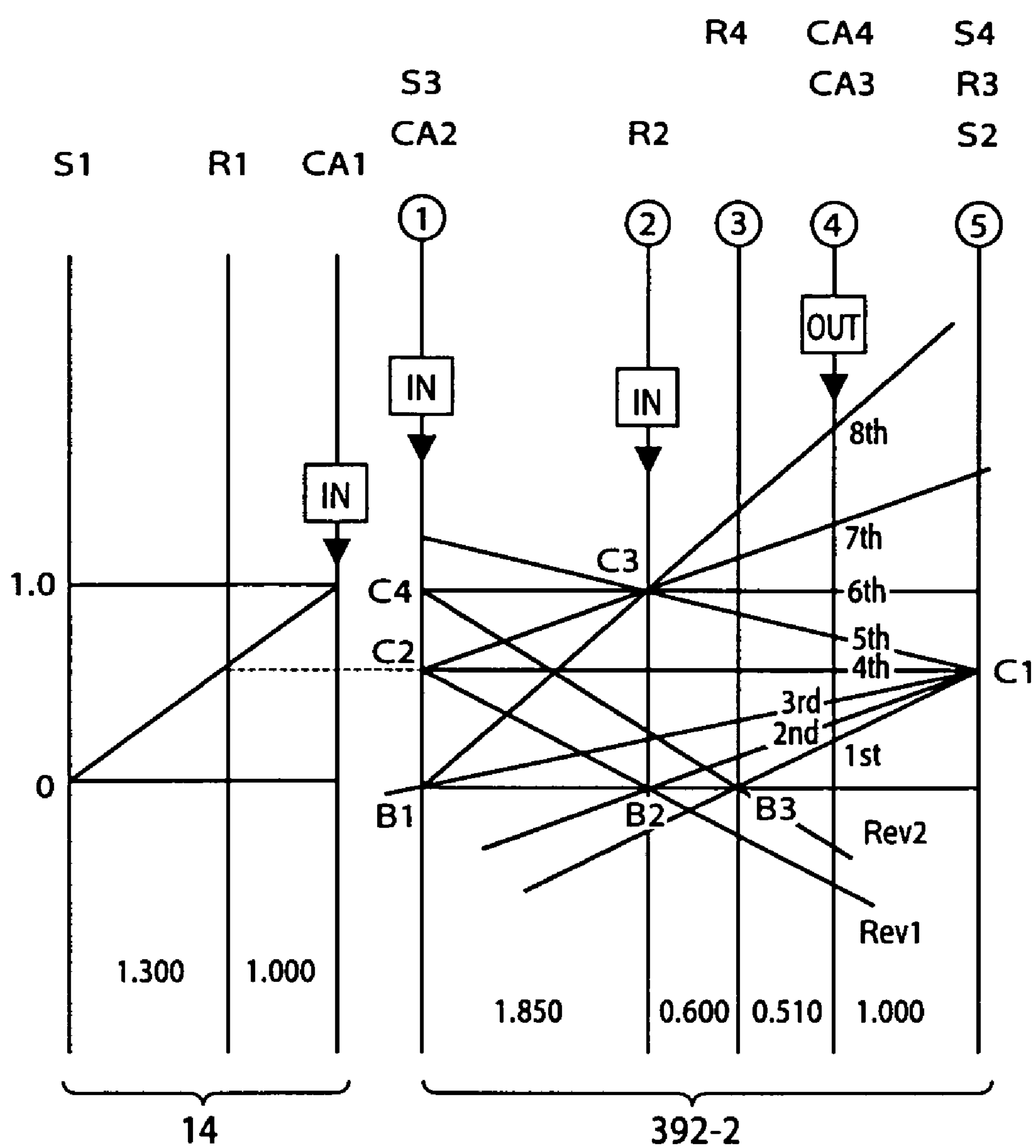
Figures 253A, 253B:
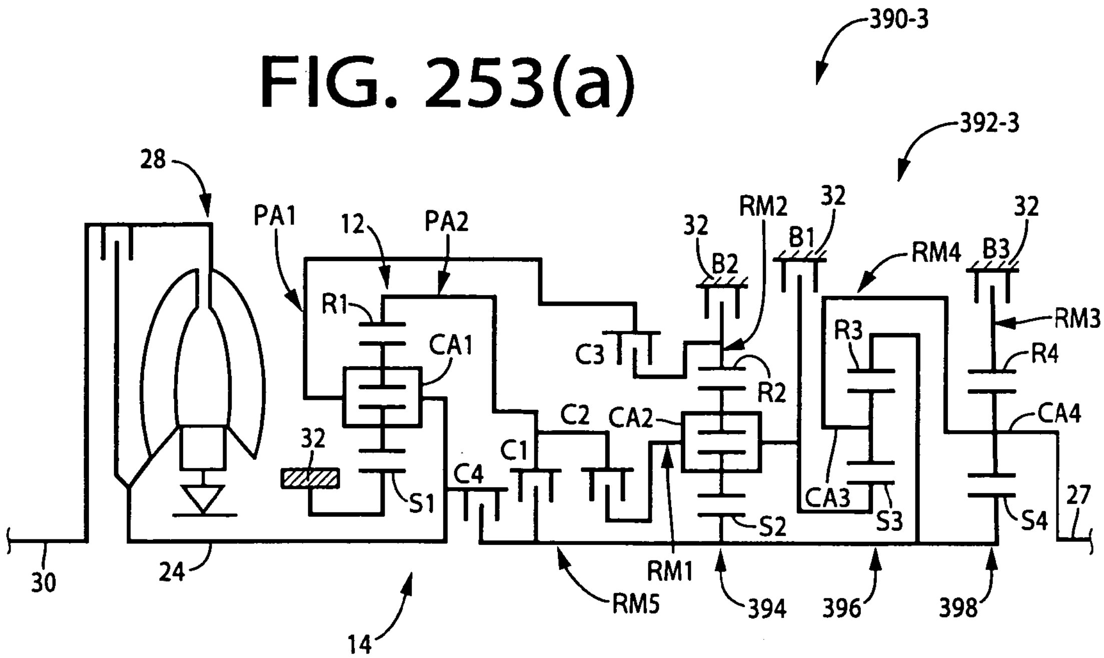
Figure 254:
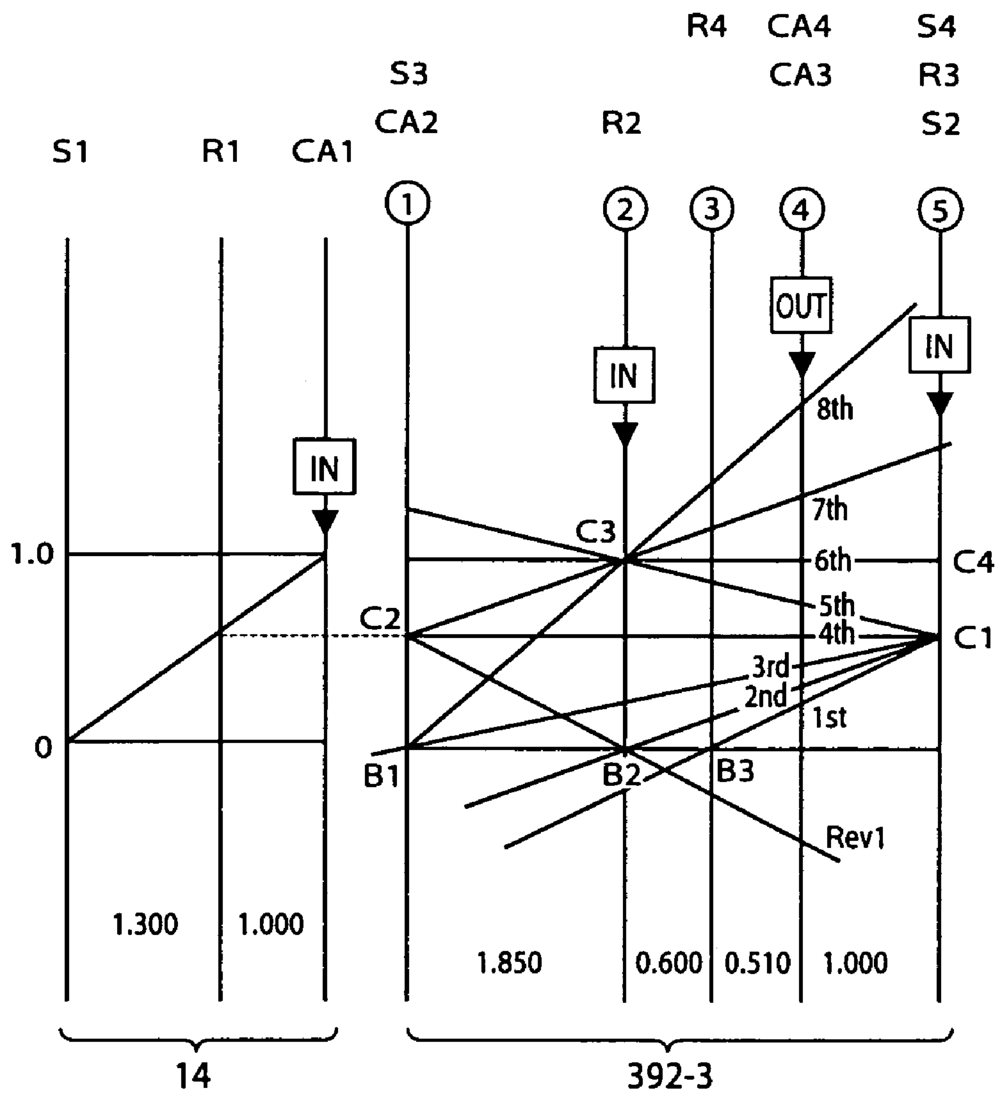
Figures 255A, 255B:
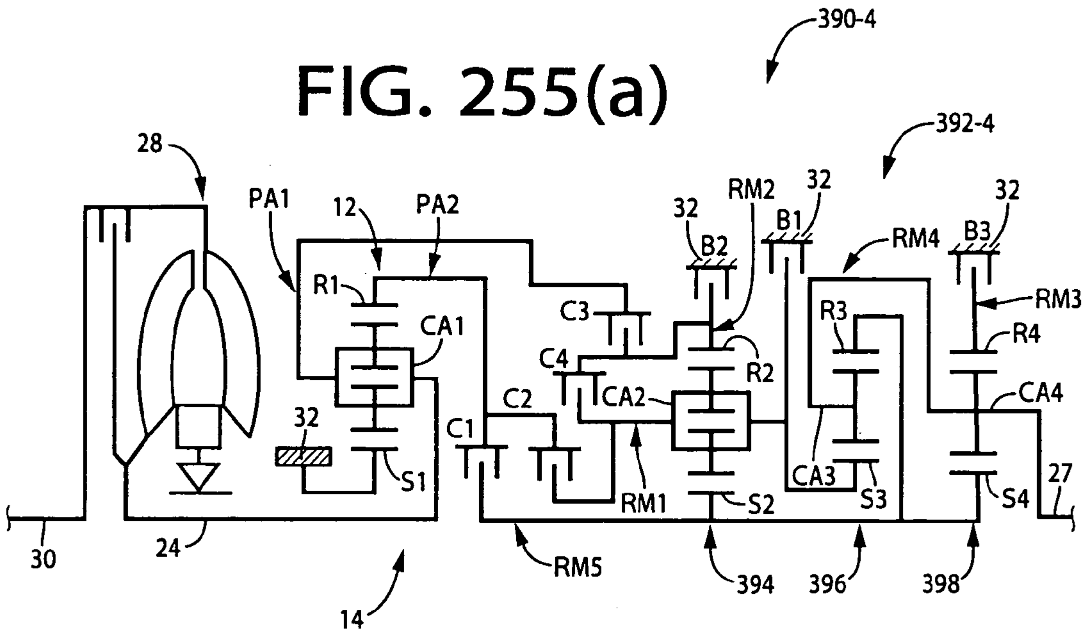
Figure 256:
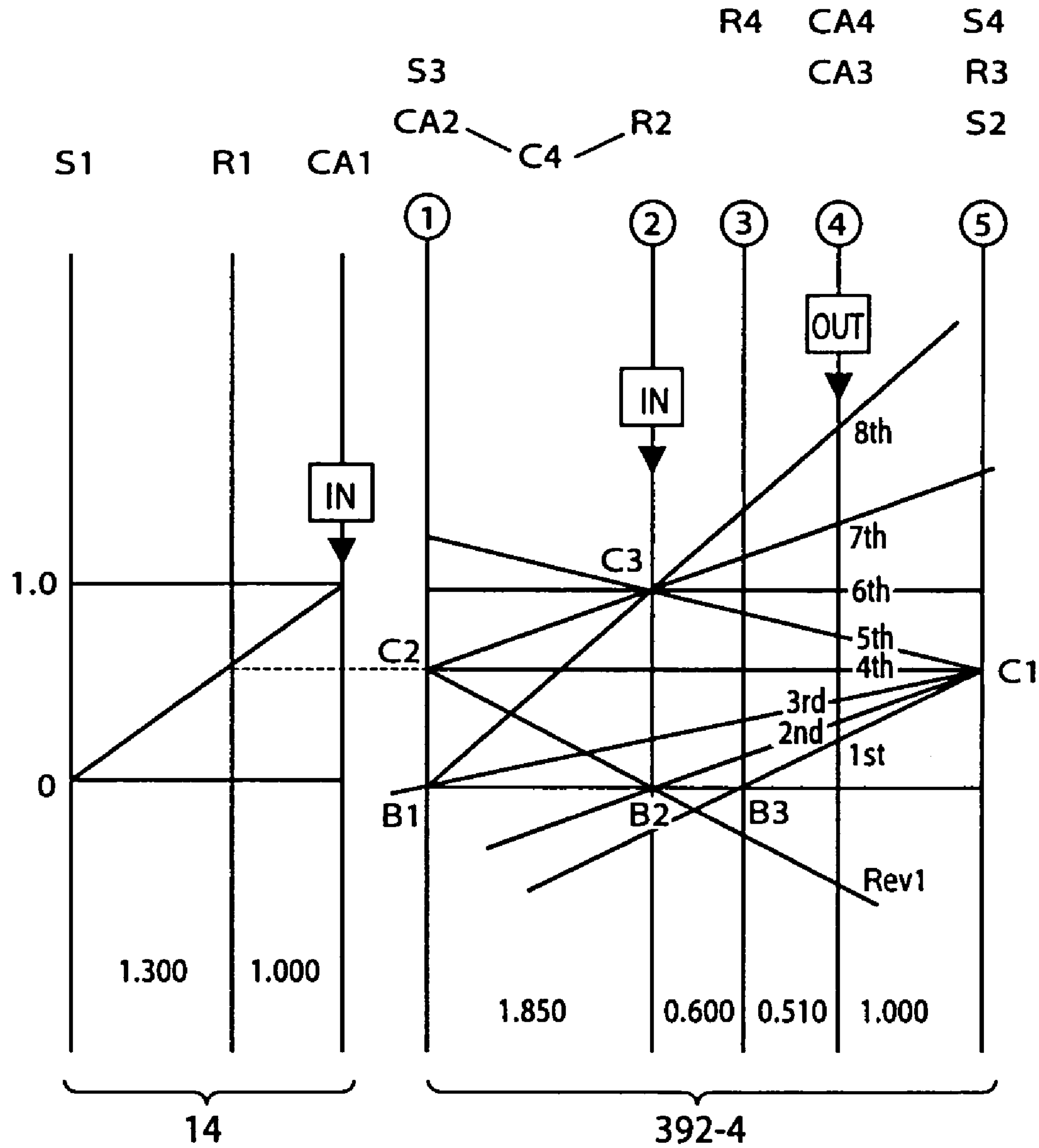
Figures 257A, 257B:
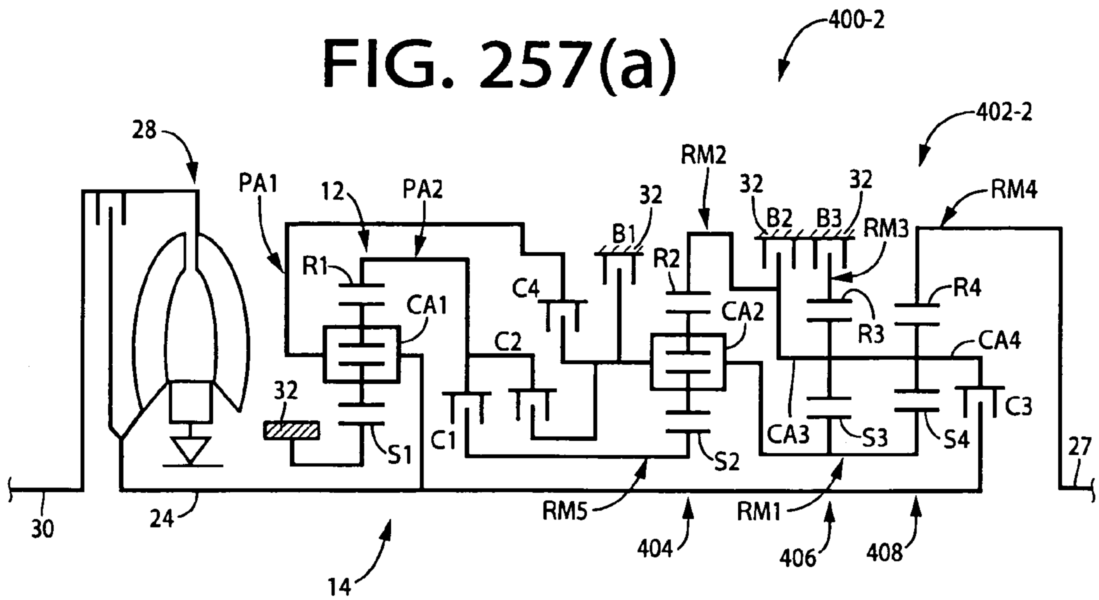
Figure 258:
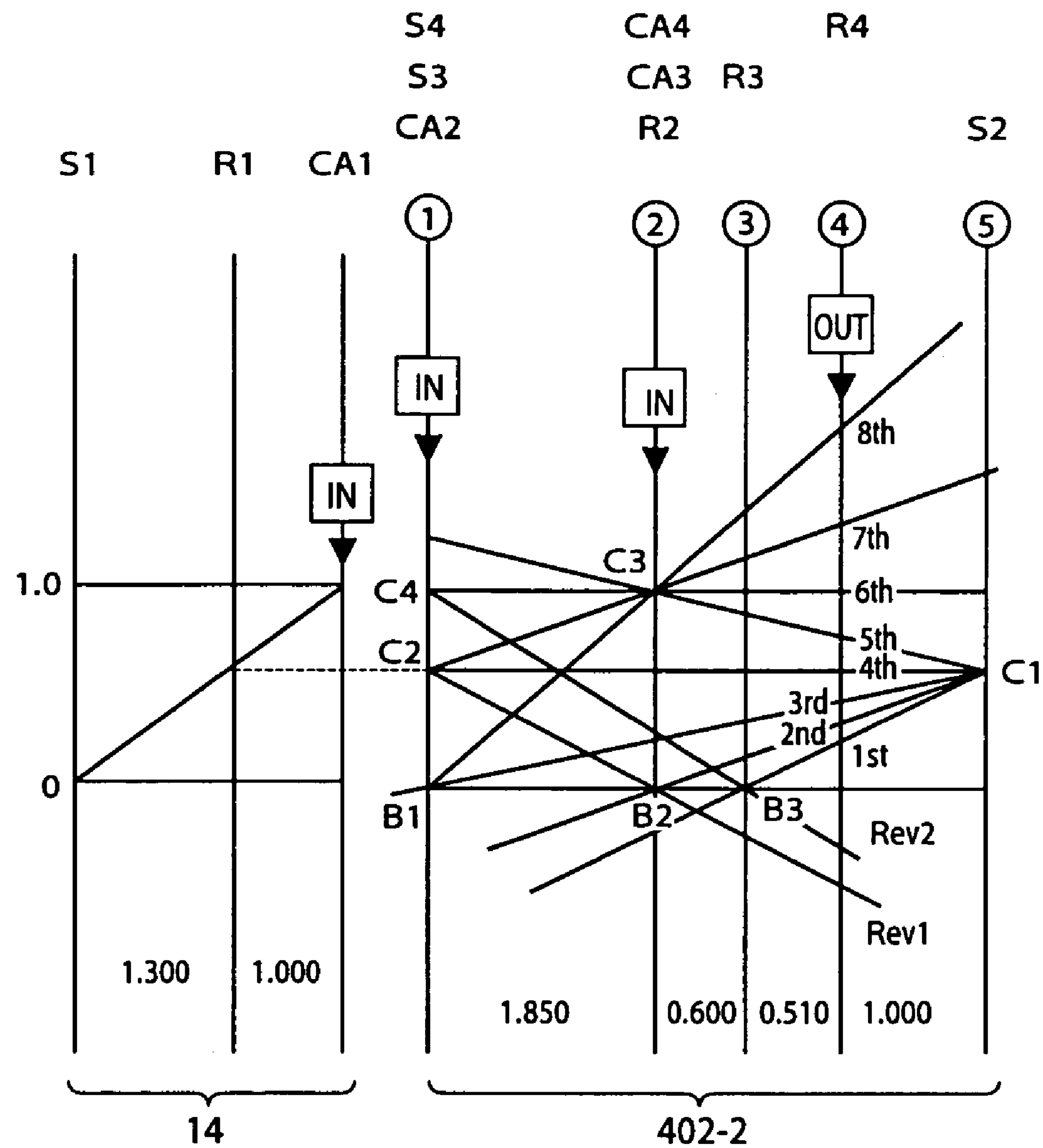
Figures 259A, 259B:
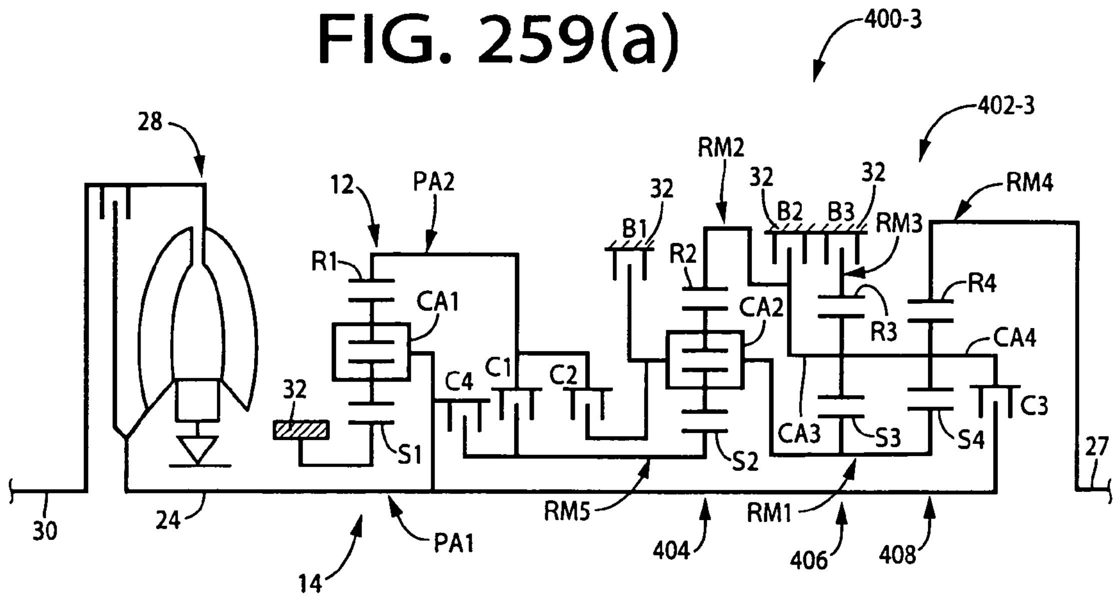
Figure 260:
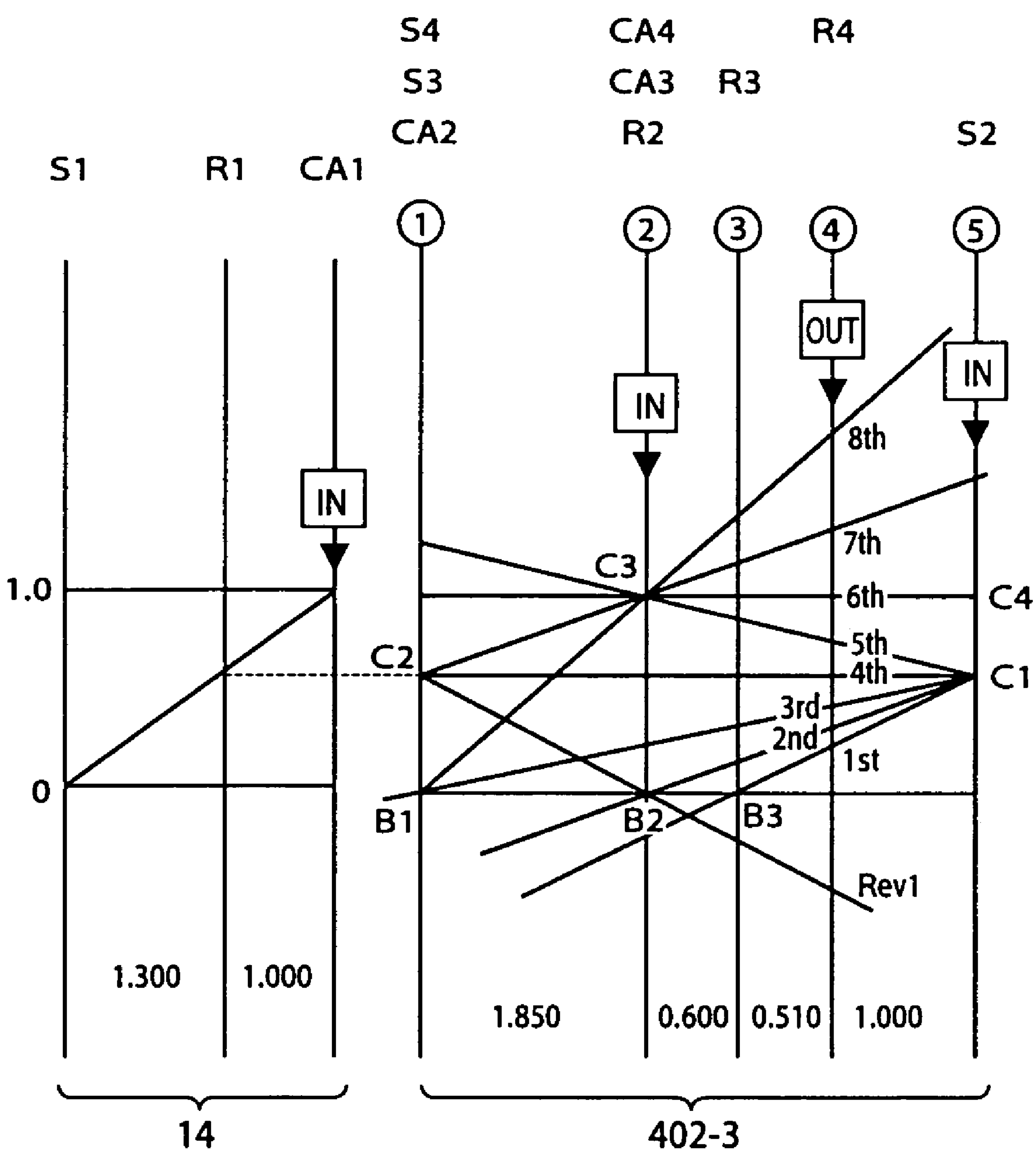
Figures 261A, 261B:
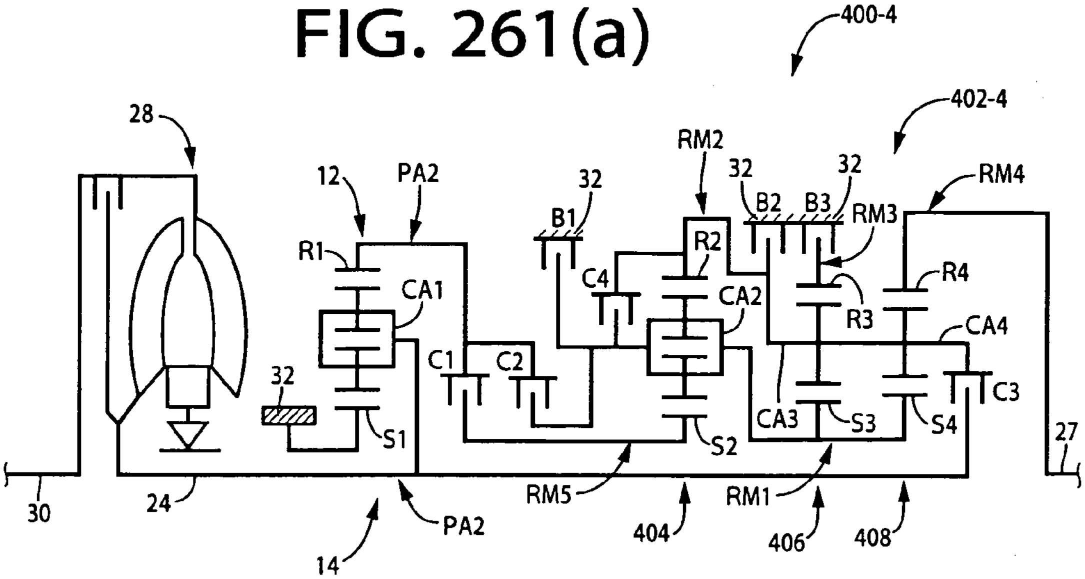
Figure 262:
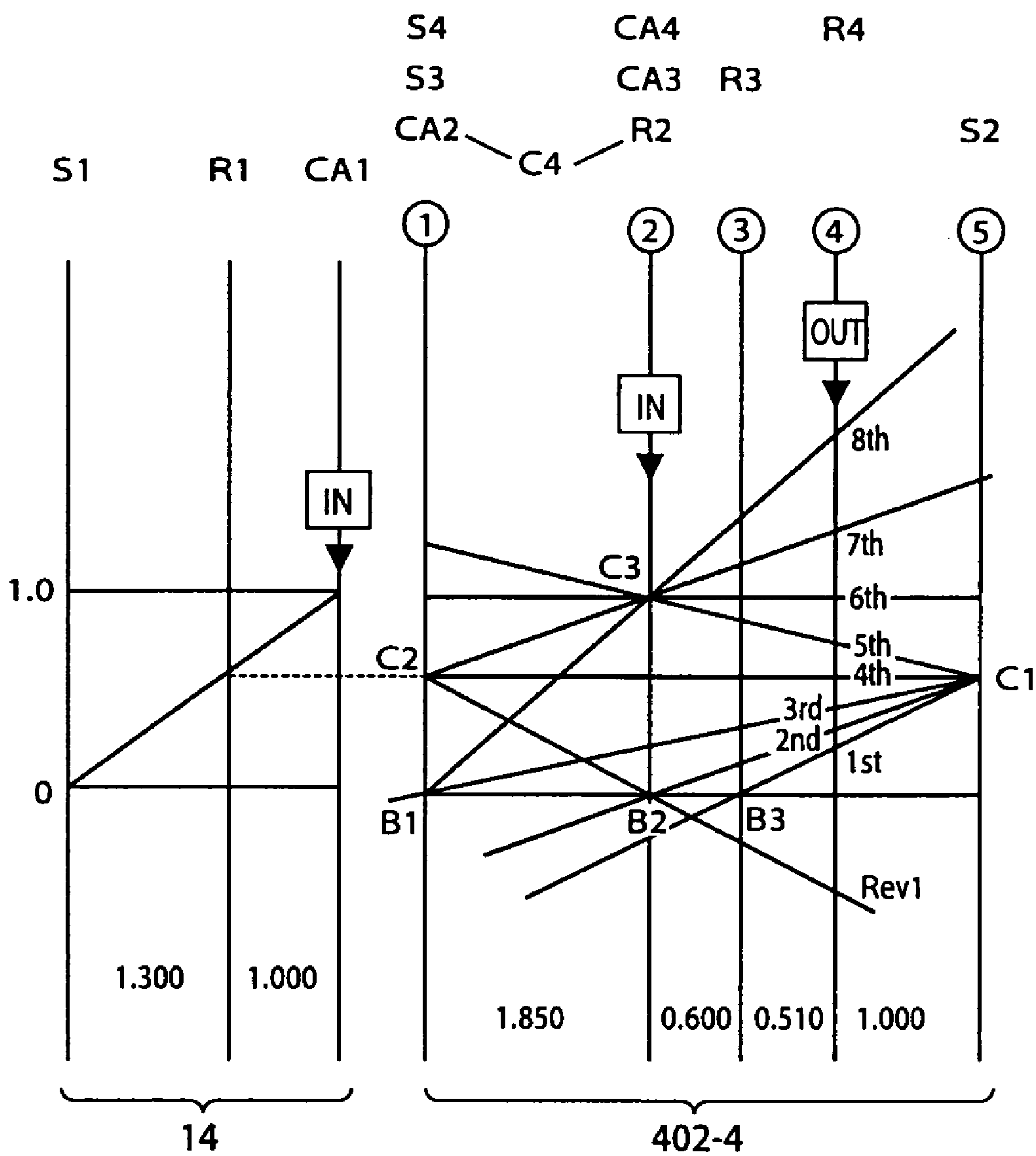
Figures 263A, 263B:
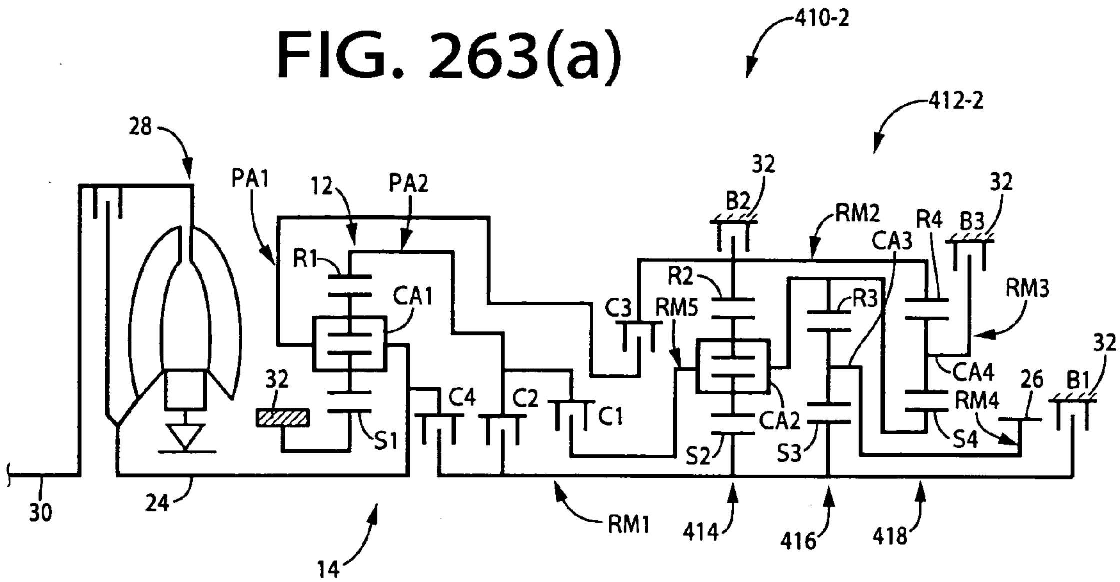
Figure 264:
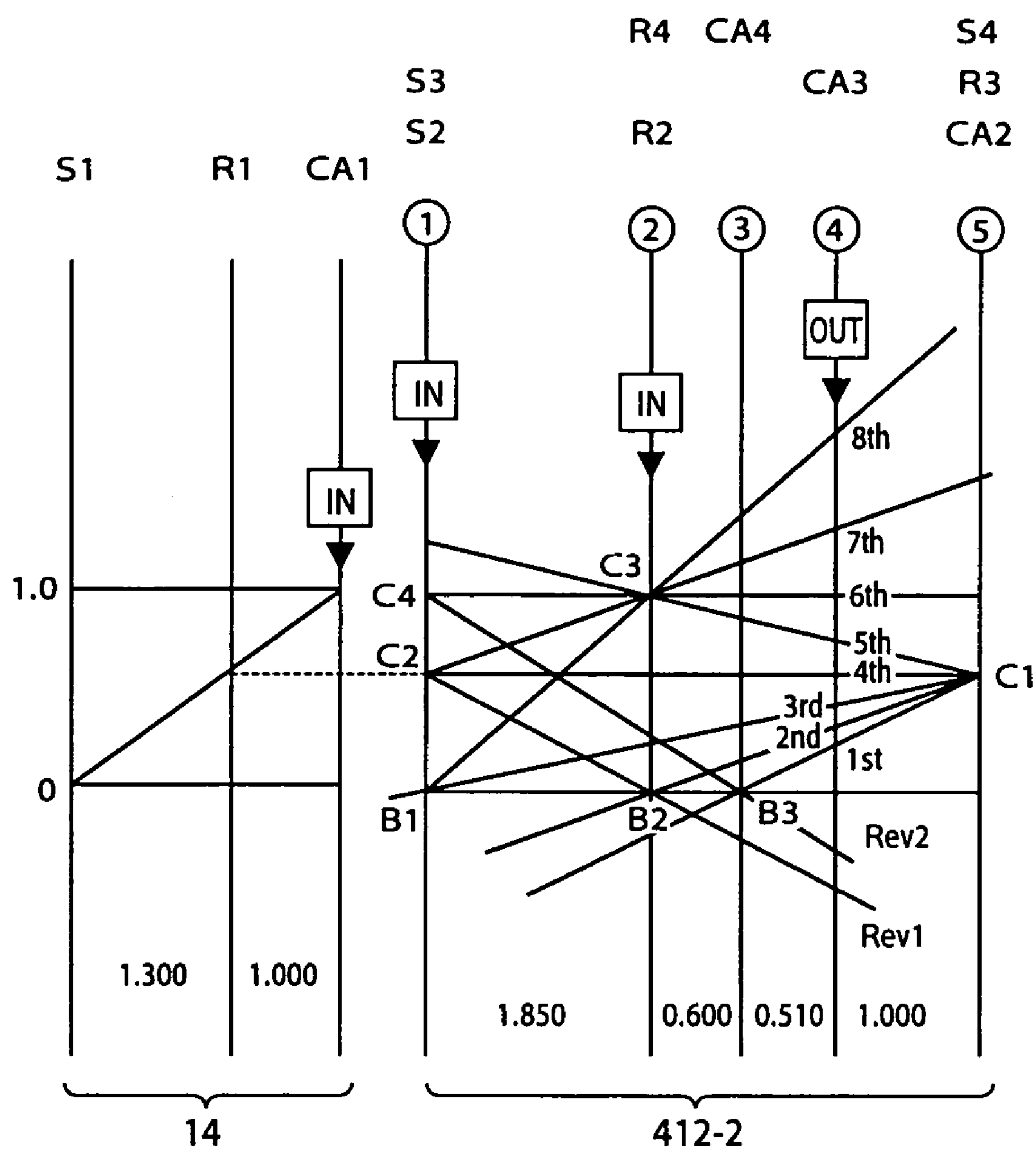
Figures 265A, 265B:
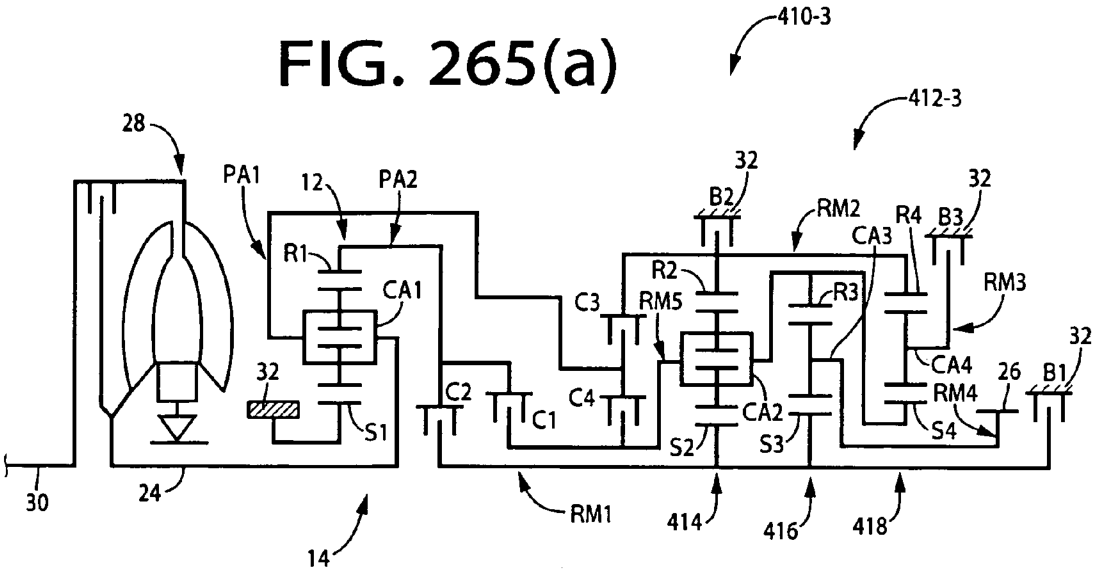
Figure 266:
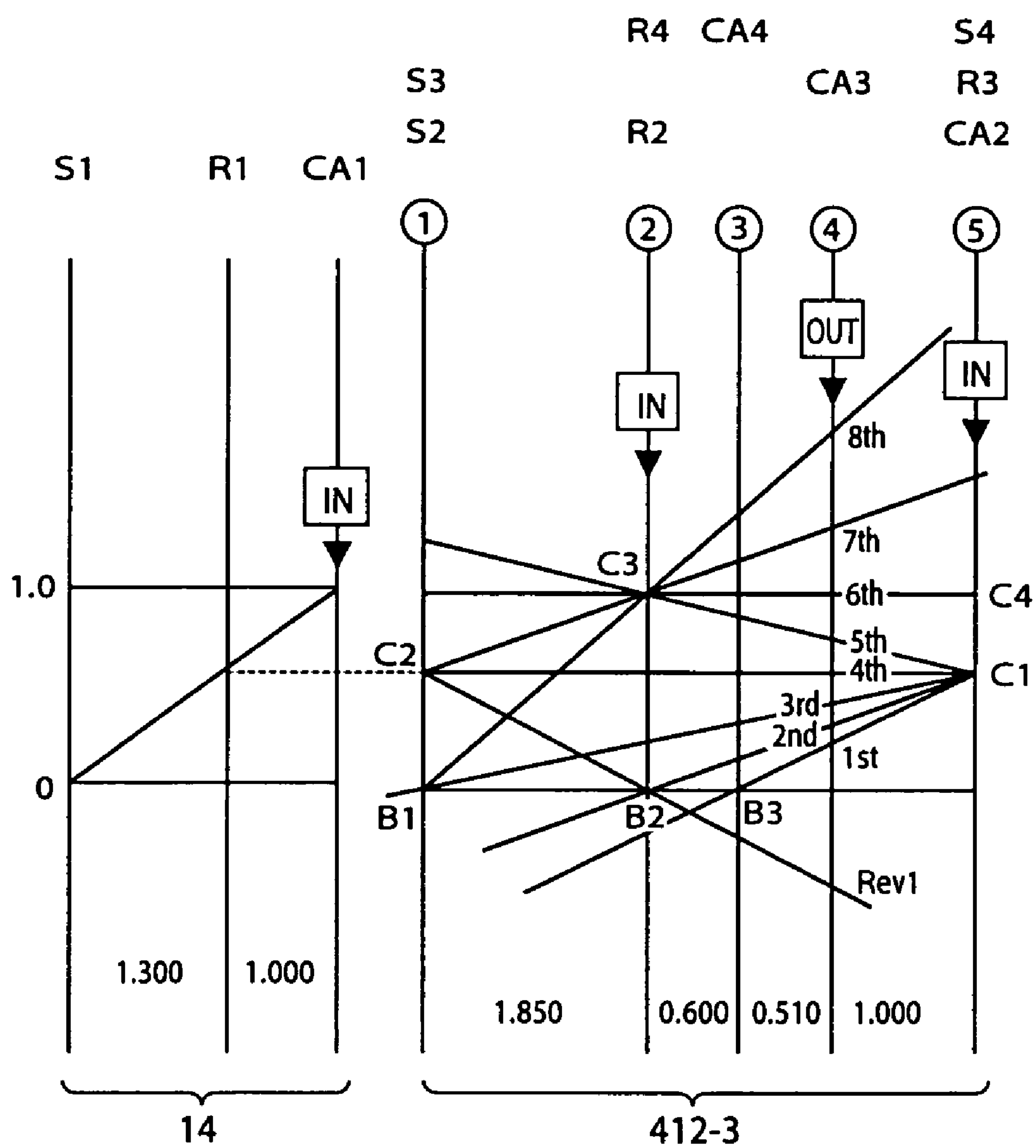
Figures 267A, 267B:
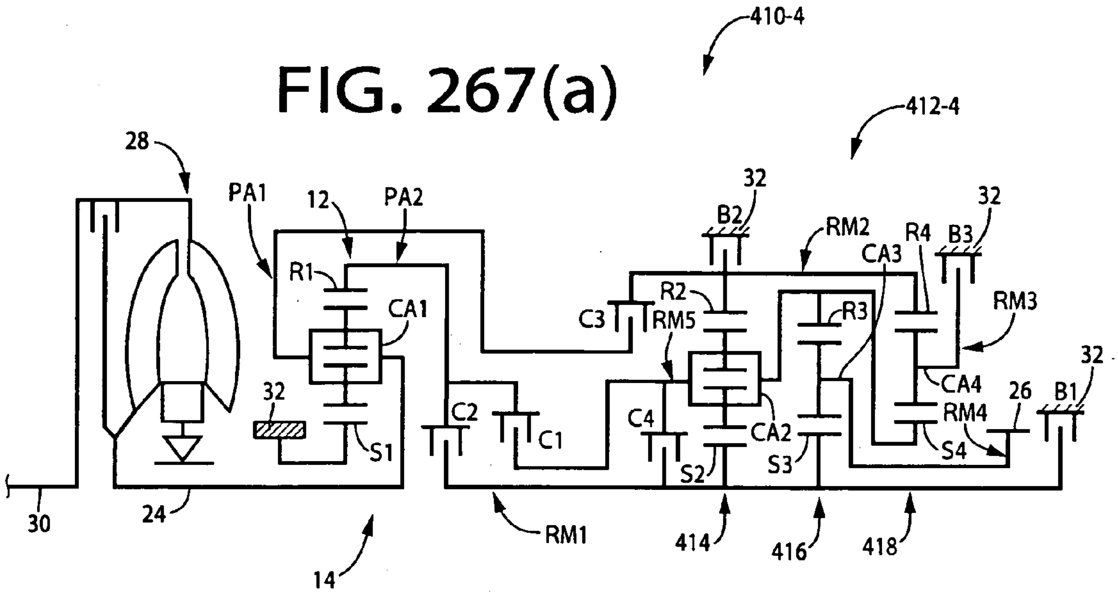
Figure 268:
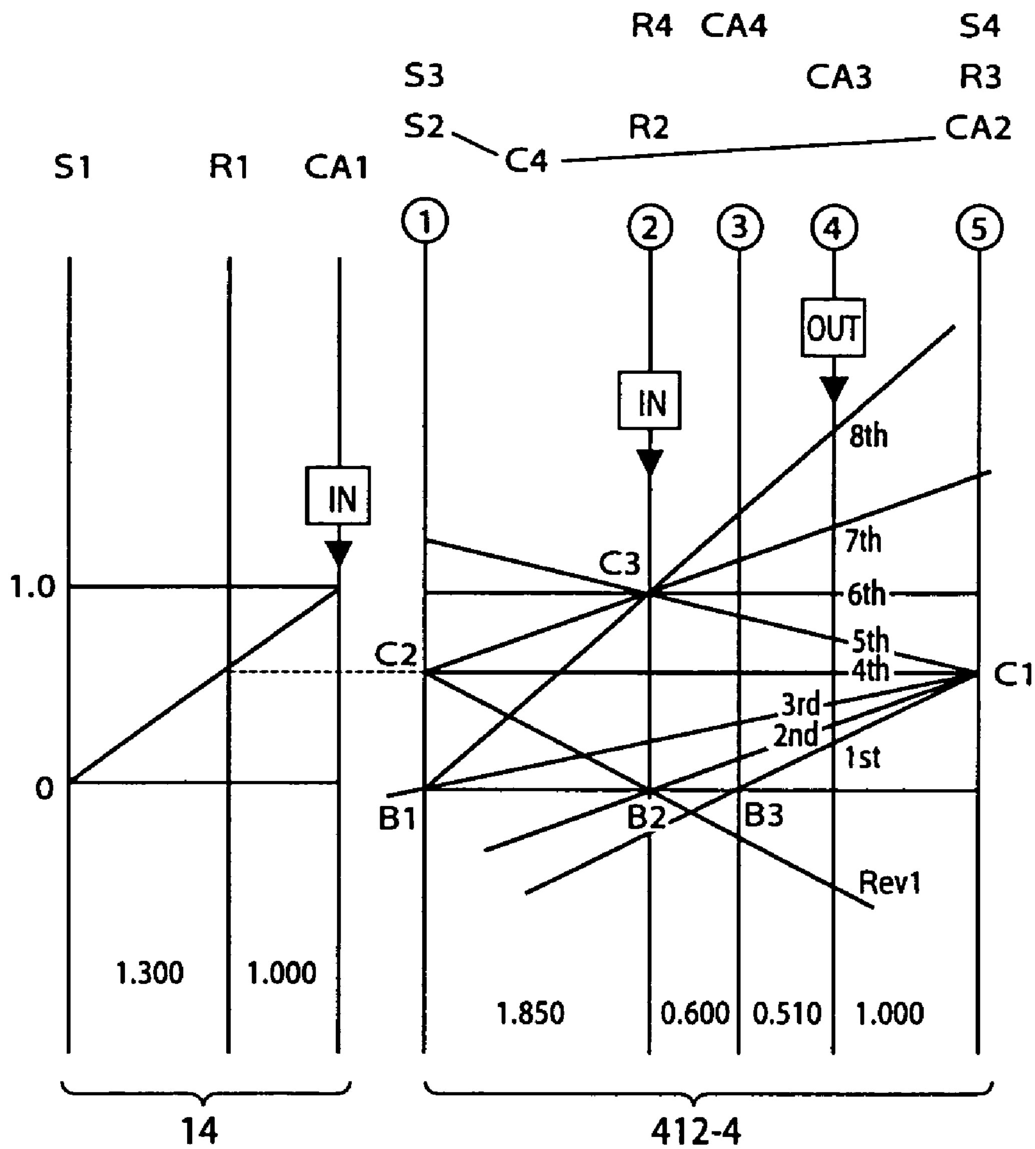
Figures 269A, 269B:
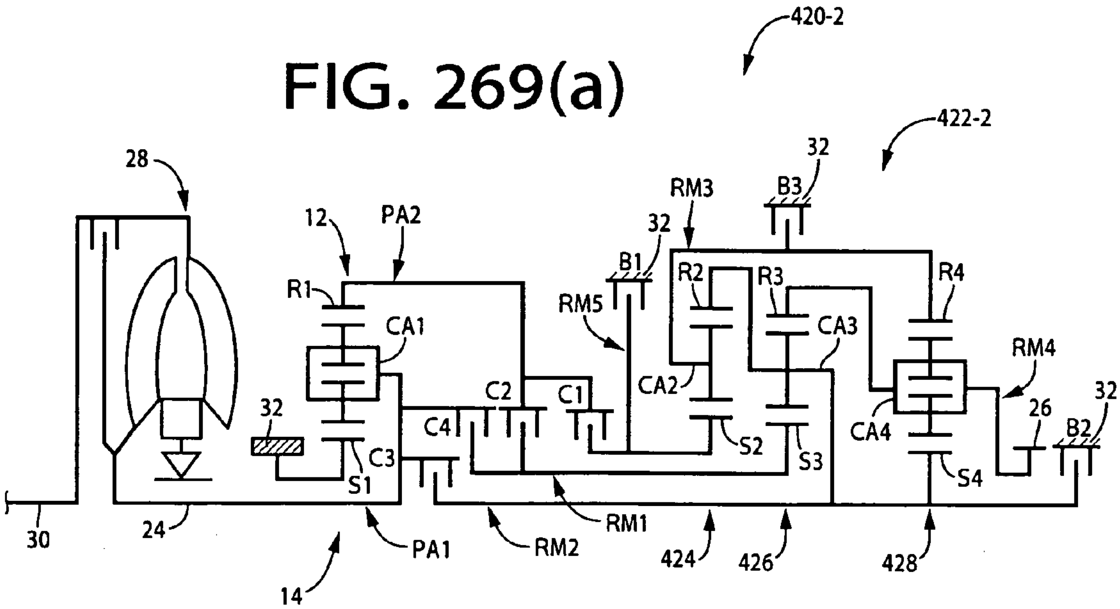
Figure 270:
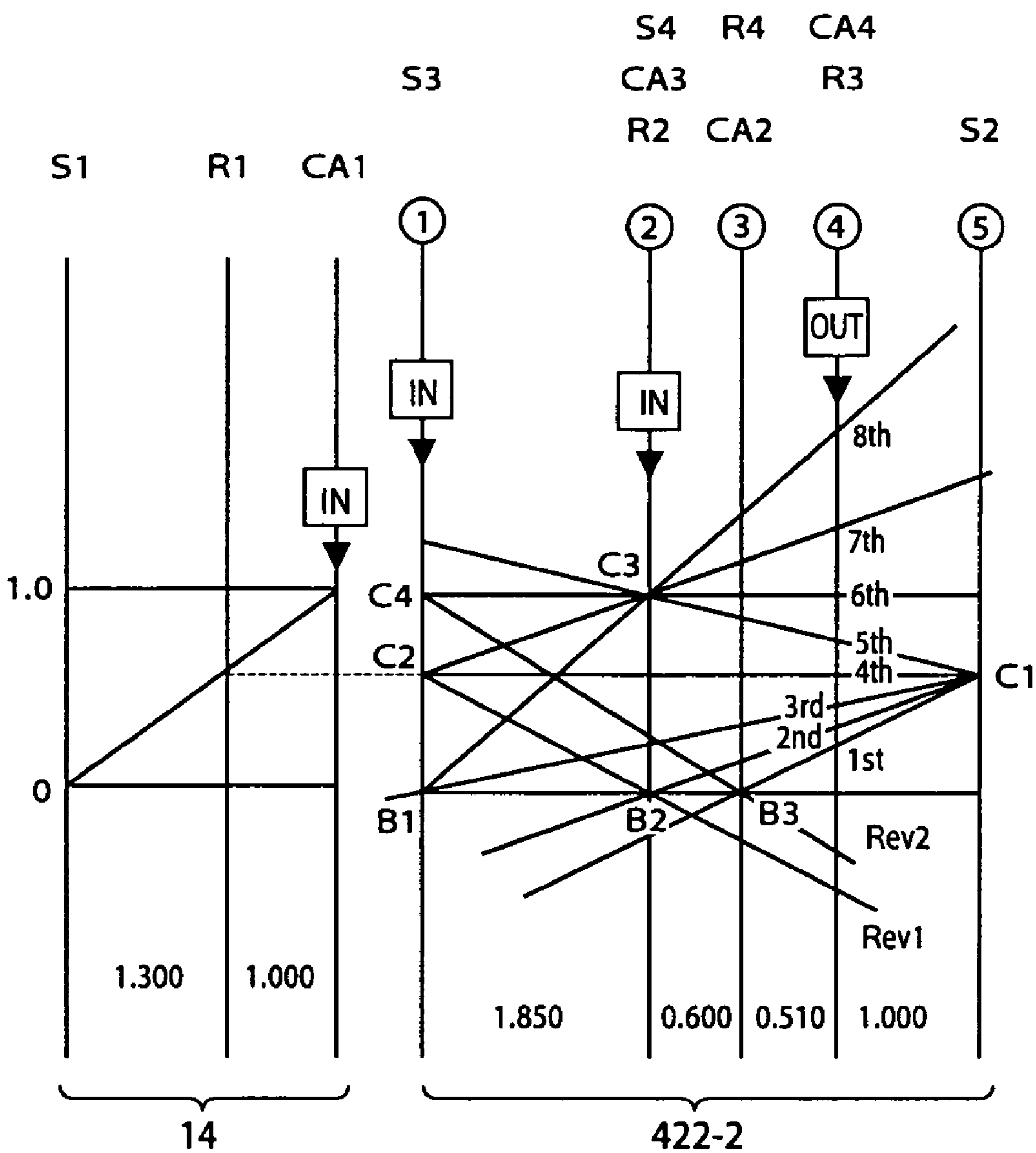
Figures 271A, 271B:
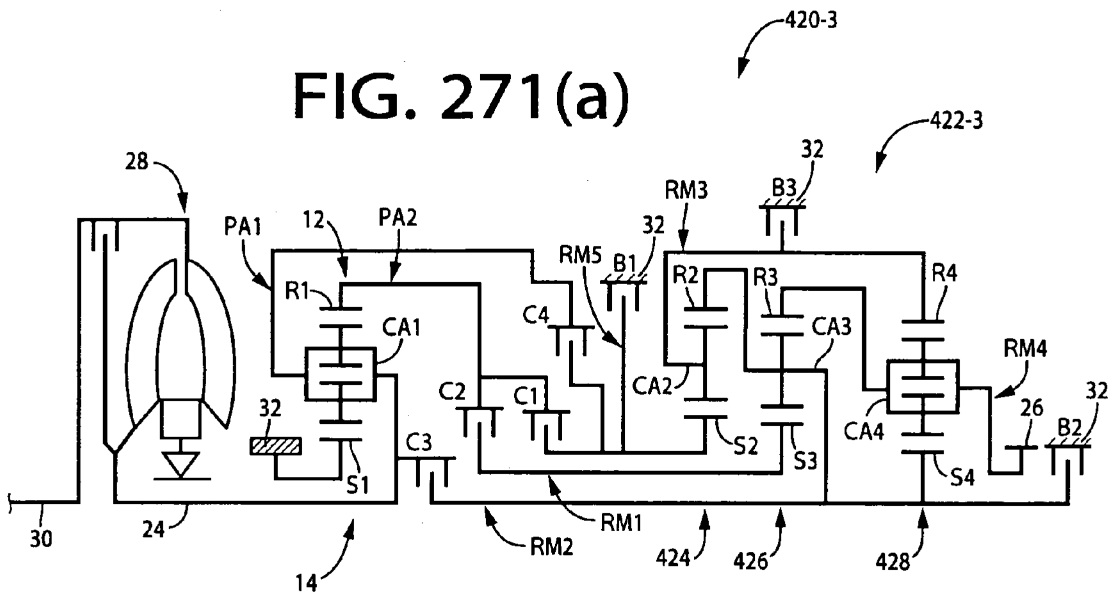
Figure 272:
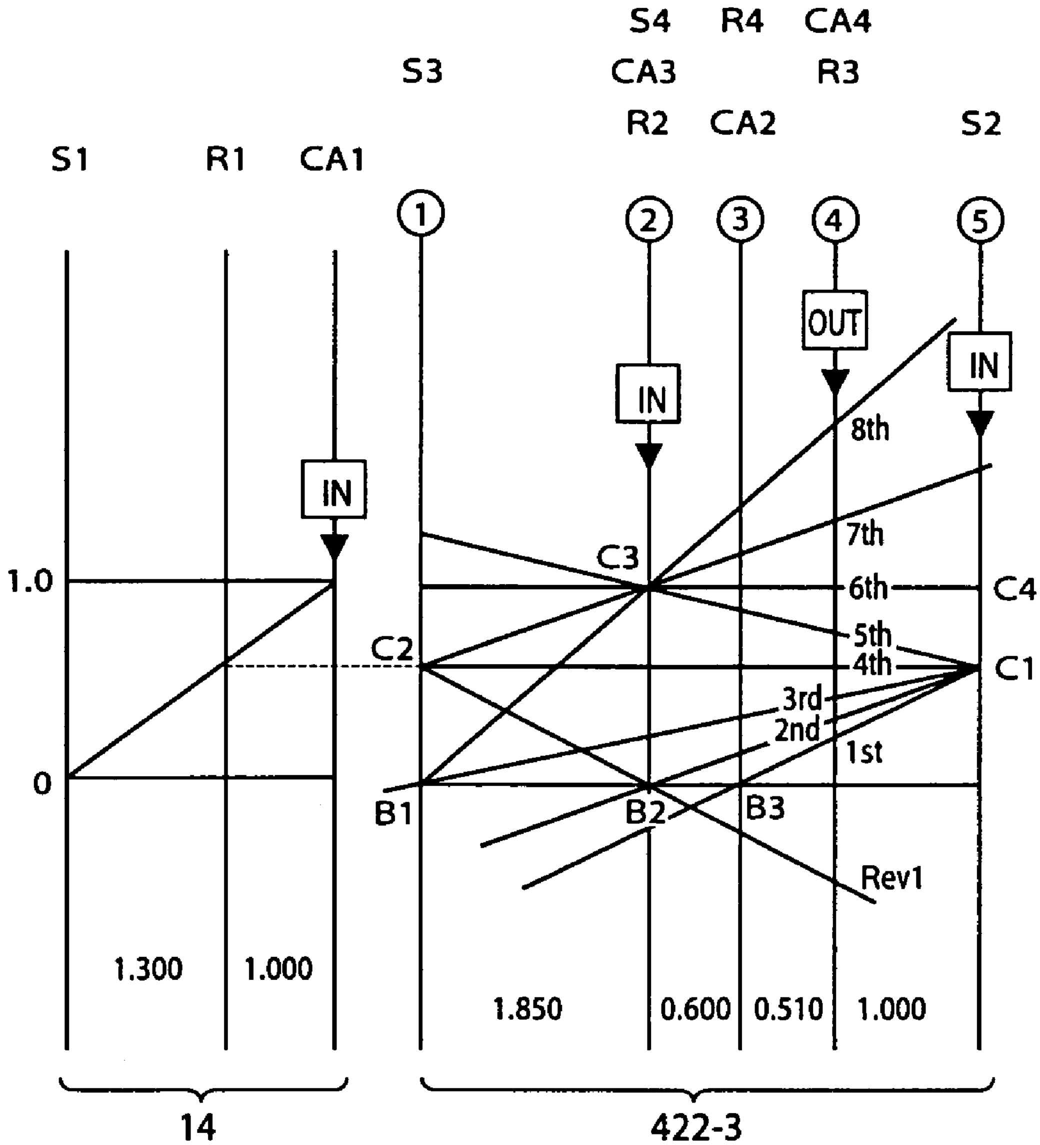
Figures 273A, 273B:
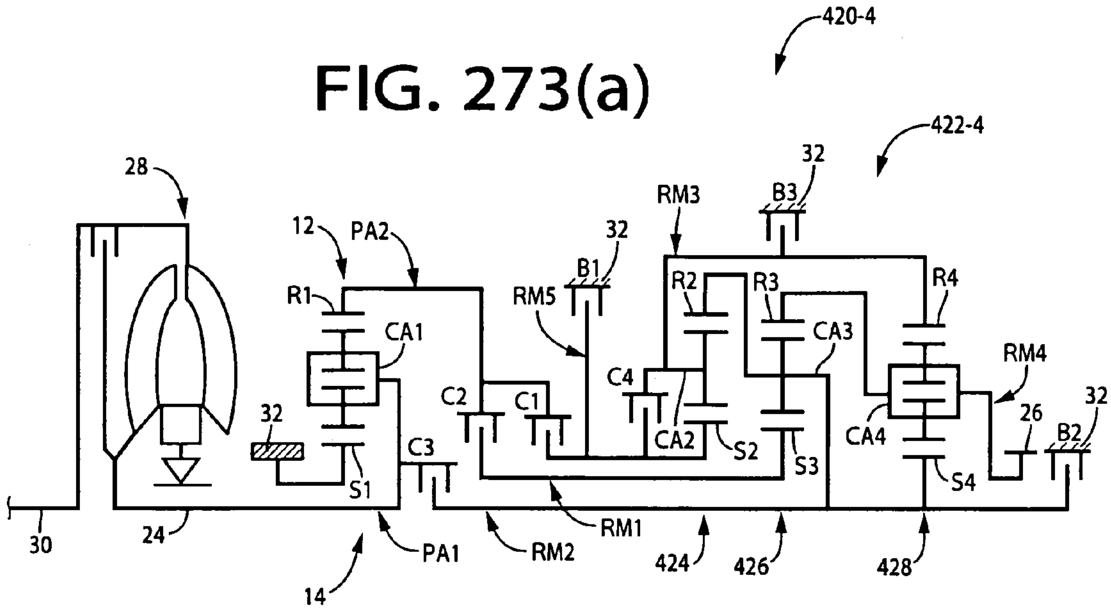
Figure 274:
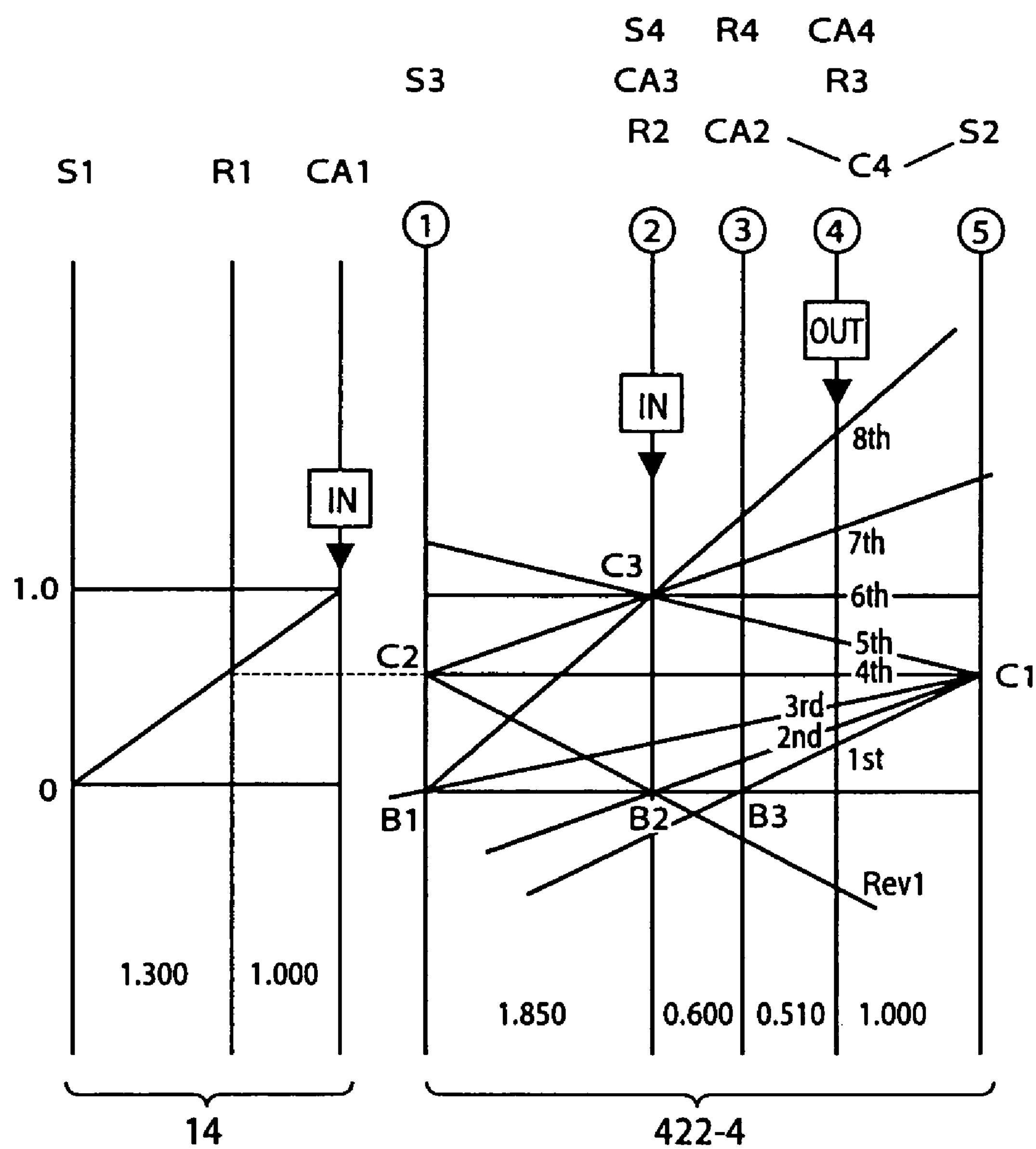
Figures 275A, 275B:
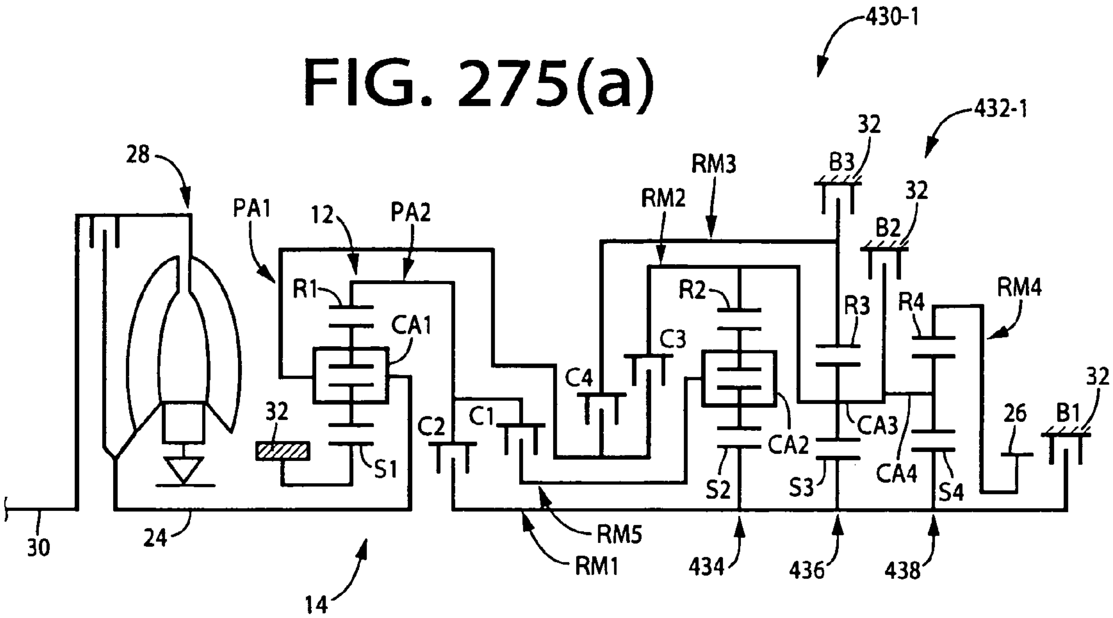
Figure 276:
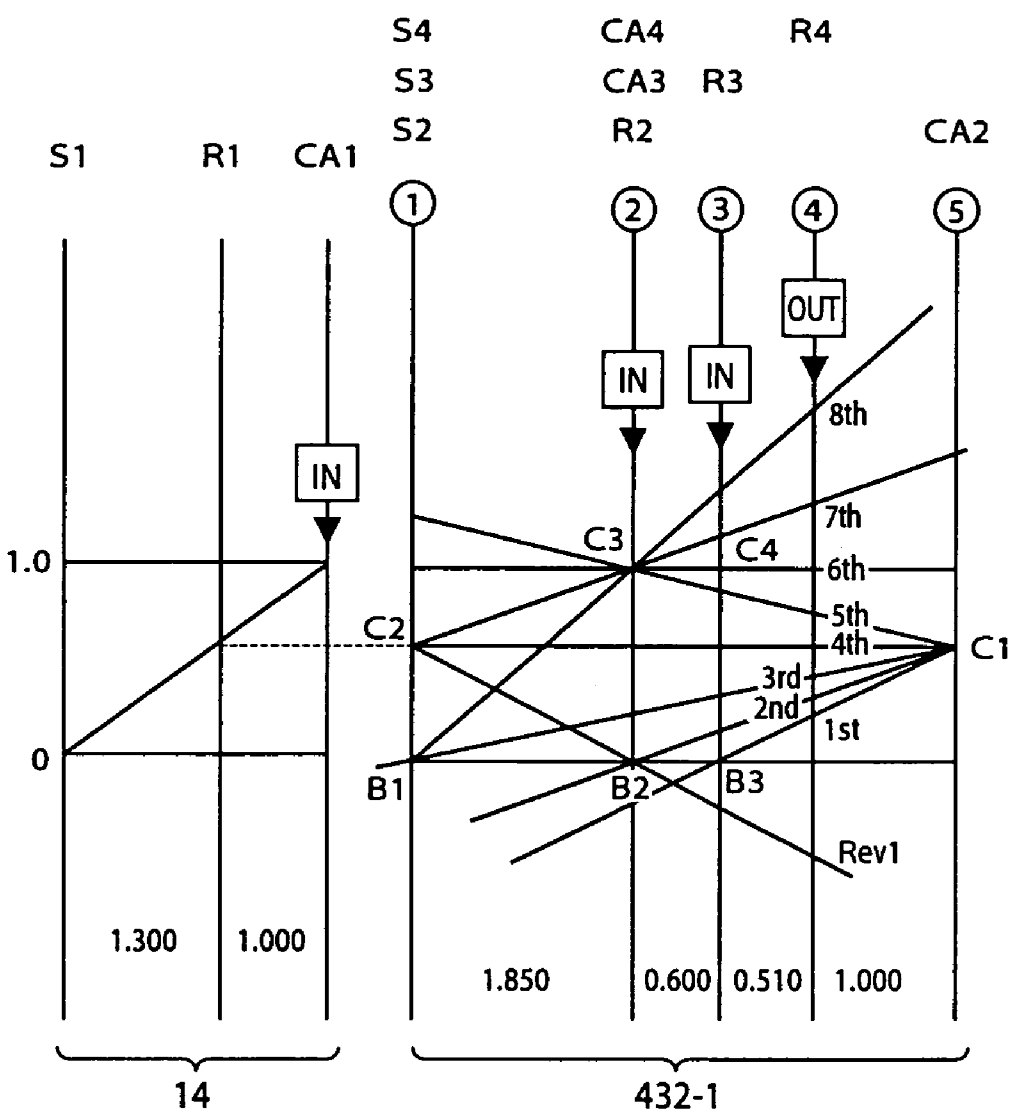
Figures 277A, 277B:
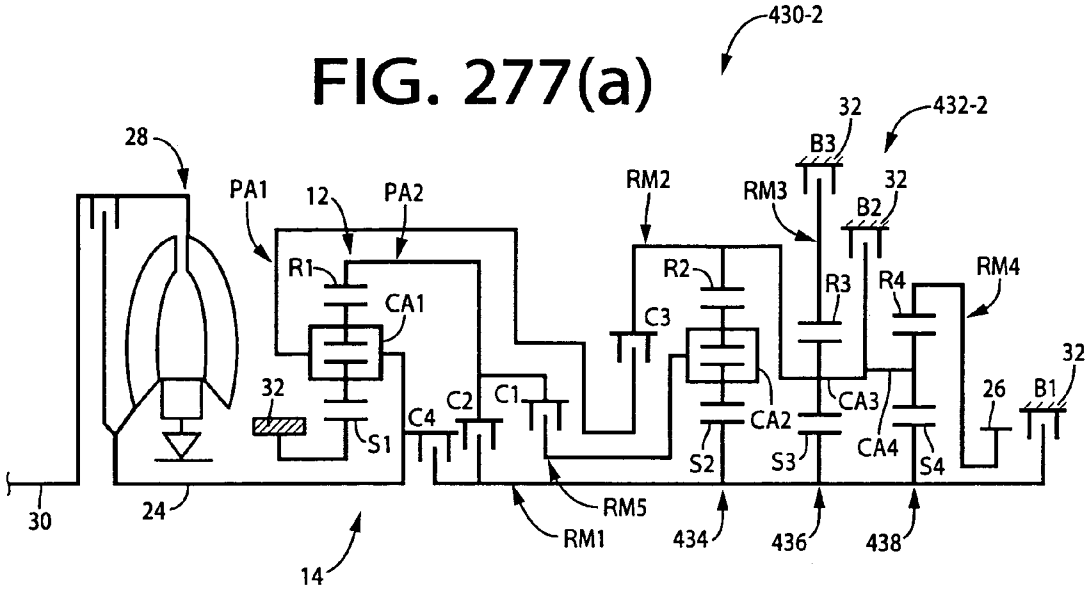
Figure 278:
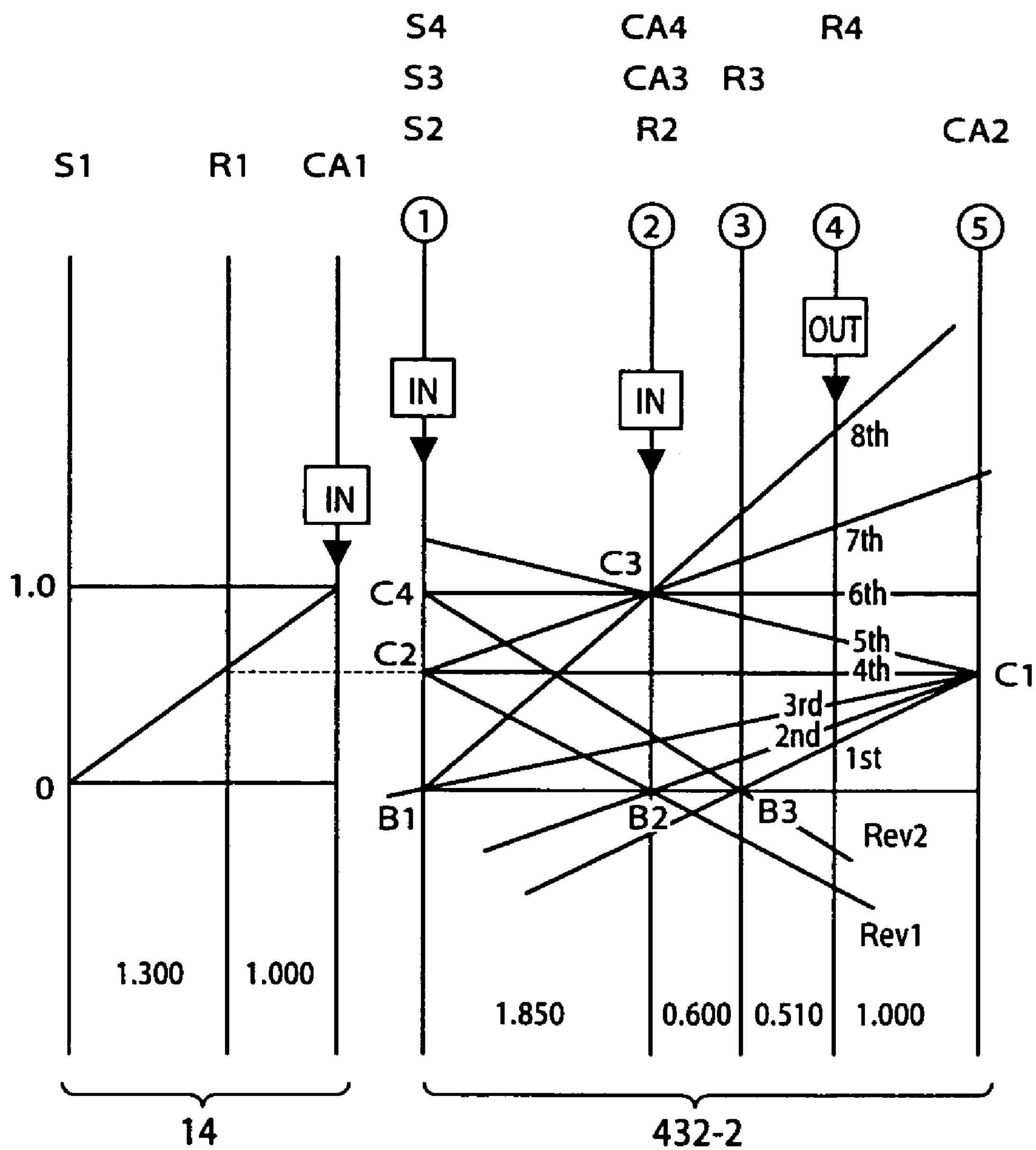
Figures 279A, 279B:
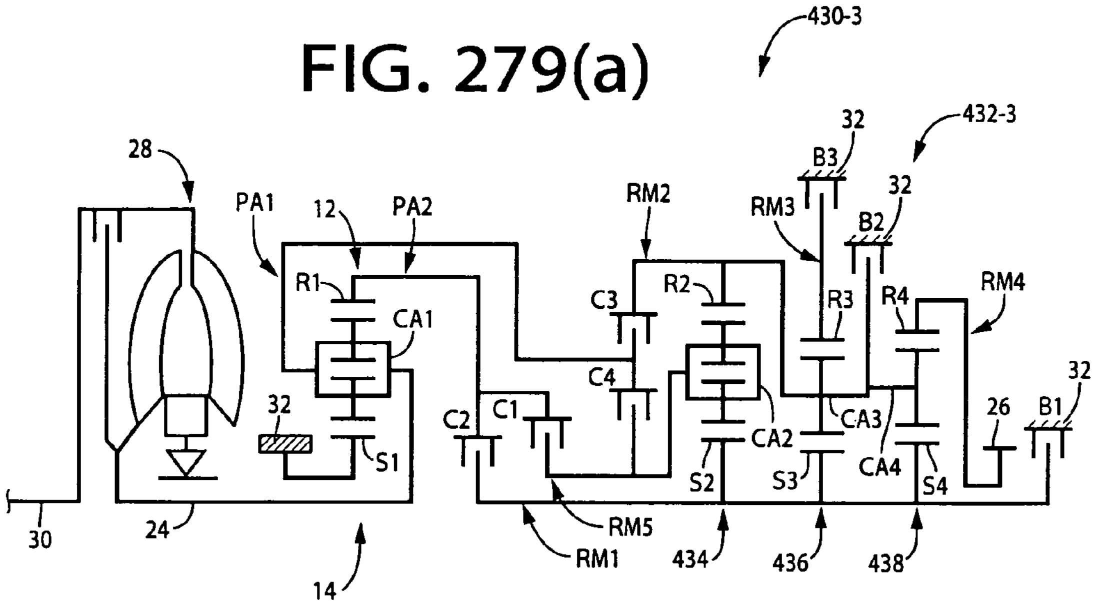
Figure 280:
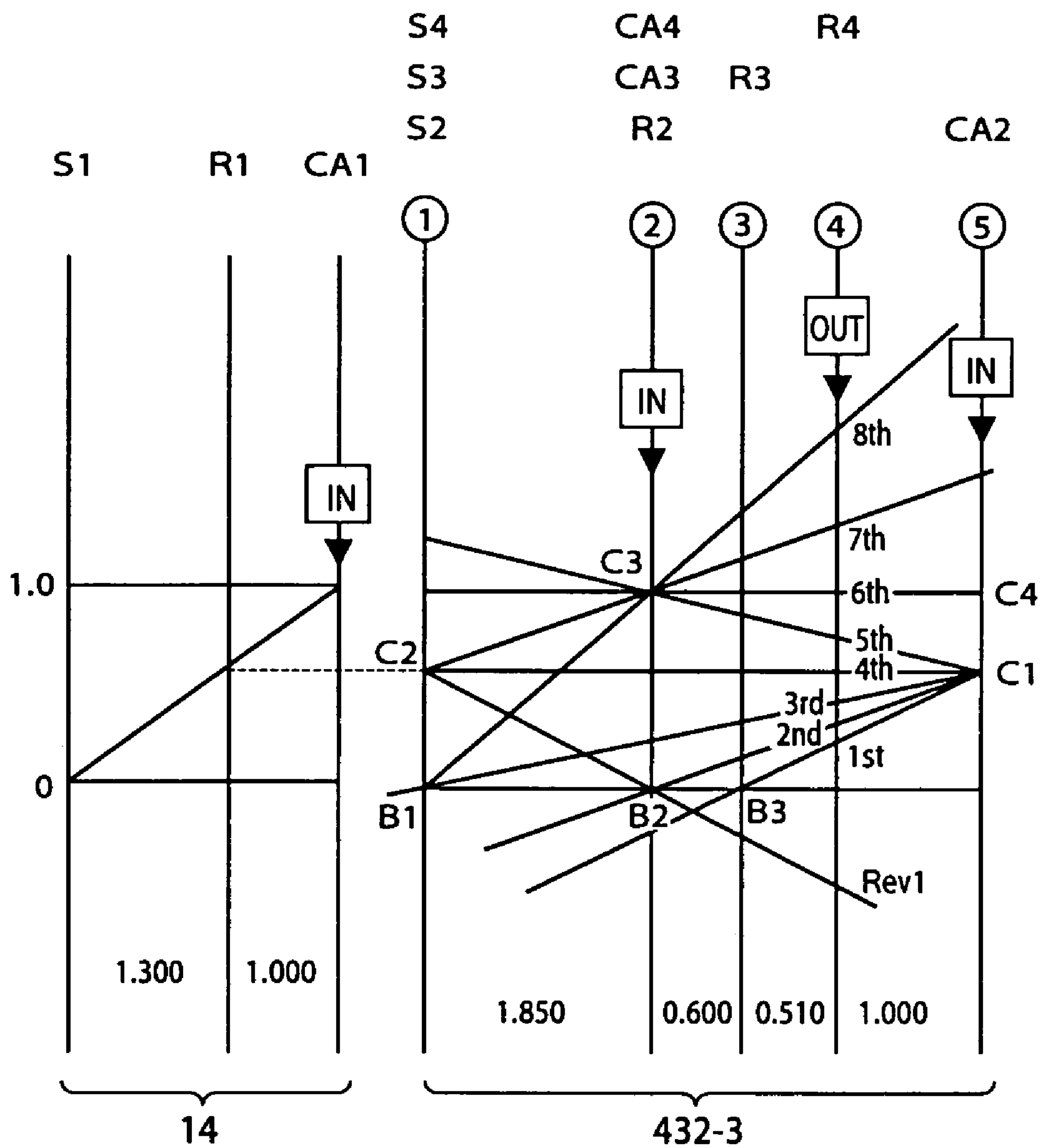
Figures 281A, 281B:
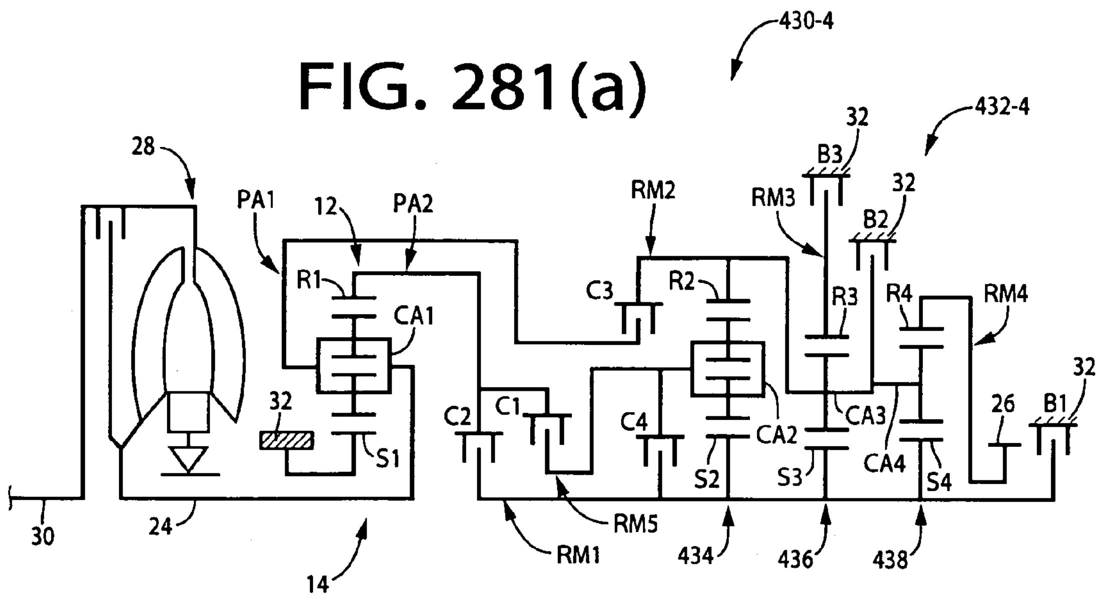
Figure 282:
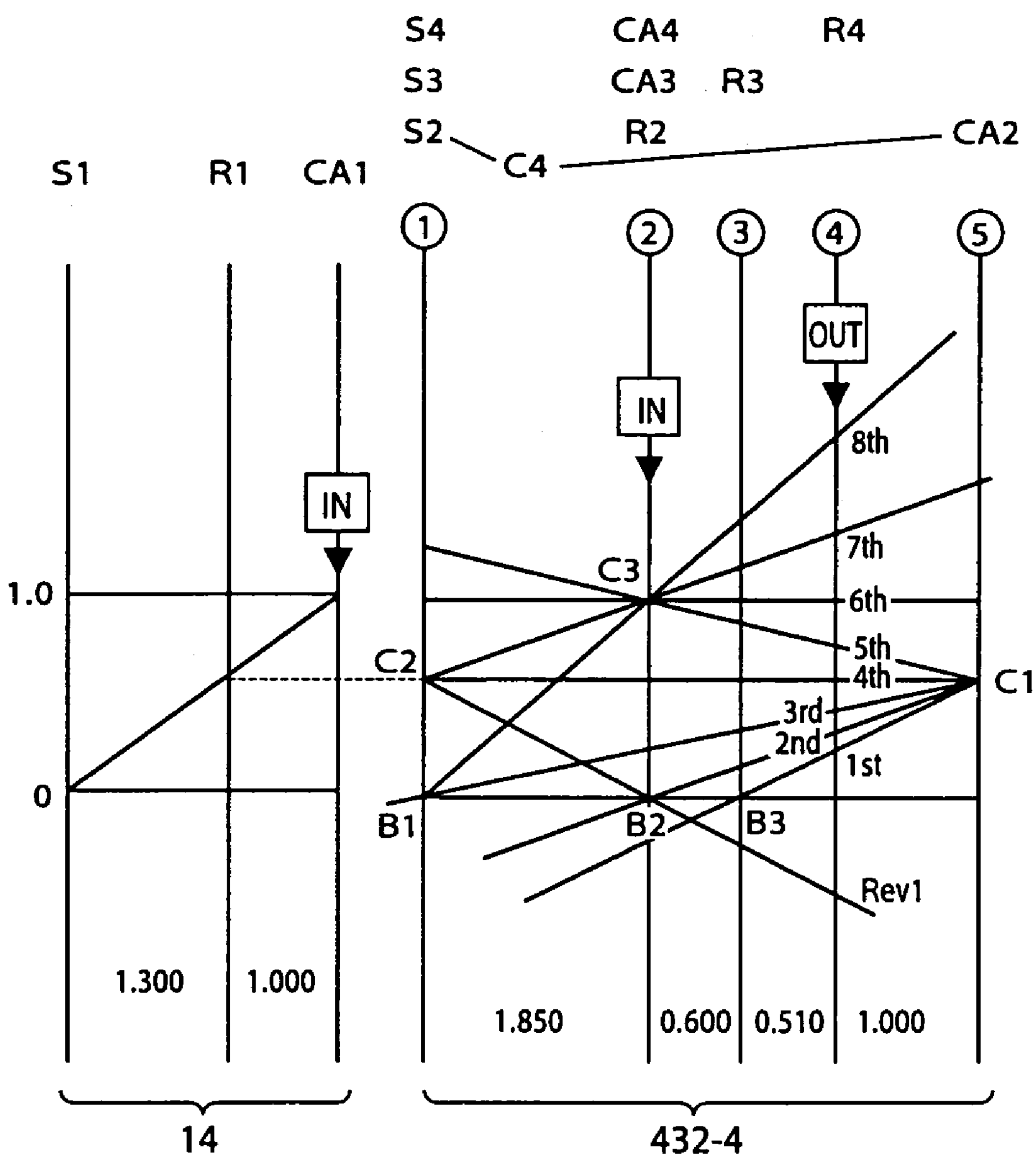
Figures 283A, 283B:
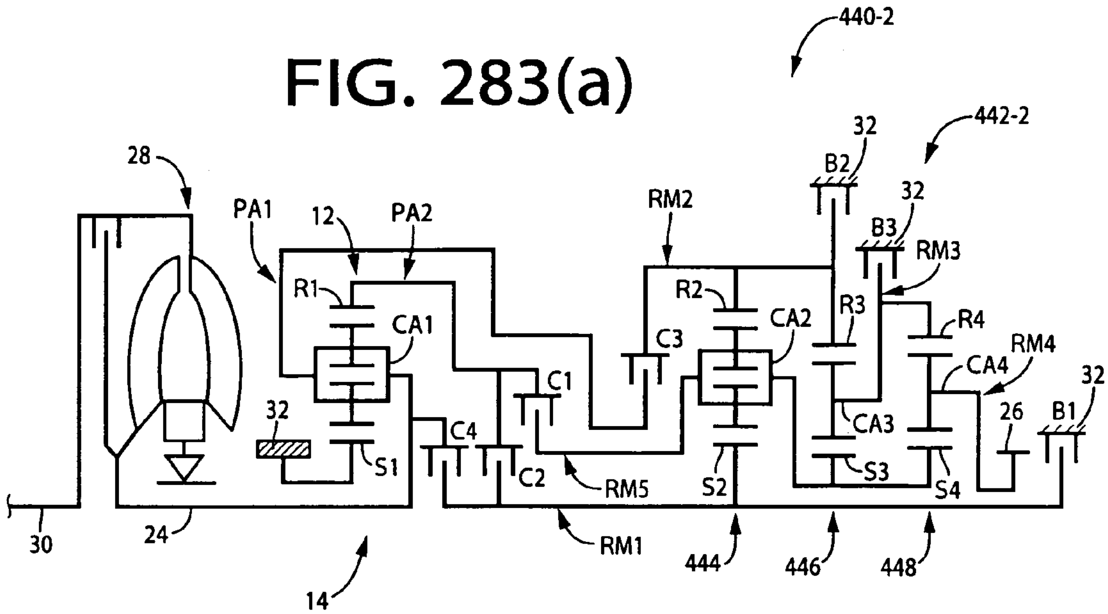
Figure 284:
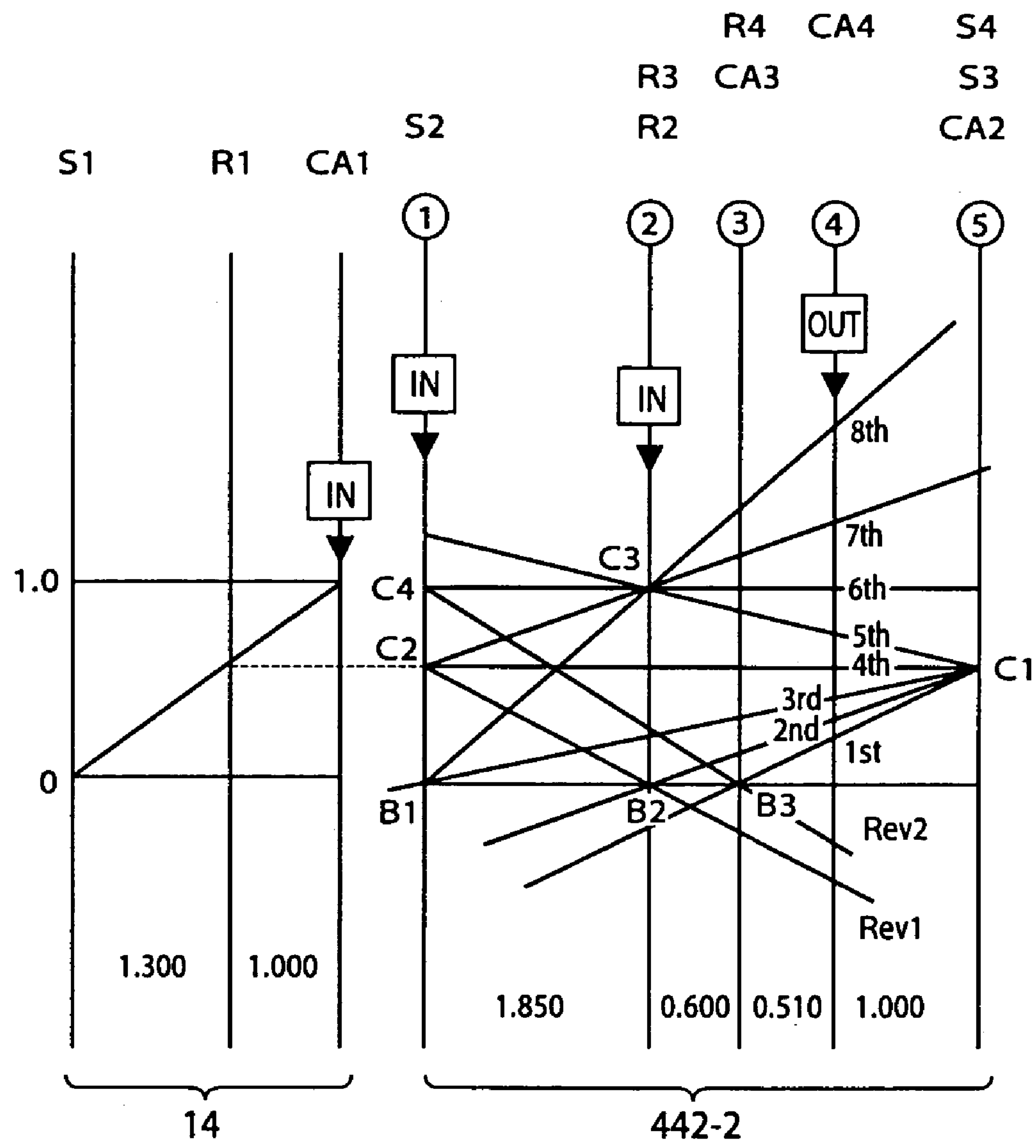
Figures 285A, 285B:
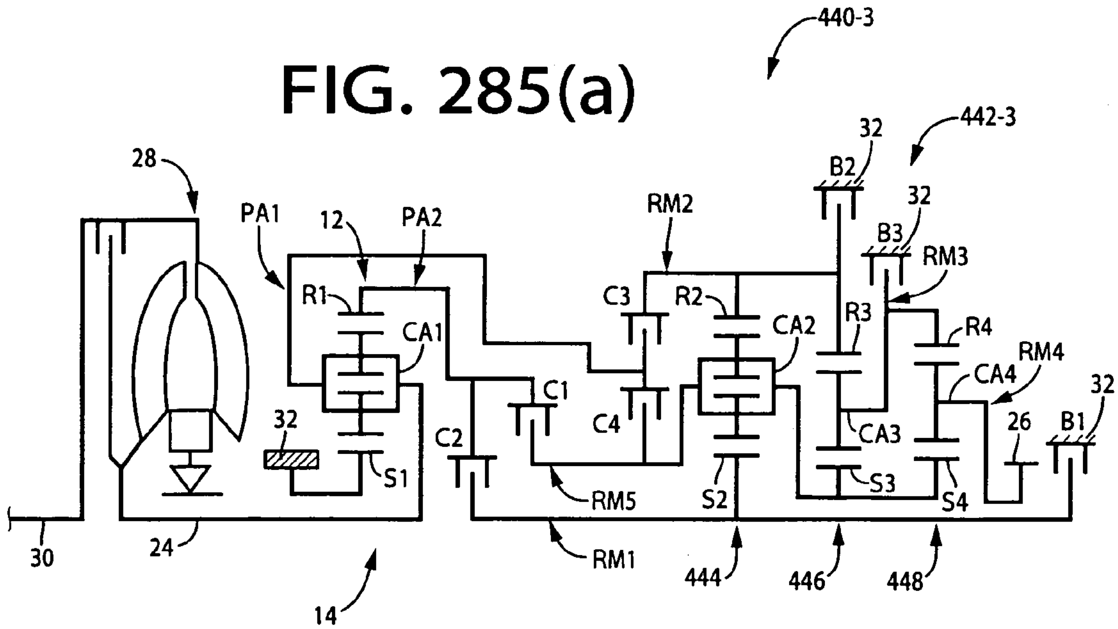
Figure 286:
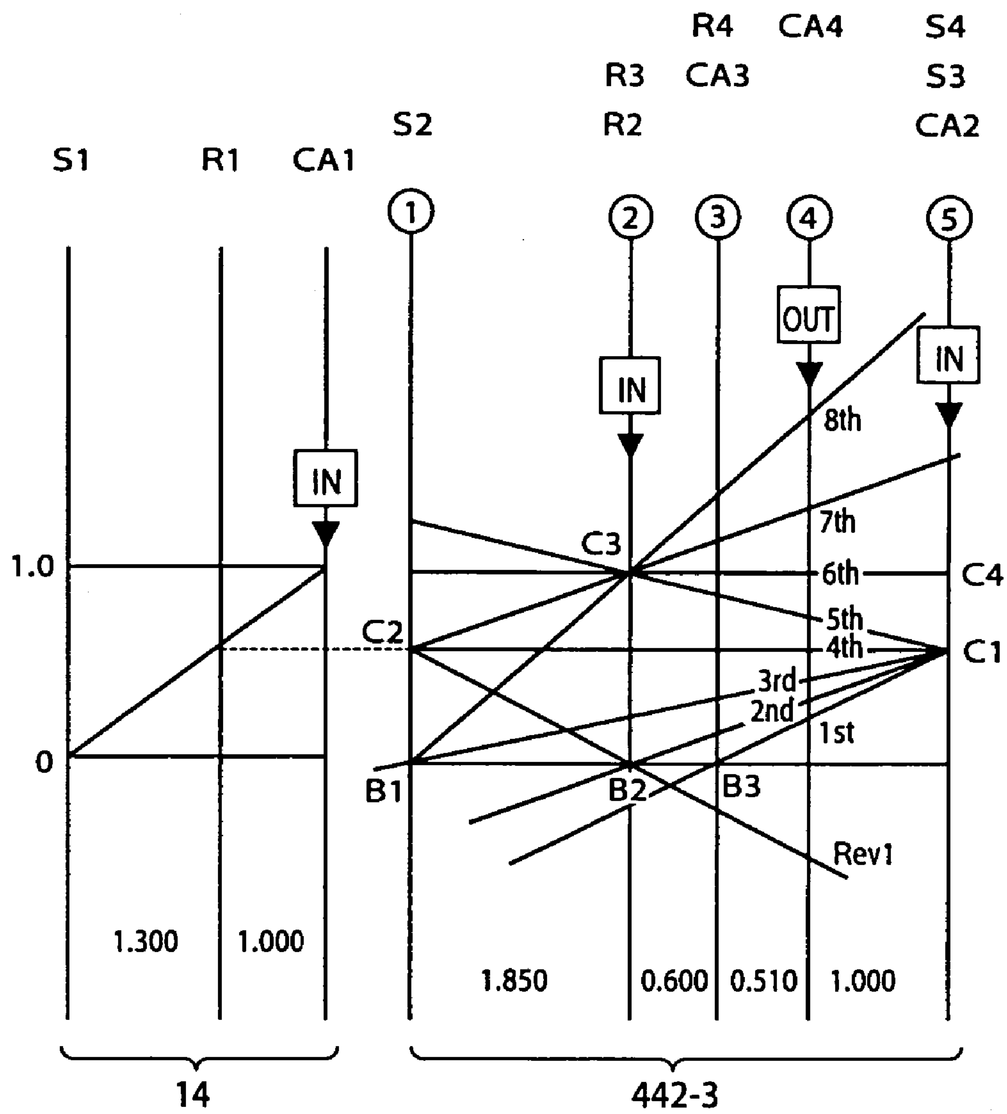
Figures 287A, 287B:
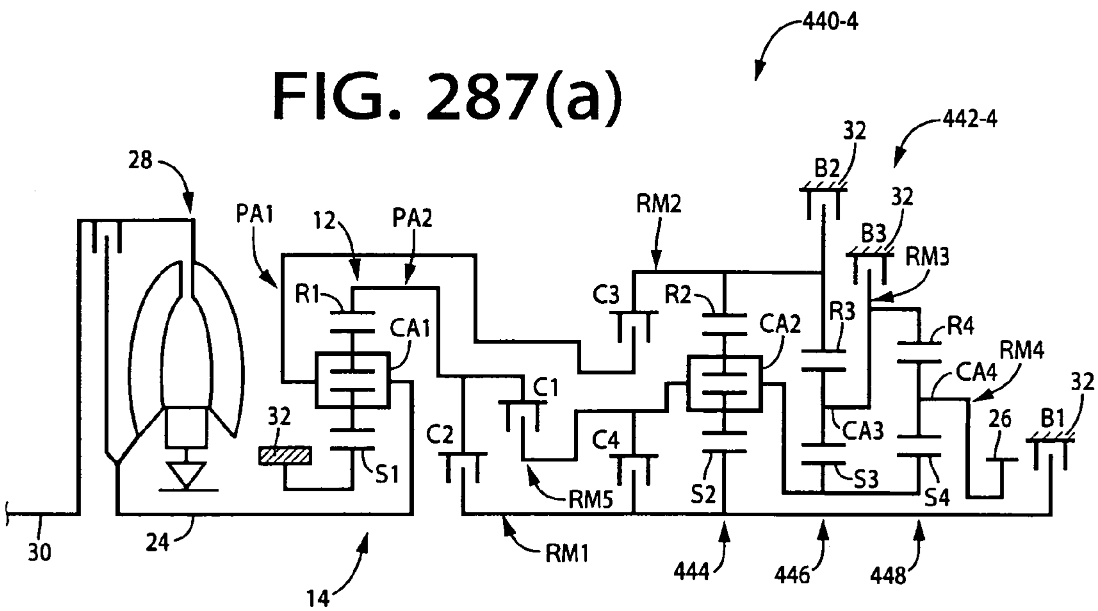
Figure 288:
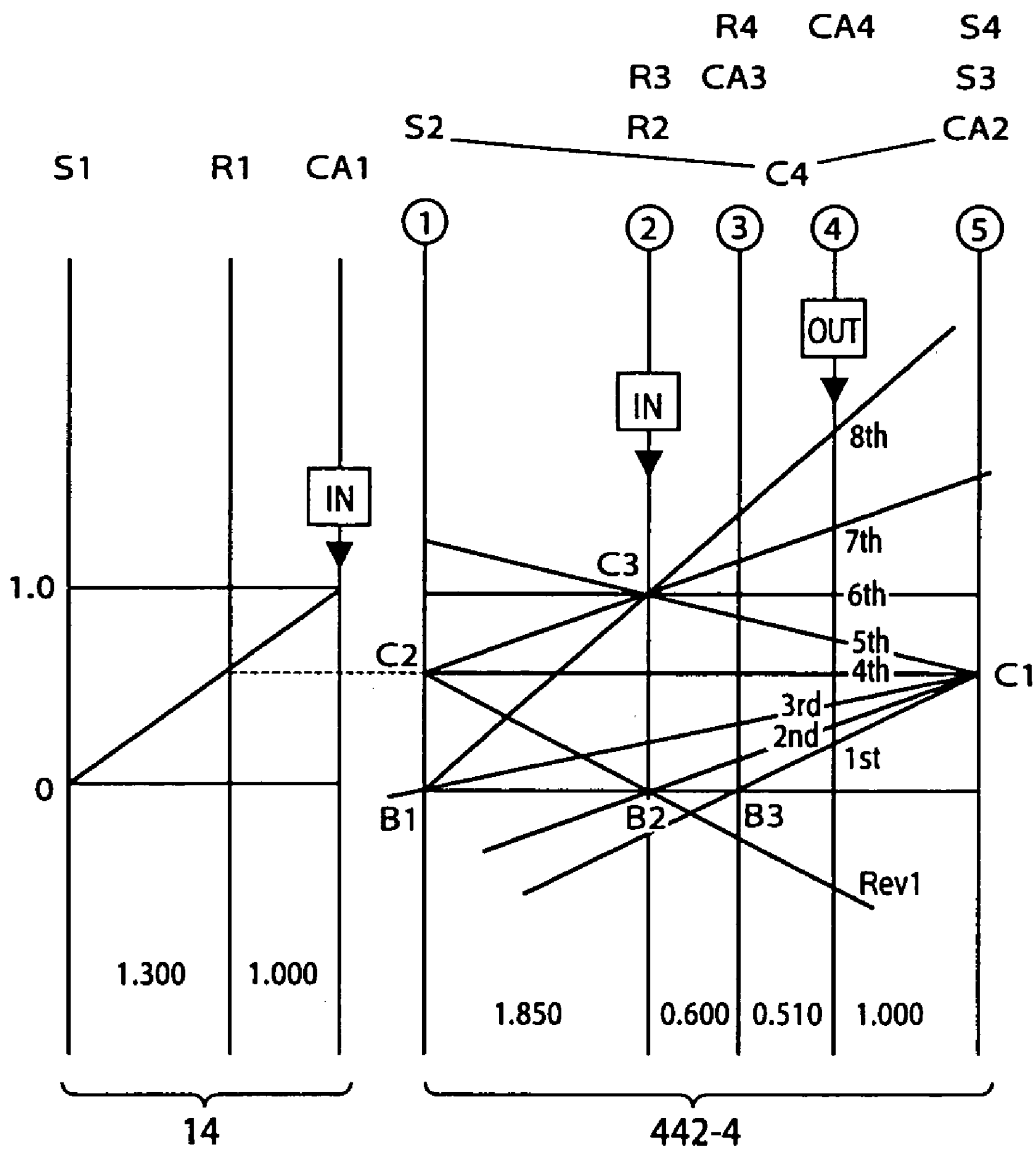
Figures 289A, 289B:
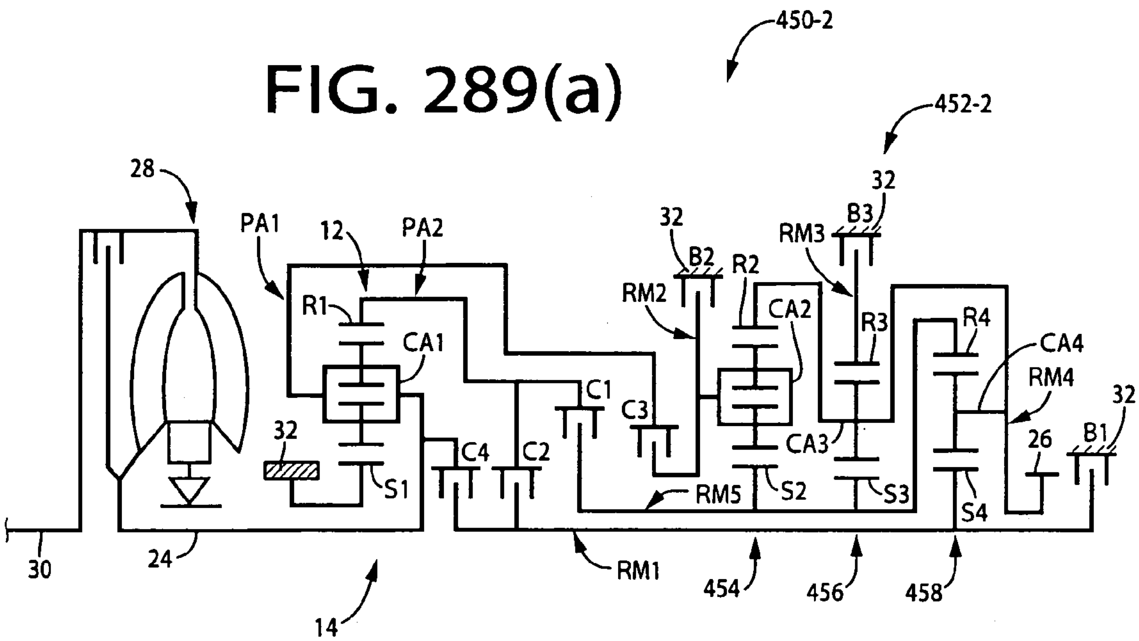
Figure 290:
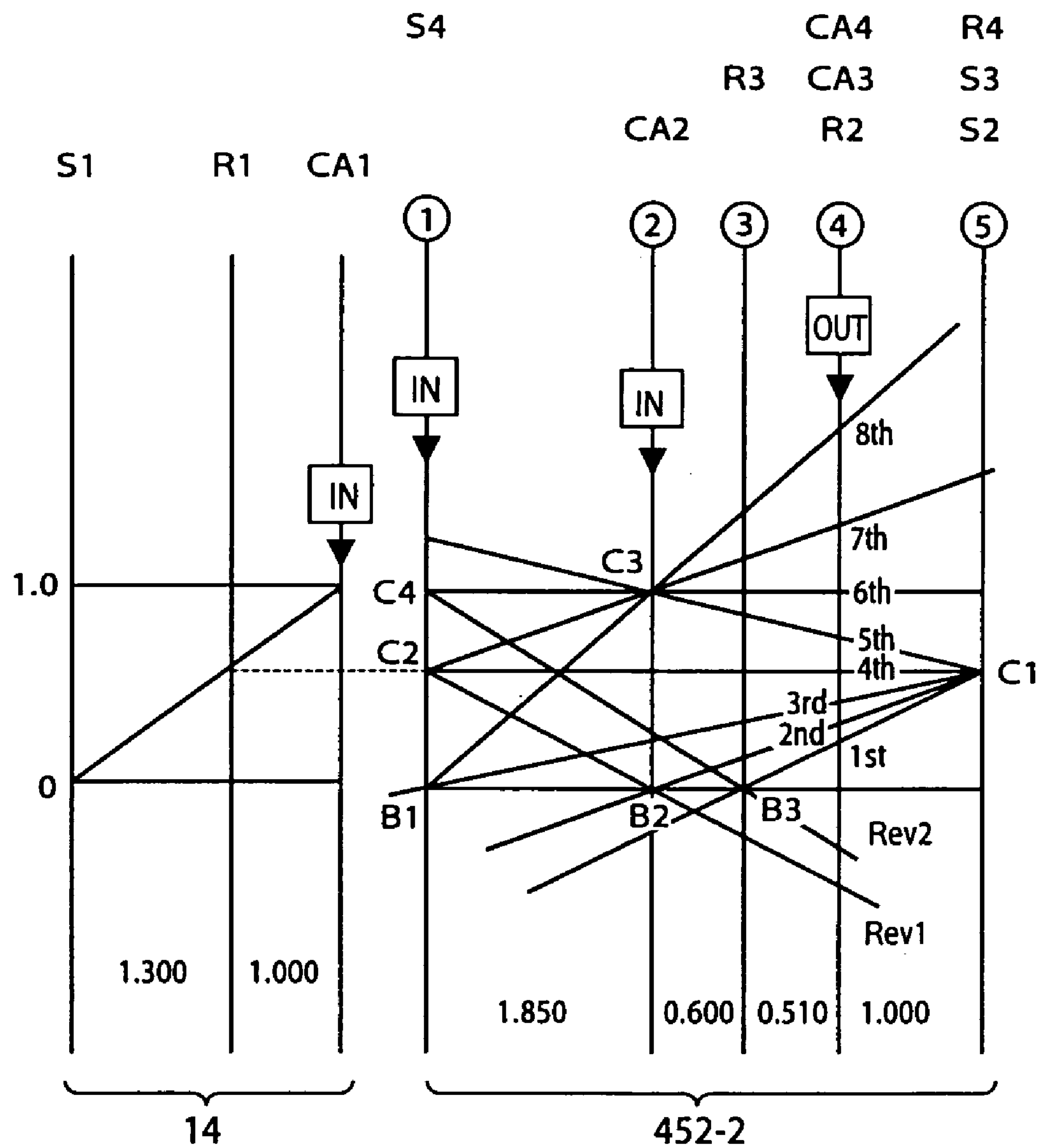
Figures 291A, 291B:
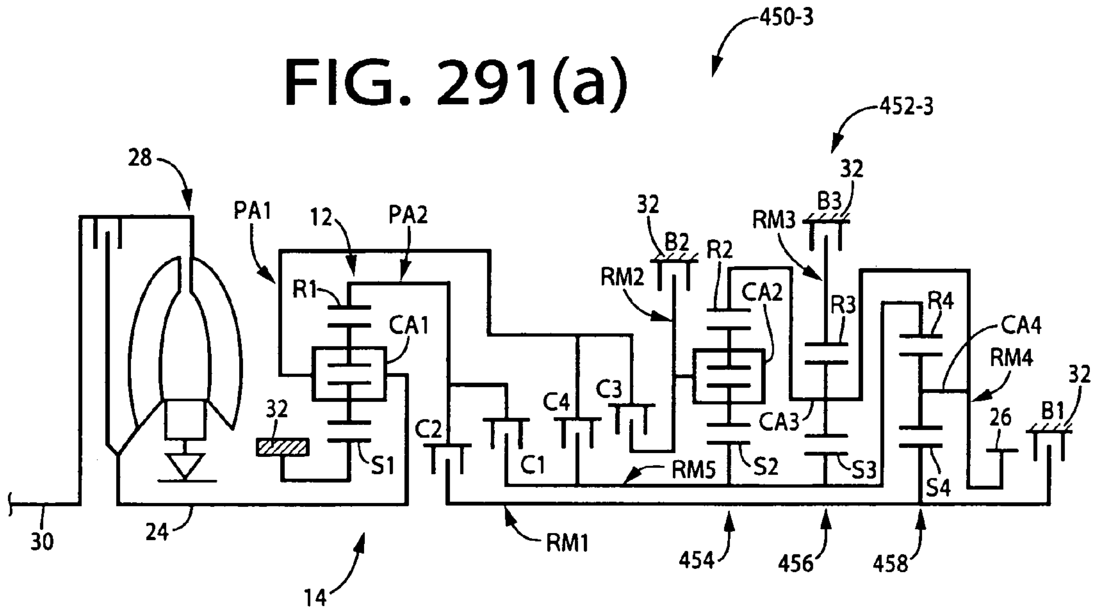
Figure 292:
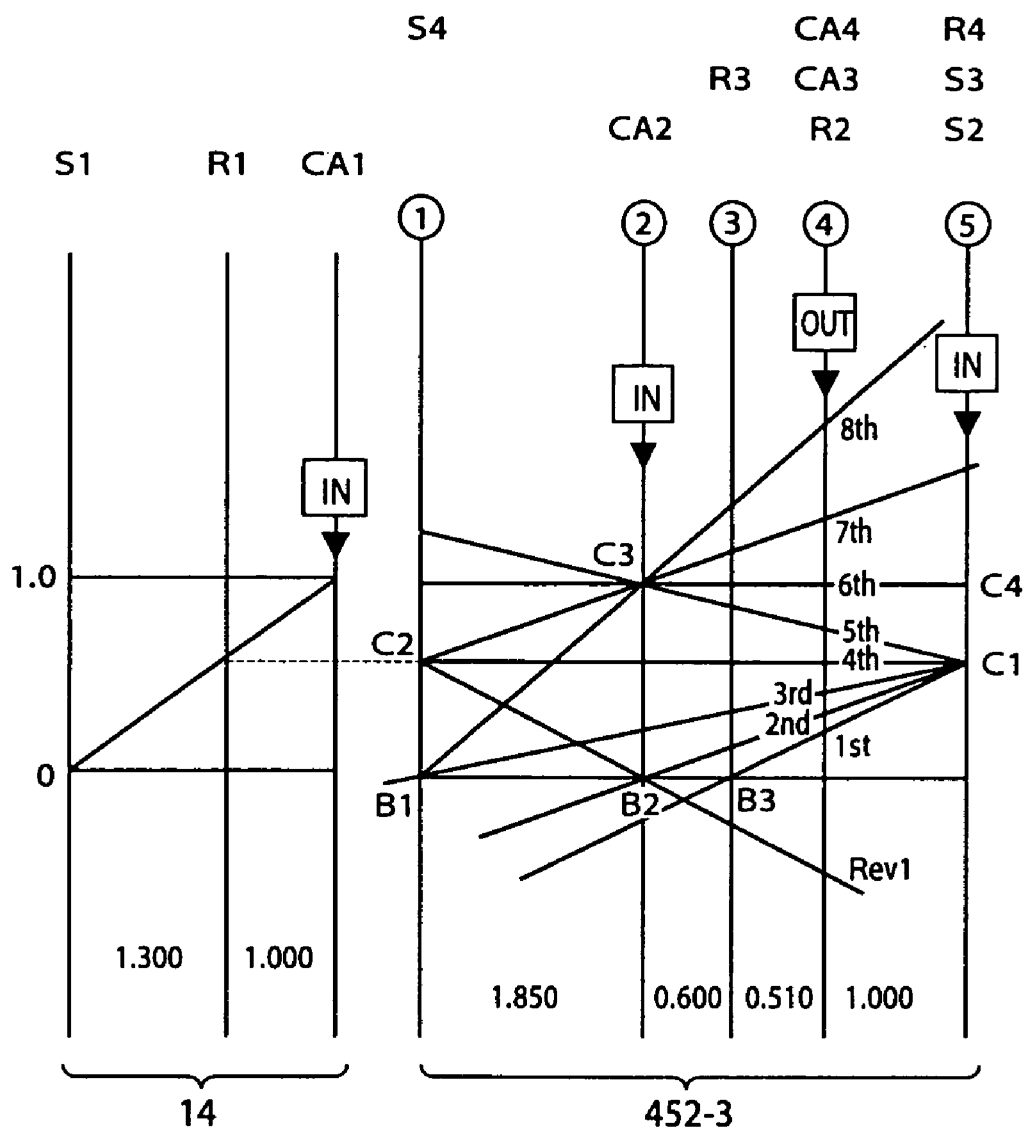
Figures 293A, 293B:
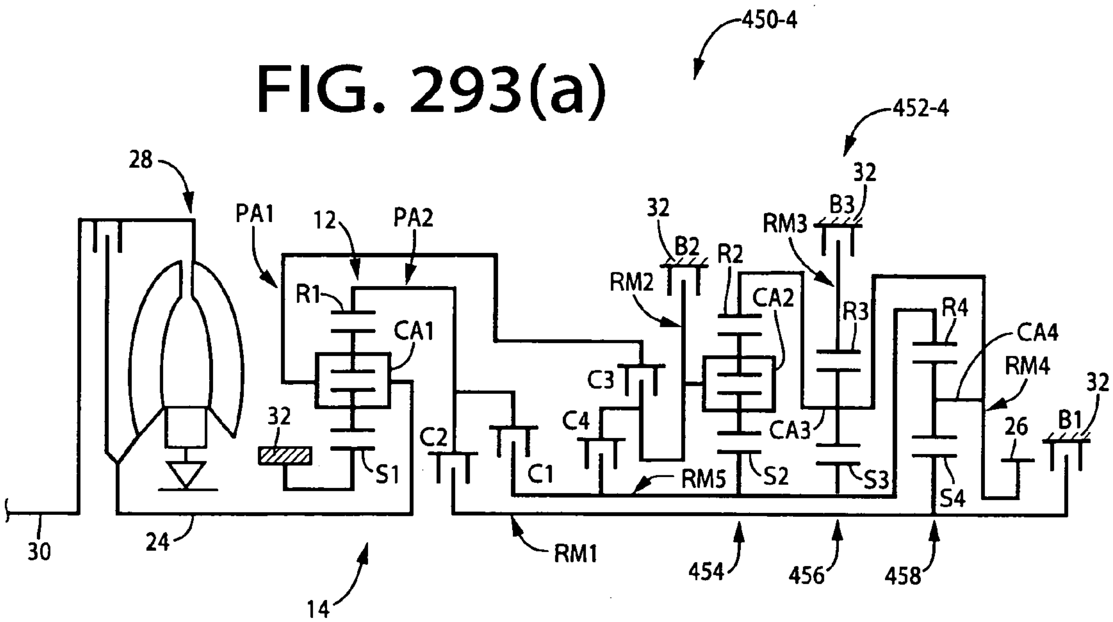
Figure 294:
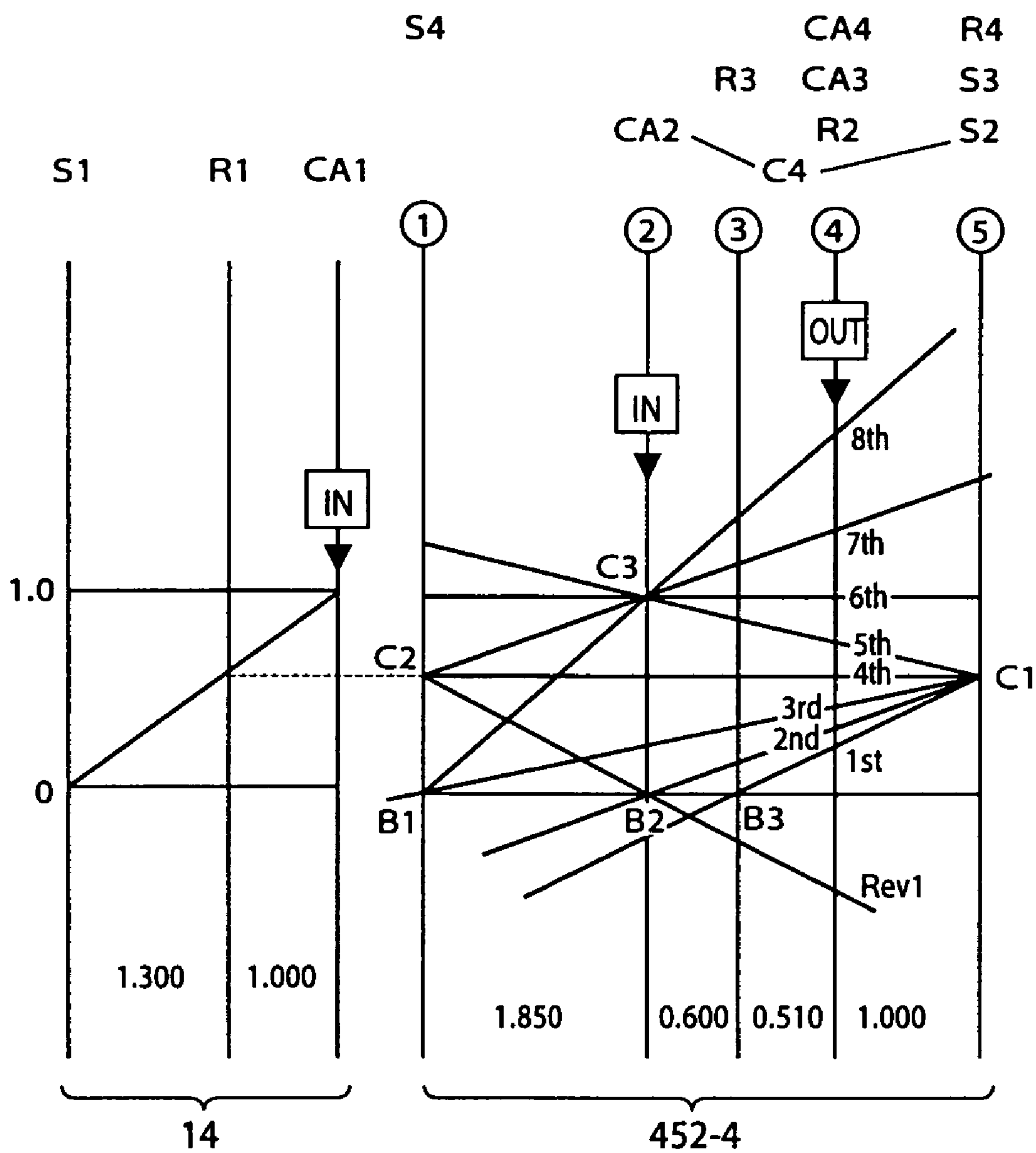
Figures 295A, 295B:
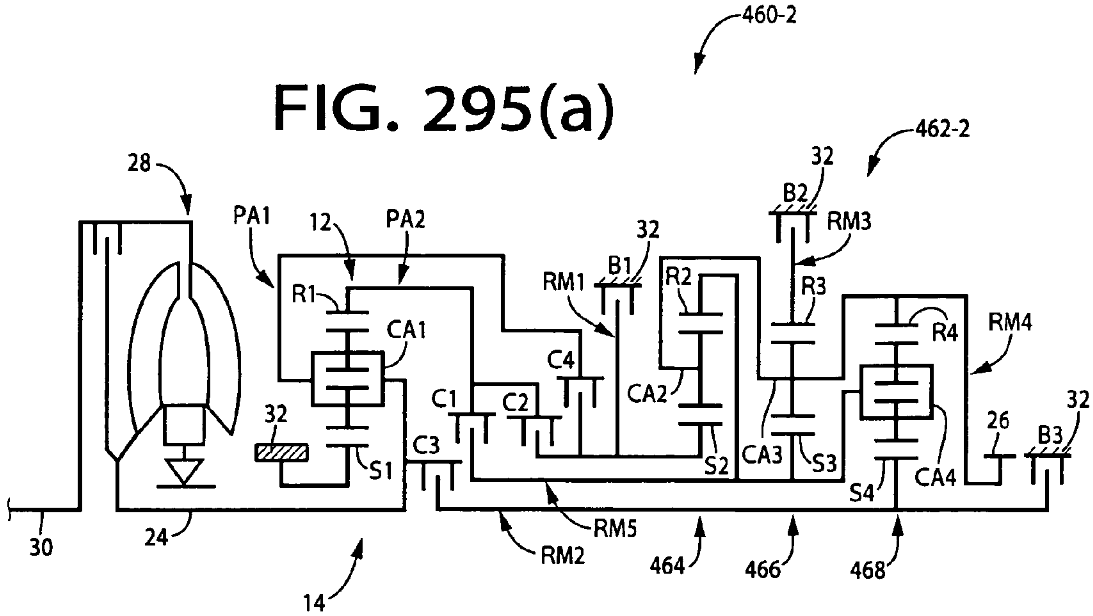
Figure 296:
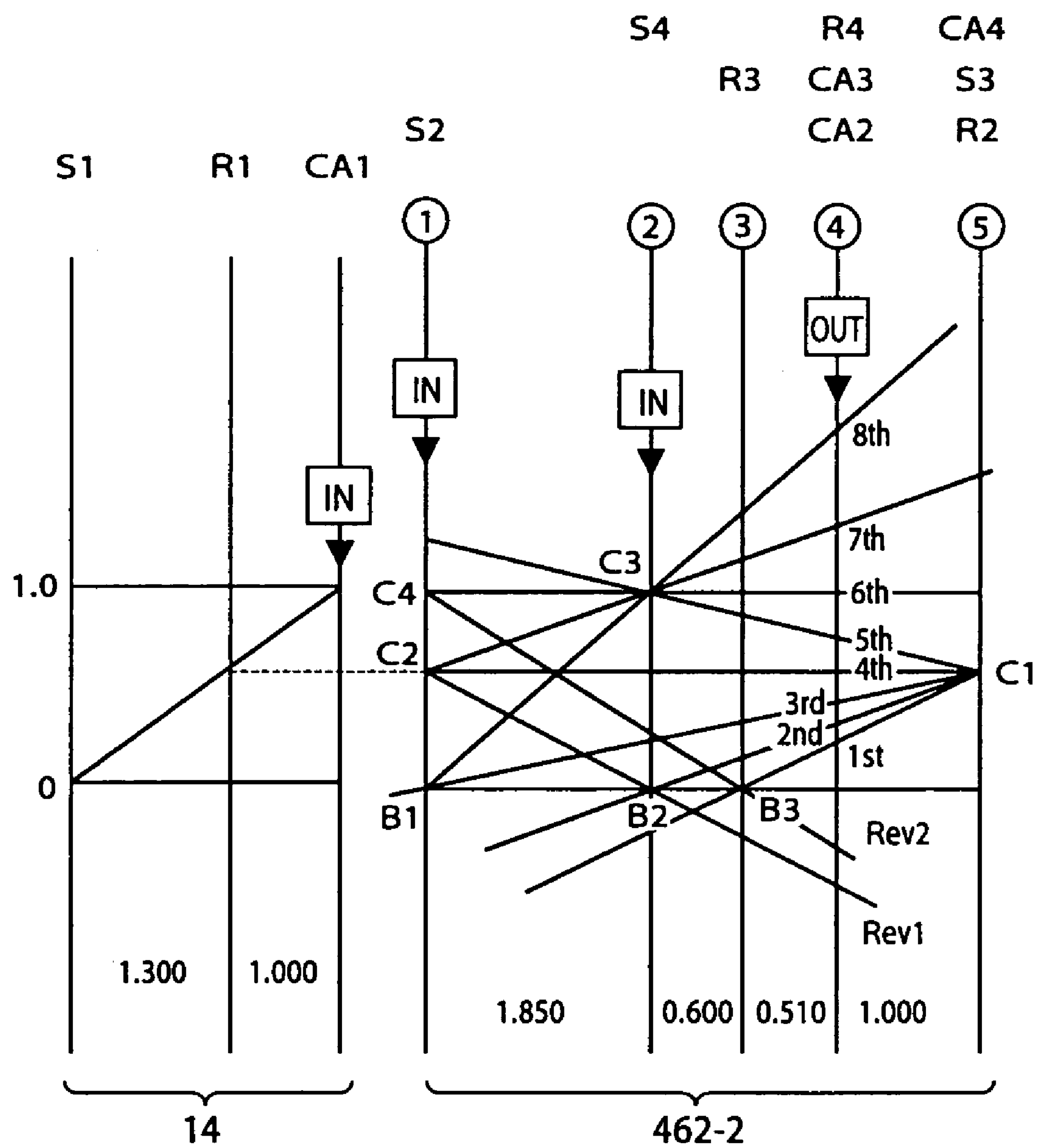
Figures 297A, 297B:
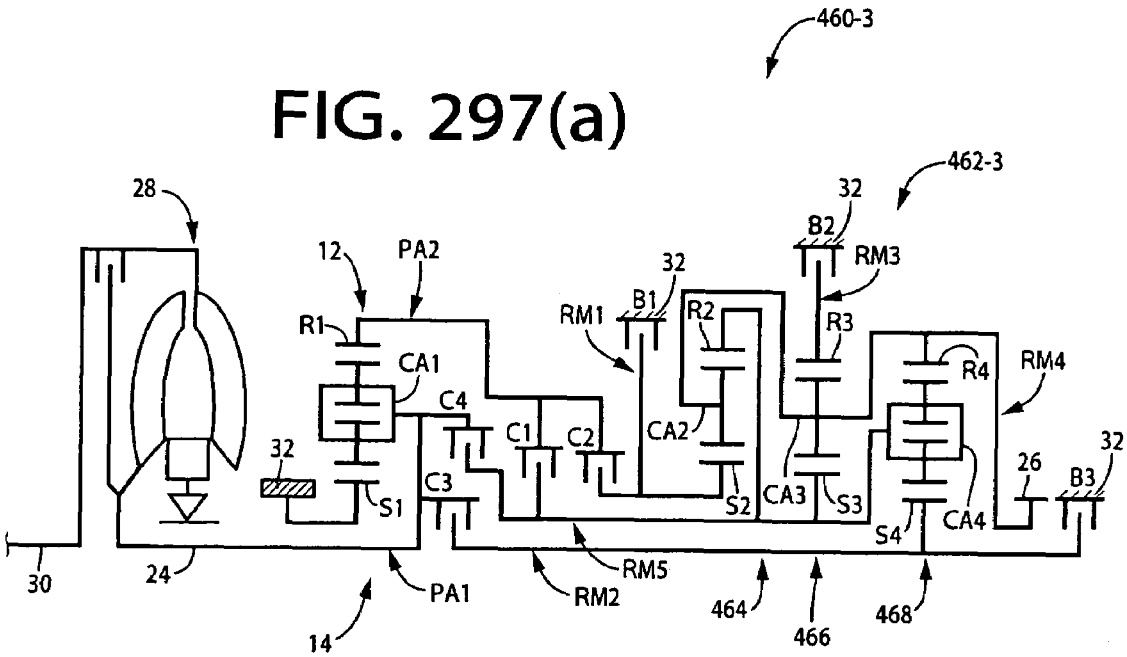
Figure 298:
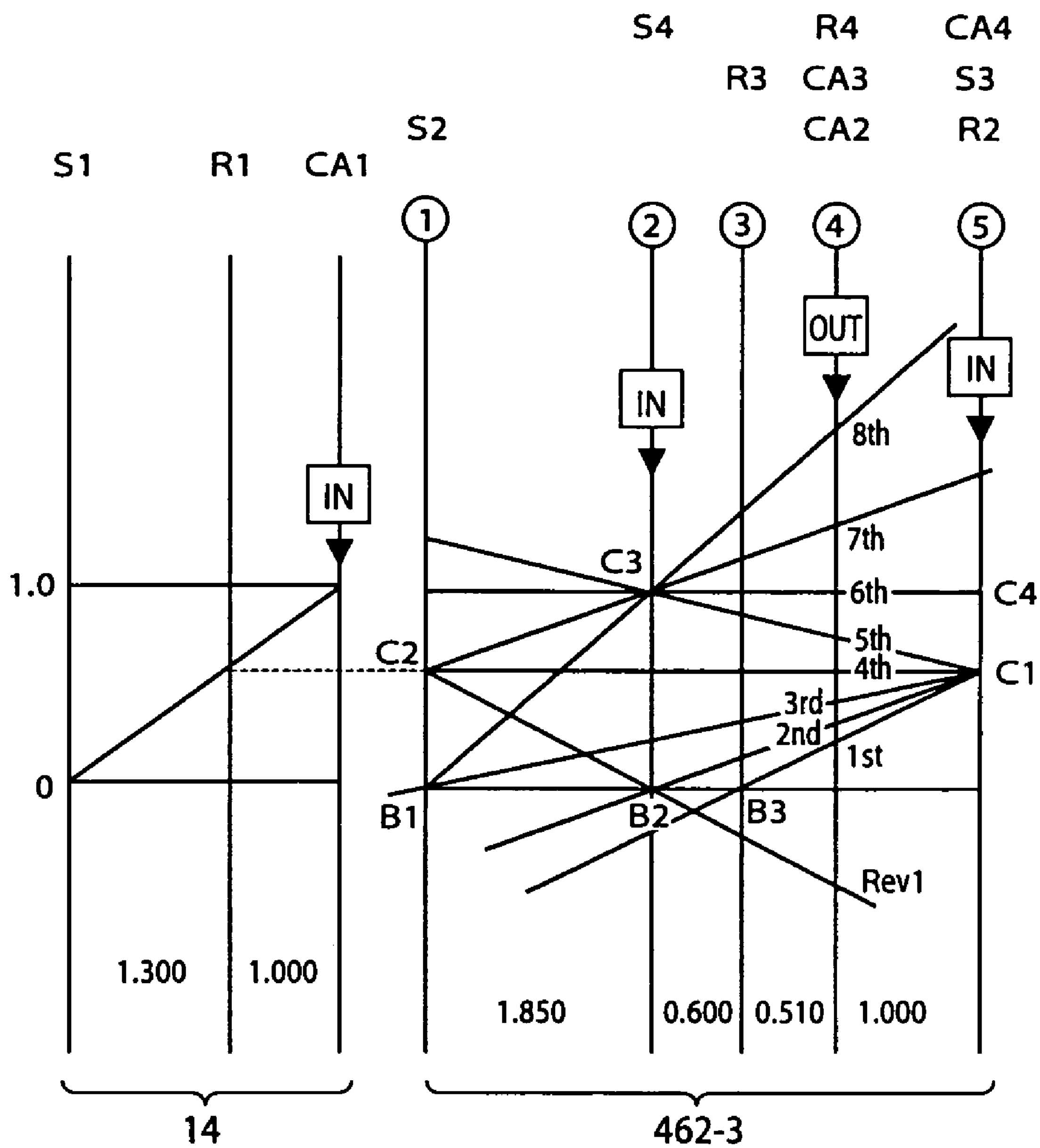
Figures 299A, 299B:
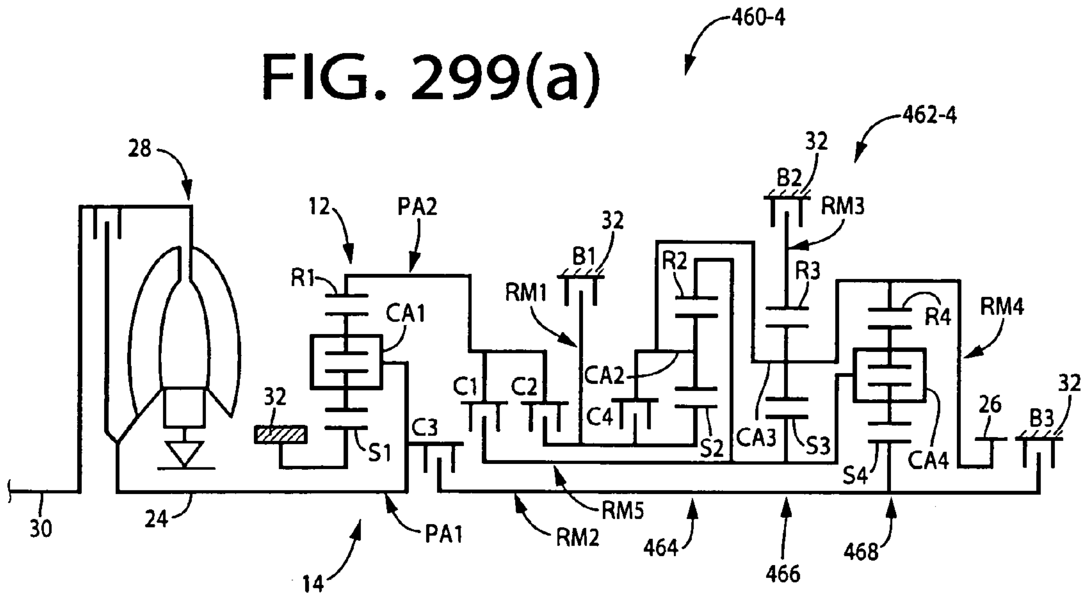
Figure 300:
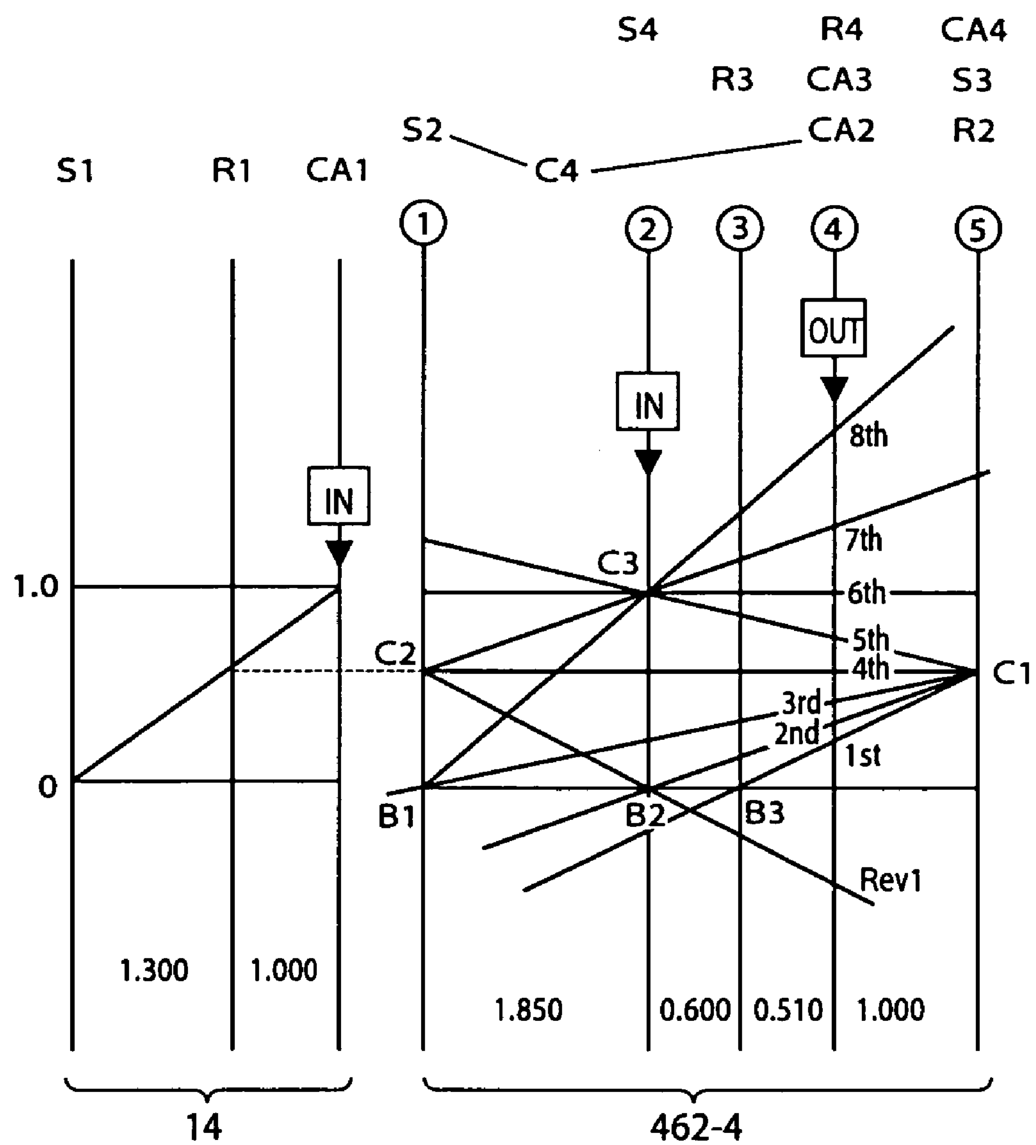
Figures 301A, 301B:
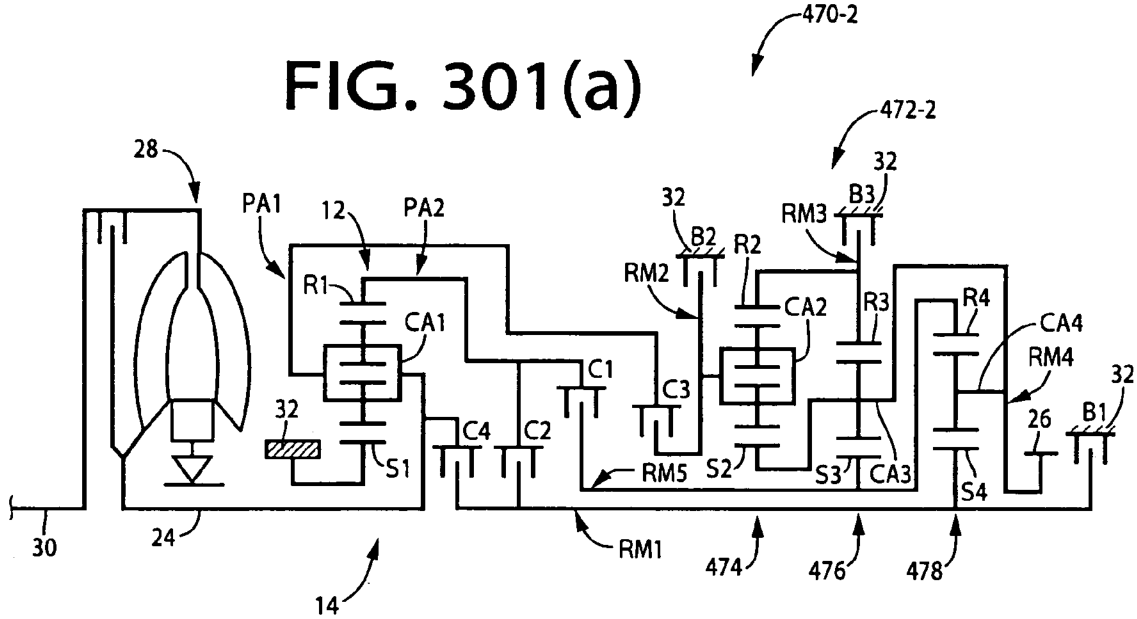
Figure 302:
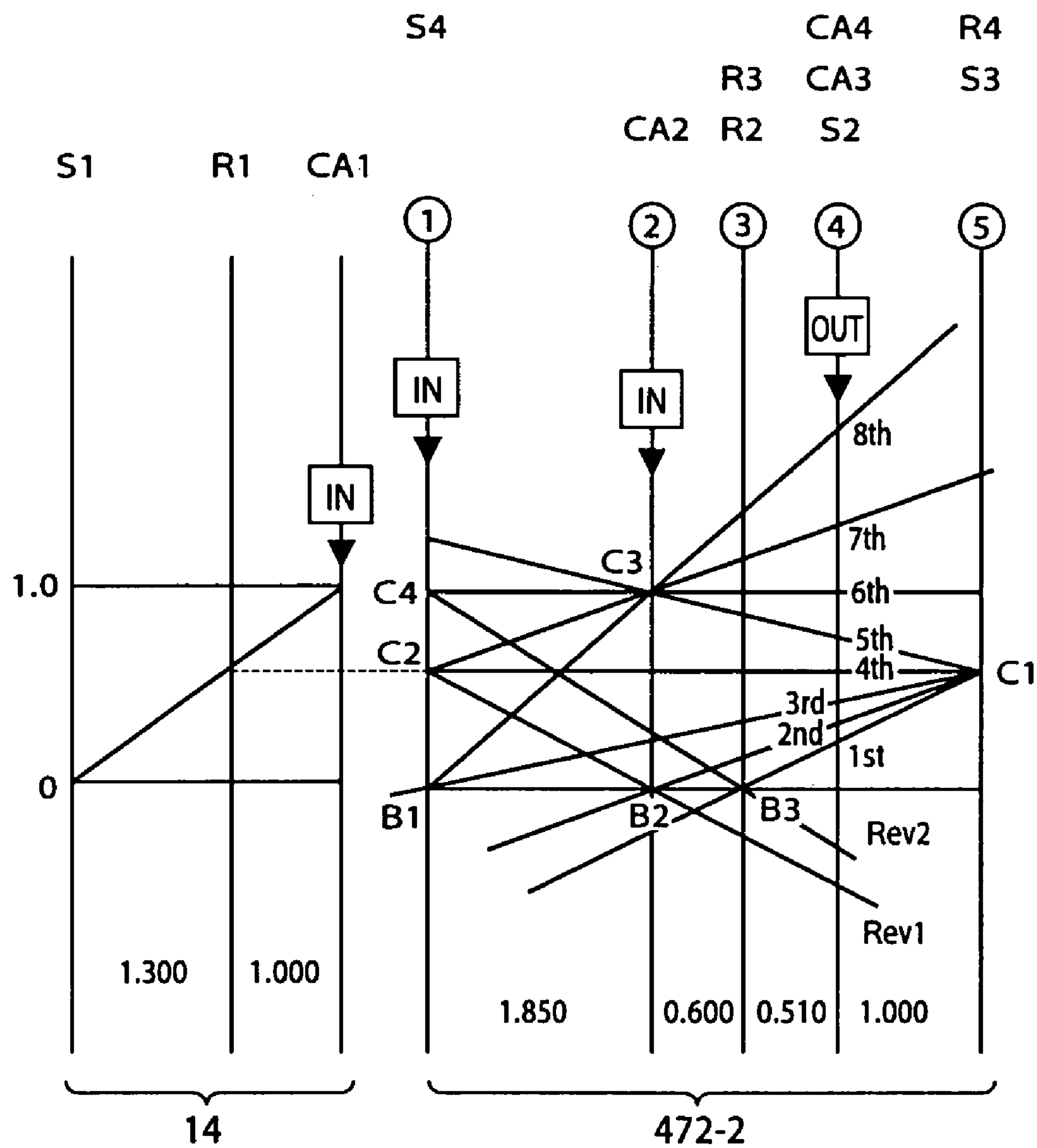
Figures 303A, 303B:
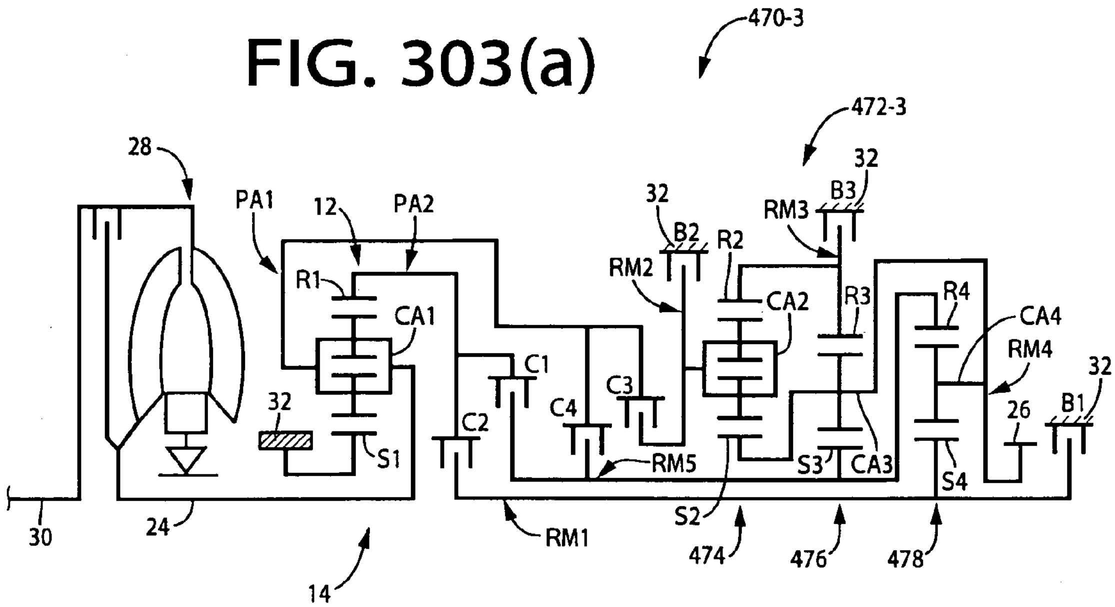
Figure 304:
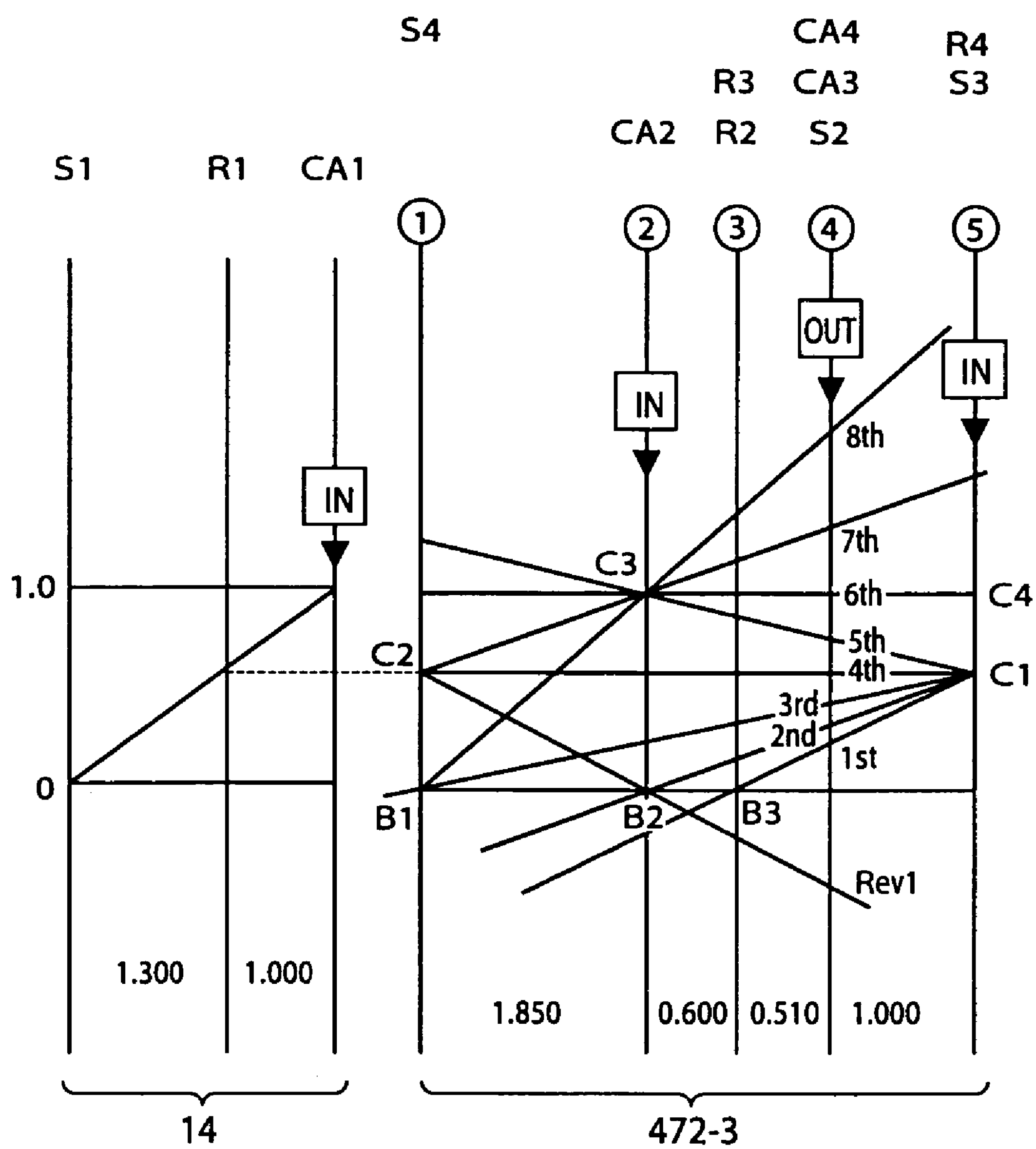
Figures 305A, 305B:
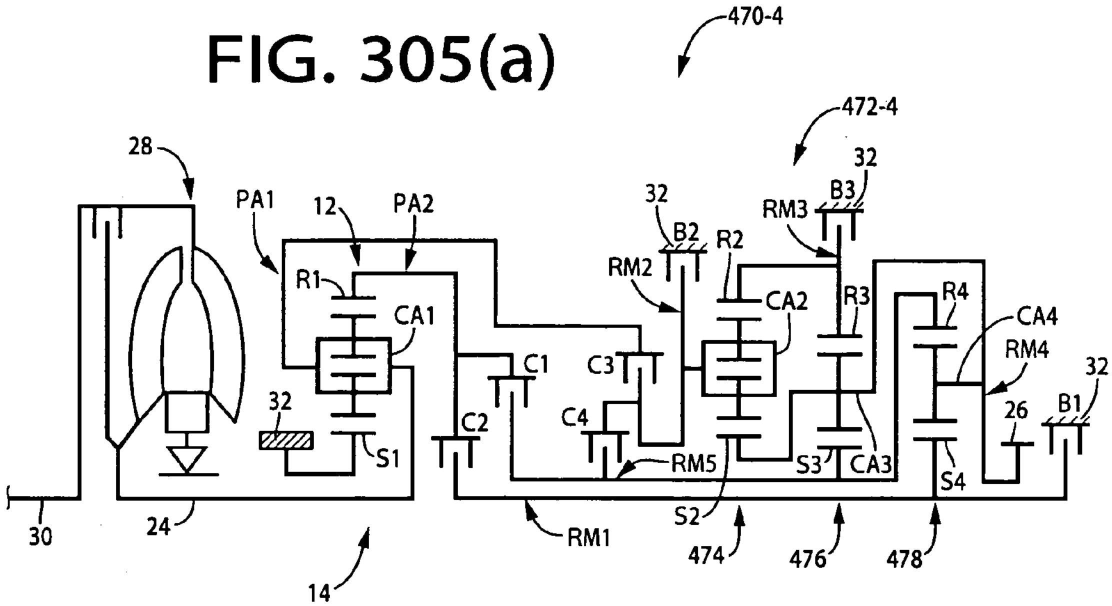
Figure 306:
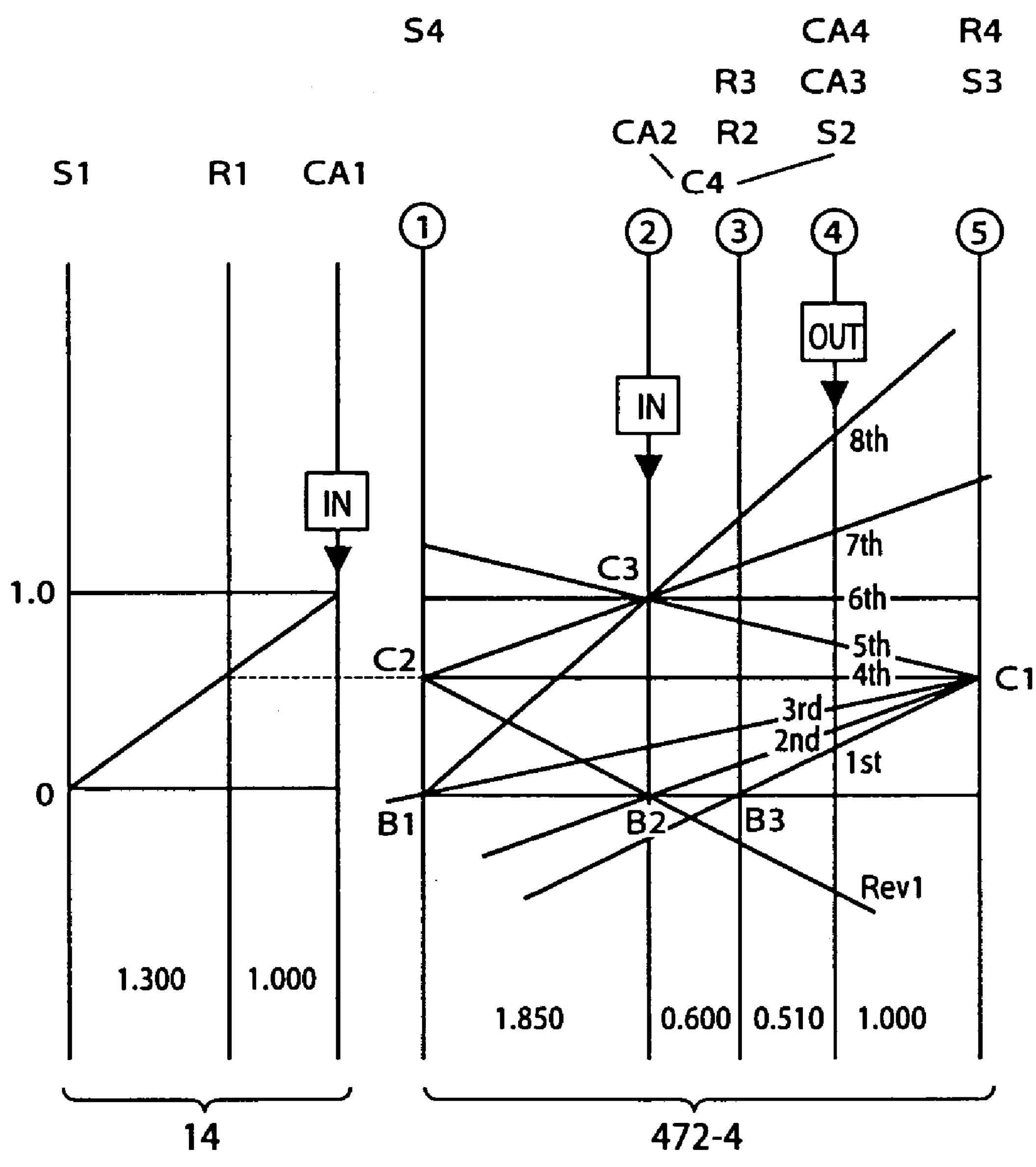
Figures 307A, 307B:
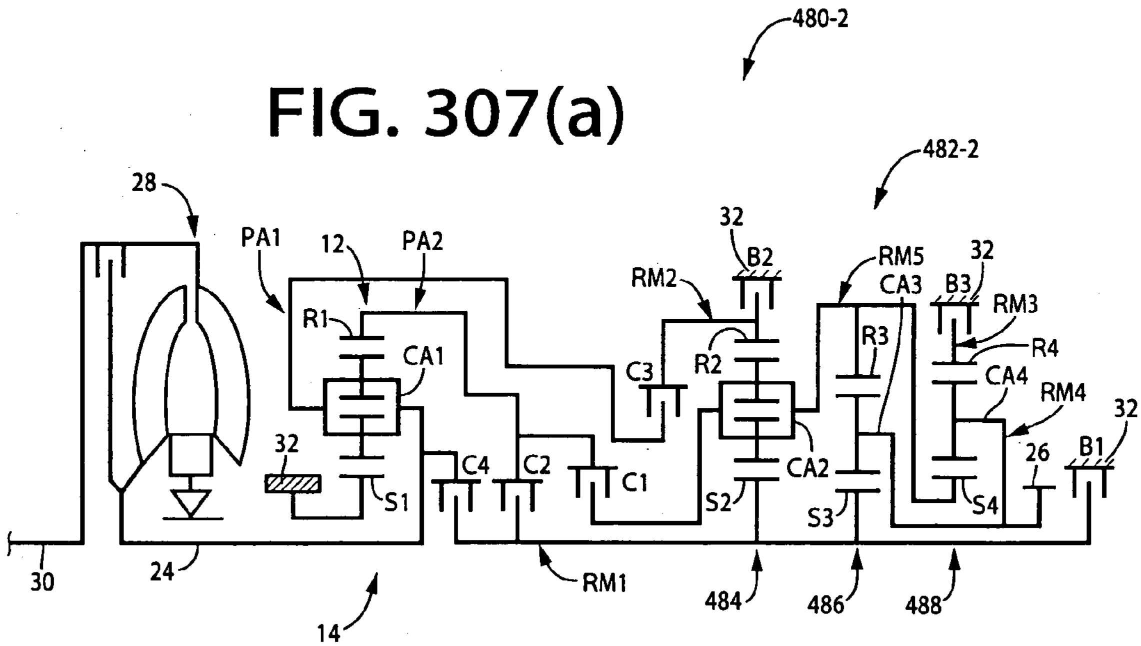
Figure 308:
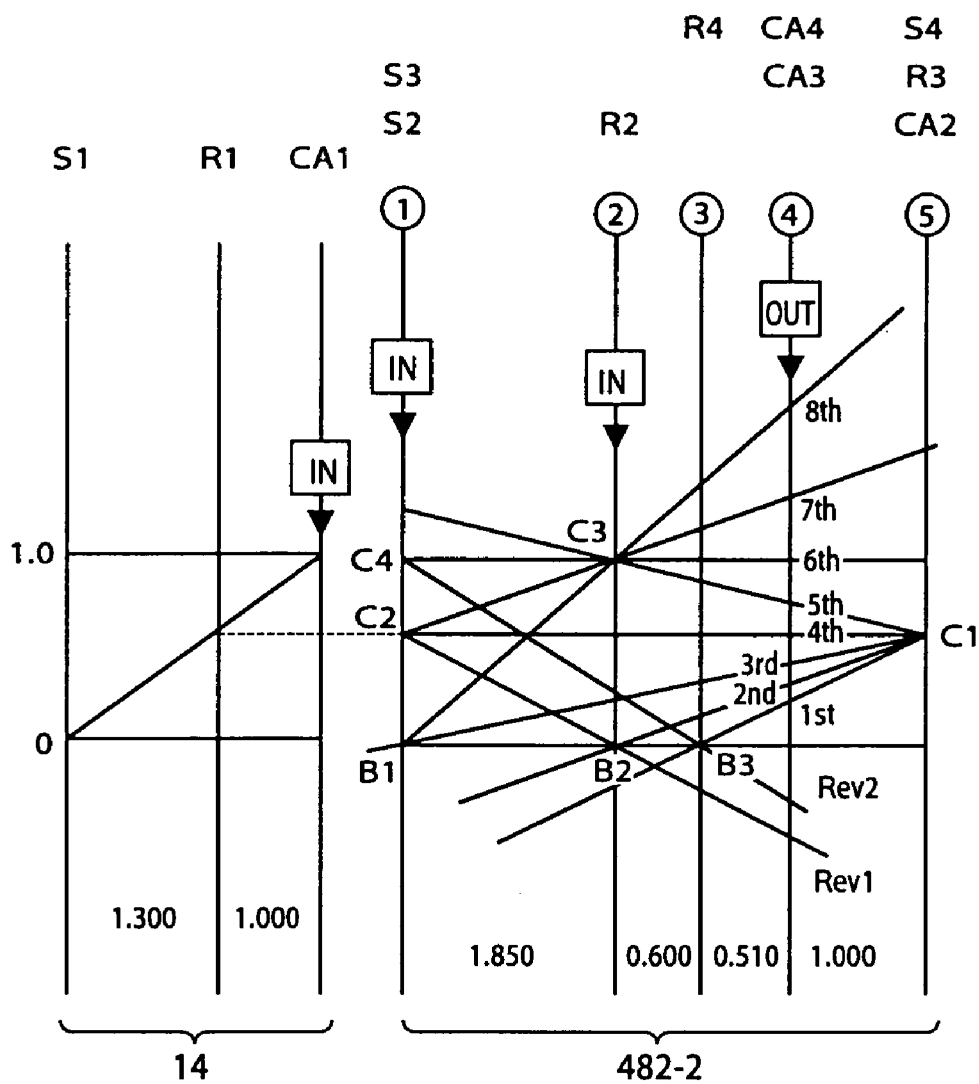

FIG. 134 is a collinear chart of the embodiment in FIG. 132;

FIG. 135 is a view illustrating still another embodiment of the invention, in which a case is shown where the second transmission portion differs in the construction thereof in comparison with the embodiment in FIG. 105, and is a schematic view corresponding to FIG. 105;

FIG. 136 is an operation table of the embodiment in FIG. 135;

FIG. 137 is a collinear chart of the embodiment in FIG. 135;

FIG. 138 is a view illustrating further another embodiment of the invention, in which a case is shown where the fourth clutch C4 differs in the arrangement position thereof in comparison with the embodiment in FIG. 135, and is a schematic view corresponding to FIG. 135;

FIG. 139 is an operation table of the embodiment in FIG. 138;

FIG. 140 is a collinear chart of the embodiment in FIG. 138;

FIG. 141 is a view illustrating further another embodiment of the invention, in which a case is shown where the fourth clutch C4 differs in the arrangement position thereof in comparison with the embodiment in FIG. 135, and is a schematic view corresponding to FIG. 135;

FIG. 142 is an operation table of the embodiment in FIG. 141;

FIG. 143 is a collinear chart of the embodiment in FIG. 141;

FIG. 144 is a view illustrating still another embodiment of the invention, in which a case is shown where the second transmission portion differs in the construction thereof in comparison with the embodiment in FIG. 105, and is a schematic view corresponding to FIG. 105;

FIG. 145 is an operation table of the embodiment in FIG. 144;

FIG. 146 is a collinear chart of the embodiment in FIG. 144;

FIG. 147 is a view illustrating further another embodiment of the invention, in which a case is shown where the fourth clutch C4 differs in the arrangement position thereof in comparison with the embodiment in FIG. 144, and is a schematic view corresponding to FIG. 144;

FIG. 148 is an operation table of the embodiment in FIG. 147;

FIG. 149 is a collinear chart of the embodiment in FIG. 147;

FIG. 150 is a view illustrating still another embodiment of the invention, in which a case is shown where the second transmission portion differs in the construction thereof in comparison with the embodiment in FIG. 105, and is a schematic view corresponding to FIG. 105;

FIG. 151 is an operation table of the embodiment in FIG. 150;

FIG. 152 is a collinear chart of the embodiment in FIG. 150;

FIG. 153 is a view illustrating further another embodiment of the invention, in which a case is shown where the fourth clutch C4 differs in the arrangement position thereof in comparison with the embodiment in FIG. 150, and is a schematic view corresponding to FIG. 150;

FIG. 154 is an operation table of the embodiment in FIG. 153;

FIG. 155 is a collinear chart of the embodiment in FIG. 153;

FIG. 156 is a view illustrating further another embodiment of the invention, in which a case is shown where the fourth clutch C4 differs in the arrangement position thereof in comparison with the embodiment in FIG. 150, and is a schematic view corresponding to FIG. 150;

FIG. 157 is an operation table of the embodiment in FIG. 156;

FIG. 158 is a collinear chart of the embodiment in FIG. 156;

FIG. 159 is a view illustrating still another embodiment of the invention, in which a case is shown where the second transmission portion differs in the construction thereof in comparison with the embodiment in FIG. 105, and is a schematic view corresponding to FIG. 105;

FIG. 160 is an operation table of the embodiment in FIG. 159;

FIG. 161 is a collinear chart of the embodiment in FIG. 159;

FIG. 162 is a view illustrating further another embodiment of the invention, in which a case is shown where the fourth clutch C4 differs in the arrangement position thereof in comparison with the embodiment in FIG. 159, and is a schematic view corresponding to FIG. 159;

FIG. 163 is an operation table of the embodiment in FIG. 162;

FIG. 164 is a collinear chart of the embodiment in FIG. 162;

FIG. 165 is a view illustrating still another embodiment of the invention, in which a case is shown where the second transmission portion differs in the construction thereof in comparison with the embodiment in FIG. 105, and is a schematic view corresponding to FIG. 105;

FIG. 166 is an operation table of the embodiment in FIG. 165;

FIG. 167 is a collinear chart of the embodiment in FIG. 165;

FIG. 168 is a view illustrating further another embodiment of the invention, in which a case is shown where the fourth clutch C4 differs in the arrangement position thereof in comparison with the embodiment in FIG. 165, and is a schematic view corresponding to FIG. 165;

FIG. 169 is an operation table of the embodiment in FIG. 168;

FIG. 170 is a collinear chart of the embodiment in FIG. 168;

FIG. 171 is a view illustrating further another embodiment of the invention, in which a case is shown where the fourth clutch C4 differs in the arrangement position thereof in comparison with the embodiment in FIG. 165, and is a schematic view corresponding to FIG. 165;

FIG. 172 is an operation table of the embodiment in FIG. 171;

FIG. 173 is a collinear chart of the embodiment in FIG. 171;

FIG. 174 is a view illustrating still another embodiment of the invention, in which a case is shown where the second transmission portion differs in the construction thereof in comparison with the embodiment in FIG. 105, and is a schematic view corresponding to FIG. 105;

FIG. 175 is an operation table of the embodiment in FIG. 174;

FIG. 176 is a collinear chart of the embodiment in FIG. 174;

FIG. 177 is a view illustrating further another embodiment of the invention, in which a case is shown where the fourth clutch C4 differs in the arrangement position thereof in comparison with the embodiment in FIG. 174, and is a schematic view corresponding to FIG. 174;

FIG. 178 is an operation table of the embodiment in FIG. 177;

FIG. 179 is a collinear chart of the embodiment in FIG. 177;

FIG. 180 is a view illustrating still another embodiment of the invention, in which a case is shown where the second transmission portion differs in the construction thereof in comparison with the embodiment in FIG. 105, and is a schematic view corresponding to FIG. 105;

FIG. 181 is an operation table of the embodiment in FIG. 180;

FIG. 182 is a collinear chart of the embodiment in FIG. 180;

FIG. 183 is a view illustrating further another embodiment of the invention, in which a case is shown where the fourth clutch C4 differs in the arrangement position thereof in comparison with the embodiment in FIG. 180, and is a schematic view corresponding to FIG. 180;

FIG. 184 is an operation table of the embodiment in FIG. 183;

FIG. 185 is a collinear chart of the embodiment in FIG. 183;

FIG. 186 is a view illustrating still another embodiment of the invention, in which a case is shown where the second transmission portion differs in the construction thereof in comparison with the embodiment in FIG. 105, and is a schematic view corresponding to FIG. 105;

FIG. 187 is an operation table of the embodiment in FIG. 186;

FIG. 188 is a collinear chart of the embodiment in FIG. 186;

FIG. 189 is a view illustrating further another embodiment of the invention, in which a case is shown where the fourth clutch C4 differs in the arrangement position thereof in comparison with the embodiment in FIG. 186, and is a schematic view corresponding to FIG. 186;

FIG. 190 is an operation table of the embodiment in FIG. 189;

FIG. 191 is a collinear chart of the embodiment in FIG. 189;

FIG. 192 is a view illustrating still another embodiment of the invention, in which a case is shown where the second transmission portion differs in the construction thereof in comparison with the embodiment in FIG. 105, and is a schematic view corresponding to FIG. 105;

FIG. 193 is an operation table of the embodiment in FIG. 192;

FIG. 194 is a collinear chart of the embodiment in FIG. 192;

FIG. 195 is a view illustrating further another embodiment of the invention, in which a case is shown where the fourth clutch C4 differs in the arrangement position thereof in comparison with the embodiment in FIG. 192, and is a schematic view corresponding to FIG. 192;

FIG. 196 is an operation table of the embodiment in FIG. 195;

FIG. 197 is a collinear chart of the embodiment in FIG. 195;

FIG. 198 is a view illustrating still another embodiment of the invention, in which a case is shown where the second transmission portion differs in the construction thereof in comparison with the embodiment in FIG. 192, and is a schematic view corresponding to FIG. 192;

FIG. 199 is an operation table of the embodiment in FIG. 198;

FIG. 200 is a collinear chart of the embodiment in FIG. 198;

FIG. 201 is a view illustrating further another embodiment of the invention, in which a case is shown where the fourth clutch C4 differs in the arrangement position thereof in comparison with the embodiment in FIG. 198, and is a schematic view corresponding to FIG. 198;

FIG. 202 is an operation table of the embodiment in FIG. 201;

FIG. 203 is a collinear chart of the embodiment in FIG. 201;

FIG. 204 is a view illustrating still another embodiment of the invention, in which a case is shown where the second transmission portion differs in the construction thereof in comparison with the embodiment in FIG. 168, and is a schematic view corresponding to FIG. 168;

FIG. 205 is an operation table of the embodiment in FIG. 204;

FIG. 206 is a collinear chart of the embodiment in FIG. 204;

FIG. 207 is a view illustrating further another embodiment of the invention, in which a case is shown where the fourth clutch C4 differs in the arrangement position thereof in comparison with the embodiment in FIG. 204, and is a schematic view corresponding to FIG. 204;

FIG. 208 is an operation table of the embodiment in FIG. 207;

FIG. 209 is a collinear chart of the embodiment in FIG. 207;

FIG. 210 is a view illustrating still another embodiment of the invention, in which a case is shown where the second transmission portion differs in the construction thereof in comparison with the embodiment in FIG. 204, and is a schematic view corresponding to FIG. 204;

FIG. 211 is an operation table of the embodiment in FIG. 210;

FIG. 212 is a collinear chart of the embodiment in FIG. 210;

FIG. 213 is a view illustrating further another embodiment of the invention, in which a case is shown where the fourth clutch C4 differs in the arrangement position thereof in comparison with the embodiment in FIG. 210, and is a schematic view corresponding to FIG. 210;

FIG. 214 is an operation table of the embodiment in FIG. 213;

FIG. 215 is a collinear chart of the embodiment in FIG. 213;

FIG. 216 is a view illustrating still another embodiment of the invention, in which a case is shown where the second transmission portion differs in the construction thereof in comparison with the embodiment in FIG. 204, and is a schematic view corresponding to FIG. 204;

FIG. 217 is an operation table of the embodiment in FIG. 216;

FIG. 218 is a collinear chart of the embodiment in FIG. 216;

FIG. 219 is a view illustrating further another embodiment of the invention, in which a case is shown where the fourth clutch C4 differs in the arrangement position thereof in comparison with the embodiment in FIG. 216, and is a schematic view corresponding to FIG. 216;

FIG. 220 is an operation table of the embodiment in FIG. 219;

FIG. 221 is a collinear chart of the embodiment in FIG. 219;

FIG. 222 is a view illustrating still another embodiment of the invention, in which a case is shown where the second transmission portion differs in the construction thereof in comparison with the embodiment in FIG. 204, and is a schematic view corresponding to FIG. 204;

FIG. 223 is an operation table of the embodiment in FIG. 222;

FIG. 224 is a collinear chart of the embodiment in FIG. 222;

FIG. 225 is a view illustrating further another embodiment of the invention, in which a case is shown where the fourth clutch C4 differs in the arrangement position thereof in comparison with the embodiment in FIG. 222, and is a schematic view corresponding to FIG. 222;

FIG. 226 is an operation table of the embodiment in FIG. 225;

FIG. 227 is a collinear chart of the embodiment in FIG. 225;

FIG. 228 is a view illustrating still another embodiment of the invention, in which a case is shown where the second transmission portion differs in the construction thereof in comparison with the embodiment in FIG. 111, and is a schematic view corresponding to FIG. 111;

FIG. 229 is an operation table of the embodiment in FIG. 228;

FIG. 230 is a collinear chart of the embodiment in FIG. 228; which FIG. 231 is a view illustrating further another embodiment of the invention, in which a case is shown where the fourth clutch C4 differs in the arrangement position thereof in comparison with the embodiment in FIG. 228, and is a schematic view corresponding to FIG. 228;

FIG. 232 is an operation table of the embodiment in FIG. 231;

FIG. 233 is a collinear chart of the embodiment in FIG. 231;

FIG. 234 is a view illustrating still another embodiment of the invention and is a schematic view illustrating an automatic transmission for vehicle, in which the fifth planetary gear set is disposed in the second transmission portion in comparison with the embodiment of FIG. 1;

FIG. 235 is an operation table of the embodiment in FIG. 234;

FIG. 236 is a collinear chart of the embodiment in FIG. 234;

FIG. 237 is an operation view in which the range of transmission ratios in the embodiment of FIG. 234 is made into close gear ratios with respect to FIG. 235;

FIG. 238 is a collinear view in which the range of transmission ratios in the embodiment of FIG. 234 is made into close gear ratios with respect to FIG. 236;

FIG. 239 is another operation view of the embodiment of FIG. 234;

FIG. 240 is another collinear chart of the embodiment in FIG. 234;

FIG. 241 is an operation view in which the range of transmission ratios in the embodiment of FIG. 234 is made into wide gear ratios with respect to FIG. 239;

FIG. 242 is a collinear view in which the range of transmission ratios in the embodiment of FIG. 234 is made into wide gear ratios with respect to FIG. 240;

FIG. 243 is a view illustrating still another embodiment of the invention in order to describe one example in which another gear stage is established in comparison with the embodiment of FIG. 25, wherein (a) is a schematic view corresponding to FIG. 25 and (b) is an operation table for establishing respective gear stages;

FIG. 244 is a collinear chart of the embodiment in FIG. 243;

FIGS. 245(*a*) and 245(*b*) are views illustrating still another embodiment of the invention, in which a case is shown where the second transmission portion differs in the construction thereof in comparison with the embodiment of FIG. 3, and corresponding to FIG. 3;

FIG. 246 is a collinear chart of the embodiment in FIG. 245;

FIGS. 247(*a*) and 247(*b*) are views illustrating further another embodiment of the invention, in which a case is shown where the fourth clutch C4 differs in the arrangement position thereof in comparison with the embodiment in FIG. 245, and corresponding to FIG. 245;

FIG. 248 is a collinear chart of the embodiment in FIG. 247;

FIGS. 249(*a*) and 249(*b*) are views illustrating further another embodiment of the invention, in which a case is shown where the fourth clutch C4 differs in the arrangement position thereof in comparison with the embodiment in FIG. 245, and corresponding to FIG. 245;

FIG. 250 is a collinear chart of the embodiment in FIG. 249;

FIGS. 251(*a*) and 251(*b*) are views illustrating still another embodiment of the invention, in which a case is shown where the second transmission portion differs in the construction thereof in comparison with the embodiment of FIG. 245, and corresponding to FIG. 245;

FIG. 252 is a collinear chart of the embodiment in FIG. 251;

FIGS. 253(*a*) and 253(*b*) are views illustrating further another embodiment of the invention, in which a case is shown where the fourth clutch C4 differs in the arrangement position thereof in comparison with the embodiment in FIG. 251, and corresponding to FIG. 251;

FIG. 254 is a collinear chart of the embodiment in FIG. 253;

FIGS. 255(*a*) and 255(*b*) are views illustrating further another embodiment of the invention, in which a case is shown where the fourth clutch C4 differs in the arrangement position thereof in comparison with the embodiment in FIG. 251, and corresponding to FIG. 251;

FIG. 256 is a collinear chart of the embodiment in FIG. 255;

FIGS. 257(*a*) and 257(*b*) are views illustrating still another embodiment of the invention, in which a case is shown where the second transmission portion differs in the construction thereof in comparison with the embodiment of FIG. 245, and corresponding to FIG. 245;

FIG. 258 is a collinear chart of the embodiment in FIG. 257;

FIGS. 259(*a*) and 259(*b*) are views illustrating further another embodiment of the invention, in which a case is shown where the fourth clutch C4 differs in the arrangement position thereof in comparison with the embodiment in FIG. 257, and corresponding to FIG. 257;

FIG. 260 is a collinear chart of the embodiment in FIG. 259;

FIGS. 261(*a*) and 261(*b*) are views illustrating further another embodiment of the invention, in which a case is shown where the fourth clutch C4 differs in the arrangement position thereof in comparison with the embodiment in FIG. 257, and corresponding to FIG. 257;

FIG. 262 is a collinear chart of the embodiment in FIG. 261;

FIGS. 263(*a*) and 263(*b*) are views illustrating still another embodiment of the invention, in which a case is shown where the second transmission portion differs in the construction thereof in comparison with the embodiment of FIG. 245, and corresponding to FIG. 245;

FIG. 264 is a collinear chart of the embodiment in FIG. 263;

FIGS. 265(*a*) and 265(*b*) are views illustrating further another embodiment of the invention, in which a case is shown where the fourth clutch C4 differs in the arrangement position thereof in comparison with the embodiment in FIG. 263, and corresponding to FIG. 263;

FIG. 266 is a collinear chart of the embodiment in FIG. 265;

FIGS. 267(*a*) and 267(*b*) are views illustrating further another embodiment of the invention, in which a case is shown where the fourth clutch C4 differs in the arrangement position thereof in comparison with the embodiment in FIG. 263, and corresponding to FIG. 263;

FIG. 268 is a collinear chart of the embodiment in FIG. 267;

FIGS. 269(*a*) and 269(*b*) are views illustrating still another embodiment of the invention, in which a case is shown where the second transmission portion differs in the construction thereof in comparison with the embodiment of FIG. 245, and corresponding to FIG. 245;

FIG. 270 is a collinear chart of the embodiment in FIG. 269;

FIGS. 271(*a*) and 271(*b*) are views illustrating further another embodiment of the invention, in which a case is shown where the fourth clutch C4 differs in the arrangement position thereof in comparison with the embodiment in FIG. 269, and corresponding to FIG. 269;

FIG. 272 is a collinear chart of the embodiment in FIG. 271;

FIGS. 273(*a*) and 273(*b*) are views illustrating further another embodiment of the invention, in which a case is shown where the fourth clutch C4 differs in the arrangement position thereof in comparison with the embodiment in FIG. 269, and corresponding to FIG. 269;

FIG. 274 is a collinear chart of the embodiment in FIG. 273;

FIGS. 275(*a*) and 275(*b*) are views illustrating still another embodiment of the invention, in which a case is shown where the second transmission portion differs in the construction thereof in comparison with the embodiment of FIG. 1, and corresponding to FIG. 1;

FIG. 276 is a collinear chart of the embodiment in FIG. 275;

FIGS. 277(*a*) and 277(*b*) are views illustrating further another embodiment of the invention, in which a case is shown where the fourth clutch C4 differs in the arrangement position thereof in comparison with the embodiment in FIG. 275, and corresponding to FIG. 275;

FIG. 278 is a collinear chart of the embodiment in FIG. 277;

FIGS. 279(*a*) and 279(*b*) are views illustrating further another embodiment of the invention, in which a case is shown where the fourth clutch C4 differs in the arrangement position thereof in comparison with the embodiment in FIG. 275, and corresponding to FIG. 275;

FIG. 280 is a collinear chart of the embodiment in FIG. 279;

FIGS. 281(*a*) and 281(*b*) are views illustrating further another embodiment of the invention, in which a case is shown where the fourth clutch C4 differs in the arrangement position thereof in comparison with the embodiment in FIG. 275, and corresponding to FIG. 275;

FIG. 282 is a collinear chart of the embodiment in FIG. 281;

FIGS. 283(*a*) and 283(*b*) are views illustrating still another embodiment of the invention, in which a case is shown where the second transmission portion differs in the construction thereof in comparison with the embodiment of FIG. 245, and corresponding to FIG. 245;

FIG. 284 is a collinear chart of the embodiment in FIG. 283;

FIGS. 285(*a*) and 285(*b*) are views illustrating further another embodiment of the invention, in which a case is shown where the fourth clutch C4 differs in the arrangement position thereof in comparison with the embodiment in FIG. 283, and corresponding to FIG. 283;

FIG. 286 is a collinear chart of the embodiment in FIG. 285;

FIGS. 287(*a*) and 287(*b*) are views illustrating further another embodiment of the invention, in which a case is shown where the fourth clutch C4 differs in the arrangement position thereof in comparison with the embodiment in FIG. 283, and corresponding to FIG. 283;

FIG. 288 is a collinear chart of the embodiment in FIG. 287;

FIGS. 289(*a*) and 289(*b*) are views illustrating still another embodiment of the invention, in which a case is shown where the second transmission portion differs in the construction thereof in comparison with the embodiment of FIG. 245, and corresponding to FIG. 245;

FIG. 290 is a collinear chart of the embodiment in FIG. 289;

FIGS. 291(*a*) and 291(*b*) are views illustrating further another embodiment of the invention, in which a case is shown where the fourth clutch C4 differs in the arrangement position thereof in comparison with the embodiment in FIG. 289, and corresponding to FIG. 289;

FIG. 292 is a collinear chart of the embodiment in FIG. 291;

FIGS. 293(*a*) and 293(*b*) are views illustrating further another embodiment of the invention, in which a case is shown where the fourth clutch C4 differs in the arrangement position thereof in comparison with the embodiment in FIG. 289, and corresponding to FIG. 289;

FIG. 294 is a collinear chart of the embodiment in FIG. 293;

FIGS. 295(*a*) and 295(*b*) are views illustrating still another embodiment of the invention, in which a case is shown where the second transmission portion differs in the construction thereof in comparison with the embodiment of FIG. 245, and corresponding to FIG. 245;

FIG. 296 is a collinear chart of the embodiment in FIG. 295;

FIGS. 297(*a*) and 297(*b*) are views illustrating further another embodiment of the invention, in which a case is shown where the fourth clutch C4 differs in the arrangement position thereof in comparison with the embodiment in FIG. 295, and corresponding to FIG. 295;

FIG. 298 is a collinear chart of the embodiment in FIG. 297;

FIGS. 299(*a*) and 299(*b*) are views illustrating further another embodiment of the invention, in which a case is shown where the fourth clutch C4 differs in the arrangement position thereof in comparison with the embodiment in FIG. 295, and corresponding to FIG. 295;

FIG. 300 is a collinear chart of the embodiment in FIG. 299;

FIGS. 301(*a*) and 301(*b*) are views illustrating still another embodiment of the invention, in which a case is shown where the second transmission portion differs in the construction thereof in comparison with the embodiment of FIG. 245, and corresponding to FIG. 245;

FIG. 302 is a collinear chart of the embodiment in FIG. 301;

FIGS. 303(*a*) and 303(*b*) are views illustrating further another embodiment of the invention, in which a case is shown where the fourth clutch C4 differs in the arrangement position thereof in comparison with the embodiment in FIG. 301, and corresponding to FIG. 301;

FIG. 304 is a collinear chart of the embodiment in FIG. 303;

FIGS. 305(*a*) and 305(*b*) are views illustrating further another embodiment of the invention, in which a case is shown where the fourth clutch C4 differs in the arrangement position thereof in comparison with the embodiment in FIG. 301, and corresponding to FIG. 301;

FIG. 306 is a collinear chart of the embodiment in FIG. 305;

FIGS. 307(*a*) and 307(*b*) are views illustrating still another embodiment of the invention, in which a case is shown where the second transmission portion differs in the construction thereof in comparison with the embodiment of FIG. 245, and corresponding to FIG. 245;

FIG. 308 is a collinear chart of the embodiment in FIG. 307;.

Figures 309A, 309B:
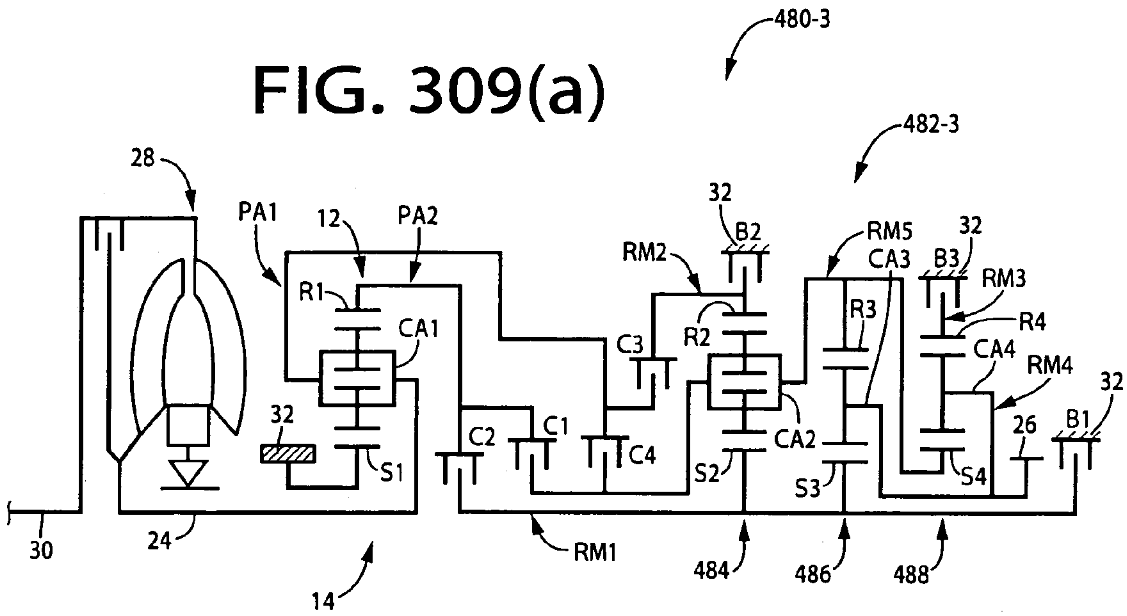
Figure 310:
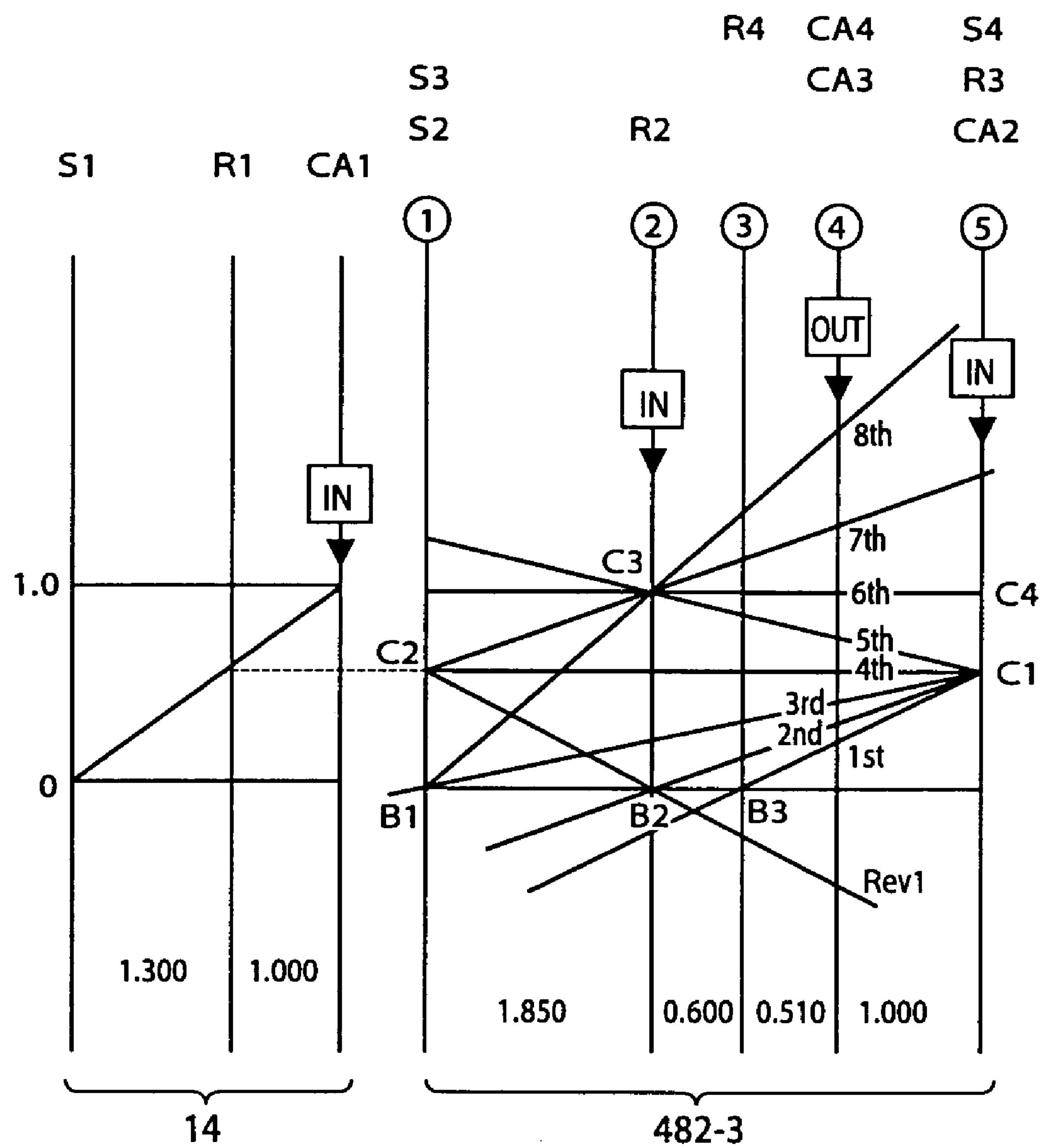
Figures 311A, 311B:
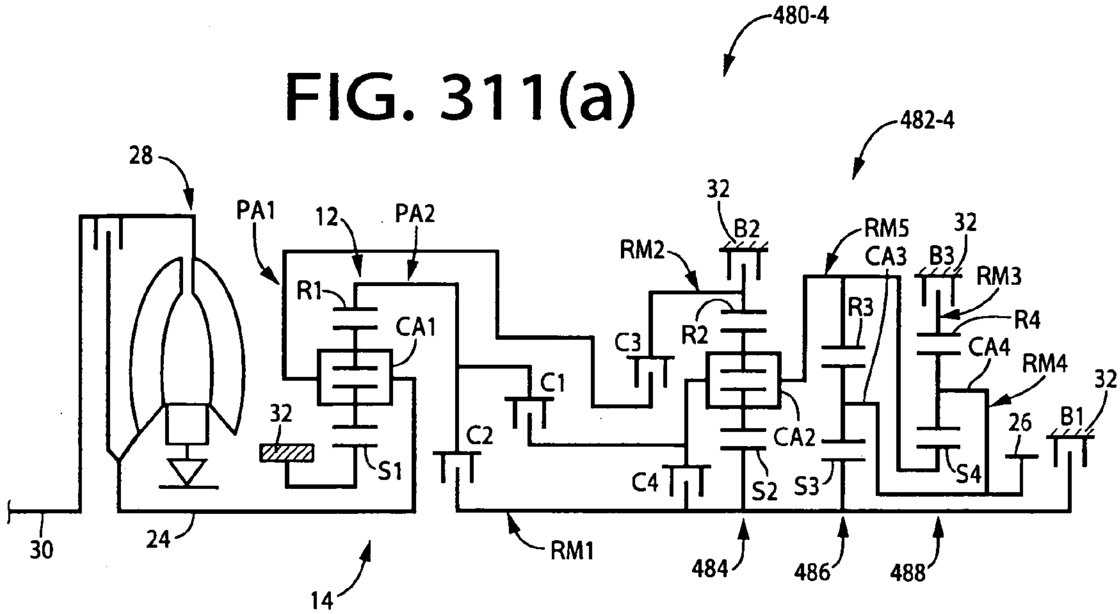
Figure 312:
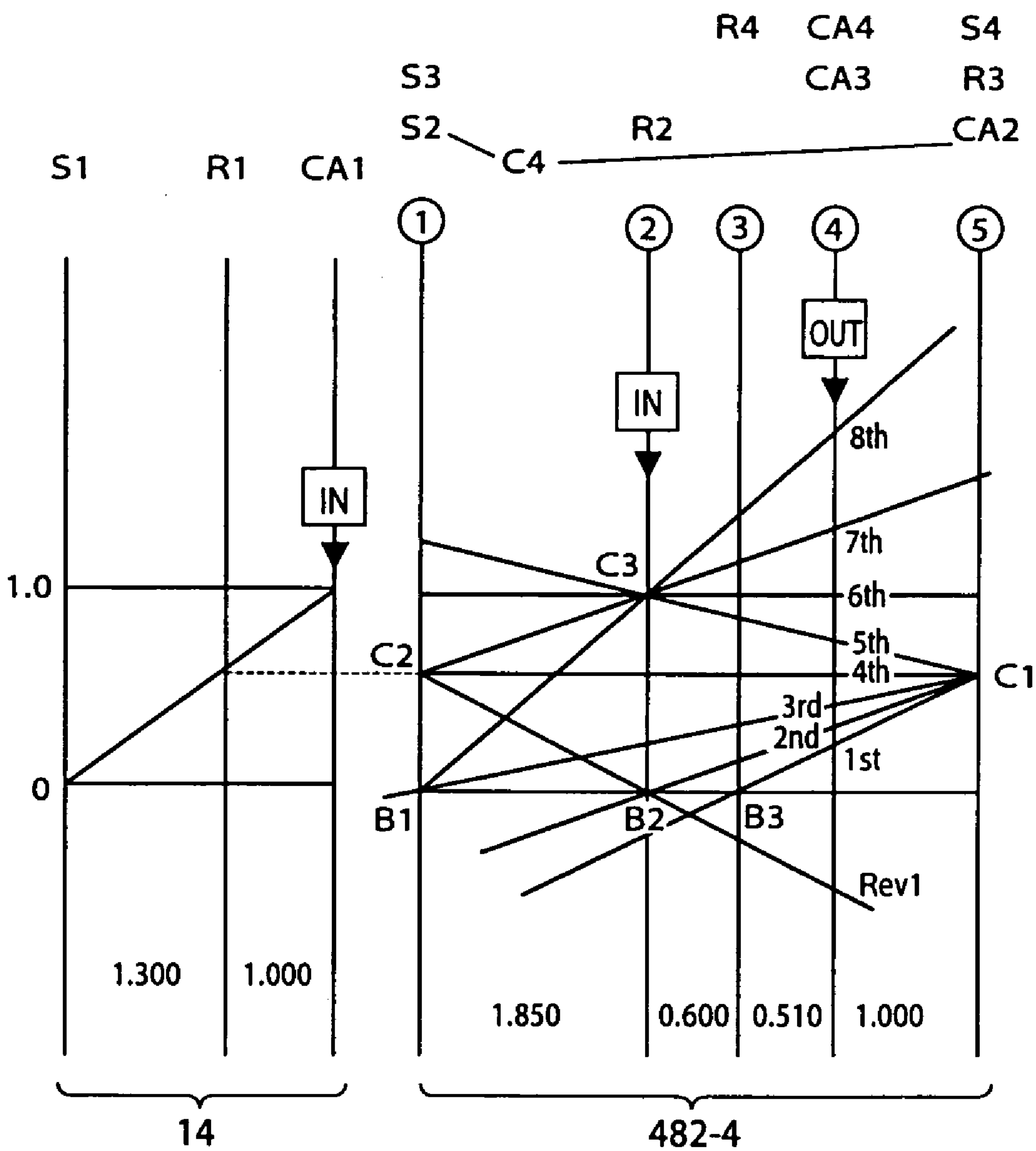
Figures 313A, 313B:
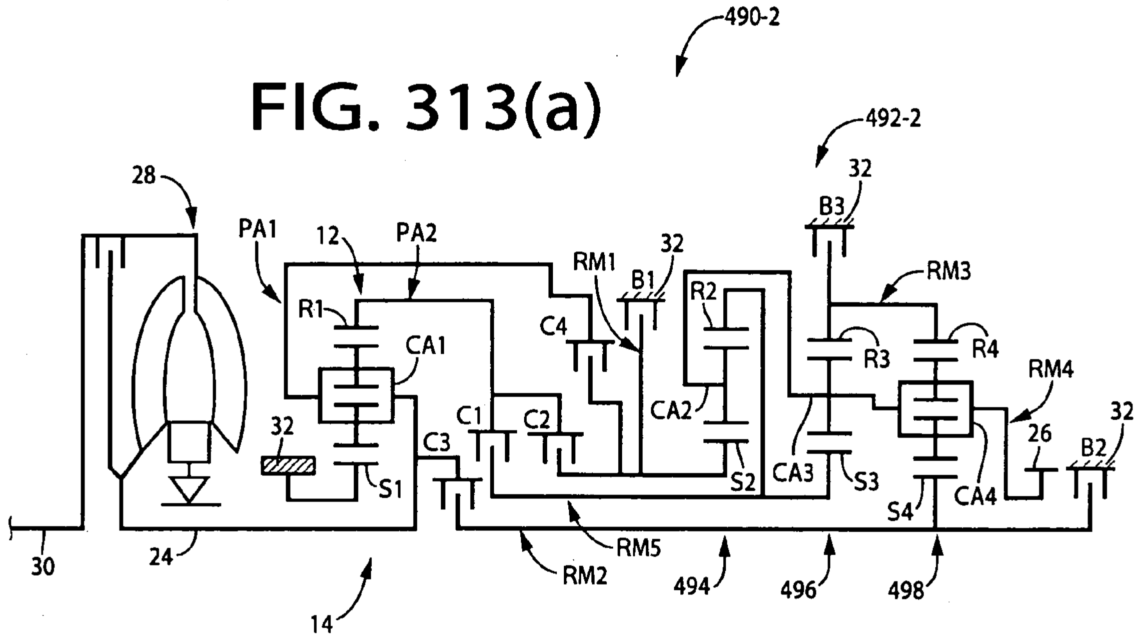
Figure 314:
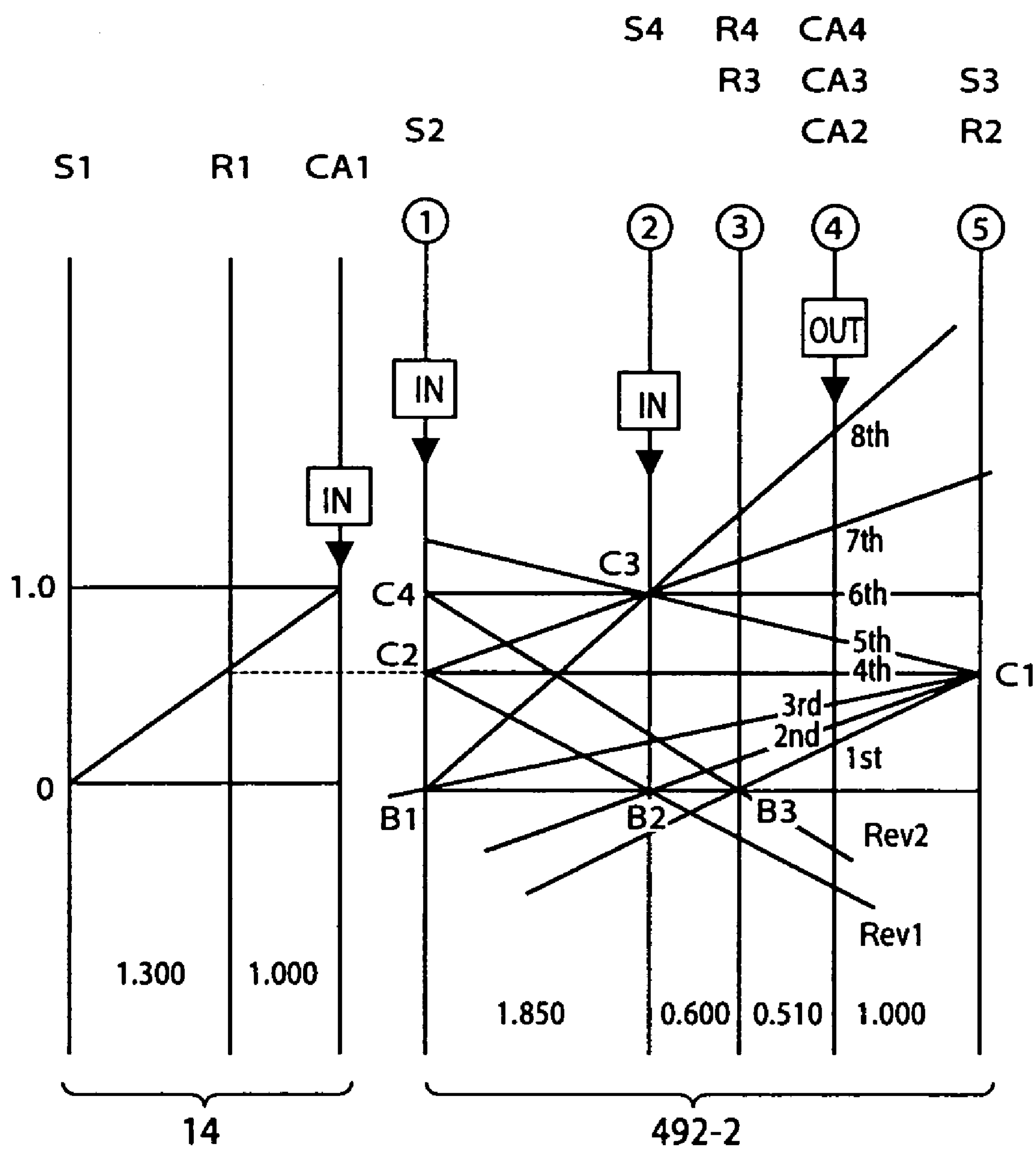
Figures 315A, 315B:
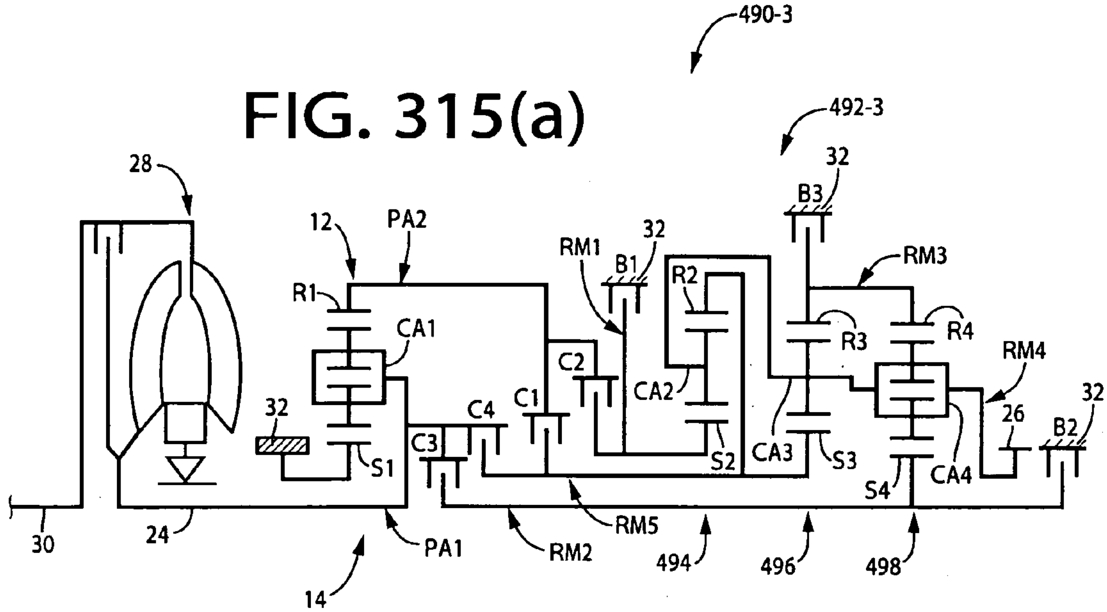
Figure 316:
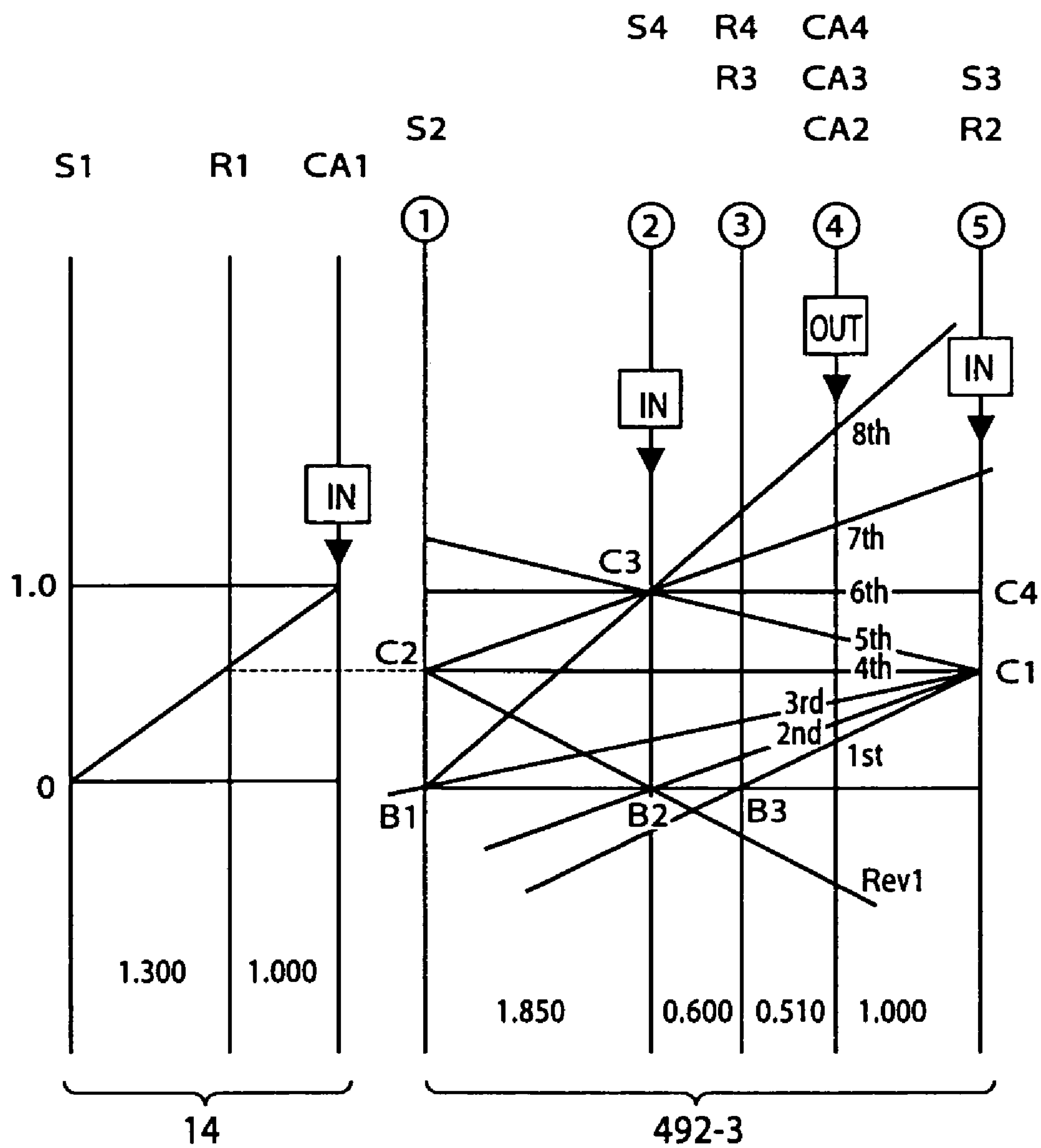
Figures 317A, 317B:
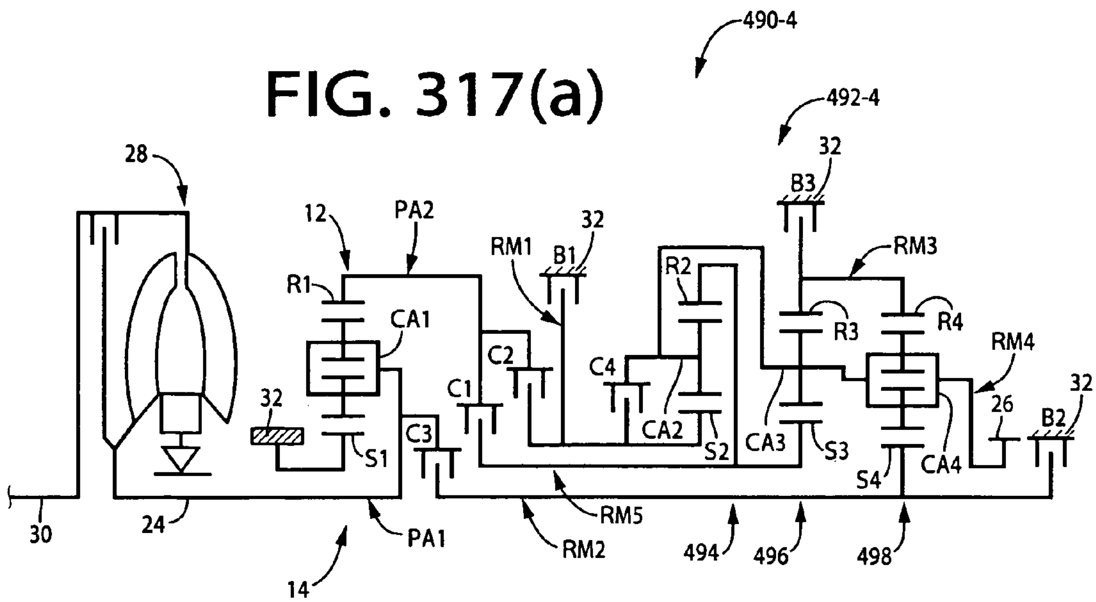
Figures 319A, 319B:
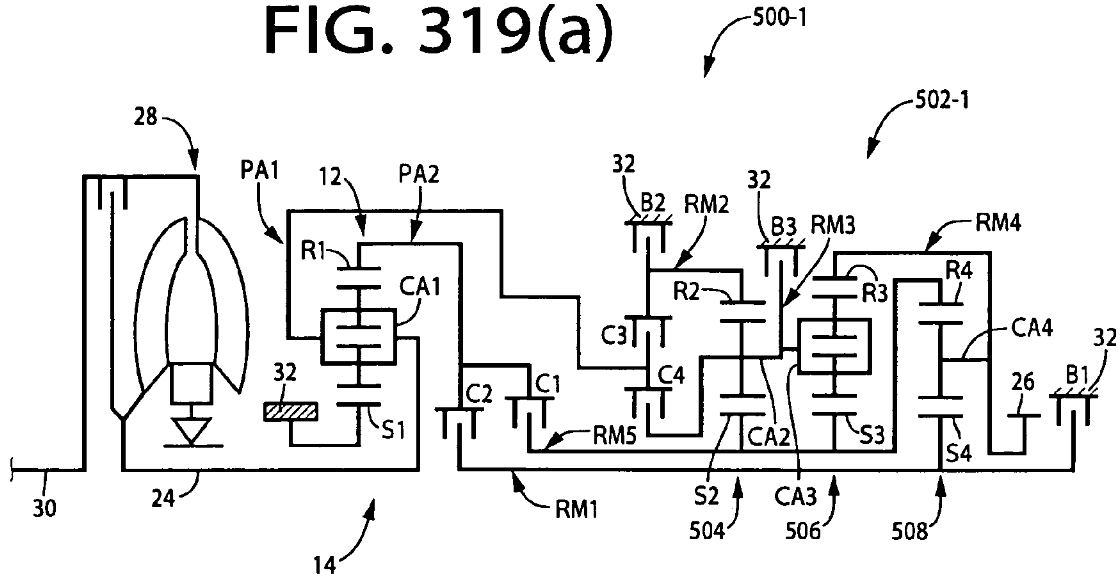
Figure 320:
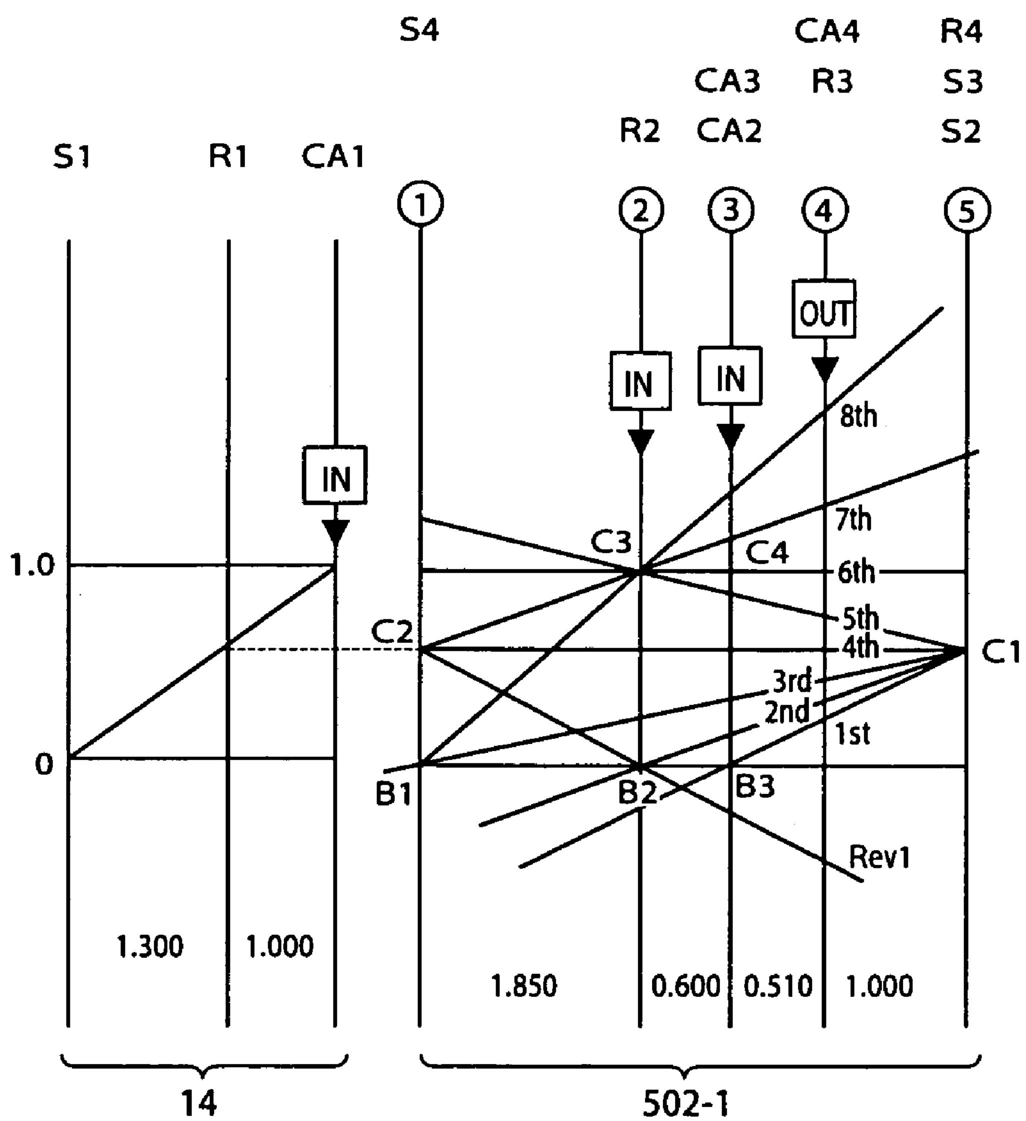
Figures 321A, 321B:
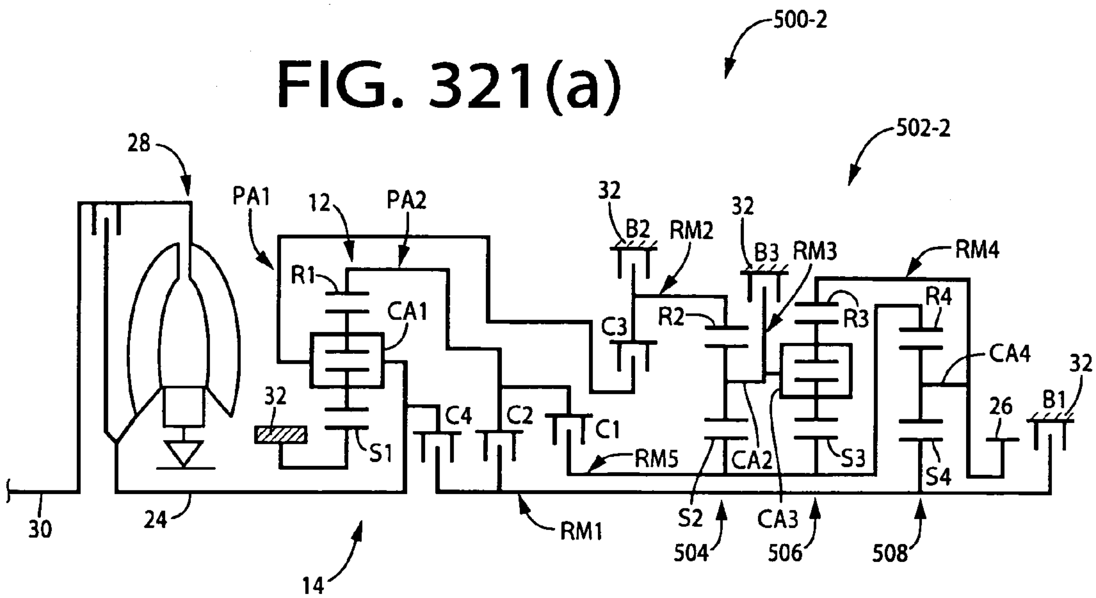
Figure 322:
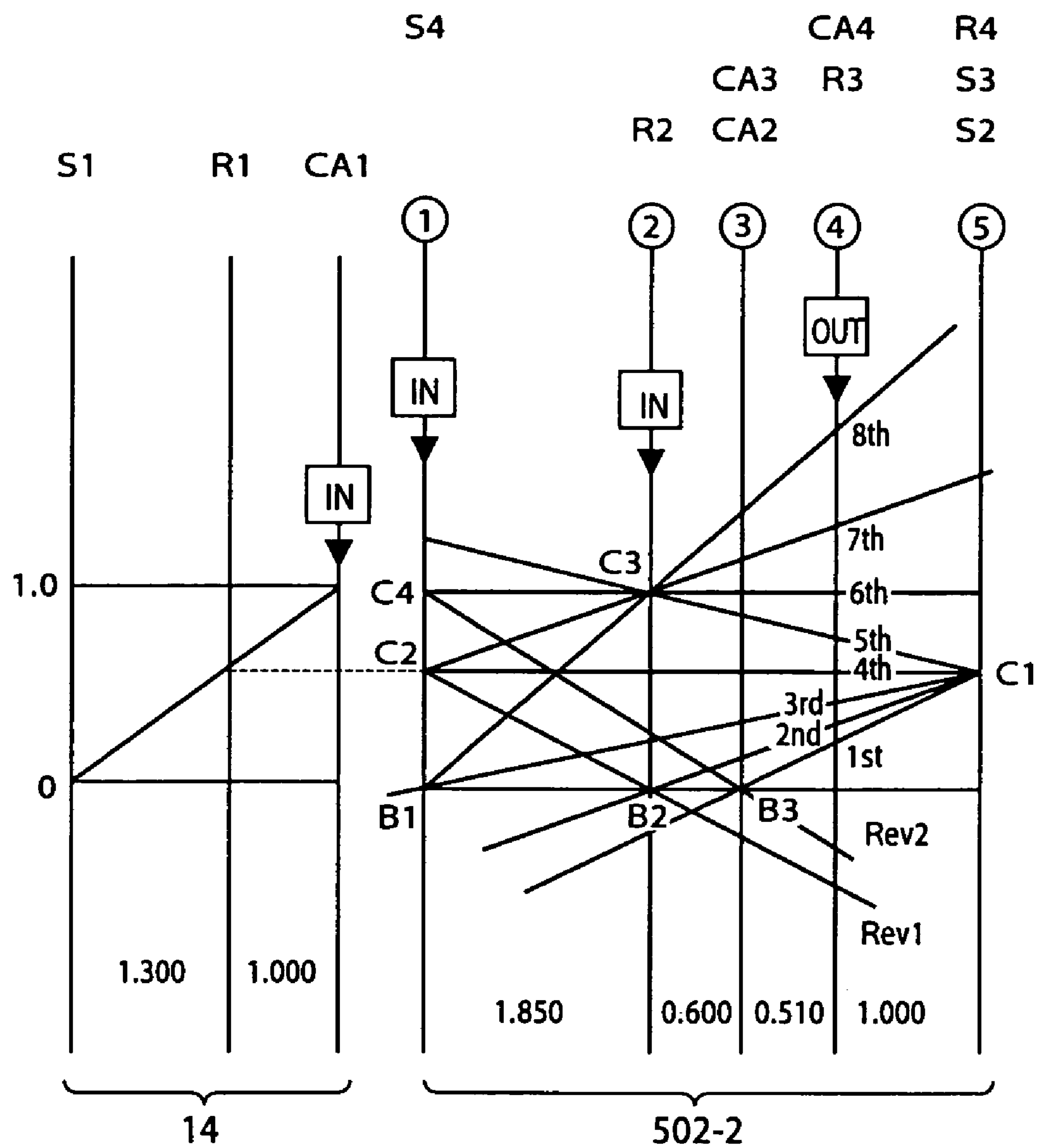
Figures 323A, 323B:
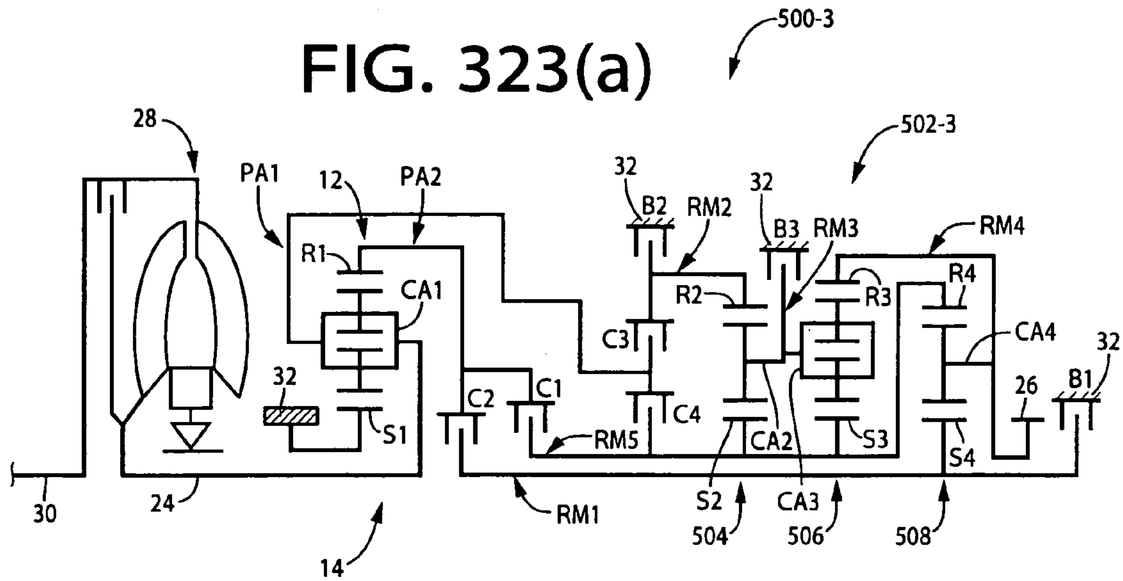
Figure 324:
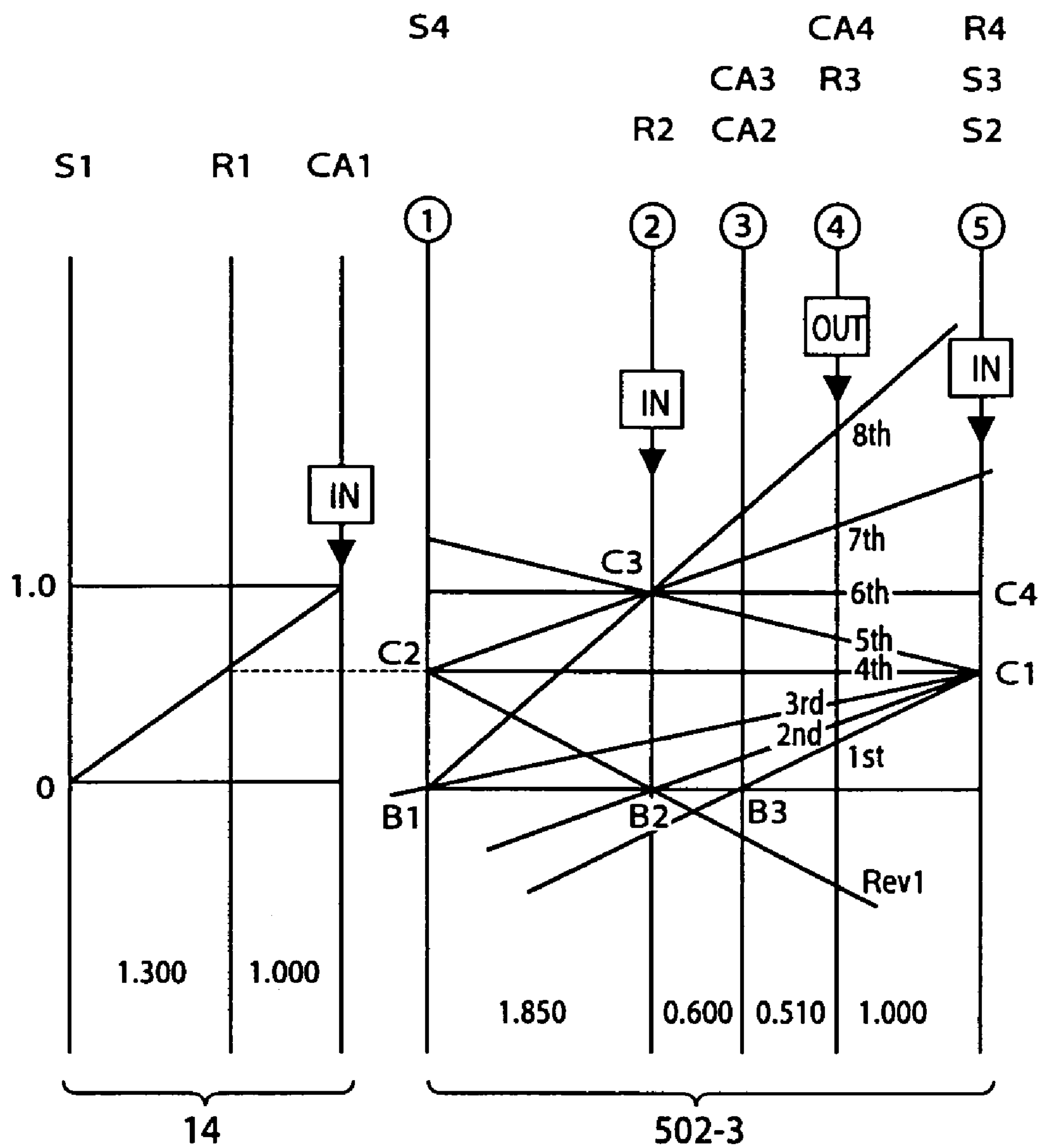
Figures 325A, 325B:
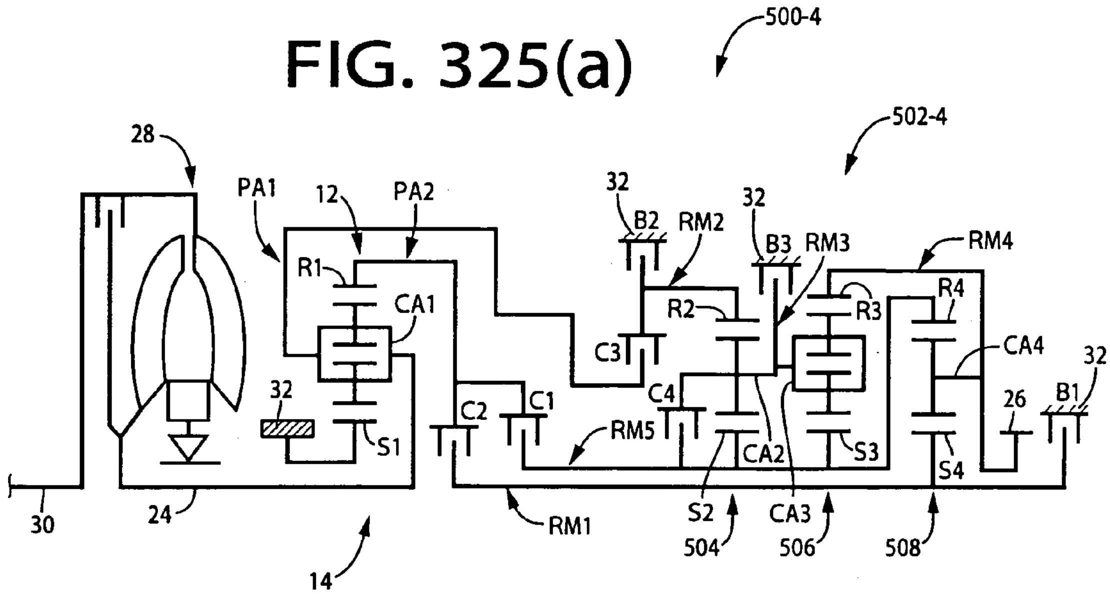
Figure 326:
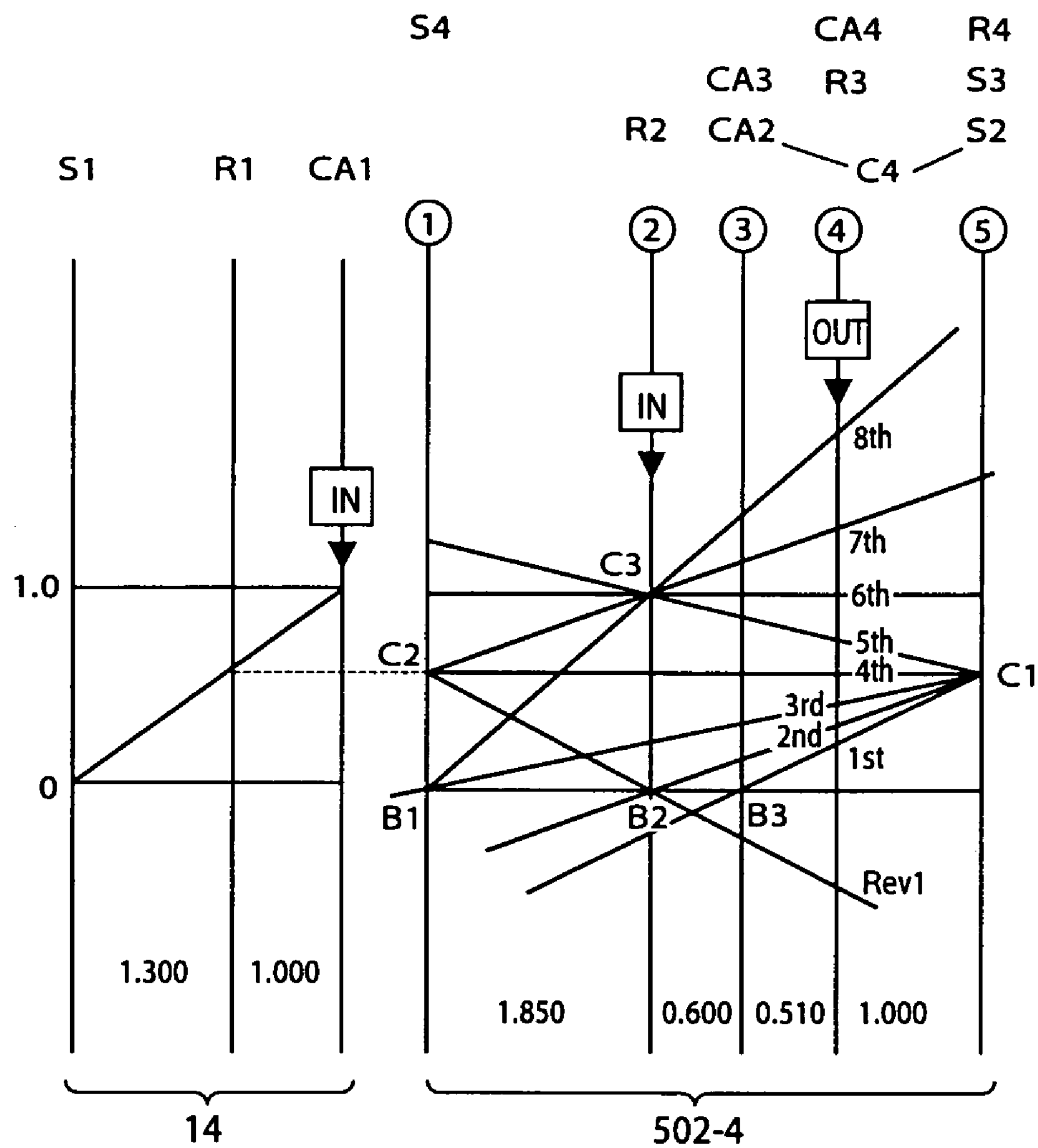
Figures 327A, 327B:
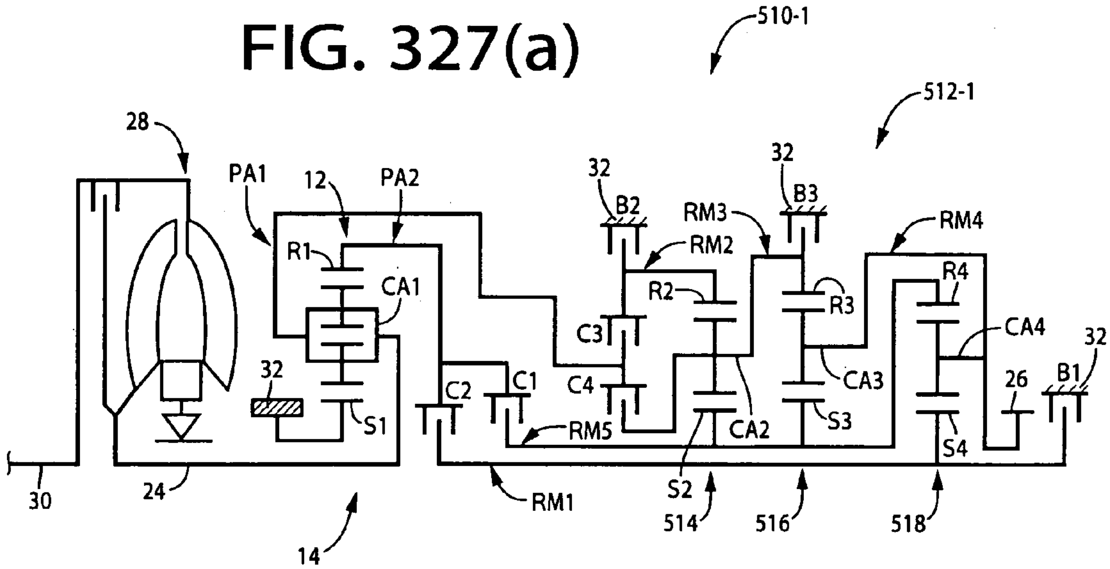
Figure 328:
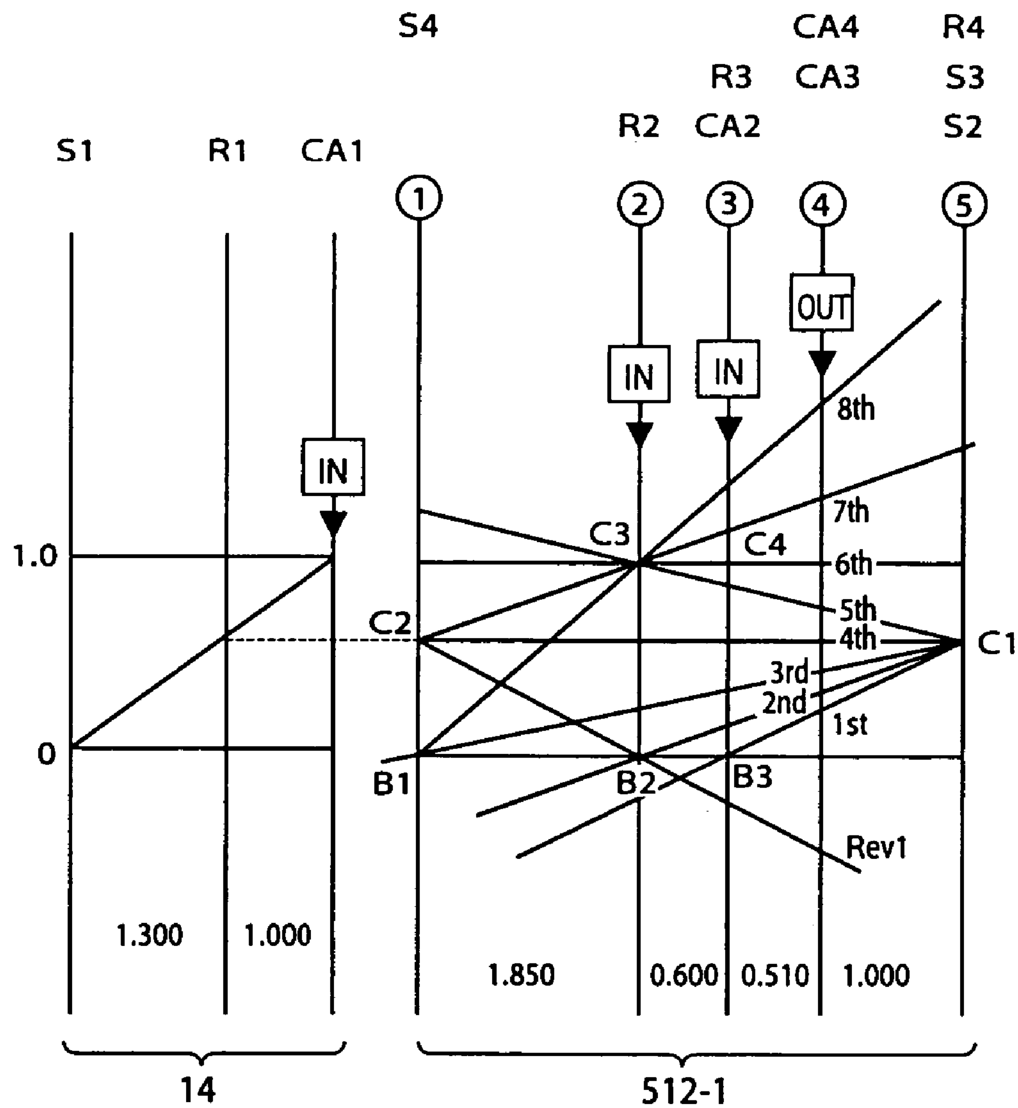
Figures 329A, 329B:
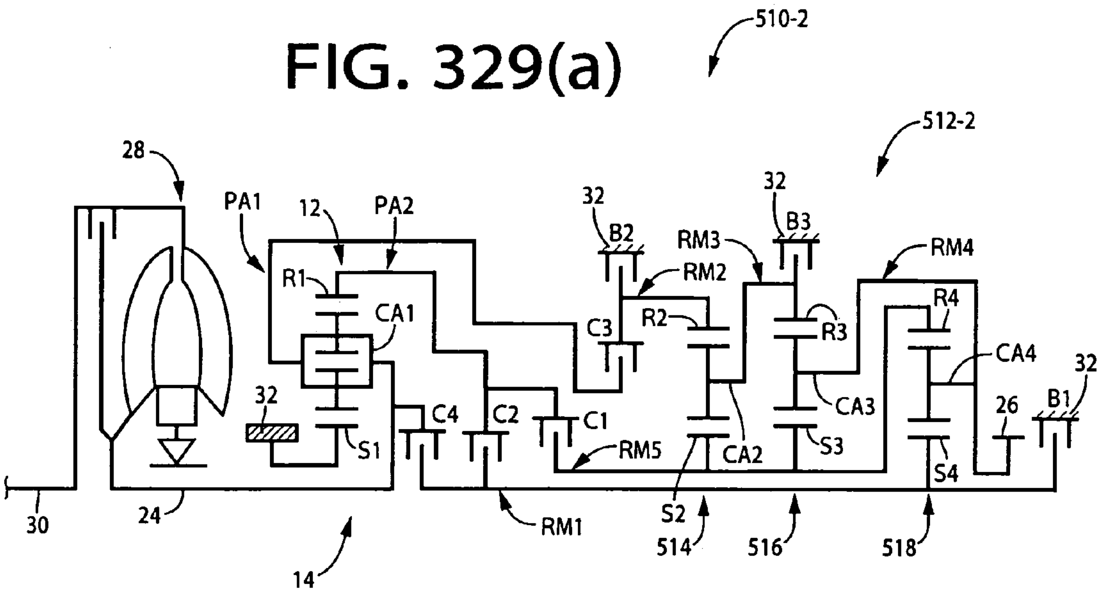
Figure 330:
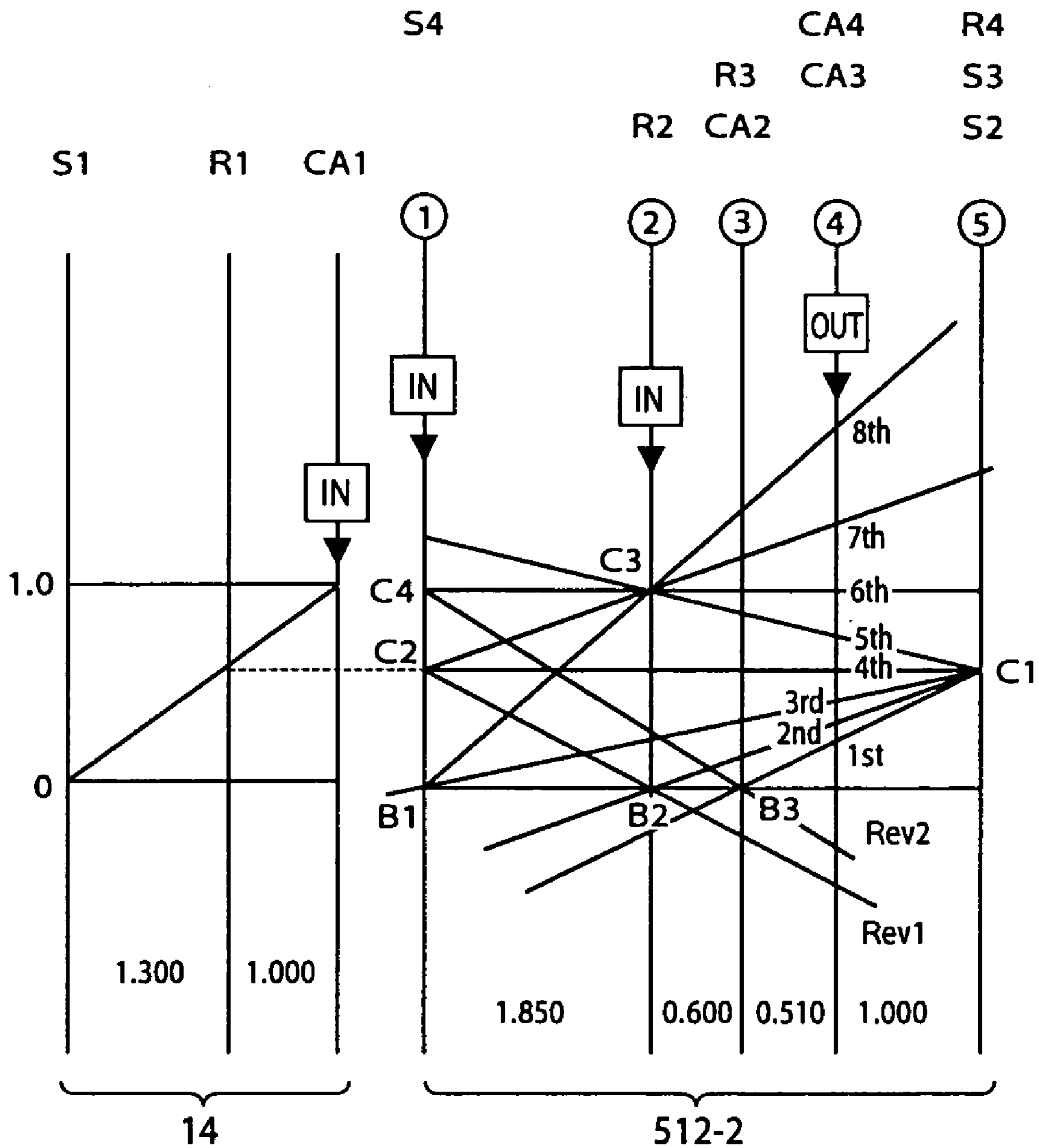
Figures 331A, 331B:
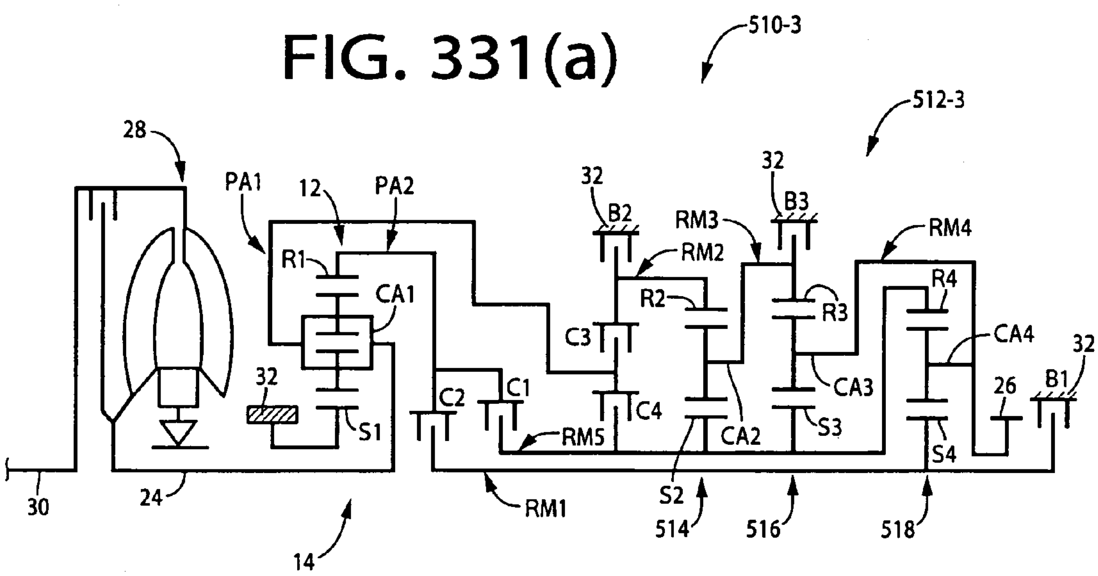
Figure 332:
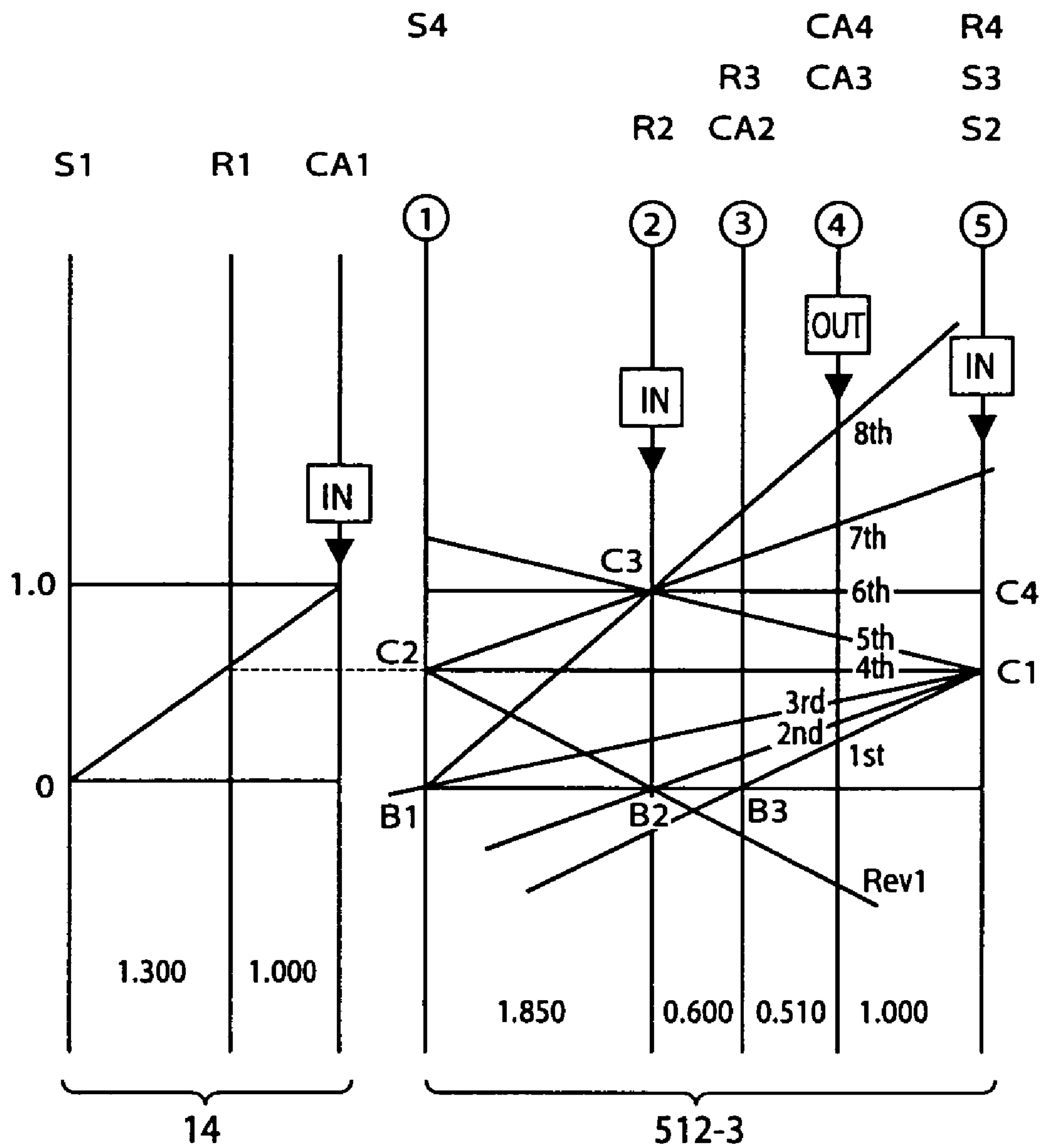
Figures 333A, 333B:
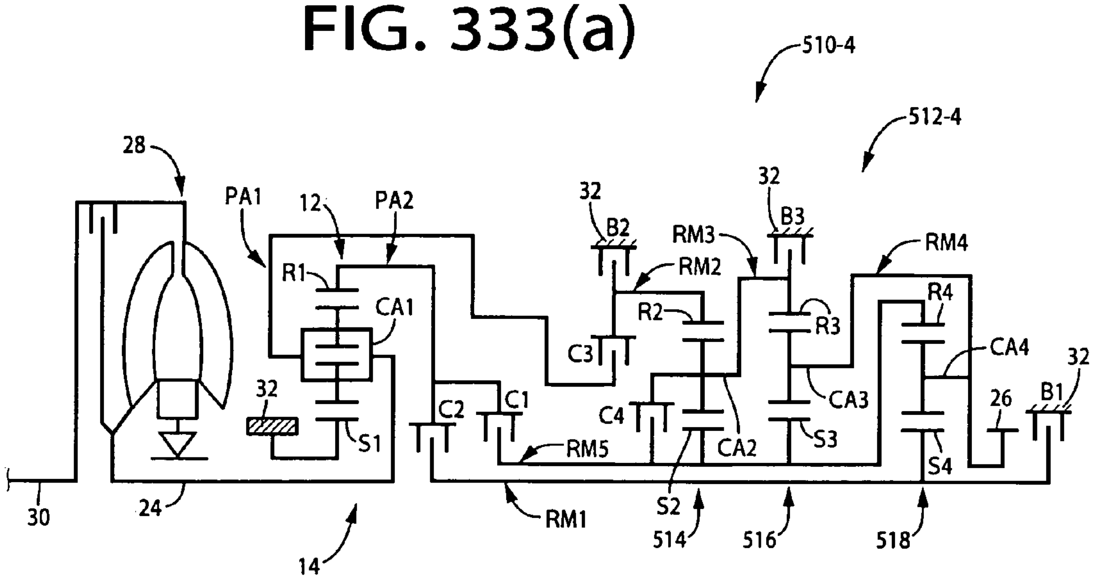
Figure 334:
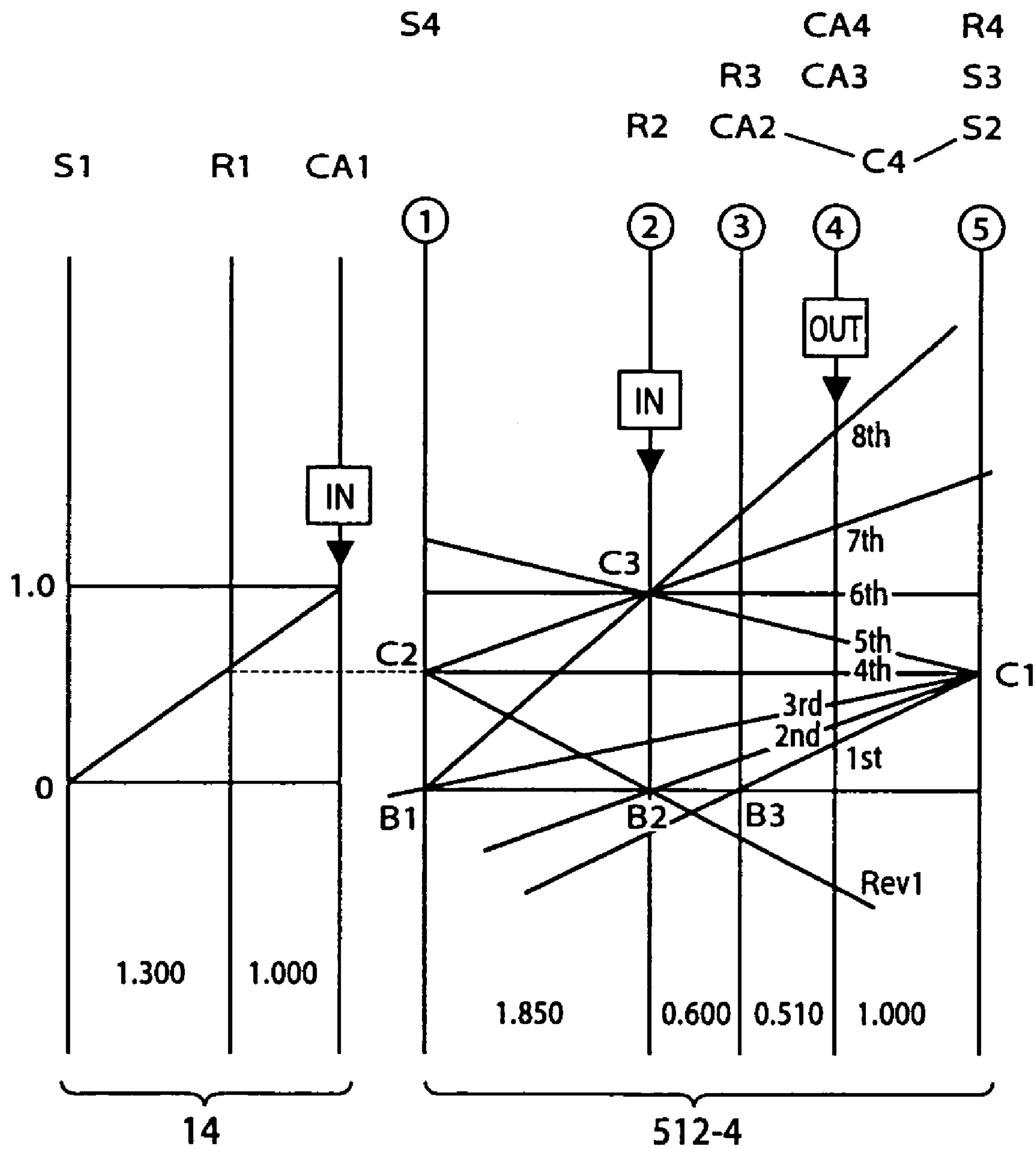

FIGS. 309(*a*) and 309(*b*) are views illustrating further another embodiment of the invention, in which a case is shown where the fourth clutch C4 differs in the arrangement position thereof in comparison with the embodiment in FIG. 307, and corresponding to FIG. 307;

FIG. 310 is a collinear chart of the embodiment in FIG. 309;

FIGS. 311(*a*) and 311(*b*) are views illustrating further another embodiment of the invention, in which a case is shown where the fourth clutch C4 differs in the arrangement position thereof in comparison with the embodiment in FIG. 307, and corresponding to FIG. 307;

FIG. 312 is a collinear chart of the embodiment in FIG. 311;

FIGS. 313(*a*) and 313(*b*) are views illustrating still another embodiment of the invention, in which a case is shown where the second transmission portion differs in the construction thereof in comparison with the embodiment of FIG. 245, and corresponding to FIG. 245;

FIG. 314 is a collinear chart of the embodiment in FIG. 313;

FIGS. 315(*a*) and 315(*b*) are views illustrating further another embodiment of the invention, in which a case is shown where the fourth clutch C4 differs in the arrangement position thereof in comparison with the embodiment in FIG. 313, and corresponding to FIG. 313;

FIG. 316 is a collinear chart of the embodiment in FIG. 315;

FIGS. 317(*a*) and 317(*b*) are views illustrating further another embodiment of the invention, in which a case is shown where the fourth clutch C4 differs in the arrangement position thereof in comparison with the embodiment in FIG. 313, and corresponding to FIG. 313;

FIGS. 319(*a*) and 319(*b*) are views illustrating still another embodiment of the invention, in which a case is shown where the second transmission portion differs in the construction thereof in comparison with the embodiment of FIG. 275, and corresponding to FIG. 275;

FIG. 320 is a collinear chart of the embodiment in FIG. 319;

FIGS. 321(*a*) and 321(*b*) are views illustrating further another embodiment of the invention, in which a case is shown where the fourth clutch C4 differs in the arrangement position thereof in comparison with the embodiment in FIG. 319, and corresponding to FIG. 319;

FIG. 322 is a collinear chart of the embodiment in FIG. 321;

FIGS. 323(*a*) and 323(*b*) are views illustrating further another embodiment of the invention, in which a case is shown where the fourth clutch C4 differs in the arrangement position thereof in comparison with the embodiment in FIG. 319, and corresponding to FIG. 319;

FIG. 324 is a collinear chart of the embodiment in FIG. 323;

FIGS. 325(*a*) and 325(*b*) are views illustrating further another embodiment of the invention, in which a case is shown where the fourth clutch C4 differs in the arrangement position thereof in comparison with the embodiment in FIG. 319, and corresponding to FIG. 319;

FIG. 326 is a collinear chart of the embodiment in FIG. 325;

FIGS. 327(*a*) and 327(*b*) are views illustrating still another embodiment of the invention, in which a case is shown where the second transmission portion differs in the construction thereof in comparison with the embodiment of FIG. 275, and corresponding to FIG. 275;

FIG. 328 is a collinear chart of the embodiment in FIG. 327;

FIGS. 329(*a*) and 329(*b*) are views illustrating further another embodiment of the invention, in which a case is shown where the fourth clutch C4 differs in the arrangement position thereof in comparison with the embodiment in FIG. 327, and corresponding to FIG. 327;

FIG. 330 is a collinear chart of the embodiment in FIG. 329;

FIGS. 331(*a*) and 331(*b*) are views illustrating further another embodiment of the invention, in which a case is shown where the fourth clutch C4 differs in the arrangement position thereof in comparison with the embodiment in FIG. 327, and corresponding to FIG. 327;

FIG. 332 is a collinear chart of the embodiment in FIG. 331;

FIGS. 333(*a*) and 333(*b*) are views illustrating further another embodiment of the invention, in which a case is shown where the fourth clutch C4 differs in the arrangement position thereof in comparison with the embodiment in FIG. 327, and corresponding to FIG. 327; and FIG. 334 is a collinear chart of the embodiment in FIG. 333.

DETAILED DESCRIPTION OF PREFERRED EMBODIMENTS

FIG. 1(*a*) is a view showing main points of an automatic transmission 10-1 for vehicle as a multistage transmission according to one embodiment according to the first aspect through the fifth aspect, the seventh and the eighth aspects, the fifty-first aspect, and the fifty-third aspect through the fifty-fifth aspect of the invention, and (b) is a table describing engagement elements and transmission ratios when a plurality of gear stages are established. The automatic transmission 10-1 for vehicle is a lateral type installed in an FF vehicle and an RR vehicle and includes the first transmission portion 14 mainly composed of a double-pinion type first planetary gear set 12 and the second transmission portion 22-1 mainly composed of a single-pinion type second planetary gear set 16, a double-pinion type third planetary gear set 18 and a single-pinion type fourth planetary gear set 20, in which rotation of an input shaft 24 is changed with respect to speed and is outputted from an output gear 26. While the input shaft 24 corresponds to the input member, which is a turbine shaft of a torque converter 28, and rotation is inputted via the torque converter 28 from a crank shaft 30 of an internal combustion engine as a running drive source, the output gear 26 corresponds to the output member, which drives and rotates left and right drive wheels via a differential gear set. In addition, the automatic transmission 10-1 for vehicle is composed to be substantially symmetrical about the centerline. In FIG. 1(*a*), the lower half section thereof below the centerline is omitted, and this is the same in the following respective embodiments.

A carrier CA1 of the first planetary gear set 12 which composes the first transmission portion 14 is connected to the input shaft 24 and driven to rotate, a sun gear S1 is non-rotatably fixed integral with a casing 32, and a ring gear R1 is rotated with its rotation speed reduced with respect to the input shaft 24 as the intermediate output member and outputs the rotation to the second transmission portion 22-1. In the present embodiment, a path which exactly outputs rotation of the input shaft 24 from the carrier CA1 to the second transmission portion 22 is the first intermediate output path PA1 which outputs the rotation at a fixed transmission ratio determined in advance, and a path which outputs rotation from the input shaft 24 to the second transmission portion 22-1 via the carrier CA1, a pinion gear disposed in the carrier CA1 and a ring gear R1 operating as an intermediate output member is the second intermediate output path PA2 which outputs the rotation of the input shaft 24 with its speed reduced at a larger transmission ratio than that of the first intermediate output path PA1.

Also, the second planetary gear set 16, the third planetary gear set 18 and the fourth planetary gear set 20, which compose the second transmission portion 22-1, are partially connected to each other to compose five rotary elements RM1 through RM5. In detail, the sun gear S4 of the fourth planetary gear set 20 composes the first rotary element RM1, the ring gear R2 of the second planetary gear set 16 composes the second rotary element RM2, the third rotary element RM3 is composed of the carrier CA2 of the second planetary gear set 16 and the carrier CA3 of the third planetary gear set 18 connected to each other, the fourth rotary element RM4 the ring gear R3 of the third planetary gear set 18 and the carrier CA4 of the fourth planetary gear set 20 connected to each other, and the fifth rotary element RM5 is composed of the sun gear S2 of the second planetary gear set 16, the sun gear S3 of the third planetary gear set 18 and the ring gear R4 of the fourth planetary gear set 20 connected to each other. In the embodiment, the carriers CA2 and CA3 of the second planetary gear set 16 and the third planetary gear set 18, and the sun gears S2 and S3 thereof are, respectively, composed of a common member, and at the same time, a stepped pinion SP having a minor-diameter portion and a major-diameter portion is rotatably disposed on the common carriers CA2 and CA3, wherein the minor-diameter portion thereof is engaged with the ring gear R2 of the second planetary gear set 16 and the major-diameter portion thereof is engaged with an outside pinion which is engaged with the common sun gears S2 and S3 and the second pinion of the third planetary gear set 18, that is, the ring gear R3.

And, the first rotary element RM1 (Sun gear S4) is selectively connected to the casing 32 by the first brake B1 and is brought to a stationary state, the second rotary element RM2 (Ring gear R2) is selectively connected to the casing 32 by the second brake B2 and is brought to a stationary state, and the third rotary element RM3 (Carriers CA2 and CA3) is selectively connected to the casing 32 by the third brake B3 and is brought to a stationary state. The fifth rotary element RM5 (Sun gears S2, S3 and ring gear R4) is selectively connected via the first clutch Cl to the ring gear R1 of the first planetary gear set 12, which is an intermediate output member, that is, the second intermediate output path PA2, the first rotary element RM1 (Sun gear S4) is selectively connected via the second clutch C2 to the ring gear R1, that is, the second intermediate output path PA2, the second rotary element RM2 (Ring gear R2) is selectively connected via the third clutch C3 to the input shaft 24, that is, the first intermediate output path PA1, the third rotary element RM3 (Carriers CA2 and CA3) is selectively connected via the fourth clutch C4 to the input shaft 24, that is, the first intermediate output shaft PA, and the fourth rotary element RM4 (Ring gear R3 and carrier CA4) is integrally connected to the output gear 26 and outputs rotation. The first brake B1 through the third brake B3 and the first clutch Cl through the fourth clutch C4 compose a multiple-plate type hydraulic friction-engagement unit in which the clutches and brakes are friction-engaged by hydraulic cylinders.

Figure 2:
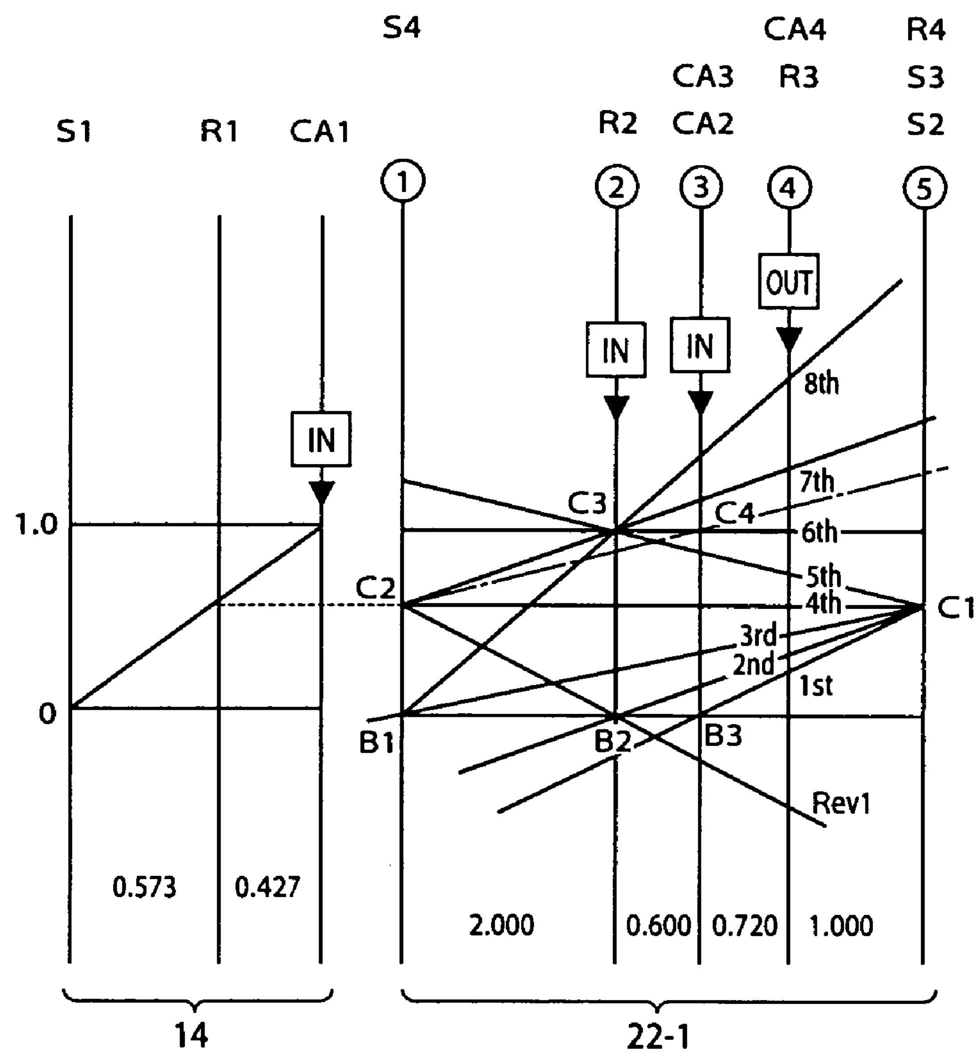
FIG. 2 is a collinear chart of the embodiment in FIG. 1.

FIG. 2 is a collinear chart capable of linearly describing rotation speeds of respective rotary elements of the first transmission portion 14 and the second transmission portion 22-1. The lower horizontal line thereof indicates a rotation speed [0] while the upper horizontal line indicates the rotation speed [1.0], that is, the same rotation speed as that of the input shaft 24. Also, respective vertical lines of the first transmission portion 14 indicates the sun gear S1, ring gear R1, and carrier CA1 in order from the left side. The intervals therebetween are determined in accordance with the gear ratio (=Number of teeth of the sun gear/number of teeth of the ring gear) ρ1 of the first planetary gear set 12. The drawing indicates a case where the gear ratio ρ1 is 0.427. The five vertical lines of the second transmission portion 22-1 indicates the first rotary element RM1 (Sun gear S4), the second rotary element RM2 (Ring gear R2), the third rotary element RM3 (Carriers CA2 and CA3), the fourth rotary element RM4 (Ring gears R3 and carrier CA4), and the fifth rotary element RM5 (Sun gears S2, S3 and S4) in order from the left side. The intervals therebetween are determined in accordance with the gear ratio ρ2 of the second planetary gear set 16, gear ratio ρ3 of the third planetary gear set 18, and gear ratio ρ4 of the fourth planetary gear set 20. The drawing shows a case where the gear ratio ρ2 is 0.349, ρ3 is 0.419 and ρ4 is 0.301. FIGS. [1] through [5] with circled numbers of the second transmission portion 22-1 indicates the first rotary element RM1 through the fifth rotary element MR5, respectively. The above-described assumption is applicable to respective embodiments shown below.

As has been made clear in the collinear chart, where the first clutch C1 and the third brake B3 are engaged with each other, the fifth rotary element RM5 is rotated via the first transmission portion 14 with its rotation speed reduced, and the third rotary element RM3 is brought to a stationary state, the fourth rotary element RM4 connected to the output gear 26 is rotated at a rotation speed shown with [1st], and the first gear stage [1st] having the largest transmission ratio (=rotation speed of the input shaft 24/rotation speed of the output gear 26) is established. Where the first clutch C1 and the second brake B2 are engaged with each other, the fifth rotary element RM5 is rotated via the first transmission portion 14 with its rotation speed reduced, and the second rotary element RM2 is brought to a stationary state, the fourth rotary element RM4 is rotated at a rotation speed [2nd] and the second gear stage [2nd] having a smaller transmission ratio than that of the first gear stage [1st] is established. Where the first clutch C1 and the first brake B1 are engaged with each other, the fifth rotary element RM5 is rotated via the first transmission portion 14 with its rotation speed reduced, and the first rotary element RM1 is brought to a stationary state, the fourth rotary element RM4 is rotated at a rotation speed [3rd], and the third gear stage [3rd] having a smaller transmission-ratio than the second gear stage [2nd] is-established. Where the first clutch C1 and the second clutch C2 are engaged with each other, the second transmission portion 22-1 is rotated via the first transmission portion 14 integral therewith with its rotation speed reduced, the fourth rotary element RM4 is rotated at a rotation speed [4th], that is, at the same rotation speed as that of the ring gear R1 of the first transmission portion 14, and the fourth gear stage [4th] having a smaller transmission ratio than the third gear stage [3rd] is established. Where the first clutch C1 and the third clutch C3 are engaged with each other, the fifth rotary element RM5 is rotated via the first transmission portion 14 with its rotation speed reduced, and the second rotary element RM2 is rotated integral with the input shaft 24, the fourth rotary element RM4 is rotated at a rotation speed [5th], and the fifth gear stage [5th] having a smaller transmission ratio than the fourth gear stage [4th] is established. Where the third clutch C3 and the fourth clutch C4 are engaged with each other, the second transmission portion 22-1 is rotated integral with the input shaft 24, the fourth rotary element RM4 is rotated at a rotation speed [6th], that is, at the same rotation speed as that of the input shaft 24, and the sixth gear stage [6th] having a smaller transmission ratio than the fifth gear stage [5th] is established. The transmission ratio of the sixth gear stage [6th] is 1. Where the second clutch C2 and the third clutch C3 are engaged with each other, the first rotary element RM1 is rotated via the first transmission portion 14 with its rotation speed reduced, and the second rotary element RM2 is rotated integral with the input shaft 24, the fourth rotary element RM4 is rotated at a rotation speed [7th] and the seventh gear stage [7th] having a smaller transmission ratio than the sixth gear stage [6th] is established. Where the third clutch C3 and the first brake B1 are engaged with each other, the second input rotary element RM2 is rotated integral with the input shaft 24, and the first rotary element RM1 is brought to a stationary state, the fourth rotary element RM4 is rotated at a rotation speed [8th], and the eighth gear stage [8th] having a smaller gear stage than the sixth gear stage [7th] is established. As shown with an alternate long and short dashed line in FIG. 2, if the second clutch C2 and the fourth clutch C4 are engaged with each other, the first rotary element RM1 is rotated via the first transmission portion 14 with its rotation speed reduced, and the third rotary element RM3 is rotated integral with the input shaft 24, an intermediate gear stage between the sixth gear stage [6th] and the seventh gear stage [7th] is provided to enable nine gear stages in total.

Also, where the second clutch C2 and the second brake B2 are engaged with each other, the first rotary element RM1 is rotated via the first transmission portion 14 with its rotation speed reduced, and the second rotary element RM2 is brought to a stationary state, the fourth rotary element RM4 is reversed at a rotation speed [Rev1], and the first reverse gear stage [Rev1] is established.

The operation table in FIG. 1(*b*) summarizes the relationships between the above-described respective gear stages and operating states of the clutches C1 through C4 and the brakes B1 through B3, wherein circles [○] express "engaged" and blanks express "disengaged (free)." The transmission ratios of the respective gear stages are adequately determined in accordance with the respective gear ratios ρ1 through ρ4 of the first planetary gear set 12, second planetary gear set 16, third planetary gear set 18 and fourth planetary gear set 20. For example, if the gear ratio ρ1 is 0.427, ρ2 is 0.349, ρ3 is 0.419 and ρ4 is 0.301, the transmission ratios shown in FIG. 1(*b*) can be obtained, wherein the values of the gear ratio step (ratio of the transmission ratios between the respective gear stages) is substantially appropriate, the total range (=4.169/0.602) of transmission ratios is large to become 6.921, and the transmission ratio of the reverse gear stage [Rev1] is also appropriate. Herein, adequate transmission ratio characteristics can be obtained as a whole.

Thus, with the automatic transmission 10-1 for vehicle according to the present embodiment, since multistage transmission of eight forward gear stages can be obtained by means of four sets of planetary gear sets 12, 16, 18 and 20, four clutches C1 through C4 and three brakes B1 through B3, the transmission can be fabricated to be light in weight and made compact, wherein the mountability thereof in a vehicle can be improved. Further, as has been made clear in FIG. 1(*b*), since speed change in the respective gear stages can be carried out only by a shifting action of any two of the clutches C1 through C4 and brakes B1 through B3, the speed change control can be facilitated and it is possible to prevent a shock to the transmission from occurring.

Also, the gear ratios ρ1 through ρ4 of the four planetary gear sets 12, 16, 18 and 20 are set in a range from 0.3 through 0.6, and the transmission ratios of the first gear stage [1st] to the eighth gear stage [8th] can be established in the form close to equal ratios as shown in FIG. 1(*b*) while the planetary gear sets 12, 16, 18 and 20 can be maintained to be comparatively small-sized (small-diameter), wherein it is possible to secure a large range of transmission ratios, which is approximately 7 in total, the transmission ratio of the first reverse gear stage [Rev1] is large, and adequate transmission ratio characteristics can be obtained as a whole.

Next, a description is given of other embodiments of the invention. In the following embodiments, parts which are substantially common to those of the above-described embodiment are given the same reference numbers, and detailed description thereof is omitted.

Figure 4:
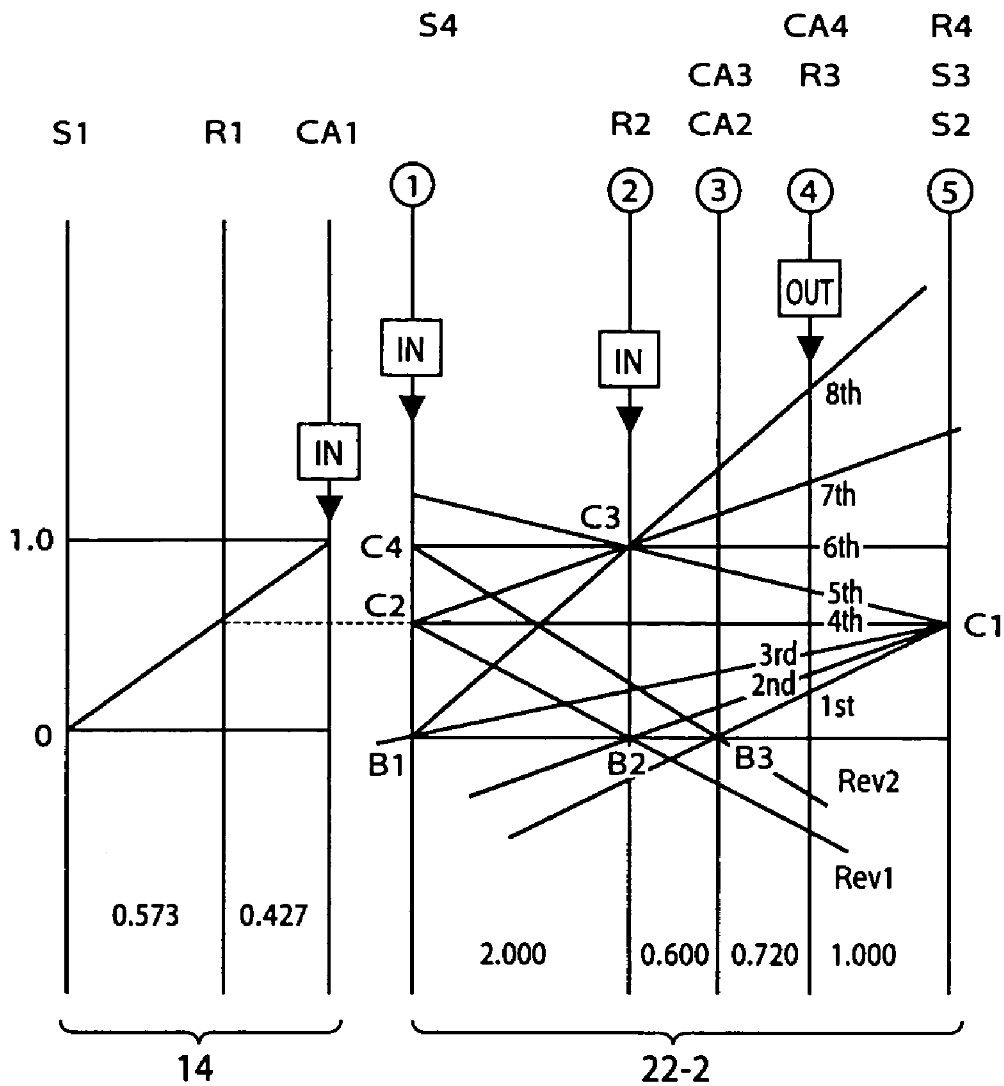
FIG. 4 is a collinear chart of the embodiment in FIG. 3.

FIG. 3 through FIG. 4 show one embodiment according to the first through the fifth aspects, the seventh and the eighth aspects, the fifty-first aspect, and the fifty-third through the fifty-fifth aspects of the invention. FIG. 3 is a view corresponding to FIG. 1 described above, and FIG. 4 is a view corresponding to FIG. 2 described above. An automatic transmission 10-2 for vehicle differs from the automatic transmission 10-1 for vehicle, which is shown in FIG. 1 and FIG. 2 in that the first rotary element RM1 (Sun gear S4) of the second transmission portion 22-2 is selectively connected to the input shaft 24, that is, the first intermediate output path PA1 via the fourth clutch C4. However, as shown in FIG. 3(*b*), the eight forward gear stages from the first gear stage [1st] to the eighth gear stage [8th] and one reverse gear stage [Rev1] are established in accordance with the same operation table as that in FIG. 1(*b*), and as shown in FIG. 4, the same collinear chart as that of FIG. 2 can be obtained, and similar actions and effects can be brought about. In addition, the automatic transmission 10-2 for vehicle may be composed so that, as shown in FIG. 3 and FIG. 4, the fourth clutch C4 and the third brake B3 are engaged with each other, the first rotary element RM1 is rotated integral with the input shaft 24, and the third rotary element RM3 is brought to a stationary state, wherein the fourth rotary element RM4 is reversed at a rotation speed [Rev2] and the second reverse gear stage [Rev2] can be established in addition to the first reverse gear stage [Rev1].

Figures 5A, 5B:
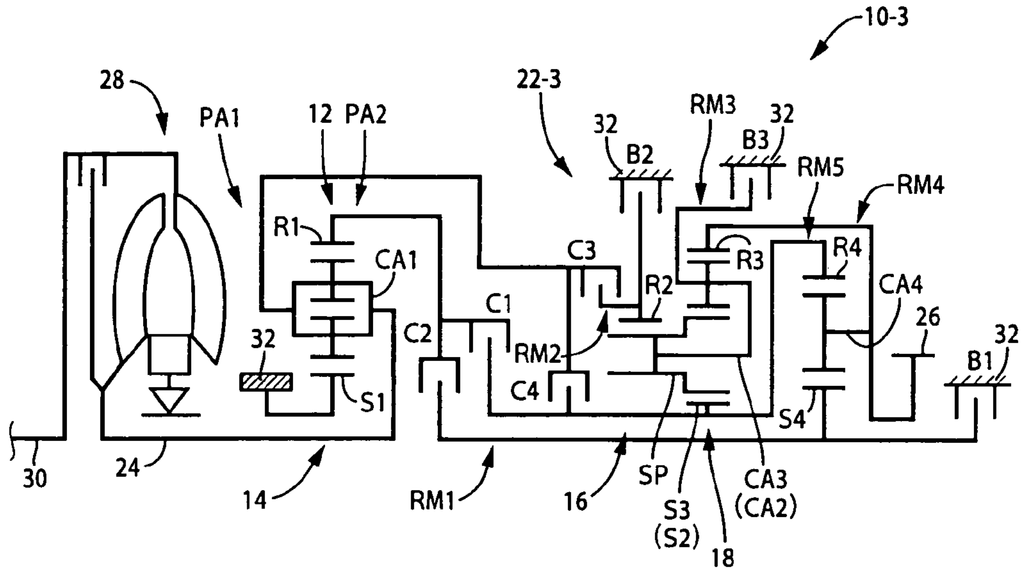
FIGS. 5(*a*) and 5(*b*) are views illustrating still another embodiment of the invention, in which a case is shown where the fourth clutch C4 differs in the arrangement position thereof in comparison with the embodiment in FIG. 1, and corresponding to FIG. 1.
Figure 6:
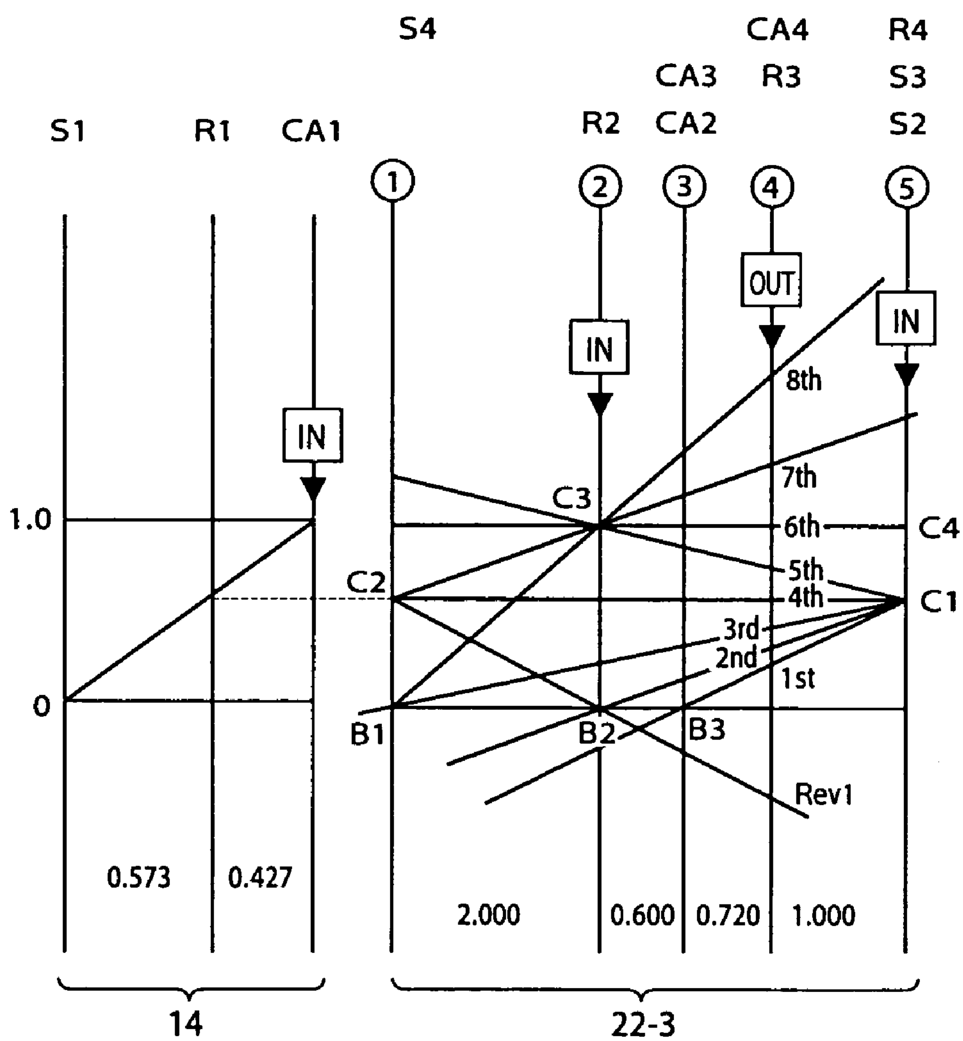
FIG. 6 is a collinear chart of the embodiment in FIG. 5.

FIG. 5 through FIG. 6 show one embodiment according to the first through the fifth aspects, the seventh and the eighth aspects, the fifty-first aspect, and the fifty-third through the fifty-fifth aspects of the invention. FIG. 5 is a view corresponding to FIG. 1 described above, and FIG. 6 is a view corresponding to FIG. 2 described above. An automatic transmission 10-3 for vehicle differs from the automatic transmission 10-1 for vehicle, which is shown in FIG. 1 and FIG. 2 in that the fifth rotary element (Sun gears S2, S3 and ring gear R4) of the second transmission portion 22-3 is selectively connected to the input shaft 24, that is, the first intermediate output path PA1 via the fourth clutch C4. However, as shown in FIG. 5(*b*), the eight forward gear stages from the first gear stage [1st] to the eighth gear stage [8th] and one reverse gear stage [Rev1] are established in accordance with the same operation table as that in FIG. 1(*b*), and as shown in FIG. 6, the same collinear chart as that of FIG. 2 can be obtained, and similar actions and effects can be brought about.

Figures 7A, 7B:
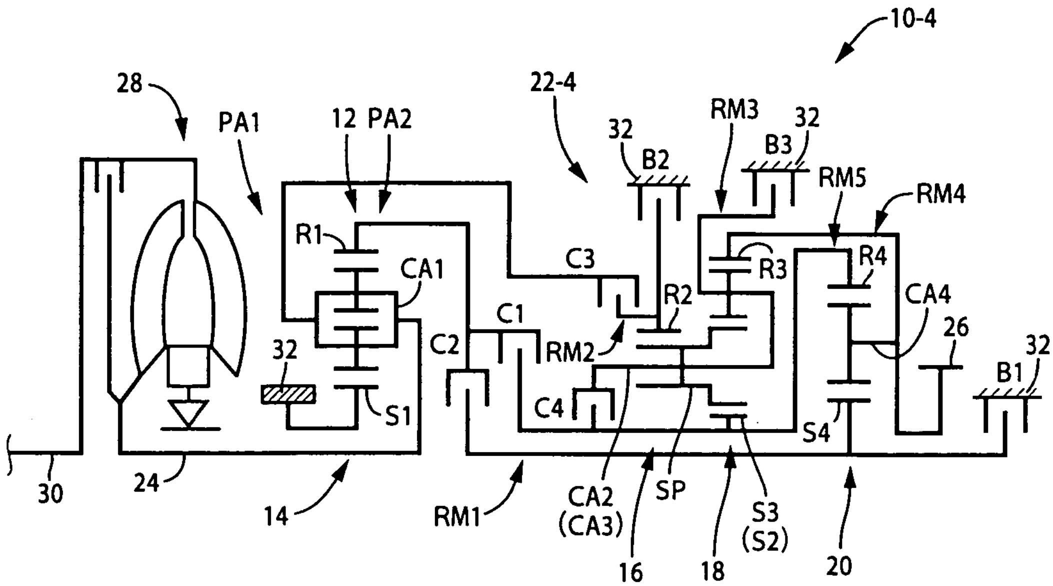
FIGS. 7(*a*) and 7(*b*) are views illustrating still another embodiment of the invention, in which a case is shown where the fourth clutch C4 differs in the arrangement position thereof in comparison with the embodiment in FIG. 1, and corresponding to FIG. 1.
Figure 8:
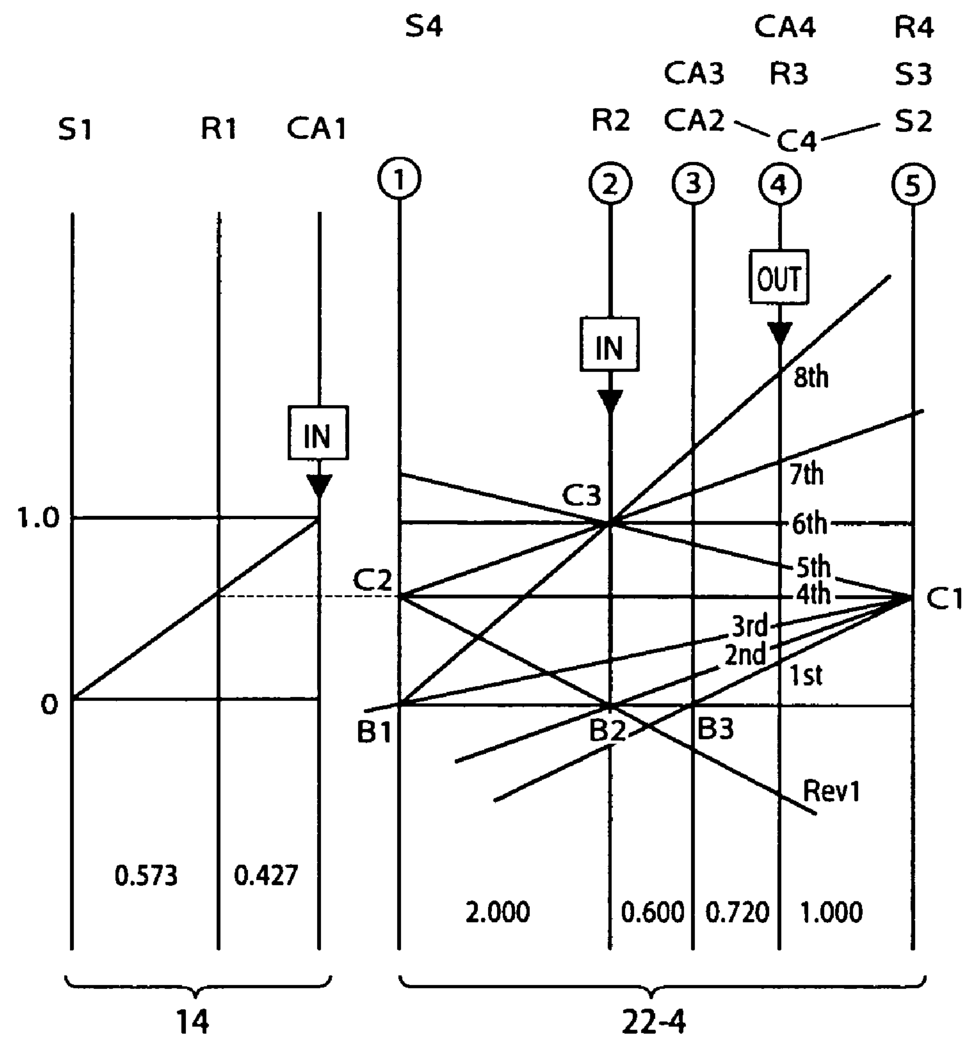
FIG. 8 is a collinear chart of the embodiment in FIG. 7.

FIG. 7 through FIG. 8 show one embodiment according to the first through the fourth aspects, the sixth and the eighth aspects, and the fifty-second through the fifty-fifth aspects of the invention. FIG. 7 is a view corresponding to FIG. 1 described above, and. FIG. 8 is a view corresponding to FIG. 2 described above. An automatic transmission 10-4 for vehicle differs from the automatic transmission 10-1 for vehicle, which is shown in FIG. 1 and FIG. 2 in that the third rotary element RM3 (Carriers CA2 and CA3) of the second transmission portion 22-4 and the fifth rotary element RM5 (Sun gears S2, S3 and ring gear R4) thereof are selectively connected integral with each other via the fourth clutch C4. However, as shown in FIG. 7(*b*), the eight forward gear stages from the first gear stage [1st] to the eighth gear stage [8th] and one reverse gear stage [Rev1] are established in accordance with the same operation table as that in FIG.

1(*b*), and as shown in FIG. 8, the same collinear chart as that of FIG. 2 can be obtained, and similar actions and effects can be brought about.

Figures 9A, 9B:
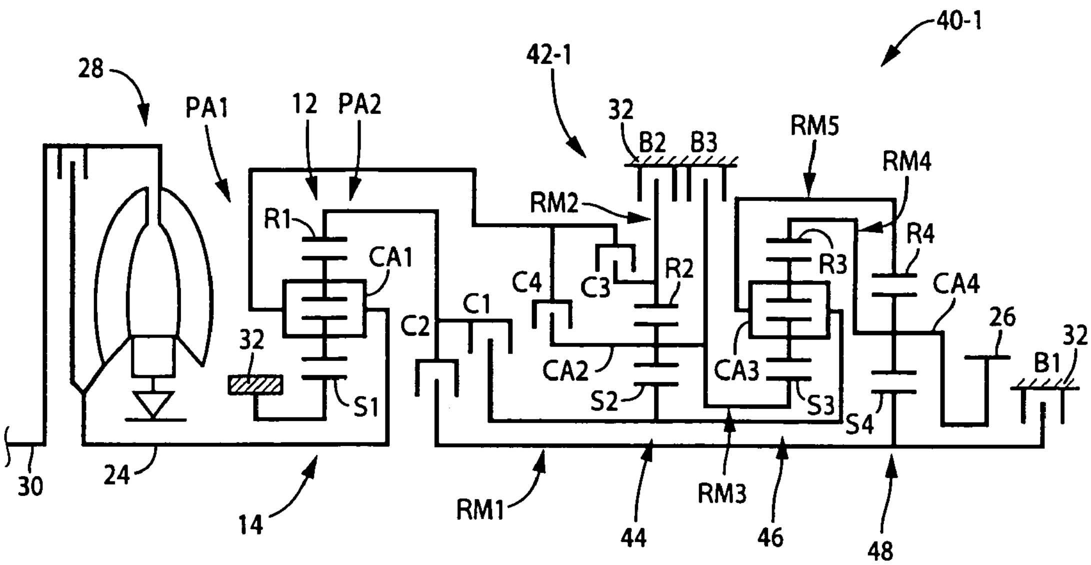
FIGS. 9(*a*) and 9(*b*) are views illustrating still another embodiment of the invention, in which a case is shown where the second transmission portion differs in the construction thereof in comparison with the embodiment in FIG. 1, and corresponding to FIG. 1.
Figure 10:
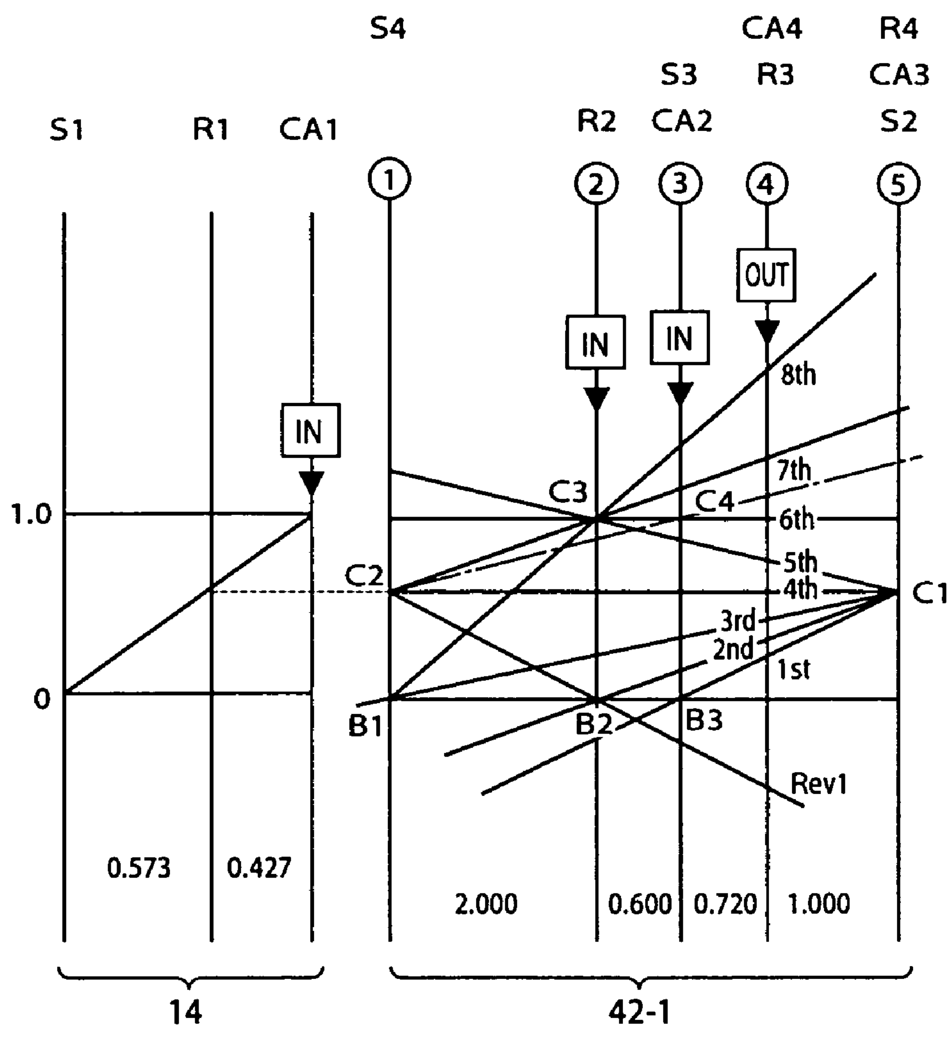
FIG. 10 is a collinear chart of the embodiment in FIG. 9.

FIG. 9 through FIG. 10 show one embodiment according to the first through the fifth aspects, the ninth aspect, the fifty-fifth aspect, and the fifty-third through the fifty-fifth aspects of the invention. FIG. 9 is a view corresponding to FIG. 1 described above, and FIG. 10 is a view corresponding to FIG. 2 described above. An automatic transmission 40-1 for vehicle differs from the automatic transmission 10-1 for vehicle, which is shown in FIG. 1 and FIG. 2 in the construction of the second transmission portion 42-1. That is, the second transmission portion 42-1 is composed mainly of a single-pinion type second planetary gear set 44, a double-pinion type third planetary gear set 46 and a single-pinion type fourth planetary gear set 48, wherein the first rotary element RM1 is composed of the sun gear S4 of the fourth planetary gear set 48, the second rotary element RM2 is composed of the ring gear R2 of the second planetary gear set 44, the third rotary element RM3 is composed of the carrier CA2 of the second planetary gear set 44 and sun gear S3 of the third planetary gear set 46 connected to each other, the fourth rotary element RM4 is composed of the ring gear R3 of the third planetary gear set 46 and the carrier CA4 of the fourth planetary gear set 48 connected to each other, and the fifth rotary element RM5 is composed of the sun gear S2 of the second planetary gear set 44, the carrier CA3 of the third planetary gear set 46 and the ring gear R4 of the fourth planetary gear set 48 connected to each other. Also, mutual connections between the respective rotary elements RM1 through RM5 by means of the clutches C1 through C4 and brakes B1 through B3, and connections between the casing 32, input shaft 24, that is, the first intermediate output path PA1, the ring gear R1 of the first planetary gear set 12, that is, the second intermediate output path PA2, and the output gear 26 are the same as those of the embodiment in FIG. 1 and FIG. 2.

In this case, as shown in FIG. 9(*b*), the eight forward gear stages from the first gear stage [1st] to the eighth gear stage [8th] and one reverse gear stage [Rev1] are established in accordance with the same operation table as that in FIG. 1(*b*) described above. As shown with an alternate long and short dashed line in FIG. 10, the second clutch C2 and the fourth clutch C4 are engaged with each other, the first rotary element RM1 is rotated via the first transmission portion 14 with its rotation speed reduced, and the third rotary element RM3 is rotated integral with the input shaft 24, wherein an intermediate gear stage is provided between the sixth gear stage [6th] and the seventh gear stage [7th], and nine gear stages can be secured in total. Further, the transmission ratios of the respective gear stages are appropriately determined by the respective gear ratios ρ1 through ρ4 of the first planetary gear set 12, the second planetary gear set 44, the third planetary gear set 46 and the fourth planetary gear set 48, wherein if, for example, ρ1 is 0.427, ρ2 is 0.349, ρ3 is 0.581 and ρ4 is 0.301, the collinear chart as that in FIG. 2 can be obtained as shown in FIG. 10, and the same transmission ratios as those in FIG. 1(*b*) can be obtained as shown in FIG. 9(*b*). Also, actions and effects similar to those of the embodiment shown in FIG. 2 can be obtained.

Figures 11A, 11B:
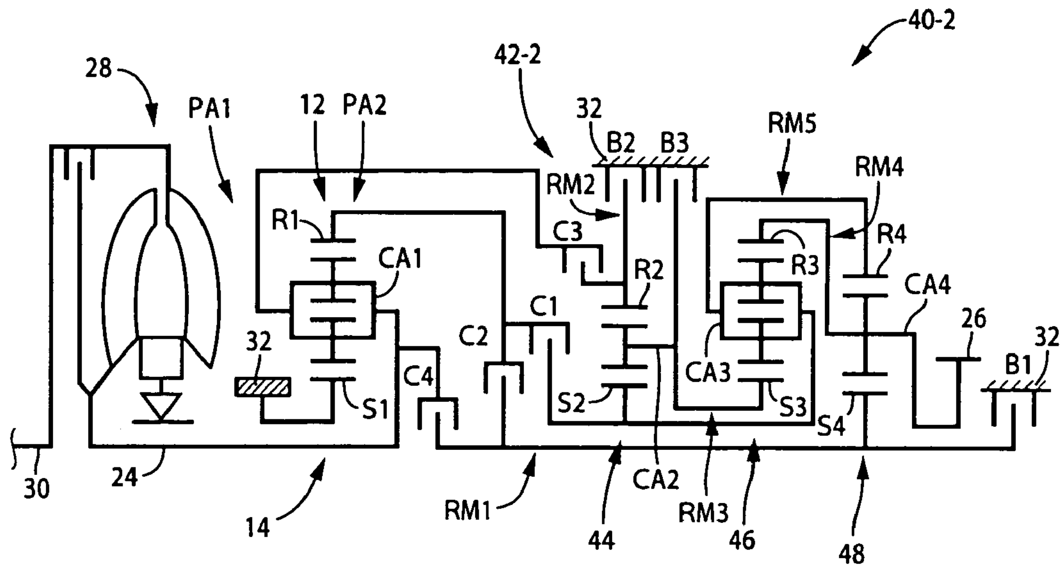
FIGS. 11(*a*) and 11(*b*) are views illustrating still another embodiment of the invention, in which a case is shown where the fourth clutch C4 differs in the arrangement position thereof in comparison with the embodiment in FIG. 9, and corresponding to FIG. 9.
Figure 12:
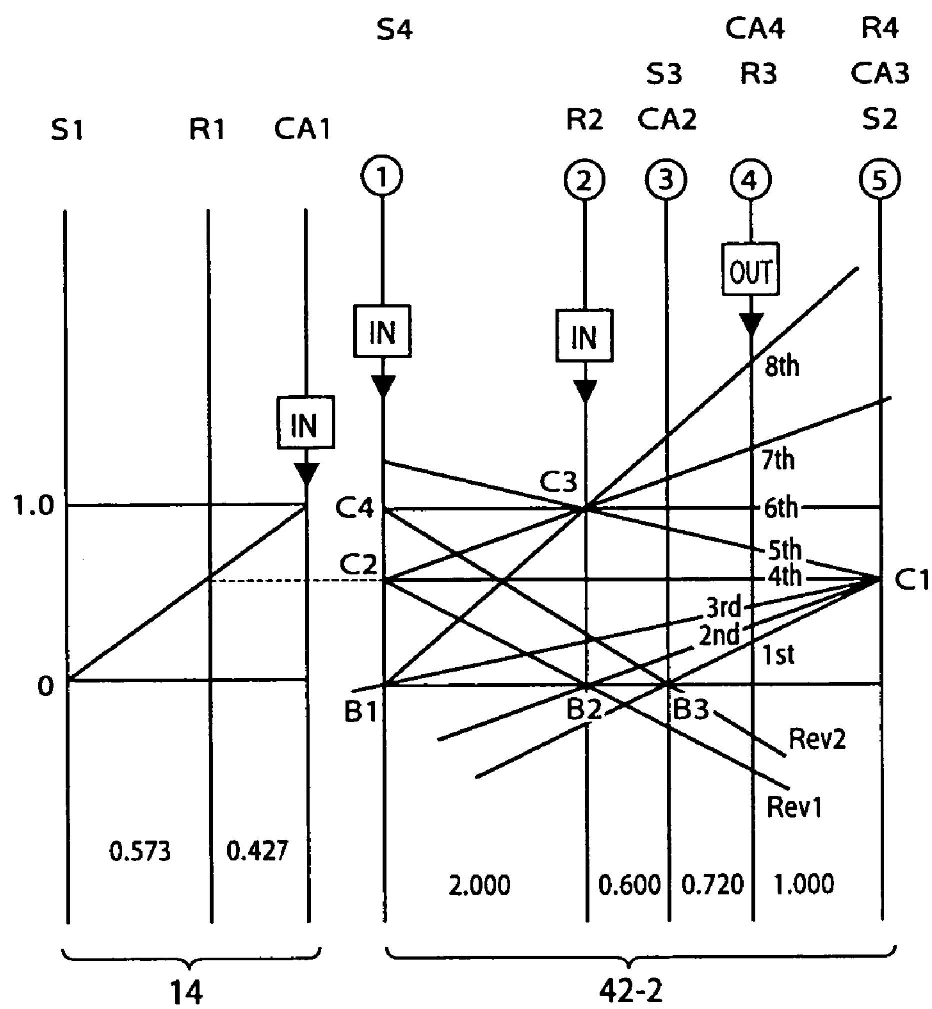
FIG. 12 is a collinear chart of the embodiment in FIG. 11.

FIG. 11 through FIG. 12 show one embodiment according to the first through the fifth aspects, the ninth aspect, the fifty-first aspect, and the fifty-third through the fifty-fifth aspects of the invention. FIG. 11 is a view corresponding to FIG. 1 described above, and FIG. 12 is a view corresponding to FIG. 2 described above. An automatic transmission 40-2 for vehicle differs from the automatic transmission 40-1 for vehicle, which is shown in FIG. 9 and FIG. 10 in that the first rotary element RM1 (Sun gear S4) of the second transmission portion 42-2 is selectively connected to the input shaft 24, that is, the first intermediate output path PA1 via the fourth clutch C4. However, as shown in FIG. 11(*b*), eight forward gear stages from the first gear stage [1st] to the eighth gear stage [8th] and one reverse gear stage [Rev1] are established in accordance with the same operation table as that in FIG. 9(*b*), and the same collinear chart as that in FIG. 10 can be obtained as shown in FIG. 12, wherein similar actions and effects can be brought about. Also, as shown in FIG. 11(*b*) and FIG. 12, the automatic transmission 40-2 for vehicle may be composed so that, the fourth clutch C4 and the third brake B3 are engaged with each other as in FIG. 3(*b*) and FIG. 4, the first rotary element RM1 is rotated integral with the input shaft 24, the third rotary element RM3 is brought to a stationary state, and the fourth rotary element RM4 is reversed at a rotation speed [Rev2], wherein the second reverse gear stage [Rev2] may be established in addition to the first reverse gear stage [Rev1].

Figures 13A, 13B:
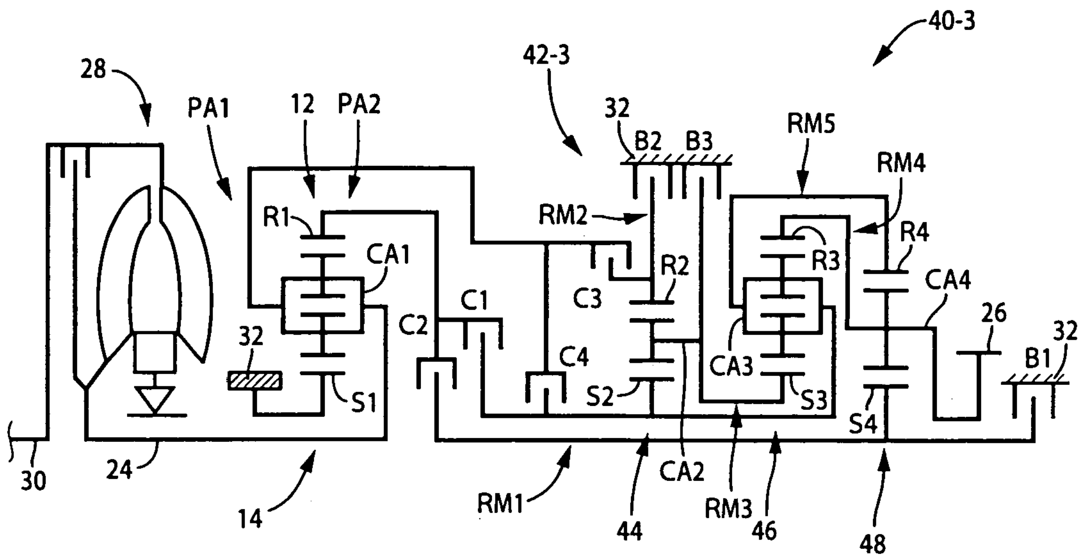
FIGS. 13(*a*) and 13(*b*) are views illustrating still another embodiment of the invention, in which a case is shown where the fourth clutch C4 differs in the arrangement position thereof in comparison with the embodiment in FIG. 9, and corresponding to FIG. 9.
Figure 14:
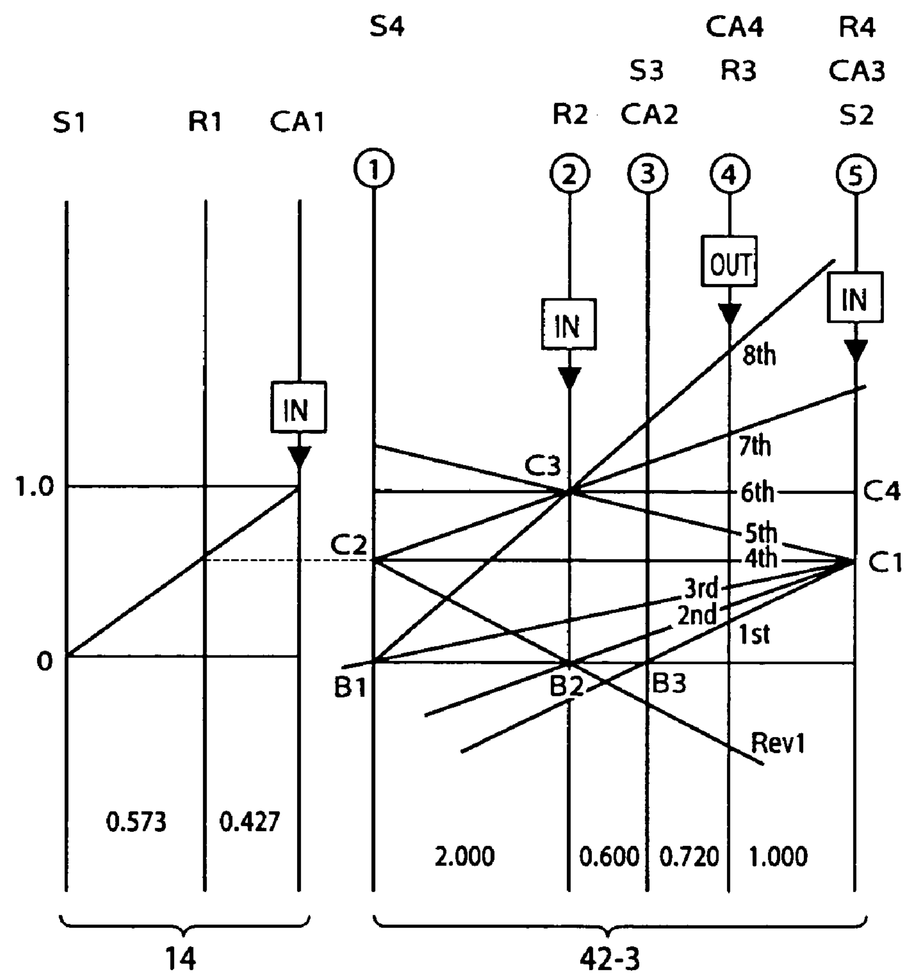
FIG. 14 is a collinear chart of the embodiment in FIG. 13.

FIG. 13 through FIG. 14 show one embodiment according to the first through the fifth aspects, the ninth aspect, the fifty-first aspect, and the fifty-third through the fifty-fifth aspects of the invention. FIG. 13 is a view corresponding to FIG. 1 described above, and FIG. 14 is a view corresponding to FIG. 2 described above. An automatic transmission 40-3 for vehicle differs from the automatic transmission 40-1 for vehicle, which is shown in FIG. 9 and FIG. 10 in that the fifth rotary element RM5 (Sun gear S2, carrier CA3 and ring gear R4) of the second transmission portion 42-3 is selectively connected to the input shaft 24, that is, the first intermediate output path PA1 via the fourth clutch C4. However, as shown in FIG. 13(*b*), eight forward gear stages from the first gear stage [1st] to the eighth gear stage [8th] and one reverse gear stage [Rev1] are established in accordance with the same operation table as that in FIG. 9(*b*), and the same collinear chart as that in FIG. 10 can be obtained as shown in FIG. 14, wherein similar actions and effects can be brought about.

Figures 15A, 15B:
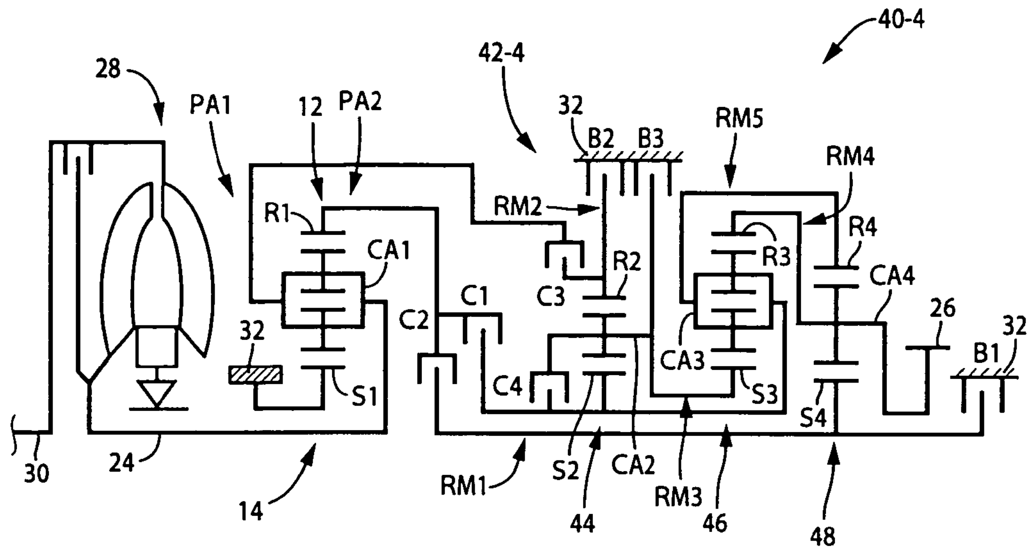
FIGS. 15(*a*) and 15(*b*) are views illustrating still another embodiment of the invention, in which a case is shown where the fourth clutch C4 differs in the arrangement position thereof in comparison with the embodiment in FIG. 9, and corresponding to FIG. 9.
Figure 16:
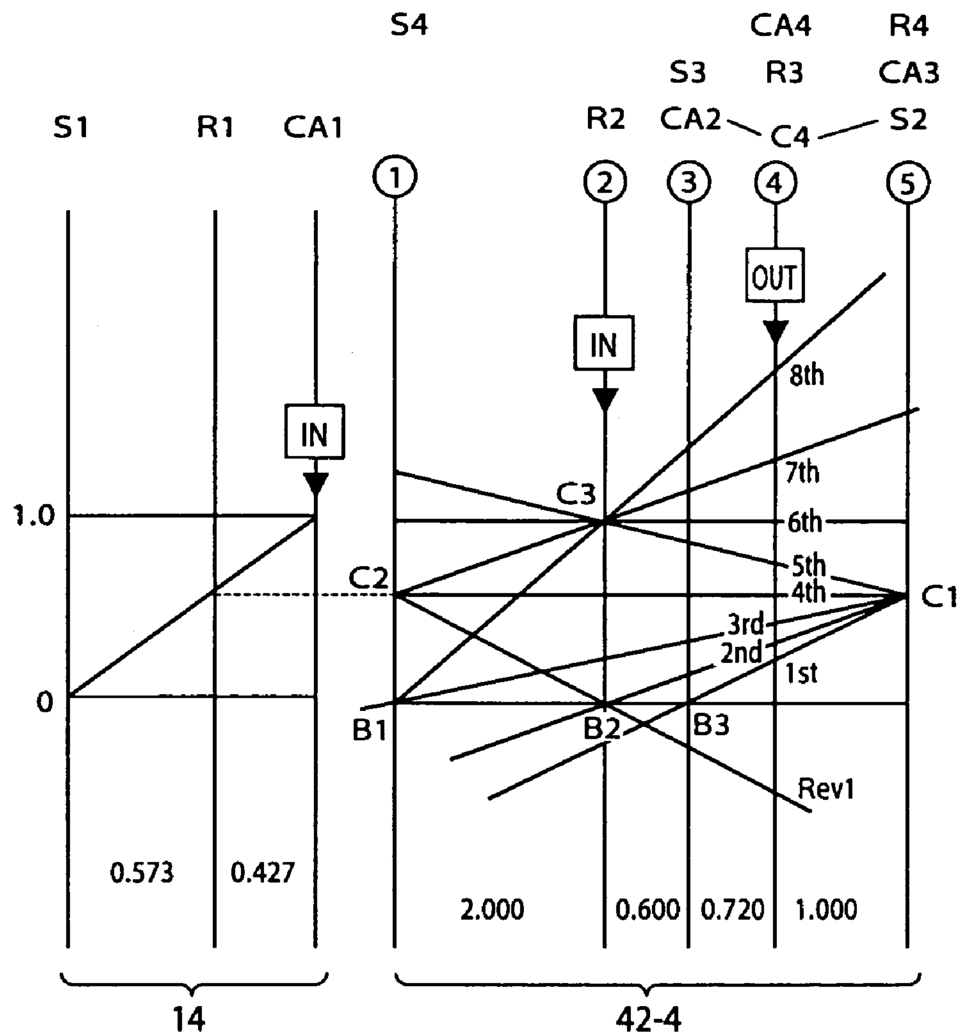
FIG. 16 is a collinear chart of the embodiment in FIG. 15.

FIG. 15 through FIG. 16 show one embodiment according to the first through the fourth aspects, the sixth aspect, the ninth aspect, and the fifty-second through the fifty-fifth aspects of the invention. FIG. 15 is a view corresponding to FIG. 1 described above, and FIG. 16 is a view corresponding to FIG. 2 described above. An automatic transmission 40-4 for vehicle differs from the automatic transmission 40-1 for vehicle, which is shown in FIG. 9 and FIG. 10 in that the third rotary element RM3 (Carrier CA2 and sun gear S3) of the second transmission portion 42-4 and the fifth rotary element RM5 (Sun gear S2, carrier CA3 and ring gear R4) thereof are selectively connected integral with each other via the fourth clutch C4. However, as shown in FIG. 15(*b*), eight forward gear stages from the first gear stage [1st] to the eighth gear stage [8th] and one reverse gear stage [Rev1] are established in accordance with the same operation table as that in FIG. 9(*b*), and the same collinear chart as that in FIG. 10 can be obtained as shown in FIG. 16, wherein similar actions and effects can be brought about.

Figures 17A, 17B:
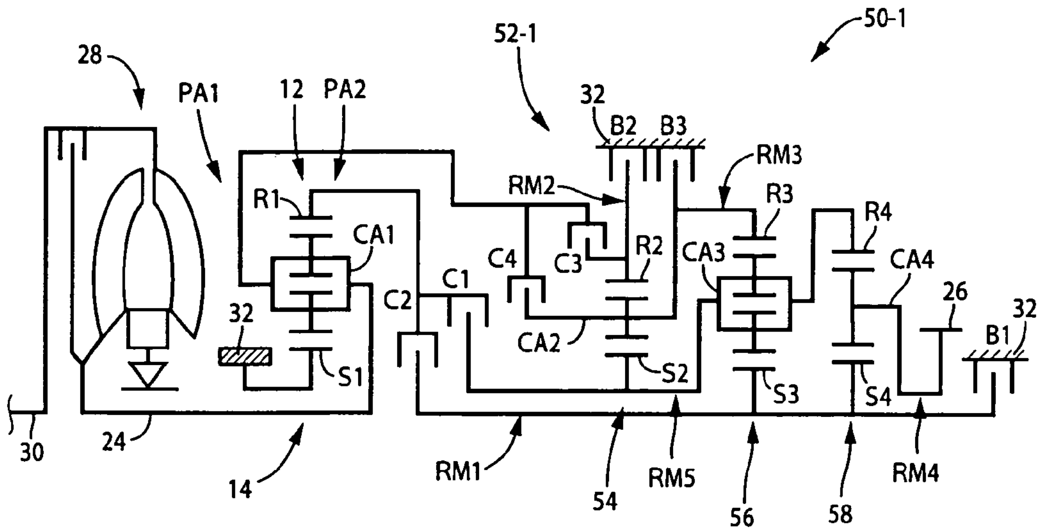
FIGS. 17(*a*) and 17(*b*) are views illustrating still another embodiment of the invention, in which a case is shown where the second transmission portion differs in the construction position thereof in comparison with the embodiment in FIG. 1, and corresponding to FIG. 1.
Figure 18:
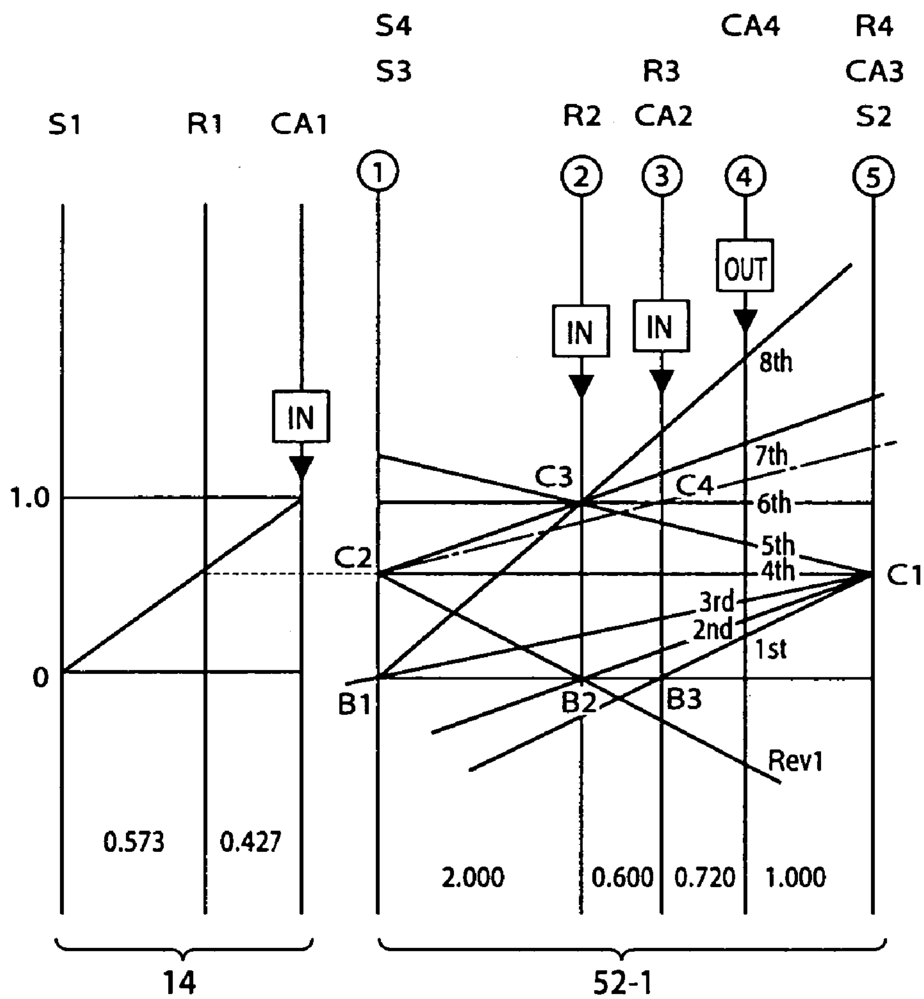
FIG. 18 is a collinear chart of the embodiment in FIG. 17.

FIG. 17 through FIG. 18 show one embodiment according to the first through the fifth aspects, the tenth aspect, the fifty-first aspect, and the fifty-third through the fifty-fifth aspects of the invention. FIG. 17 is a view corresponding to FIG. 1 described above, and FIG. 18 is a view corresponding to FIG. 2 described above. An automatic transmission 50-1 for vehicle differs from the automatic transmission 10-1 for vehicle, which is shown in FIG. 1 and FIG. 2 in the construction of the second transmission portion 52-1. That is, the second transmission portion 52-1 is composed mainly of a single-pinion type second planetary gear set 54, a double-pinion type third planetary gear set 56 and a single-pinion type fourth planetary gear set 58, wherein the first rotary element RM1 is composed of the sun gear S3 of the third planetary gear set 56 and the sun gear S4 of the fourth planetary gear set 58 connected to each other, the second rotary element RM2 is composed of the ring gear R2 of the second planetary gear set 54, the third rotary element RM3 is composed of the carrier CA2 of the second planetary gear set 54 and the ring gear R3 of the third planetary gear set 56 connected to each other, the fourth rotary element RM4 is composed of the carrier CA4 of the fourth planetary gear set 58, and the fifth rotary element RM5 is composed of the sun gear S2 of the second planetary gear set 54, the carrier CA3 of the third planetary gear set 56, and the ring gear R4 of the fourth planetary gear set 58 connected to each other. Also, mutual connections between the respective rotary elements RM1 through RM5 by means of the clutches C1 through C4 and brakes B1 through B3, and connections between the casing 32, input shaft 24, that is, the first intermediate output path PA1, the ring gear R1 of the first planetary gear set 12, that is, the second intermediate output path PA2, and the output gear 26 are the same as those of the embodiment in FIG. 1 and FIG. 2.

In this case, as shown in FIG. 17(*b*), eight forward gear stages from the first gear stage [1st] to the eighth gear stage [8th] and one reverse gear stage [Rev1] are established in accordance with the same operation table as that in FIG. 1(*b*). As shown with an alternate long and short dashed line in FIG. 18, the second clutch C2 and fourth clutch C4 are engaged with each other, the first rotary element RM1 is rotated via the first transmission portion 14 with its rotation speed reduced, and the third rotary element RM3 is rotated integral with the input shaft 24, wherein an intermediate gear stage is provided between the sixth gear stage [6th] and the seventh gear stage [7th] to enable nine gear stages in total. Also, the transmission ratios of the respective gear stages are appropriately determined by the respective gear ratios ρ1 through ρ4 of the first planetary gear set 12, the second planetary gear set 54, the third planetary gear set 56 and the fourth planetary gear set 58. For example, if ρ1 is 0.427, ρ2 is 0.349, ρ3 is 0.398 and ρ4 is 0.301, the same collinear chart as that in FIG. 2 is obtained as shown in FIG. 18, wherein as shown in FIG. 17(*b*) the same transmission ratios as those in FIG. 1(*b*) can be obtained, and actions and effects similar to those of the embodiment in FIG. 1 and FIG. 2 can be brought about.

Figures 19A, 19B:
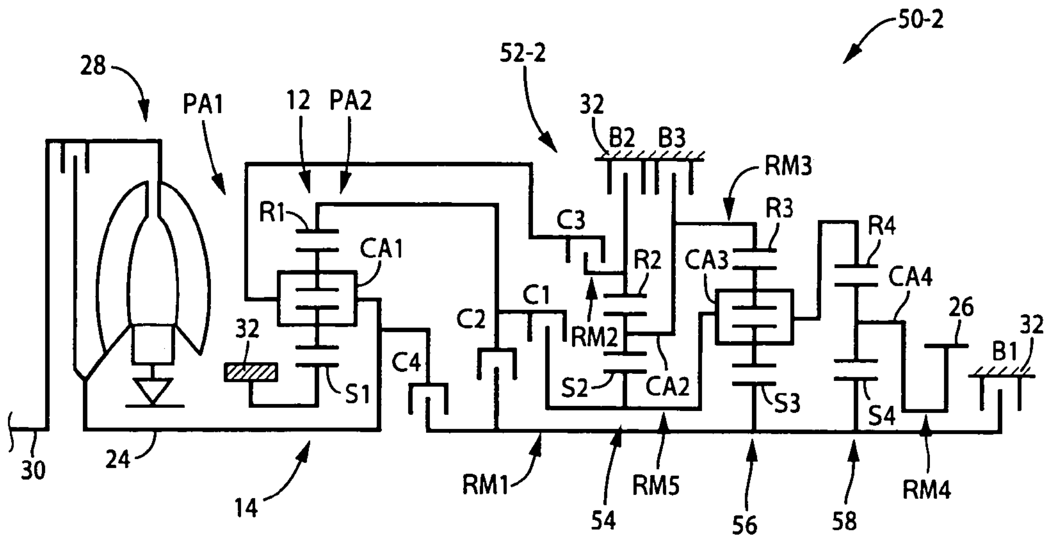
FIGS. 19(*a*) and 19(*b*) are views illustrating further another embodiment of the invention, in which a case is shown where the fourth clutch C4 differs in the arrangement position thereof in comparison with the embodiment in FIG. 17, and corresponding to FIG. 17.
Figure 20:
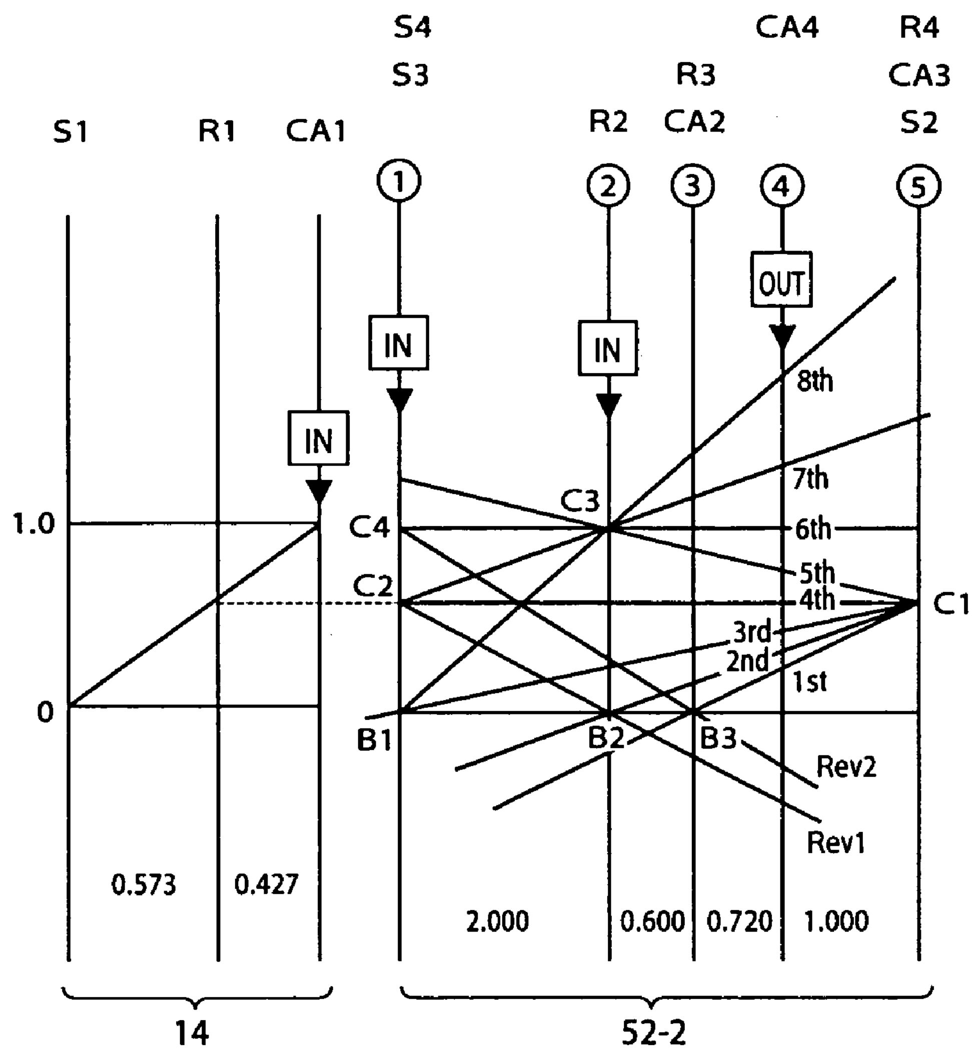
FIG. 20 is a collinear chart of the embodiment in FIG. 19.

FIG. 19 through FIG. 20 show one embodiment according to the first through the fifth aspects, the tenth aspect, the fifty-first aspect, and the fifty-third through the fifty-fifth aspects of the invention. FIG. 19 is a view corresponding to FIG. 1 described above, and FIG. 20 is a view corresponding to FIG. 2 described above. An automatic transmission 50-2 for vehicle differs from the automatic transmission 50-1 for vehicle, which is shown in FIG. 17 and FIG. 18 in that the first rotary element RM1 (Sun gears S3 and S4) of the second transmission portion 52-2 is selectively connected via the fourth clutch C4 to the input shaft 24, that is, the first intermediate output path PA1. However, as shown in FIG. 19(*b*), eight forward gear stages from the first gear stage [1st] to the eighth gear stage [8th] and one reverse gear stage [Rev1] are established in accordance with the same operation table as that in FIG. 17(*b*), and the same collinear chart as that in FIG. 18 can be obtained as shown in FIG. 20, wherein similar actions and effects can be brought about. Also, as shown in FIG. 19(*b*) and FIG. 20, the automatic transmission 50-2 for vehicle may be composed so that the fourth clutch C4 and the third brake B3 are engaged with each other as shown in FIG. 3(*b*) and FIG. 4, the first rotary element RM1 is rotated integral with the input shaft 24, and the third rotary element RM3 is brought to a stationary state, wherein the fourth rotary element RM4 is reversed at a rotation speed [Rev2], and the second reverse gear stage [Rev2] maybe established in addition to the first reverse gear stage [Rev1].

Figures 21A, 21B:
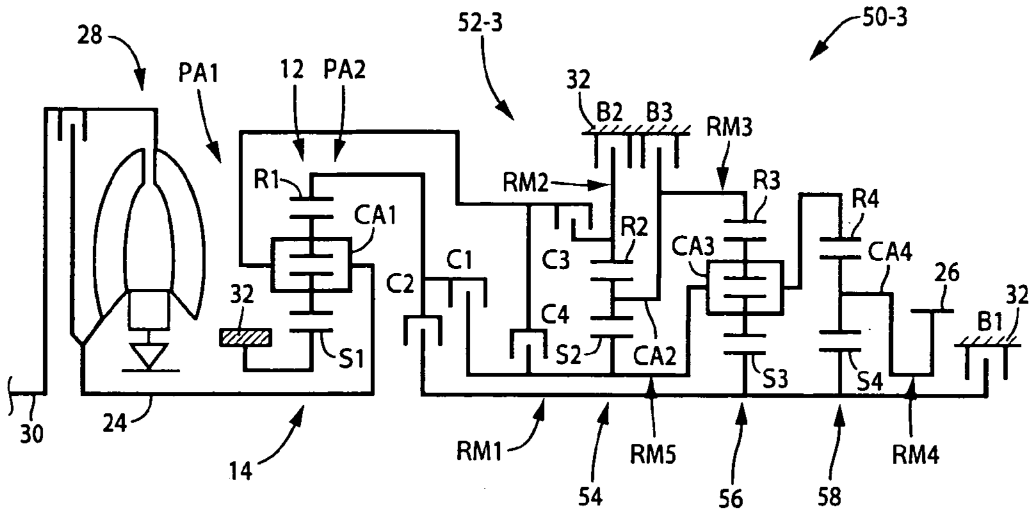
FIGS. 21(*a*) and 21(*b*) are views illustrating further another embodiment of the invention, in which a case is shown where the fourth clutch C4 differs in the arrangement position thereof in comparison with the embodiment in FIG. 17, and corresponding to FIG. 17.
Figure 22:
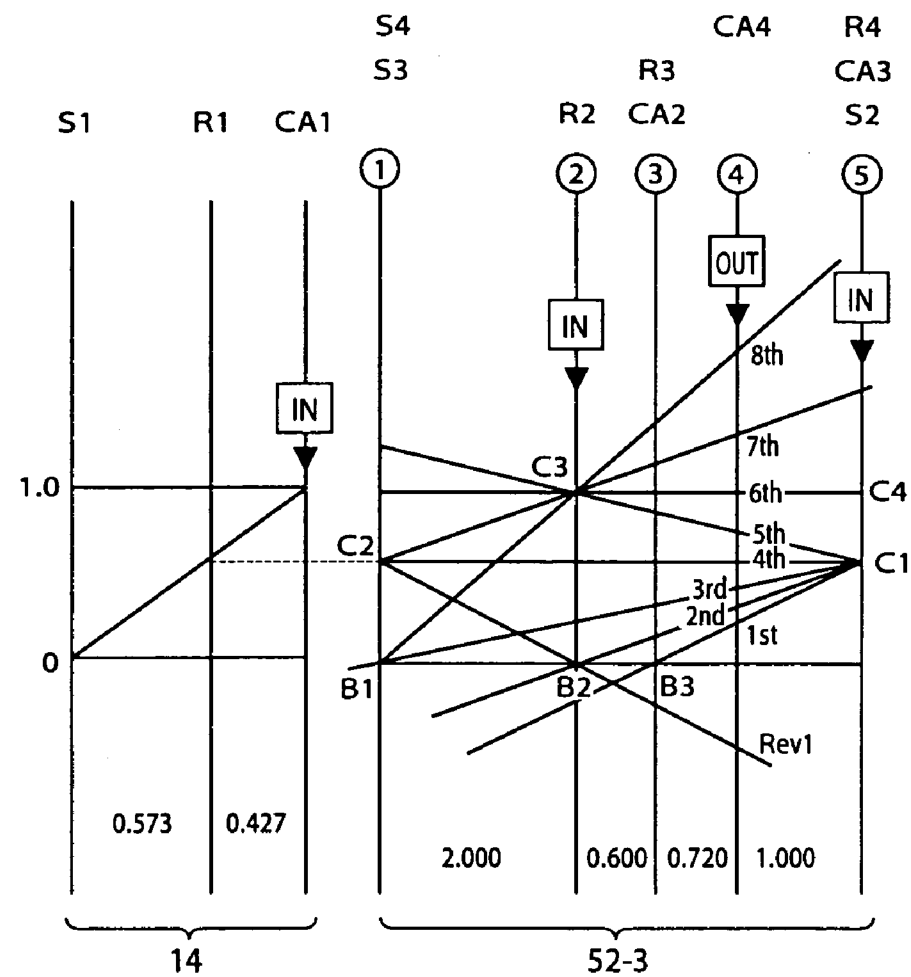
FIG. 22 is a collinear chart of the embodiment in FIG. 21.

FIG. 21 through FIG. 22 show one embodiment according to the first through the fifth aspects, the tenth aspect, the fifty-first aspect, and the fifty-third through the fifty-fifth aspects of the invention. FIG. 21 is a view corresponding to FIG. 1 described above, and FIG. 22 is a view corresponding to FIG. 2 described above. An automatic transmission 50-3 for vehicle differs from the automatic transmission 50-1 for vehicle, which is shown in FIG. 17 and FIG. 18 in that the fifth rotary element RM5 (Sun gear S2, carrier CA3, and ring gear R4) of the second transmission portion 52-3 is selectively connected to the input shaft 24, that is, the first intermediate output path PA1 via the fourth clutch C4. However, as shown in FIG. 21(*b*), eight forward gear stages from the first gear stage [1st] to the eighth gear stage [8th] and one reverse gear stage [Rev1] are established in accordance with the same operation table as that in FIG. 17(*b*), and the same collinear chart as that in FIG. 18 can be obtained as shown in FIG. 22, wherein similar actions and effects can be brought about.

Figures 23A, 23B:
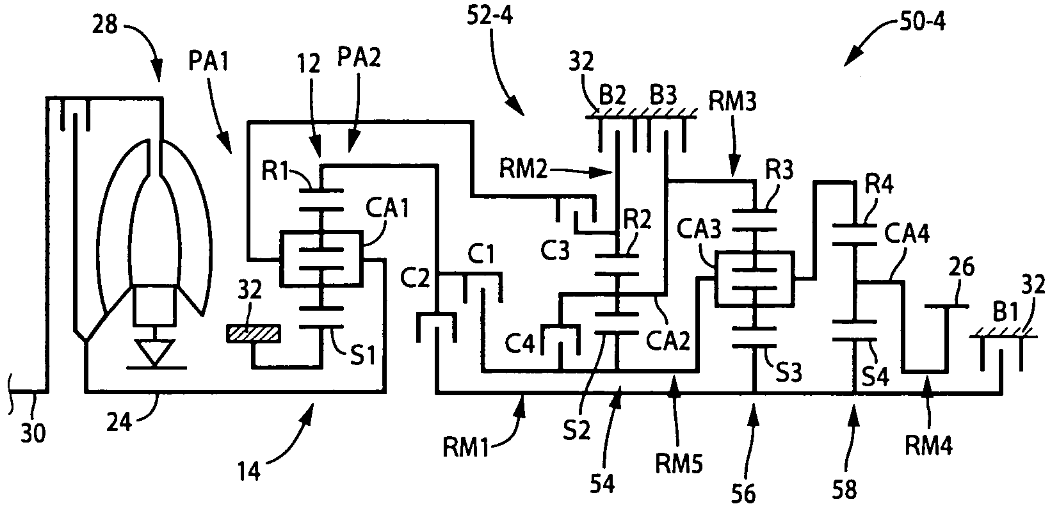
FIGS. 23(*a*) and 23(*b*) are views illustrating still further another embodiment of the invention, in which a case is shown where the fourth clutch C4 differs in the arrangement position thereof in comparison with the embodiment in FIG. 17, and corresponding to FIG. 17.
Figure 24:
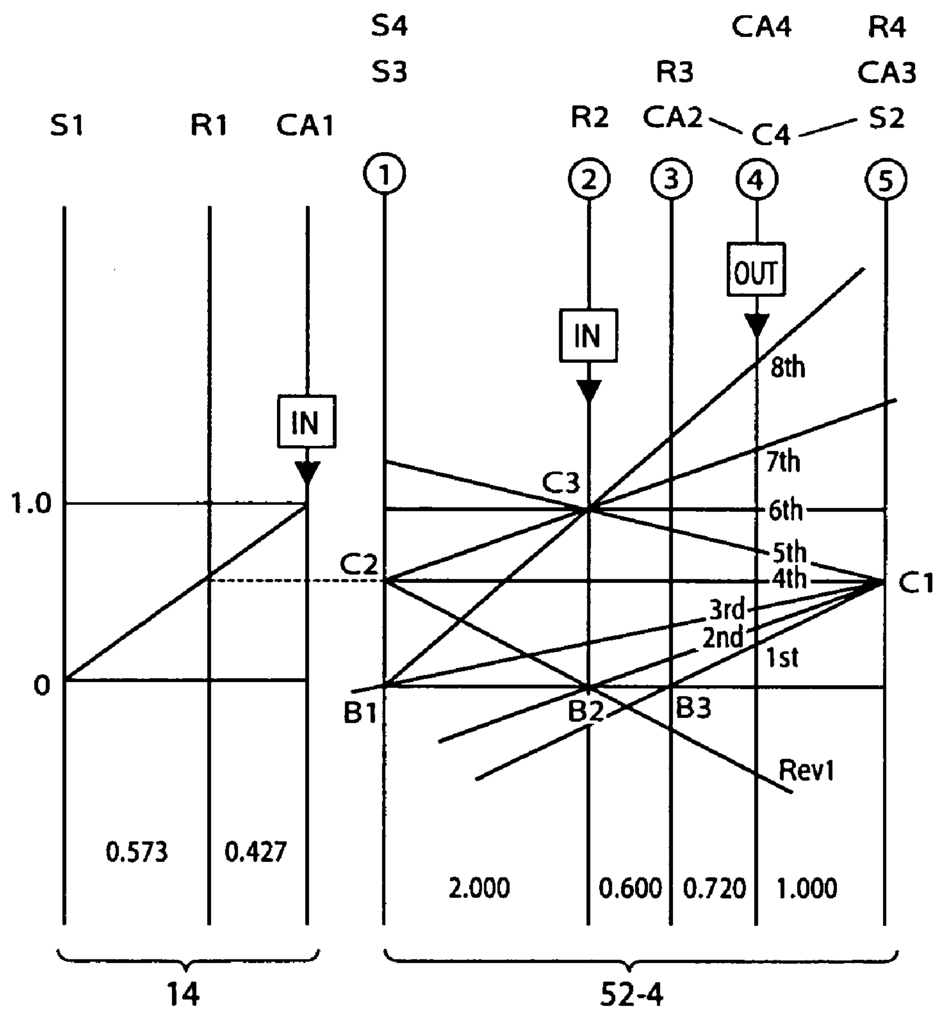
FIG. 24 is a collinear chart of the embodiment in FIG. 23.

FIG. 23 through FIG. 24 show one embodiment according to the first through the fourth aspects, the sixth aspect, the tenth aspect, and the fifty-second through the fifty-fifth aspects of the invention. FIG. 23 is a view corresponding to FIG. 1 described above, and FIG. 24 is a view corresponding to FIG. 2 described above. An automatic transmission 50-4 for vehicle differs from the automatic transmission 50-1 for vehicle, which is shown in FIG. 17 and FIG. 18 in that the third rotary element RM3 (Carrier CA2 and ring gear R3) of the second transmission portion 52-4 and the fifth rotary element RM5 (Sun gear S2, carrier CA3 and ring gear R4) thereof are selectively connected integral with each other via the fourth clutch C4. However, as shown in FIG. 23(*b*), eight forward gear stages from the first gear stage [1st] to the eighth gear stage [8th] and one reverse gear stage [Rev1] are established in accordance with the same operation table as that in FIG. 17(*b*), and the same collinear chart as that in FIG. 18 can be obtained as shown in FIG. 24, wherein similar actions and effects can be brought about.

Figure 26:
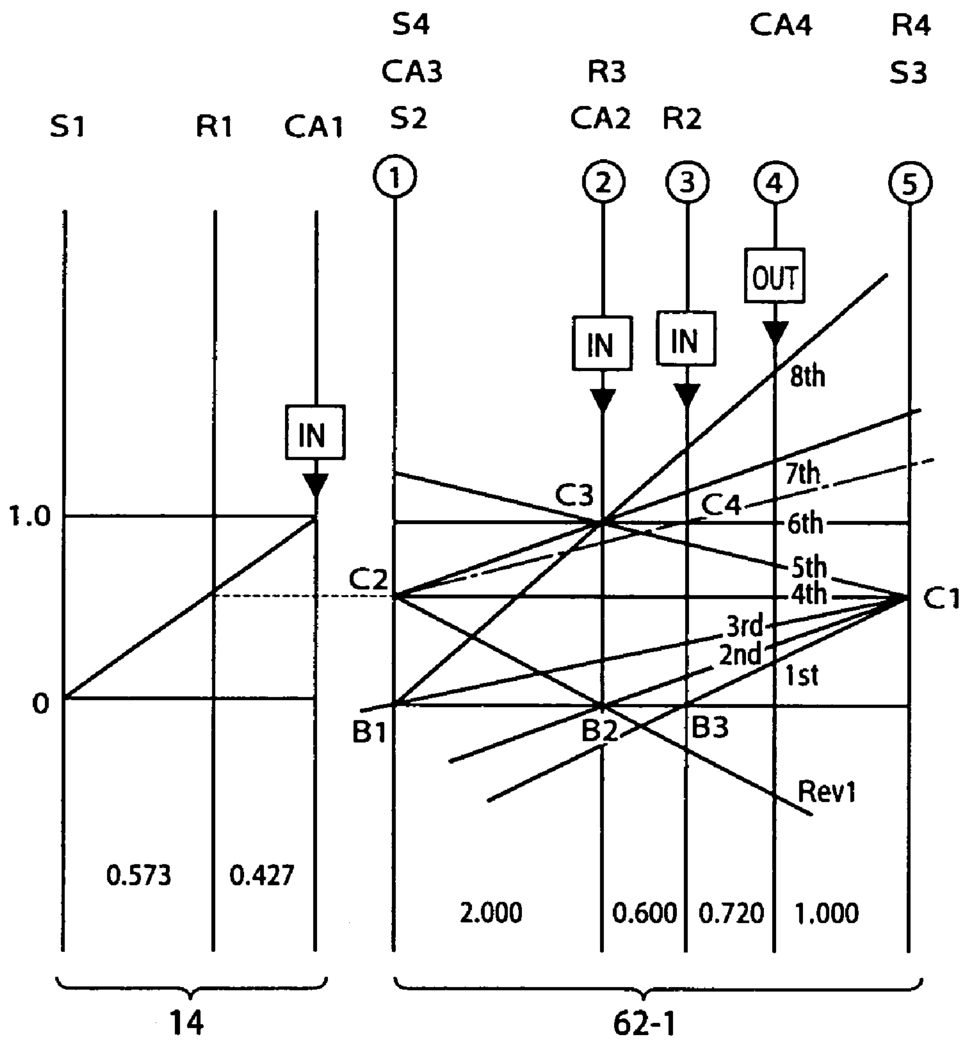
FIG. 26 is a collinear chart of the embodiment in FIG. 25.

FIG. 25 through FIG. 26 show one embodiment according to the first through the fifth aspects, the eleventh aspect, the fifty-first aspect, and the fifty-third through the fifty-fifth aspects of the invention. FIG. 25 is a view corresponding to FIG. 1 described above, and FIG. 26 is a view corresponding to FIG. 2 described above. An automatic transmission 60-1 for vehicle differs from the automatic transmission 10-1 for vehicle, which is shown in FIG. 1 and FIG. 2 in the construction of the second transmission portion 62-1, and is preferably used for longitudinal installation in an FR vehicle. That is, the second transmission portion 62-1 is composed mainly of a single-pinion type second planetary gear set 64, a double-pinion type third planetary gear set 66 and a single-pinion type fourth planetary gear set 68, wherein the first rotary element RM1 is composed of the sun gear S2 of the second planetary gear set 64 and the carrier CA3 of the third planetary gear set 66 and the sun gear S4 of the fourth planetary gear set 68 connected to each other, the second rotary element RM2 is composed of the carrier CA2 of the second planetary gear set 64 and ring gear R3 of the third planetary gear set 66 connected to each other, the third rotary element RM3 is composed of the ring gear R2 of the second planetary gear set 64, the fourth rotary element RM4 is composed of the carrier CA4 of the fourth planetary gear set 68, and the fifth rotary element RM5 is composed of the sun gear S3 of the third planetary gear set 66 and the ring gear R4 of the fourth planetary gear set 68 connected to each other. Also, an output shaft 27 is provided instead of the above-described output gear 26, and the fourth rotary element RM4 (Carrier CA4) is connected integral with the output shaft 27. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment in FIG. 1 and FIG. 2.

In this case, as shown in FIG. 25(*b*), eight forward gear stages from the first gear stage [1st] to the eighth gear stage [8th] and one reverse gear stage [Rev1] are established in accordance with the same operation table as that in FIG. 1(*b*). As shown with an alternate long and short dashed line in FIG. 26, the second clutch C2 and fourth clutch C4 are engaged with each other, the first rotary element RM1 is rotated via the first transmission portion 14 with its rotation speed reduced, and the third rotary element RM3 is rotated integral with the input shaft 24, wherein an intermediate gear stage is provided between the sixth gear stage [6th] and the seventh gear stage [7th] to enable nine gear stages in total. Also, the transmission ratios of the respective gear stages are appropriately determined by the respective gear ratios ρ1 through ρ4 of the first planetary gear set 12, the second planetary gear set 64, the third planetary gear set 66 and the fourth planetary gear set 68. For example, if ρ1 is 0.427, ρ2 is 0.300, ρ3 is 0.463 and ρ4 is 0.301, the same collinear chart as that in FIG. 2 is obtained as shown in FIG. 26, wherein as shown in FIG. 25(*b*) the same transmission ratios as those in FIG. 1(*b*) can be obtained, and actions and effects similar to those of the embodiment in FIG. 1 and FIG. 2 can be brought about.

Figures 27A, 27B:
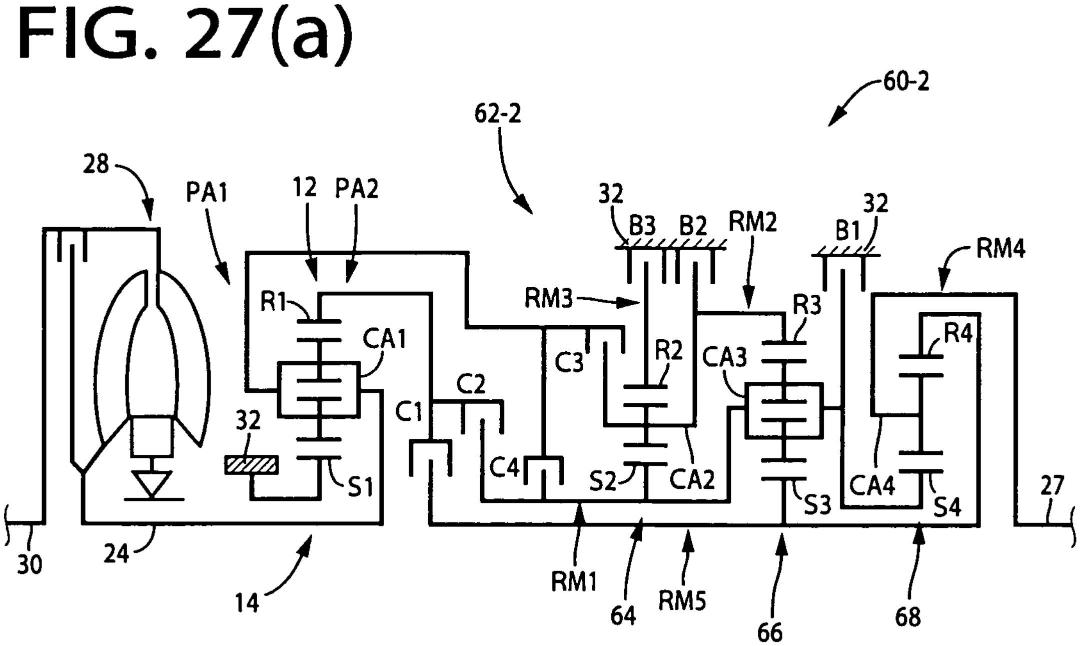
FIGS. 27(*a*) and 27(*b*) are views illustrating further another embodiment of the invention, in which a case is shown where the fourth clutch C4 differs in the arrangement position thereof in comparison with the embodiment in FIG. 25, and corresponding to FIG. 25.
Figure 28:
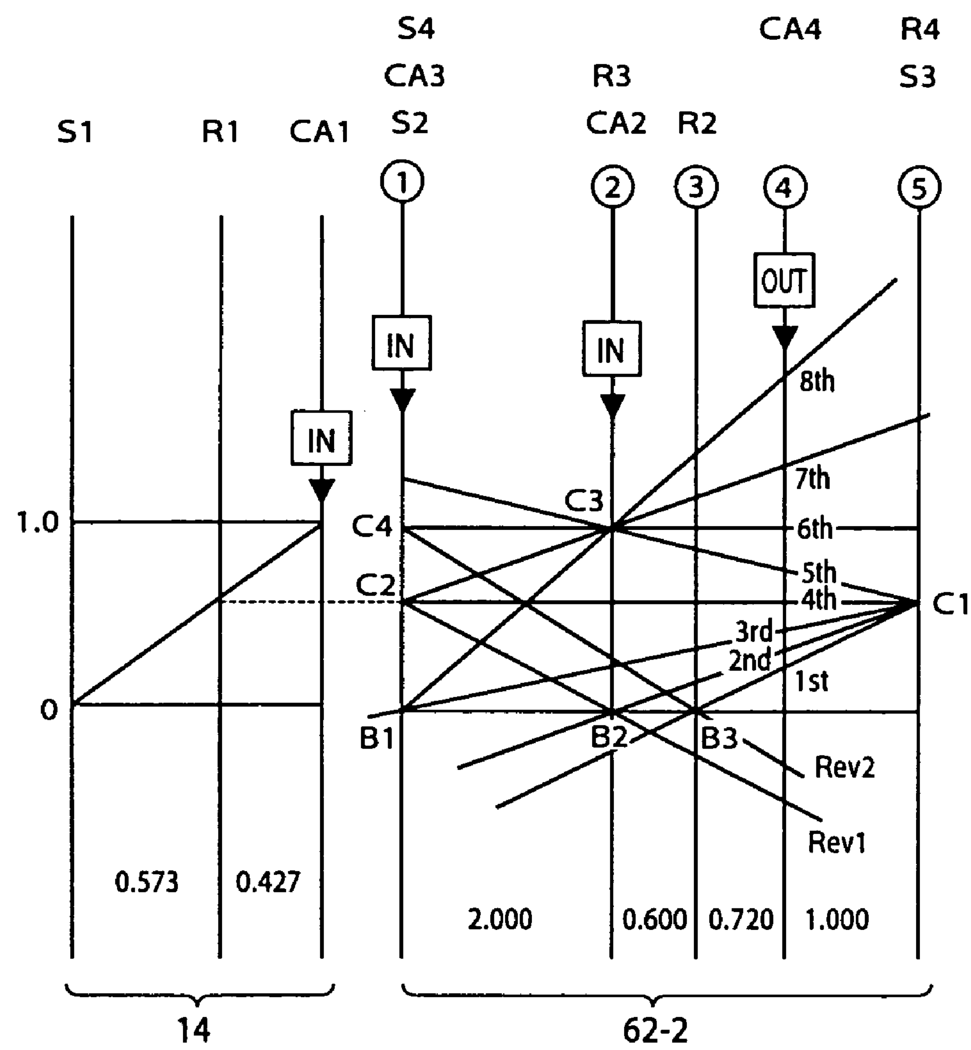
FIG. 28 is a collinear chart of the embodiment in FIG. 27.

FIG. 27 through FIG. 28 show one embodiment according to the first through the fifth aspects, the eleventh aspect, the fifty-first aspect, and the fifty-third through the fifty-fifth aspects of the invention. FIG. 27 is a view corresponding to FIG. 1 described above, and FIG. 28 is a view corresponding to FIG. 2 described above. An automatic transmission 60-2 for vehicle differs from the automatic transmission 60-1 for vehicle, which is shown in FIG. 25 and FIG. 26 in that the first rotary element RM1 (Sun gear S2, carrier CA3 and sun gear S4) of the second transmission portion 62-2 is selectively connected via the fourth clutch C4 to the input shaft 24, that is, the first intermediate output path PA1. However, as shown in FIG. 27(*b*), eight forward gear stages from the first gear stage [1st] to the eighth gear stage [8th] and one reverse gear stage [Rev1] are established in accordance with the same operation table as that in FIG. 25(*b*), and the same collinear chart as that in FIG. 26 can be obtained as shown in FIG. 28, wherein similar actions and effects can be brought about. Also, as shown in FIG. 27(*b*) and FIG. 28, the automatic transmission 60-2 for vehicle may be composed so that the fourth clutch C4 and the third brake B3 are engaged with each other as shown in FIG. 3(*b*) and FIG. 4, the first rotary element RM1 is rotated integral with the input shaft 24, and the third rotary element RM3 is brought to a stationary state, wherein the fourth rotary element RM4 is reversed at a rotation speed [Rev2], and the second reverse gear stage [Rev2] may be established in addition to the first reverse gear stage [Rev1].

Figures 29A, 29B:
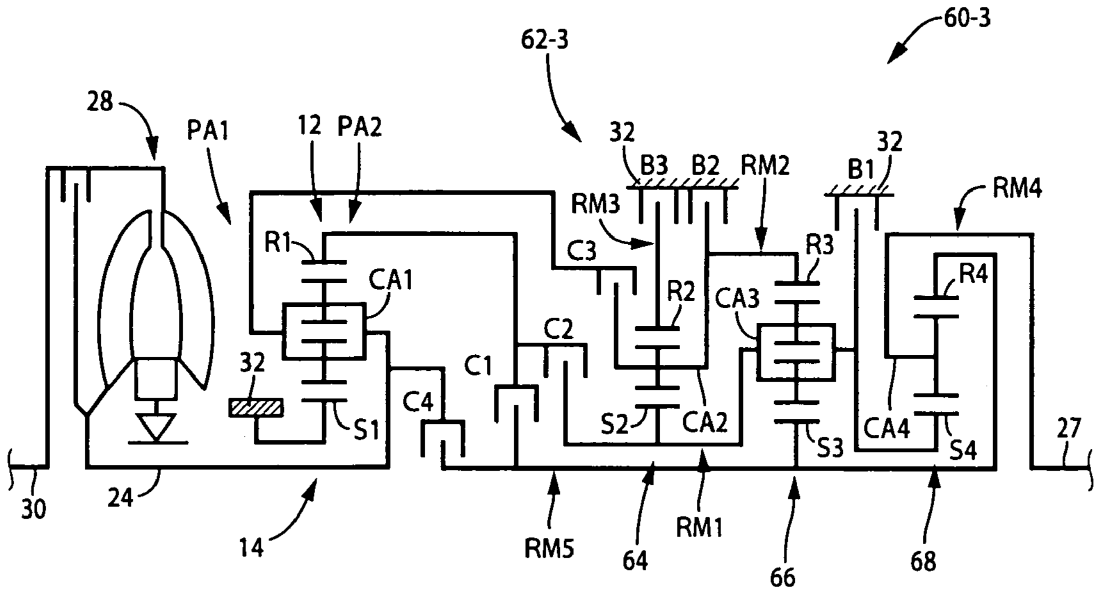
FIGS. 29(*a*) and 29(*b*) are views illustrating further another embodiment of the invention, in which a case is shown where the fourth clutch C4 differs in the arrangement position thereof in comparison with the embodiment in FIG. 25, and corresponding to FIG. 25.
Figure 30:
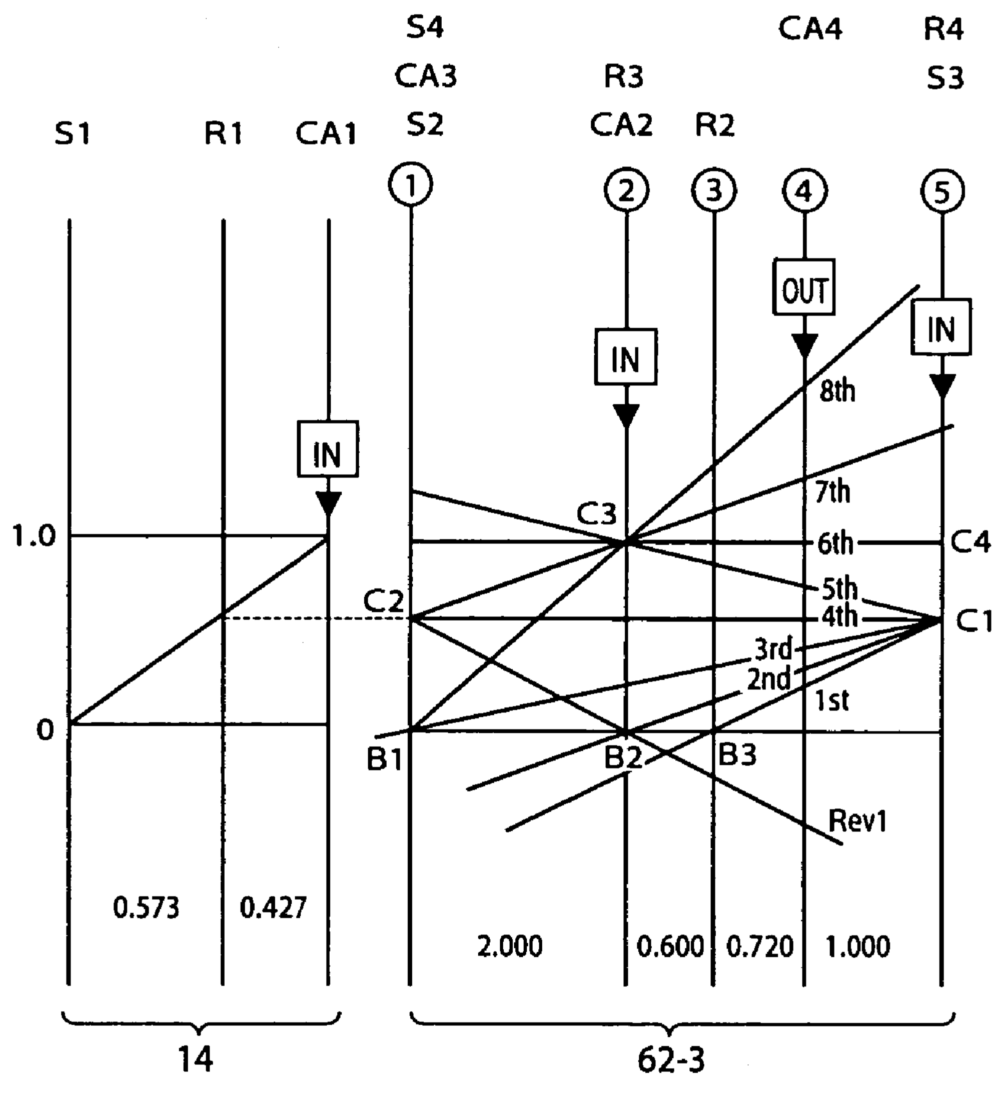
FIG. 30 is a collinear chart of the embodiment in FIG. 29.

FIG. 29 through FIG. 30 show one embodiment according to the first through the fifth aspects, the eleventh aspect, the fifty-first aspect, and the fifty-third through the fifty-fifth aspects of the invention. FIG. 29 is a view corresponding to FIG. 1 described above, and FIG. 30 is a view corresponding to FIG. 2 described above. An automatic transmission 60-3 for vehicle differs from the automatic transmission 60-1 for vehicle, which is shown in FIG. 25 and FIG. 26 in that the fifth rotary element RM5 (Sun gear S3 and ring gear R4) of the second transmission portion 62-3 is selectively connected to the input shaft 24, that is, the first intermediate output path PA1 via the fourth clutch C4. However, as shown in FIG. 29(*b*), eight forward gear stages from the first gear stage [1st] to the eighth gear stage [8th] and one reverse gear stage [Rev1] are established in accordance with the same operation table as that in FIG. 25(*b*), and the same collinear chart as that in FIG. 26 can be obtained as shown in FIG. 30, wherein similar actions and effects can be brought about.

Figures 31A, 31B:
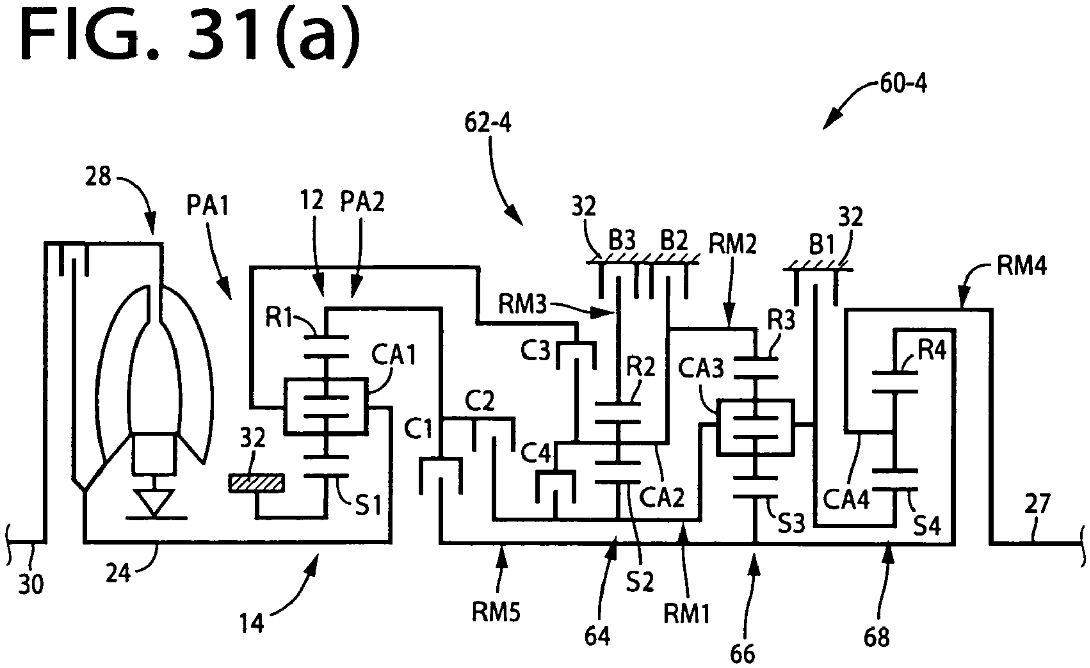
FIGS. 31(*a*) and 31(*b*) are views illustrating further another embodiment of the invention, in which a case is shown where the fourth clutch C4 differs in the arrangement position thereof in comparison with the embodiment in FIG. 25, and corresponding to FIG. 25.
Figure 32:
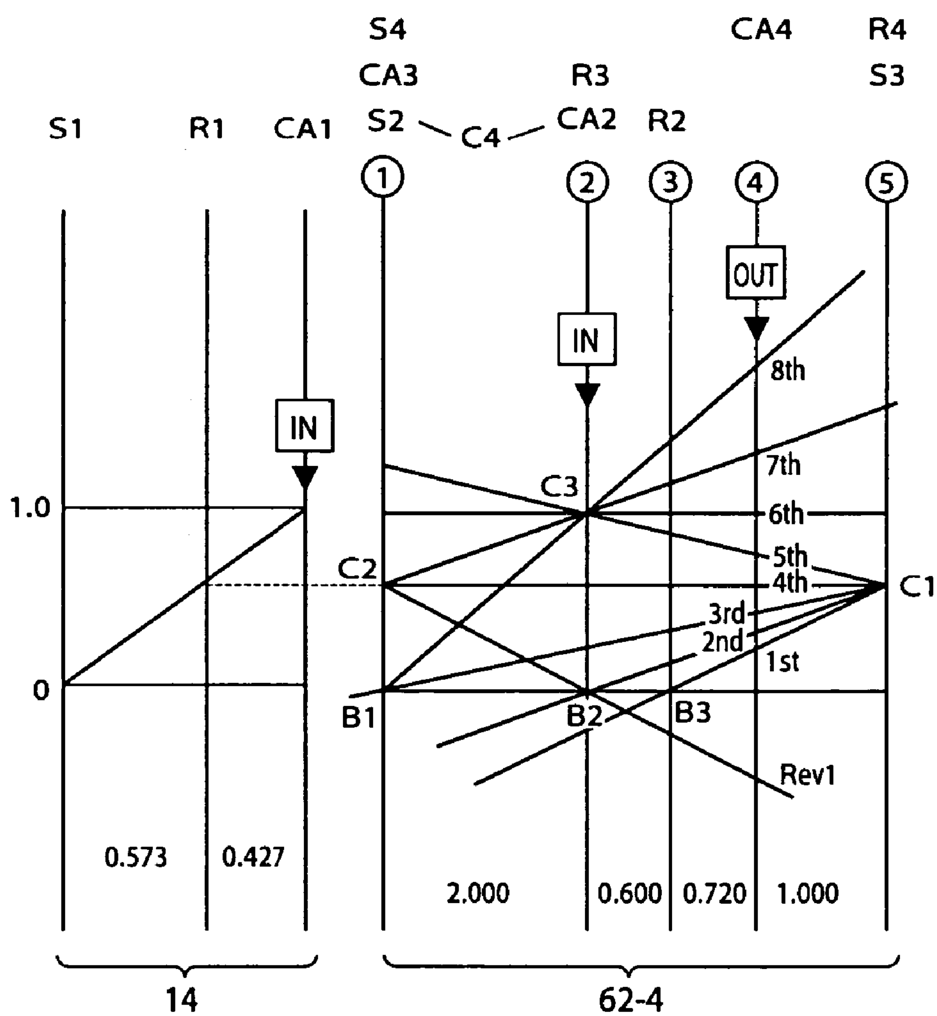
FIG. 32 is a collinear chart of the embodiment in FIG. 29.

FIG. 31 through FIG. 32 show one embodiment according to the first through the fourth aspects, the sixth aspect, the eleventh aspect, and the fifty-second through the fifty-fifth aspects of the invention. FIG. 31 is a view corresponding to FIG. 1 described above, and FIG. 32 is a view corresponding to FIG. 2 described above. An automatic transmission 60-4 for vehicle differs from the automatic transmission 60-1 for vehicle, which is shown in FIG. 25 and FIG. 26 in that the first rotary element RM1 (Sun gear S2, carrier CA3 and sun gear S4) of the second-transmission portion 62-4 and the second rotary element RM2 (Carrier CA2 and ring gear R3) thereof are selectively connected integral with each other via the fourth clutch C4. However, as shown in FIG. 31(*b*), eight forward gear stages from the first gear stage [1st] to the eighth gear stage [8th] and one reverse gear stage [Rev1] are established in accordance with the same operation table as that in FIG. 25(*b*), and the same collinear chart as that in FIG. 26 can be obtained as shown in FIG. 32, wherein similar actions and effects can be brought about.

Figures 33A, 33B:
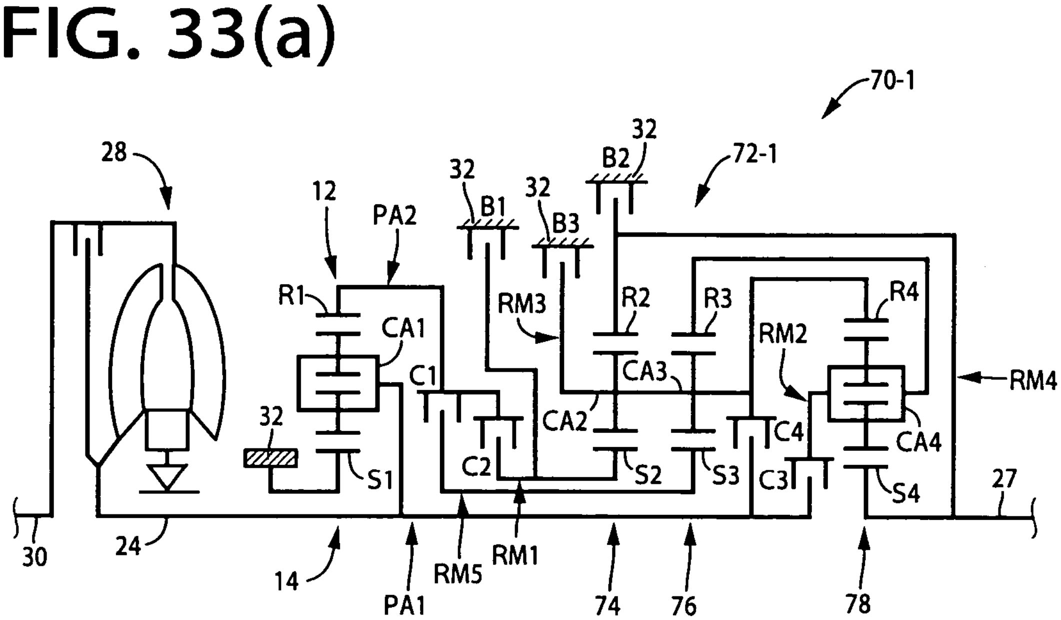
FIGS. 33(*a*) and 33(*b*) are views is a view illustrating still another embodiment of the invention, in which a case is shown where the second transmission portion differs in the construction thereof in comparison with the embodiment in FIG. 1, and corresponding to FIG. 1.
Figure 34:
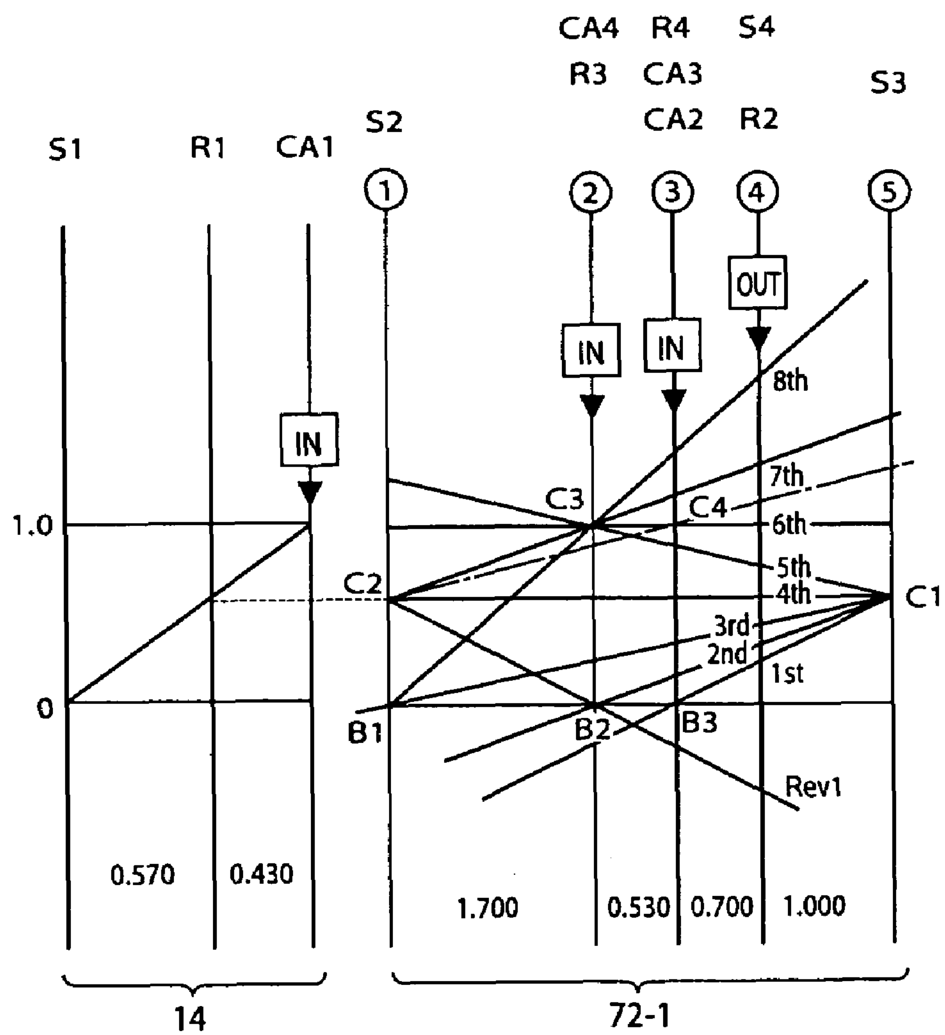
FIG. 34 is a collinear chart of the embodiment in FIG. 33.

FIG. 33 through FIG. 34 show one embodiment according to the first through the fifth aspects, the twelfth aspect, the fifty-first aspect, and the fifty-third through the fifty-fifth aspects of, the invention. FIG. 33 is a view corresponding to FIG. 1 described above, and FIG. 34 is a view corresponding to FIG. 2 described above. An automatic transmission 70-1 for vehicle differs from the automatic transmission 10-1 for vehicle, which is shown in FIG. 1 and FIG. 2 in the construction of the second transmission portion 72-1, and is preferably used for longitudinal installation in an FR vehicle. That is, the second transmission portion 72-1 is composed mainly of a single-pinion type second planetary gear set 74, a single-pinion type third planetary gear set 76 and a double-pinion type fourth planetary gear set 78, wherein the first rotary element RM1 is composed of the sun gear S2 of the second planetary gear set 74, the second rotary element RM2 is composed of the ring gear R3 of the third planetary gear set 76 and the carrier CA4 of the fourth planetary gear set 78 connected to each other, the third rotary element RM3 is composed of the carrier CA2 of the second planetary gear set 74, the carrier CA3 of the third planetary gear set 76 and the ring gear R4 of the fourth planetary gear set 78 connected to each other, the fourth rotary element RM4 is composed of the ring gear R2 of the second planetary gear set 74 and the sun gear S4 of the fourth planetary gear set 78 connected to each other, and the fifth rotary element RM5 is composed of the sun gear S3 of the third planetary gear set 76. Also, an output shaft 27 is provided instead of the above-described output gear 26, and the fourth rotary element RM4 (Ring gear R2 and sun gear S4) is connected integral with the output shaft 27. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment in FIG. 1 and FIG. 2. However, as shown in the collinear chart of FIG. 34, respective intervals of respective vertical lines of the first transmission portion 14 and five vertical lines of the second transmission portion 72-1 are different from those in FIG. 2. The intervals of these vertical lines are appropriately determined by respective gear ratios p1 through ρ4 of the first planetary gear set 12, second planetary gear set 74, third planetary gear set 76, and fourth planetary gear set 78 as in FIG. 2, and FIG. 34 shows a case where ρ1 is 0.430, ρ2 is 0.314, ρ3 is 0.312 and ρ4 is 0.431.

In this case, as shown in FIG. 33(*b*), eight forward gear stages from the first gear stage [1st] to the eighth gear stage [8th] and one reverse gear stage [Rev1] are established in accordance with the same operation table as that in FIG. 1(*b*). As shown with an alternate long and short dashed line in FIG. 34, the second clutch C2 and fourth clutch C4 are engaged with each other, the first rotary element RM1 is rotated via the first transmission portion 14 with its rotation speed reduced, and the third rotary element RM3 is rotated integral with the input shaft 24, wherein an intermediate gear stage is provided between the sixth gear stage [6th] and the seventh gear stage [7th] to enable nine gear stages in total. Also, the transmission ratios of the respective gear stages are appropriately determined by the respective gear ratios ρ1 through ρ4 of the first planetary gear set 12, the second planetary gear set 74, the third planetary gear set 76 and the fourth planetary gear set 78. For example, if ρ1 is 0.430, ρ2 is 0.314, ρ3 is 0.312 and ρ4 is 0.431, the transmission ratios shown in FIG. 33(*b*) can be obtained, wherein the values of the gear ratio step (ratio of the transmission ratios between the respective gear stages) is substantially appropriate, the total range (=4.261/0.580) of transmission ratios is large to become 7.343, and the transmission ratio of the reverse gear stage [Rev1] is also appropriate. Herein, adequate transmission ratio characteristics can be obtained as a whole. Therefore, it can seem that the above-described transmission ratio characteristics are substantially the same as those of the embodiment of FIG. 1 and FIG. 2. Actions and effects similar to those of the embodiment in FIG. 1 and FIG. 2 can be brought about.

Figures 35A, 35B:
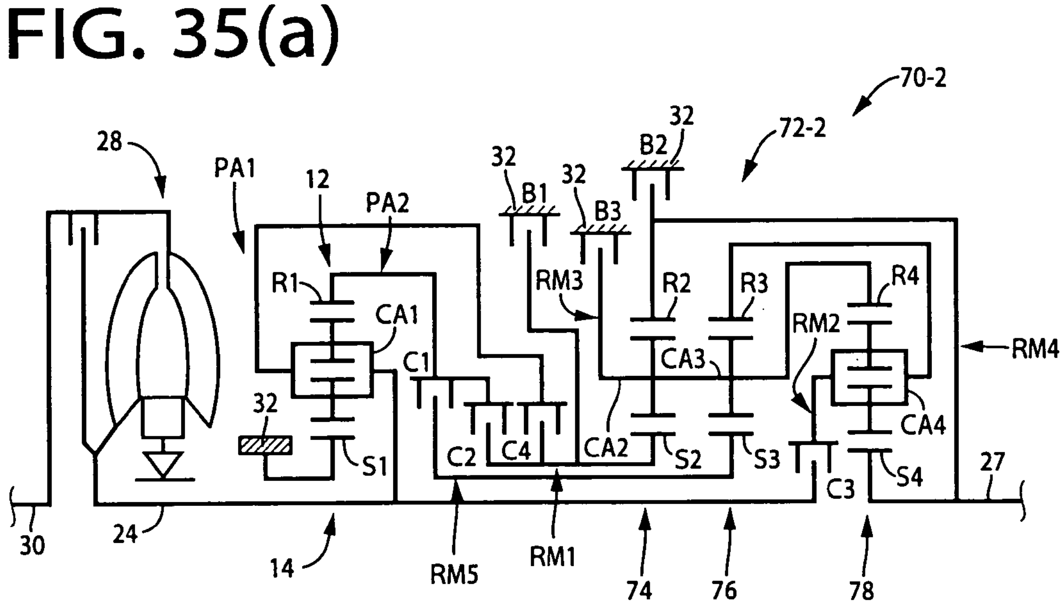
FIGS. 35(*a*) and 35(*b*) are views illustrating further another embodiment of the invention, in which a case is shown where the fourth clutch C4 differs in the arrangement position thereof in comparison with the embodiment in FIG. 33, and corresponding to FIG. 33.
Figure 36:
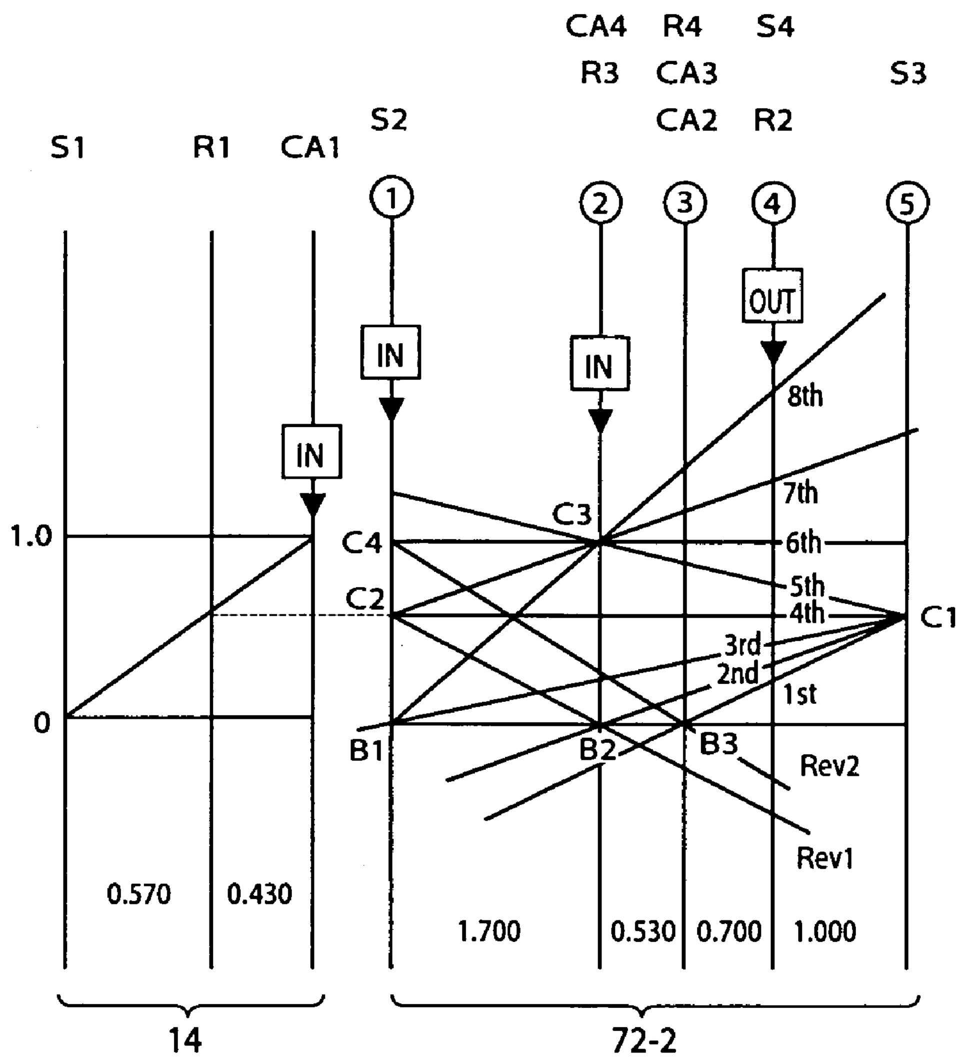
FIG. 36 is a collinear chart of the embodiment in FIG. 35.

FIG. 35 through FIG. 36 show one embodiment according to the first through the fifth aspects, the twelfth aspect, the fifty-first aspect, and the fifty-third through the fifty-fifth aspects of the invention. FIG. 35 is a view corresponding to FIG. 1 described above, and FIG. 36 is a view corresponding to FIG. 2 described above. An automatic transmission 70-2 for vehicle differs from the automatic transmission 70-1 for vehicle, which is shown in FIG. 33 and FIG. 34 in that the first rotary element RM1 (Sun gear S2) of the second transmission portion 72-2 is selectively connected via the fourth clutch C4 to the input shaft 24, that is, the first intermediate output path PA1. However, as shown in FIG. 35(*b*), eight forward gear stages from the first gear stage [1st] to the eighth gear stage [8th] and one reverse gear stage [Rev1] are established in accordance with the same operation table as that in FIG. 33(*b*), and the same collinear chart as that in FIG. 34 can be obtained as shown in FIG. 36, wherein similar actions and effects can be brought about. Also, as shown in FIG. 35(*b*) and FIG. 36, the automatic transmission 70-2 for vehicle may be composed so that the fourth clutch C4 and the third brake B3 are engaged with each other as shown in FIG. 3(*b*) and FIG. 4, the first rotary element RM1 is rotated integral with the input shaft 24, and the third rotary element RM3 is brought to a stationary state, wherein the fourth rotary element RM4 is reversed at a rotation speed [Rev2], and the second reverse gear stage [Rev2] may be established in addition to the first reverse gear stage [Rev1].

Figures 37A, 37B:
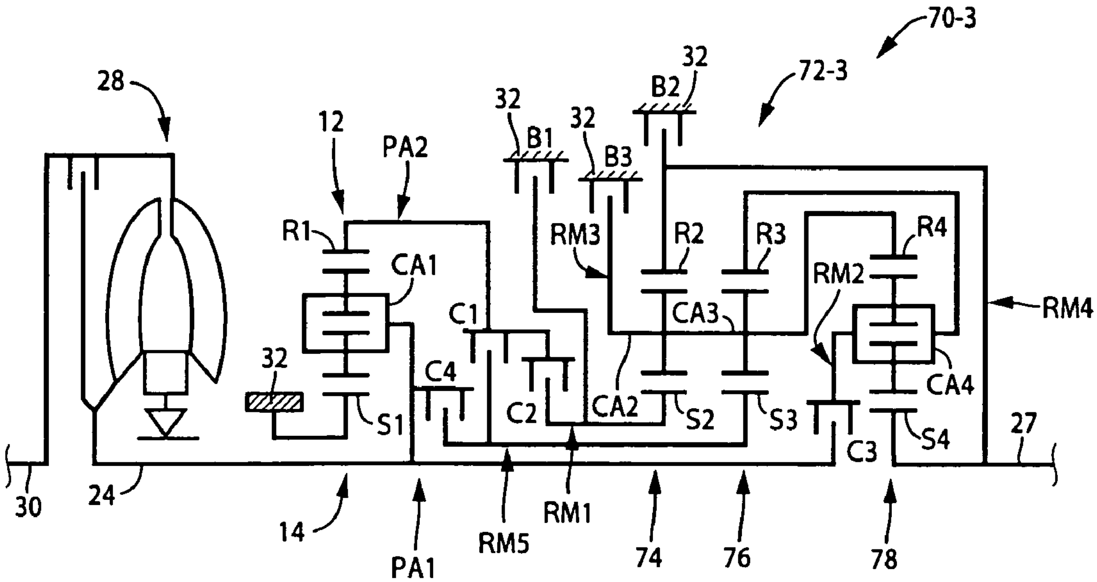
FIGS. 37(*a*) and 37(*b*) are views illustrating further another embodiment of the invention, in which a case is shown where the fourth clutch C4 differs in the arrangement position thereof in comparison with the embodiment in FIG. 33, and corresponding to FIG. 33.
Figure 38:
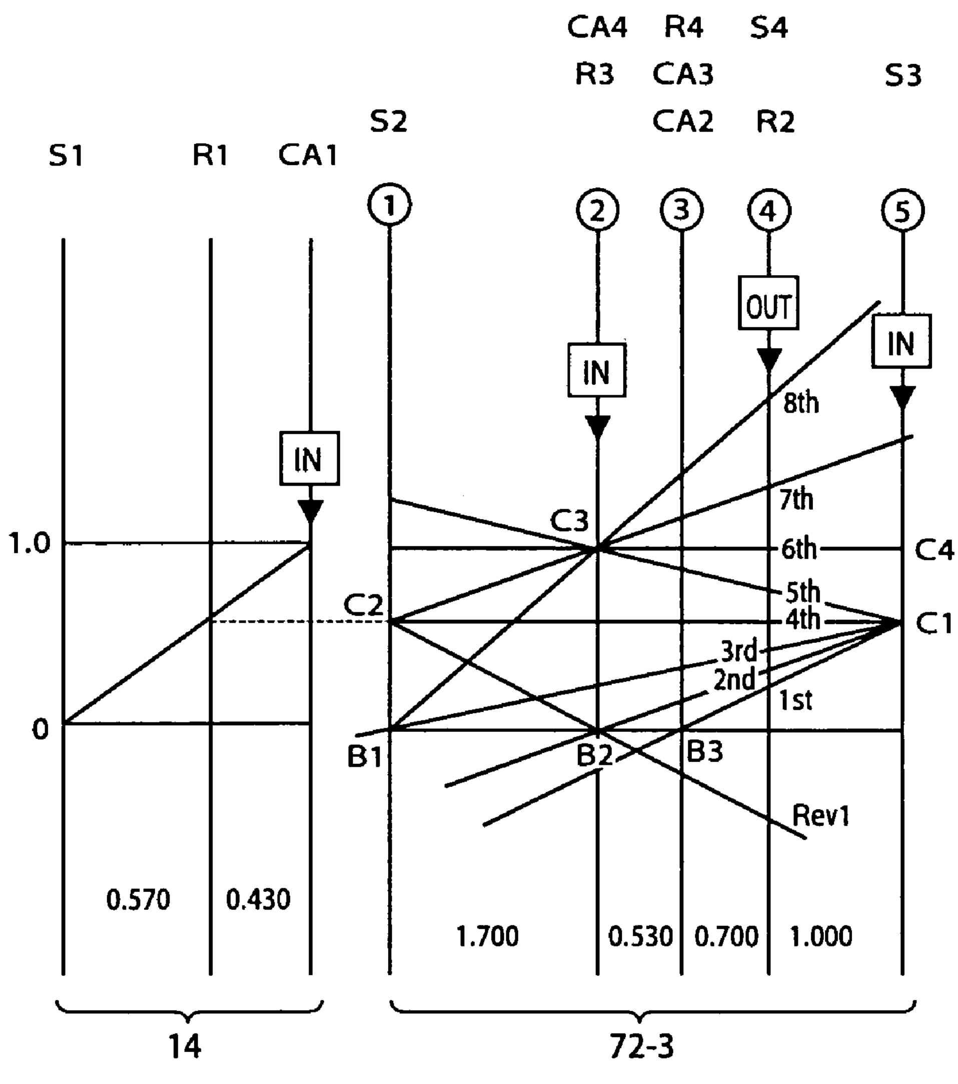
FIG. 38 is a collinear chart of the embodiment in FIG. 37.

FIG. 37 through FIG. 38 show one embodiment according to the first through the fifth aspects, the twelfth aspect, the fifty-first aspect, and the fifty-third through the fifty-fifth aspects of the invention. FIG. 37 is a view corresponding to FIG. 1 described above, and FIG. 38 is a view corresponding to FIG. 2 described above. An automatic transmission 70-3 for vehicle differs from the automatic transmission 70-1 for vehicle, which is shown in FIG. 33 and FIG. 34 in that the fifth rotary element RM5 (Sun gear S3) of the second transmission portion 72-3 is selectively connected to the input shaft 24, that is, the first intermediate output path PA1 via the fourth clutch C4. However, as shown in FIG. 37(*b*), eight forward gear stages from the first gear stage [1st] to the eighth gear stage [8th] and one reverse gear stage [Rev1] are established in accordance with the same operation table as that in FIG. 33(*b*), and the same collinear chart as that in FIG. 34 can be obtained as shown in FIG. 38, wherein similar actions and effects can be brought about.

Figures 39A, 39B:
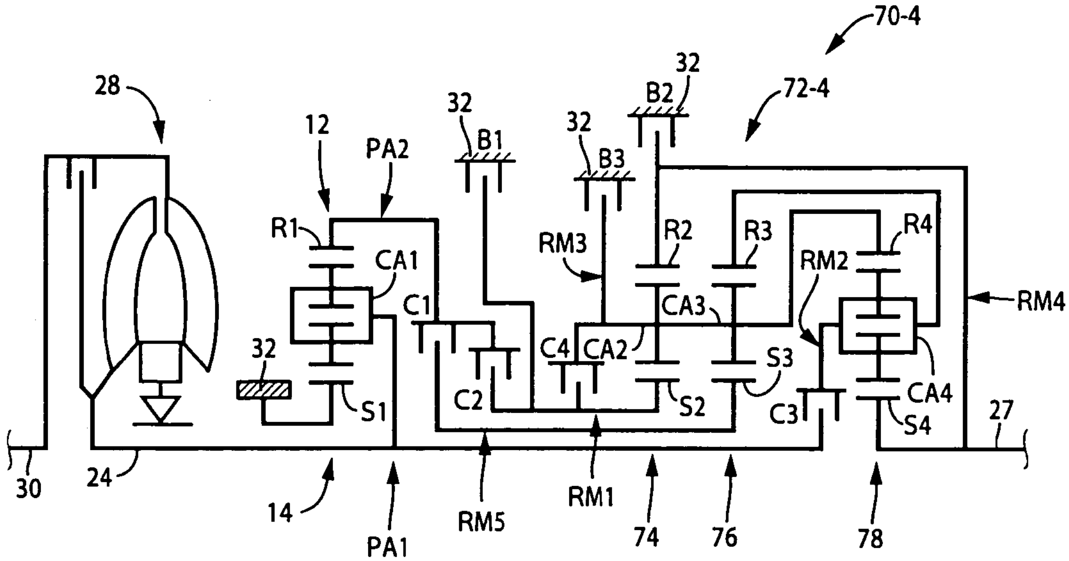
FIGS. 39(*a*) and 39(*b*) are views illustrating further another embodiment of the invention, in which a case is shown where the fourth clutch C4 differs in the arrangement position thereof in comparison with the embodiment in FIG. 33, and corresponding to FIG. 33.
Figure 40:
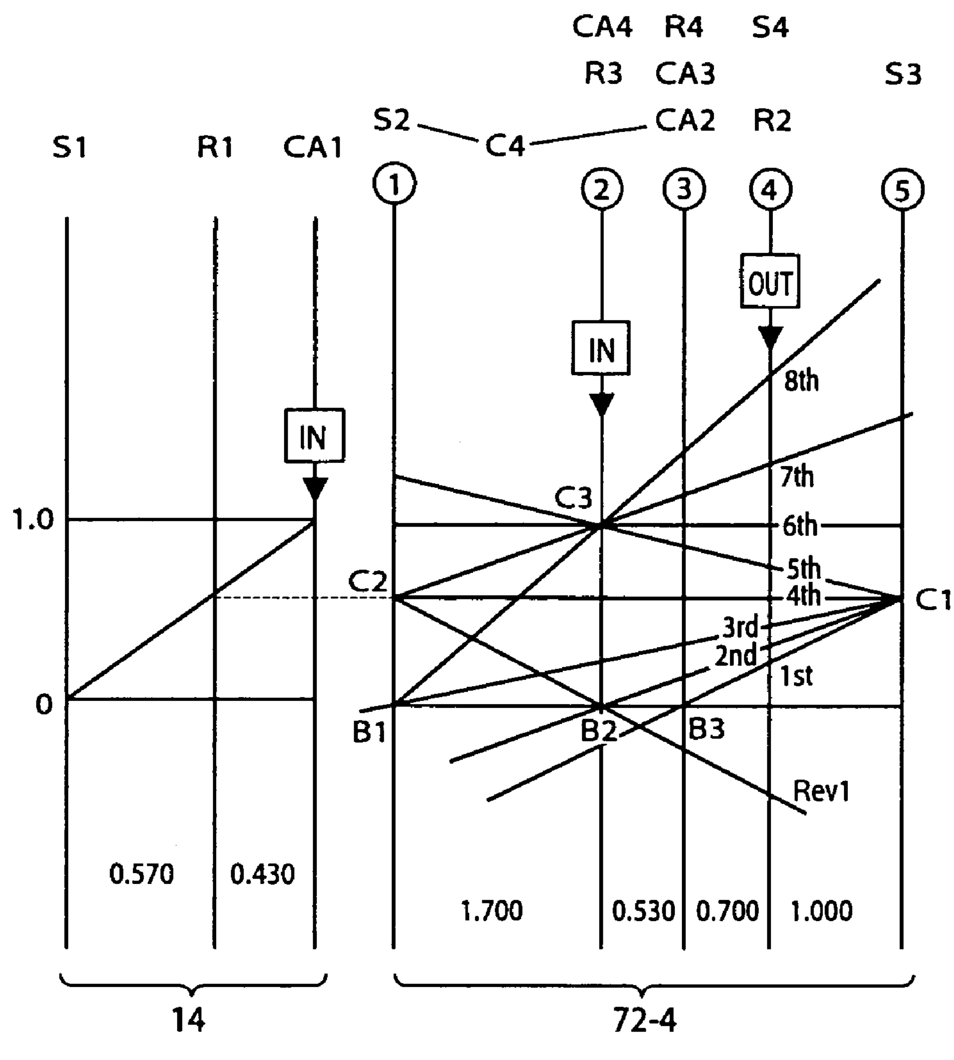
FIG. 40 is a collinear chart of the embodiment in FIG. 39.

FIG. 39 through FIG. 40 show one embodiment according to the first through the fourth aspects, the sixth aspect, the twelfth aspect, and the fifty-second through the fifty-fifth aspects of the invention. FIG. 39 is a view corresponding to FIG. 1 described above, and FIG. 40 is a view corresponding to FIG. 2 described above. An automatic transmission 70-4 for vehicle differs from the automatic transmission 70-1 for vehicle, which is shown in FIG. 33 and FIG. 34 in that the first rotary element RM1 (Sun gear S2) of the second transmission portion 72-4 and the third rotary element RM3 (Carriers CA2 and CA3 and ring gear R4) thereof are selectively connected integral with each other via the fourth clutch C4. However, as shown in FIG. 39(*b*), eight forward gear stages from the first gear stage [1st] to the eighth gear stage [8th] and one reverse gear stage [Rev1] are established in accordance with the same operation table as that in FIG. 33(*b*), and the same collinear chart as that in FIG. 34 can be obtained as shown in FIG. 40, wherein similar actions and effects can be brought about.

Figures 41A, 41B:
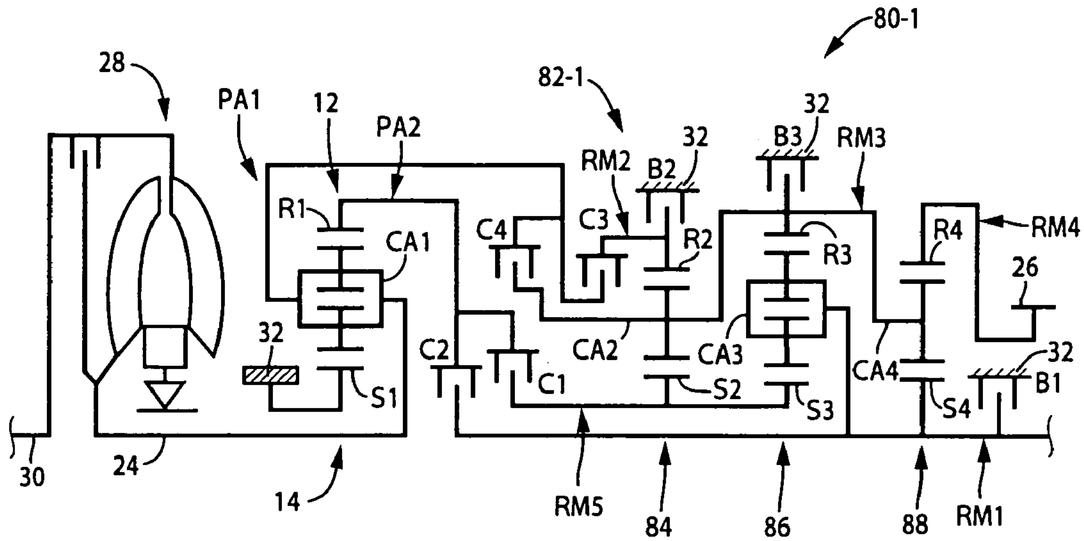
FIGS. 41(*a*) and 41(*b*) are views illustrating still another embodiment of the invention, in which a case is shown where the second transmission portion differs in the construction thereof in comparison with the embodiment in FIG. 33, and corresponding to FIG. 33.
Figure 42:
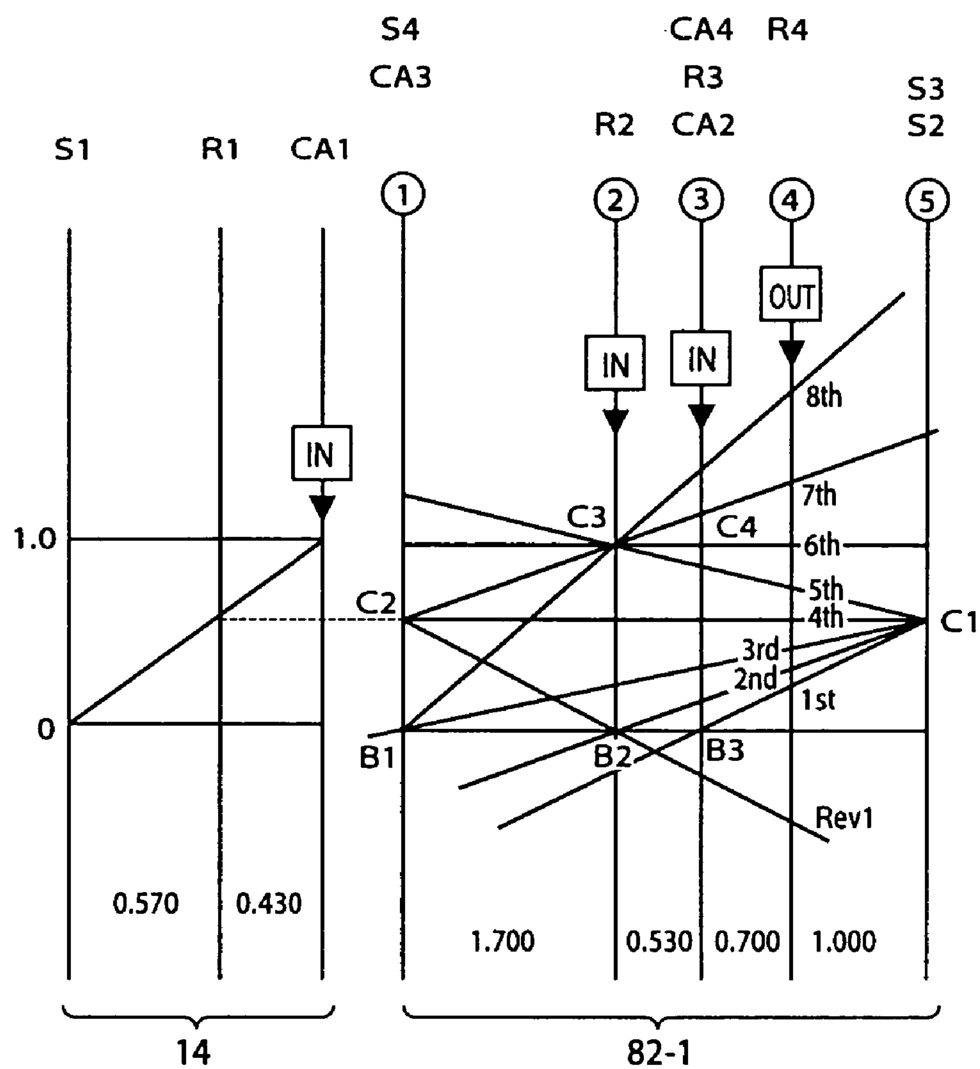
FIG. 42 is a collinear chart of the embodiment in FIG. 41.

FIG. 41 through FIG. 42 show one embodiment according to the first through the fifth aspects, the thirteenth aspect, the fifty-first aspect, and the fifty-third through the fifty-fifth aspects of the invention. FIG. 41 is a view corresponding to FIG. 1 described above, and FIG. 42 is a view corresponding to FIG. 2 described above. An automatic transmission 80-1 for vehicle differs from the automatic transmission 70-1 for vehicle, which is shown in FIG. 33 and FIG. 34 in the construction of the second transmission portion 82-1, and is preferably used for lateral installation in an FF vehicle or RR vehicle. That is, the second transmission portion 82-1 is composed mainly of a single-pinion type second planetary gear set 84, a double-pinion type third planetary gear set 86 and a single-pinion type fourth planetary gear set 88, wherein the first rotary element RM1 is composed of the carrier CA3 of the third planetary gear set 86 and the sun gear S4 of the fourth planetary gear set 88 connected to each other, the second rotary element RM2 is composed of the ring gear R2 of the second planetary gear set 84, the third rotary element RM3 is composed of the carrier CA2 of the second planetary gear set 84, the ring gear R3 of the third planetary gear set 86 and the carrier CA4 of the fourth planetary gear set 88 connected to each other, the fourth rotary element RM4 is composed of the ring gear R4 of the fourth planetary gear set 88, and the fifth rotary element RM5 is composed of the sun gear S2 of the second planetary gear set 84 and the sun gear S3 of the third planetary gear set 86 connected to each other. Also, an output gear 26 is provided instead of the above-described output shaft 27, and the fourth rotary element RM4 (Ring gear R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 33 and FIG. 34.

In this case, as shown in FIG. 41(*b*), eight forward gear stages from the first gear stage [1st] to the eighth gear stage [8th] and one reverse gear stage [Rev1] are established in accordance with the same operation table as that in FIG. 33(*b*). Also, the transmission ratios of the respective gear stages are appropriately determined by the respective gear ratios ρ1 through ρ4 of the first planetary gear set 12, the second planetary gear set 84, the third planetary gear set 86 and the fourth planetary gear set 88. For example, if ρ1 is 0.430, ρ2 is 0.312, ρ3 is 0.567 and ρ4 is 0.314, the same collinear chart as that of FIG. 34 is obtained as shown in FIG. 42, and the same transmission ratios as that in FIG. 33(*b*) can be obtained as shown in FIG. 41(*b*), and actions and effects similar to those of the embodiment in FIG. 33 and FIG. 34, that is, actions and effects similar to those of the embodiment in FIG. 1 and FIG. 2 can be brought about.

Figures 43A, 43B:
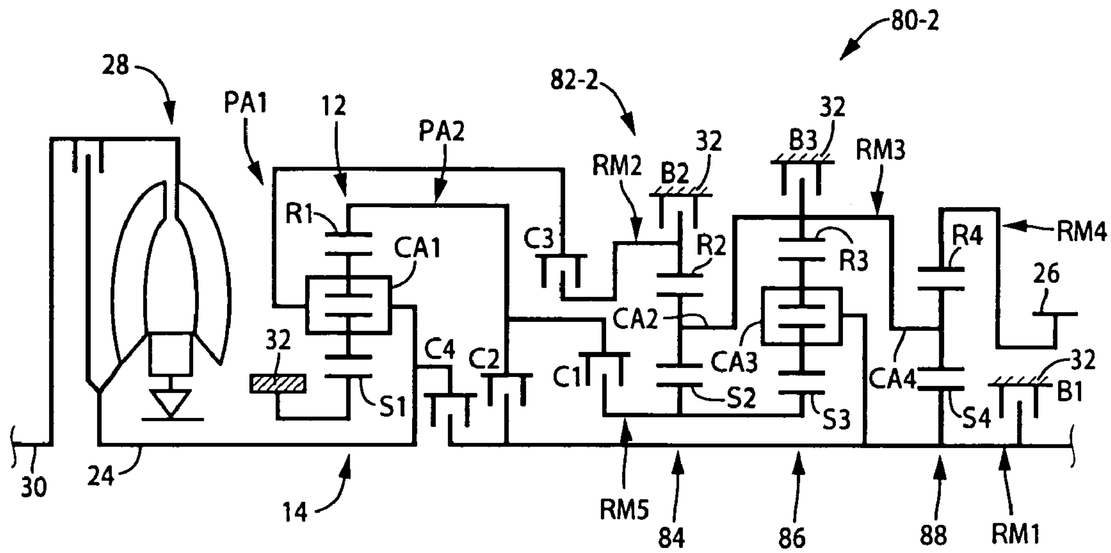
FIGS. 43(*a*) and 43(*b*) are views illustrating further another embodiment of the invention, in which a case is shown where the fourth clutch C4 differs in the arrangement position thereof in comparison with the embodiment in FIG. 41, and corresponding to FIG. 41.
Figure 44:
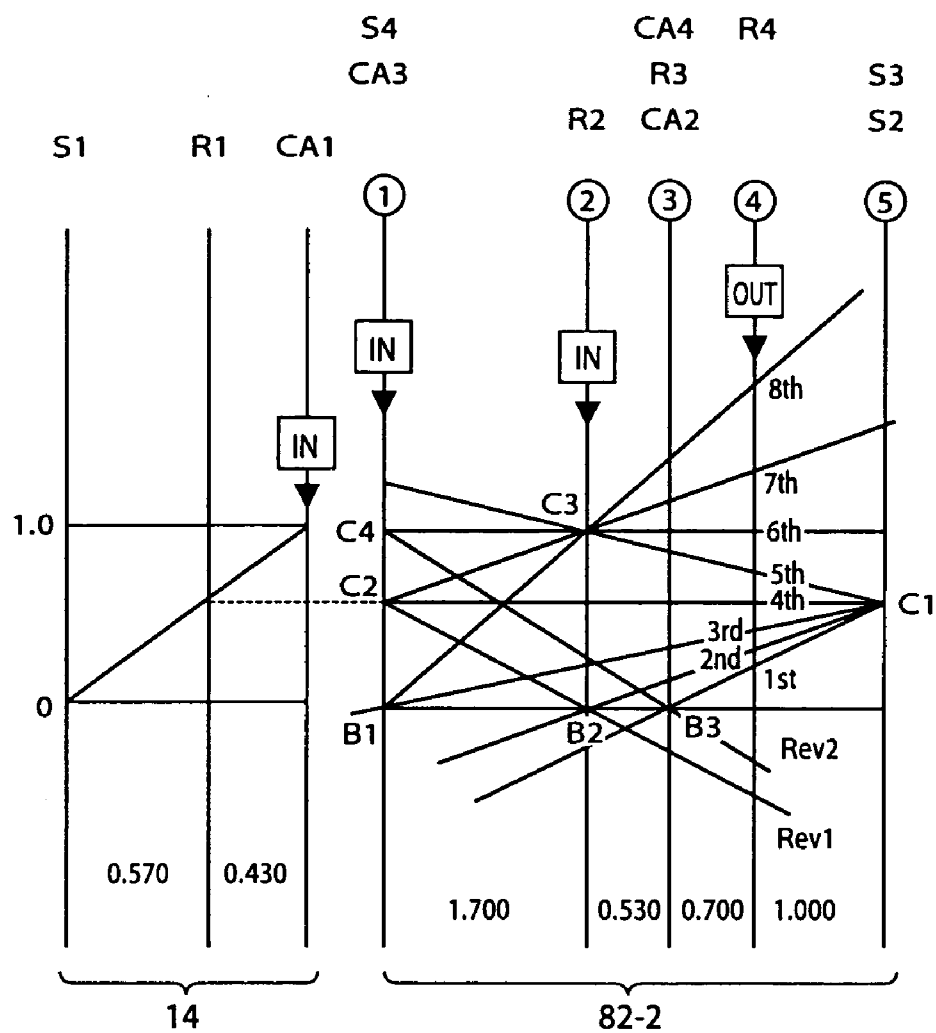
FIG. 44 is a collinear chart of the embodiment in FIG. 43.

FIG. 43 through FIG. 44 show one embodiment according to the first through the fifth aspects, the thirteenth aspect, the fifty-first aspect, and the fifty-third through the fifty-fifth aspects of the invention. FIG. 43 is a view corresponding to FIG. 1 described above, and FIG. 44 is a view corresponding to FIG. 2 described above. An automatic transmission 80-2 for vehicle differs from the automatic transmission 80-1 for vehicle, which is shown in FIG. 41 and FIG. 42 in that the first rotary element RM1 (Carrier CA3 and sun gear S4) of the second transmission portion 82-2 is selectively connected via the fourth clutch C4 to the input shaft 24, that is, the first intermediate output path PA1. However, as shown in FIG. 43(*b*), eight forward gear stages from the first gear stage [1st] to the eighth gear stage [8th] and one reverse gear stage [Rev1] are established in accordance with the same operation table as that in FIG. 41(*b*), and the same collinear chart as that in FIG. 42 can be obtained as shown in FIG. 44, wherein similar actions and effects can be brought about. Also, as shown in FIG. 43(*b*) and FIG. 44, the automatic transmission 80-2 for vehicle may be composed so that the fourth clutch C4 and the third brake B3 are engaged with each other as shown in FIG. 3(*b*) and FIG. 4, the first rotary element RM1 is rotated integral with the input shaft 24, and the third rotary element RM3 is brought to a stationary state, wherein the fourth rotary element RM4 is reversed at a rotation speed [Rev2], and the second reverse gear stage [Rev2] may be established in addition to the first reverse gear stage [Rev1].

Figures 45A, 45B:
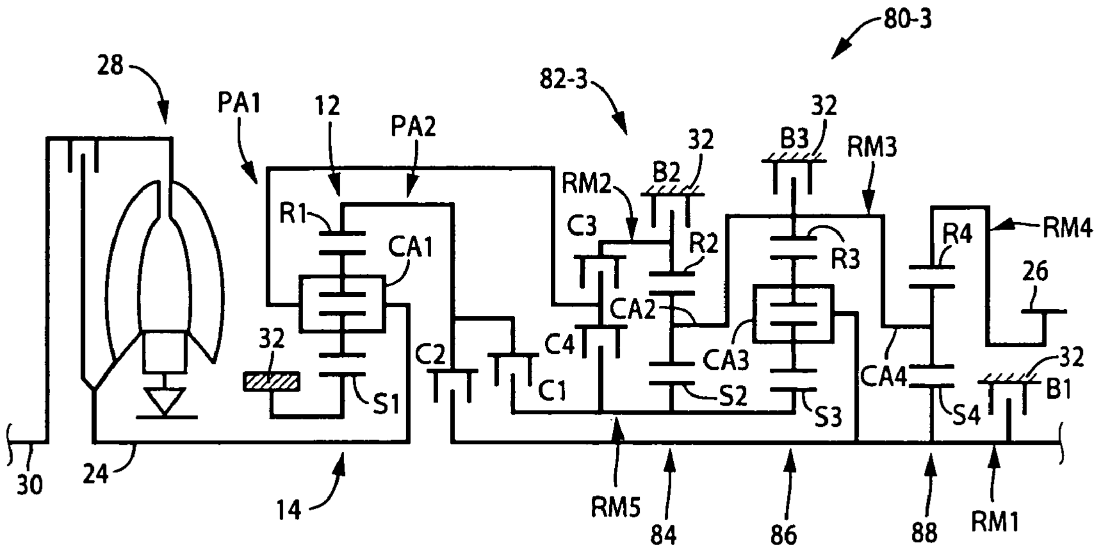
FIGS. 45(*a*) and 45(*b*) are views illustrating further another embodiment of the invention, in which a case is shown where the fourth clutch C4 differs in the arrangement position thereof in comparison with the embodiment in FIG. 41, and corresponding to FIG. 41.
Figure 46:
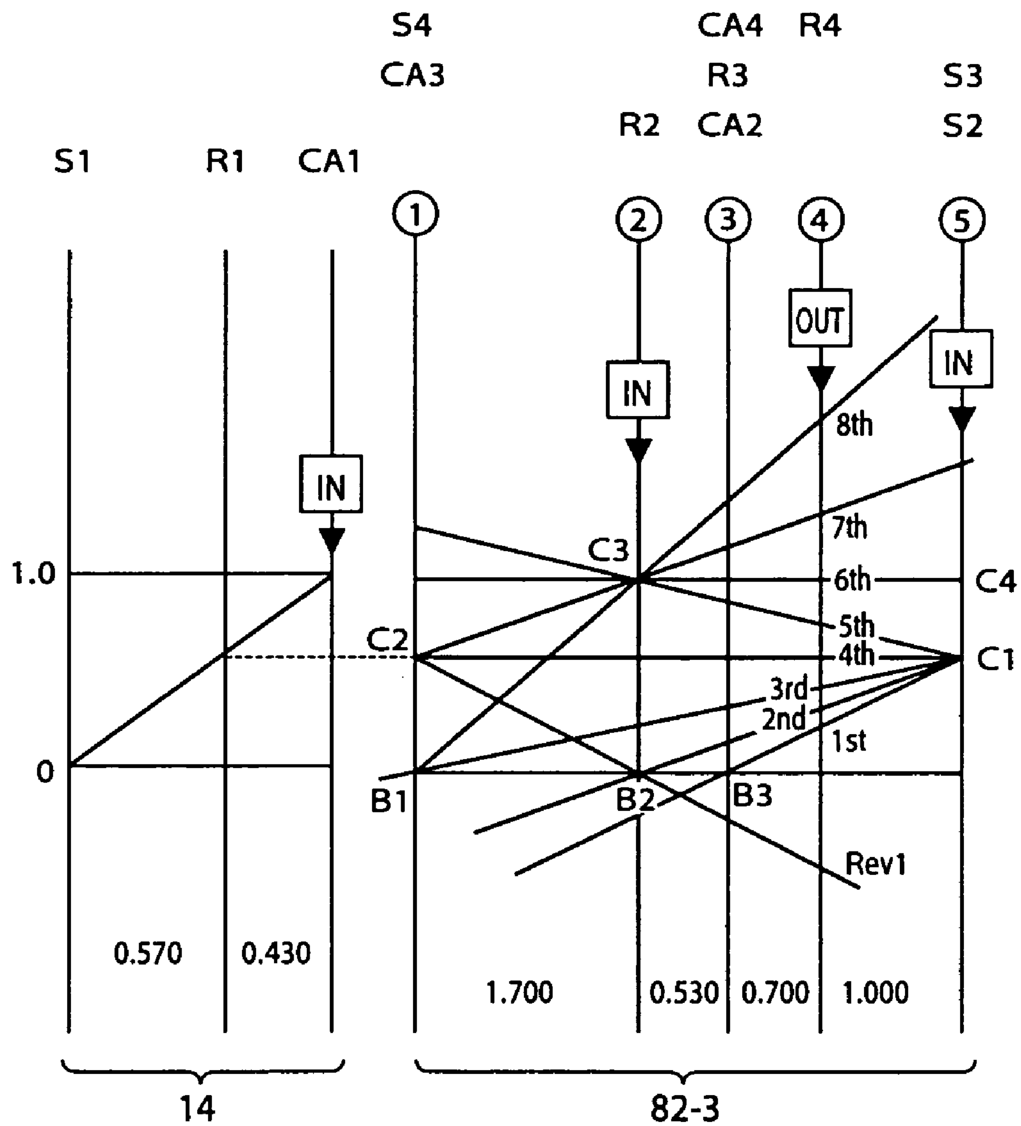
FIG. 46 is a collinear chart of the embodiment in FIG. 45.

FIG. 45 through FIG. 46 show one embodiment according to the first through the fifth aspects, the thirteenth aspect, the fifty-first aspect, and the fifty-third through the fifty-fifth aspects of the invention. FIG. 45 is a view corresponding to FIG. 1 described above, and FIG. 46 is a view corresponding to FIG. 2 described above. An automatic transmission 80-3 for vehicle differs from the automatic transmission 80-1 for vehicle, which is shown in FIG. 41 and FIG. 42 in that the fifth rotary element RM5 (Sun gears S2 and S3) of the second transmission portion 82-3 is selectively connected to the input shaft 24, that is, the first intermediate output path PA1 via the fourth clutch C4. However, as shown in FIG. 45(*b*), eight forward gear stages from the first gear stage [1st] to the eighth gear stage [8th] and one reverse gear stage [Rev1] are established in accordance with the same operation table as that in FIG. 41(*b*), and the same collinear chart as that in FIG. 42 can be obtained as shown in FIG. 46, wherein similar actions and effects can be brought about.

Figures 47A, 47B:
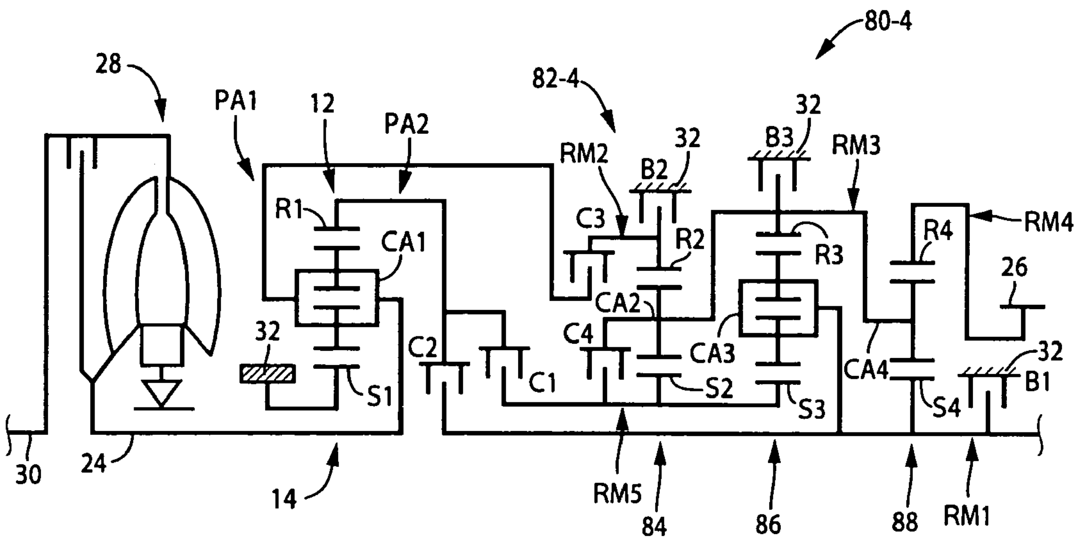
FIGS. 47(*a*) and 47(*b*) are views illustrating further another embodiment of the invention, in which a case is shown where the fourth clutch C4 differs in the arrangement position thereof in comparison with the embodiment in FIG. 41, and corresponding to FIG. 41.
Figure 48:
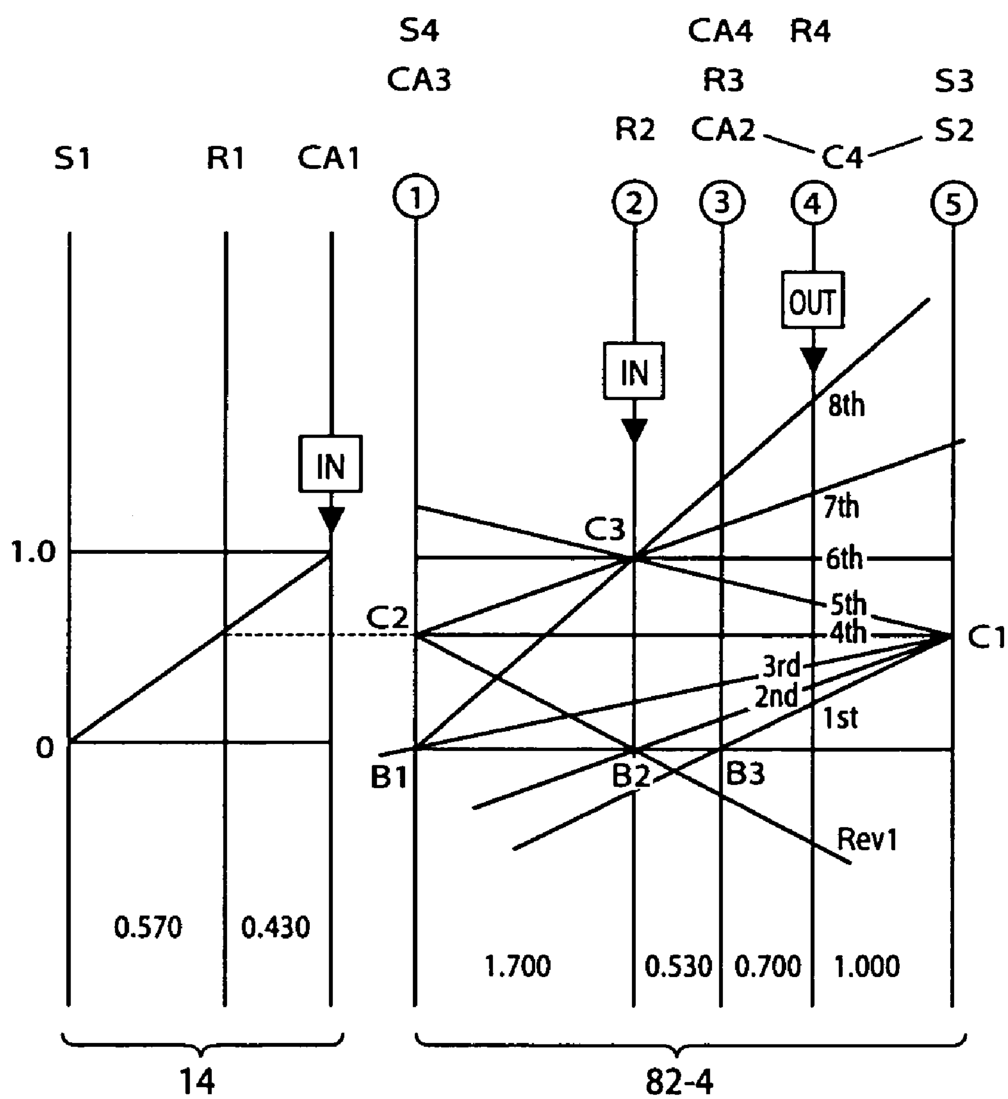
FIG. 48 is a collinear chart of the embodiment in FIG. 47.

FIG. 47 through FIG. 48 show one embodiment according to the first through the fourth aspects, the sixth aspect, the thirteenth aspect, and the fifty-second through the fifty-fifth aspects of the invention. FIG. 47 is a view corresponding to FIG. 1 described above, and FIG. 48 is a view corresponding to FIG. 2 described above. An automatic transmission 80-4 for vehicle differs from the automatic transmission 80-1 for vehicle, which is shown in FIG. 41 and FIG. 42 in that the third rotary element RM3 (Carrier CA2, ring gear R3 and carrier CA4) of the second transmission portion 82-4 and the fifth rotary element RM5 (Sun gears S2 and S3) thereof are selectively connected integral with each other via the fourth clutch C4. However, as shown in FIG. 47(*b*), eight forward gear stages from the first gear stage [1st] to the eighth gear stage [8th] and one reverse gear stage [Rev1] are established in accordance with the same operation table as that in FIG. 41(*b*), and the same collinear chart as that in FIG. 42 can be obtained as shown in FIG. 48, wherein similar actions and effects can be brought about.

Figures 49A, 49B:
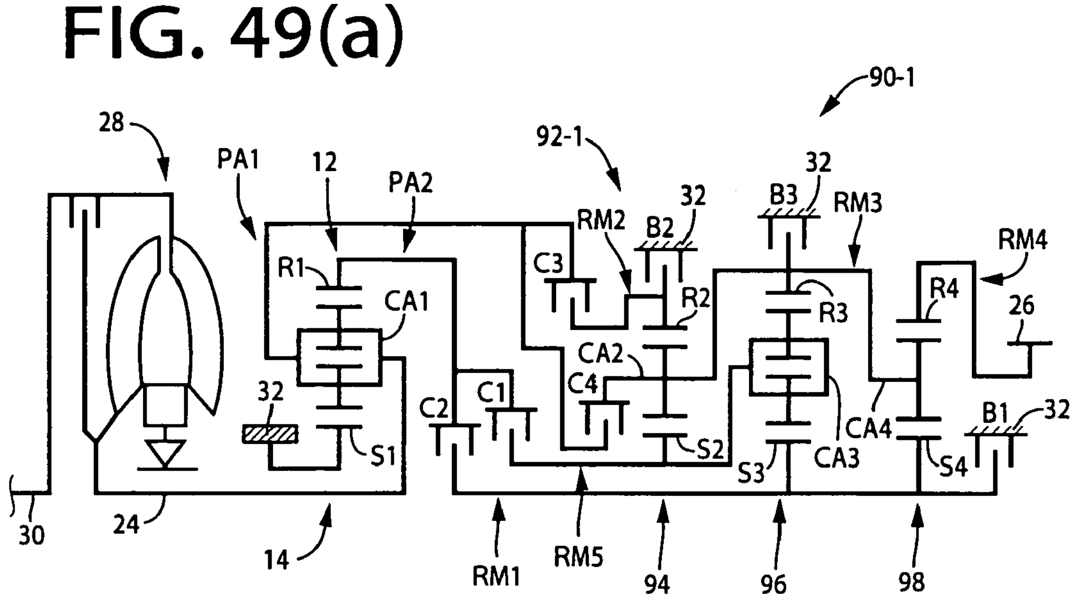
FIGS. 49(*a*) and 49(*b*) are views illustrating still another embodiment of the invention, in which a case is shown where the second transmission portion differs in the construction thereof in comparison with the embodiment in FIG. 33, and corresponding to FIG. 33.
Figure 50:
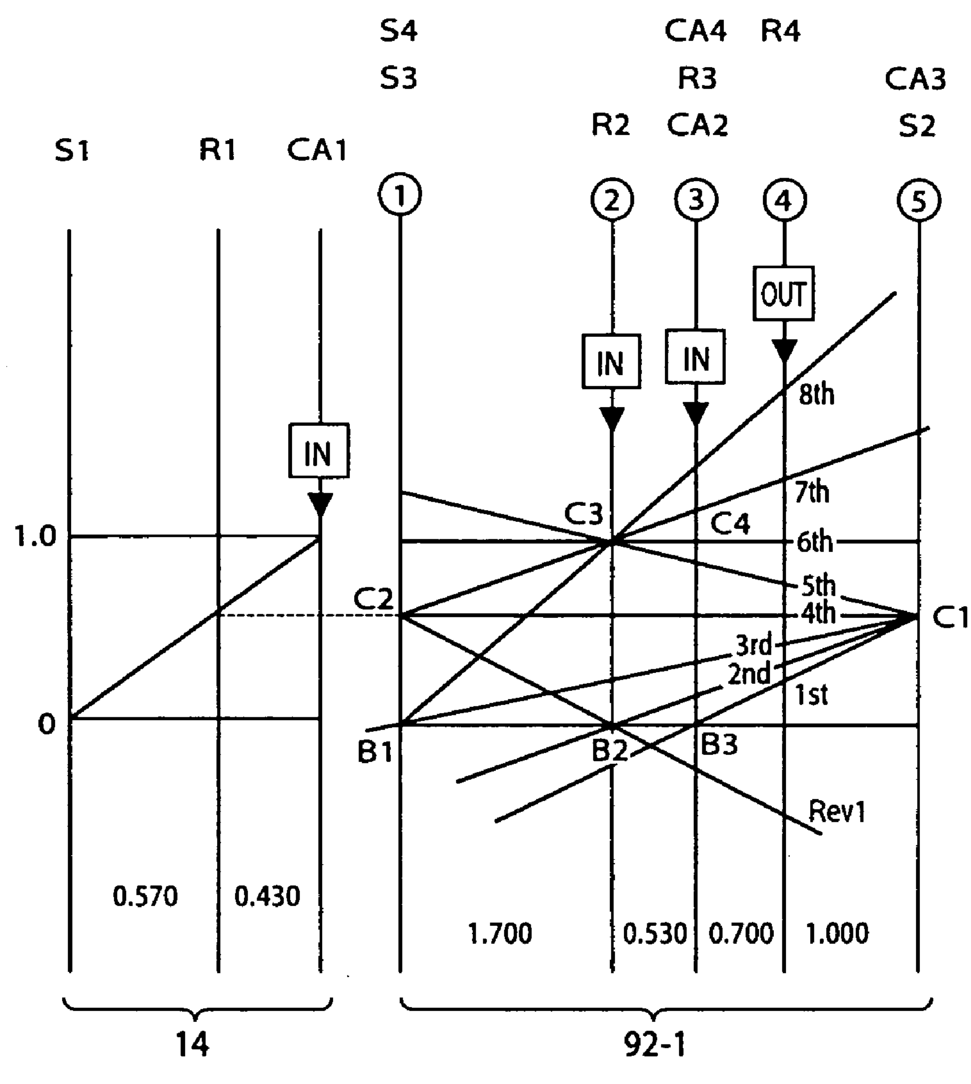
FIG. 50 is a collinear chart of the embodiment in FIG. 49.

FIG. 49 through FIG. 50 show one embodiment according to the first through the fifth aspects, the fourteenth aspect, the fifty-first aspect, and the fifty-third through the fifty-fifth aspects of the invention. FIG. 49 is a view corresponding to FIG. 1 described above, and FIG. 50 is a view corresponding to FIG. 2 described above. An automatic transmission 90-1 for vehicle differs from the automatic transmission 70-1 for vehicle, which is shown in FIG. 33 and FIG. 34 in the construction of the second transmission portion 92-1, and is preferably used for lateral installation in an FF vehicle or RR vehicle. That is, the second transmission portion 92-1 is composed mainly of a single-pinion type second planetary gear set 94, a double-pinion type third planetary gear set 96 and a single-pinion type fourth planetary gear set 98, wherein the first rotary element RM1 is composed of the sun gear S3 of the third planetary gear sets 96 and the sun gear S4 of the fourth planetary gear set 98 connected to each other, the second rotary element RM2 is composed of the ring gear R2 of the second planetary gear set 94, the third rotary element RM3 is composed of the carrier CA2 of the second planetary gear set 94, the ring gear R3 of the third planetary gear set 96 and the carrier CA4 of the fourth planetary gear set 98 connected to each other, the fourth rotary element RM4 is composed of the ring gear R4 of the fourth planetary gear set 98, and the fifth rotary element RM5 is composed of the sun gear S2 of the second planetary gear set 94 and the carrier CA3 of the third planetary gear set 96 connected to each other. Also, an output gear 26 is provided instead of the above-described output shaft 27, and the fourth rotary element RM4 (Ring gear R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 33 and FIG. 34.

In this case, as shown in FIG. 49(*b*), eight forward gear stages from the first gear stage [1st] to the eighth gear stage [8th] and one reverse gear stage [Rev1] are established in accordance with the same operation table as that in FIG. 33(*b*). The transmission ratios of the respective gear stages are adequately determined in accordance with the respective gear ratios ρ1 through ρ4 of the first planetary gear set 12, second planetary gear set 94, third planetary gear set 96 and fourth planetary gear set 98. For example, if the gear ratio ρ1 is 0.430, ρ2 is 0.312, ρ3 is 0.433 and ρ4 is 0.314, the same collinear chart as that of FIG. 34 is obtained as shown in FIG. 50, and the same transmission ratios shown in FIG. 33(*b*) can be obtained as shown in FIG. 49(*b*), wherein actions and effects similar to the embodiment in FIG. 33 and FIG. 34, that is, actions and effects similar to those of the embodiment in FIG. 1 and FIG. 2 can be brought about.

Figures 51A, 51B:
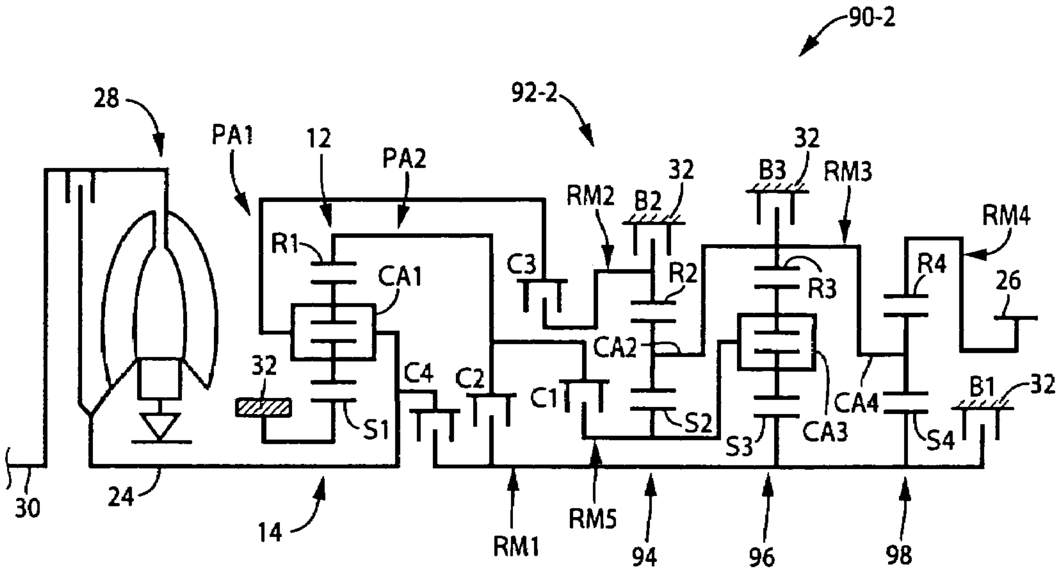
FIGS. 51(*a*) and 51(*b*) are views illustrating further another embodiment of the invention, in which a case is shown where the fourth clutch C4 differs in the arrangement position thereof in comparison with the embodiment in FIG. 49, and corresponding to FIG. 49.
Figure 52:
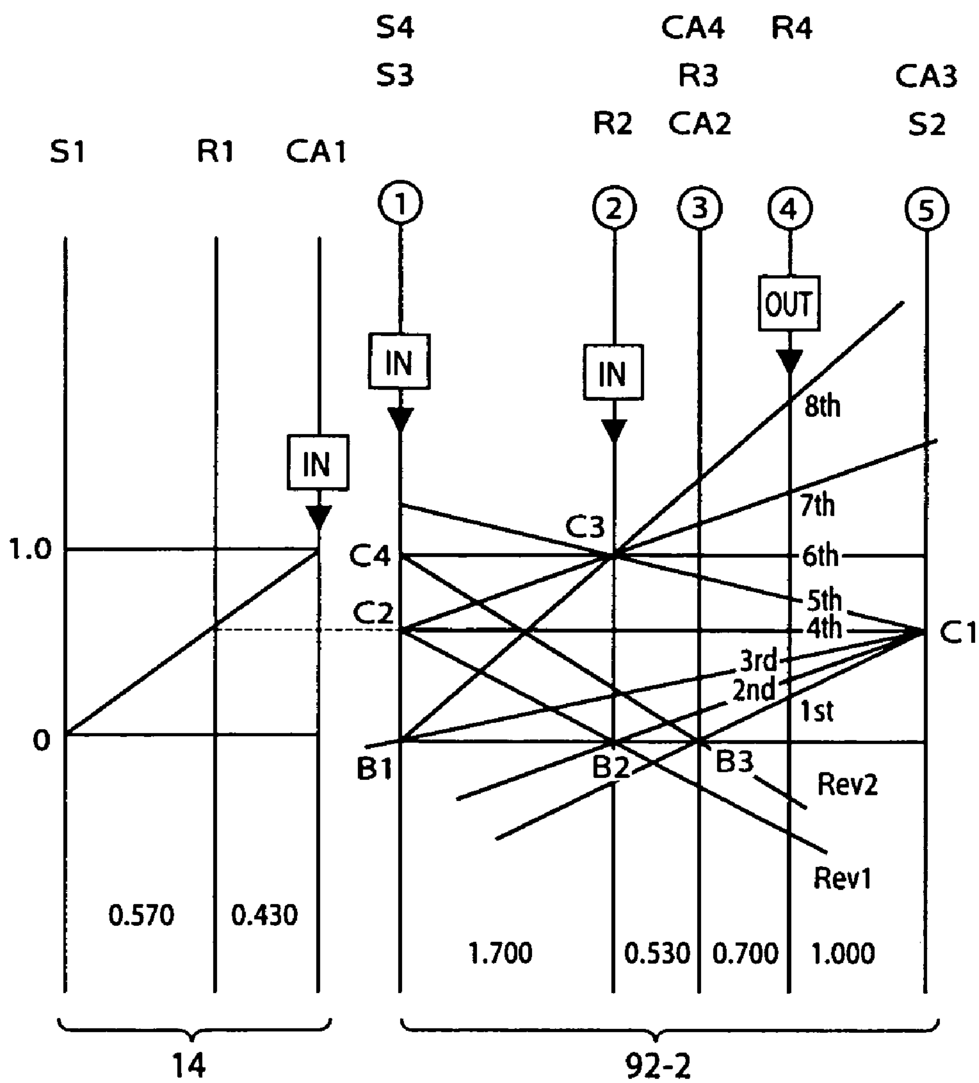
FIG. 52 is a collinear chart of the embodiment in FIG. 51.

FIG. 51 through FIG. 52 show one embodiment according to the first through the fifth aspects, the fourteenth aspect, the fifty-first aspect, and the fifty-third through the fifty-fifth aspects of the invention. FIG. 51 is a view corresponding to FIG. 1 described above, and FIG. 52 is a view corresponding to FIG. 2 described above. An automatic transmission 90-2 for vehicle differs from the automatic transmission 90-1 for vehicle, which is shown in FIG. 49 and FIG. 50 in that the first rotary element RM1 (Sun gears S3 and S4) of the second transmission portion 92-2 is selectively connected via the fourth clutch C4 to the input shaft 24, that is, the first intermediate output path PA1. However, as shown in FIG. 51(*b*), eight forward gear stages from the first gear stage [1st] to the eighth gear stage [8th] and one reverse gear stage [Rev1] are established in accordance with the same operation table as that in FIG. 49(*b*), and the same collinear chart as that in FIG. 50 can be obtained as shown in FIG. 52, wherein similar actions and effects can be brought about. Also, as shown in FIG. 51(*b*) and FIG. 52, the automatic transmission 90-2 for vehicle may be composed so that the fourth clutch C4 and the third brake B3 are engaged with each other as shown in FIG. 3(*b*) and FIG. 4, the first rotary element RM1 is rotated integral with the input shaft 24, and the third rotary element RM3 is brought to a stationary state, wherein the fourth rotary element RM4 is reversed at a rotation speed [Rev2], and the second reverse gear stage [Rev2] may be established in addition to the first reverse gear stage [Rev1].

Figures 53A, 53B:
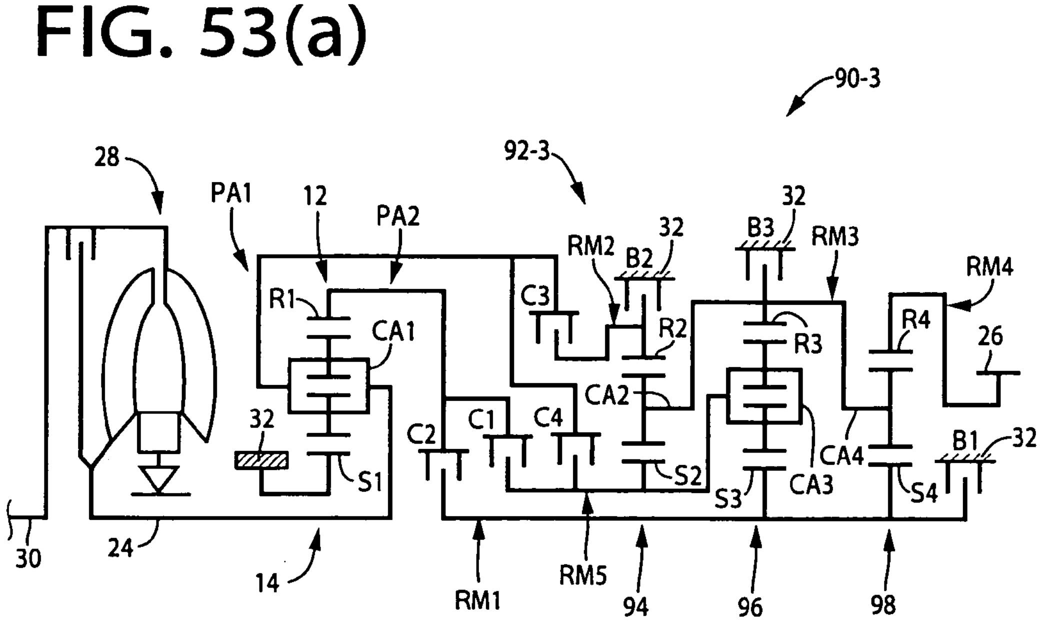
FIGS. 53(*a*) and 53(*b*) are views illustrating further another embodiment of the invention, in which a case is shown where the fourth clutch C4 differs in the arrangement position thereof in comparison with the embodiment in FIG. 49, and corresponding to FIG. 49.
Figure 54:
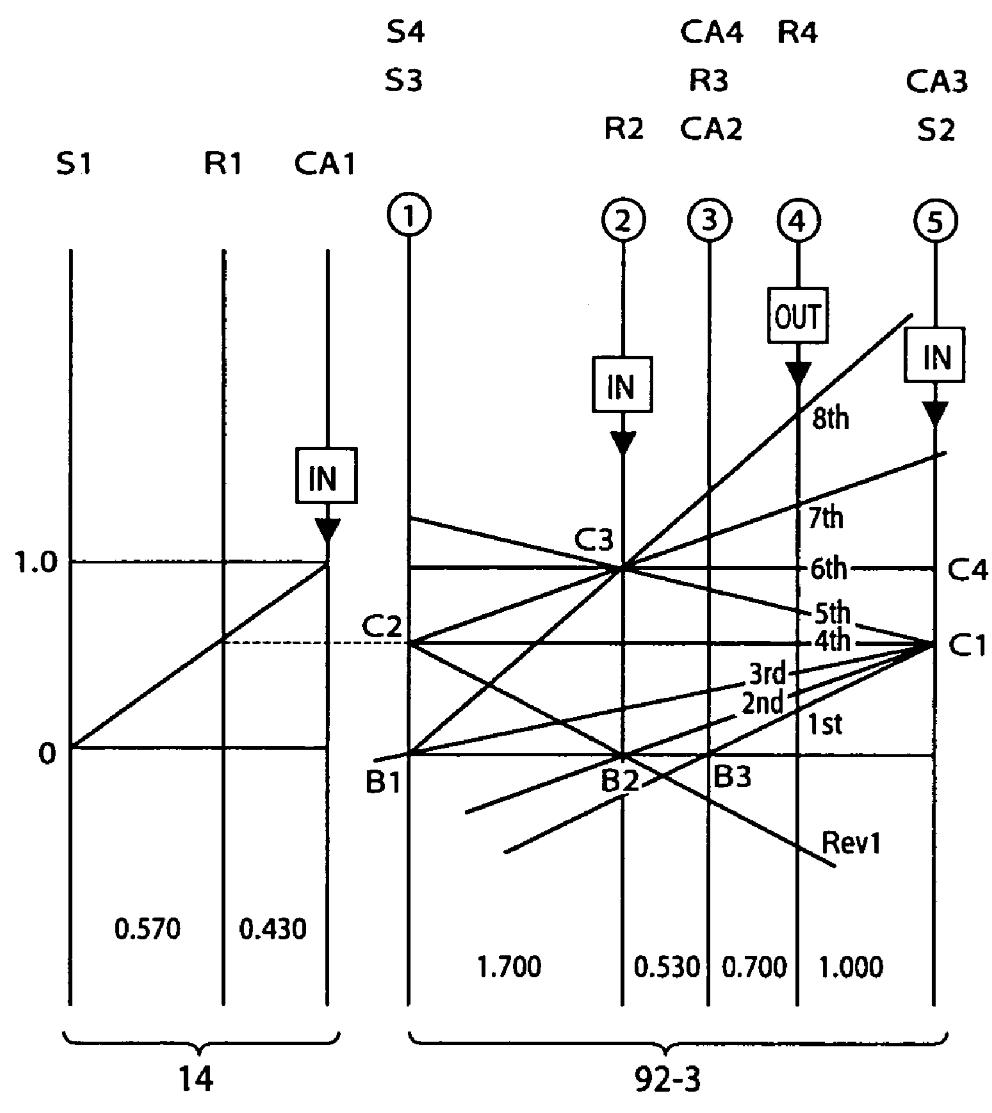
FIG. 54 is a collinear chart of the embodiment in FIG. 53.

FIG. 53 through FIG. 54 show one embodiment according to the first through the fifth aspects, the fourteenth aspect, the fifty-first aspect, and the fifty-third through the fifty-fifth aspects of the invention. FIG. 53 is a view corresponding to FIG. 1 described above, and FIG. 54 is a view corresponding to FIG. 2 described above. An automatic transmission 90-3 for vehicle differs from the automatic transmission 90-1 for vehicle, which is shown in FIG. 49 and FIG. 50 in that the fifth rotary element RM5 (Sun gear S2 and carrier CA3) of the second transmission portion 92-3 is selectively connected to the input shaft 24, that is, the first intermediate output path PA1 via the fourth clutch C4. However, as shown in FIG. 53(*b*), eight forward gear stages from the first gear stage [1st] to the eighth gear stage [8th] and one reverse gear stage [Rev1] are established in accordance with the same operation table as that in FIG. 49(*b*), and the same collinear chart as that in FIG. 50 can be obtained as shown in FIG. 54, wherein similar actions and effects can be brought about.

Figures 55A, 55B:
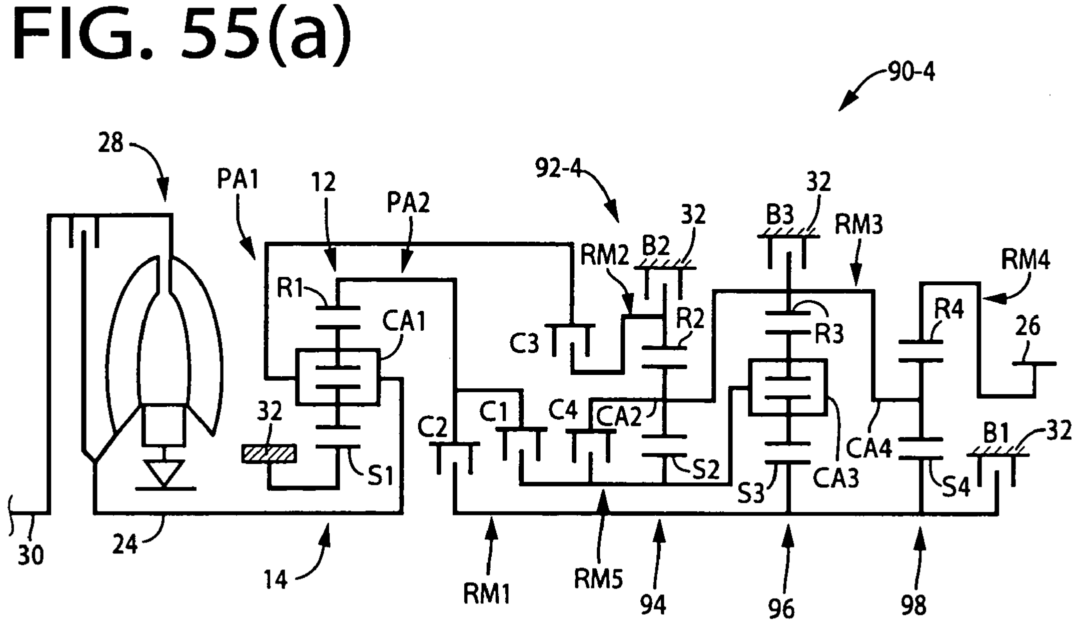
FIGS. 55(*a*) and 55(*b*) are views illustrating further another embodiment of the invention, in which a case is shown where the fourth clutch C4 differs in the arrangement position thereof in comparison with the embodiment in FIG. 49, and corresponding to FIG. 49.
Figure 56:
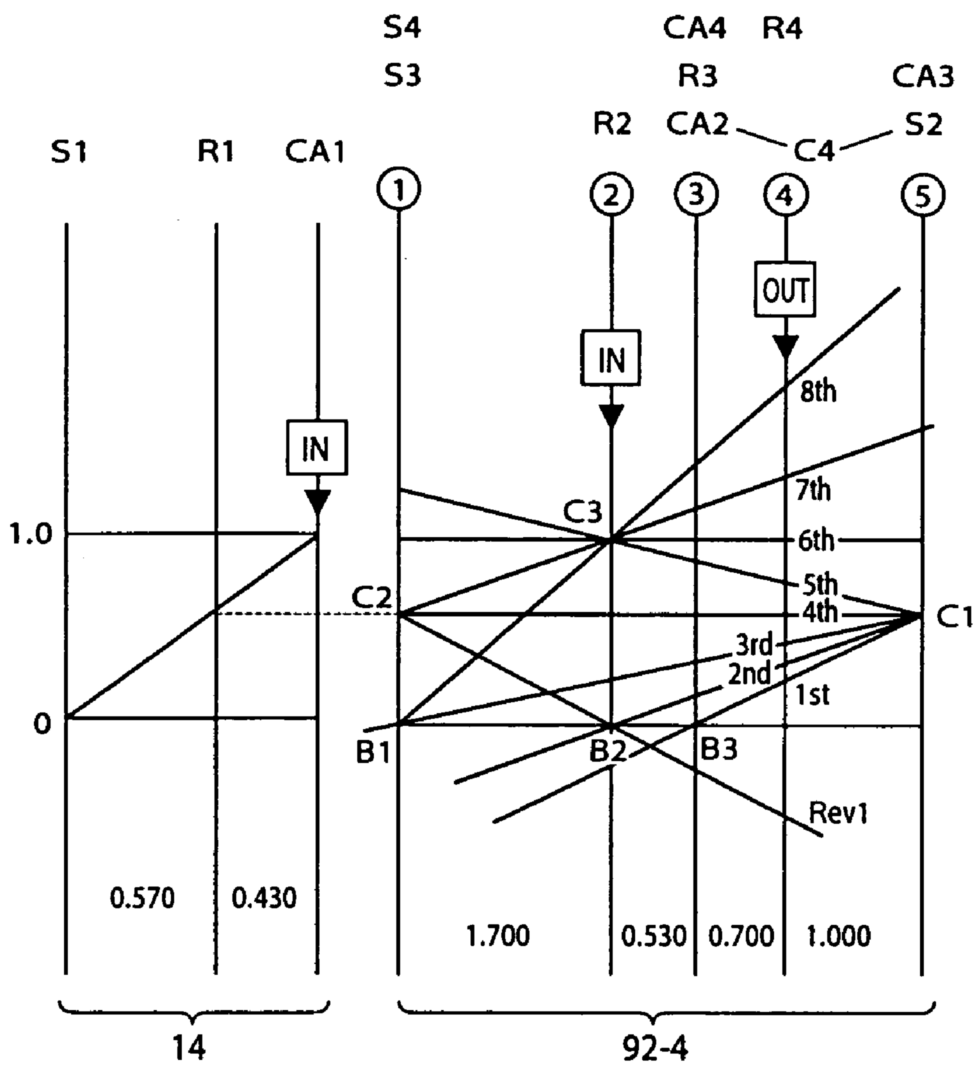
FIG. 56 is a collinear chart of the embodiment in FIG. 55.

FIG. 55 through FIG. 56 show one embodiment according to the first through the fourth aspects, the sixth aspect, the fourteenth aspect, and the fifty-second through the fifty-fifth aspects of the invention. FIG. 55 is a view corresponding to FIG. 1 described above, and FIG. 56 is a view corresponding to FIG. 2 described above. An automatic transmission 90-4 for vehicle differs from the automatic transmission 90-1 for vehicle, which is shown in FIG. 49 and FIG. 50 in that the third rotary element RM3 (Carrier CA2, ring gear R3 and carrier CA4) of the second transmission portion 92-4 and the fifth rotary element RM5 (Sun gear S2 and carrier CA3) are selectively connected integral with each other via the fourth clutch C4. However, as shown in FIG. 55(*b*), eight forward gear stages from the first gear stage [1st] to the eighth gear stage [8th] and one reverse gear stage [Rev1] are established in accordance with the same operation table as that in FIG. 49(*b*), and the same collinear chart as that in FIG. 50 can be obtained as shown in FIG. 56, wherein similar actions and effects can be brought about.

Figures 57A, 57B:
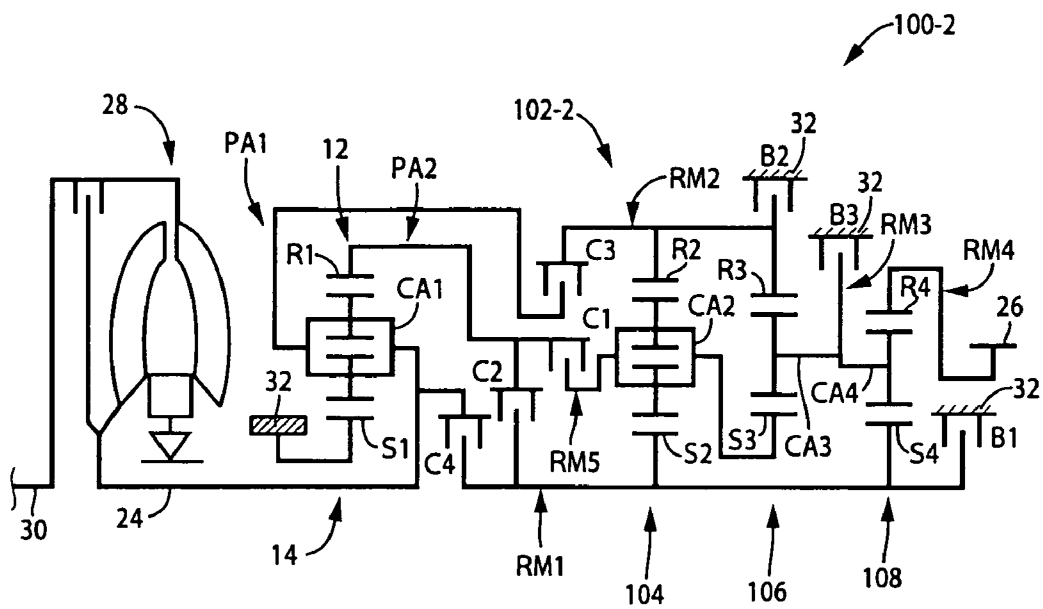
FIGS. 57(*a*) and 57(*b*) are views illustrating still another embodiment of the invention, in which a case is shown where the second transmission portion differs in the construction thereof in comparison with the embodiment in FIG. 35, and corresponding to FIG. 35.
Figure 58:
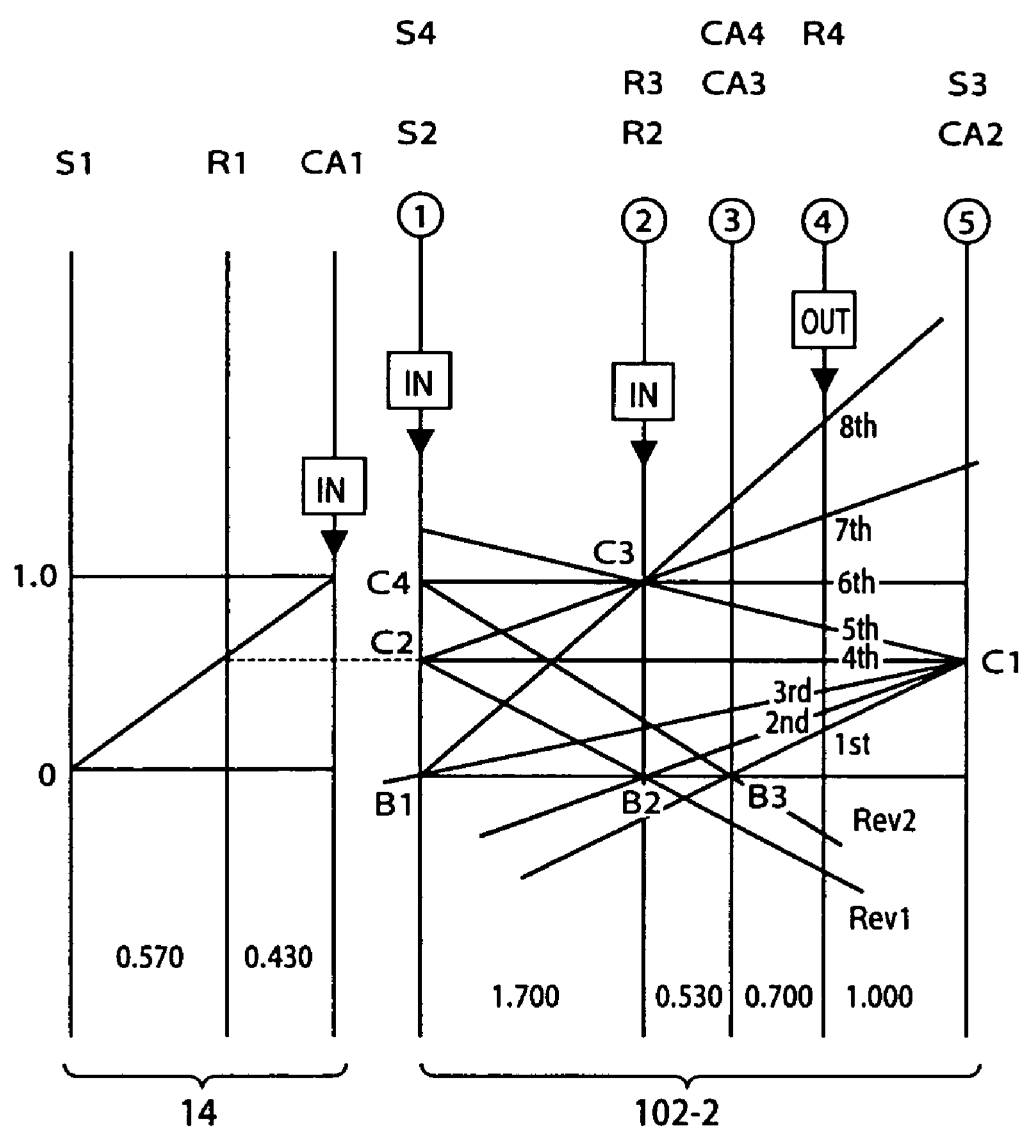
FIG. 58 is a collinear chart of the embodiment in FIG. 57.

FIG. 57 through FIG. 58 show one embodiment according to the first through the fifth aspects, the fifteenth aspect, the fifty-first aspect, and the fifty-third through the fifty-fifth aspects of the invention. FIG. 57 is a view corresponding to FIG. 1 described above, and FIG. 58 is a view corresponding to FIG. 2 described above. An automatic transmission 100-2 for vehicle differs from the automatic transmission 70-2 for vehicle, which is shown in FIG. 35 and FIG. 36 in the construction of the second transmission portion 102-2, and is preferably used for lateral installation in an FF vehicle or RR vehicle. That is, the second transmission portion 102-2 is composed mainly of a double-pinion type second planetary gear set 104, a single-pinion type third planetary gear set 106 and a single-pinion type fourth planetary gear set 108, wherein the first rotary element RM1 is composed of the sun gear S2 of the second planetary gear set 104 and the sun gear S4 of the fourth planetary gear set 108 connected to each other, the second rotary element RM2 is composed of the ring gear R2 of the second planetary gear set 104 and the ring gear R3 of the third planetary gear set 106 connected to each other, the third rotary element RM3 is composed of the carrier CA3 of the third planetary gear set 106 and the carrier CA4 of the fourth planetary gear set 108 connected to each other, the fourth rotary element RM4 is composed of the ring gear R4 of the fourth planetary gear set 108, and the fifth rotary element RM5 is composed of the carrier CA2 of the second planetary gear set 104 and the sun gear S3 of the third planetary gear set 106 connected to each other. Also, an output gear 26 is provided instead of the above-described output shaft 27, and the fourth rotary element RM4 (Ring gear R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 35 and FIG. 36.

In this case, as shown in FIG. 57(*b*), eight forward gear stages from the first gear stage [1st] to the eighth gear stage [8th] and one reverse gear stage [Rev1] are established in accordance with the same operation table as that in FIG. 35(*b*). Also, the transmission ratios of the respective gear stages are appropriately determined by the respective gear ratios ρ1 through ρ4 of the first planetary gear set 12, the second planetary gear set 104, the third planetary gear set 106 and the fourth planetary gear set 108. For example, if ρ1 is 0.430, ρ2 is 0.567, ρ3 is 0.312 and ρ4 is 0.314, the same collinear chart as that of FIG. 36 is obtained as shown in FIG. 58, and the same transmission ratios as that in FIG. 35(*b*) can be obtained as shown in FIG. 57(*b*), and actions and effects similar to those of the embodiment in FIG. 35 and FIG. 36, that is, actions and effects similar to those of the embodiment in FIG. 1 and FIG. 2 can be brought about. Further, as shown in FIG. 57(*b*) and FIG. 58, the automatic transmission 100-2 for vehicle may be composed so that, as shown in FIG. 35(*b*) and FIG. 36, the fourth clutch C4 and the third brake B3 are engaged with each other, the first rotary element RM1 is rotated integral with the input shaft 24, and the third rotary element RM3 is brought to a stationary state, wherein the fourth rotary element RM4 is reversed at a rotation speed [Rev2] and the second reverse gear stage [Rev2] can be established in addition to the first reverse gear stage [Rev1].

Figures 59A, 59B:
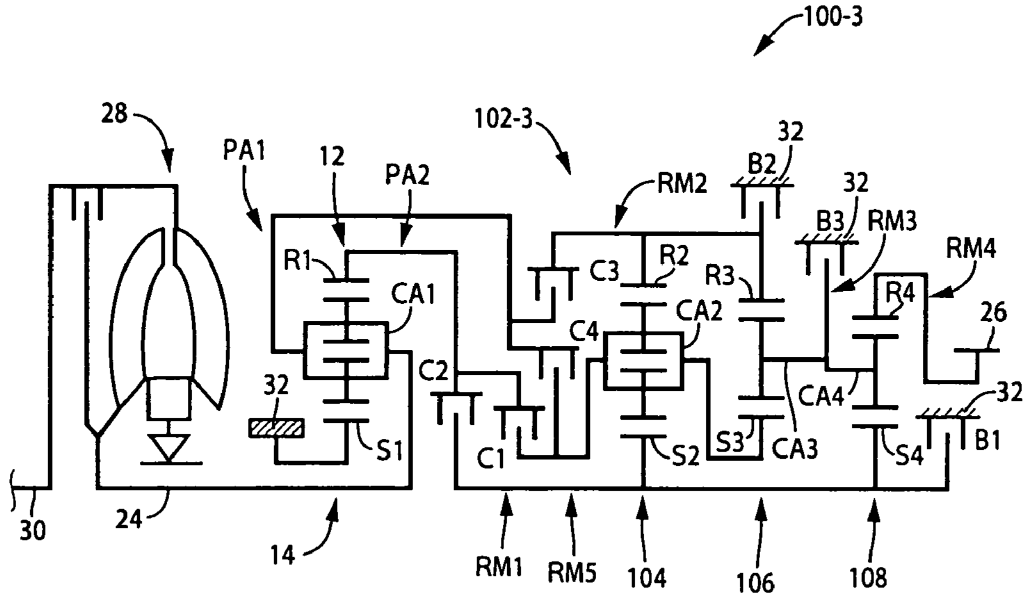
FIGS. 59(*a*) and 59(*b*) are views illustrating further another embodiment of the invention, in which a case is shown where the fourth clutch C4 differs in the arrangement position thereof in comparison with the embodiment in FIG. 57, and corresponding to FIG. 57.
Figure 60:
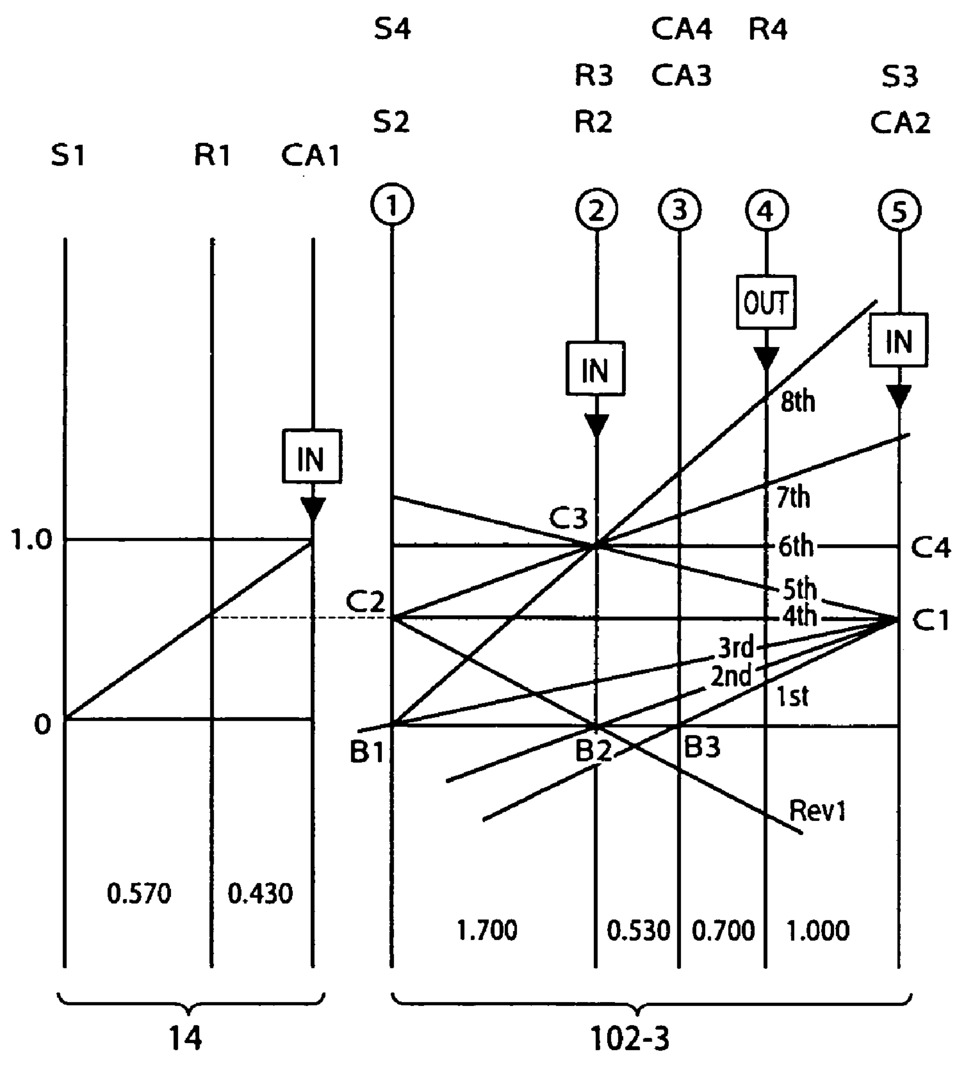
FIG. 60 is a collinear chart of the embodiment in FIG. 59.

FIG. 59 through FIG. 60 show one embodiment according to the first through the fifth aspects, the fifteenth aspect, the fifty-first aspect, and the fifty-third through the fifty-fifth aspects of the invention. FIG. 59 is a view corresponding to FIG. 1 described above, and FIG. 60 is a view corresponding to FIG. 2 described above. An automatic transmission 100-3 for vehicle differs from the automatic transmission 100-2 for vehicle, which is shown in FIG. 57 and FIG. 58 in that the fifth rotary element RM5 (Carrier CA2 and sun gear S3) of the second transmission portion 102-3 is selectively connected via the fourth clutch C4 to the input shaft 24, that is, the first intermediate output path PA1. However, as shown in FIG. 59(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 57(*b*), and the same collinear chart (excluding the second reverse gear stage [Rev2]) as that in FIG. 58 can be obtained as shown in FIG. 60, wherein similar actions and effects can be brought about.

Figures 61A, 61B:
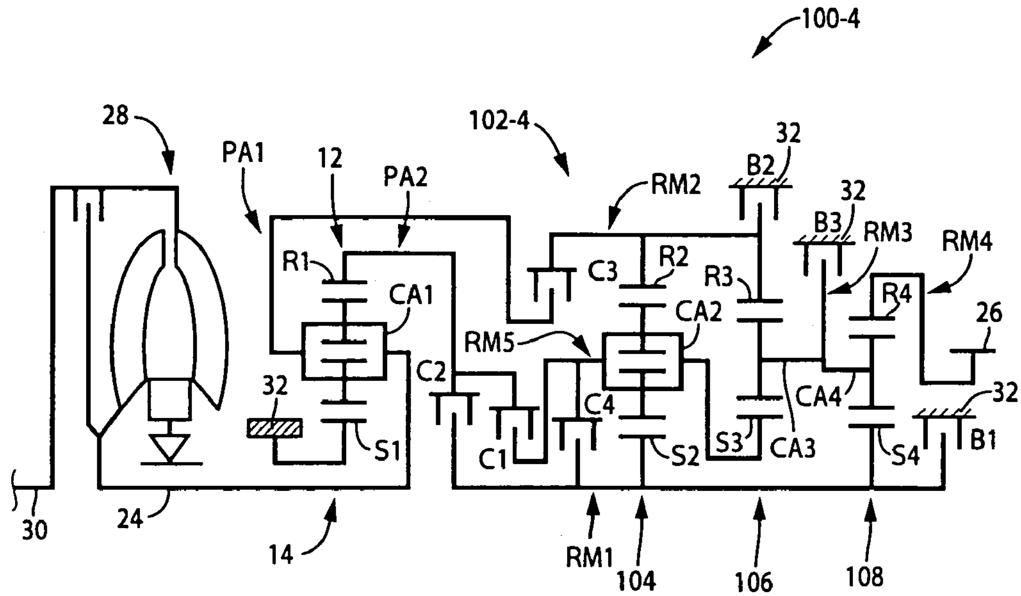
FIGS. 61(*a*) and 61(*b*) are views illustrating further another embodiment of the invention, in which a case is shown where the fourth clutch C4 differs in the arrangement position thereof in comparison with the embodiment in FIG. 57, and corresponding to FIG. 57.
Figure 62:
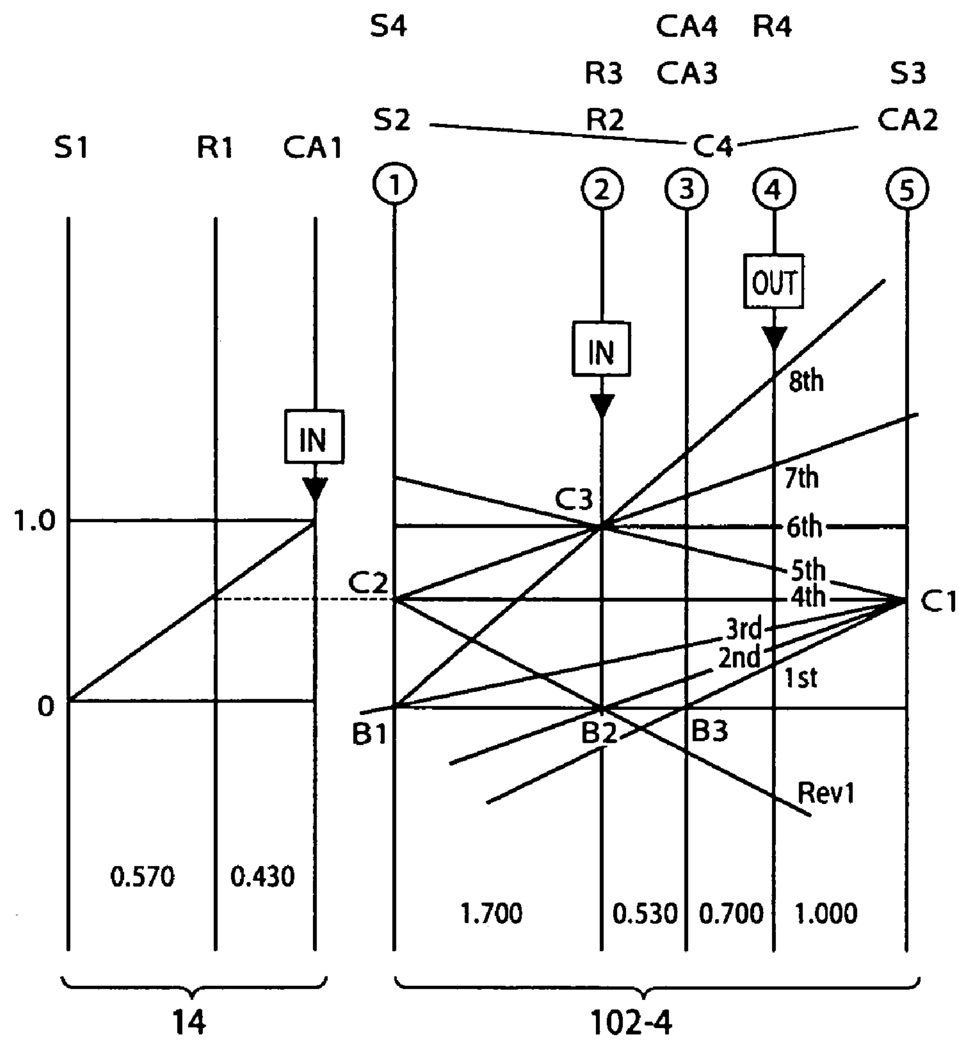
FIG. 62 is a collinear chart of the embodiment in FIG. 61.

FIG. 61 through FIG. 62 show one embodiment according to the first through the fourth aspects, the sixth aspect, the fifteenth aspect, and the fifty-second through the fifty-fifth aspects of the invention. FIG. 61 is a view corresponding to FIG. 1 described above, and FIG. 62 is a view corresponding to FIG. 2 described above. An automatic transmission 100-4 for vehicle differs from the automatic transmission 100-2 for vehicle, which is shown in FIG. 57 and FIG. 58 in that the first rotary element RM1 (Sun gears S2 and S4) of the second transmission portion 102-4 and the fifth rotary element RM5 (Carrier CA2 and sun gear S3) are selectively connected integral with each other via the fourth clutch C4. However, as shown in FIG. 61(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 57(*b*), and the same collinear chart (excluding the second reverse gear stage [Rev2]) as that in FIG. 58 can be obtained as shown in FIG. 62, wherein similar actions and effects can be brought about.

Figures 63A, 63B:
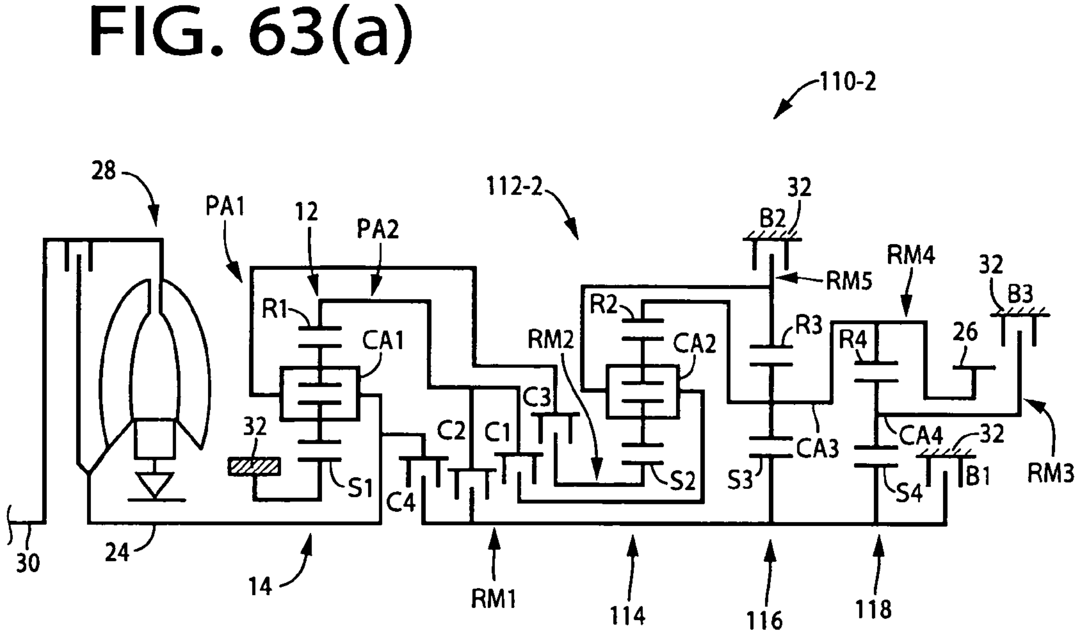
FIGS. 63(*a*) and 63(*b*) are views illustrating still another embodiment of the invention, in which a case is shown where the second transmission portion differs in the construction thereof in comparison with the embodiment in FIG. 35, and corresponding to FIG. 35.
Figure 64:
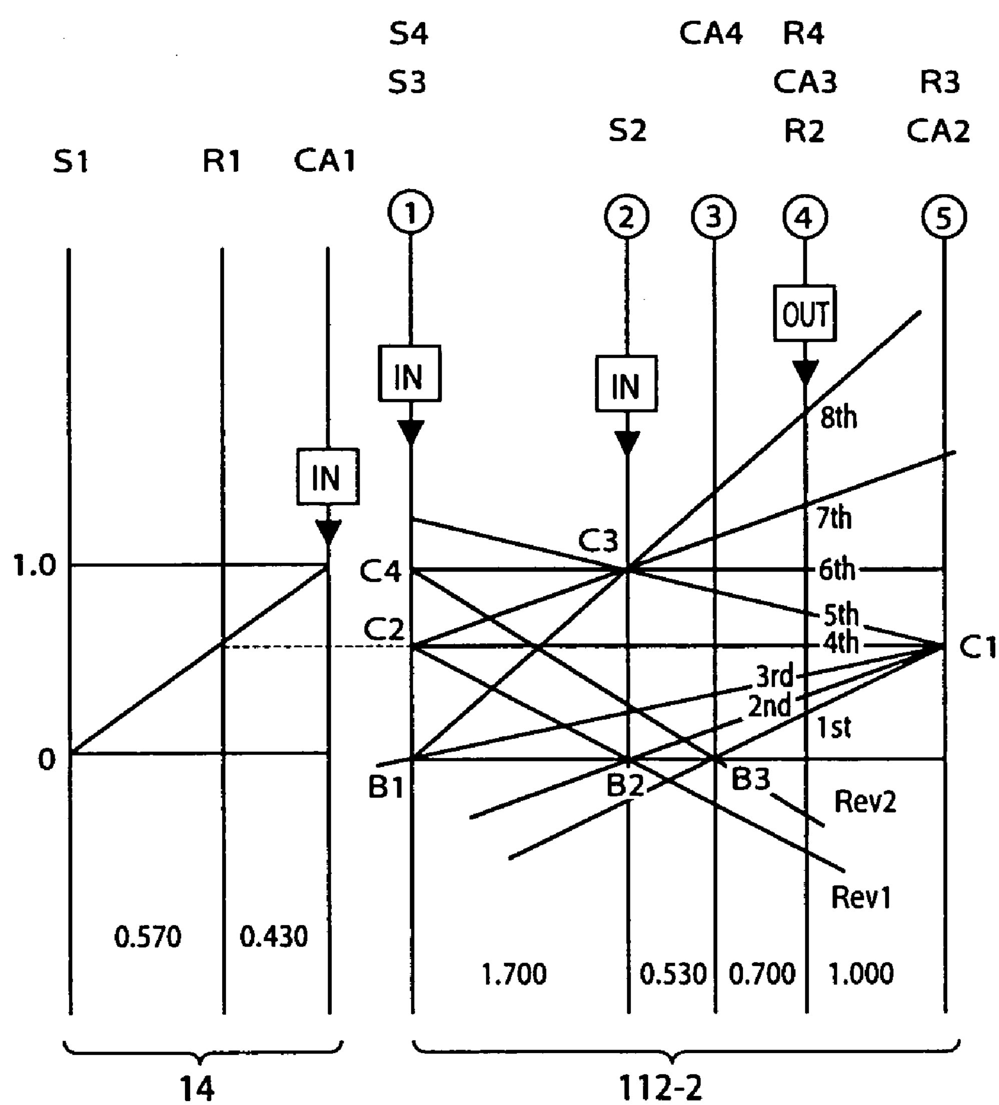
FIG. 64 is a collinear chart of the embodiment in FIG. 63.

FIG. 63 through FIG. 64 show one embodiment according to the first through the fifth aspects, the sixteenth aspect, the fifty-first aspect, and the fifty-third through the fifty-fifth aspects of the invention. FIG. 63 is a view corresponding to FIG. 1 described above, and FIG. 64 is a view corresponding to FIG. 2 described above. An automatic transmission 110-2 for vehicle differs from the automatic transmission 70-2 for vehicle, which is shown in FIG. 35 and FIG. 36 in the construction of the second transmission portion 112-2, and is preferably used for lateral installation in an FF vehicle or RR vehicle. That is, the second transmission portion 112-2 is composed mainly of a double-pinion type second planetary gear set 114, a single-pinion type third planetary gear set 116 and a single-pinion type fourth planetary gear set 118, wherein the sun gear S3 of the third planetary gear set 116 and the sun gear S4 of the fourth planetary gear set 118 are connected to each other to compose the first rotary element RM1, the second rotary element RM2 is composed of the sun gear S2 of the second planetary gear set 114, the third rotary element RM3 is composed of the carrier CA4 of the fourth planetary gear set 118, the fourth rotary element RM4 is composed of the ring gear R2 of the second planetary gear set 114, the carrier CA3 of the third planetary gear set 116 and the ring gear R4 of the fourth planetary gear set 118 connected to each other, and the fifth rotary element RM5 is composed of the carrier CA2 of the second planetary gear set 114 and the ring gear R3 of the third planetary gear set 116 connected to each other. Also, an output gear 26 is provided instead of the above-described output shaft 27, and the fourth rotary element RM4 (Ring gear R2, carrier CA3 and ring gear R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 35 and FIG. 36.

In this case, as shown in FIG. 63(*b*), eight forward gear stages from the first gear stage [1st] to the eighth gear stage [8th] and one reverse gear stage [Rev1] are established in accordance with the same operation table as that in FIG. 35(*b*). Also, the transmission ratios of the respective gear stages are appropriately determined by the respective gear ratios ρ1 through ρ4 of the first planetary gear set 12, the second planetary gear set 114, the third planetary gear set 116 and the fourth planetary gear set 118, wherein if, for example, ρ1 is 0.430, ρ2 is 0.448, ρ3 is 0.341 and ρ4 is 0.314, the collinear chart as that in FIG. 36 can be obtained as shown in FIG. 64, and the same transmission ratios as those in FIG. 35(*b*) can be obtained as shown in FIG. 63(*b*). Also, actions and effects similar to those of the embodiment shown in FIG. 35 and FIG. 36, that is, actions and effects similar to those of the embodiment of FIG. 1 and FIG. 2 can be obtained. Further, as shown in FIG. 63(*b*) and FIG. 64, the automatic transmission 110-2 for vehicle may be composed so that, as shown in FIG. 35(*b*) and FIG. 36, the fourth clutch C4 and the third brake B3 are engaged with each other, the first rotary element RM1 is rotated integral with the input shaft 24, and the third rotary element RM3 is brought to a stationary state, wherein the fourth rotary element RM4 is reversed at a rotation speed [Rev2] and the second reverse gear stage [Rev2] can be established in addition to the first reverse gear stage [Rev1].

Figures 65A, 65B:
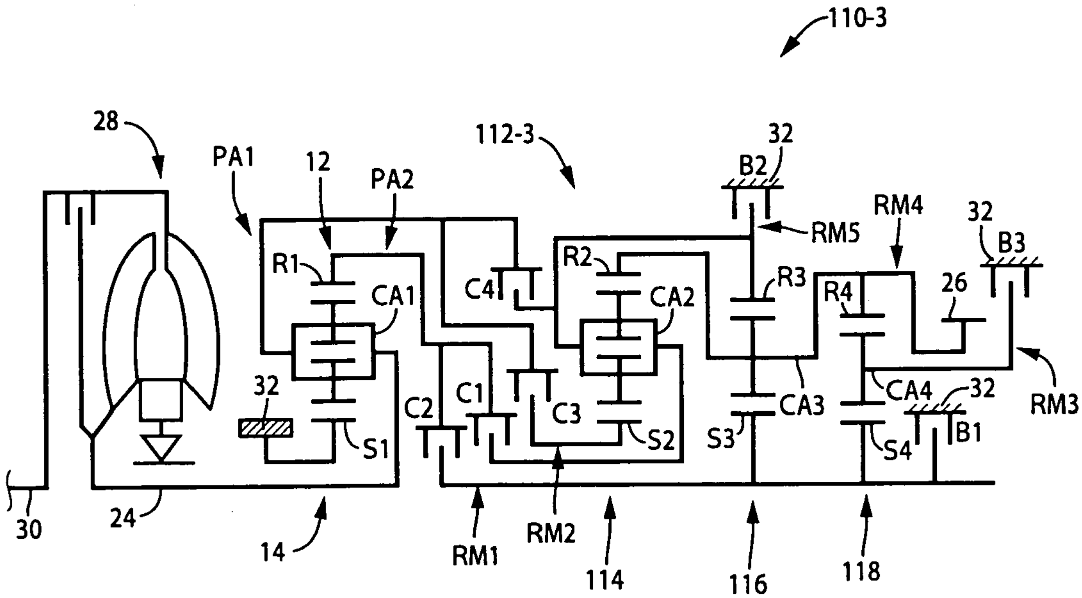
FIGS. 65(*a*) and 65(*b*) are views illustrating further another embodiment of the invention, in which a case is shown where the fourth clutch C4 differs in the arrangement position thereof in comparison with the embodiment in FIG. 63, and corresponding to FIG. 63.
Figure 66:
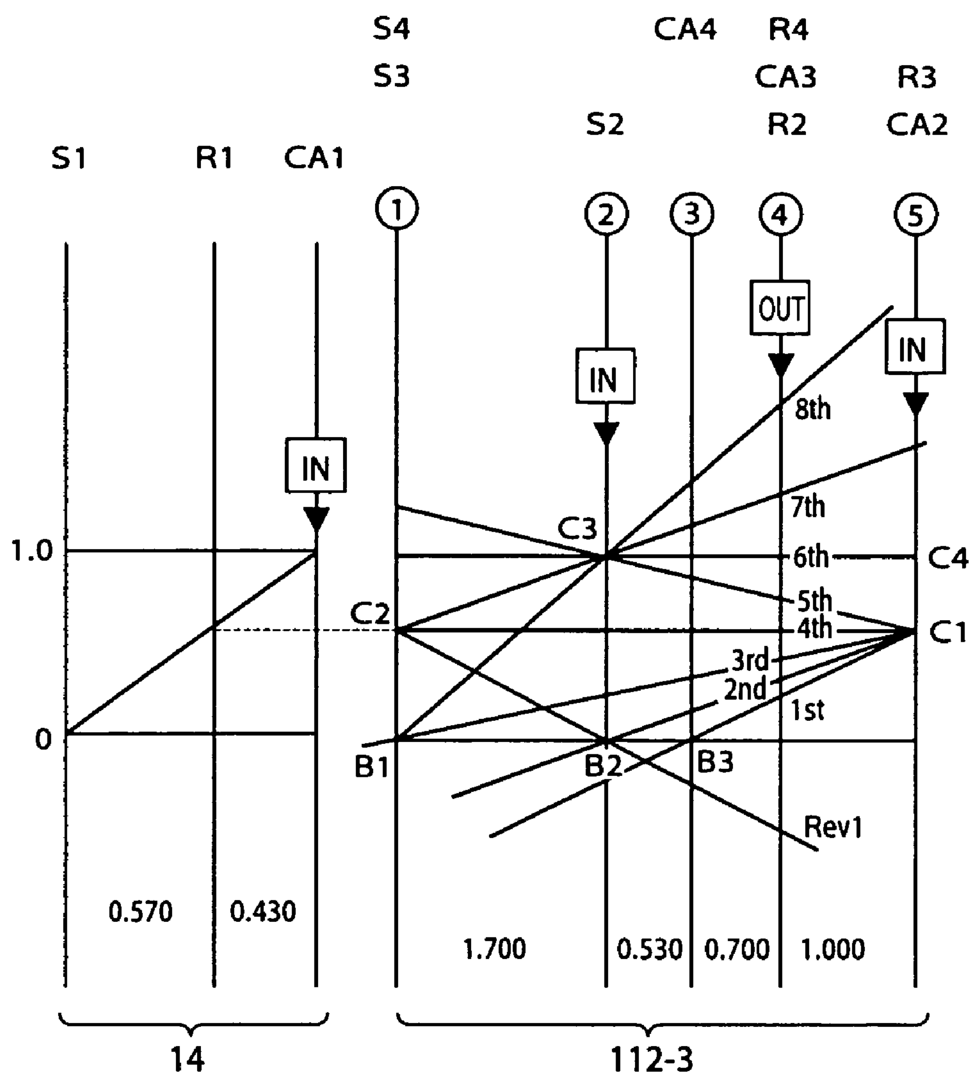
FIG. 66 is a collinear chart of the embodiment in FIG. 65.

FIG. 65 through FIG. 66 show one embodiment according to the first through the fifth aspects, the sixteenth aspect, the fifty-first aspect, and the fifty-third through the fifty-fifth aspects of the invention. FIG. 65 is a view corresponding to FIG. 1 described above, and FIG. 66 is a view corresponding to FIG. 2 described above. An automatic transmission 110-3 for vehicle differs from the automatic transmission 110-2 for vehicle, which is shown in FIG. 63 and FIG. 64 in that the fifth rotary element RM5 (Carrier CA2 and ring gear R3) of the second transmission portion 112-3 is selectively connected via the fourth clutch C4 to the input shaft 24, that is, the first intermediate output path PA1. However, as shown in FIG. 65(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 63(*b*), and the same collinear chart (excluding the second reverse gear stage [Rev2]) as that in FIG. 64 can be obtained as shown in FIG. 66, wherein similar actions and effects can be brought about.

Figures 67A, 67B:
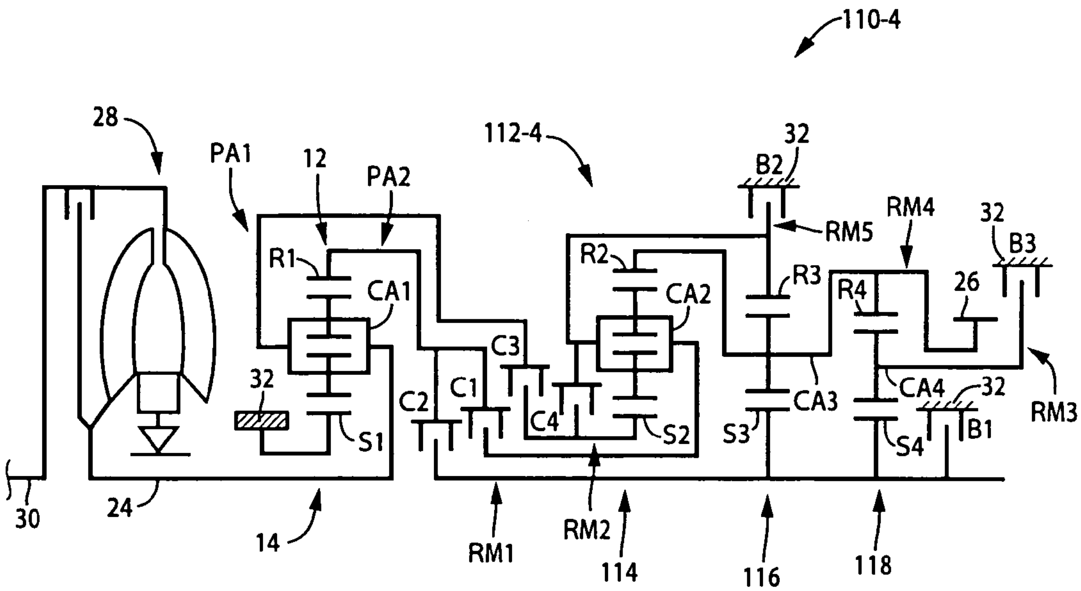
FIGS. 67(*a*) and 67(*b*) are views illustrating further another embodiment of the invention, in which a case is shown where the fourth clutch C4 differs in the arrangement position thereof in comparison with the embodiment in FIG. 63, and corresponding to FIG. 63.
Figure 68:
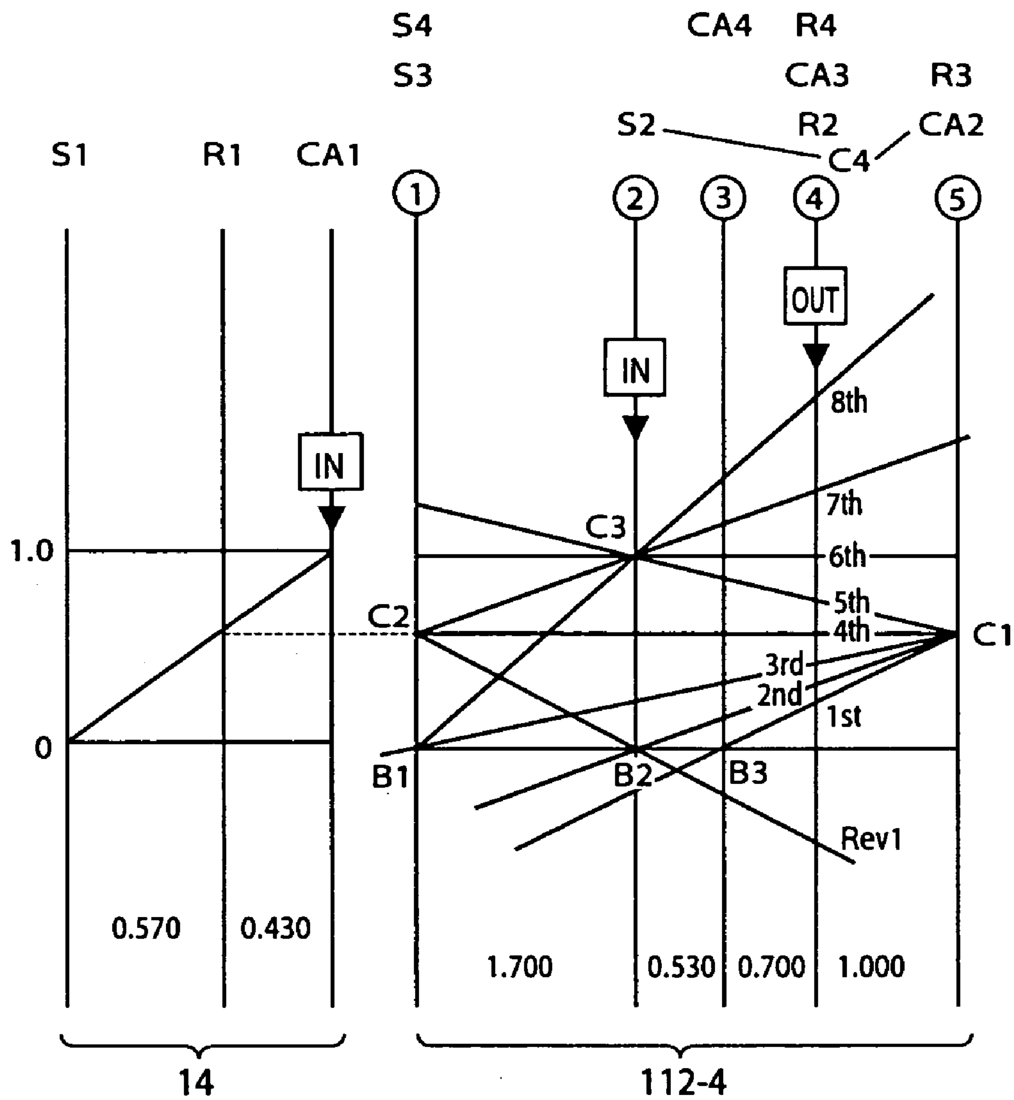
FIG. 68 is a collinear chart of the embodiment in FIG. 67.

FIG. 67 through FIG. 68 show one embodiment according to the first through the fourth aspects, the sixth aspect, the sixteenth aspect, and the fifty-second through the fifty-fifth aspects of the invention. FIG. 67 is a view corresponding to FIG. 1 described above, and FIG. 68 is a view corresponding to FIG. 2 described above. An automatic transmission 110-4 for vehicle differs from the automatic transmission 110-2 for vehicle, which is shown in FIG. 63 and FIG. 64 in that the second rotary element RM2 (Sun gear S2) of the second transmission portion 112-4 and the fifth rotary element RM5 (Carrier CA2 and ring gear R3) thereof are selectively connected integral with each other via the fourth clutch C4. However, as shown in FIG. 67(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 63(*b*), and the same collinear chart (excluding the second reverse gear stage [Rev2]) as that in FIG. 64 can be obtained as shown in FIG. 68, wherein similar actions and effects can be brought about.

Figures 69A, 69B:
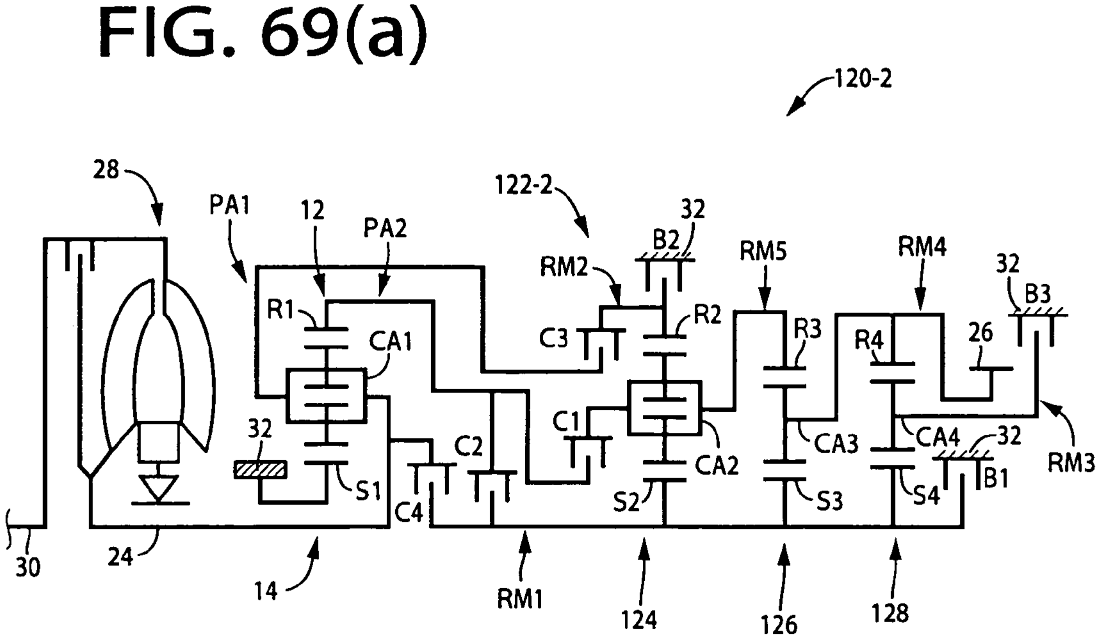
FIGS. 69(*a*) and 69(*b*) are views illustrating still another embodiment of the invention, in which a case is shown where the second transmission portion differs in the construction thereof in comparison with the embodiment in FIG. 35, and corresponding to FIG. 35.
Figure 70:
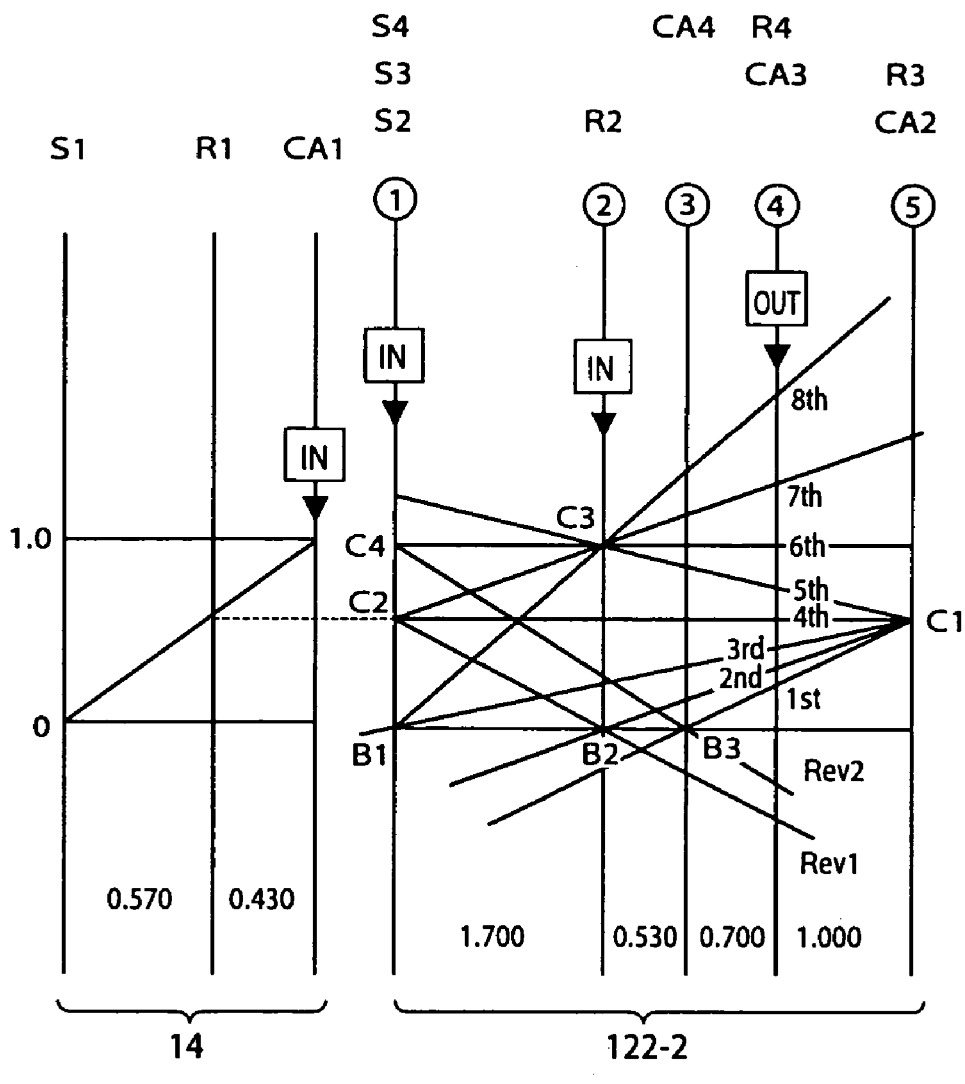
FIG. 70 is a collinear chart of the embodiment in FIG. 69.

FIG. 69 through FIG. 70 show one embodiment according to the first through the fifth aspects, the seventeenth aspect, the fifty-first aspect, and the fifty-third through the fifty-fifth aspects of the invention. FIG. 69 is a view corresponding to FIG. 1 described above, and FIG. 70 is a view corresponding to FIG. 2 described above. An automatic transmission 120-2 for vehicle differs from the automatic transmission 70-2 for vehicle, which is shown in FIG. 35 and FIG. 36 in the construction of the second transmission portion 122-2, and is preferably used for lateral installation in an FF vehicle or RR vehicle. That is, the second transmission portion 122-2 is composed mainly of a double-pinion type second planetary gear set 124, a single-pinion type third planetary gear set 126 and a single-pinion type fourth planetary gear set 128, wherein the first rotary element RM1 is composed of the sun gear S2 of the second planetary gear set 124, the sun gear S3 of the third planetary gear set 126, and the sun gear S4 of the fourth planetary gear set 128 connected to each other, the second rotary element RM2 is composed of the ring gear R2 of the second planetary gear set 124, the third rotary element RM3 is composed of the carrier CA4 of the fourth planetary gear set 128, the fourth rotary element RM4 is composed of the carrier CA3 of the third planetary gear set 126 and the ring gear R4 of the fourth planetary gear set 128 connected to each other, and the fifth rotary element RM5 is composed of the carrier CA2 of the second planetary gear set 124 and the ring gear R3 of the third planetary gear set 126 connected to each other. Also, an output gear 26 is provided instead of the above-described output shaft 27, and the fourth rotary element RM4 (Carrier CA3 and ring gear R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 35 and FIG. 36.

In this case, as shown in FIG. 69(*b*), eight forward gear stages from the first gear stage [1st] to the eighth gear stage [8th] and one reverse gear stage [Rev1] are established in accordance with the same operation table as that in FIG. 35(*b*). Also, the transmission ratios of the respective gear stages are appropriately determined by the respective gear ratios ρ1 through ρ4 of the first planetary gear set 12, the second planetary gear set 124, the third planetary gear set 126 and the fourth planetary gear set 128, wherein if, for example, ρ1 is 0.430, ρ2 is 0.567, ρ3 is 0.341 and ρ4 is 0.314, the collinear chart as that in FIG. 36 can be obtained as shown in FIG. 70, and the same transmission ratios as those in FIG. 35(*b*) can be obtained as shown in FIG. 69(*b*). Also, actions and effects similar to those of the embodiment shown in FIG. 35 and FIG. 36, that is, actions and effects similar to those of the embodiment of FIG. 1 and FIG. 2 can be obtained. Further, as shown in FIG. 69(*b*) and FIG. 70, the automatic transmission 120-2 for vehicle may be composed so that, as shown in FIG. 35(*b*) and FIG. 36, the fourth clutch C4 and the third brake B3 are engaged with each other, the first rotary element RM1 is rotated integral with the input shaft 24, and the third rotary element RM3 is brought to a stationary state, wherein the fourth rotary element RM4 is reversed at a rotation speed [Rev2] and the second reverse gear stage [Rev2] can be established in addition to the first reverse gear stage [Rev1].

Figures 71A, 71B:
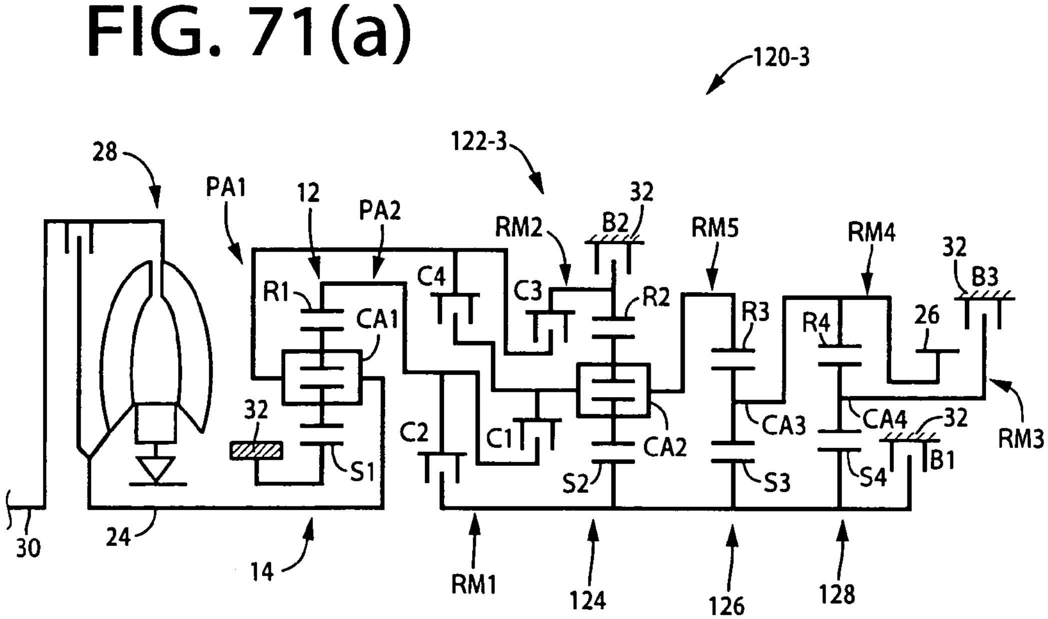
FIGS. 71(*a*) and 71(*b*) are views illustrating further another embodiment of the invention, in which a case is shown where the fourth clutch C4 differs in the arrangement position thereof in comparison with the embodiment in FIG. 69, and corresponding to FIG. 69.
Figure 72:
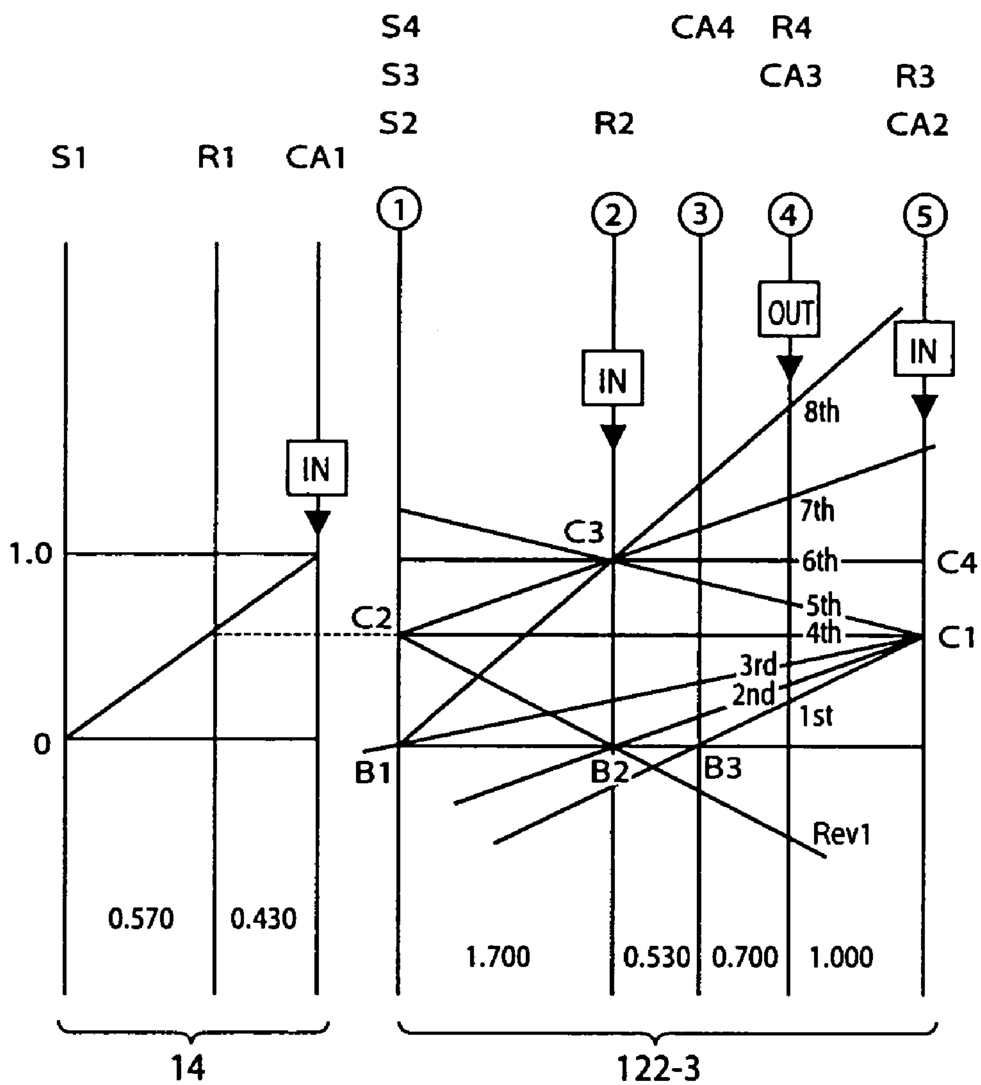
FIG. 72 is a collinear chart of the embodiment in FIG. 71.

FIG. 71 through FIG. 72 show one embodiment according to the first through the fifth aspects, the seventeenth aspect, the fifty-first aspect, and the fifty-third through the fifty-fifth aspects of the invention. FIG. 71 is a view corresponding to FIG. 1 described above, and FIG. 72 is a view corresponding to FIG. 2 described above. An automatic transmission 120-3 for vehicle differs from the automatic transmission 120-2 for vehicle, which is shown in FIG. 69 and FIG. 70 in that the fifth rotary element RM5 (Carrier CA2 and ring gear R3) of the second transmission portion 122-3 is selectively connected via the fourth clutch C4 to the input shaft 24, that is, the first intermediate output path PA1. However, as shown in FIG. 71(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 69(*b*), and the same collinear chart (excluding the second reverse gear stage [Rev2]) as that in FIG. 70 can be obtained as shown in FIG. 72, wherein similar actions and effects can be brought about.

Figures 73A, 73B:
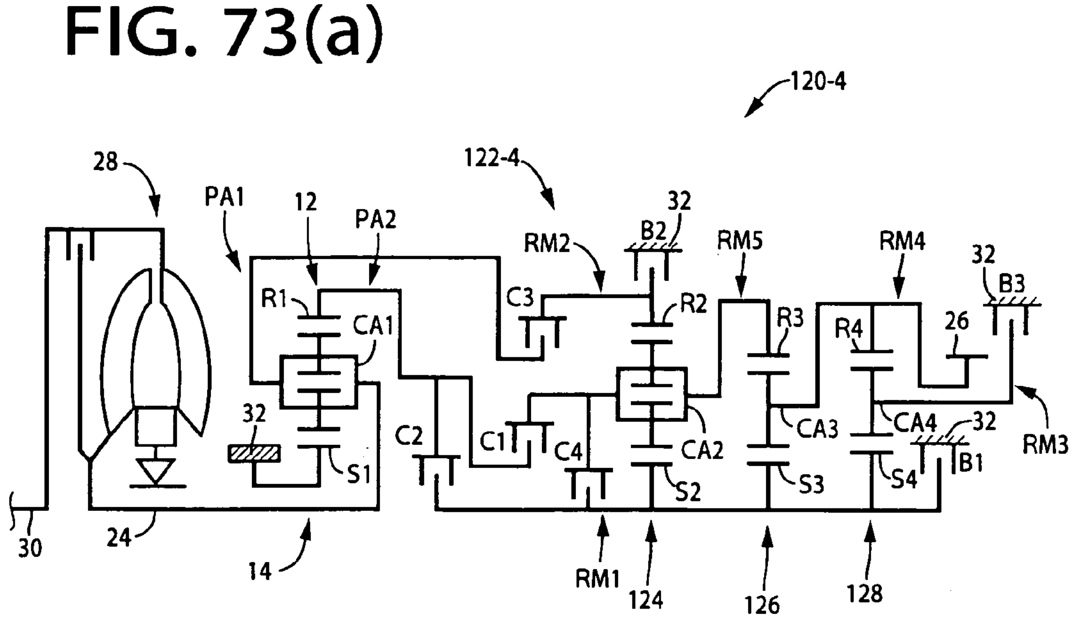
FIGS. 73(*a*) and 73(*b*) are views illustrating further another embodiment of the invention, in which a case is shown where the fourth clutch C4 differs in the arrangement position thereof in comparison with the embodiment in FIG. 69, and corresponding to FIG. 69.
Figure 74:
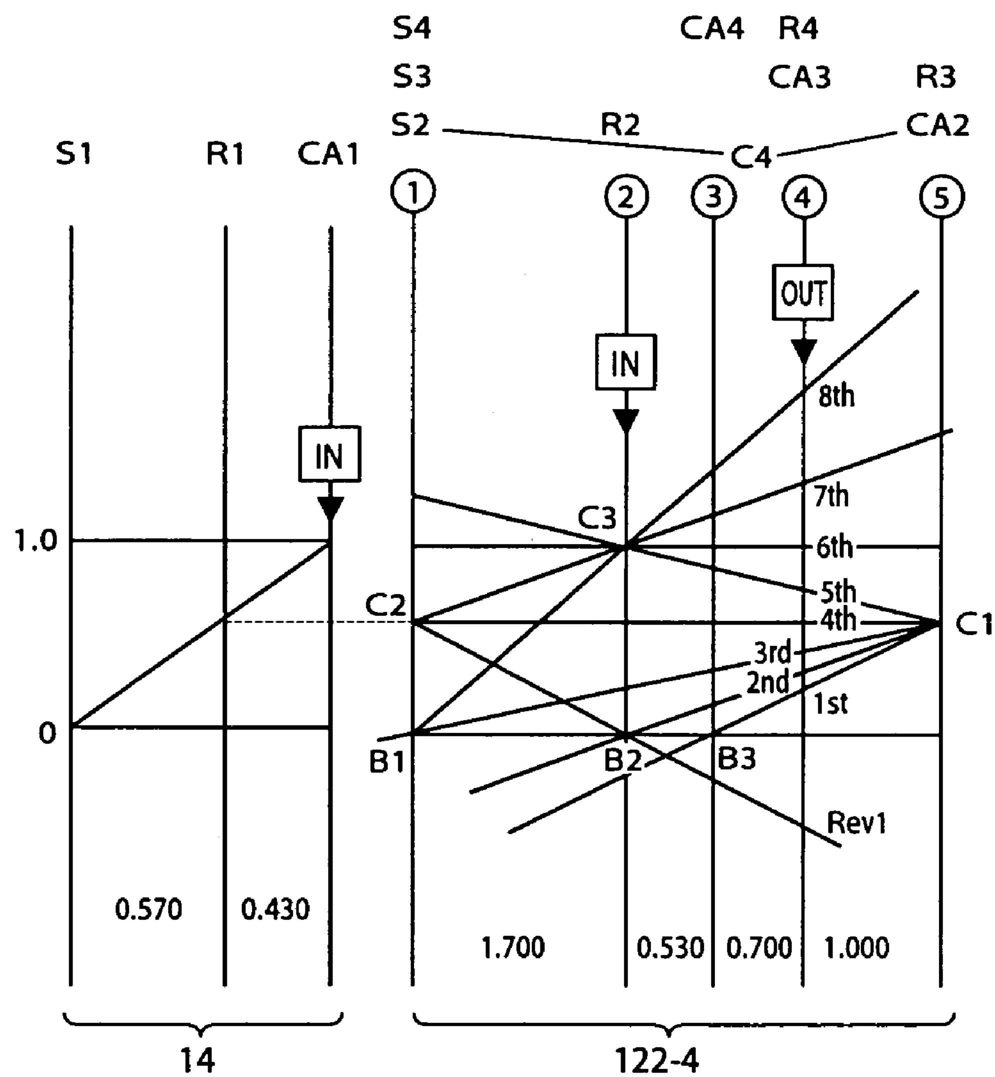
FIG. 74 is a collinear chart of the embodiment in FIG. 73.

FIG. 73 through FIG. 74 show one embodiment according to the first through the fourth aspects, the sixth aspect, the seventeenth aspect, and the fifty-second through the fifty-fifth aspects of the invention. FIG. 73 is a view corresponding to FIG. 1 described above, and FIG. 74 is a view corresponding to FIG. 2 described above. An automatic transmission 120-4 for vehicle differs from the automatic transmission 120-2 for vehicle, which is shown in FIG. 69 and FIG. 70 in that the first rotary element RM1 (Sun gears S2, S3 and S4) of the second transmission portion 122-4 and the fifth rotary element RM5 (Carrier CA2 and ring gear R3) thereof are selectively connected integral with each other via the fourth clutch C4. However, as shown in FIG. 73(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 69(*b*), and the same collinear chart (excluding the second reverse gear stage [Rev2]) as that-in FIG. 70 can be obtained as shown in FIG. 74, wherein similar actions and effects can be brought about.

Figures 75A, 75B:
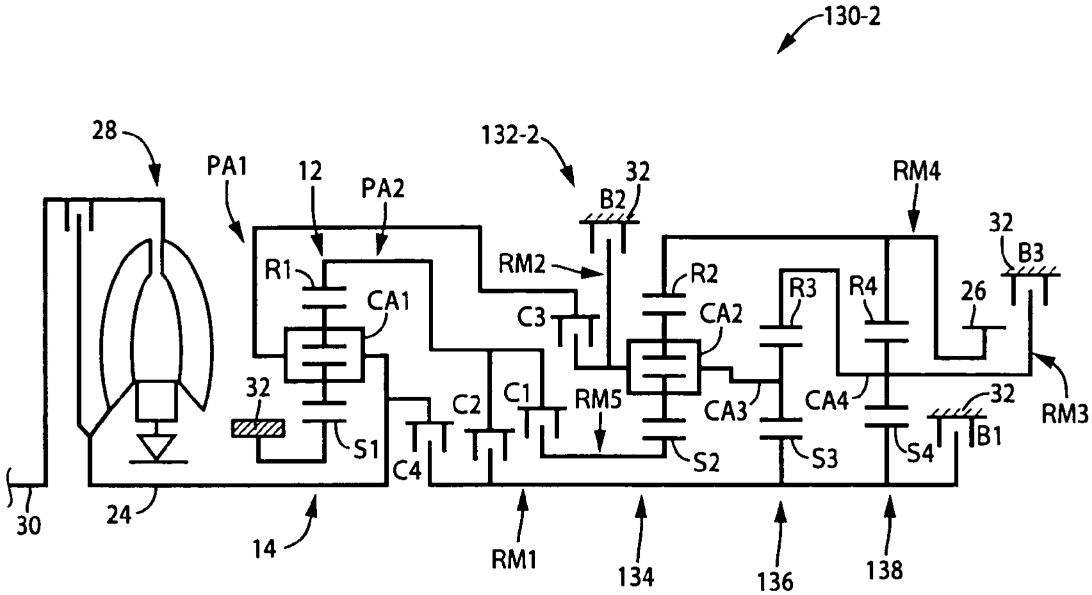
FIGS. 75(*a*) and 75(*b*) are views illustrating still another embodiment of the invention, in which a case is shown where the second transmission portion differs in the construction thereof in comparison with the embodiment in FIG. 35, and corresponding to FIG. 35.
Figure 76:
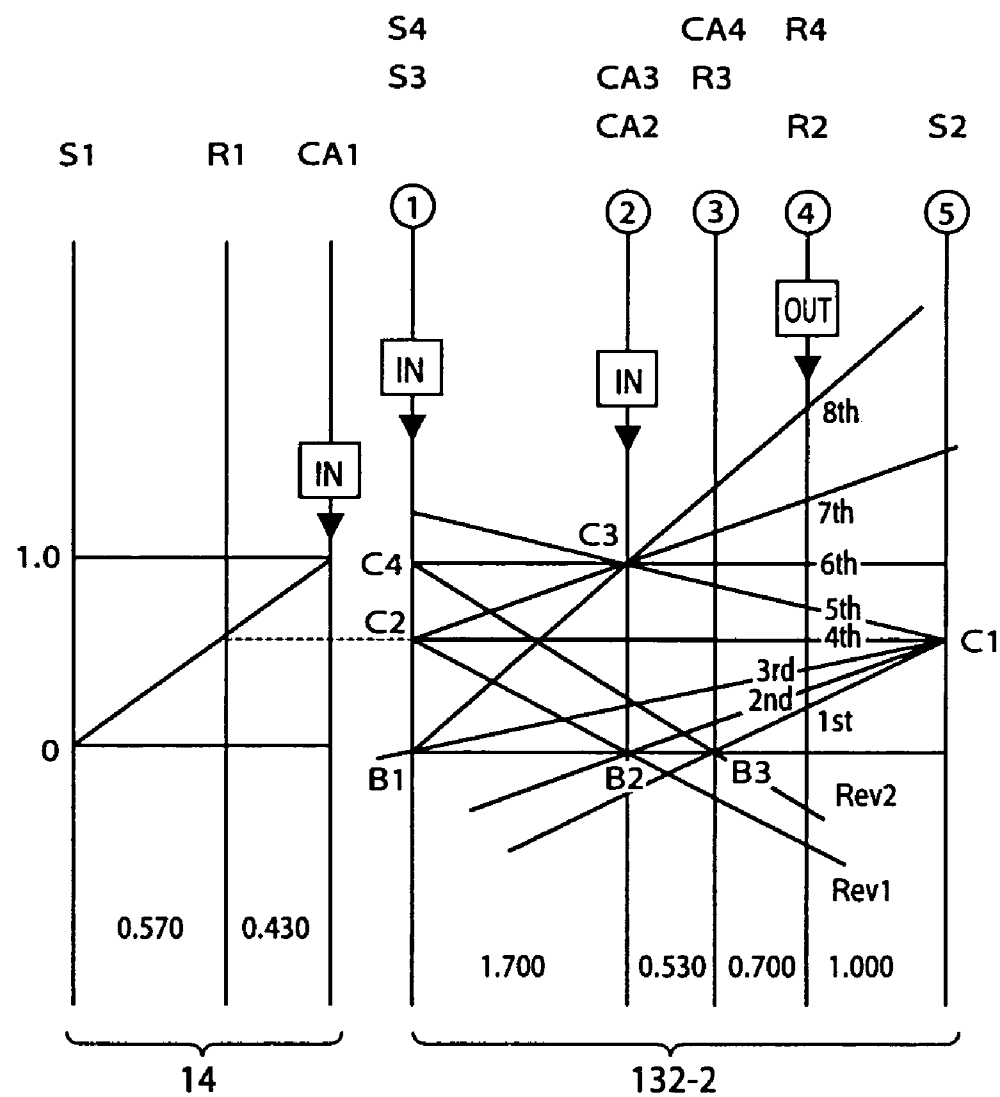
FIG. 76 is a collinear chart of the embodiment in FIG. 75.

FIG. 75 through FIG. 76 show one embodiment according to the first through the fifth aspects, the eighteenth aspect, the fifty-first aspect, and the fifty-third through the fifty-fifth aspects of the invention. FIG. 75 is a view corresponding to FIG. 1 described above, and FIG. 76 is a view corresponding to FIG. 2 described above. An automatic transmission 130-2 for vehicle differs from the automatic transmission 70-2 for vehicle, which is shown in FIG. 35 and FIG. 36 in the construction of the second transmission portion 132-2, and is preferably used for lateral installation in an FF vehicle or RR vehicle. That is, the second transmission portion 132-2 is composed mainly of a double-pinion type second planetary gear set 134, a single-pinion type third planetary gear set 136 and a single-pinion type fourth planetary gear set 138, wherein the first rotary element RM1 is composed of the sun gear S3 of the third planetary gear set 136 and the sun gear S4 of the fourth planetary gear set 138 connected to each other, the second rotary element RM2 is composed of the carrier CA2 of the second planetary gear set 134 and the carrier CA3 of the third planetary-gear set 136 connected to each other, the third rotary element RM3 is composed of the ring gear R3 of the third planetary gear set 136 and the carrier CA4 of the fourth planetary gear set 138 connected to each other, the fourth rotary element RM4 is composed of the ring gear R2 of the second planetary gear set 134 and the ring gear R4 of the fourth planetary gear set 138 connected to each other, and the fifth rotary element RM5 is composed of the sun gear S2 of the second planetary gear set 134. Also, an output gear 26 is provided instead of the above-described output shaft 27, and the fourth rotary element RM4 (Ring gears R2 and R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 35 and FIG. 36.

In this case, as shown in FIG. 75(*b*), eight forward gear stages from the first gear stage [1st] to the eighth gear stage [8th] and one reverse gear stage [Rev1] are established in accordance with the same operation table as that in FIG. 35(*b*). Also, the transmission ratios of the respective gear stages are appropriately determined by the respective gear ratios ρ1 through ρ4 of the first planetary gear set 12, the second planetary gear set 134, the third planetary gear set 136 and the fourth planetary gear set 138, wherein if, for example, ρ1 is 0.430, ρ2 is 0.552, ρ3 is 0.312 and ρ4 is 0.314, the collinear chart as that in FIG. 36 can be obtained as shown in FIG. 76, and the same transmission ratios as those in FIG. 35(*b*) can be obtained as shown in FIG. 75(*b*). Also, actions and effects similar to those of the embodiment shown in FIG. 35 and FIG. 36, that is, actions and effects similar to those of the embodiment of FIG. 1 and FIG. 2 can be obtained. Further, as shown in FIG. 75(*b*) and FIG. 76, the automatic transmission 130-2 for vehicle may be composed so that, as shown in FIG. 35(*b*) and FIG. 36, the fourth clutch C4 and the third brake B3 are engaged with each other, the first rotary element RM1 is rotated integral with the input shaft 24, and the third rotary element RM3 is brought to a stationary state, wherein the fourth rotary element RM4 is reversed at a rotation speed [Rev2] and the second reverse gear stage [Rev2] can be established in addition to the first reverse gear stage [Rev1].

Figures 77A, 77B:
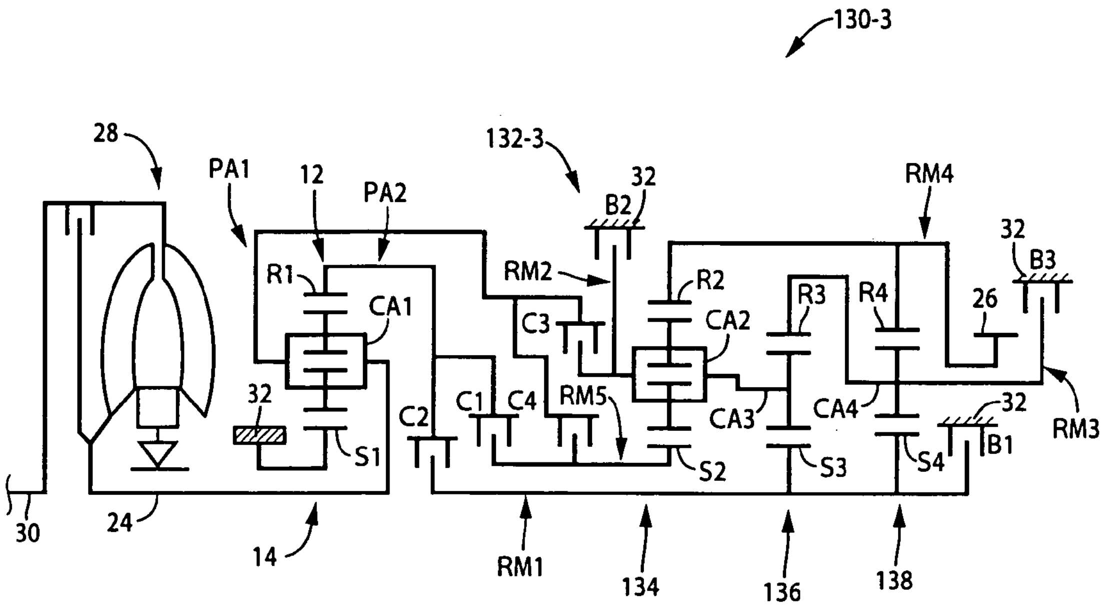
FIGS. 77(*a*) and 77(*b*) are views illustrating further another embodiment of the invention, in which a case is shown where the fourth clutch C4 differs in the arrangement position thereof in comparison with the embodiment in FIG. 75, and corresponding to FIG. 75.
Figure 78:
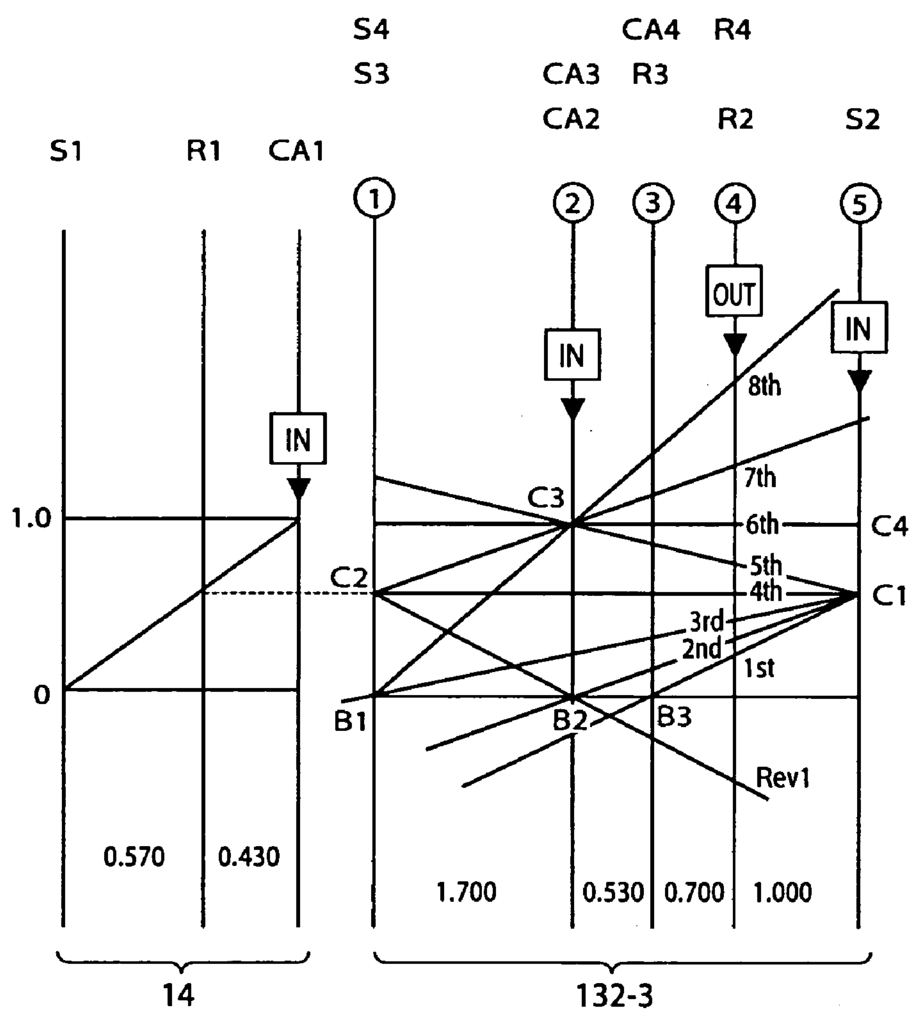
FIG. 78 is a collinear chart of the embodiment in FIG. 77.

FIG. 77 through FIG. 78 show one embodiment according to the first through the fifth aspects, the eighteenth aspect, the fifty-first aspect, and the fifty-third through the fifty-fifth aspects of the invention. FIG. 77 is a view corresponding to FIG. 1 described above, and FIG. 78 is a view corresponding to FIG. 2 described above. An automatic transmission 130-3 for vehicle differs from the automatic transmission 130-2 for vehicle, which is shown in FIG. 75 and FIG. 76 in that the fifth rotary element RM5 (Sun gear S2) of the second transmission portion 132-3 is selectively connected via the fourth clutch C4 to the input shaft 24, that is, the first intermediate output path PA1. However, as shown in FIG. 77(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 75(*b*), and the same collinear chart (excluding the second reverse gear stage [Rev2]) as that in FIG. 76 can be obtained as shown in FIG. 78, wherein similar actions and effects can be brought about.

Figures 79A, 79B:
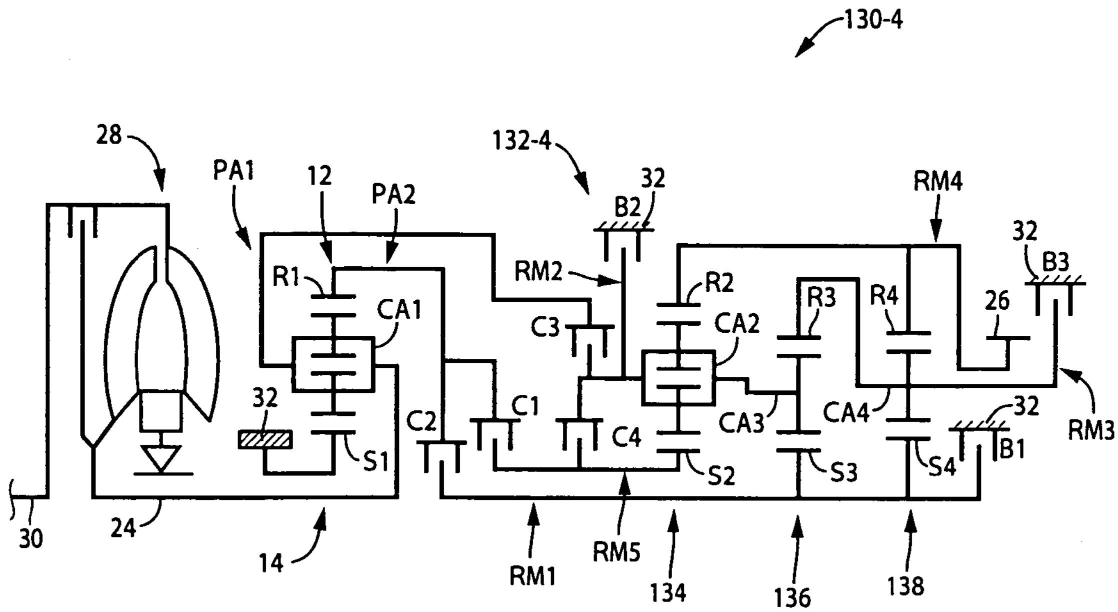
FIGS. 79(*a*) and 79(*b*) are views illustrating further another embodiment of the invention, in which a case is shown where the fourth clutch C4 differs in the arrangement position thereof in comparison with the embodiment in FIG. 75, and corresponding to FIG. 75.
Figure 80:
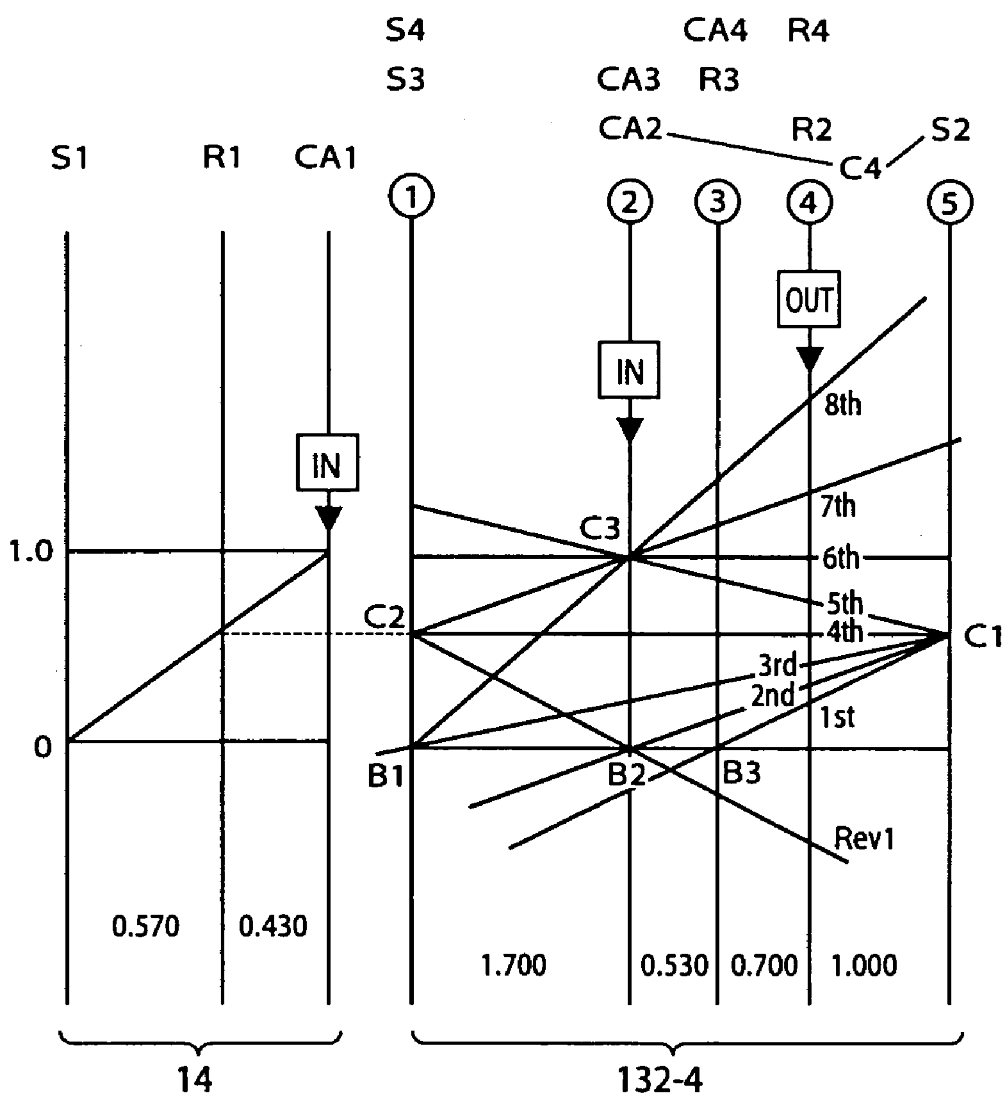
FIG. 80 is a collinear chart of the embodiment in FIG. 79.

FIG. 79 through FIG. 80 show one embodiment according to the first through the fourth aspects, the sixth aspect, the eighteenth aspect, and the fifty-second through the fifty-fifth aspects of the invention. FIG. 79 is a view corresponding to FIG. 1 described above, and FIG. 80 is a view corresponding to FIG. 2 described above. An automatic transmission 130-4 for vehicle differs from the automatic transmission 130-2 for vehicle, which is shown in FIG. 75 and FIG. 76 in that the second rotary element RM2 (Carriers CA2 and CA3) of the second transmission portion 132-4 and the fifth rotary element RM5 (Sun gear S2) thereof are selectively connected integral with each other via the fourth clutch CA4. However, as shown in FIG. 79(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 75(*b*), and the same collinear chart (excluding the second reverse gear stage [Rev2]) as that in FIG. 76 can be obtained as shown in FIG. 80, wherein similar actions and effects can be brought about.

Figures 81A, 81B:
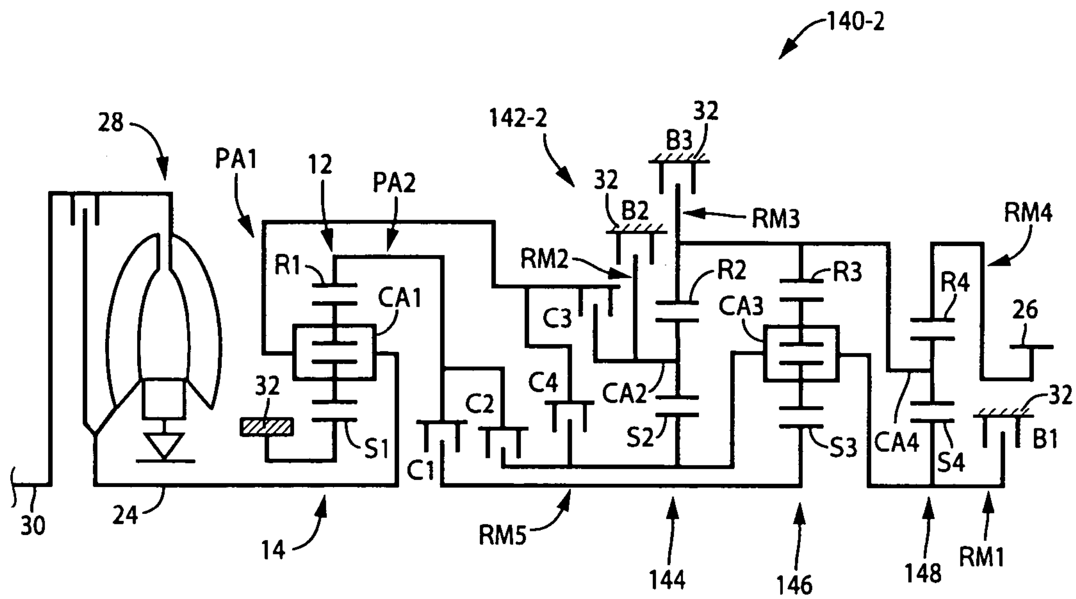
FIGS. 81(*a*) and 81(*b*) are views illustrating still another embodiment of the invention, in which a case is shown where the second transmission portion differs in the construction thereof in comparison with the embodiment in FIG. 35, and corresponding to FIG. 5.
Figure 82:
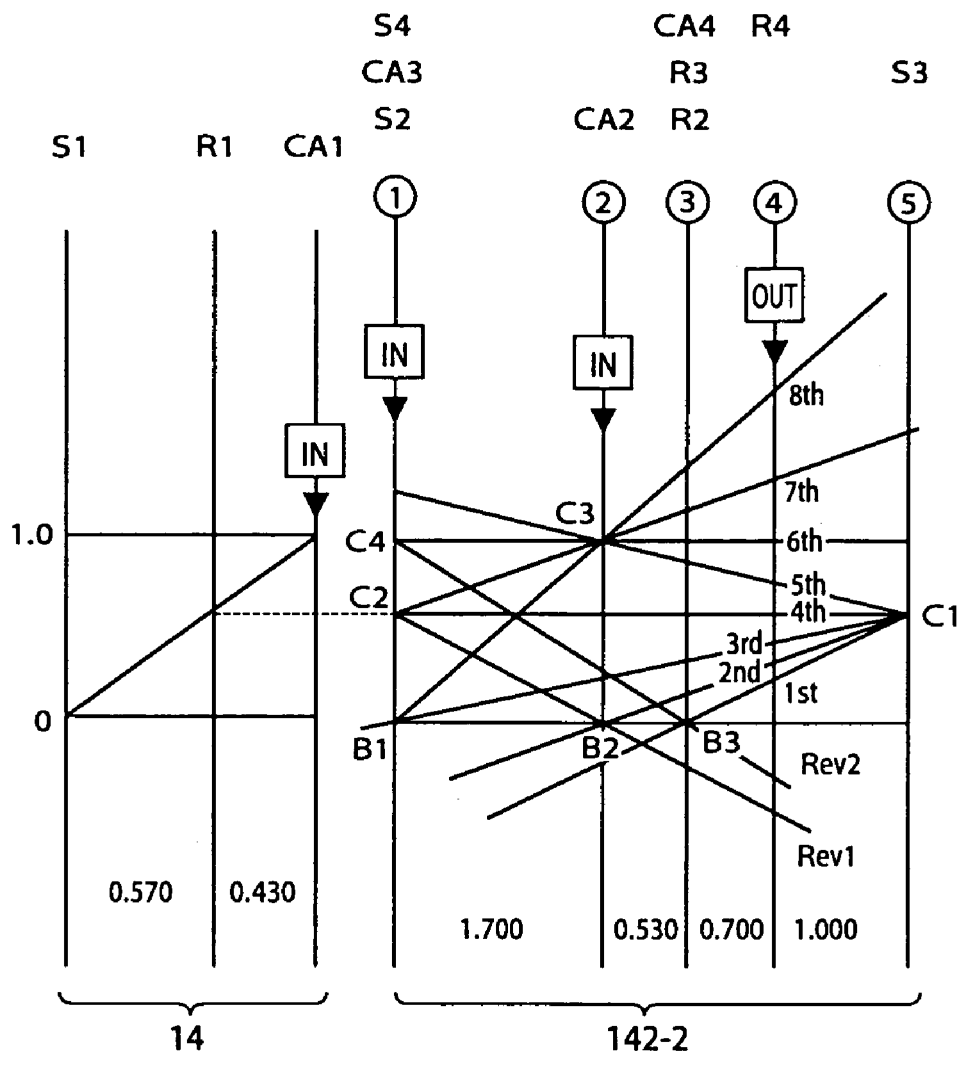
FIG. 82 is a collinear chart of the embodiment in FIG. 81.

FIG. 81 through FIG. 82 show one embodiment according to the first through the fifth aspects, the nineteenth aspect, the fifty-first aspect, and the fifty-third through the fifty-fifth aspects of the invention. FIG. 81 is a view corresponding to FIG. 1 described above, and FIG. 82 is a view corresponding to FIG. 2 described above. An automatic transmission 140-2 for vehicle differs from the automatic transmission 70-2 for vehicle, which is shown in FIG. 35 and FIG. 36 in the construction of the second transmission portion 142-2, and is preferably used for lateral installation in an FF vehicle or RR vehicle. That is, the second transmission portion 142-2 is composed mainly of a single-pinion type second planetary gear set 144, a double-pinion type third planetary gear set 146 and a single-pinion type fourth planetary gear set 148, wherein the sun gear S2 of the second planetary gear set 144, the carrier CA3 of the third planetary gear set 146 and the sun gear S4 of the fourth planetary gear set 148 are connected to each other to compose the first rotary element RM1, the second rotary element RM2 is composed of the carrier CA2 of the second planetary gear set 144, the third rotary element RM3 is composed of the ring gear R2 of the second planetary gear set 144, the ring gear R3 of the third planetary gear set 146 and the carrier CA4 of the fourth planetary gear set 148 connected to each other, the fourth rotary element RM4 is composed of the ring gear R4 of the fourth planetary gear set 148, and the fifth rotary element RM5 is composed of the sun gear S3 of the third planetary gear set 146. Also, an output gear 26 is provided instead of the above-described output shaft 27, and the fourth rotary element RM4 (Ring gear R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 35 and FIG. 36.

In this case, as shown in FIG. 81(*b*), eight forward gear stages from the first gear stage [1st] to the eighth gear stage [8th] and one reverse gear stage [Rev1] are established in accordance with the same operation table as that in FIG. 35(*b*). Also, the transmission ratios of the respective gear stages are appropriately determined by the respective gear ratios ρ1 through ρ4 of the first planetary gear set 12, the second planetary gear set 144, the third planetary gear set 146 and the fourth planetary gear set 148, wherein if, for example, ρ1 is 0.430, ρ2 is 0.312, ρ3 is 0.567 and ρ4 is 0.314, the collinear chart as that in FIG. 36 can be obtained as shown in FIG. 82, and the same transmission ratios as those in FIG. 35(*b*) can be obtained as shown in FIG. 81(*b*). Also, actions and effects similar to those of the embodiment shown in FIG. 35 and FIG. 36, that is, actions and effects similar to those of the embodiment of FIG. 1 and FIG. 2 can be obtained. Further, as shown in FIG. 81(*b*) and FIG. 82, the automatic transmission 140-2 for vehicle may be composed so that, as shown in FIG. 35(*b*) and FIG. 36, the fourth clutch C4 and the third brake B3 are engaged with each other, the first rotary element RM1 is rotated integral with the input shaft 24, and the third rotary element RM3 is brought to a stationary state, wherein the fourth rotary element RM4 is reversed at a rotation speed [Rev2] and the second reverse gear stage [Rev2] can be established in addition to the first reverse gear stage [Rev1].

Figures 83A, 83B:
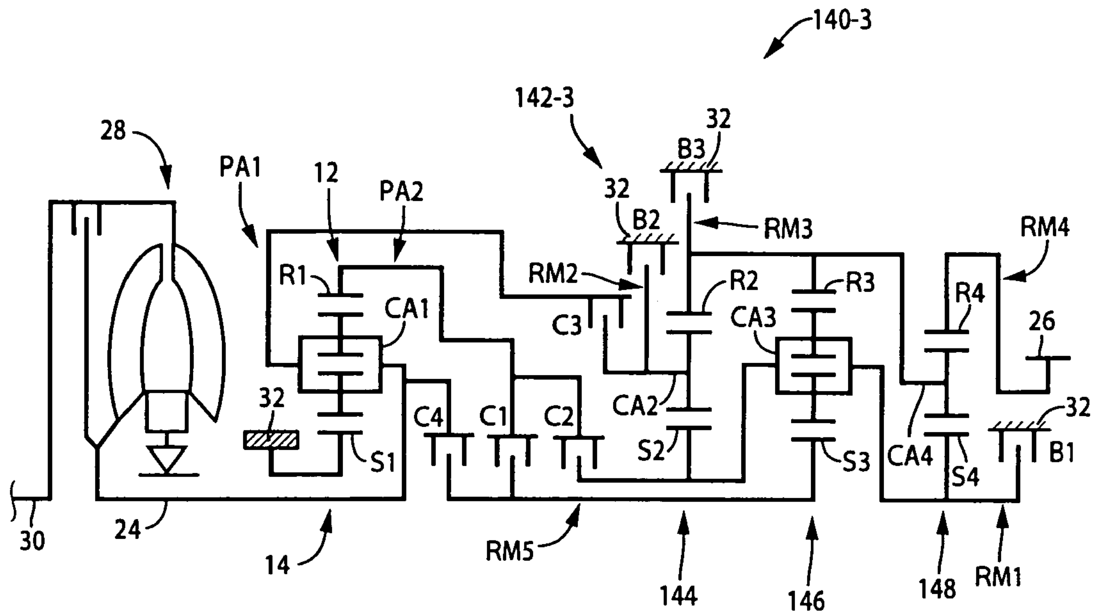
FIGS. 83(*a*) and 83(*b*) are views illustrating further another embodiment of the invention, in which a case is shown where the fourth clutch C4 differs in the arrangement position thereof in comparison with the embodiment in FIG. 81, and corresponding to FIG. 81.
Figure 84:
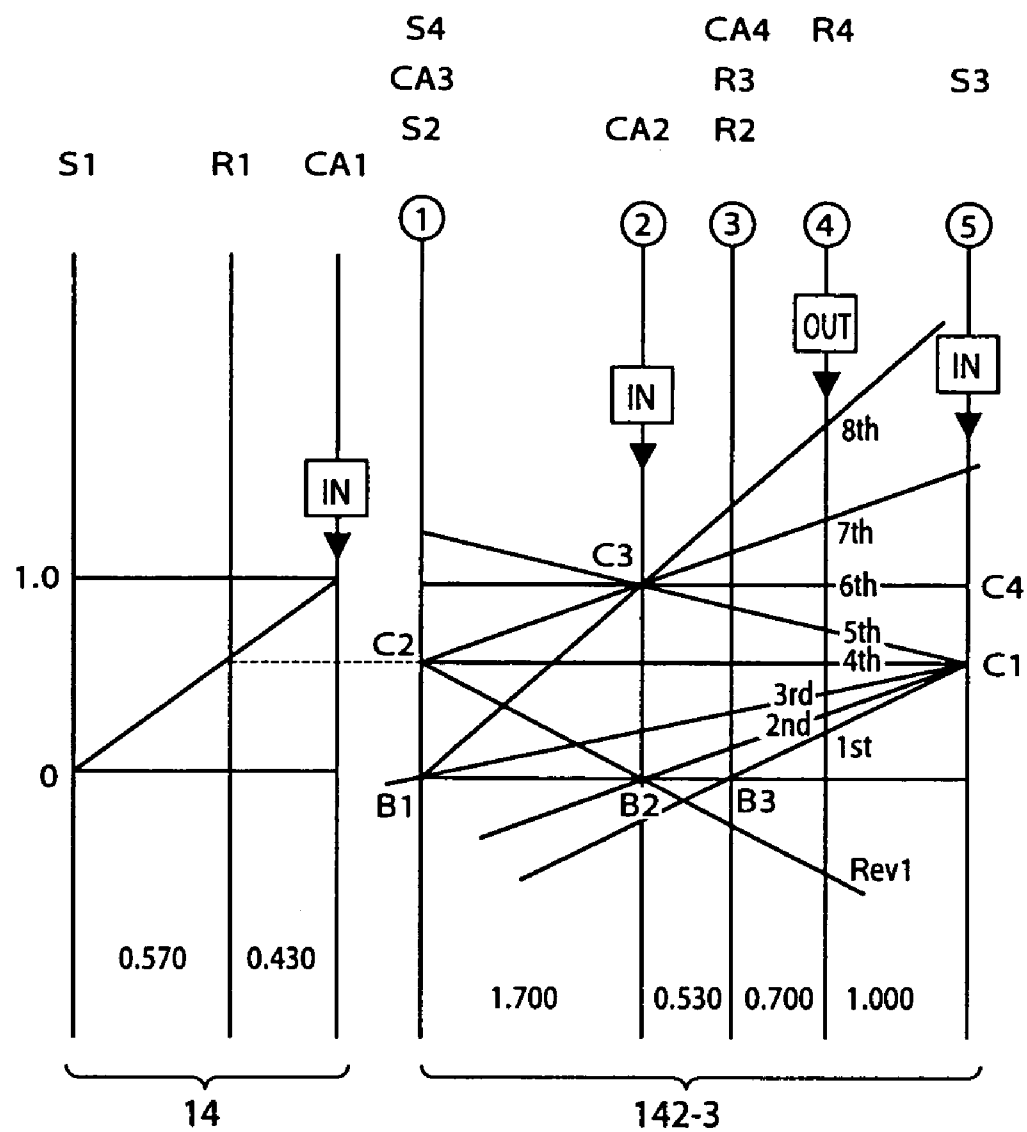
FIG. 84 is a collinear chart of the embodiment in FIG. 83.

FIG. 83 through FIG. 84 show one embodiment according to the first through the fifth aspects, the nineteenth aspect, the fifty-first aspect, and the fifty-third through the fifty-fifth aspects of the invention. FIG. 83 is a view corresponding to FIG. 1 described above, and FIG. 84 is a view corresponding to FIG. 2 described above. An automatic transmission 140-3 for vehicle differs from the automatic transmission 140-2 for vehicle, which is shown in FIG. 81 and FIG. 82 in that the fifth rotary element RM5 (Sun gear S3) of the second transmission portion 142-3 is selectively connected via the fourth clutch C4 to the input shaft 24, that is, the first intermediate output path PA1. However, as shown in FIG. 83(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 81(*b*), and the same collinear chart (excluding the second reverse gear stage [Rev2]) as that in FIG. 82 can be obtained as shown in FIG. 84, wherein similar actions and effects can be brought about.

Figures 85A, 85B:
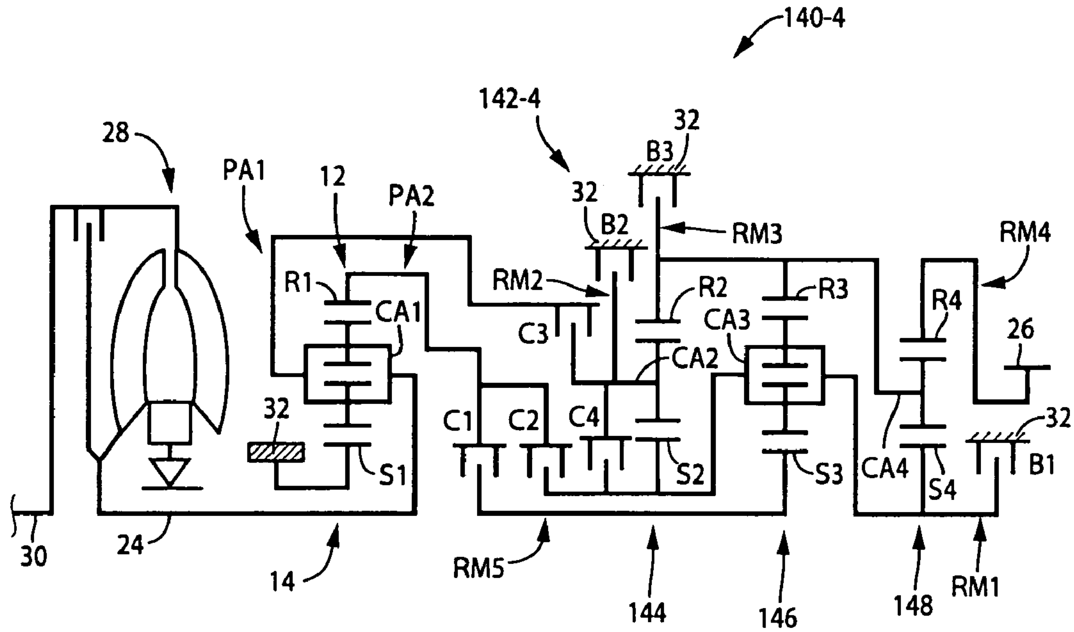
FIGS. 85(*a*) and 85(*b*) are views illustrating further another embodiment of the invention, in which a case is shown where the fourth clutch C4 differs in the arrangement position thereof in comparison with the embodiment in FIG. 81, and corresponding to FIG. 81.
Figure 86:
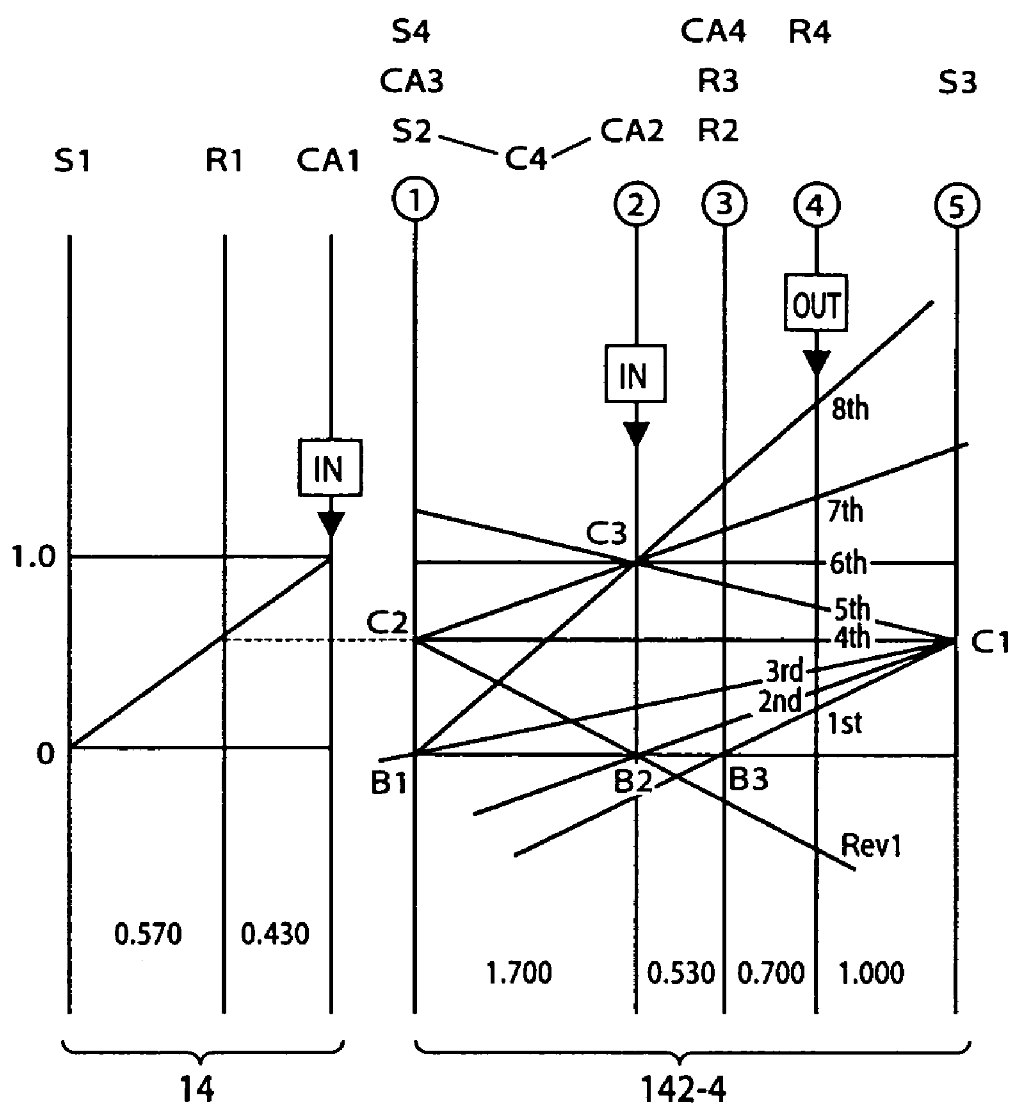
FIG. 86 is a collinear chart of the embodiment in FIG. 87.

FIG. 85 through FIG. 86 show one embodiment according to the first through the fourth aspects, the sixth aspect, the nineteenth aspect, and the fifty-second through the fifty-fifth aspects of the invention. FIG. 85 is a view corresponding to FIG. 1 described above, and FIG. 86 is a view corresponding to FIG. 2 described above. An automatic transmission 140-4 for vehicle differs from the automatic transmission 140-2 for vehicle, which is shown in FIG. 81 and FIG. 82 in that the first rotary element RM1 (Sun gear S2, carrier CA3 and sun gear S4) of the second transmission portion 142-4 and the second rotary element RM2 (Carrier CA2) thereof are selectively connected integral with each other via the fourth clutch CA4. However, as shown in FIG. 85(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 81(*b*), and the same collinear chart (excluding the second reverse gear stage [Rev2]) as that in FIG. 82 can be obtained as shown in FIG. 86, wherein similar actions and effects can be brought about.

Figures 87A, 87B:
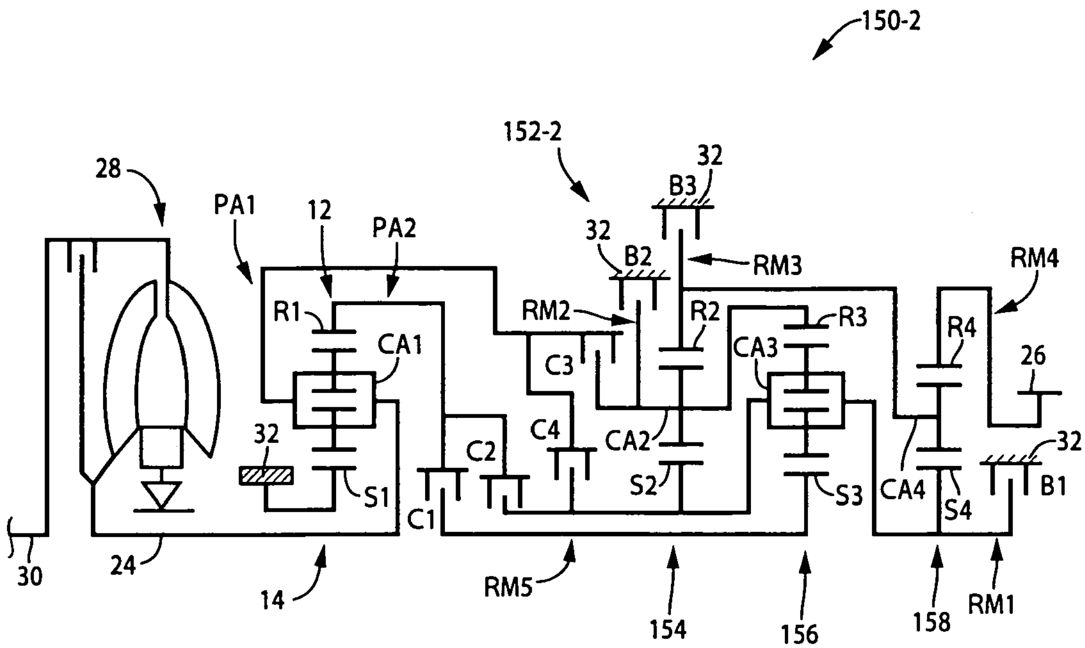
FIGS. 87(*a*) and 87(*b*) are views illustrating still another embodiment of the invention, in which a case is shown where the second transmission portion differs in the construction thereof in comparison with the embodiment in FIG. 35, and corresponding to FIG. 35.
Figure 88:
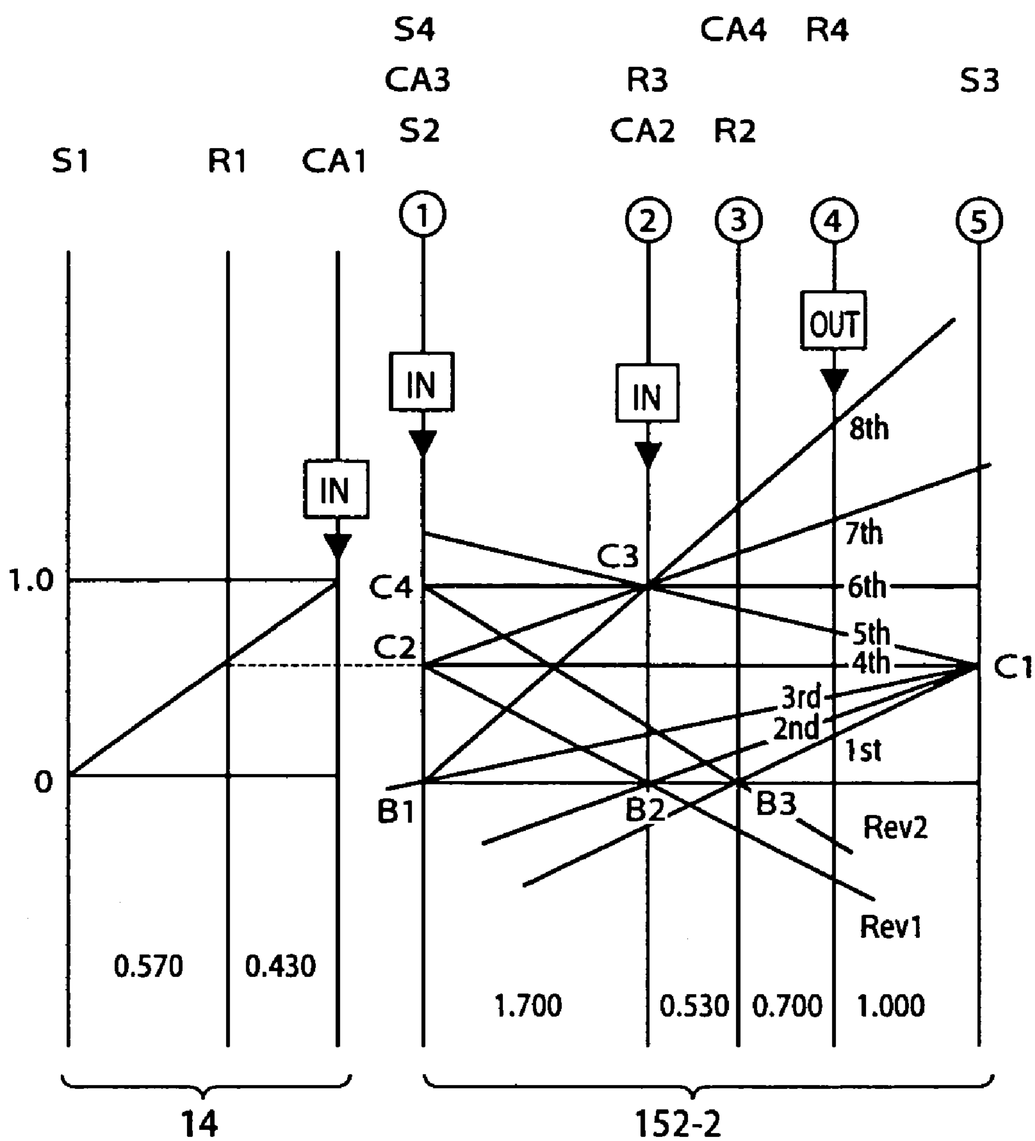
FIG. 88 is a collinear chart of the embodiment in FIG. 87.

FIG. 87 through FIG. 88 show one embodiment according to the first through the fifth aspects, the twentieth aspect, the fifty-first aspect, and the fifty-third through the fifty-fifth aspects of the invention. FIG. 87 is a view corresponding to FIG. 1 described above, and FIG. 88 is a view corresponding to FIG. 2 described above. An automatic transmission 150-2 for vehicle differs from the automatic transmission 70-2 for vehicle, which is shown in FIG. 35 and FIG. 36 in the construction of the second transmission portion 152-2, and is preferably used for lateral installation in an FF vehicle or RR vehicle. That is, the second transmission portion 152-2 is composed mainly of a single-pinion type second planetary gear set 154, a double-pinion type third planetary gear set 156 and a single-pinion type fourth planetary gear set 158, wherein the first rotary element RM1 is composed of the sun gear S2 of the second planetary gear set 154, the carrier CA3 of the third planetary gear set 156 and the sun gear S4 of the fourth planetary gear set 158 connected to each other, the second rotary element RM2 is composed of the carrier CA2 of the second planetary gear set 154 and the ring gear R3 of the third planetary gear set 156 connected to each other, the third rotary element RM3 is composed of the ring gear R2 of the second planetary gear set 154, and the carrier CA4 of the fourth planetary gear set 158 connected to each other, the fourth rotary element RM4 is composed of the ring gear R4 of the fourth planetary gear set 158, and the fifth rotary element RM5 is composed of the sun gear S3 of the third planetary gear set 156. Also, an output gear 26 is provided instead of the above-described output shaft 27, and the fourth rotary element RM4 (Ring gear R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 35 and FIG. 36.

In this case, as shown in FIG. 87 (*b*), eight forward gear stages from the first gear stage [1st] to the eighth gear stage [8th] and one reverse gear stage [Rev1] are established in accordance with the same operation table as that in FIG. 35(*b*). Also, the transmission ratios of the respective gear stages are appropriately determined by the respective gear ratios ρ1 through ρ4 of the first planetary gear set 12, the second planetary gear set 154, the third planetary gear set 156 and the fourth planetary gear set 158, wherein if, for example, ρ1 is 0.430, ρ2 is 0.312, ρ3 is 0.433 and ρ4 is 0.314, the collinear chart as that in FIG. 36 can be obtained as shown in FIG. 88, and the same transmission ratios as those in FIG. 35(*b*) can be obtained as shown in FIG. 87(*b*). Also, actions and effects similar to those of the embodiment shown in FIG. 35 and FIG. 36, that is, actions and effects similar to those of the embodiment of FIG. 1 and FIG. 2 can be obtained. Further, as shown in FIG. 87(*b*) and FIG. 88, the automatic transmission 150-2 for vehicle may be composed so that, as shown in FIG. 35(*b*) and FIG. 36, the fourth clutch C4 and the third brake B3 are engaged with each other, the first rotary element RM1 is rotated integral with the input shaft 24, and the third rotary element RM3 is brought to a stationary state, wherein the fourth rotary element RM4 is reversed at a rotation speed [Rev2] and the second reverse gear stage [Rev2] can be established in addition to the first reverse gear stage [Rev1].

Figures 89A, 89B:
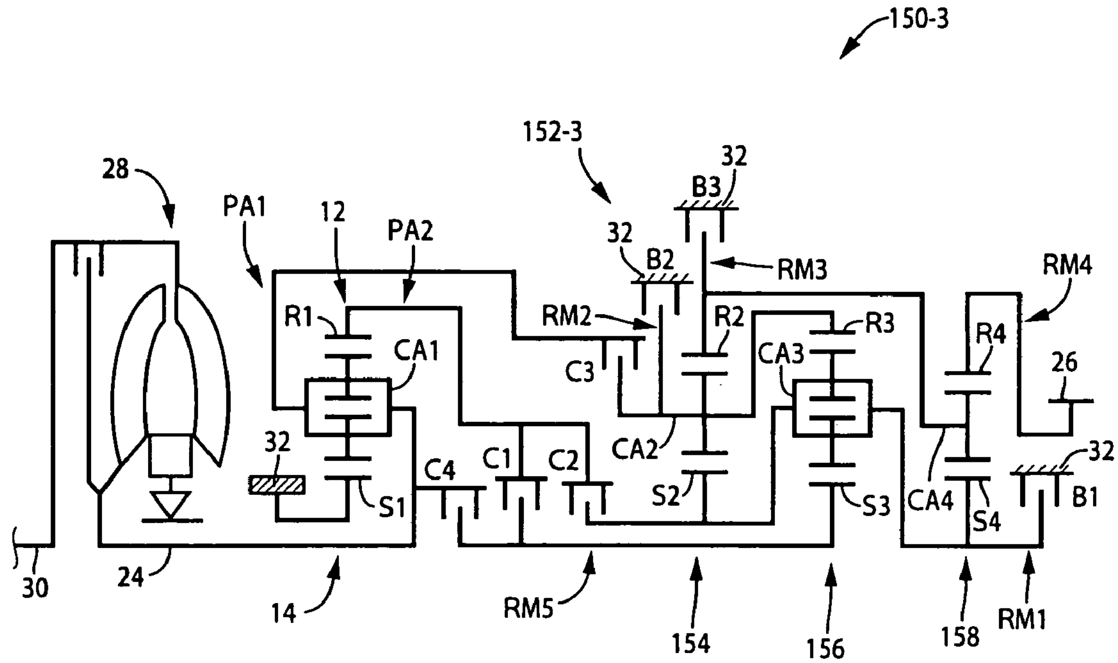
FIGS. 89(*a*) and 89(*b*) are views illustrating further another embodiment of the invention, in which a case is shown where the fourth clutch C4 differs in the arrangement position thereof in comparison with the embodiment in FIG. 87, and corresponding to FIG. 87.
Figure 90:
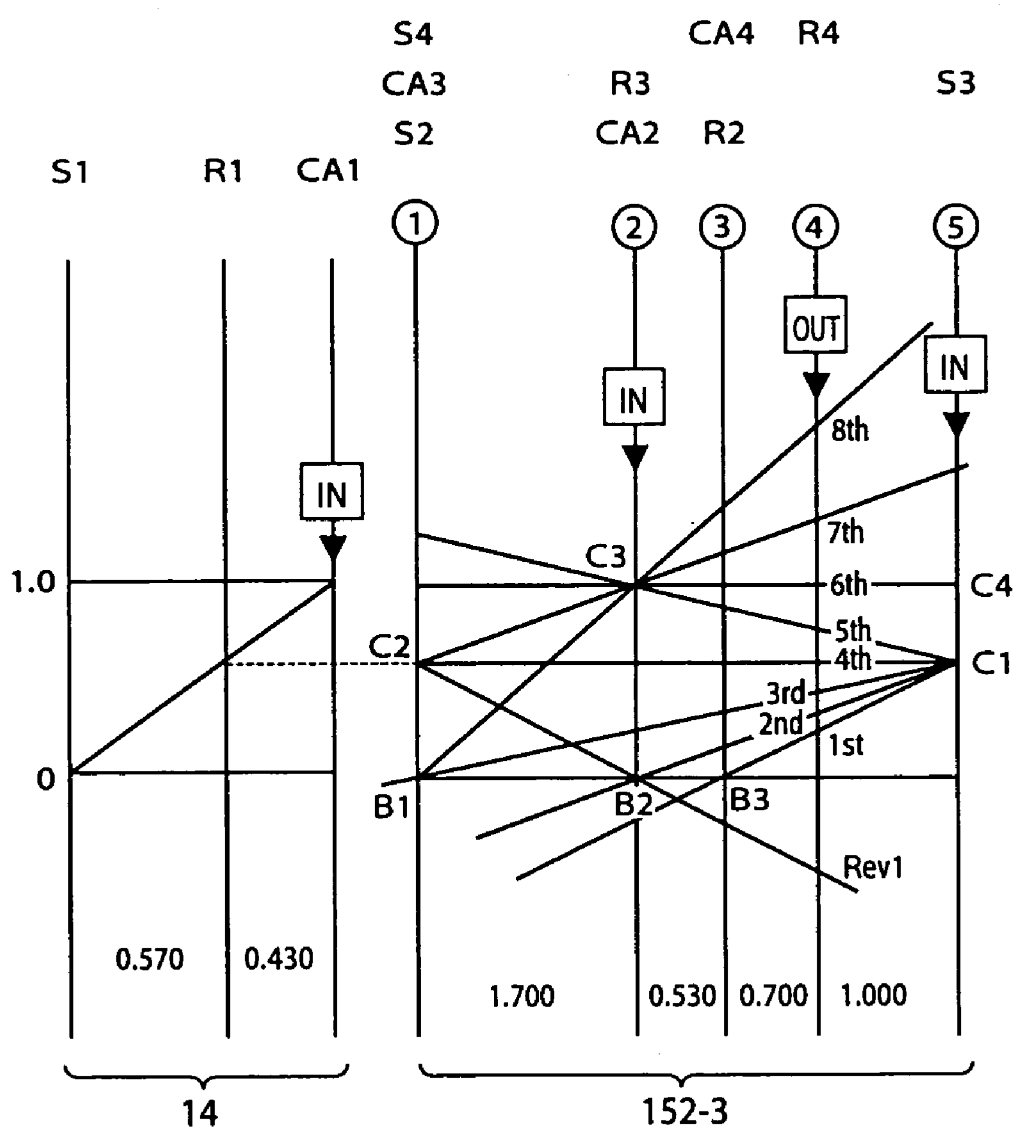
FIG. 90 is a collinear chart of the embodiment in FIG. 89.

FIG. 89 through FIG. 90 show one embodiment according to the first through the fifth aspects, the twentieth aspect, the fifty-first aspect, and the fifty-third through the fifty-fifth aspects of the invention. FIG. 89 is a view corresponding to FIG. 1 described above, and FIG. 90 is a view corresponding to FIG. 2 described above. An automatic transmission 150-3 for vehicle differs from the automatic transmission 150-2 for vehicle, which is shown in FIG. 87 and FIG. 88 in that the fifth rotary element RM5 (Sun gear S3) of the second transmission portion 152-3 is selectively connected via the fourth clutch C4 to the input shaft 24, that is, the first intermediate output path PA1. However, as shown in FIG. 89(*b*), eight forward gear stages from the first gear stage [1st) to the eighth gear stage [8th] and one reverse gear stage [Rev1] are established in accordance with the same operation table (excluding the second reverse gear stage [Rev2]) as that in FIG. 87(*b*), and the same collinear chart (excluding the second reverse gear stage [Rev2]) as that in FIG. 88 can be obtained as shown in FIG. 90, wherein similar actions and effects can be brought about.

Figures 91A, 91B:
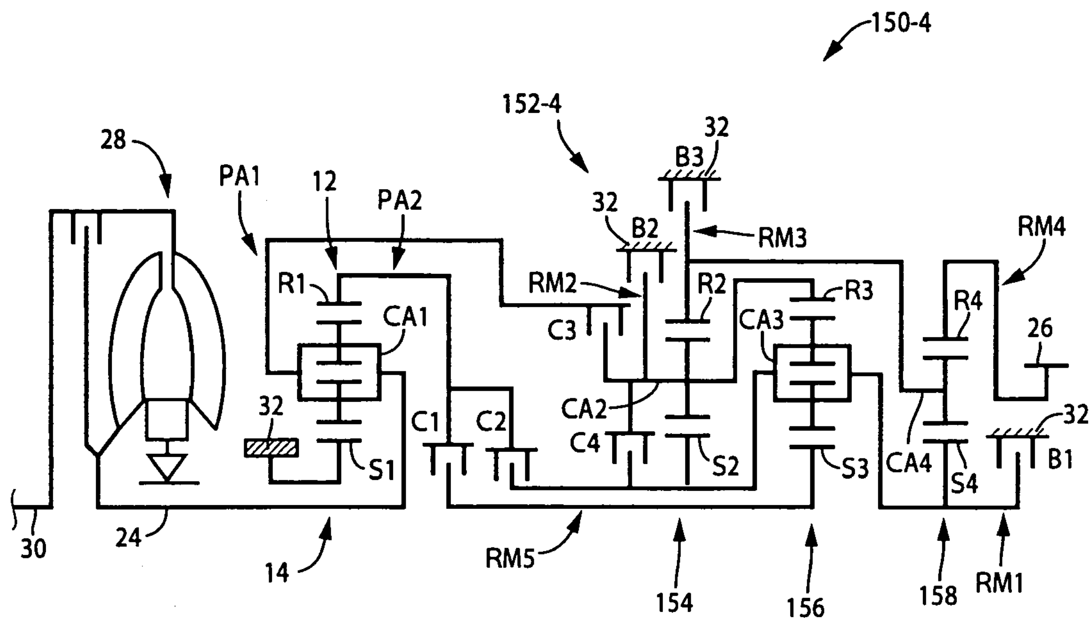
FIG. 91 is a view illustrating further another embodiment of the invention, in which a case is shown where the fourth clutch C4 differs in the arrangement position thereof in comparison with the embodiment in FIG. 87, and corresponding to FIG. 87.
Figure 92:
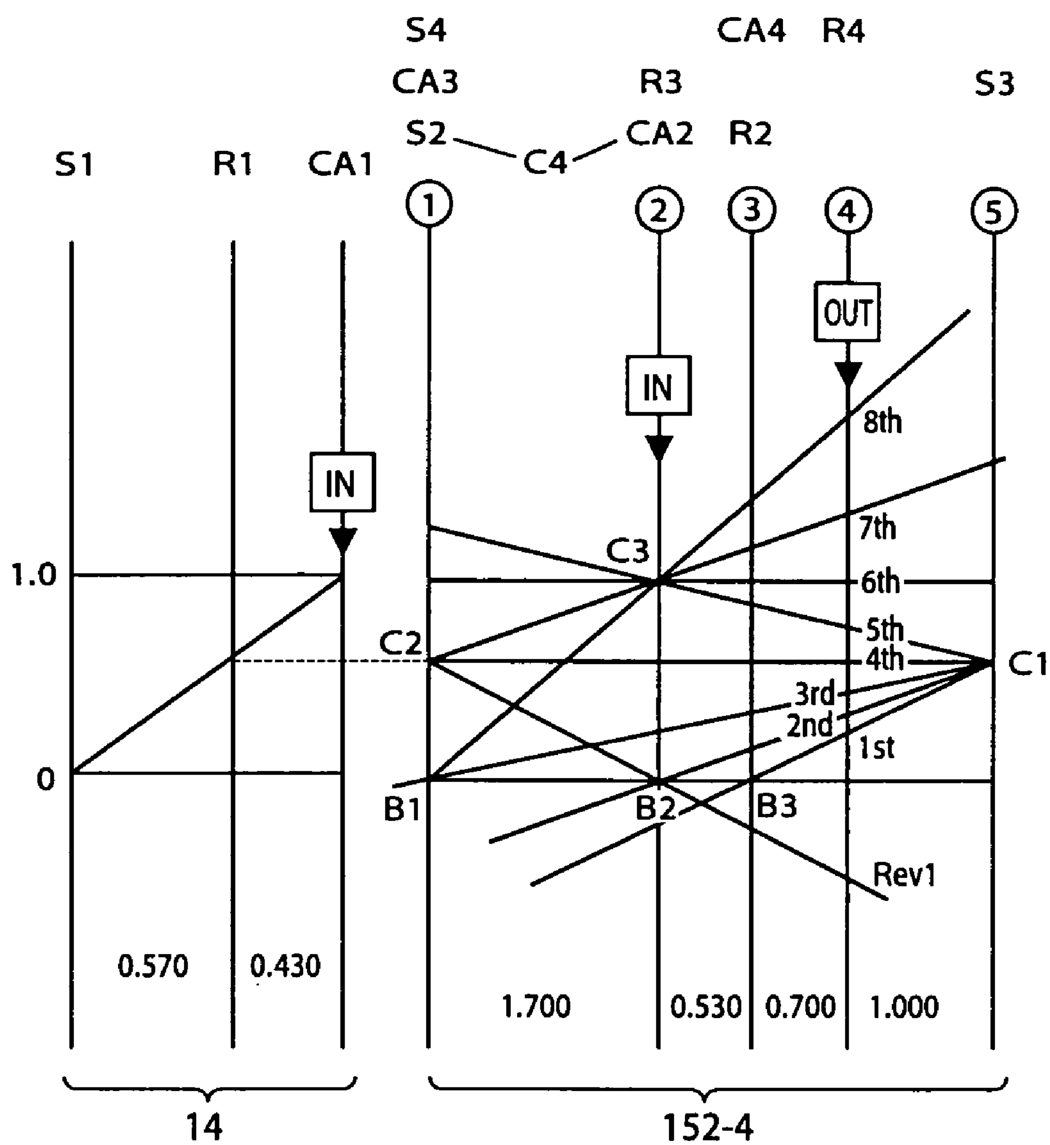
FIG. 92 is a collinear chart of the embodiment in FIG. 91.

FIG. 91 through FIG. 92 show one embodiment according to the first through the fourth aspects, the sixth aspect, the twentieth aspect, and the fifty-second through the fifty-fifth aspects of the invention. FIG. 91 is a view corresponding to FIG. 1 described above, and FIG. 92 is a view corresponding to FIG. 2 described above. An automatic transmission 150-4 for vehicle differs from the automatic transmission 150-2 for vehicle, which is shown in FIG. 87 and FIG. 88 in that the first rotary element RM1 (Sun gear S2, carrier CA3 and sun gear S4) of the second transmission portion 152-4 and the second rotary element RM2 (Carrier CA2 and ring gear R3) thereof are selectively connected integral with each other via the fourth clutch CA4. However, as shown in FIG. 91(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 87(*b*), and the same collinear chart (excluding the second reverse gear stage [Rev2]) as that in FIG. 88 can be obtained as shown in FIG. 92, wherein similar actions and effects can be brought about.

Figures 93A, 93B:
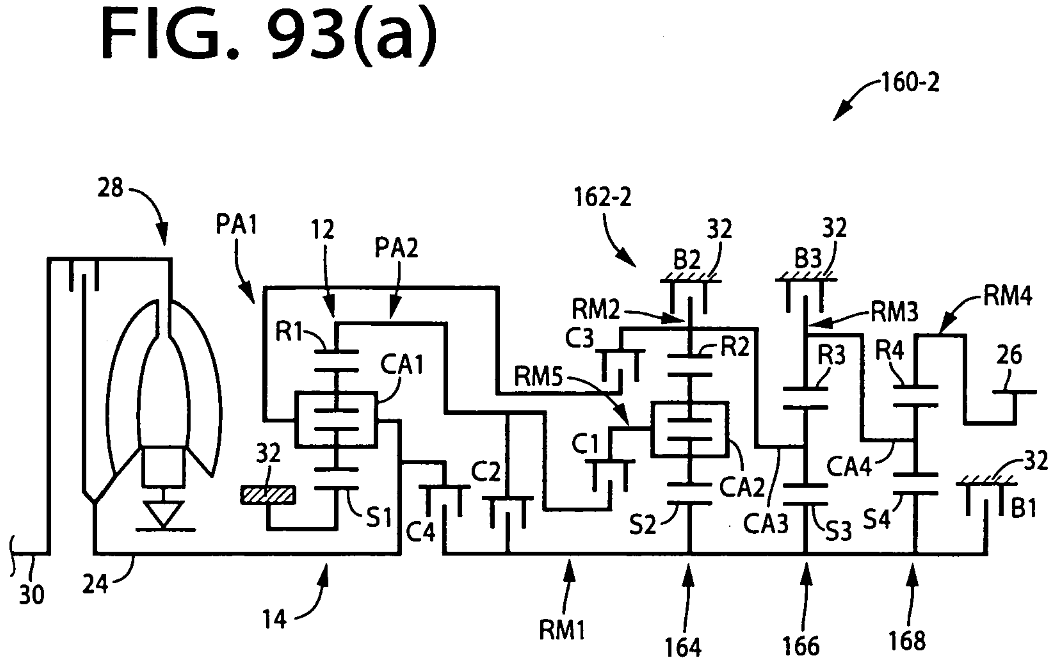
FIGS. 93(*a*) and 93(*b*) are views illustrating still another embodiment of the invention, in which a case is shown where the second transmission portion differs in the construction thereof in comparison with the embodiment in FIG. 35, and corresponding to FIG. 35.
Figure 94:
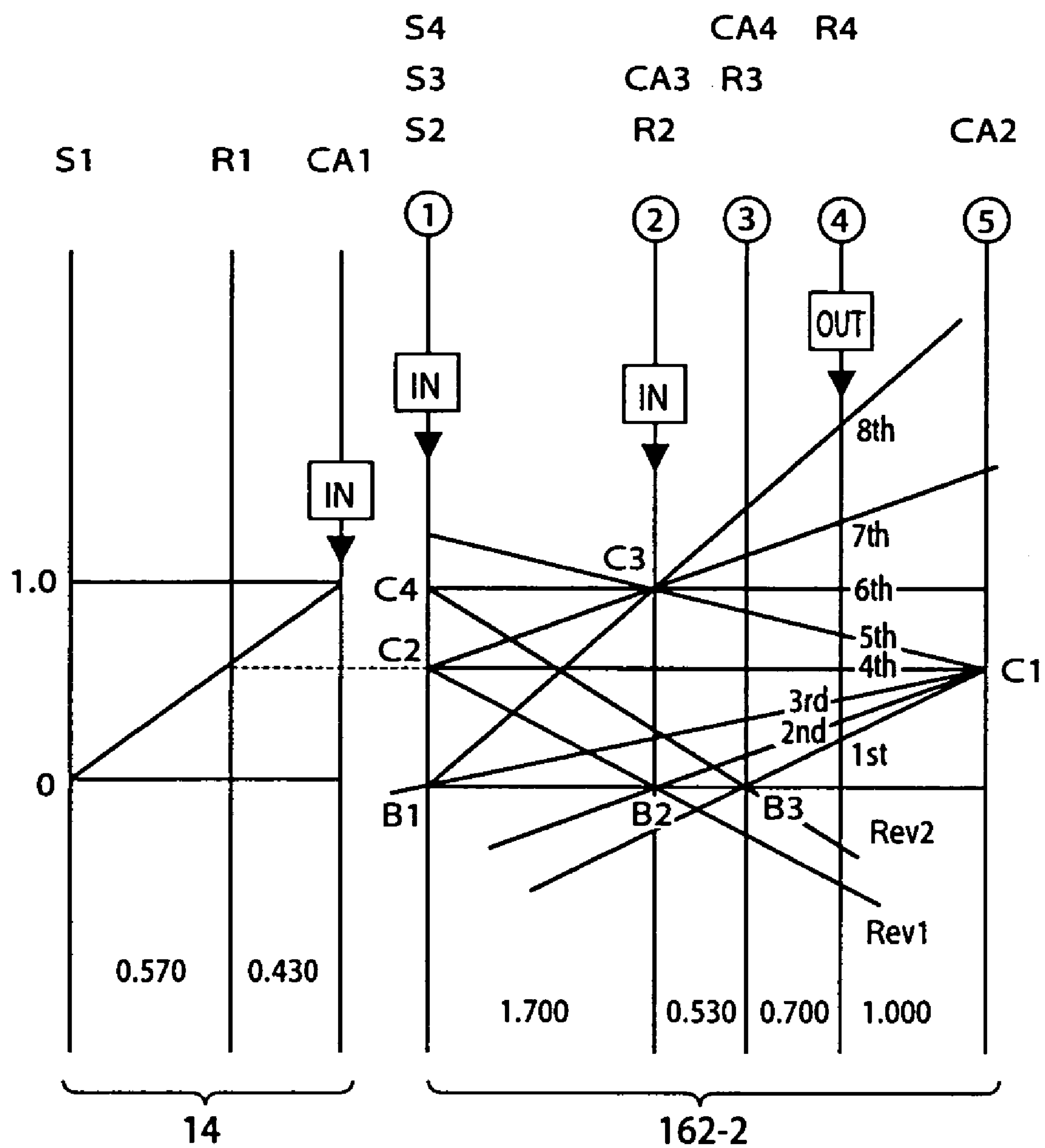
FIG. 94 is a collinear chart of the embodiment in FIG. 93.

FIG. 93 through FIG. 94 show one embodiment according to the first through the fifth aspects, the twenty-first aspect, the fifty-first aspect, and the fifty-third through the fifty-fifth aspects of the invention. FIG. 93 is a view corresponding to FIG. 1 described above, and FIG. 94 is a view corresponding to FIG. 2 described above. An automatic transmission 160-2 for vehicle differs from the automatic transmission 70-2 for vehicle, which is shown in FIG. 35 and FIG. 36 in the construction of the second transmission portion 162-2, and is preferably used for lateral installation in an FF vehicle or RR vehicle. That is, the second transmission portion 162-2 is composed mainly of a double-pinion type second planetary gear set 164, a single-pinion type third planetary gear set 166 and a single-pinion type fourth planetary gear set 168, wherein the first rotary element RM1 is composed of the sun gear S2 of the second planetary gear set 164, the sun gear S3 of the third planetary gear set 166 and the sun gear S4 of the fourth planetary gear set 168 connected to each other, the second rotary element RM2 is composed of the ring gear R2 of the second planetary gear set 164 and the carrier CA3 of the third planetary gear set 166 connected to each other, the third rotary element RM3 is composed of the ring gear R3 of the third planetary gear set 166 and the carrier CA4 of the fourth planetary gear set 168 connected to each other, the fourth rotary element RM4 is composed of the ring gear R4 of the fourth planetary gear set 168, and the fifth rotary element RM5 is composed of the carrier CA2 of the second planetary gear set 164. Also, an output gear 26 is provided instead of the above-described output shaft 27, and the fourth rotary element RM4 (Ring gear R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 35 and FIG. 36.

In this case, as shown in FIG. 93(*b*), eight forward gear stages from the first gear stage [1st] to the eighth gear stage [8th] and one reverse gear stage [Rev1] are established in accordance with the same operation table as that in FIG. 35(*b*). Also, the transmission ratios of the respective gear stages are appropriately determined by the respective gear ratios ρ1 through ρ4 of the first planetary gear set 12, the second planetary gear set 164, the third planetary gear set 166 and the fourth planetary gear set 168, wherein if, for example, ρ1 is 0.430, ρ2 is 0.567, ρ3 is 0.312 and ρ4 is 0.314, the collinear chart as that in FIG. 36 can be obtained as shown in FIG. 94, and the same transmission ratios as those in FIG. 35(*b*) can be obtained as shown in FIG. 93(*b*). Also, actions and effects similar to those of the embodiment shown in FIG. 35 and FIG. 36, that is, actions and effects similar to those of the embodiment of FIG. 1 and FIG. 2 can be obtained. Further, as shown in FIG. 93(*b*) and FIG. 94, the automatic transmission 160-2 for vehicle may be composed so that, as shown in FIG. 35(*b*) and FIG. 36, the fourth clutch C4 and the third brake B3 are engaged with each other, the first rotary element RM1 is rotated integral with the input shaft 24, and the third rotary element RM3 is brought to a stationary state, wherein the fourth rotary element RM4 is reversed at a rotation speed [Rev2] and the second reverse gear stage [Rev2] can be established in addition to the first reverse gear stage [Rev1].

Figures 95A, 95B:
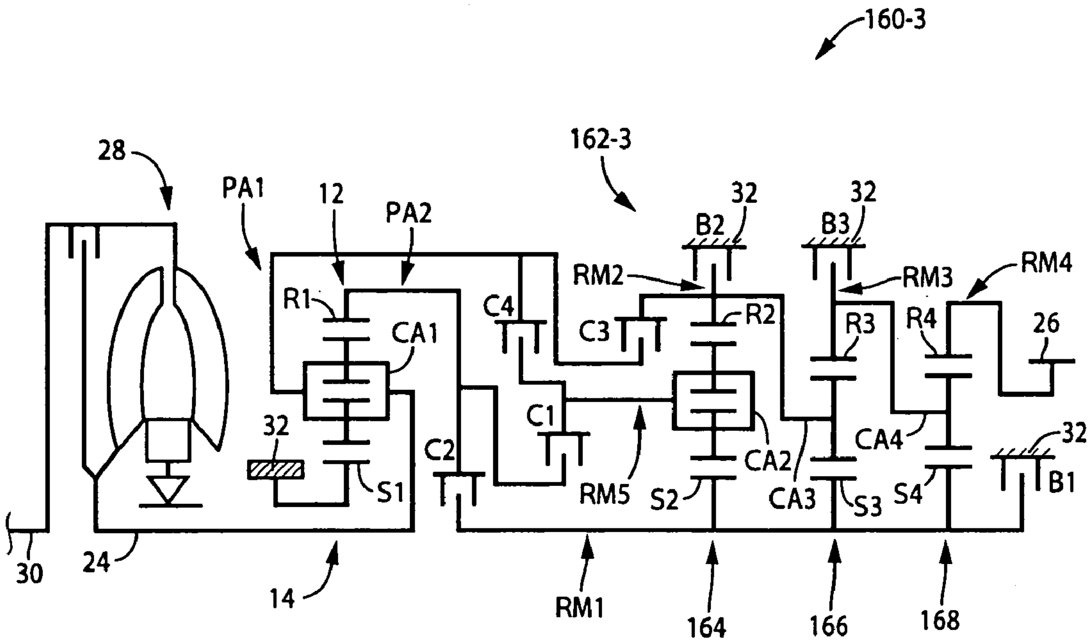
FIGS. 95(*a*) and 95(*b*) are views illustrating further another embodiment of the invention, in which a case is shown where the fourth clutch C4 differs in the arrangement position thereof in comparison with the embodiment in FIG. 93, and corresponding to FIG. 93.
Figure 96:
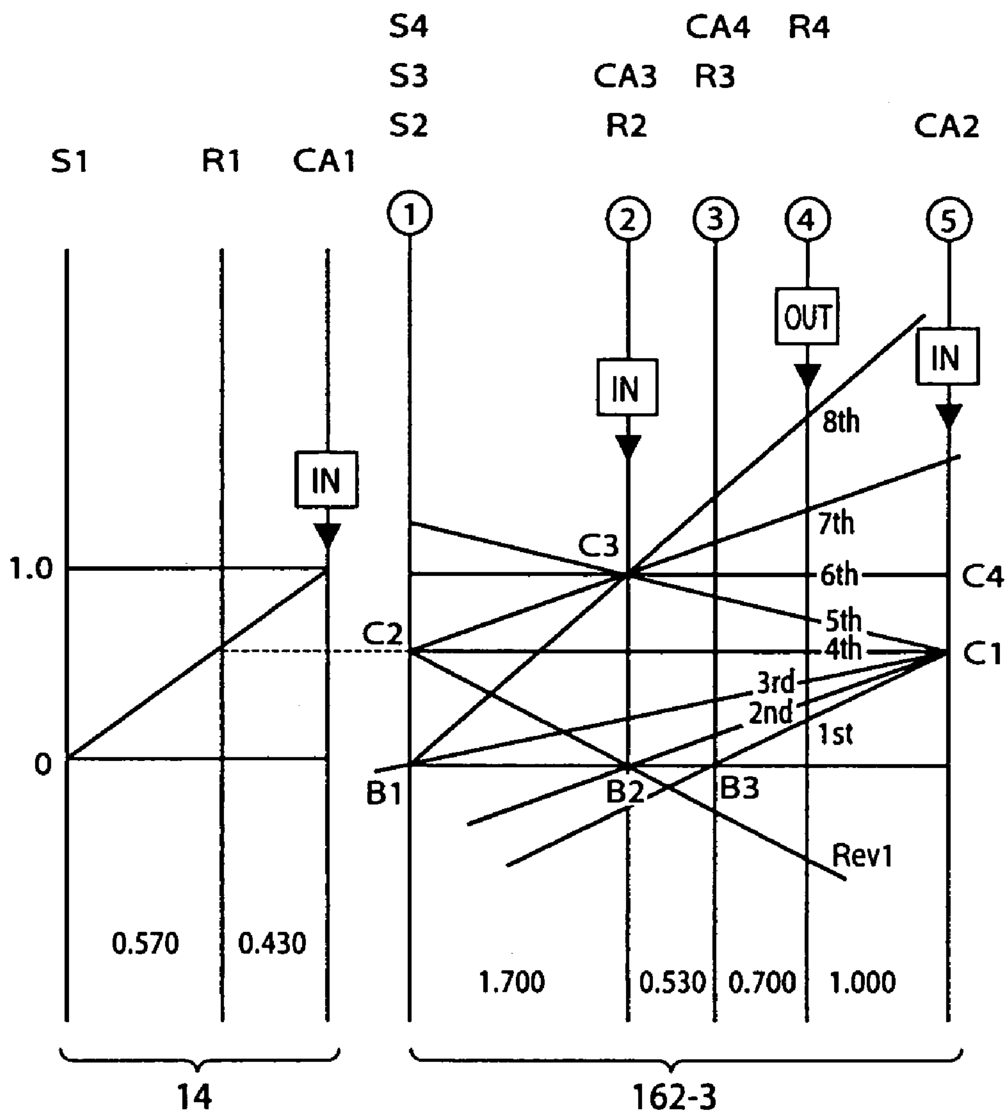
FIG. 96 is a collinear chart of the embodiment in FIG. 95.

FIG. 95 through FIG. 96 show one embodiment according to the first through the fifth aspects, the twenty-first aspect, the fifty-first aspect, and the fifty-third through the fifty-fifth aspects of the invention. FIG. 95 is a view corresponding to FIG. 1 described above, and FIG. 96 is a view corresponding to FIG. 2 described above. An automatic transmission 160-3 for vehicle differs from the automatic transmission 160-2 for vehicle, which is shown in FIG. 93 and FIG. 94 in that the fifth rotary element RM5 (Carrier CA2) of the second transmission portion 162-3 is selectively connected via the fourth clutch C4 to the input shaft 24, that is, the first intermediate output path PA1. However, as shown in FIG. 95(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 93(*b*), and the same collinear chart (excluding the second reverse gear stage [Rev2]) as that in FIG. 94 can be obtained as shown in FIG. 96, wherein similar actions and effects can be brought about.

Figures 97A, 97B:
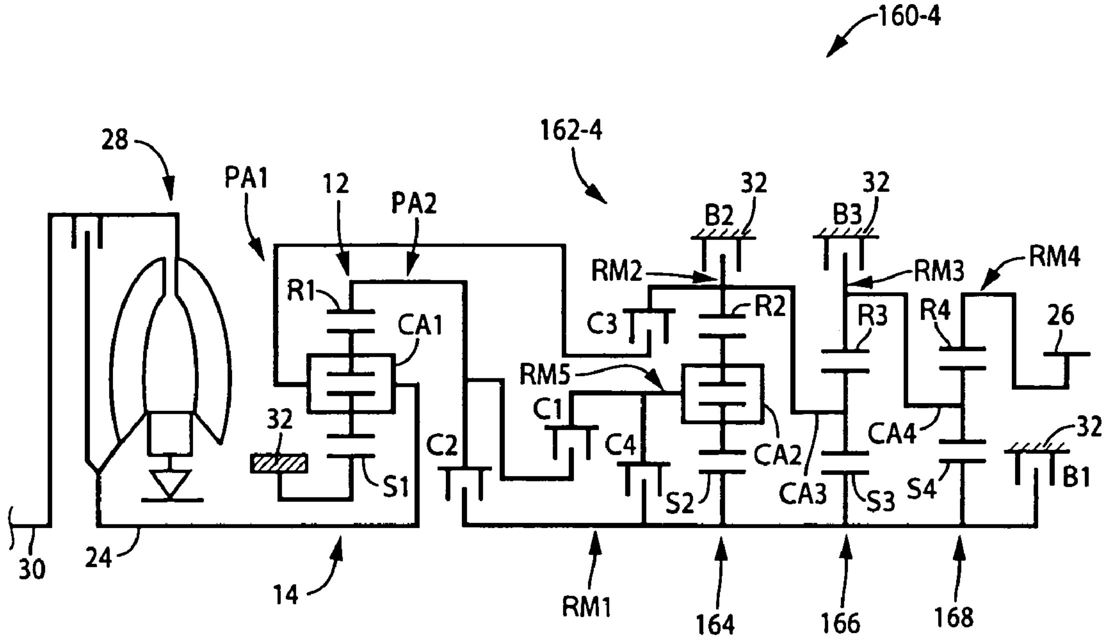
FIGS. 97(*a*) and 97(*b*) are views illustrating further another embodiment of the invention, in which a case is shown where the fourth clutch C4 differs in the arrangement position thereof in comparison with the embodiment in FIG. 93, and corresponding to FIG. 93.
Figure 98:
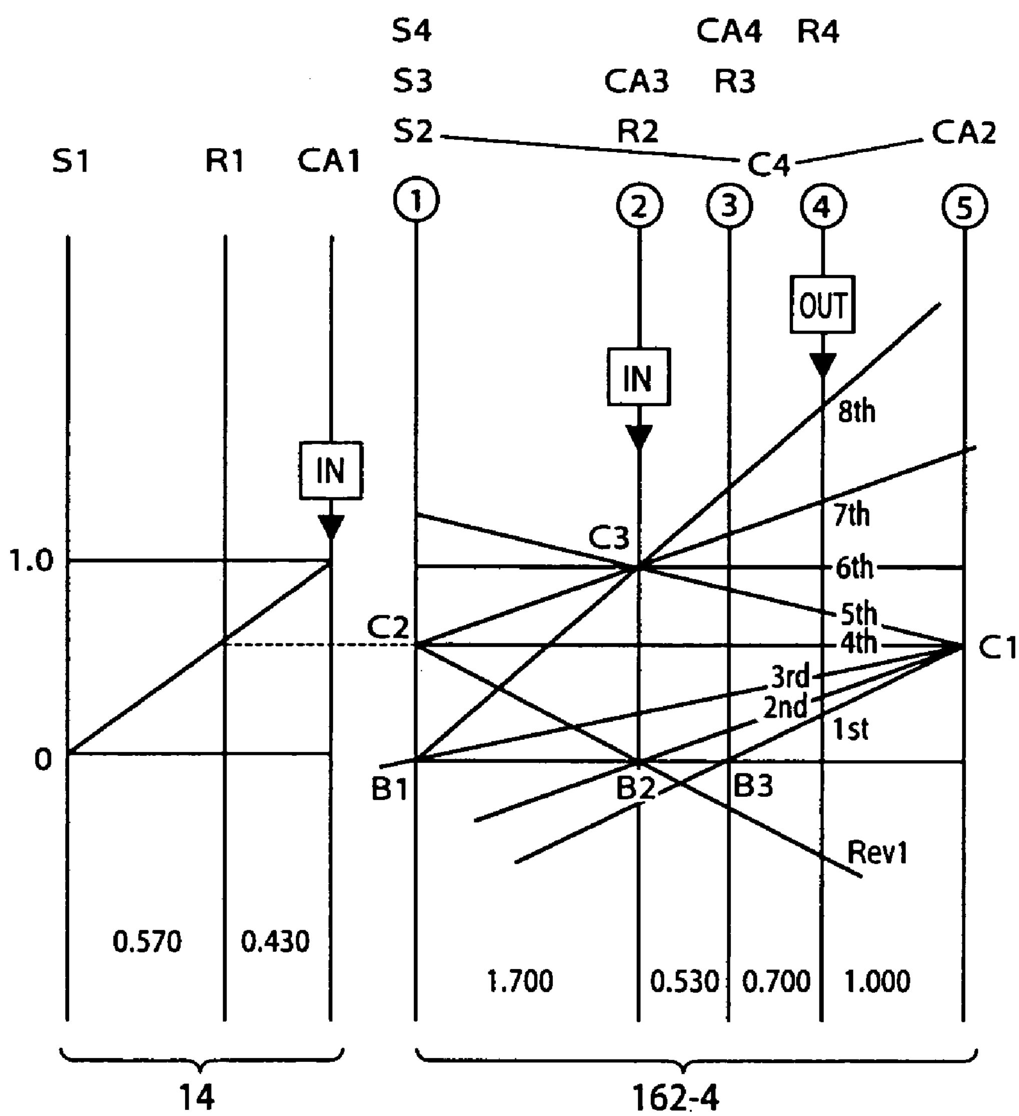
FIG. 98 is a collinear chart of the embodiment in FIG. 97.

FIG. 97 through FIG. 98 show one embodiment according to the first through the fourth aspects, the sixth aspect, the twenty-first aspect, and the fifty-second through the fifty-fifth aspects of the invention. FIG. 97 is a view corresponding to FIG. 1 described above, and FIG. 98 is a view corresponding to FIG. 2 described above. An automatic transmission 160-4 for vehicle differs from the automatic transmission 160-2 for vehicle, which is shown in FIG. 93 and FIG. 94 in that the first rotary element RM1 (Sun gears S2, S3 and S4) of the second transmission portion 162-4 and the fifth rotary element RM5 (Carrier CA2) thereof are selectively connected integral with each other via the fourth clutch C4. However, as shown in FIG. 97(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 93(*b*), and the same collinear chart (excluding the second reverse gear stage [Rev2]) as that in FIG. 94 can be obtained as shown in FIG. 98, wherein similar actions and effects can be brought about.

Figures 99A, 99B:
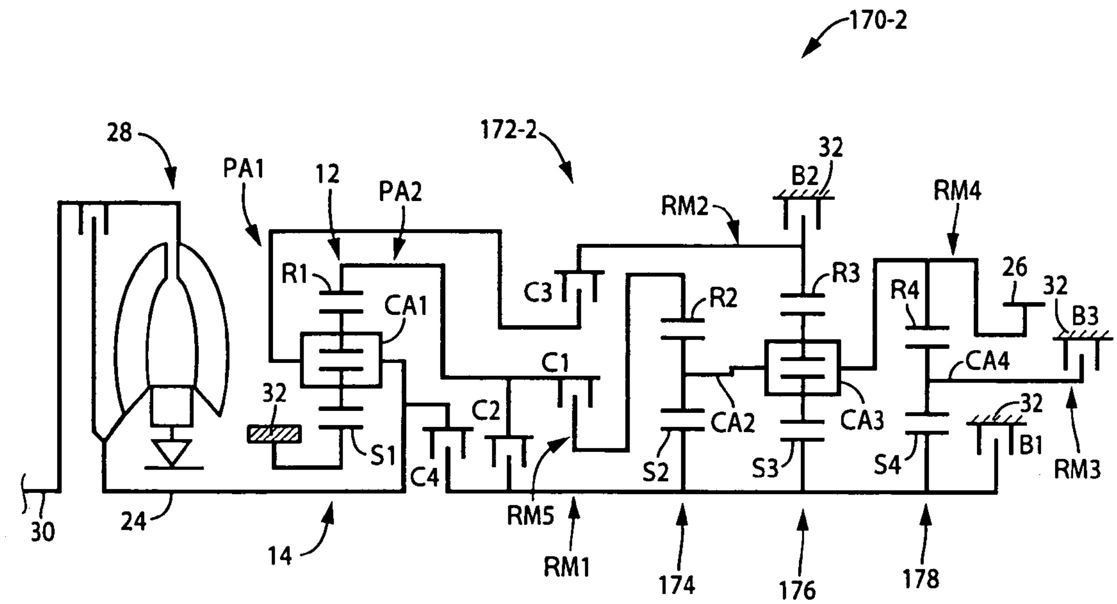
FIGS. 99(*a*) and 99(*b*) are views illustrating still another embodiment of the invention, in which a case is shown where the second transmission portion differs in the construction thereof in comparison with the embodiment in FIG. 35, and corresponding to FIG. 35.
Figure 100:
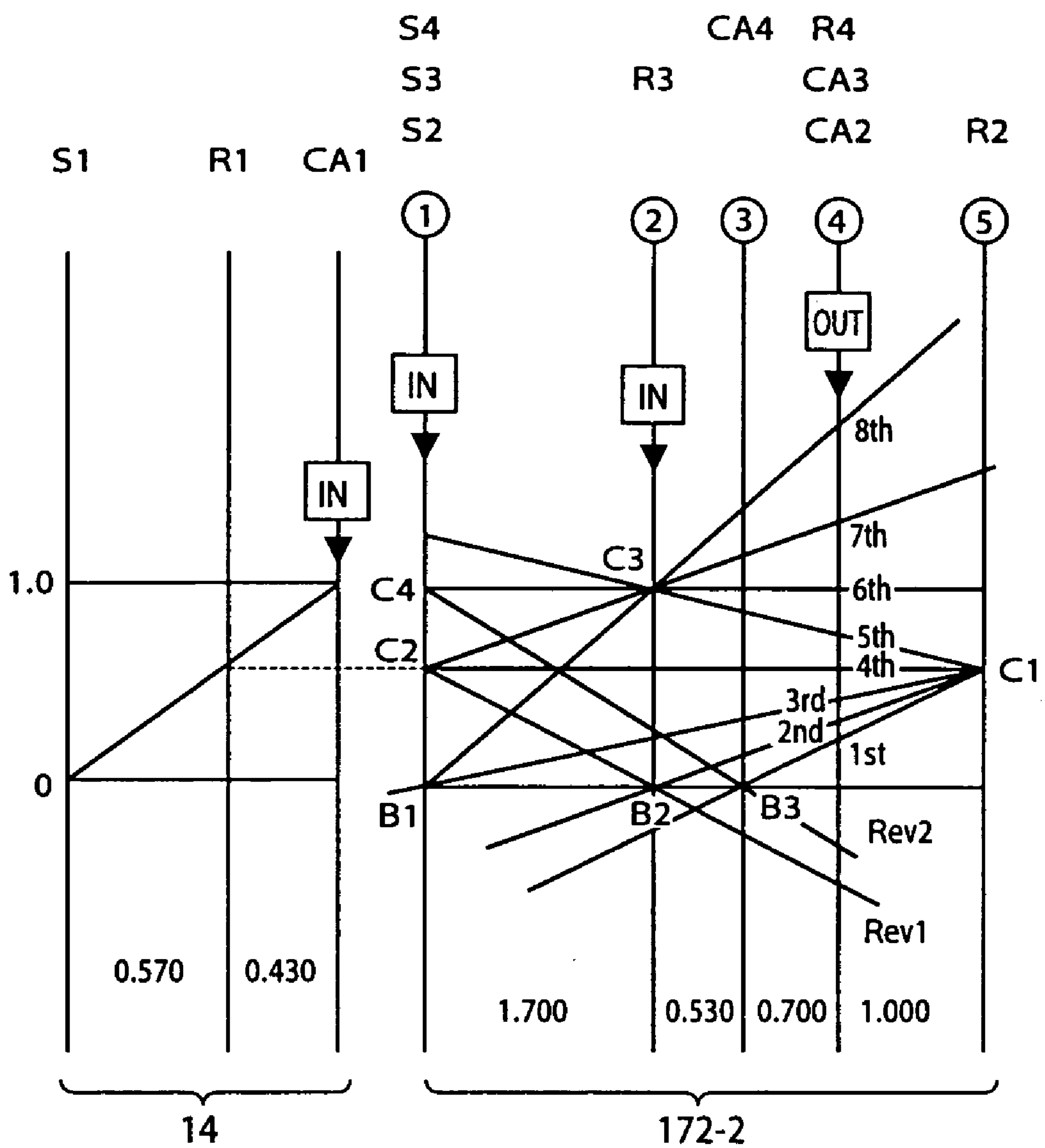
FIG. 100 is a collinear chart of the embodiment in FIG. 99.

FIG. 99 through FIG. 100 show one embodiment according to the first through the fifth aspects, the twenty-second aspect, the fifty-first aspect, and the fifty-third through the fifty-fifth aspects of the invention. FIG. 99 is a view corresponding to FIG. 1 described above, and FIG. 100 is a view corresponding to FIG. 2 described above. An automatic transmission 170-2 for vehicle differs from the automatic transmission 70-2 for vehicle, which is shown in FIG. 35 and FIG. 36 in the construction of the second transmission portion 172-2, and is preferably used for lateral installation in an FF vehicle or RR vehicle. That is, the second transmission portion 172-2 is composed mainly of a single-pinion type second planetary gear set 174, a double-pinion type third planetary gear set 176 and a single-pinion type fourth planetary gear set 178, wherein the first rotary element RM1 is composed of the sun gear S2 of the second planetary gear set 174, the sun gear S3 of the third planetary gear set 176 and the sun gear S4 of the fourth planetary gear set 178 connected to each other, the second rotary element RM2 is composed of the ring gear R3 of the third planetary gear set 176, the third rotary element RM3 is composed of the carrier CA4 of the fourth planetary gear set 178, the fourth rotary element RM4 is composed of the carrier CA2 of the second planetary gear set 174, the carrier CA3 of the third planetary gear set 176 and the ring gear R4 of the fourth planetary gear set 178 connected to each other, and the fifth rotary element RM5 is composed of the ring gear R2 of the second planetary gear set 174. Also, an output gear 26 is provided instead of the above-described output shaft 27, and the fourth rotary element RM4 (Carriers CA2 and CA3 and ring gear R4) is connected integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1, and the ring gear R1 of the first planetary gear set 12, that is, the second intermediate output path PA2 are the same as those of the embodiment of FIG. 35 and FIG. 36.

In this case, as shown in FIG. 99(*b*), eight forward gear stages from the first gear stage [1st] to the eighth gear stage [8th] and one reverse gear stage [Rev1] are established in accordance with the same operation table as that in FIG.

35(*b*). Also, the transmission ratios of the respective gear stages are appropriately determined by the respective gear ratios ρ1 through ρ4 of the first planetary gear set 12, the second planetary gear set 174, the third planetary gear set 176 and the fourth planetary gear set 178, wherein if, for example, ρ1 is 0.430, ρ2 is 0.341, ρ3 is 0.420 and ρ4 is 0.314, the collinear chart as that in FIG. 36 can be obtained as shown in FIG. 100, and the same transmission ratios as those in FIG. 35(*b*) can be obtained as shown in FIG. 99(*b*). Also, actions and effects similar to those of the embodiment shown in FIG. 35 and FIG. 36, that is, actions and effects similar to those of the embodiment of FIG. 1 and FIG. 2 can be obtained. Further, as shown in FIG. 99(*b*) and FIG. 100, the automatic transmission 170-2 for vehicle may be composed so that, as shown in FIG. 35(*b*) and FIG. 36, the fourth clutch C4 and the third brake B3 are engaged with each other, the first rotary element RM1 is rotated integral with the input shaft 24, and the third rotary element RM3 is brought to a stationary state, wherein the fourth rotary element RM4 is reversed at a rotation speed [Rev2] and the second reverse gear stage [Rev2] can be established in addition to the first reverse gear stage [Rev1].

Figures 101A, 101B:
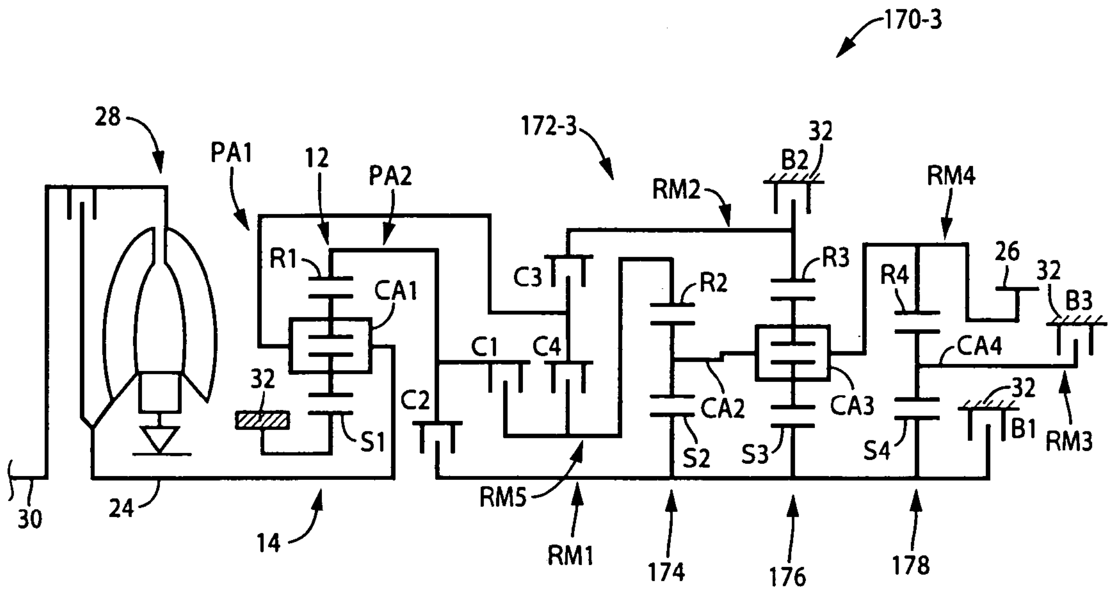
FIGS. 101(*a*) and 101(*b*) are views illustrating further another embodiment of the invention, in which a case is shown where the fourth clutch C4 differs in the arrangement position thereof in comparison with the embodiment in FIG. 99, and corresponding to FIG. 99.
Figure 102:
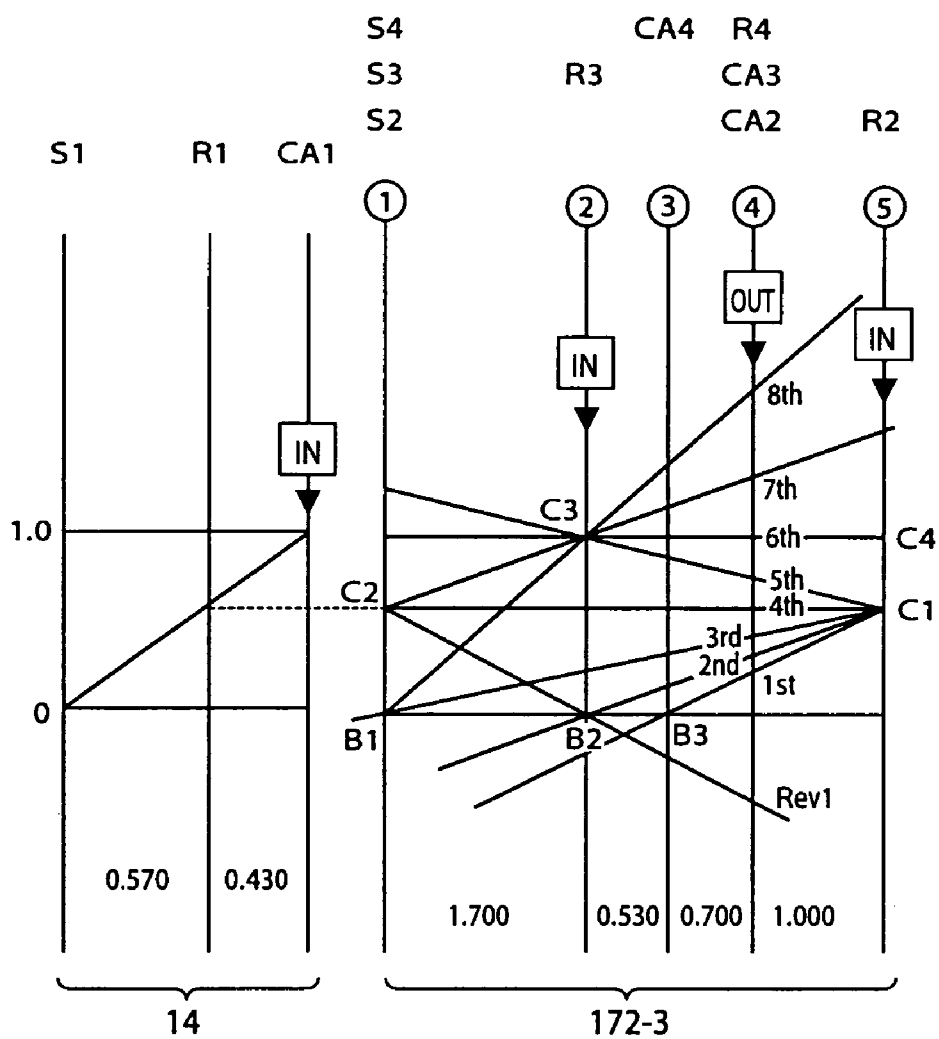
FIG. 102 is a collinear chart of the embodiment in FIG. 101.

FIG. 101 through FIG. 102 show one embodiment according to the first through the fifth aspects, the twenty-second aspect, the fifty-first aspect, and the fifty-third through the fifty-fifth aspects of the invention. FIG. 101 is a view corresponding to FIG. 1 described above, and FIG. 102 is a view corresponding to FIG. 2 described above. An automatic transmission 170-3 for vehicle differs from the automatic transmission 170-2 for vehicle, which is shown in FIG. 99 and FIG. 100 in that the fifth rotary element RM5 (Ring gear R2) of the second transmission portion 172-3 is selectively connected via the fourth clutch C4 to the input shaft 24, that is, the first intermediate output path PA1. However, as shown in FIG. 101(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 99(*b*), and the same collinear chart (excluding the second reverse gear stage [Rev2]) as that in FIG. 100 can be obtained as shown in FIG. 102, wherein similar actions and effects can be brought about.

Figures 103A, 103B:
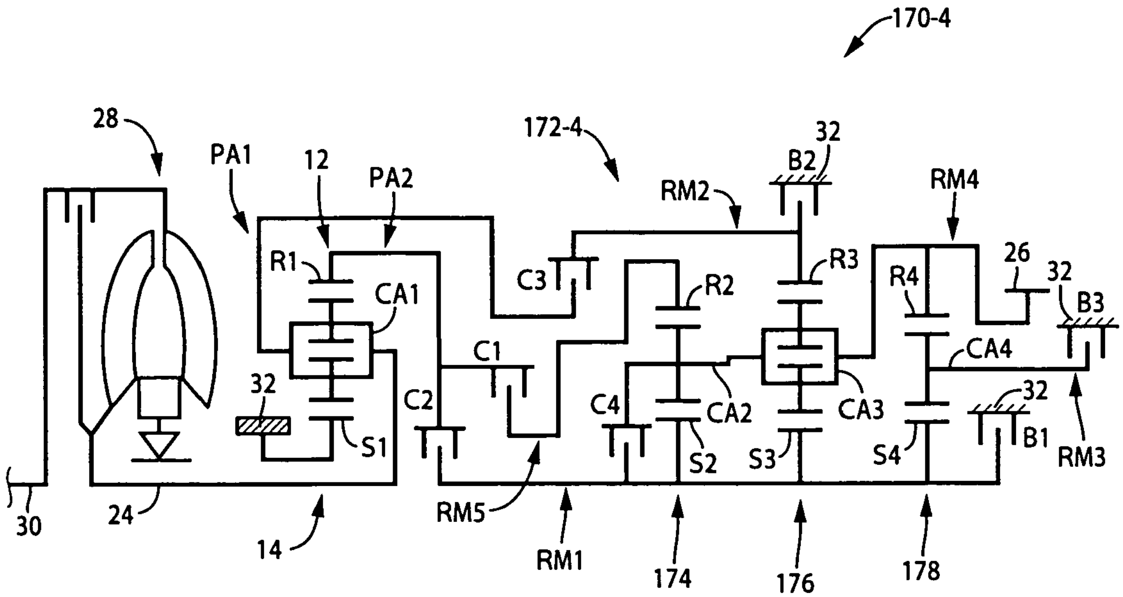
FIGS. 103(*a*) and 103(*b*) are views illustrating further another embodiment of the invention, in which a case is shown where the fourth clutch C4 differs in the arrangement position thereof in comparison with the embodiment in FIG. 99, and corresponding to FIG. 99.
Figure 104:
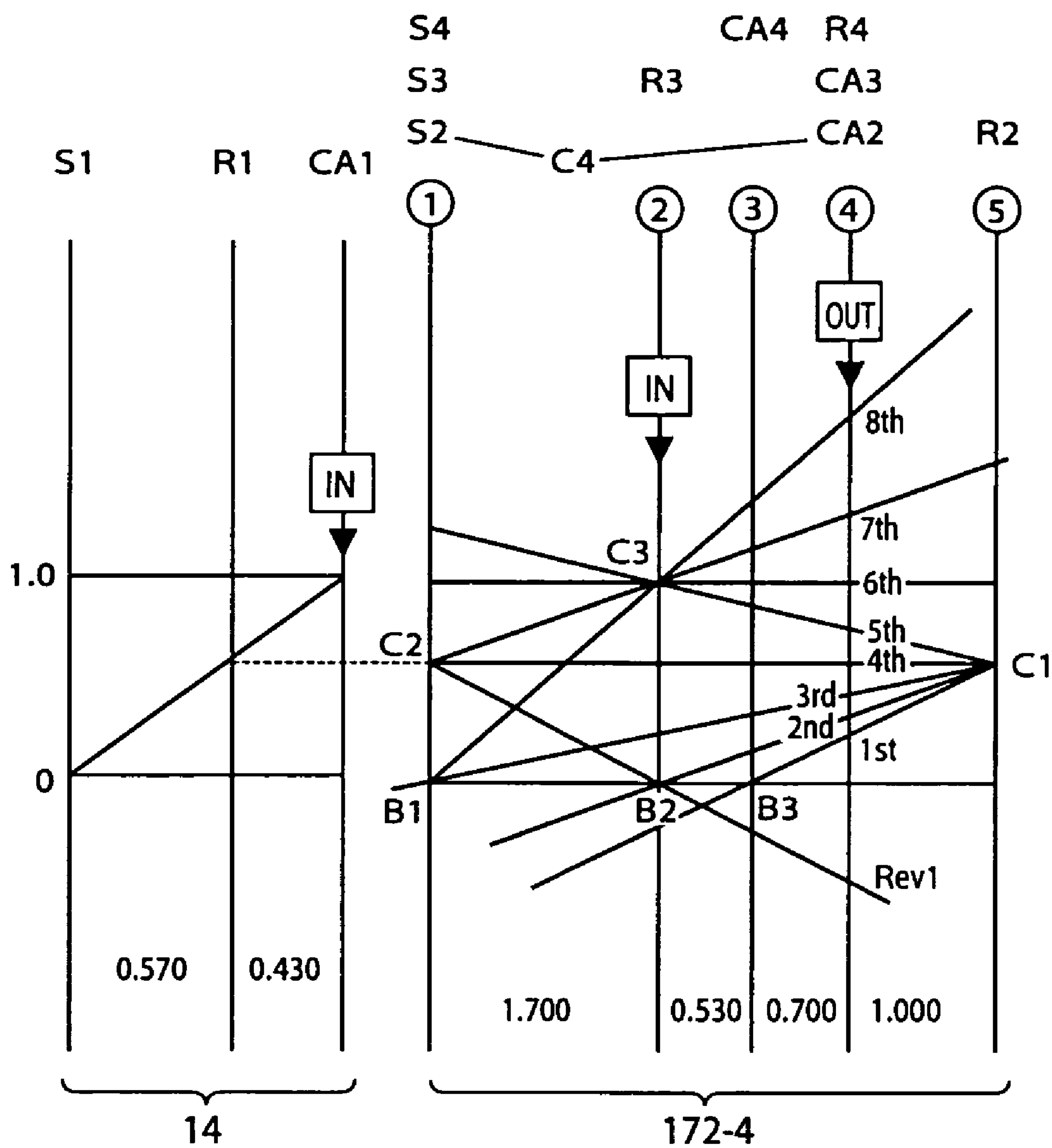
FIG. 104 is a collinear chart of the embodiment in FIG. 103.

FIG. 103 through FIG. 104 show one embodiment according to the first through the fourth aspects, the sixth aspect, the twenty-second aspect, and the fifty-second through the fifty-fifth aspects of the invention. FIG. 103 is a view corresponding to FIG. 1 described above, and FIG. 104 is a view corresponding to FIG. 2 described above. An automatic transmission 170-4 for vehicle differs from the automatic transmission 170-2 for vehicle, which is shown in FIG. 99 and FIG. 100 in that the first rotary element RM1 (Sun gears S2, S3 and S4) of the second transmission portion 172-4 and the fourth rotary element RM4 (Carriers CA2 and CA3 and ring gear R4) thereof are selectively connected integral with each other via the fourth clutch C4. However, as shown in FIG. 103(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 99(*b*), and the same collinear chart (excluding the second reverse gear stage [Rev2]) as that in FIG. 100 can be obtained as shown in FIG. 104, wherein similar actions and effects can be brought about.

Figures 106, 107:
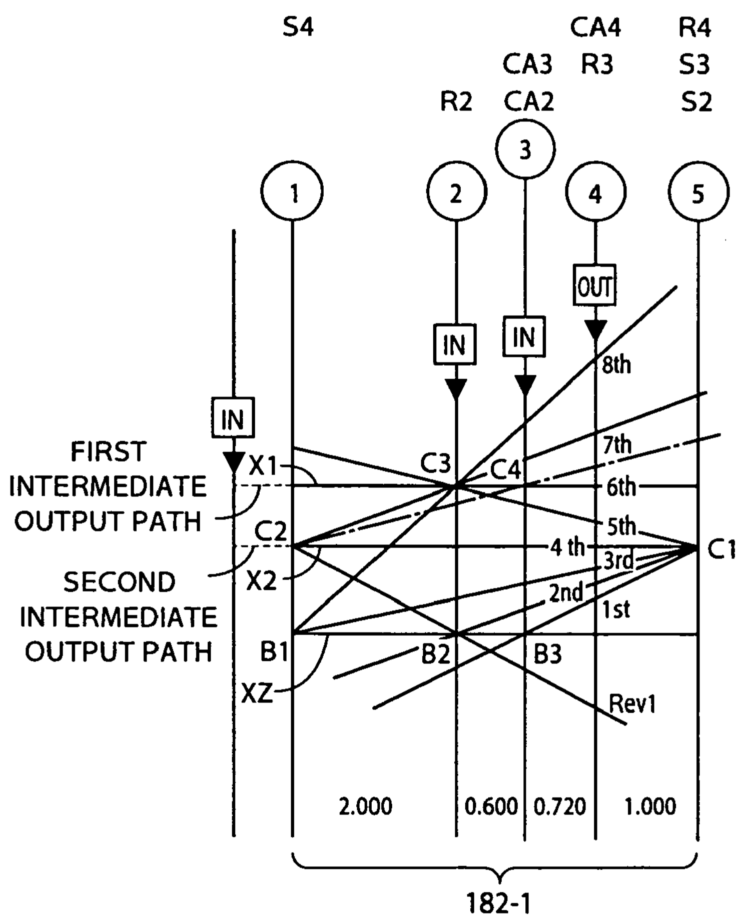
FIG. 106 is an operation table of the embodiment in FIG. 105.
FIG. 107 is a collinear chart of the embodiment in FIG. 105.

FIG. 105 through FIG. 106 show one embodiment according to the first through the fifth aspects, the seventh and eighth aspects, the fifty-first, the fifth-third and the fifty-fourth aspects of the invention. FIG. 105 is a view showing the main points of an automatic transmission 180-1 for vehicle, and FIG. 106 is an operation table describing engagement elements and transmission ratios when a plurality of gear stages are established. FIG. 107 is a collinear chart showing rotation speeds of rotary elements in the respective gear stages. The automatic transmission 180-1 for vehicle differs from the automatic transmission 10-1 for vehicle, which is shown in FIG. 2 in the construction of the first transmission portion 181. That is, with respect to the embodiment shown in FIG. 1 and FIG. 2, a major point of difference with the present embodiment exists in that the first transmission portion 14 is replaced by the first transmission portion 181. Hereinafter, a description is given of the major point of difference.

In FIG. 105, in the casing 32 attached to the vehicle body, the automatic transmission 180-1 for vehicle includes a first transmission portion 181 composed mainly of the first axis 33 and second axis 34, which are rotatably fixed in the casing 32 and are disposed in parallel to each other, and two sets of counter-gear pairs, operating as two sets of power transmission members, which are the first counter-gear pair CG1 and second counter-gear pair CG2, and a second transmission portion 182-1 composed mainly of three sets of planetary gear sets of the second planetary gear set 184, third planetary gear set 186 and fourth planetary gear set 188. A torque converter 28 with a lock-up clutch, which operates as a fluid transmission unit, an input shaft 24 connected to the torque converter 28, a drive gear CG1A which is one of the above-described first counter-gear pair CG1 fixed on the first axis 33 connected to the input shaft 24, and a drive gear CG2A which is one of the above-described second counter-gear pair CG2 are coaxially disposed on the first axis 33c that is the rotation center of the above-described first axis 33. Also, a driven gear CG1B which is the other one of the first counter-gear CG1 rotatably equipped about the second axis 34, a driven gear CG2B which is the other one of the second counter-gear pair CG2, the second planetary gear set 184, the third planetary gear set 186, the fourth planetary gear set 188 and output gear 26 are coaxially disposed on the second axis center 34c that is the rotation center of the second axis 34. The automatic transmission 180-1 for vehicle is preferably employed as an automatic transmission for an FF or RR vehicle in which the automatic transmission is installed particularly in a lateral state, and the same automatic transmission 180-1 is provided between a drive source, for example, an engine 8, and drive wheels (not illustrated), and transmits an output of the engine 8 to the drive wheels. In the present embodiment, the above-described input shaft 24 and output gear 26 correspond to the input member and output member while the casing 32 corresponds to the non-rotating member. In addition, the input shaft 24 is substantially identical to the first axis 33 connected to the input shaft 24, wherein it can be the that rotation of the first axis 33 is rotation of the input shaft 24 being the input member. Further, the torque converter 28 is operatively connected to the crankshaft 30 of the engine 8 and outputs power of the engine 8 to the input shaft 24. That is, the input shaft 24 connected to the turbine shaft being the output side rotary member of the torque converter 28 is driven and rotated about the first axis center 33c by the engine 8, wherein the turbine shaft of the torque converter 28 is equivalent to the input member. Also, the output gear 26 is meshed with a large-diameter gear of the differential gear set 36, and the same output gear 26 drives and rotates the left and right drive wheels via the differential gear set 36, etc.

Here, a detailed description is given of arrangement (layout) of respective units which compose the automatic transmission 180-1 for vehicle by reference to FIG. 105. The first transmission portion 181 is disposed at a further position from the engine 8 than the second planetary gear set 184, third planetary gear set 186 and fourth planetary gear set 188 on the first axis center 33_c_ and the second axis center 34_c_ so that the first counter-gear pair CG1 and the second counter-gear pair CG2 are juxtaposed adjacent to each other as much as possible. That is, the torque converter 28, input shaft 24 and the second transmission portion 182-1 are disposed at the engine 8 side from the first transmission portion 181 on the first axis center 33_c_ or the second axis center 34_c_. Also, for example, the axis length in which the input shaft 24 and the first axis 33 are added to each other is made substantially equivalent to the axis length of the second axis 34. The first counter-gear pair CG1 that composes the first transmission portion 181 is disposed at the engine 8 side from the second counter-gear pair CG2, and in the second transmission portion 182-1, the second planetary gear set 184, the third planetary gear set 186, the fourth planetary gear set 188 and the output gear 26 are disposed on the second axis center 34_c_ in the order from the first transmission portion 181 toward the engine 8 side. The arrangement of the second transmission portion 182-1 is made such that the left and right sides thereof are made inverse when facing the drawing, with respect to the second transmission portion 22-1 of the automatic transmission 10-1 for vehicle. That is, the second planetary gear set 184 corresponds to the second planetary gear set 16, the third planetary gear set 186 corresponds to the third planetary gear set 18, and the fourth planetary gear set 188 corresponds to the fourth planetary gear set 20, respectively. In addition, respective engagement units from the clutches C1 through C4 are disposed between the second transmission portion 182-1 and the first counter-gear pair CG1 or the second counter-gear pair CG2. Thereby, the dimension of the automatic transmission 180-1 for vehicle in the axial direction can be shortened in comparison with a case where four planetary gear sets are mounted on one axis center, wherein lateral installation thereof is made advantageous in an FF vehicle or RR vehicle. Further, since, in the present embodiment, clutches C1 through C4 and brakes B1 and B2 are concentrated at the axis end of the second axis center 34_c_ or outside the casing 12, hydraulic circuits can be easily routed. In particular, linkage between the clutches C1 through C4 and the first transmission portion 181 can be facilitated. Also, since it becomes possible to dispose an oil pump and valve bodies of hydraulic control circuits of the hydraulic friction-engagement unit in empty spacing on the first axis center 33_c_ between the first transmission portion 181 and the torque converter 28, connections of oil paths of the automatic transmission 180-1 for vehicle are facilitated. Also, for example, a mechanical oil pump driven and rotated by the engine 8 is disposed in the vicinity of the engine 8, operation of the mechanical oil pump can be made advantageous (That is, efficiency is improved).

The first counter-gear pair CG1 and second counter-gear pair CG2, which compose the above-described first transmission portion 181 are provided with the first drive gear CG1A and the second drive gear CG2A on the first axis 33 and the first driven gear CG1B and the second driven gear CG2B on the second axis center 34_c_ as in the counter gear of the parallel axis type transmission that has been publicly known, and are composed of gear pairs in which the first drive gear CG1A and the first driven gear CGLB, and the second drive gear CG2A and the second driven gear CG2B are, respectively, engaged with each other at all times. And, these two sets of the counter-gear pairs function as two sets of power transmission members for transmitting rotation of the input member, which is inputted to the first axis 33, to the second transmission portion 182-1 on the second axis center 34*c*. The first intermediate output path M1 which is a drive-driven path is composed of the first counter-gear pair CG1, and the second intermediate output path M2 which is also a drive-driven path is composed of the second counter-gear pair CG2. The first transmission portion 181 transmits two different rotations to the second transmission portion 182-1 through the first intermediate output path M1 and second intermediate output path M2 thereof, which are the two output paths. The first drive gear CG1A and the second drive gear CG2A are, respectively, the first drive member for composing the first intermediate output path M1 at the first axis 33 side and the second drive member for composing the second intermediate output path M2 at the first axis 33 side, and the first driven gear CG1B and the second driven gear CG2B are, respectively, the first driven member for composing the first intermediate output path Ml at the second axis center 34*c* side and the second driven member for composing the second intermediate output path M2 at the second axis center 34*c* side. For example, where it is assumed that the speed reduction ratio (=the rotation speed of the drive gear CG1A/the rotation speed of the driven gear CG1B) of the first counter-gear pair CG1 is [1.000] or so, and the speed reduction ratio (=the rotation speed of the drive gear CG2A/the rotation speed of the driven gear CG2B) of the second counter-gear pair CG2 is [1.745] or so, the first transmission portion 181 transmits (outputs) rotation of the input shaft 24, that is, the first axis 33 to the second transmission portion 182-1 by means of the above-described first intermediate output path M1 and the above-described second intermediate output path M2 which is rotated with its rotation speed reduced with respect to-the first intermediate output path M1. In the present embodiment, while the speed reduction ratio of the first counter-gear pair CG1 is [1.000] or so and the first intermediate output path M1 is rotated at the rotation speed of the input shaft 24, the first intermediate output path M1 may not be necessarily made into the rotation speed of the input shaft 24. The first intermediate output path M1 and the second intermediate output path M2, respectively, correspond to the first intermediate output path PA1 and second intermediate output path PA2 of the automatic transmission 10-1 for vehicle, which is described in FIG. 1 and FIG. 2.

On the other hand, the above-described second transmission portion 182-1 is composed mainly of a single-pinion type second planetary gear set 184, a double-pinion type third planetary gear set 186 and a single-pinion type fourth planetary gear set 188. The second transmission portion 182-1 has substantially the same construction as the second transmission portion 22-1 shown in FIG. 1 and FIG. 2, wherein the first rotary element RM1 is composed of the sun gear S4 of the fourth planetary gear set 188, the second rotary element RM2 is composed of the ring gear R2 of the second planetary gear set 184, the third rotary element RM3 is composed of the carrier CA2 of the second planetary gear set 184 and the carrier CA3 of the third planetary gear set 186 connected to each other, the fourth rotary element RM4 is composed of the ring gear R3 of the third planetary gear set 186 and the carrier CA4 of the fourth planetary gear set 188 connected to each other, and the fifth rotary element RM5 is composed of the sun gear S2 of the second planetary gear set 184, the sun gear S3 of the third planetary gear set 186 and the ring gear R4 of the fourth planetary gear set 188 connected to each other. In the present embodiment, the carriers CA2 and CA3 and sun gears S2 and S3 of the second planetary gear set 184 and the third planetary gear set 186 are, respectively, composed of the common members as in the second transmission portion 22-1 in FIG. 1 and FIG. 2, and a stepped pinion P3 (P2) having a minor-diameter portion and a major-diameter portion is rotatably disposed on the common carriers CA2 and CA3, wherein the minor-diameter portion is engaged with the ring gear R2 of the second planetary gear set 184, and the large-diameter portion is engaged with the common sun gears S2 and S3 and the second pinion of the third planetary gear set 186, that is, the outside pinion meshing with the ring gear R3.

And, the first rotary element RM1 (Sun gear S4) is selectively connected to the casing 32 by the first brake B1 and is brought to a stationary state. The second rotary element RM2 (Ring gear R2) is selectively connected to the casing 32 by the second brake B2 and is brought to a stationary state. The third rotary element RM3 (Carriers CA2 and CA3) is selectively connected to the casing 32 by the third brake-B3 and is brought to a stationary state. The fifth rotary element RM5 (Sun gears S2 and S3, and the ring gear R4) is selectively connected to the driven gear CG2B functioning as the second intermediate output path M2, which is the second intermediate output path M2, via the first clutch C1, and the first rotary element RM1 (Sun gear S4) is selectively connected to the driven gear CG2B via the second clutch C2, and the second rotary element RM2 (Ring gear R2) is selectively connected to the driven gear CG1B functioning as the first intermediate output path M1, which is the first intermediate output path M1, via the third clutch C3. The third rotary element RM3 (Carriers CA2 and CA3) is also selectively connected to the driven gear CG1B1 via the fourth clutch C4. The fourth rotary element RM4 (Ring gear R3 and carrier CA4) is connected integral with the above-described output gear 26 and outputs rotation.

FIG. 107 is a collinear chart capable of expressing rotation speeds of the respective rotary elements RM1 through RM5 of the second transmission portion 182-1 by means of straight lines, wherein the lower horizontal line XZ indicates a rotation speed [0], the upper horizontal line X1 indicates a rotation speed [Speed reduction ratio of 1/the first counter-gear pair CG2] at the second transmission portion 182-1 side of the first intermediate output path M1, that is, [1.0] in the present embodiment, which is the same rotation speed as that of the input shaft 24, and the horizontal line X2 therebetween indicates a rotation speed [Speed reduction ratio of 1/the second counter-gear pair CG2] at the second transmission portion 182-1 side of the second intermediate output path M2. Five vertical lines of the second transmission portion 182-1 indicate the first rotary element RM1 (Sun gear S4), the second rotary element RM2 (Ring gear R2), the third rotary element RM3 (Carriers CA2 and CA3), the fourth rotary element RM4 (Ring gear R3 and carrier CA4) and the fifth rotary element RM5 (Sun gears S2 and S3, and ring gear R4) in order from the left side. The respective interval therebetween is determined in response to the gear ratio ρ2 of the second planetary gear set 184, gear ratio ρ3 of the third planetary gear set 186 and gear ratio ρ4 of the fourth planetary gear set 188. The drawing shows a case where the gear ratio ρ2 is 0.349, ρ3 is 0.419 and ρ4 is 0.301. Where it is assumed that the speed reduction ratio of the first counter-gear pair CG1 is [1.000] and the speed reduction ratio of the second counter-gear pair CG2 is [1.745], the same collinear chart as that in FIG. 2 can be brought about.

Therefore, also in the present embodiment, by changing engagement and disengagement of the clutches C1 through C4 and brakes B1 through B3 in accordance with the same operation table as in FIG. 1(*b*), eight forward gear stages from the first gear stage [1st] to the eighth gear stage [8th] and one reverse gear stage [Rev1] are established as shown in FIG. 106. As shown with an alternate long and short dashed line in FIG. 107, where the second clutch C2 and the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 184, the third planetary gear set 186 and the fourth planetary gear set 188. For example, where the speed reduction ratio of the first counter-gear pair CG1 is [1.000], that of the second counter-gear pair CG2 is [1.745], and ρ2 is 0.349, ρ3 is 0.419 and ρ4 is 0.301, the same transmission ratios as in FIG. 1(*b*) can be obtained as shown in FIG. 106, and actions and effects similar to those of the embodiment shown in FIG. 1 and FIG. 2 can be brought about.

Also, in the present embodiment, since three sets of planetary gear sets are disposed on the second axis 34, it is possible to shorten the overall length, that is, the dimension in the axial direction, for example, in comparison with a case where four planetary gear sets are mounted on one axis, a multistage transmission capable of carrying out forward multistage transmission which can be preferably employed for lateral installation in an FF vehicle or RR vehicle.

Figure 108:
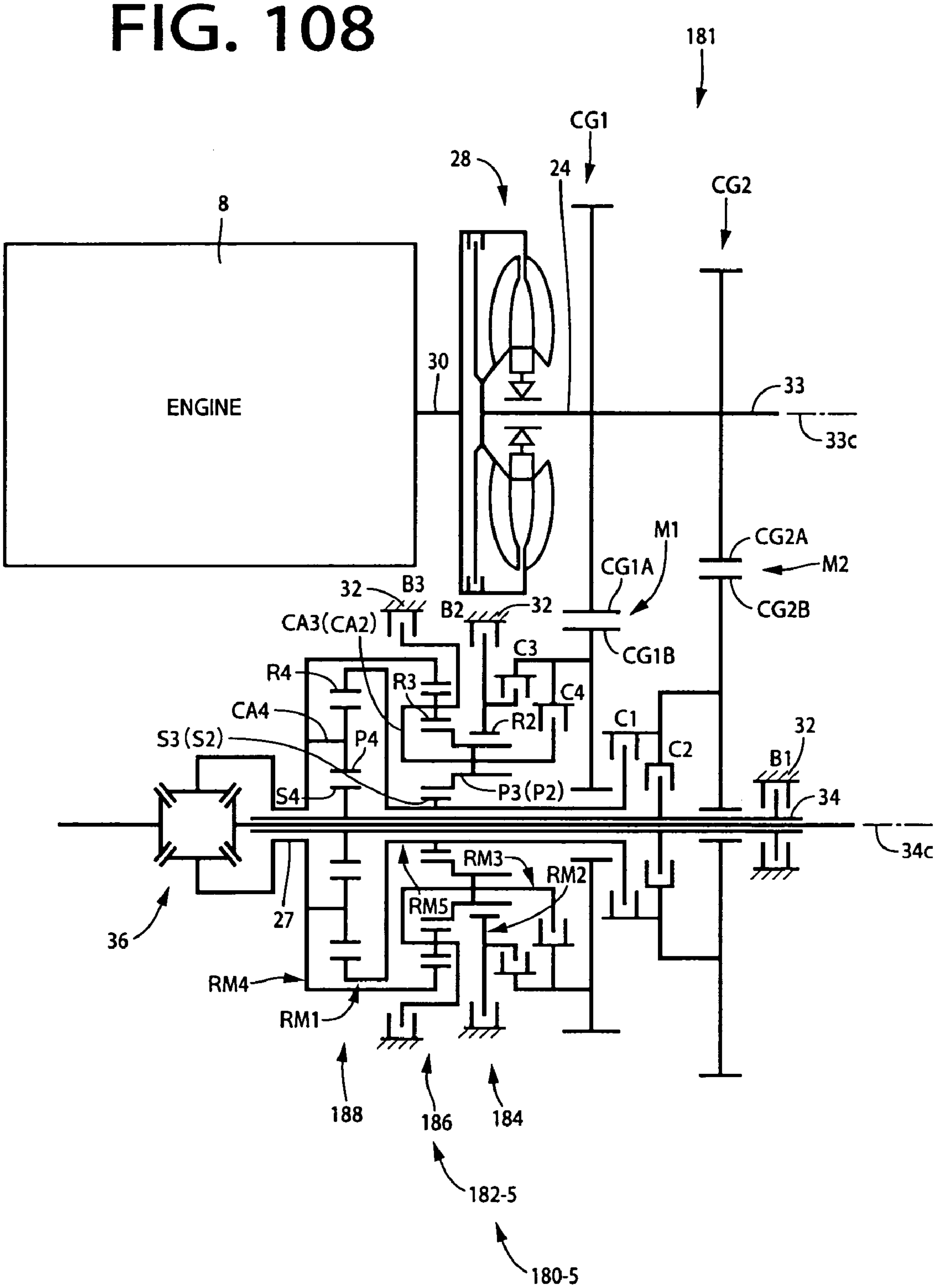
FIG. 108 is a view illustrating further another embodiment of the invention, in which a case is shown where the relative position between the first transmission portion and a torque converter differs in comparison with the embodiment in FIG. 105, and corresponding to FIG. 105.
Figures 109, 110:
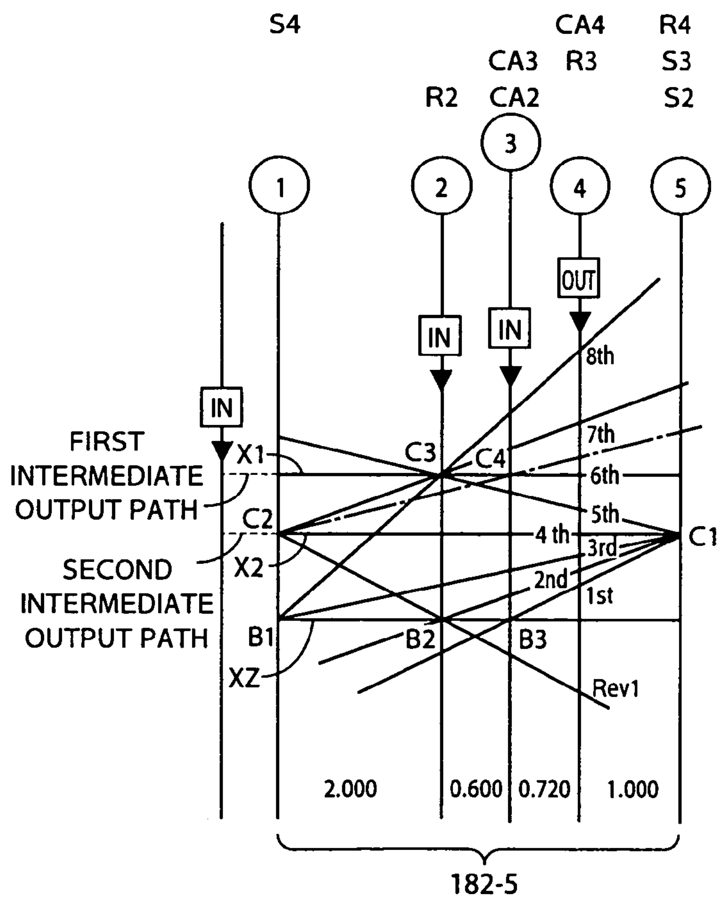
FIG. 109 is an operation table of the embodiment in FIG. 108.
FIG. 110 is a collinear chart of the embodiment in FIG. 108.

FIG. 108 through FIG. 110 show one embodiment according to the first through the fifth aspects, the seventh and the eighth aspects, the fifty-first aspect, the fifty-third aspect, and the fifty-fourth aspect of the invention. FIG. 108 is a view corresponding to FIG. 105 described above, FIG. 109 is a view corresponding to FIG. 106 described above, and FIG. 110 is a view corresponding to FIG. 107 described above. The automatic transmission 180-5 for vehicle differs from the automatic transmission 180-1 for vehicle, which is shown in FIG. 105 through FIG. 107, in the positional relationship (layout of) between the first transmission portion 181 and the torque converter 28 on the first axis center 32*c* and in the arrangement of the differential gear set 36. However, as shown in FIG. 109, eight forward gear stages from the first gear stage [1st] to the eighth gear stage [8th] and one reverse gear stage [Rev1] are established in accordance with the same operation table as that in FIG. 106, and at the same time, the same collinear chart as that in FIG. 107 can be obtained as shown in FIG. 110, wherein similar actions and effects can be brought about.

On the other hand, in the automatic transmission 180-5 for vehicle, as shown in FIG. 108, the axial length of the input shaft 24 is sufficiently short in comparison with the automatic transmission 180-1 for vehicle, which is shown in FIG. 105. The axial length of the input shaft 24 is made remarkably shorter than the second axis 34, and empty spacing is brought about on the extension line at the torque converter 14 side of the first axis center 32*c*. The spacing can be made into spacing for installing other units of the automatic transmission 180-5 for vehicle, such as, for example, the engine 8, etc., which becomes advantageous in terms of installing the automatic transmission 180-5 in a vehicle. In addition, the differential gear set 36 according to the present embodiment is disposed adjacent to the second transmission portion 182-5 at the side opposite to the first transmission portion 181 with the second transmission portion 182-5 placed therebetween, that is, at the same side as the engine 8. Also, an output shaft 27 is provided instead of the above-described output gear 26, and the fourth rotary element RM4 (Ring gear R3 and carrier CA4) is connected integral with the output shaft 27, wherein the center of the axle for transmitting power from the differential gear set 36 to the drive wheels (not illustrated) and the second axis center 34*c* can be made common, and the automatic transmission 180-5 for vehicle can be made further compact. This point becomes advantageous in terms of installing it in a vehicle.

Figures 112, 113:
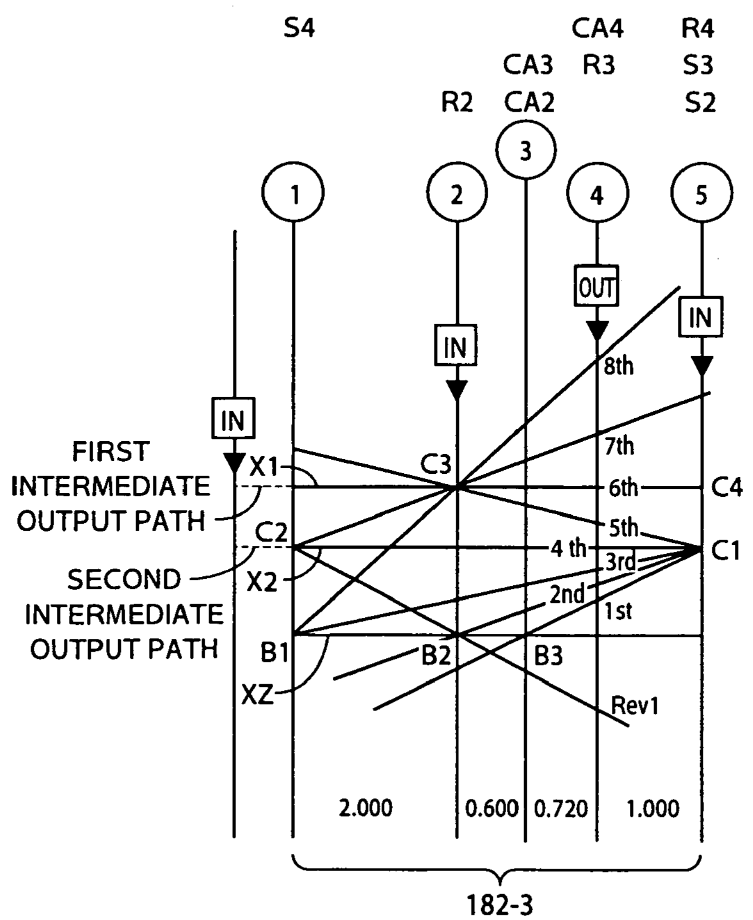
FIG. 112 is an operation table of the embodiment in FIG. 111.
FIG. 113 is a collinear chart of the embodiment in FIG. 111.

FIG. 111 through FIG. 113 show one embodiment according to the first through the fifth aspects, the seventh and the eighth aspects, the fifty-first aspect, the fifty-third aspect, and the fifty-fourth aspect of the invention. FIG. 111 is a view corresponding to FIG. 105 described above, FIG. 112 is a view corresponding to FIG. 106 described above, and FIG. 113 is a view corresponding to FIG. 107 described above. The automatic transmission 180-3 for vehicle differs from the automatic transmission 180-1 for vehicle, which is shown in FIG. 105 through FIG. 107, in that the fifth rotary element RM5 (Sun gears S2 and S3 and ring gear R4) of the second transmission portion 182-3 is selectively connected to the driven gear CG1B functioning as the first intermediate output path M1, which is the first intermediate output path M1 via the fourth clutch C4. However, as shown in FIG. 112, eight forward gear stages from the first gear stage [1st] to the eighth gear stage [8th] and one reverse gear stage [Rev1] are established in accordance with the same operation table as that in FIG. 106, and at the same time, the same collinear chart as that in FIG. 107 can be obtained as shown in FIG. 113, wherein similar actions and effects can be brought about.

Figure 114:
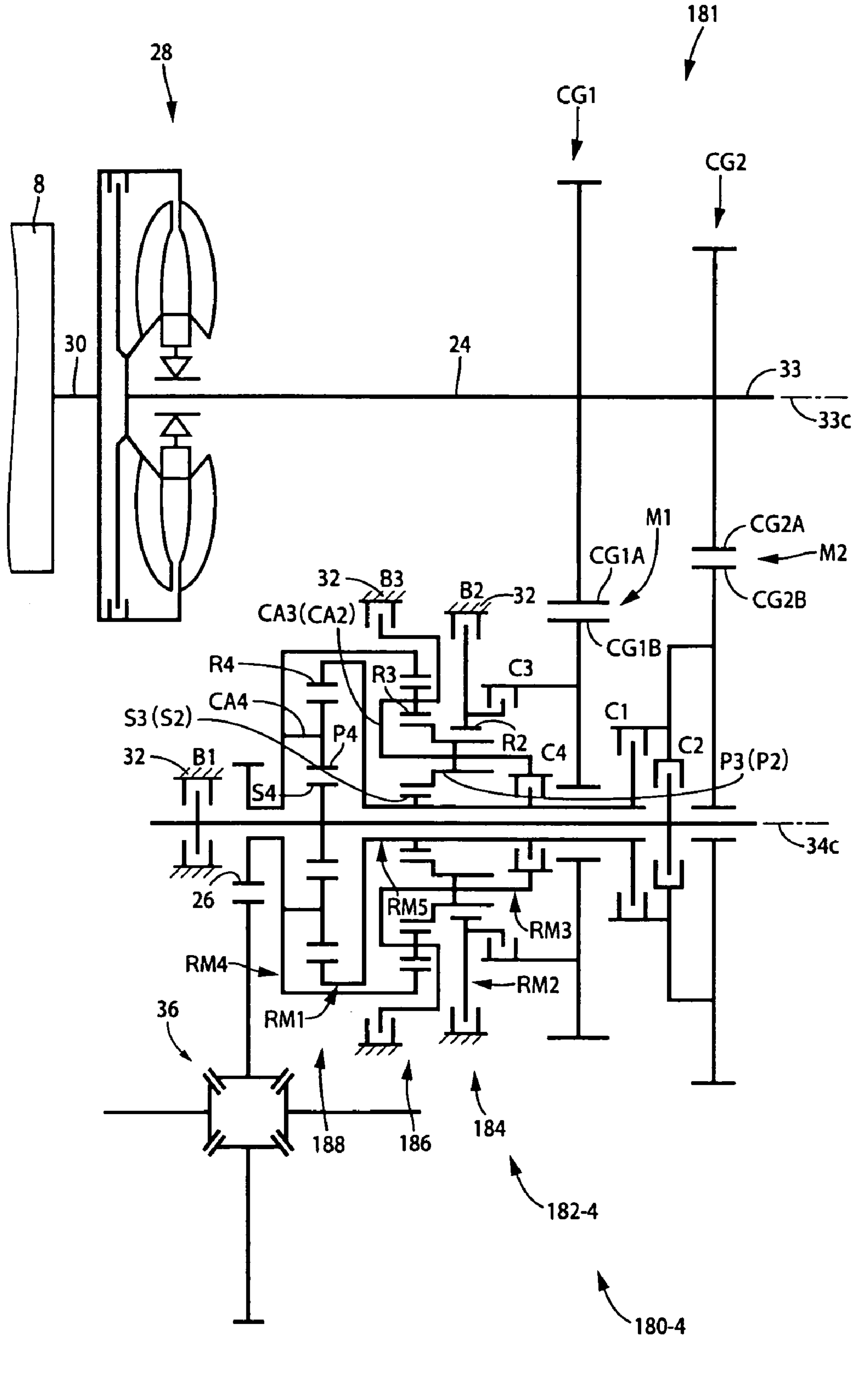
FIG. 114 is a view illustrating further another embodiment of the invention, in which a case is shown where the fourth clutch C4 differs in the arrangement position thereof in comparison with the embodiment in FIG. 105, and is a schematic view corresponding to FIG. 105.
Figures 115, 116:
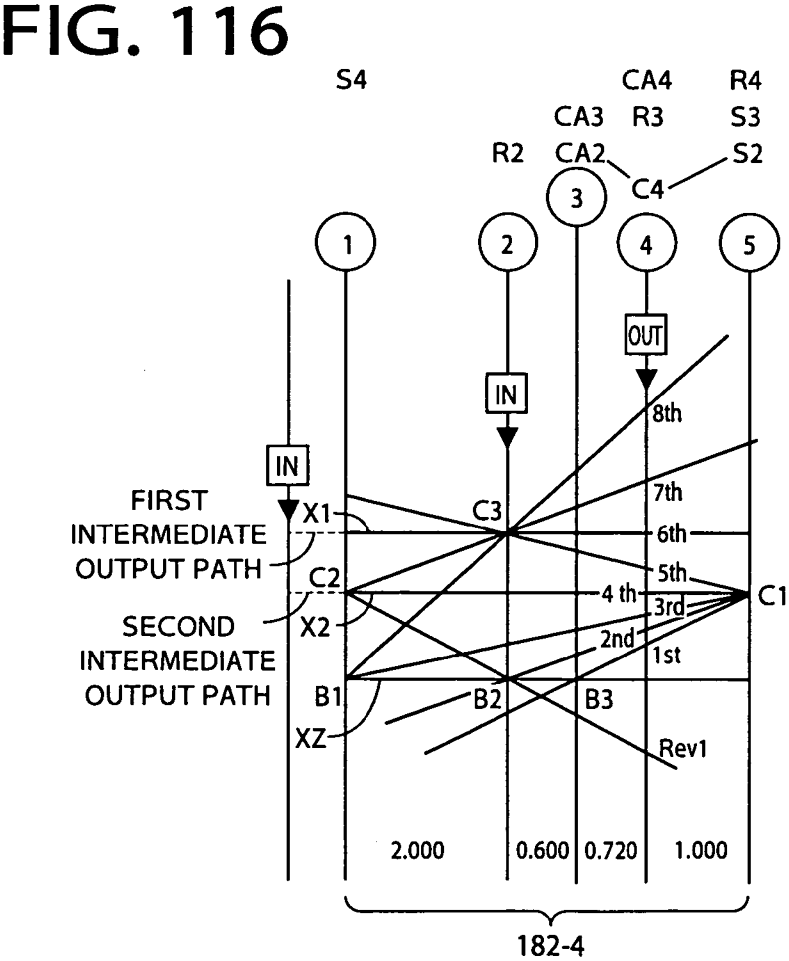
FIG. 115 is an operation table of the embodiment in FIG. 114.
FIG. 116 is a collinear chart of the embodiment in FIG. 114.

FIG. 114 through FIG. 116 show one embodiment according to the first through the fourth aspects, the sixth through the eighth aspects, and the fifty-second through the fifty-fourth aspects of the invention. FIG. 114 is a view corresponding to FIG. 105 described above, FIG. 115 is a view corresponding to FIG. 106 described above, and FIG. 116 is a view corresponding to FIG. 107 described above. The automatic transmission 180-4 for vehicle differs from the automatic transmission 180-1 for vehicle, which is shown in FIG. 105 through FIG. 107, in that the third rotary element RM3 (Carriers CA2 and CA3) of the second transmission portion 182-4 and the fifth rotary element RM5 (Sun gears S2 and S3 and ring gear R4) thereof are selectively connected to each other via the fourth clutch C4. However, as shown in FIG. 115, eight forward gear stages from the first gear stage [1st] to the eighth gear stage [8th] and one reverse gear stage [Rev1] are established in accordance with the same operation table as that in FIG. 106, and at the same time, the same collinear chart as that in FIG. 107 can be obtained as shown in FIG. 116, wherein similar actions and effects can be brought about.

Figure 117:
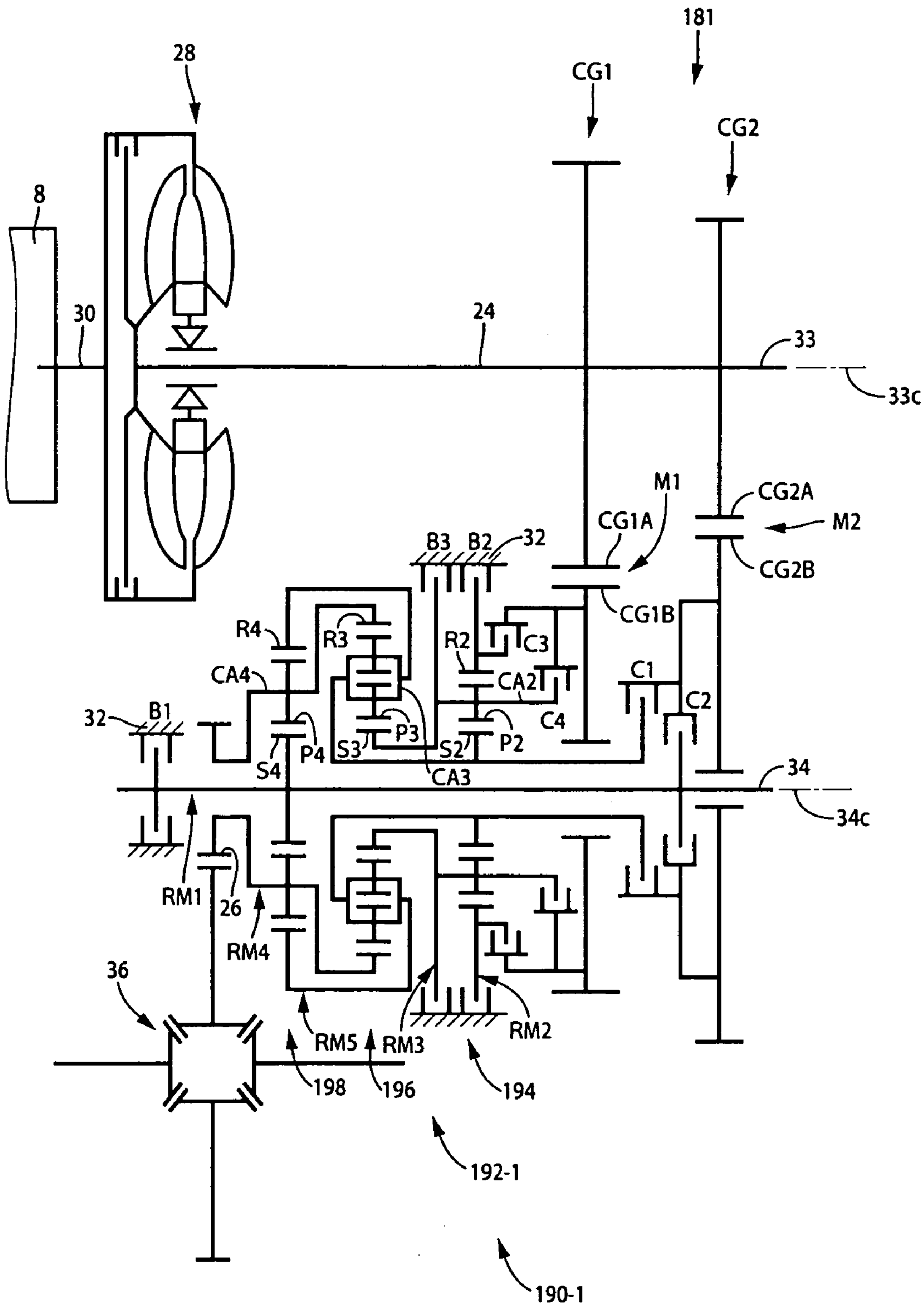
FIG. 117 is a view illustrating still another embodiment of the invention, in which a case is shown where the second transmission portion differs in the construction thereof in comparison with the embodiment in FIG. 105, and is a schematic view corresponding to FIG. 105.
Figures 118, 119:
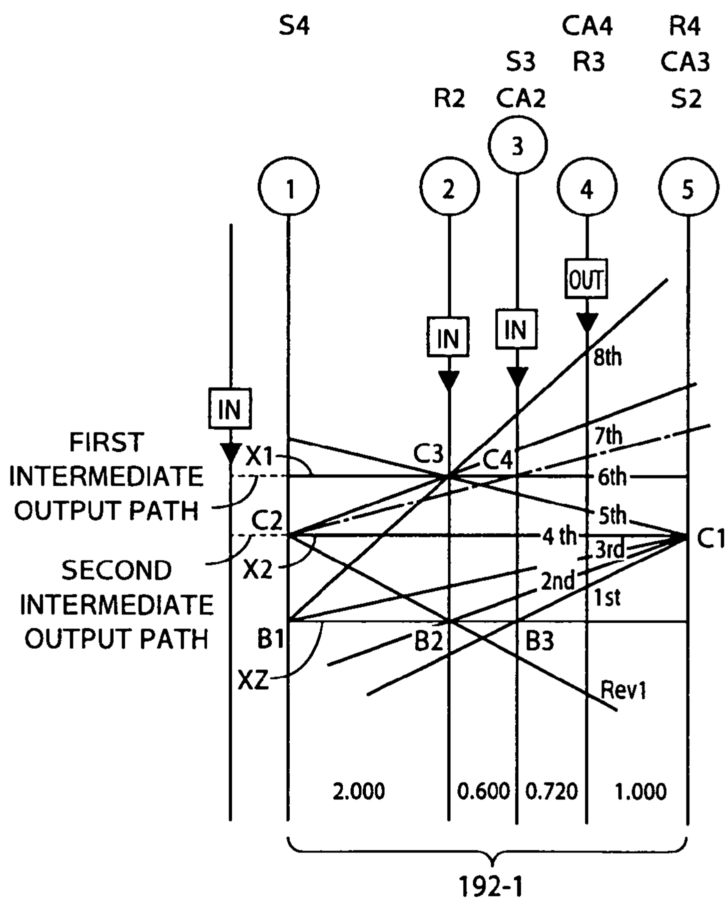
FIG. 118 is an operation table of the embodiment in FIG. 117.

FIG. 117 through FIG. 119 show one embodiment according to the first through the fifth aspects, the ninth aspect, the fifty-first aspect, and the fifty-fourth aspect of the invention. FIG. 117 is a view corresponding to FIG. 105 described above, FIG. 118 is a view corresponding to FIG. 106 described above, and FIG. 119 is a view corresponding to FIG. 107 described above. An automatic transmission 190-1 for vehicle differs from the automatic transmission 180-1 for vehicle, which is shown in FIG. 105 through FIG. 107 in the construction of the second transmission portion 192-1. That is, the second transmission portion 192-1 has substantially the same construction as that of the second transmission portion 42-1 in FIG. 9 and FIG. 10, and is composed mainly of a single-pinion type second planetary gear set 194, a double-pinion type third planetary gear set 196 and a single-pinion type fourth planetary gear set 419, wherein the first rotary element RM1 is composed of the sun gear S4 of the fourth planetary gear set 198, the second rotary element RM2 is composed of the ring gear R2 of the second planetary gear set 194, the third rotary element RM3 is composed of the carrier CA2 of the second planetary gear set 194 and the sun gear S3 of the third planetary gear set 196 connected to each other, the fourth rotary element RM4 is composed of the ring gear R3 of the third planetary gear set 196 and the carrier CA4 of the fourth planetary gear set 198 connected to each other, and the fifth rotary element RM5 is composed of the sun gear S2 of the second planetary gear set 194, the carrier CA3 of the third planetary gear set 196 and the ring gear R4 of the fourth planetary gear set 198 connected to each other. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

In this case, as shown in FIG. 118, eight forward gear stages from the first gear stage [1st] to the eighth gear stage [8th] and one reverse gear stage [Rev1] are established in accordance with the same operation table as that in FIG. 106. As shown with an alternate long and short dashed line in FIG. 119, where the second clutch C2 and the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 194, the third planetary gear set 196 and the fourth planetary gear set 198. For example, where the speed reduction ratio of the first counter-gear pair CG1 is [1.060], that of the second counter-gear pair CG2 is [1.745], and ρ2 is 0.349, ρ3 is 0.581 and ρ4 is 0.301, the same collinear chart as that in FIG. 107 can be secured as shown in FIG. 119, and the same transmission ratios as those in FIG. 106 can be obtained as shown in FIG. 118, wherein actions and effects similar to those of the embodiment shown in FIG. 105 through FIG. 107 can be brought about.

Figure 120:
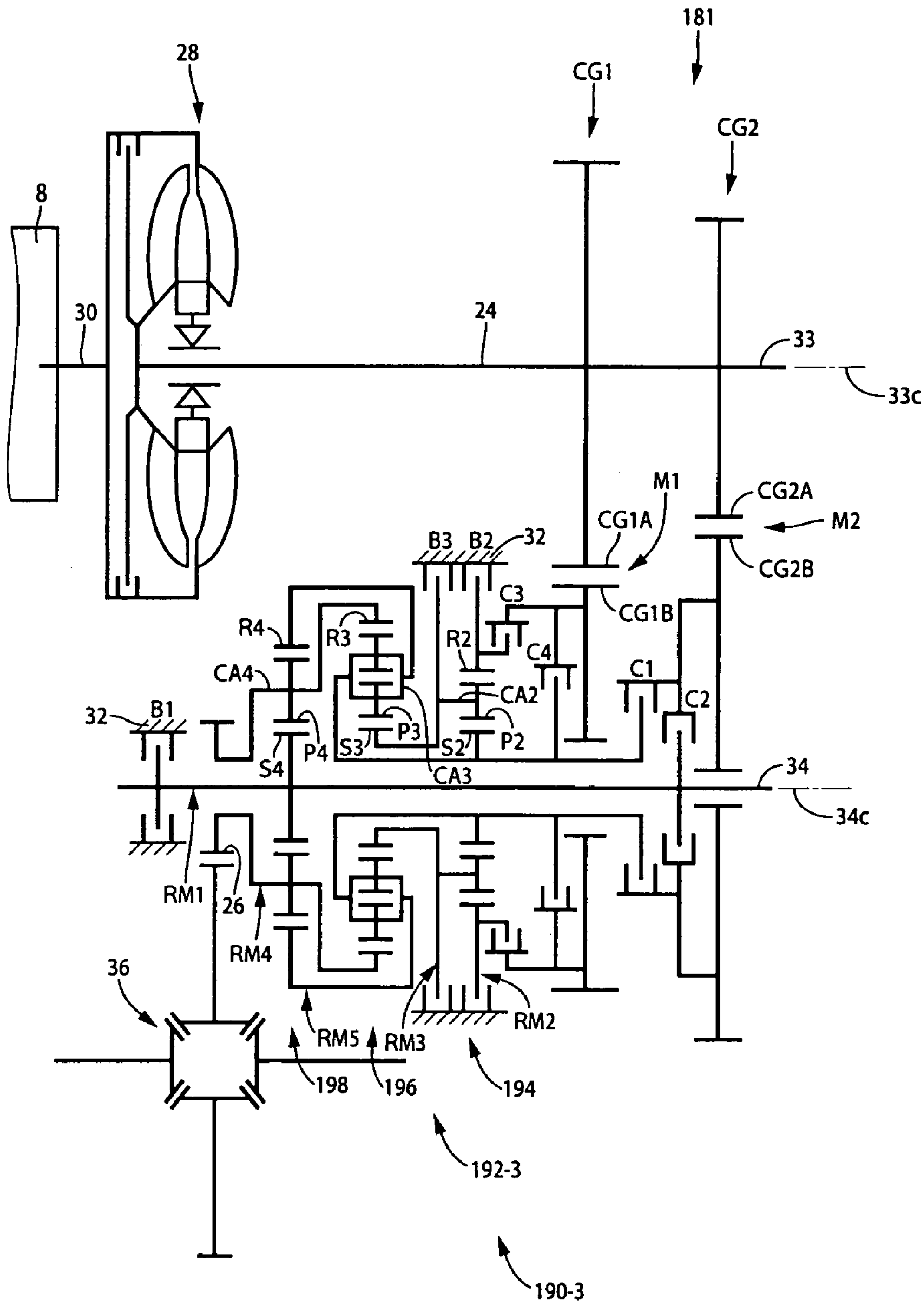
Figures 121, 122:
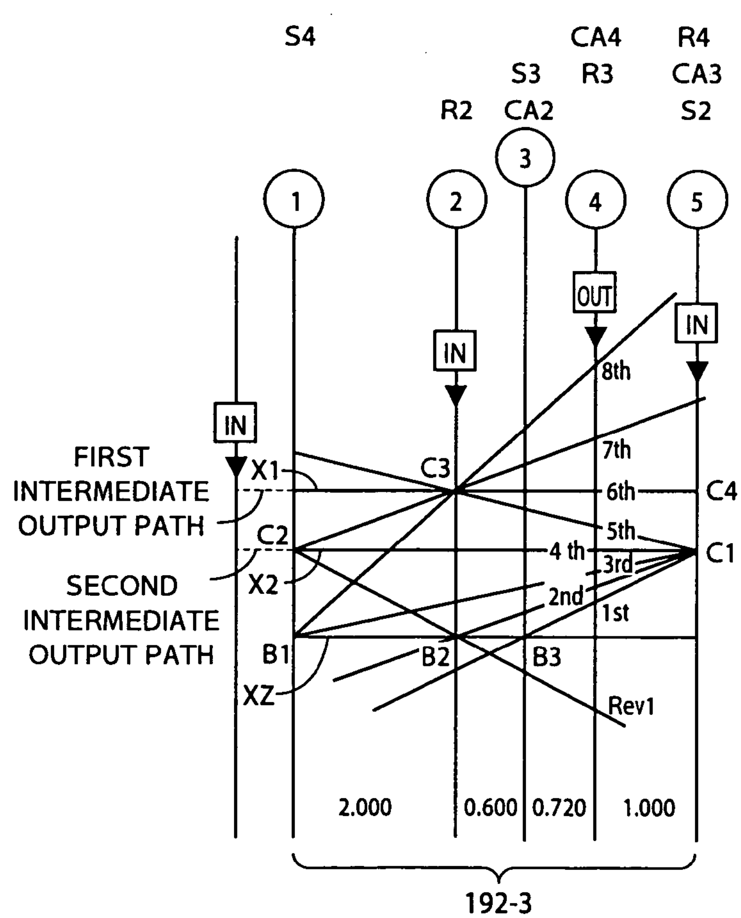

FIG. 120 through FIG. 122 show one embodiment according to the first through the fifth aspects, the ninth aspect, the fifty-first aspect, the fifty-third aspect, and the fifty-fourth aspect of the invention. FIG. 120 is a view corresponding to FIG. 105 described above, FIG. 121 is a view corresponding to FIG. 106 described above, and FIG. 122 is a view corresponding to FIG. 107 described above. The automatic transmission 190-3 for vehicle differs from the automatic transmission 190-1 for vehicle, which is shown in FIG. 117 through FIG. 119, in that the fifth rotary element RM5 (Sun gear S2, carrier CA3 and ring gear R4) of the second transmission portion 192-3 is selectively connected to the driven gear CG1B functioning as the first intermediate output path M1 via the fourth clutch C4. However, as shown in FIG. 121, eight forward gear stages from the first gear stage [1st] to the eighth gear stage [8th] and one reverse gear stage [Rev1] are established in accordance with the same operation table as that in FIG. 118, and at the same time, the same collinear chart as that in FIG. 119 can be obtained as shown in FIG. 122, wherein similar actions and effects can be brought about.

Figure 123:
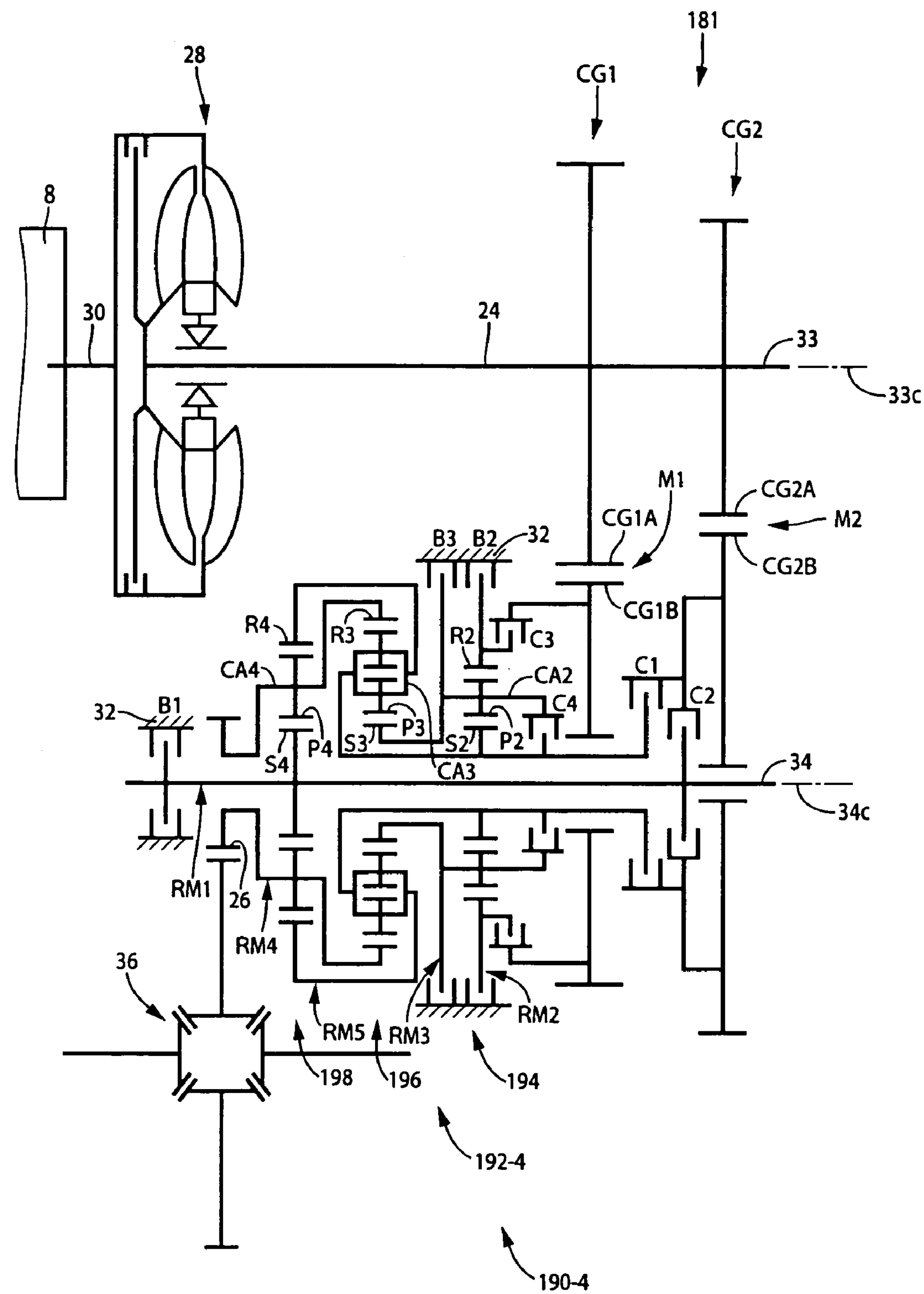
Figures 124, 125:
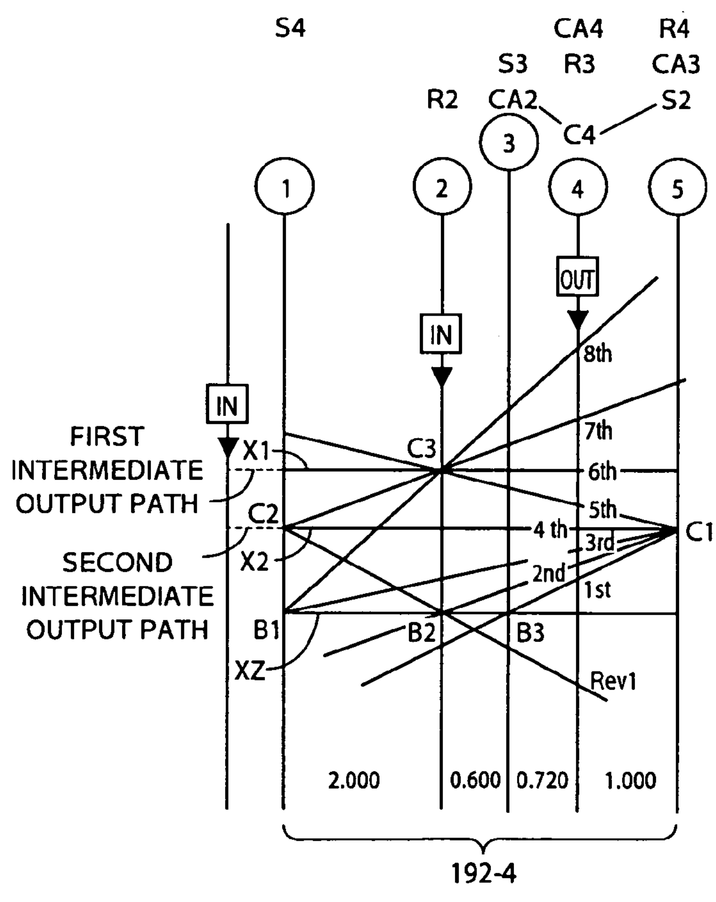

FIG. 123 through FIG. 125 show one embodiment according to the first through the fourth aspects, the sixth aspect, the ninth aspect, and the fifty-second through the fifty-fourth aspects of the invention. FIG. 123 is a view corresponding to FIG. 105 described above, FIG. 124 is a view corresponding to FIG. 106 described above, and FIG. 125 is a view corresponding to FIG. 107 described above. The automatic transmission 190-4 for vehicle differs from the automatic transmission 190-1 for vehicle, which is shown in FIG. 117 through FIG. 119, in that the third rotary element RM3 (Carrier CA2 and sun gear S3) of the second transmission portion 192-4 and the fifth rotary element RM5 (Sun gear S2, carrier CA3 and ring gear R4) thereof are selectively connected integral with each other via the fourth clutch C4. However, as shown in FIG. 124, eight forward gear stages from the first gear stage [1st] to the eighth gear stage [8th] and one reverse gear stage [Rev1]are established in accordance with the same operation table as that in FIG. 118, and at the same time, the same collinear chart as that in FIG. 119 can be obtained as shown in FIG. 125, wherein similar actions and effects can be brought about.

Figures 127, 128:
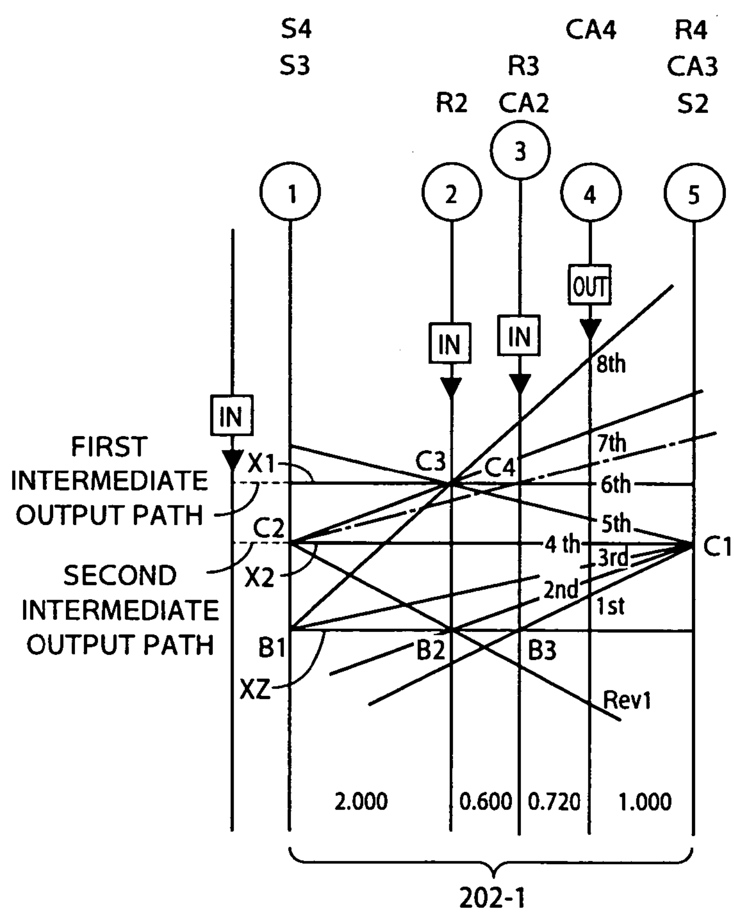

FIG. 126 through FIG. 128 show one embodiment according to the first through the fifth aspects, the tenth aspect, the fifty-first aspect, the fifty-third aspect and the fifty-fourth aspect of the invention. FIG. 126 is a view corresponding to FIG. 105 described above, FIG. 127 is a view corresponding to FIG. 106 described above, and FIG. 128 is a view corresponding to FIG. 107 described above. An automatic transmission 200-1 for vehicle differs from the automatic transmission 180-1 for vehicle, which is shown in FIG. 105 through FIG. 107 in the construction of the second transmission portion 202-1. That is, the second transmission portion 202-1 has substantially the same construction as that of the second transmission portion 52-1 in FIG. 17 and FIG. 18, and is composed mainly of a single-pinion type second planetary gear set 204, a double-pinion type third planetary gear set 206 and a single-pinion type fourth planetary gear set 208, wherein the first rotary element RM1 is composed of the sun gear S3 of the third planetary gear set 206 and the sun gear S4 of the fourth planetary gear set 208 connected to each other, the second rotary element RM2 is composed of the ring gear R2 of the second planetary gear set 204, the third rotary element RM3 is composed of the carrier CA2 of the second planetary gear set 204 and the ring gear R3 of the third planetary gear set 206 connected to each other, the fourth rotary element RM4 is composed of the carrier CA4 of the fourth planetary gear set 208, and the fifth rotary element RM5 is composed of the sun gear S2 of the second planetary gear set 204, the carrier CA3 of the third planetary gear set 206 and the ring gear R4 of the fourth planetary gear set 208 connected to each other. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

In this case, as shown in FIG. 127, eight forward gear stages from the first gear stage [1st] to the eighth gear stage [8th] and one reverse gear stage [Rev1] are established in accordance with the same operation table as that in FIG. 106. As shown with an alternate long and short dashed line in FIG. 119, where the second clutch C2 and the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 204, the third planetary gear set 206 and the fourth planetary gear set 208. For example, where the speed reduction ratio of the first counter-gear pair CG1 is [1.000], that of the second counter-gear pair CG2 is [1.745], and ρ2 is 0.349, ρ3 is 0.398 and ρ4 is 0.301, the same collinear chart as that in FIG. 107 can be secured as shown in FIG. 128, and the same transmission ratios as those in FIG. 106 can be obtained as shown in FIG. 127, wherein actions and effects similar to those of the embodiment shown in FIG. 105 through FIG. 107 can be brought about.

FIG. 129 through FIG. 131 show one embodiment according to the first through the fifth aspects, the tenth aspect, the fifty-first aspect, the fifty-third aspect, and the fifty-fourth aspect of the invention. FIG. 129 is a view corresponding to FIG. 105 described above, FIG. 130 is a view corresponding to FIG. 106 described above, and FIG. 131 is a view corresponding to FIG. 107 described above. The automatic transmission 200-3 for vehicle differs from the automatic transmission 200-1 for vehicle, which is shown in FIG. 126 through FIG. 128, in that the fifth rotary element RM5 (Sun gear S2, carrier CA3 and ring gear R4) of the second transmission portion 202-3 is selectively connected to the driven gear CG1B functioning as the first intermediate output path M1 via the fourth clutch C4. However, as shown in FIG. 130, eight forward gear stages from the first gear stage [1st] to the eighth gear stage [8th] and one reverse gear stage [Rev1] are established in accordance with the same operation table as that in FIG. 127, and at the same time, the same collinear chart as that in FIG. 128 can be obtained as shown in FIG. 131, wherein similar actions and effects can be brought about.

FIG. 132 through FIG. 134 show one embodiment according to the first through the fourth aspects, the sixth aspect, the tenth aspect, and the fifty-second through the fifty-fourth aspects of the invention. FIG. 132 is a view corresponding to FIG. 105 described above, FIG. 133 is a view corresponding to FIG. 106 described above, and FIG. 134 is a view corresponding to FIG. 107 described above. The automatic transmission 200-4 for vehicle differs from the automatic transmission 200-1 for vehicle, which is shown in FIG. 126 through FIG. 128, in that the third rotary element RM3 (Carrier CA2 and ring gear R3) of the second transmission portion 202-4 and the fifth rotary element RM5 (Sun gear S2, carrier CA3 and ring gear R4) thereof are selectively connected to each other via the fourth clutch C4. However, as shown in FIG. 133, eight forward gear stages from the first gear stage [1st] to the eighth gear stage [8th] and one reverse gear stage [Rev1] are established in accordance with the same operation table as that in FIG. 127, and at the same time, the same collinear chart as that in FIG. 128 can be obtained as shown in FIG. 134, wherein similar actions and effects can be brought about.

FIG. 135 through FIG. 137 show one embodiment according to the first through the fifth aspects, the eleventh aspect, the fifty-first aspect, the fifty-third aspect and the fifty-fourth aspect of the invention. FIG. 135 is a view corresponding to FIG. 105 described above, FIG. 136 is a view corresponding to FIG. 106 described above, and FIG. 137 is a view corresponding to FIG. 107 described above. An automatic transmission 210-1 for vehicle differs from the automatic transmission 180-1 for vehicle, which is shown in FIG. 105 through FIG. 107 in the construction of the second transmission portion 212-1. That is, the second transmission portion 212-1 has substantially the same construction as that of the second transmission portion 62-1 in FIG. 25 and FIG. 26, and is composed mainly of a single-pinion type second planetary gear set 214, a double-pinion type third planetary gear set 216 and a single-pinion type fourth planetary gear set 218, wherein the first rotary element RM1 is composed of the sun gear S2 of the second planetary gear set 214, carrier CA3 of the third planetary gear set 216 and the sun gear S4 of the fourth planetary gear set 218 connected to each other, the second rotary element RM2 is composed of the carrier CA2 of the second planetary gear set 214 and the ring gear R3 of the third planetary gear set 216 connected to each other, the third rotary element RM3 is composed of the ring gear R2 of the second planetary gear set 214, the fourth rotary element RM4 is composed of the carrier CA4 of the fourth planetary gear set 218, and the fifth rotary element RM5 is composed of the sun gear S3 of the third planetary gear set 216 and the ring gear R4 of the fourth planetary gear set 218 connected to each other. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

In this case, as shown in FIG. 136, eight forward gear stages from the first gear stage [1st] to the eighth gear stage [8th] and one reverse gear stage [Rev1] are established in accordance with the same operation table as that in FIG. 106. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 214, the third planetary gear set 216 and the fourth planetary gear set 218. For example, where the speed reduction ratio of the first counter-gear pair CG1 is [1.000], that of the second counter-gear pair CG2 is [1.745], and ρ2 is 0.300, ρ3 is 0.463 and ρ4 is 0.301, the same collinear chart as that in FIG. 107 can be secured as shown in FIG. 137, and the same transmission ratios as those in FIG. 106 can be obtained as shown in FIG. 136, wherein actions and effects similar to those of the embodiment shown in FIG. 105 through FIG. 107 can be brought about.

FIG. 138 through FIG. 140 show one embodiment according to the first through the fifth aspects, the eleventh aspect, the fifty-first aspect, the fifty-third aspect, and the fifty-fourth aspect of the invention. FIG. 138 is a view corresponding to FIG. 105 described above, FIG. 139 is a view corresponding to FIG. 106 described above, and FIG. 140 is a view corresponding to FIG. 107 described above. The automatic transmission 210-2 for vehicle differs from the automatic transmission 210-1 for vehicle, which is shown in FIG. 135 through FIG. 137, in that the first rotary element RM1 (Sun gear S2, carrier CA3 and sun gear S4) of the second transmission portion 212-1 is selectively connected to the driven gear CG1B functioning as the first intermediate output path M1 via the clutch C4. However, as shown in FIG. 139, eight forward gear stages from the first gear stage [1st] to the eighth gear stage [8th] and one reverse gear stage [Rev1] are established in accordance with the same operation table as that in FIG. 136, and at the same time, the same collinear chart as that in FIG. 137 can be obtained as shown in FIG. 140, wherein similar actions and effects can be brought about. Further, as shown in FIG. 139 and FIG. 140, the automatic transmission 210-2 for vehicle may be composed so that the fourth clutch C4 and the third brake B3 are engaged with each other, the first rotary element RM1 is connected to the driven gear CG1B and is rotated at a rotation speed [1.0], and the third rotary element RM3 is brought to a stationary state, wherein the fourth rotary element RM4 is reversed at a rotation speed [Rev2], and the second reverse gear stage [Rev2] is established in addition to the first reverse gear stage [Rev1].

FIG. 141 through FIG. 143 show one embodiment according to the first through the fourth aspects, the sixth aspect, the eleventh aspect, and the fifty-second through the fifty-fourth aspects of the invention. FIG. 141 is a view corresponding to FIG. 105 described above, FIG. 142 is a view corresponding to FIG. 106 described above, and FIG. 143 is a view corresponding to FIG. 107 described above. The automatic transmission 210-4 for vehicle differs from the automatic transmission 210-1 for vehicle, which is shown in FIG. 135 through FIG. 137, in that the first rotary element RM1 (Sun gear S2, carrier CA3 and sun gear S4) of the second transmission portion 212-4 and the second rotary element RM2 (Carrier CA2 and ring gear R3) are connected integral with each other via the fourth clutch C4. However, as shown in FIG. 142, eight forward gear stages from the first gear stage [1st] to the eighth gear stage [8th] and one reverse gear stage [Rev1] are established in accordance with the same operation table as that in FIG. 136, and at the same time, the same collinear chart as that in FIG. 137 can be obtained as shown in FIG. 143, wherein similar actions and effects can be brought about.

FIG. 144 through FIG. 146 show one embodiment according to the first through the fifth aspects, the twenty-third aspect, the fifty-first aspect, the fifty-third aspect and the fifty-fourth aspect of the invention. FIG. 144 is a view corresponding to FIG. 105 described above, FIG. 145 is a view corresponding to FIG. 106 described above, and FIG. 146 is a view corresponding to FIG. 107 described above. An automatic transmission 220-1 for vehicle differs from the automatic transmission 180-1 for vehicle, which is shown in FIG. 105 through FIG. 107 in the arrangement of the first counter-gear pair CG1 and the second counter-gear pair CG2, which compose the first transmission portion 221, and the construction of the second transmission portion 222-1. That is, in the first transmission portion 221, the second counter-gear pair CG2 is disposed at the engine 8 side from the first counter-gear pair CG1, and the first counter-gear pair CG1 and the second counter-gear pair CG2 are disposed in a state where the second planetary gear set 224 and the third planetary gear set 226 are placed therebetween. Also, the second transmission portion 222-1 is composed mainly of a double-pinion type second planetary gear set 224, a single-pinion type third planetary gear set 226 and a single-pinion type fourth planetary gear set 228, wherein the first rotary element RM1 is composed of the sun gear S3 of the third planetary gear set 226 and the sun gear S4 of the fourth planetary gear set 228 connected to each other, the second rotary element RM2 is composed of the carrier CA2 of the second planetary gear set 224 and the carrier CA3 of the third planetary gear set 226 connected to each other, the third rotary element RM3 is composed of the ring gear R2 of the second planetary gear set 224 and the ring gear R3 of the third planetary gear set 226 connected to each other, the fourth rotary element RM4 is composed of the sun gear S2 of the second planetary gear set 224 and the carrier CA4 of the fourth planetary gear set 228 connected to each other, and the fifth rotary element RM5 is composed of the ring gear R4 of the fourth planetary gear set 228. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

Also, in the second planetary gear set 224 and the third planetary gear set 226, the second carrier CA2 and the third carrier CA3 are composed of a common part, and the second ring gear R2 and the third ring gear R3 are composed of a common part. And, it may be a Ravigneaux type planetary gear row in which the third planetary gear P3 is concurrently used as any one of a pair of the second planetary gears P2 engageable with each other. Also, the above-described third planetary gear P3 may have different diameters (number of teeth) at the second planetary gear set 224 side and the third planetary gear set 226 side.

In this case, as shown in FIG. 145, eight forward gear stages from the first gear stage [1st] to the eighth gear stage [8th] and one reverse gear stage [Rev1] are established in accordance with the same operation table as that in FIG. 106. As shown with an alternate long and short dashed line in FIG. 146, where the second clutch C2 and the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 224, the third planetary gear set 226 and the fourth planetary gear set 228. For example, where the speed reduction ratio of the first counter-gear pair CG1 is [1.000], that of the second counter-gear pair CG2 is [1.745], and ρ2 is 0.455, ρ3 is 0.300 and ρ4 is 0.301, the same collinear chart as that in FIG. 107 can be secured as shown in FIG. 146, and the same transmission ratios as those in FIG. 106 can be obtained as shown in FIG. 145, wherein actions and effects similar to those of the embodiment shown in FIG. 105 through FIG. 107 can be brought about.

FIG. 147 through FIG. 149 show one embodiment according to the first through the fourth aspects, the sixth aspect, the twenty-third aspect, the fifty-second through the fifty-fourth aspects of the invention. FIG. 147 is a view corresponding to FIG. 105 described above, FIG. 148 is a view corresponding to FIG. 106 described above, and FIG. 149 is a view corresponding to FIG. 107 described above. The automatic transmission 220-4 for vehicle differs from the automatic transmission 220-1 for vehicle, which is shown in FIG. 144 through FIG. 146, in that the second rotary element RM2 (Carriers CA2 and CA3) of the second transmission portion 222-4 and the fourth rotary element RM4 (Sun gear S2 and carrier CA4) thereof are selectively connected integral with each other via the fourth clutch C4. However, as shown in FIG. 148, eight forward gear stages from the first gear stage [1st] to the eighth gear stage [8th] and one reverse gear stage [Rev1] are established in accordance with the same operation table as that in FIG. 145, and at the same time, the same collinear chart as that in FIG. 146 can be obtained as shown in FIG. 149, wherein similar actions and effects can be brought about.

FIG. 150 through FIG. 152 show one embodiment according to the first through the fifth aspects, the twenty-fourth aspect, the fifty-first aspect, the fifty-third aspect and the fifty-fourth aspect of the invention. FIG. 150 is a view corresponding to FIG. 105 described above, FIG. 151 is a view corresponding to FIG. 106 described above, and FIG. 152 is a view corresponding to FIG. 107 described above. An automatic transmission 230-1 for vehicle differs from the automatic transmission 180-1 for vehicle, which is shown in FIG. 105 through FIG. 107 in the arrangement of the first counter-gear pair CG1 and the second counter-gear pair CG2, which compose the first transmission portion 231, and the construction of the second transmission portion 232-1. That is, in the first transmission portion 231, the second counter-gear pair CG2 is disposed at the engine 8 side from the first counter-gear pair CG1, and the first counter-gear pair CG1 and the second counter-gear pair CG2 are disposed in a state where the second planetary gear set 234, the third planetary gear set 236 and the fourth planetary gear set 238 are placed therebetween. Also, the second transmission portion 232-1 is composed mainly of a single-pinion type second planetary gear set 234, a double-pinion type third planetary gear set 236 and a single-pinion type fourth planetary gear set 238, wherein the first rotary element RM1 is composed of the sun gear S2 of the second planetary gear set 234, the sun gear S3 of the third planetary gear set 236 and the sun gear S4 of the fourth planetary gear set 238 connected to each other, the second rotary element RM2 is composed of the carrier CA2 of the second planetary gear set 234 and the ring gear R3 of the third planetary gear set 236 connected to each other, the third rotary element RM3 is composed of the ring gear R2 of the second planetary gear set 234, the fourth rotary element RM4 is composed of the carrier CA3 of the third planetary gear set 236 and the carrier CA4 of the fourth planetary gear set 238 connected to each other, and the fifth rotary element RM5 is composed of the ring gear R4 of the fourth planetary gear set 238. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

In this case, as shown in FIG. 151, eight forward gear stages from the first gear stage [1st] to the eighth gear stage [8th] and one reverse gear stage [Rev1] are established in accordance with the same operation table as that in FIG. 106. As shown with an alternate long and short dashed line in FIG. 152, where the second clutch C2 and the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 234, the third planetary gear set 236 and the fourth planetary gear set 238. For example, where the speed reduction ratio of the first counter-gear pair CG1 is [1.000], that of the second counter-gear pair CG2 is [1.745], and ρ2 is 0.300, ρ3 is 0.398 and ρ4 is 0.301, the same collinear chart as that in FIG. 107 can be secured as shown in FIG. 152, and the same transmission ratios as those in FIG. 106 can be obtained as shown in FIG. 151, wherein actions and effects similar to those of the embodiment shown in FIG. 105 through FIG. 107 can be brought about.

FIG. 153 through FIG. 155 show one embodiment according to the first through the fifth aspects, the twenty-fourth aspect, the fifty-first aspect, the fifty-third aspect and the fifty-fourth aspect of the invention. FIG. 153 is a view corresponding to FIG. 105 described above, FIG. 154 is a view corresponding to FIG. 106 described above, and FIG. 155 is a view corresponding to FIG. 107 described above. An automatic transmission 230-2 for vehicle differs from the automatic transmission 230-1 for vehicle, which is shown in FIG. 150 through FIG. 152 in that the first rotary element RM1 (Sun gears S2, S3 and S4) of the second transmission portion 232-2 is selectively connected to the driven gear CG1B functioning as the first intermediate output path M1 via the fourth clutch C4. However, as shown in FIG. 154, eight forward gear stages from the first gear stage [1st] to the eighth gear stage [8th] and one reverse gear stage [Rev1] are established in accordance with the same operation table as that in FIG. 151, and at the same time, the same collinear chart as that in FIG. 152 can be obtained as shown in FIG. 155, wherein similar actions and effects can be brought about. Further, as shown in FIG. 154 and FIG. 155, the automatic transmission 230-2 for vehicle may be composed so that the fourth clutch C4 and the third brake B3 are engaged with each other, the first rotary element RM1 is connected to the driven gear CG1B and is rotated at a rotation speed [1.0], and the third rotary element RM3 is brought to a stationary state, and the fourth rotary element RM4 is reversed at a rotation speed [Rev2] and the second reverse gear stage [Rev2] can be established in addition to the first reverse gear stage [Rev1]

FIG. 156 through FIG. 158 show one embodiment according to the first through the fourth aspects, the sixth aspect, the twenty-fourth aspect, and the fifty-second through the fifty-fourth aspects of the invention. FIG. 156 is a view corresponding to FIG. 105 described above, FIG. 157 is a view corresponding to FIG. 106 described above, and FIG. 158 is a view corresponding to FIG. 107 described above. The automatic transmission 230-4 for vehicle differs from the automatic transmission 230-1 for vehicle, which is shown in FIG. 150 through FIG. 152, in that the first rotary element (Sun gears S2, S3 and S4) of the second transmission portion 232-4 and the second rotary element RM2 (Carrier CA2 and ring gear R3) thereof are selectively connected integral with each other via the fourth clutch C4. However, as shown in FIG. 157, eight forward gear stages from the first gear stage [1st] to the eighth gear stage [8th] and one reverse gear stage [Rev1] are established in accordance with the same operation table as that in FIG. 151, and at the same time, the same collinear chart as that in FIG. 152 can be obtained as shown in FIG. 158, wherein similar actions and effects can be brought about.

FIG. 159 through FIG. 161 show one embodiment according to the first through the fifth aspects, the twenty-fifth aspect, the fifty-first aspect, the fifty-third aspect and the fifty-fourth aspect of the invention. FIG. 159 is a view corresponding to FIG. 105 described above, FIG. 160 is a view corresponding to FIG. 106 described above, and FIG. 161 is a view corresponding to FIG. 107 described above. An automatic transmission 240-1 for vehicle differs from the automatic transmission 180-1 for vehicle, which is shown in FIG. 105 through FIG. 107 in the construction of the second transmission portion 242-1. That is, the second transmission portion 242-1 is composed mainly of a single-pinion type second planetary gear set 244, a single-pinion type third planetary gear set 246 and a double-pinion type fourth planetary gear set 248, wherein the first rotary element RM1 is composed of the sun gear S3 of the third planetary gear set 246 the sun gear S4 of the fourth planetary gear set 248 connected to each other, the second rotary element RM2 is composed of the ring gear R2 of the second planetary gear set 244 and the ring gear R4 of the fourth planetary gear set 248 connected to each other, the third rotary element RM3 is composed of the carrier CA2 of the second planetary gear set 244, the fourth rotary element RM4 is composed of the carrier CA3 of the third planetary gear set 246 and the carrier CA4 of the fourth planetary gear set 248 connected to each other, and the fifth rotary element RM5 is composed of the sun gear S2 of the second planetary gear set 244 and the ring gear R3 of the third planetary gear set 246 connected to each other. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

Also, in the third planetary gear set 246 and the fourth planetary gear set 248, the third carrier CA3 and the fourth carrier CA4 are composed of a common part, and the third sun gear S3 and the fourth sun gear S4 are composed of a common part. And, it may be a planetary gear row in which the third planetary gear P3 is concurrently used as any one of a pair of the fourth planetary gears P4 engageable with each other. Also, the above-described third planetary gear P3 may have different diameters (number of teeth) at the fourth planetary gear set 248 side and the third planetary gear set 246 side.

In this case, as shown in FIG. 160, eight forward gear stages from the first gear stage [1st] to the eighth gear stage [8th] and one reverse gear stage [Rev1] are established in accordance with the same operation table as that in FIG. 106. As shown with an alternate long and short dashed line in FIG. 161, where the second clutch C2 and-the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 244, the third planetary gear set 246 and the fourth planetary gear set 248. For example, where the speed reduction ratio of the first counter-gear pair CG1 is [1.000], that of the second counter-gear pair CG2 is [1.745], and ρ2 is 0.349, ρ3 is 0.301 and ρ4 is 0.398, the same collinear chart as that in FIG. 107 can be secured as shown in FIG. 161, and the same transmission ratios as those in FIG. 106 can be obtained as shown in FIG. 160, wherein actions and effects similar to those of the embodiment shown in FIG. 105 through FIG. 107 can be brought about.

FIG. 162 through FIG. 164 show one embodiment according to the first through the fourth aspects, the sixth aspect, the twenty-fifth aspect, and the fifty-second through the fifty-fourth aspects of the invention. FIG. 162 is a view corresponding to FIG. 105 described above, FIG. 163 is a view corresponding to FIG. 106 described above, and FIG. 164 is a view corresponding to FIG. 107 described above. The automatic transmission 240-4 for vehicle differs from the automatic transmission 240-1 for vehicle, which is shown in FIG. 159 through FIG. 161, in-that the third rotary element RM3 (Carrier CA2) of the second transmission portion-242-4 and the fifth rotary element RM5 (Sun gear S2 and ring gear R3) thereof are selectively connected integral with each other via the fourth clutch C4. However, as shown in FIG. 163, eight forward gear stages from the first gear stage [1st] to the eighth gear stage [8th] and one reverse gear stage [Rev1] are established in accordance with the same operation table as that in FIG. 160, and at the same time, the same collinear chart as that in FIG. 161 can be obtained as shown in FIG. 164, wherein similar actions and effects can be brought about.

FIG. 165 through FIG. 167 show one embodiment according to the first through the fifth aspects, the twenty-sixth aspect, the fifty-first aspect, the fifty-third aspect and the fifty-fourth aspect of the invention. FIG. 165 is a view corresponding to FIG. 105 described above, FIG. 166 is a view corresponding to FIG. 106 described above, and FIG. 167 is a view corresponding to FIG. 107 described above. An automatic transmission 250-1 for vehicle differs from the automatic transmission 180-1 for vehicle, which is shown in FIG. 105 through FIG. 107 in the arrangement of the first counter-gear pair CG1 and the second counter-gear pair CG2, which compose the first transmission portion 251, and the construction of the second transmission portion 252-1. That is, in the first transmission portion 251, the second counter-gear pair CG2 is disposed at the engine 8 side from the first counter-gear pair CG1, and the first counter-gear pair CG1 and the second counter-gear pair CG2 are disposed in a state where the second planetary gear set 254, the third planetary gear set 256 and the fourth planetary gear set 258 are placed therebetween. Also, the second transmission portion 252-1 is composed mainly of a single-pinion type second planetary gear set 254, a double-pinion type third planetary gear set 256 and a single-pinion type fourth planetary gear set 258, wherein the first rotary element RM1 is composed of the sun gear S2 of the second planetary gear set 254 and the sun gear S4 of the fourth planetary gear set 258 connected to each other, the second rotary element RM2 is composed of the carrier CA2 of the second planetary gear set 254 and the carrier CA3 of the third planetary gear set 256 connected to each other, the third rotary element RM3 is composed of the ring gear R2 of the second planetary gear set 254 and the ring gear R3 of the third planetary gear set 256 connected to each other, the fourth rotary element RM4 is composed of the sun gear S3 of the third planetary gear set 256 and the carrier CA4 of the fourth planetary gear set 258 connected to each other, and the fifth rotary element RMS is composed of the ring gear R4 of the fourth planetary gear set 258. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

Also, in the second planetary gear set 254 and the third planetary gear set 256, the second carrier CA2 and the third carrier CA3 are composed of a common part, and the second ring gear R2 and the third ring gear R3 are composed of a common part. And, it may be a Ravigneaux type planetary gear row in which the second planetary gear P2 is concurrently used as any one of a pair of the third planetary gears P3 engageable with each other. Also, the above-described second planetary gear P2 may have different diameters (number of teeth) at the second planetary gear set 254 side and the third planetary gear set 256 side.

In this case, as shown in FIG. 166, eight forward gear stages from the first gear stage [1st] to the eighth gear stage [8th] and one reverse gear stage [Rev1] are established in accordance with the same operation table as that in FIG. 106. As shown with an alternate long and short dashed line in FIG. 167, where the second clutch C2 and the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios $\rho 2$ through $\rho 4$ of the second planetary gear set 254, the third planetary gear set 256 and the fourth planetary gear set 258. For example, where the speed reduction ratio of the first counter-gear pair CG1 is [1.000], that of the second counter-gear pair CG2 is [1.745], and $\rho 2$ is 0.300, $\rho 3$ is 0.455 and $\rho 4$ is 0.301, the same collinear chart as that in FIG. 107 can be secured as shown in FIG. 167, and the same transmission ratios as those in FIG. 106 can be obtained as shown in FIG. 166, wherein actions and effects similar to those of the embodiment shown in FIG. 105 through FIG. 107 can be brought about.

FIG. 168 through FIG. 170 show one embodiment according to the first through the fifth aspects, the twenty-sixth aspect, the fifty-first aspect, the fifty-third aspect and the fifty-fourth aspect of the invention. FIG. 168 is a view corresponding to FIG. 105 described above, FIG. 169 is a view corresponding to FIG. 106 described above, and FIG. 170 is a view corresponding to FIG. 107 described above. An automatic transmission 250-2 for vehicle differs from the automatic transmission 250-1 for vehicle, which is shown in FIG. 165 through FIG. 167 in that the first rotary element RM1 (Sun gears S2 and S4) of the second transmission portion 252-2 is selectively connected to the driven gear CGLB functioning as the first intermediate output path M1 via the fourth clutch C4. However, as shown in FIG. 169, eight forward gear stages from the first gear stage [1st] to the eighth gear stage [8th] and one reverse gear stage [Rev1] are established in accordance with the same operation table as that in FIG. 166. Also, the same collinear chart as that of FIG. 167 can be obtained as shown in FIG. 170, and similar actions and effects can be brought about. In addition, as shown in FIG. 169 and FIG. 170, in the automatic transmission 250-2 for vehicle, the fourth clutch C4 and the third brake B3 are engaged with each other, the first rotary element RM1 is connected to the driven gear CG1B and is rotated at a rotation speed [1.0], and simultaneously the third rotary element RM3 is brought to a stationary state, wherein the fourth rotary element RM4 is reversed at a rotation speed [Rev2], and the second reverse gear stage [Rev2] may be established in addition to the first reverse gear stage [Rev1].

FIG. 171 through FIG. 172 show one embodiment according to the first through the fourth aspects, the sixth aspect, the twenty-sixth aspect, and the fifty-second through the fifty-fourth aspects of the invention. FIG. 171 is a view corresponding to FIG. 105 described above, FIG. 172 is a view corresponding to FIG. 106 described above, and FIG. 173 is a view corresponding to FIG. 107 described above. The automatic transmission 250-4 for vehicle differs from the automatic transmission 250-1 for vehicle, which is shown in FIG. 165 through FIG. 167, in that the first rotary element RM1 (Sun gears S2 and S4) of the second transmission portion 252-4 and the second rotary element RM2 (Carriers CA2 and CA3) thereof are selectively connected integral with each other via the fourth clutch C4. However, as shown in FIG. 172, eight forward gear stages from the first gear stage [1st] to the eighth gear stage [8th] and one reverse gear stage [Rev1] are established in accordance with the same operation table as that in FIG. 166, and at the same time, the same collinear chart as that in FIG. 167 can be obtained as shown in FIG. 173, wherein similar actions and effects can be brought about.

FIG. 174 through FIG. 176 show one embodiment according to the first through the fifth aspects, the twenty-seventh aspect, the fifty-first aspect, the fifty-third aspect and the fifty-fourth aspect of the invention. FIG. 174 is a view corresponding to FIG. 105 described above, FIG. 175 is a view corresponding to FIG. 106 described above, and FIG. 176 is a view corresponding to FIG. 107 described above. An automatic transmission 260-1 for vehicle differs from the automatic transmission 180-1 for vehicle, which is shown in FIG. 105 through FIG. 107 in the arrangement of the first counter-gear pair CG1 and the second counter-gear pair CG2, which compose the first transmission portion 261, and the construction of the second transmission portion 262-1. That is, in the first transmission portion 261, the second counter-gear pair CG2 is disposed at the engine 8 side from the first counter-gear pair CG1, and the first counter-gear pair CG1 and the second counter-gear pair CG2 are disposed in a state where the second planetary gear set 264, the third planetary gear set 266 and the fourth planetary gear set 268 are placed therebetween. Also, the second transmission portion 262-1 is composed mainly of a single-pinion type second planetary gear set 264, a double-pinion type third planetary gear set 266 and a single-pinion type fourth planetary gear set 268, wherein the first rotary element RM1 is composed of the sun gear S2 of the second planetary gear set 264 and the sun gear S4 of the fourth planetary gear set 268 connected to each other, the second rotary element RM2 is composed of the carrier CA2 of the second planetary gear set 264 and the sun gear S3 of the third planetary gear set 266 connected to each other, the third rotary element RM3 is composed of the ring gear R2 of the second planetary gear set 264 and the ring gear R3 of the third planetary gear set 266 connected to each other, the fourth rotary element RM4 is composed of the carrier CA3 of the third planetary gear set 266 and the carrier CA4 of the fourth planetary gear set 268 connected to each other, and the fifth rotary element RM5 is composed of the ring gear R4 of the fourth planetary gear set 268. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

In this case, as shown in FIG. 175, eight forward gear stages from the first gear stage [1st] to the eighth gear stage [8th] and one reverse gear stage [Rev1] are established in accordance with the same operation table as that in FIG. 106. As shown with an alternate long and short dashed line in FIG. 176, where the second clutch C2 and the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 264, the third planetary gear set 266 and the fourth planetary gear set 268. For example, where the speed reduction ratio of the first counter-gear pair CG1 is [1.000], that of the second counter-gear pair CG2 is [1.745], and ρ2 is 0.300, ρ3 is 0.545 and ρ4 is 0.301, the same collinear chart as that in FIG. 107 can be secured as shown in FIG. 176, and the same transmission ratios as those in FIG. 106 can be obtained as shown in FIG. 175, wherein actions and effects similar to those of the embodiment shown in FIG. 105 through FIG. 107 can be brought about.

FIG. 177 through FIG. 179 show one embodiment according to the first through the fourth aspects, the sixth aspect, the twenty-seventh aspect, and the fifty-second through the fifty-fourth aspects of the invention. FIG. 177 is a view corresponding to FIG. 105 described above, FIG. 178 is a view corresponding to FIG. 106 described above, and FIG. 179 is a view corresponding to FIG. 107 described above. The automatic transmission 260-4 for vehicle differs from the automatic transmission 260-1 for vehicle, which is shown in FIG. 174 through FIG. 176, in that the first rotary element RM1 (Sun gears S2 and S4) of the second transmission portion 262-4 and the second rotary element RM2 (Carrier CA2 and sun gear S3) thereof are selectively connected integral with each other via the fourth clutch C4. However, as shown in FIG. 178, eight forward gear stages from the first gear stage [1st] to the eighth gear stage [8th] and one reverse gear stage [Rev1] are established in accordance with the same operation table as that in FIG. 175, and at the same time, the same collinear chart as that in FIG. 176 can be obtained as shown in FIG. 179, wherein similar actions and effects can be brought about.

FIG. 180 through FIG. 182 show one embodiment according to the first through the fifth aspects, the twenty-eighth aspect, the fifty-first aspect, the fifty-third aspect and the fifty-fourth aspect of the invention. FIG. 180 is a view corresponding to FIG. 105 described above, FIG. 181 is a view corresponding to FIG. 106 described above, and FIG. 182 is a view corresponding to FIG. 107 described above. An automatic transmission 270-1 for vehicle differs from the automatic transmission 180-1 for vehicle, which is shown in FIG. 105 through FIG. 107 in the arrangement of the first counter-gear pair CG1 and the second counter-gear pair CG2, which compose the first transmission portion 271, and the construction of the second transmission portion 272-1. That is, in the first transmission portion 271, the second counter-gear pair CG2 is disposed at the engine 8 side from the first counter-gear pair CG1, and the first counter-gear pair CG1 and the second counter-gear pair CG2 are disposed in a state where the second planetary gear set 274, the third planetary gear set 276 and the fourth planetary gear set 278 are placed therebetween. Also, the second transmission portion 272-1 is composed mainly of a single-pinion type second planetary gear set 274, a single-pinion type third planetary gear set 276 and a single-pinion type fourth planetary gear set 278, wherein the first rotary element RM1 is composed of the sun gear S2 of the second planetary gear set 274, the second rotary element RM2 is composed of the carrier CA2 of the second planetary gear set 274 and the ring gear R3 of the third planetary gear set 276 connected to each other, the third rotary element RM3 is composed of the ring gear R2 of the second planetary gear set 274, the carrier CA3 of the third planetary gear set 276 and the carrier CA4 of the fourth planetary gear set 278 connected to each other, the fourth rotary element RM4 is composed of the ring gear R4 of the fourth planetary gear set 278, and the fifth rotary element RM5 is composed of the sun gear S3 of the third planetary gear set 276 and the sun gear S4 of the fourth planetary gear set 278 connected to each other. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

Also, in the third planetary gear set 276 and the fourth planetary gear set 278, the third carrier CA3 and the fourth carrier CA4 are composed of a common part, and the third sun gear S3 and the fourth sun gear S4 are composed of a common part. And, it may be a planetary gear row in which the third planetary gear P3 is concurrently used as any one of a pair of the fourth planetary gears P4 engageable with each other. Also, the above-described third planetary gear P3 may have different diameters (number of teeth) at the fourth planetary gear set 278 side and the third planetary gear set 276 side.

In this case, as shown in FIG. 181, eight forward gear stages from the first gear stage [1st] to the eighth gear stage [8th] and one reverse gear stage [Rev1] are established in accordance with the same operation table as that in FIG. 106. As shown with an alternate long and short dashed line in FIG. 182, where the second clutch C2 and the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 274, the third planetary gear set 276 and the fourth planetary gear set 278. For example, where the speed reduction ratio of the first counter-gear pair CG1 is [1.000], that of the second counter-gear pair CG2 is [1.745], and ρ2 is 0.300, ρ3 is 0.349 and ρ4 is 0.419, the same collinear chart as that in FIG. 107 can be secured as shown in FIG. 182, and the same transmission ratios as those in FIG. 106 can be obtained as shown in FIG. 181, wherein actions and effects similar to those of the embodiment shown in FIG. 105 through FIG. 107 can be brought about.

FIG. 183 through FIG. 185 show one embodiment according to the first through the fourth aspects, the sixth aspect, the twenty-eighth aspect, and the fifty-second through the fifty-fourth aspects of the invention. FIG. 183 is a view corresponding to FIG. 105 described above, FIG. 184 is a view corresponding to FIG. 106 described above, and FIG. 185 is a view corresponding to FIG. 107 described above. The automatic transmission 270-4 for vehicle differs from the automatic transmission 270-1 for vehicle, which is shown in FIG. 180 through FIG. 182, in that the first rotary element RM1 (Sun gear S2) of the second transmission portion 272-4 and the second rotary element RM2 (Carrier CA2 and ring gear R3) thereof are selectively connected integral with each other via the fourth clutch C4. However, as shown in FIG. 184, eight forward gear stages from the first gear stage [1st] to the eighth gear stage [8th] and one reverse gear stage [Rev1] are established in accordance with the same operation table as that in FIG. 181, and at the same time, the same collinear chart as that in FIG. 182 can be obtained as shown in FIG. 185, wherein similar actions and effects can be brought about.

FIG. 186 through FIG. 188 show one embodiment according to the first through the fifth aspects, the twenty-ninth aspect, the fifty-first aspect, the fifty-third aspect and the fifty-fourth aspect of the invention. FIG. 186 is a view corresponding to FIG. 105 described above, FIG. 187 is a view corresponding to FIG. 106 described above, and FIG. 188 is a view corresponding to FIG. 107 described above. An automatic transmission 280-1 for vehicle differs from the automatic transmission 180-1 for vehicle, which is shown in FIG. 105 through FIG. 107 in the arrangement of the first counter-gear pair CG1 and the second counter-gear pair CG2, which compose the first transmission portion 281, and the construction of the second transmission portion 282-1. That is, in the first transmission portion 281, the second counter-gear pair CG2 is disposed at the engine 8 side from the first counter-gear pair CG1, and the first counter-gear pair CG1 and the second counter-gear pair CG2 are disposed in a state where the second planetary gear set 284, the third planetary gear set 286 and the fourth planetary gear set 288 are placed therebetween. Also, the second transmission portion 282-1 is composed mainly of a single-pinion type second planetary gear set 284, a single-pinion type third planetary gear set 286 and a double-pinion type fourth planetary gear set 288, wherein the first rotary element RM1 is composed of the sun gear S3 of the third planetary gear set 286, the second rotary element RM2 is composed of the ring gear R2 of the second planetary gear set 284, the carrier CA3 of the third planetary gear set 286 and the carrier CA4 of the fourth planetary gear set 288 connected to each other, the third rotary element RM3 is composed of the carrier CA2 of the second planetary gear set 284, the ring gear R3 of the third planetary gear set 286 and the ring gear R4 of the fourth planetary gear set 288 connected to each other, the fourth rotary element RM4 is composed of the sun gear S4 of the fourth planetary gear set 288, and the fifth rotary element RM5 is composed of the sun gear S2 of the second planetary gear set 284. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107.

Also, in the third planetary gear set 286 and the fourth planetary gear set 288, the third carrier CA3 and the fourth carrier CA4 are composed of a common part, and the third ring gear R3 and the fourth ring gear R4 are composed of a common part. And, it may be a Ravigneaux type planetary gear row in which the third planetary gear P3 is concurrently used as any one of a pair of the fourth planetary gears P4 engageable with each other. Also, the above-described third planetary gear P3 may have different diameters (number of teeth) at the fourth planetary gear set 288 side and the third planetary gear set 286 side.

In this case, as shown in FIG. 187, eight forward gear stages from the first gear stage [1st] to the eighth gear stage [8th] and one reverse gear stage [Rev1] are established in accordance with the same operation table as that in FIG. 106. As shown with an alternate long and short dashed line in FIG. 188, where the second clutch C2 and the fourth clutch C4 are engaged with each other, the first rotary element RM1 is connected to the driven gear CG2B and is rotated with its rotation speed reduced, and the third rotary element RM3 is connected to the driven gear CG1B and is rotated at the rotation speed [1.0], another intermediate gear stage is brought about between the sixth gear stage [6th] and the seventh gear stage [7th], thereby enabling nine gear stages in total. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 284, the third planetary gear set 286 and the fourth planetary gear set 288. For example, where the speed reduction ratio of the first counter-gear pair CG1 is [1.000], that of the second counter-gear pair CG2 is [1.745], and ρ2 is 0.349, ρ3 is 0.300 and ρ4 is 0.455, the same collinear chart as that in FIG. 107 can be secured as shown in FIG. 188, and the same transmission ratios as those in FIG. 106 can be obtained as shown in FIG. 187, wherein actions and effects similar to those of the embodiment shown in FIG. 105 through FIG. 107 can be brought about.

FIG. 189 through FIG. 191 show one embodiment according to the first through the fourth aspects, the sixth aspect, the twenty-ninth aspect, and the fifty-second through the fifty-fourth aspects of the invention. FIG. 189 is a view corresponding to FIG. 105 described above, FIG. 190 is a view corresponding to FIG. 106 described above, and FIG. 191 is a view corresponding to FIG. 107 described above. The automatic transmission 280-4 for vehicle differs from the automatic transmission 280-1 for vehicle, which is shown in FIG. 186 through FIG. 188, in that the third rotary element RM3 (Carrier CA2, ring gear R3 and ring gear R4) of the second transmission portion 282-4 and the fifth rotary element RM5 (Sun gear S2) thereof are selectively connected integral with each other via the fourth clutch C4. However, as shown in FIG. 190, eight forward gear stages from the first gear stage [1st] to the eighth gear stage [8th] and one reverse gear stage [Rev1] are established in accordance with the same operation table as that in FIG. 187, and at the same time, the same collinear chart as that in FIG. 188 can be obtained as shown in FIG. 191, wherein similar actions and effects can be brought about.

FIG. 192 through FIG. 194 show one embodiment according to the first through the fifth aspects, the thirtieth aspect, the fifty-first aspect, the fifty-third aspect and the fifty-fourth aspect of the invention. FIG. 192 is a view corresponding to FIG. 105 described above, FIG. 193 is a view corresponding to FIG. 106 described above, and FIG. 194 is a view corresponding to FIG. 107 described above. An automatic transmission 290-1 for vehicle differs from the automatic transmission 180-1 for vehicle, which is shown in FIG. 105 through FIG. 107 in the arrangement of the first counter-gear pair CG1 and the second counter-gear pair CG2, which compose the first transmission portion 291, and the construction of the second transmission portion 292-1. That is, in the first transmission portion 291, the first counter-gear pair CG1 is disposed at the engine 8 side from the second counter-gear pair CG2, and the first counter-gear pair CG1 and the second counter-gear pair CG2 are disposed in a state where the second planetary gear set 294, the third planetary gear set 296 and the fourth planetary gear set 298 are placed therebetween. Also, the second transmission portion 292-1 is composed mainly of a single-pinion type second planetary gear set 294, a single-pinion type third planetary gear set 296 and a double-pinion type fourth planetary gear set 298, wherein the first rotary element RM1 is composed of the sun gear S2 of the second planetary gear set 294 and the sun gear S3 of the third planetary gear set 296 connected to each other, the second rotary element RM2 is composed of the carrier CA4 of the fourth planetary gear set 298, the third rotary element RM3 is composed of the carrier CA3 of the third planetary gear set 296 and the ring gear R4 of the fourth planetary gear set 298 connected to each other, the fourth rotary element RM4 is composed of the carrier CA2 of the second planetary gear set 294, the ring gear R3 of the third planetary gear set 296 and the sun gear S4 of the fourth planetary gear set 298 connected to each other, and the fifth rotary element RM5 is composed of the ring gear R2 of the second planetary gear set 294. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 105 through FIG. 107. However, as shown in the collinear chart of FIG. 194, the intervals of the respective five vertical lines of the second transmission portion 292-1 are different from those of the embodiment shown in FIG. 107. The intervals of these vertical lines are determined by the respective gear ratios ρ2 through ρ4 of the second planetary gear set 294, the third planetary gear set 296 and the fourth planetary gear set 298 as in FIG. 107. And, FIG. 194 shows a case where ρ2 is 0.341, ρ3 is 0.314 and ρ4 is 0.431.

In this case, as shown in FIG. 193, eight forward gear stages from the first gear stage [1st] to the eighth gear stage [8th] and one reverse gear stage [Rev1] are established in accordance with the same operation table as that in FIG. 106. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 294, the third planetary gear set 296 and the fourth planetary gear set 298. For example, where the speed reduction ratio of the first counter-gear pair CG1 is [1.000], that of the second counter-gear pair CG2 is [1.745], and ρ2 is 0.341, ρ3 is 0.314 and ρ4 is 0.431, the transmission ratios shown in FIG. 193 can be obtained, wherein values of the gear ratio steps (ratios of the transmission ratios between the respective gear stages) are substantially appropriate, and the total range (=4.261/0.580) of the transmission ratios is large to become 7.343, and further the transmission ratio of the reverse gear stage [Rev1] is adequate. Appropriate transmission ratio characteristics can be obtained as a whole. Therefore, since it is considered that the transmission ratio characteristics are substantially identical to those of the embodiment in FIG. 105 through FIG. 107, actions and effects similar to those of the embodiment in FIG. 105 through FIG. 107 can be obtained.

FIG. 195 through FIG. 197 show one embodiment according to the first through the fourth aspects, the sixth aspect, the thirtieth aspect, and the fifty-second through the fifty-fourth aspects of the invention. FIG. 195 is a view corresponding to FIG. 105 described above, FIG. 196 is a view corresponding to FIG. 106 described above, and FIG. 197 is a view corresponding to FIG. 107 described above. The automatic transmission 290-4 for vehicle differs from the automatic transmission 290-1 for vehicle, which is shown in FIG. 192 through FIG. 194, in that the first rotary element RM1 (Sun gears S2 and S3) of the second transmission portion 292-4 and the fourth rotary element RM4 (Carrier CA2, ring gear R3 and sun gear S4) thereof are selectively connected integral with each other via the fourth clutch C4. However, as shown in FIG. 196, eight forward gear stages from the first gear stage [1st] to the eighth gear stage [8th] and one reverse gear stage [Rev1] are established in accordance with the same operation table as that in FIG. 193, and at the same time, the same collinear chart as that in FIG. 194 can be obtained as shown in FIG. 197, wherein similar actions and effects can be brought about.

FIG. 198 through FIG. 200 show one embodiment according to the first through the fifth aspects, the thirty-first aspect, the fifty-first aspect, the fifty-third aspect and the fifty-fourth aspect of the invention. FIG. 198 is a view corresponding to FIG. 105 described above, FIG. 199 is a view corresponding to FIG. 106 described above, and FIG. 200 is a view corresponding to FIG. 107 described above. An automatic transmission 300-1 for vehicle differs from the automatic transmission 290-1 for vehicle, which is shown in FIG. 192 through FIG. 194 in the construction of the second transmission portion 302-1 while both of the automatic transmissions have the same construction in the first transmission portion 301. That is, the second transmission portion 302-1 is composed mainly of a single-pinion type second planetary gear set 304, a single-pinion type third planetary gear set 306 and a double-pinion type fourth planetary gear set 308, wherein the first rotary element RM1 is composed of the sun gear S2 of the second planetary gear set 304 and the sun gear S3 of the third planetary gear set 306 connected to each other, the second rotary element RM2 is composed of the sun gear S4 of the fourth planetary gear set 308, the third rotary element RM3 is composed of the carrier CA3 of the third planetary gear set 306 and the ring gear R4 of the fourth planetary gear set 308 connected to each other, the fourth rotary element RM4 is composed of the carrier CA2 of the second planetary gear set 304, the ring gear R3 of the third planetary gear set 306 and the carrier CA4 of the fourth planetary gear set 308 connected to each other, and the fifth rotary element RM5 is composed of the ring gear R2 of the second planetary gear set 304. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 192 through FIG. 194.

In this case, as shown in FIG. 199, eight forward gear stages from the first gear stage [1st] to the eighth gear stage [8th] and one reverse gear stage [Rev1] are established in accordance with the same operation table as that in FIG. 193. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 304, the third planetary gear set 306 and the fourth planetary gear set 308. For example, where the speed reduction ratio of the first counter-gear pair CG1 is [1.000], that of the second counter-gear pair CG2 is [1.745], and ρ2 is 0.341, ρ3 is 0.314 and ρ4 is 0.569, the same collinear chart as that in FIG. 194 can be obtained as shown in FIG. 200, wherein actions and effects similar to those of the embodiment shown in FIG. 192 through FIG. 194 can be obtained.

FIG. 201 through FIG. 203 show one embodiment according to the first through the fourth aspects, the sixth aspect, the thirty-first aspect, and the fifty-second through the fifty-fourth aspects of the invention. FIG. 201 is a view corresponding to FIG. 105 described above, FIG. 202 is a view corresponding to FIG. 106 described above, and FIG. 203 is a view corresponding to FIG. 107 described above. The automatic transmission 300-4 for vehicle differs from the automatic transmission 300-1 for vehicle, which is shown in FIG. 198 through FIG. 200, in that the first rotary element RM1 (Sun gears S2 and S3) of the second transmission portion 302-4 and the fourth rotary element RM4 (Carrier CA2, ring gear R3 and carrier CA4) thereof are selectively connected integral with each other via the fourth clutch C4. However, as shown in FIG. 202, eight forward gear stages from the first gear stage [1st] to the eighth gear stage [8th] and one reverse gear stage [Rev1] are established in accordance with the same operation table as that in FIG. 199, and at the same time, the same collinear chart as that in FIG. 200 can be obtained as shown in FIG. 203, wherein similar actions and effects can be brought about.

FIG. 204 through FIG. 206 show one embodiment according to the first through the fifth aspects, the thirty-second aspect, the fifty-first aspect, the fifty-third aspect and the fifty-fourth aspect of the invention. FIG. 204 is a view corresponding to FIG. 105 described above, FIG. 205 is a view corresponding to FIG. 106 described above, and FIG. 206 is a view corresponding to FIG. 107 described above. An automatic transmission 310-1 for vehicle differs from the automatic transmission 250-2 for vehicle, which is shown in FIG. 168 through FIG. 170 in the construction of the second transmission portion 312-2 while both of the automatic transmissions have the same construction in the first transmission portions 311. That is, the second transmission portion 312-2 is composed mainly of a single-pinion type second planetary gear set 314, a single-pinion type third planetary gear set 316 and a double-pinion type fourth planetary gear set 318, wherein the first rotary element RM1 is composed of the sun gear S2 of the second planetary gear set 314 and the sun gear S3 of the third planetary gear set 316 connected to each other, the second rotary element RM2 is composed of the carrier CA2 of the second planetary gear set 314, the third rotary element RM3 is composed of the ring gear R2 of the second planetary gear set 314, the carrier CA3 of the third planetary gear set 316 and the sun gear S4 of the fourth planetary gear set 318 connected to each other, the fourth rotary element RM4 is composed of the ring gear R3 of the third planetary gear set 316 and the ring gear R4 of the fourth planetary gear set 318 connected to each other, and the fifth rotary element RM5 is composed of the carrier CA4 of the fourth planetary gear set 318. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 168 through FIG. 170. However, as shown in the collinear chart of FIG. 206, the intervals of the respective five vertical lines of the second transmission portion 312-2 are different from those of the embodiment shown in FIG. 170. The intervals of these vertical lines are determined by the respective gear ratios ρ2 through ρ4 of the second planetary gear set 314, the third planetary gear set 316 and the fourth planetary gear set 318 as in FIG. 170. And, FIG. 206 shows a case where ρ2 is 0.312, ρ3 is 0.314 and ρ4 is 0.588.

In this case, as shown in FIG. 205, eight forward gear stages from the first gear stage [1st] to the eighth gear stage [8th] and one reverse gear stage [Rev1] are established in accordance with the same operation table as that in FIG. 169. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 314, the third planetary gear set 316 and the fourth planetary gear set 318. For example, where the speed reduction ratio of the first counter-gear pair CG1 is [1.000], that of the second counter-gear pair CG2 is [1.745], and ρ2 is 0.312, ρ3 is 0.314 and ρ4 is 0.588, the transmission ratios shown in FIG. 205 can be obtained. The gear ratio steps (ratios of the transmission ratios between the respective gear stages) are substantially appropriate, and the total range (=4.261/0.580) of the transmission ratios is large to become 7.343, and further the transmission ratio of the reverse gear stage [Rev1] is adequate. Appropriate transmission ratio characteristics can be obtained as a whole. Therefore, since it is considered that the transmission ratio characteristics are substantially identical to those of the embodiment in FIG. 168 through FIG. 170, actions and effects similar to those of the embodiment in FIG. 168 and FIG. 170, that is, actions and effects similar to those of the embodiment in FIG. 105 through FIG. 107 can be obtained. In addition, as shown in FIG. 205 and FIG. 206, in the automatic transmission 310-2 for vehicle, the fourth clutch CA4 and the third brake B3 are engaged with each other as shown in FIG. 169 and FIG. 170, the first rotary element RM1 is rotated integral with the input shaft 24, and the third rotary element RM3 is brought to a stationary state, wherein the fourth rotary element RM4 is reversed at a rotation speed [Rev2], and the second reverse gear stage [Rev2] is established in addition to the first reverse gear stage [Rev1].

FIG. 207 through FIG. 209 show one embodiment according to the first through the fourth aspects, the sixth aspect, the thirty-second aspect, and the fifty-second through the fifty-fourth aspects of the invention. FIG. 207 is a view corresponding to FIG. 105 described above, FIG. 208 is a view corresponding to FIG. 106 described above, and FIG. 209 is a view corresponding to FIG. 107 described above. The automatic transmission 310-4 for vehicle differs from the automatic transmission 310-2 for vehicle, which is shown in FIG. 204 through FIG. 206, in that the first rotary element RM1 (Sun gears S2 and S3) of the second transmission portion 312-4 and the second rotary element RM2 (Carrier CA2) thereof are selectively connected integral with each other via the fourth clutch C4. However, as shown in FIG. 208, eight forward gear stages from the first gear stage [1st] to the eighth gear stage [8th] and one reverse gear stage [Rev1] are established in accordance with the same operation table as that in FIG. 205, and at the same time, the same collinear chart as that in FIG. 206 can be obtained as shown in FIG. 209, wherein similar actions and effects can be brought about.

FIG. 210 through FIG. 212 show one embodiment according to the first through the fifth aspects, the thirty-third aspect, the fifty-first aspect, the fifty-third aspect and the fifty-fourth aspect of the invention. FIG. 210 is a view corresponding to FIG. 105 described above, FIG. 211 is a view corresponding to FIG. 106 described above, and FIG. 212 is a view corresponding to FIG. 107 described above. An automatic transmission 320-2 for vehicle differs from the automatic transmission 310-2 for vehicle, which is shown in FIG. 204 through FIG. 207 in the arrangement of the first counter-gear pair CG1 and the second counter-gear pair CG2, which compose the first transmission portion 321, and the construction of the second transmission portion 322-2. That is, in the first transmission portion 321, the first counter-gear pair CG1 is disposed at the engine 8 side from the second counter-gear pair CG2. Also, the second transmission portion 322-2 is composed mainly of a double-pinion type second planetary gear set 324, a single-pinion type third planetary gear set 326 and a single-pinion type fourth planetary gear set 328, wherein the first rotary element RM1 is composed of the sun gear S2 of the second planetary gear set 324, the sun gear S3 of the third planetary gear set 326 and the sun gear S4 of the fourth planetary gear set 328 connected to each other, the second rotary element RM2 is composed of the carrier CA4 of the fourth planetary gear set 328, the third rotary element. RM3 is composed of the ring gear R2 of the second planetary gear set 324, the carrier CA3 of the third planetary gear set 326 and the ring gear R4 of the fourth planetary gear set 328 connected to each other, the fourth rotary element RM4 is composed of the ring gear R3 of the third planetary gear set 326, and the fifth rotary element RM5 is composed of the carrier CA2 of the second planetary gear set 324. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 204 through FIG. 206.

In this case, as shown in FIG. 211, eight forward gear stages from the first gear stage [1st] to the eighth gear stage [8th] and one reverse gear stage [Rev1] are established in accordance with the same operation table as that in FIG. 205. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 324, the third planetary gear set 326 and the fourth planetary gear set 328. For example, where the speed reduction ratio of the first counter-gear pair CG1 is [1.000], that of the second counter-gear pair CG2 is [1.745], and ρ2 is 0.312, ρ3 is 0.314 and ρ4 is 0.433, the same collinear chart as that of FIG. 206 is obtained as in FIG. 212, and the same transmission ratios as those shown in FIG. 205 can be obtained as in FIG. 211, wherein actions and effects similar to those of the embodiment in FIG. 204 and FIG. 206 can be obtained. Also, as shown in FIG. 211 and FIG. 212, in the automatic transmission 320-2 for vehicle, the fourth clutch C4 and the third brake B3 are engaged with each other as shown in FIG. 205 and FIG. 206, the first rotary element RM1 is rotated integral with the input shaft 24, and the third rotary element RM3 is brought to a stationary state, wherein the fourth rotary element RM4 is reversed at a rotation speed [Rev2], and the second reverse gear stage [Rev2] can be established in addition to the first reverse gear stage [Rev1].

FIG. 213 through FIG. 215 show one embodiment according to the first through the fourth aspects, the sixth aspect, the thirty-third aspect, and the fifty-second through the fifty-fourth aspects of the invention. FIG. 213 is a view corresponding to FIG. 105 described above, FIG. 214 is a view corresponding to FIG. 106 described above, and FIG. 215 is a view corresponding to FIG. 107 described above. The automatic transmission 320-4 for vehicle differs from the automatic transmission 320-2 for vehicle, which is shown in FIG. 210 through FIG. 212, in that the first rotary element RM1 (Sun gears S2, S3 and S4) of the second transmission portion 322-4 and the fifth rotary element RM5 (Carrier CA2) thereof are selectively connected integral with each other via the fourth clutch C4. However, as shown in FIG. 214, eight forward gear stages from the first gear stage [1st] to the eighth gear stage [8th] and one reverse gear stage [Rev1] are established in accordance with the same operation table as that in FIG. 211, and at the same time, the same collinear chart as that in FIG. 212 can be obtained as shown in FIG. 215, wherein similar actions and effects can be brought about.

FIG. 216 through FIG. 218 show one embodiment according to the first through the fifth aspects, the thirty-fourth aspect, the fifty-first aspect, the fifty-third aspect and the fifty-fourth aspect of the invention. FIG. 216 is a view corresponding to FIG. 105 described above, FIG. 217 is a view corresponding to FIG. 106 described above, and FIG. 218 is a view corresponding to FIG. 107 described above. An automatic transmission 330-2 for vehicle differs from the automatic transmission 310-2 for vehicle, which is shown in FIG. 204 through FIG. 206 in the construction of the second transmission portion 332-2 while both of the automatic transmissions have the same construction in the first transmission portion 331. That is, the second transmission portion 332-2 is composed mainly of a single-pinion type second planetary gear set 334, a single-pinion type third planetary gear set 336 and a double-pinion type fourth planetary gear set 338, wherein the first rotary element RM1 is composed of the sun gear S2 of the second planetary gear set 334 and the sun gear S3 of the third planetary gear set 336 connected to each other, the second rotary element RM2 is composed of the carrier CA2 of the second planetary gear set 334, the third rotary element RM3 is composed of the ring gear R2 of the second planetary gear set 334, the carrier CA3 of the third planetary gear set 336 and the carrier CA4 of the fourth planetary gear set 338, the fourth rotary element RM4 is composed of the ring gear R3 of the third planetary gear set-336 and the ring gear R4 of the fourth planetary gear set 338, and the fifth rotary element RM5 is composed of the sun gear S4 of the fourth planetary gear set 338. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 204 through FIG. 206.

In this case, as shown in FIG. 217, eight forward gear stages from the first gear stage [1st] to the eighth gear stage [8th] and one reverse gear stage [Rev1] are established in accordance with the same operation table as that in FIG. 205. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 334, the third planetary gear set 336 and the fourth planetary gear set 338. For example, where the speed reduction ratio of the first counter-gear pair CG1 is [1.000], that of the second counter-gear pair CG2 is [1.745], and ρ2 is 0.312, ρ3 is 0.314 and ρ4 is 0.412, the same collinear chart as that in FIG. 206 can be obtained as shown in FIG. 218, and the same transmission ratios as those shown in FIG. 205 can be obtained as in FIG. 217, wherein actions and effects similar to those of the embodiment shown in FIG. 204 through FIG. 206 can be obtained. In addition, in the automatic transmission 330-2 for vehicle, as shown in FIG. 217 and FIG. 218, the fourth clutch C4 and the third clutch C3 are engaged with each other as shown in FIG. 205 and FIG. 206, the first rotation element RM1 is rotated integral with the input shaft 24, and the third rotary element RM3 is brought to a stationary state, wherein the fourth rotary element RM4 is reversed at a rotation speed [Rev2], and the second reverse gear stage [Rev2] maybe established in addition to the first reverse gear stage [Rev1].

FIG. 219 through FIG. 221 show one embodiment according to the first through the fourth aspects, the sixth aspect, the thirty-fourth aspect, and the fifty-second through the fifty-fourth aspects of the invention. FIG. 219 is a view corresponding to FIG. 105 described above, FIG. 220 is a view corresponding to FIG. 106 described above, and FIG. 221 is a view corresponding to FIG. 107 described above. The automatic transmission 330-4 for vehicle differs from the automatic transmission 330-2 for vehicle, which is shown in FIG. 216 through FIG. 218, in that the first rotary element RM1 (Sun gears S2 and S3) of the second transmission portion 332-4 and the second rotary element RM2 (Carrier CA2) thereof are selectively connected integral with each other via the fourth clutch C4. However, as shown in FIG. 220, eight forward gear stages from the first gear stage [1st] to the eighth gear stage [8th] and one reverse gear stage [Rev1] are established in accordance with the same operation table as that in FIG. 217, and at the same time, the same collinear chart as that in FIG. 218 can be obtained as shown in FIG. 221, wherein similar actions and effects can be brought about.

FIG. 222 through FIG. 224 show one embodiment according to the first through the fifth aspects, the thirty-fifth aspect, the fifty-first aspect, the fifty-third aspect and the fifty-fourth aspect of the invention. FIG. 222 is a view corresponding to FIG. 105 described above, FIG. 223 is a view corresponding to FIG. 106 described above, and FIG. 224 is a view corresponding to FIG. 107 described above. An automatic transmission 340-2 for vehicle differs from the automatic transmission 310-2 for vehicle, which is shown in FIG. 204 through FIG. 206 in the construction of the second transmission portion 342-2 while both of the automatic transmissions have the same construction in the first transmission portion 341. That is, the second transmission portion 342-2 is composed mainly of a single-pinion type second planetary gear set 344, a single-pinion type third planetary gear set 346 and a single-pinion type fourth planetary gear set 348, wherein the first rotary element RM1 is composed of the sun gear S2 of the second planetary gear set 344, the sun gear S3 of the third planetary gear set 346 and the sun gear S4 of the fourth planetary gear set 348 connected to each other, the second rotary element RM2 is composed of the carrier CA2 of the second planetary gear set 344, the third rotary element RM3 is composed of the ring gear R2 of the second planetary gear set 344 and the carrier CA3 of the third planetary gear set 346, the fourth rotary element RM4 is composed of the ring gear R3 of the third planetary gear set 346 and the carrier CA4 of the fourth planetary gear set 348, and the fifth rotary element RM5 is composed of the ring gear R4 of the fourth planetary gear set 348. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 204 through FIG. 206.

In this case, as shown in FIG. 223, eight forward gear stages from the first gear stage [1st] to the eighth gear stage [8th] and one reverse gear stage [Rev1] are established in accordance with the same operation table as that in FIG. 205. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 344, the third planetary gear set 346 and the fourth planetary gear set 348. For example, where the speed reduction ratio of the first counter-gear pair CG1 is [1.000], that of the second counter-gear pair CG2 is [1.745], and ρ2 is 0.312, ρ3 is 0.314 and ρ4 is 0.341, the same collinear chart as that in FIG. 206 can be obtained as shown in FIG. 224, and the same transmission ratios as those shown in FIG. 205 can be obtained as in FIG. 223, wherein actions and effects similar to those of the embodiment shown in FIG. 204 through FIG. 206 can be obtained. In addition, in the automatic transmission 340-2 for vehicle, as shown in FIG. 223 and FIG. 224, the fourth clutch C4 and the third brake B3 are engaged with each other as shown in FIG. 205 and FIG. 206, the first rotation element RM1 is rotated integral with the input shaft 24, and the third rotary element RM3 is brought to a stationary state, wherein the fourth rotary element RM4 is reversed at a rotation speed [Rev2], and the second reverse gear stage [Rev2] may be established in addition to the first reverse gear stage [Rev1].

FIG. 225 through FIG. 227 show one embodiment according to the first through the fourth aspects, the sixth aspect, the thirty-fifth aspect, and the fifty-second through the fifty-fourth aspects of the invention. FIG. 225 is a view corresponding to FIG. 105 described above, FIG. 226 is a view corresponding to FIG. 106 described above, and FIG. 227 is a view corresponding to FIG. 107 described above. The automatic transmission 340-4 for vehicle differs from the automatic transmission 340-2 for vehicle, which is shown in FIG. 222 through FIG. 224, in that the first rotary element RM1 (Sun gears S2, S3 and S4) of the second transmission portion 342-4 and the second rotary element RM2 (Carrier CA2) thereof are selectively connected integral with each other via the fourth clutch C4. However, as shown in FIG. 226, eight forward gear stages from the first gear stage [1st] to the eighth gear stage [8th] and one reverse gear stage [Rev1] are established in accordance with the same operation table as that in FIG. 223, and at the same time, the same collinear chart as that in FIG. 224 can be obtained as shown in FIG. 227, wherein similar actions and effects can be brought about.

FIG. 228 through FIG. 230 show one embodiment according to the first through the fifth aspects, the thirty-sixth aspect, the fifty-first aspect, the fifty-third aspect and the fifty-fourth aspect of the invention. FIG. 228 is a view corresponding to FIG. 105 described above, FIG. 229 is a view corresponding to FIG. 106 described above, and FIG. 230 is a view corresponding to FIG. 107 described above. An automatic transmission 350-3 for vehicle differs from the automatic transmission 180-3 for vehicle, which is shown in FIG. 111 through FIG. 113 in the arrangement of the first counter-gear pair CG1 and the second counter-gear-pair CG2, which compose the first transmission portion 351, and the construction of the second transmission portion 352-3. That is, in the first transmission portion 351, the second counter-gear pair CG2 is disposed at the engine 8 side from the first counter-gear pair CG1, and the first counter-gear pair CG1 and the second counter-gear pair CG2 are disposed in a state where the second planetary gear set 354, the third planetary gear set 356 and the fourth planetary gear set 358 are placed therebetween. Also, the second transmission portion 352-3 is composed mainly of a double-pinion type second planetary gear set 354, a single-pinion type third planetary gear set 356 and a single-pinion type fourth planetary gear set 358, wherein the first rotary element RM1 is composed of the sun gear S4 of the fourth planetary gear set 358, the second rotary element RM2 is composed of the carrier CA2 of the second planetary gear set 354 and the ring gear R3 of the third planetary gear set 356 connected to each other, the third rotary element RM3 is composed of the carrier CA3 of the third planetary gear set 356 and the carrier CA4 of the fourth planetary gear set 358 connected to each other, the fourth rotary element RM4 is composed of the ring gear R2 of the second planetary gear set 354 and the ring gear R4 of the fourth planetary gear set 358 connected to each other, and the fifth rotary element RM5 is composed of the sun gear S2 of the second planetary gear set 354 and the sun gear S3 of the third planetary gear set 356 connected to each other. Also, mutual connections between the respective rotary elements RM1 through RM5 by means of the clutches C1 through C4 and brakes B1 through B3, and connections between the casing 32, the driven gear CG1B functioning as the first intermediate output path M1, the driven gear CG2B functioning as the second intermediate output path M2, and the output gear 26 are the same as those of the embodiment of FIG. 111 through FIG. 113. However, as shown in the collinear chart of FIG. 230, the intervals of the respective five vertical lines of the second transmission portion 352-3 are different from those of the embodiment shown in FIG. 113. The intervals of these vertical lines are determined by the respective gear ratios ρ2 through ρ4 of the second planetary gear set 354, the third planetary gear set 356 and the fourth planetary gear set 358 as in FIG. 113. And, FIG. 230 shows a case where ρ2 is 0.552, ρ3 is 0.312 and ρ4 is 0.314.

In this case, as shown in FIG. 129, eight forward gear stages from the first gear stage [1st] to the eighth gear stage [8th] and one reverse gear stage [Rev1] are established in accordance with the same operation table as that in FIG. 112. Also, transmission ratios of the respective gear stages are appropriately determined by speed reduction ratios of the first counter-gear pair CG1 and the second counter-gear pair CG2, and respective gear ratios ρ2 through ρ4 of the second planetary gear set 354, the third planetary gear set 356 and the fourth planetary gear set 358. For example, where the speed reduction ratio of the first counter-gear pair CG1 is [1.000], that of the second counter-gear pair CG2 is [1.745], and ρ2 is 0.552, ρ3 is 0.312 and ρ4 is 0.314, the transmission ratios shown in FIG. 229 can be obtained, wherein values of the gear ratio steps (ratios of the transmission ratios between the respective gear stages) are substantially appropriate, and the total range (=4.261/0.580) of the transmission ratios is large to become 7.343, and further the transmission ratio of the reverse gear stage [Rev1] is adequate. Appropriate transmission ratio characteristics can be obtained as a whole. Therefore, since it is considered that the transmission ratio characteristics are substantially identical to those of the embodiment in FIG. 111 through FIG. 113, actions and effects similar to those of the embodiment in FIG. 111 through FIG. 113 , that is, actions and effects similar to those of the embodiment in FIG. 105 through FIG. 107 can be obtained.

FIG. 231 through FIG. 233 show one embodiment according to the first through the fourth aspects, the sixth aspect, the thirty-sixth aspect, and the fifty-second through the fifty-fourth aspects of the invention. FIG. 231 is a view corresponding to FIG. 105 described above, FIG. 232 is a view corresponding to FIG. 106 described above, and FIG. 233 is a view corresponding to FIG. 107 described above. The automatic transmission 350-4 for vehicle differs from the automatic transmission 350-3 for vehicle, which is shown in FIG. 228 through FIG. 230, in that the second rotary element RM2 (Carrier CA2 and ring gear R3) of the second transmission portion 352-4 and the fifth rotary element RM5 (Sun gears S2 and S3) thereof are selectively connected integral with each other via the fourth clutch C4. However, as shown in FIG. 232, eight forward gear stages from the first gear stage [1st] to the eighth gear stage [8th] and one reverse gear stage [Rev1] are established in accordance with the same operation table as that in FIG. 229, and at the same time, the same collinear chart as that in FIG. 230 can be obtained as shown in FIG. 233, wherein similar actions and effects can be brought about.

FIG. 234 through FIG. 236 show one embodiment according to the first through the fourth aspects, and the fifty-third through the fifty-fifth aspects of the invention. FIG. 234 is a schematic view showing an automatic transmission,360 for vehicle, FIG. 235 is an operation table describing engagement elements and transmission ratios when a plurality of gear stages are established, and FIG. 236 is a collinear chart showing rotation speeds of the rotary elements in respective gear stages. The automatic transmission 360 for vehicle differs from the automatic transmission 10-1 for vehicle, which is shown in FIG. 1 and FIG. 2, in that, although the first transmission portions thereof are identical to each other, the fourth clutch is constructed so that a sixth rotary element RM6 is selectively connected to the first intermediate output path PA1 while the fifth planetary gear set 369 is newly provided in the second transmission portion 362 to compose the sixth rotary element RM6. In the present embodiment, the carriers CA2 and CA3 and sun gears S2 and S3 of the second planetary gear set 364 and the third planetary gear set 366 are composed of common members, respectively, and a stepped pinion P2, of the second planetary gear set 364, having a minor-diameter portion and a major-diameter portion is rotatably disposed on the common carriers CA2 and CA3, wherein the minor-diameter portion thereof is engaged with the sun gear S2 and ring gear R2 of the second planetary gear set 364 and a gear portion 367 being the major-diameter portion thereof is engaged with the ring gear R5 of the fifth planetary gear set 369, wherein the stepped pinion P2 of the second planetary gear set 364 is concurrently used as any one of planetary gears P3 of a pair of the third planetary gear set 366, which are engageable with each other. And, as shown in FIG. 236, the sixth rotary element RM6 is composed of the ring gear R5 of the fifth planetary gear set 369 between the second rotary element RM2 and the third rotary element RM3. The intervals therebetween are determined in response to the gear ratio ρ2 of the second planetary gear set 364, gear ratio ρ3 of the third planetary gear set 366 and gear ratio ρ4 of the fourth planetary gear set 368. The drawing shows a case where the gear ratio ρ2 is 0.349, gear ratio ρ3 is 0.419, gear ratio ρ4 is 0.301, and gear ratio ρ5 is 0.262.

In this case, as shown in FIG. 235, eight forward gear stages from the first gear stage [1st] to the eighth gear stage [8th] and one reverse gear stage [Rev1] are established in accordance with the same operation table as that in FIG. 1(*b*). Also, transmission ratios of the respective gear stages are appropriately determined by respective gear ratios ρ1 through ρ5 of the first planetary gear set 12, the second planetary gear set 364, the third planetary gear set 366, the fourth planetary gear set 368, and the fifth planetary gear set 369. For example, where ρ1 is 0.427, ρ2 is 0.349, ρ3 is 0.419, ρ4 is 0.301, and ρ5 is 0.262, the same transmission ratios as those shown in FIG. 1(*b*) can be obtained as shown in FIG. 235, wherein actions and effects similar to those of the embodiment shown in FIG. 1 and FIG. 2 can be brought about.

On the other hand, an optional gear stage of a plurality of gear stages, for example, a gear stage at the accelerating side in which the output member of the automatic transmission 360 for vehicle, that is, the output gear 26 becomes higher than the rotation speed of the input shaft 14, that is, the seventh gear stage [7th] and the eighth gear stage [8th] whose transmission ratio becomes smaller than 1.0 can be established by making the rotation speed into [1] by engaging the fourth clutch C4 instead of the third clutch C3 and connecting the sixth rotary element RM6 with the first intermediate output path PA1. While the transmission ratios of these gear stages further changes in comparison with a case of engaging the third clutch C3, the transmission ratios are appropriately determined in accordance with the positions of the sixth rotary element RM6 (Ring gear R5), that is, the gear ratio ρ5 of the fifth planetary gear set 369 in FIG. 236. By adequately setting the gear ratio ρ5, the transmission ratios may be used instead of the seventh gear stage [7th] and the eighth gear stage [8th] which are established by engagement of the third clutch C3. That is, with the automatic transmission 360 for vehicle, gear ratio rows (combination of transmission ratios) at the accelerating side are changed by engaging the fourth clutch C4 instead of the third clutch C3, and resultantly, a plurality of gear ratio rows can be selected.

The engagement operation table in FIG. 237 and collinear chart in FIG. 238 show an embodiment in connection with a case where, with respect to the embodiment shown in FIG. 235 and FIG. 236, respectively, the sixth rotary element RM6 is connected to the first intermediate output path M1 by engaging the fourth clutch C4 instead of engaging the third clutch C3, the gear ratios at the accelerating side, that is, the seventh gear stage [7th] and the eighth gear stage [8th] are changed over. Also, engagement and disengagement of clutches and brakes other than the third clutch C3 and the fourth clutch C4 are the same as those of the embodiment shown in FIG. 235 and FIG. 236. As shown in FIG. 237 and FIG. 238, the seventh gear stage whose speed change ratio γ7 is, for example, [0.811] or so is established by engagement of the second clutch C2 and the fourth clutch C4, and the eight gear stage whose speed change ratio γ8 is, for example, [0.648] or so is established by engagement of the fourth clutch C4 and the first brake B1, a greater speed change ratio can be obtained than that in the case of FIG. 235, respectively. Also, the total range of the speed change ratio is made into [0.6433], wherein a smaller value is obtained than that in the case of FIG. 235 and FIG. 236. That is, where it is assumed that the case of the embodiment shown in FIG. 235 and FIG. 236 is made into a normal gear ratio, so-called close gear ratios (in which the gear ratio steps are smaller) having speed change ratios close to each other can be obtained in the embodiment shown in FIG. 237 and FIG. 238 in comparison with that shown in FIG. 235 and FIG. 236. In particular, since, in the case of the embodiment shown in FIG. 237 and FIG. 238, the close gear ratios are provided at the accelerating side, the driving performance is excellent in a case where a drive force is required in high-speed running, for example, in an uphill road or passing in high-speed running.

Thus, with the automatic transmission 360 for vehicle according to the present embodiment, for example, two types of gear ratio rows such as normal gear ratios and close gear ratios can be selected by changing the speed change ratios at the accelerating side, that is, the gear ratio rows at the accelerating side. Since the two types of gear ratio rows may be changed over depending on the driving conditions or driver's selection, various modes are made available whenever necessary.

Next, a description is given of another embodiment in which a plurality of gear ratio rows can be selected by using the above-described automatic transmission 360 for vehicle.

An embodiment shown in FIG. 239 and FIG. 240 is based on, for example, the normal gear ratios in the automatic transmission 360 for vehicle, which is shown in FIG. 234, as in the embodiment shown in FIG. 235 and FIG. 236 described above, and FIG. 241 and FIG. 242 show a case of an embodiment using wide gear ratios. The embodiments shown in FIG. 239 through FIG. 242 differ from the embodiments shown in FIG. 235 through FIG. 238 only in that, in the automatic transmissions 360 for vehicle, the fifth planetary gear set 369 has a prescribed gear ratio ρ5 which is, for example, [0.390] or so, and all the other parts thereof are identical to those of the automatic transmission 360 for vehicle according to the embodiments shown in FIG. 235 through FIG. 238. The engagement operation table shown in FIG. 239 is the same as the engagement operation table shown in FIG. 235 with respect to the engaged states of the clutches and brakes to establish respective speed changes and transmission ratios of respective gear stages. In addition, the collinear chart shown in FIG. 240 differs from the collinear chart shown in FIG. 236 in that, in the second transmission portion 362, the vertical line showing the sixth rotary element RM6 is positioned between the first rotary element RM1 and the second rotary element RM2 in accordance with the gear ratio ρ5 of the fifth planetary gear set 369 having been changed, and all the other parts thereof are identical to each other.

The engagement operation table in FIG. 241 and collinear chart in FIG. 242 show an embodiment in connection with a case where, with respect to the embodiment shown in FIG. 239 and FIG. 240, respectively, the sixth rotary element RM6 is connected to the first intermediate output path M1 by engaging the fourth clutch C4 instead of engaging the third clutch C3, the gear ratios at the accelerating side are changed over. Also, engagement and disengagement of clutches and brakes other than the third clutch C3 and the fourth clutch C4 are the same as those of the embodiment shown in FIG.

239 and FIG. 240. As shown in FIG. 241 and FIG. 242, the seventh gear stage whose speed change ratio γ7 is, for example, [0.765] or so is established by engagement of the second clutch C2 and the fourth clutch C4, and the eight gear stage whose speed change ratio γ8 is, for example, [0.581] or so is established by engagement of the fourth clutch C4 and the first brake B1, a smaller speed change ratio can be obtained than that in the case of FIG. 239 and FIG. 240, respectively. Also, the total range of the speed change ratio is made into [7.175], wherein a larger value is obtained than that in the case of FIG. 239 and FIG. 240. That is, where it is assumed that the case of the embodiment shown in FIG. 239 and FIG. 240 is made into a normal gear ratio, so-called wide gear ratios (in which the gear ratio steps are larger) having speed change ratios separate from each other can be obtained in the embodiment shown in FIG. 241 and FIG. 242 in comparison with that shown in FIG. 239 and FIG. 240. In particular, since, in the case of the embodiment shown in FIG. 241 and FIG. 242, the wide gear ratios are provided at the accelerating side, and driving performance at constant high-speed running and emphasis on fuel consumption is excellent.

Thus, with the automatic transmission 360 for vehicle according to the present embodiment, for example, two types of gear ratio rows such as normal gear ratios and wide gear ratios can be selected by changing the speed change ratios at the accelerating side, that is, the gear ratio rows at the accelerating side. Since the two types of gear ratio rows may be changed over depending on the driving conditions or driver's selection, various modes are made available whenever necessary.

In the case where, of the fifth aspect and the fifty-first aspect of the invention, the fourth clutch C4 is composed so that the third rotary element RM3 is selectively connected to the first intermediate output path (PA1 or M1), FIG. 243 and FIG. 244 show one embodiment of combinations of engagement operations of clutches and brakes for establishing another eight forward gear stages instead of the engagement operation of the first clutch C1 through the fourth clutch C4 and the first brake B1 through the third brake B3 for establishing the eight forward gear stages shown in the fourth aspect and the fifty-fourth aspect of the invention. An automatic transmission 370 for vehicle shown in FIG. 243 (*a*) is the same as the automatic transmission 360-1 for vehicle, which is shown in FIG. 25(*a*) described above, and is an embodiment in which, as shown in FIG. 243(*b*) and FIG. 244, the fourth clutch C4 is composed so that the third rotary element RM3 (Ring gear R2) is selectively connected to the first intermediate output path PA. In these FIGS. 243(*b*) and 244, in comparison with FIG. 25(*b*) and FIG. 26, the seventh gear stage [7th-2] which is another mode of the seventh gear stage. [7th-1] (being identical to the seventh gear stage [7th] in FIG. 25(*b*) and FIG. 26), the eighth transmission [8th-2] which is another mode of the eighth gear stage [8th-1] (being identical to the eighth gear stage [8th] in FIG. 25(*b*) and FIG. 26), and a gear stage provided between the fifth gear stage and the sixth gear stage, for example, the fifth-sixth gear stage [5.5th] are newly illustrated.

As has been made clear in the collinear chart of FIG. 244, where, by engaging the first clutch C1 and the fourth clutch C4 with each other, the fifth rotary element RM5 is rotated via the first transmission portion 14 with its rotation speed reduced, and the third rotary element RM3 is rotated integral with the input shaft 24, the fourth rotary element RM4 is rotated at a rotation speed shown with [5.5th], and the fifth-sixth gear stage [5.5th] which becomes a gear stage between the fifth gear stage [5th] and the sixth gear stage [6th] is established. Where, by engaging the second clutch C2 and the fourth clutch C4 with each other, the first rotary element RM1 is rotated via the first transmission portion 14 with its rotation speed reduced, and the third rotary element RM3 is rotated integral with the input shaft 24, the fourth rotary element RM4 is rotated at a rotation speed shown with [7th-2], and the seventh gear stage [7th-2] whose transmission ratio is smaller than the sixth gear stage [6th] is established. Where, by engaging the fourth clutch C4 and the first brake B1 with each other, the third rotary element RM3 is rotated integral with the input shaft 24, and the first rotation element RM1 is brought to a stationary state, the fourth rotary element RM4 is rotated at a rotation speed shown with [8th-2] and the eighth gear stage [8th-2] whose transmission ratio is smaller than the seventh gear stage [7th-2] is established.

The operation table of FIG. 243(*b*) summarizes the relationship between the above-described respective gear stages and the operating states of the clutches C1 through C4 and brakes B1 through B3. Transmission ratios of the respective gear stages are appropriately determined by respective gear ratios ρ1 through ρ4 of the first planetary gear set 12, the second planetary gear set 374, the third planetary gear set 376 and the fourth planetary gear set 378, and where, for example, ρ1 is 0.427, ρ2 is 0.300, ρ3 is 0.463 and ρ4 is 0.301 as in FIG. 25(*b*), the transmission ratios shown in FIG. 243(*b*) can be obtained, where in values of the gear ratio steps (ratios of the transmission ratios between the respective gear stages) are substantially appropriate, and the total range (=4.169/0.602) of the transmission ratios is large to become 6.921, and further the transmission ratio of the reverse gear stage [Rev1] is adequate. Appropriate transmission ratio characteristics can be obtained as a whole.

Thus, in the automatic transmission 370 for vehicle according to the present embodiment, the seventh gear stage [7th-2], the eighth gear stage [8th-2] and the fifth-sixth gear stage [5.5th] are newly established. However, the seventh gear stage [7th-2], the eighth gear stage [8th-2] and the fifth-sixth gear stage [5.5th] may be, respectively, replaced by the seventh gear stage [7th-1], the eighth gear stage [8th-1] and the fifth gear stage [5th] or the sixth gear stage [6th], and may be used in addition to the eight forward gear stages [1st] through [8th] shown in FIG. 25(*b*) and FIG. 26. Also, various modes are available in which these gear stages may be changed over on the basis of driving states or driver's choice.

FIG. 245 and FIG. 246 show one embodiment according to the first aspect through the fifth aspect, the thirty-seventh aspect, the fifty-first aspect, and the fifty-third aspect through the fifty-fifth aspect of the invention. FIG. 245 is a view corresponding to FIG. 1 described above, and FIG. 246 is a view corresponding to FIG. 2 described above. The automatic transmission 380-2 for vehicle differs from the automatic transmission 10-2 for vehicle, which is shown in FIG. 3 and FIG. 4, in the construction of the second transmission portion 382-2, and is preferably used for longitudinal installation in an FR vehicle or the like. That is, the second transmission portion 382-2 is composed mainly of a single-pinion type second planetary gear set 384, a single-pinion type third planetary gear set 386 and a double-pinion type fourth planetary gear set 388, wherein the first rotary member RM1 is composed of the sun gear S2 of the second planetary gear set 384 and the sun gear S3 of the third planetary gear set 386 connected to each other, the second rotary element RM2 is composed of the carrier CA2 of the second planetary gear set 384, the carrier CA3 of the third planetary gear set 386, and the carrier CA4 of the fourth planetary gear set 388 connected to each other, the third rotary element RM3 is composed of the ring gear R2 of the second planetary gear set 384, the fourth rotary element RM4 is composed of the ring gear R3 of the third planetary gear set 386 and the ring gear R4 of the fourth planetary gear set 388 connected to each other, and the fifth rotary element RM5 is composed of the sun gear S4 of the fourth planetary gear set 388. Also, an output shaft 27 is provided instead of the above-described output gear 26, and the fourth rotary-element RM4 (Ring gears R3 and R4) is connected integral with the output shaft 27. In addition, mutual connections between the respective rotary elements RM1 through RM5 by means of the clutches C1 through C4 and brakes B1 through B3, and connections between the casing 32, input shaft 24, that is, the first intermediate output path PA1 and the ring gear R1 of the first planetary gear set 12, that is, the second intermediate output path PA2 are the same as those of the embodiment of FIG. 3 and FIG. 4. However, as shown in the collinear chart of FIG. 246, the intervals between the respective vertical lines of the first transmission portion 14 and five vertical lines of the second transmission portion 382-2 differ from those of the embodiment shown in FIG. 4. The intervals between these vertical lines are determined by respective gear ratios ρ1 through ρ4 of the first planetary gear set 12, the second planetary gear set 384, the third planetary gear set 386 and the fourth planetary gear set 388 as in FIG. 4, and FIG. 246 shows a case where ρ1 is 0.435, ρ2 is 0.324, ρ3 is 0.600, and ρ4 is 0.526.

In this case, as shown in FIG. 245(*b*), eight forward gear stages from the first gear stage [1st] to the eighth gear stage [8th) and one reverse gear stage [Rev1] are established in accordance with the same operation table as that in FIG. 3(*b*) described above. The transmission ratios of the respective gear stages are adequately determined in accordance with the respective gear ratios ρ1 through ρ4 of the first planetary gear set 12, the second planetary gear set 384, the third planetary gear set 386 and the fourth planetary gear set 388. For example, if the gear ratio ρ1 is 0.435, ρ2 is 0.324, ρ3 is 0.600 and ρ4 is 0.526, the transmission ratios shown in FIG. 245(*b*) can be obtained, wherein the values of the gear ratio step (ratio of the transmission ratios between the respective gear stages) is substantially appropriate, the total range (=5.238/0.625) of transmission ratios is large to become 8.381, and the transmission ratio of the reverse gear stage [Rev1] is also appropriate. Herein, adequate transmission ratio characteristics can be obtained as a whole. Therefore, it can be considered that the above-described transmission ratio characteristics are substantially the same as those of the embodiment shown in FIG. 3 and FIG. 4, wherein actions and effects similar to those of the embodiment in FIG. 3 and FIG. 4, that is, actions and effects similar to those in FIG. 1 and FIG. 2 can be obtained. Also, in the automatic transmission 380-2 for vehicle, as shown in FIG. 245(*b*) and FIG. 246, the fourth clutch C4 and the third brake B3 are engaged with each other as in FIG. 3(*b*) and FIG. 4, the first rotary element RM1 is rotated integral with the input shaft 24, and simultaneously, the third rotary element RM3 is brought to a stationary state, wherein the fourth rotary element RM4 is reversed at a rotation speed shown with [Rev2], and the second reverse gear stage [Rev2] can be established in addition to the first reverse gear stage [Rev1].

FIG. 247 and FIG. 248 show one embodiment according to the first aspect through the fifth aspect, the thirty-seventh aspect, the fifty-first aspect and the fifty-third aspect through the fifty-fifth aspect of the invention. FIG. 247 is a view corresponding to FIG. 1 described above, and FIG. 248 is a view corresponding to FIG. 2 described above. The automatic transmission 380-3 for vehicle differs from the automatic transmission 380-2 for vehicle, which is shown in FIG. 245 and FIG. 246, in that the fifth rotary element RM5 (Sun gear S4) of the second transmission portion 382-2 is selectively connected to the input shaft 24, that is, the first intermediate output path PA1 via the fourth clutch C4. However, as shown in FIG. 247(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 245(*b*), and the same collinear chart (excluding the second reverse gear stage [Rev2]) as that in FIG. 246 can be obtained as shown in FIG. 248, wherein similar actions and effects can be brought about.

FIG. 249 and FIG. 250 show one embodiment according to the first aspect through the fourth aspect, the sixth aspect, the thirty-seventh aspect, the fifty-second aspect through the fifty-fifth aspect of the invention. FIG. 249 is a view corresponding to FIG. 1 described above, and FIG. 250 is a view corresponding to FIG. 2 described above. The automatic transmission 380-4 for vehicle differs from the automatic transmission 380-2 for vehicle, which is shown in FIG. 245 and FIG. 246, in that the first rotary element RM1 (Sun gears S2 and S3) of the second transmission portion 382-4 and the second rotary element RM2 (Carriers CA2, CA3 and CA4) thereof are selectively connected to be integral with each other via the fourth clutch C4. However, as shown in FIG. 249(*b*), eight forward gear stages from the first gear stage [1st] to the eighth gear stage (8th] and one reverse gear stage [Rev1] are established in accordance with the same operation table (excluding the second reverse gear stage [Rev2]) as that in FIG. 245(*b*), and the same collinear chart (excluding the second reverse gear stage [Rev2]) as that in FIG. 246 can be obtained as shown in FIG. 250, wherein similar actions and effects can be brought about.

FIG. 251 and FIG. 252 show one embodiment according to the first aspect through the fifth aspect, the thirty-eighth aspect, the fifty-first aspect, and the fifty-third aspect through the fifty-fifth aspect of the invention. FIG. 251 is a view corresponding to FIG. 1 described above, and FIG. 252 is a view corresponding to FIG. 2 described above. The automatic transmission 390-2 for vehicle differs from the automatic transmission 380-2 for vehicle, which is shown in FIG. 245 and FIG. 246, in the construction of the second transmission portion 392-2, and is preferably used for longitudinal installation in an FR vehicle or the like. That is, the second transmission portion 392-2 is composed mainly of a double-pinion type second planetary gear set 394, a single-pinion type third planetary gear set 396 and a single-pinion type fourth planetary gear set 398, wherein the first rotary member RM1 is composed of the carrier CA2 of the second planetary gear set 394 and the sun gear S3 of the third planetary gear set 396 connected to each other, the second rotary element RM2 is composed of the ring gear R2 of the second planetary gear set 394, the third rotary element RM3 is composed of the ring gear R4 of the fourth planetary gear set 398, the fourth rotary element RM4 is composed of the carrier CA3 of the third planetary gear set 396 and the carrier CA4 of the fourth planetary gear set 398 connected to each other, and the fifth rotary element RM5 is composed of the sun gear S2 of the second planetary gear set 394, the ring gear R3 of the third planetary gear set 396 and the sun gear S4 of the fourth planetary gear set 398 connected to each other. In addition, mutual connections between the respective rotary elements RM1 through RM5 by means of the clutches C1 through C4 and brakes B1 through B3, and connections between the casing 32, input shaft 24, that is, the first intermediate output path PA1, the ring gear R1 of the first planetary gear set 12, that is, the second intermediate output path PA2, and the output shaft 27 are the same as those of the embodiment of FIG. 245 and FIG. 246.

In this case, as shown in FIG. 251(*b*), eight forward gear stages from the first gear stage [1st] to the eighth gear stage [8th] and one reverse gear stage [Rev1] are established in accordance with the same operation table as that in FIG. 245(*b*) described above. Also, the transmission ratios of the respective gear stages are adequately determined in accordance with the respective gear ratios ρ1 through ρ4 of the first planetary gear set 12, the second planetary gear set 394, the third planetary gear set 396 and the fourth planetary gear set 398. For example, if the gear ratio ρ1 is 0.435, ρ2 is 0.467, ρ3 is 0.338 and ρ4 is 0.510, the same collinear chart as that shown in FIG. 246 is obtained as shown in FIG. 252, and the same transmission ratios as those shown in FIG. 245(*b*) can be obtained as shown in FIG. 251(*b*), actions and effects similar to those of the embodiment in FIG. 245 and FIG. 246, that is, actions and effects similar to those in FIG. 1 and FIG. 2 can be obtained. Also, in the automatic transmission 390-2 for vehicle, as shown in FIG. 251(*b*) and FIG. 252, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element is reversed at a rotation speed shown with [Rev2], and the second reverse gear stage [Rev2] may be established in addition to the first reverse gear stage [Rev1].

FIG. 253 and FIG. 254 show one embodiment according to the first aspect through the fourth aspect, the thirty-eighth aspect, the fifty-first aspect, the fifty-third aspect through the fifty-fifth aspect of the invention. FIG. 253 is a view corresponding to FIG. 1 described above, and FIG. 254 is a view corresponding to FIG. 2 described above. The automatic transmission 390-3 for vehicle differs from the automatic transmission 390-2 for vehicle, which is shown in FIG. 251 and FIG. 252, in that the fifth rotary element RM5 (Sun gear S2, ring gear R3 and sun gear S4) of the second transmission portion 392-3 is selectively connected to the input shaft 24, that is, the first intermediate output path PA1 via the fourth clutch C4. However, as shown in FIG. 253(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 251(*b*), and the same collinear chart (excluding the second reverse gear stage [Rev2]) as that in FIG. 252 can be obtained as shown in FIG. 254, wherein similar actions and effects can be brought about.

FIG. 255 and FIG. 256 show one embodiment according to the first aspect through the fourth aspect, the sixth aspect, the thirty-eighth aspect, the fifty-second aspect through the fifty-fifth aspect of the invention. FIG. 255 is a view corresponding to FIG. 1 described above, and FIG. 256 is a view corresponding to FIG. 2 described above. The automatic transmission 390-4 for vehicle differs from the automatic transmission 390-2 for vehicle, which is shown in FIG. 251 and FIG. 252, in that the first rotary element RM1 (Carrier CA2 and sun gear S3) of the second transmission portion 392-4 and the second rotary element RM2 (Ring gear R2) thereof are selectively connected to be integral with each other via the clutch C4. However, as shown in FIG. 255(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 251(*b*), and the same collinear chart (excluding the second reverse gear stage (Rev2]) as that in FIG. 252 can be obtained as shown in FIG. 256, wherein similar actions and effects can be brought about.

FIG. 257 and FIG. 258 show one embodiment according to the first aspect through the fifth aspect, the thirty-ninth aspect, the fifty-first aspect, and the fifty-third aspect through the fifty-fifth aspect of the invention. FIG. 257 is a view corresponding to FIG. 1 described above, and FIG. 258 is a view corresponding to FIG. 2 described above. The automatic transmission 400-2 for vehicle differs from the automatic transmission 380-2 for vehicle, which is shown in FIG. 245 and FIG. 246, in the construction of the second transmission portion 402-2, and is preferably used for longitudinal installation in an FR vehicle or the like. That is, the second transmission portion 402-2 is composed mainly of a double-pinion type second planetary gear set 404, a single-pinion type third planetary gear set 406 and a single-pinion type fourth planetary gear set 408, where in the first rotary member RM1 is composed of the carrier CA2 of the second planetary gear set 404, the sun gear S3 of the third planetary gear set 406 and the sun gear S4 of the fourth planetary gear set 408 connected to each other, the second rotary element RM2 is composed of the ring gear R2 of the second planetary gear set 404, the carrier CA3 of the third planetary gear set 406 and the carrier CA4 of the fourth planetary gear set 408 connected to each other, the third rotary element RM3 is composed of the ring gear R3 of the third planetary gear set 406, the fourth rotary element RM4 is composed of the ring gear R4 of the fourth planetary gear set 408, and the fifth rotary element RM5 is composed of the sun gear S2 of the second planetary gear set 404. In addition, mutual connections between the respective rotary elements RM1 through RM5 by means of the clutches C1 through C4 and brakes B1 through B3, and connections between the casing 32, input shaft 24, that is, the first intermediate output path PA1, the ring gear R1 of the first planetary gear set 12, that is, the second intermediate output path PA2, and the output shaft 27 are the same as those of the embodiment of FIG. 245 and FIG. 246.

In this case, as shown in FIG. 257(*b*), eight forward gear stages from the first gear stage [1st] to the eighth gear stage [8th] and one reverse gear stage [Rev1] are established in accordance with the same operation table as that in FIG. 245(*b*) described above. Also, the transmission ratios of the respective gear stages are adequately determined in accordance with the respective gear ratios ρ1 through ρ4 of the first planetary gear set 12, the second planetary gear set 404, the third planetary gear set 406 and the fourth planetary gearset 408. For example, if the gear ratio ρ1 is 0.435, ρ2 is 0.467, ρ3 is 0.324 and ρ4 is 0.600, the same collinear chart as that shown in FIG. 246 is obtained as shown in FIG. 258, and the same transmission ratios as those shown in FIG. 245(*b*) can be obtained as shown in FIG. 257(*b*), actions and effects similar to those of the embodiment in FIG. 245 and FIG. 246, that is, actions and effects similar to those in FIG. 1 and FIG. 2 can be obtained. Also, in the automatic transmission 400-2 for vehicle, as shown in FIG. 257(*b*) and FIG. 258, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element is reversed at a rotation speed shown with [Rev2], and the second reverse gear stage [Rev2] may be established in addition to the first reverse gear stage [Rev1].

FIG. 259 and FIG. 260 show one embodiment according to the first aspect through the fifth aspect, the thirty-ninth aspect, the fifty-first aspect, the fifty-third aspect through the fifty-fifth aspect of the invention. FIG. 259 is a view corresponding to FIG. 1 described above, and FIG. 260 is a view corresponding to FIG. 2 described above. The automatic transmission 400-3 for vehicle differs from the automatic transmission 400-2 for vehicle, which is shown in FIG. 257 and FIG. 258, in that the fifth rotary element RM5 (Sun gear S) of the second transmission portion 402-3 is selectively connected to the input shaft 24, that is, the first intermediate output path PA1 via the fourth clutch C4. However, as shown in FIG. 259(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 257(*b*), and the same collinear chart (excluding the second reverse gear stage [Rev2]) as that in FIG. 258 can be obtained as shown in FIG. 260, wherein similar actions and effects can be brought about.

FIG. 261 and FIG. 262 show one embodiment according to the first aspect through the fourth aspect, the sixth aspect, the thirty-ninth aspect, the fifty-second aspect through the fifty-fifth aspect of the invention. FIG. 261 is a view corresponding to FIG. 1 described above, and FIG. 262 is a view corresponding to FIG. 2 described above. The automatic transmission 400-4 for vehicle differs from the automatic transmission 400-2 for vehicle, which is shown in FIG. 257 and FIG. 258, in that the first rotary element RM1 (Carrier CA2 and sun gears S3 and S4) of the second transmission portion 402-4 and the second rotary element RM2 (Ring gear R2 and carriers CA3 and CA4) there of are selectively connected to be integral with each other via the clutch C4. However, as shown in FIG. 261(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 257(*b*), and the same collinear chart (excluding the second reverse gear stage [Rev2]) as that in FIG. 258 can be obtained as shown in FIG. 262, wherein similar actions and effects can be brought about.

FIG. 263 and FIG. 264 show one embodiment according to the first aspect through the fifth aspect, the fortieth aspect, the fifty-first aspect, and the fifty-third aspect through the fifty-fifth aspect of the invention. FIG. 263 is a view corresponding to FIG. 1 described above, and FIG. 264 is a view corresponding to FIG. 2 described above. The automatic transmission 410-2 for vehicle differs from the automatic transmission 380-2 for vehicle, which is shown in FIG. 245 and FIG. 246, in the construction of the second transmission portion 412-2, and is preferably used for lateral installation in an FF or RR vehicle or the like. That is, the second transmission portion 412-2 is composed mainly of a double-pinion type second planetary gear set 414, a single-pinion type third planetary gear set 416 and a single-pinion type fourth planetary gear set 418, wherein the first rotary member RM1 is composed of the sun gear S2 of the second planetary gear set 414 and the sun gear S3 of the third planetary gear set 416 connected to each other, the second rotary element RM2 is composed of the ring gear R2 of the second planetary gear set 414 and the ring gear R4 of the fourth planetary gear set 418 connected to each other, the third rotary element RM3 is composed of the carrier CA4 of the fourth planetary gear set 418, the fourth rotary element RM4 is composed of the carrier CA3 of the third planetary gear set 416, and the fifth rotary element RM5 is composed of the carrier CA2 of the second planetary gear set 414, the ring gear R3 of the third planetary gear set 416 and the sun gear S4 of the fourth planetary gear set 418 connected to each other. In addition, an output gear 26 is provided instead of the above-described output shaft 27, and the fourth rotary element RM4 (Carrier CA3) is connected to be integral with the output gear 26. Also, mutual connections between the respective rotary elements RM1 through RM5 by means of the clutches C1 through C4 and brakes B1 through B3, and connections between the casing 32, input shaft 24, that is, the first intermediate output path PA1 and the ring gear R1 of the first planetary gear set 12, that is, the second intermediate output path PA2 are the same as those of the embodiment of FIG. 245 and FIG. 246.

In this case, as shown in FIG. 263(*b*), eight forward gear stages from the first gear stage [1st] to the eighth gear stage [8th] and one reverse gear stage [Rev1] are established in accordance with the same operation table as that in FIG. 245(*b*) described above. Also, the transmission ratios of the respective gear stages are adequately determined in accordance with the respective gear ratios $\rho 1$ through $\rho 4$ of the first planetary gear set 12, the second planetary gear set 414, the third planetary gear set 416 and the fourth planetary gear set 418. For example, if the gear ratio $\rho 1$ is 0.435, $\rho 2$ is 0.533, $\rho 3$ is 0.338 and $\rho 4$ is 0.397, the same collinear chart as that shown in FIG. 246 is obtained as shown in FIG. 264, and the same transmission ratios as those shown in FIG. 245(*b*) can be obtained as shown in FIG. 263(*b*), actions and effects similar to those of the embodiment in FIG. 245 and FIG. 246, that is, actions and effects similar to those in FIG. 1 and FIG. 2 can be obtained. Also, in the automatic transmission 410-2 for vehicle, as shown in FIG. 263(*b*) and FIG. 264, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element is reversed at a rotation speed shown with [Rev2], and the second reverse gear stage [Rev2] may be established in addition to the first reverse gear stage [Rev1].

FIG. 265 and FIG. 266 show one embodiment according to the first aspect through the fifth aspect, the fortieth aspect, the fifty-first aspect, the fifty-third aspect through the fifty-fifth aspect of the invention. FIG. 265 is a view corresponding to FIG. 1 described above, and FIG. 266 is a view corresponding to FIG. 2 described above. The automatic transmission 410-3 for vehicle differs from the automatic transmission 410-2 for vehicle, which is shown in FIG. 263 and FIG. 264, in that the fifth rotary element RM5 (Carrier CA2, ring gear R3 and sun gear S4) of the second transmission portion 412-3 is selectively connected to the input shaft 24, that is, the first intermediate output path PA1 via the fourth clutch C4. However, as shown in FIG. 265(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 263(*b*), and the same collinear chart (excluding the second reverse gear stage [Rev2]) as that in FIG. 264 can be obtained as shown in FIG. 266, wherein similar actions and effects can be brought about.

FIG. 267 and FIG. 268 show one embodiment according to the first aspect through the fourth aspect, the sixth aspect, the fortieth aspect, the fifty-second aspect through the fifty-fifth aspect of the invention. FIG. 267 is a view corresponding to FIG. 1 described above, and FIG. 268 is a view corresponding to FIG. 2 described above. The automatic transmission 410-4 for vehicle differs from the automatic transmission 410-2 for vehicle, which is shown in FIG. 263 and FIG. 264, in that the first rotary element RM1 (Sun gears S2 and S3) of the second transmission portion 412-4 and the fifth rotary element RM5 (Carrier CA2, ring gear R3 and sun gear S4) thereof are selectively connected to be integral with each other via the clutch C4. However, as shown in FIG. 267(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 263(*b*), and the same collinear chart (excluding the second reverse gear stage [Rev2]) as that in FIG. 264 can be obtained as shown in FIG. 268, wherein similar actions and effects can be brought about.

FIG. 269 and FIG. 270 show one embodiment according to the first aspect through the fifth aspect, the fortieth aspect, the fifty-first aspect, and the fifty-third aspect through the fifty-fifth aspect of the invention. FIG. 269 is a view corresponding to FIG. 1 described above, and FIG. 270 is a view corresponding to FIG. 2 described above. The automatic transmission 420-2 for vehicle differs from the automatic transmission 380-2 for vehicle, which is shown in FIG. 245 and FIG. 246, in the construction of the second transmission portion 422-2, and is preferably used for lateral installation in an FF or RR vehicle or the like. That is, the second transmission portion 422-2 is composed mainly of a single-pinion type second planetary gear set 424, a single-pinion type third planetary gear set 426 and a double-pinion type fourth planetary gear set 428, wherein the first rotary member RM1 is composed of the sun gear S3 of the third planetary gear set 426, the second rotary element RM2 is composed of the ring gear R2 of the second planetary gear set 424, the carrier CA3 of the third planetary gear set 426 and the sun gear S4 of the fourth planetary gear set 428 connected to each other, the third rotary element RM3 is composed of the carrier CA2 of the second planetary gear set 424 and the ring gear R4 of the fourth planetary gear set 428 connected to each other, the fourth rotary element RM4 is composed of the ring gear. R3 of the third planetary gear set 426 and the carrier CA4 of the fourth planetary gear set 428 connected to each other, and the fifth rotary element RM5 is composed of the sun gear S2 of the second planetary gear set 424. In addition, an output gear 26 is provided instead of the above-described output shaft 27, and the fourth rotary element RM4 (Ring gear R3 and carrier CA4) is connected to be integral with the output gear 26. Also, mutual connections between the respective rotary elements RM1 through RM5 by means of the clutches C1 through C4 and brakes B1 through B3, and connections between the casing 32, input shaft 24, that is, the first intermediate output path PA1 and the ring gear R1 of the first planetary gear set 12, that is, the second intermediate output path PA2 are the same as those of the embodiment of FIG. 245 and FIG. 246.

In this case, as shown in FIG. 269(*b*), eight forward gear stages from the first gear stage [1st] to the eighth gear stage [8th] and one reverse gear stage [Rev1] are established in accordance with the same operation table as that in FIG. 245(*b*) described above. Also, the transmission ratios of the respective gear stages are adequately determined in accordance with the respective gear ratios ρ1 through ρ4 of the first planetary gear set 12, the second planetary gear set 424, the third planetary gear set 426 and the fourth planetary gear set 428. For example, if the gear ratio ρ1 is 0.435, ρ2 is 0.397, ρ3 is 0.600 and ρ4 is 0.459, the same collinear chart as that shown in FIG. 246 is obtained as shown in FIG. 270, and the same transmission ratios as those shown in FIG. 245(*b*) can be obtained as shown in FIG. 269(*b*), actions and effects similar to those of the embodiment in FIG. 245 and FIG. 246, that is, actions and effects similar to those in FIG. 1 and FIG. 2 can be obtained. Also, in the automatic transmission 420-2 for vehicle, as shown in FIG. 269(*b*) and FIG. 270, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element is reversed at a rotation speed shown with [Rev2], and the second reverse gear stage [Rev2] may be established in addition to the first reverse gear stage [Rev1].

FIG. 271 and FIG. 272 show one embodiment according to the first aspect through the fifth aspect, the forty-first aspect, the fifty-first aspect, the fifty-third aspect through the fifty-fifth aspect of the invention. FIG. 271 is a view corresponding to FIG. 1 described above, and FIG. 272 is a view corresponding to FIG. 2 described above. The automatic transmission 420-3 for vehicle differs from the automatic transmission 420-2 for vehicle, which is shown in FIG. 269 and FIG. 270, in that the fifth rotary element RM5 (Sun gear S2) of the second transmission portion 422-3 is selectively connected to the input shaft 24, that is, the first intermediate output path PA1 via the fourth clutch C4. However, as shown in FIG. 271(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 269(*b*), and the same collinear chart (excluding the second reverse gear stage [Rev2]) as that in FIG. 270 can be obtained as shown in FIG. 272, wherein similar actions and effects can be brought about.

FIG. 273 and FIG. 274 show one embodiment according to the first aspect through the fourth aspect, the sixth aspect, the forty-first aspect, the fifty-second aspect through the fifty-fifth aspect of the invention. FIG. 273 is a view corresponding to FIG. 1 described above, and FIG. 274 is a view corresponding to FIG. 2 described above. The automatic transmission 420-4 for vehicle differs from the automatic transmission 420-2 for vehicle, which is shown in FIG. 269 and FIG. 270, in that the third rotary element RM3 (Carrier CA2 and ring gear R4) of the second transmission portion 422-4 and the fifth rotary element RM5 (Sun gear S2) thereof are selectively connected to be integral with each other via the clutch C4. However, as shown in FIG. 273(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 269(*b*), and the same collinear chart (excluding the second reverse gear stage [Rev2]) as that in FIG. 270 can be obtained as shown in FIG. 274, wherein similar actions and effects can be brought about.

FIG. 275 and FIG. 276 show one embodiment according to the first aspect through the fifth aspect, the forty-second aspect, the fifty-first aspect, and the fifty-third aspect through the fifty-fifth aspect of the invention. FIG. 275 is a view corresponding to FIG. 1 described above, and FIG. 276 is a view corresponding to FIG. 2 described above. The automatic transmission 430-1 for vehicle differs from the automatic transmission 10-1 for vehicle, which is shown in FIG. 1 and FIG. 2, in the construction of the second transmission portion 432-1, and is preferably used for lateral installation in an FF or RR vehicle or the like. That is, the second transmission portion 432-1 is composed mainly of a double-pinion type second planetary gear set 434, a single-pinion type third planetary gear set 436 and a single-pinion type fourth planetary gear set 438, wherein the first rotary member RM1 is composed of the sun gear S2 of the second planetary gear set 434, the sun gear S3 of the third planetary gear set 436, and the sun gear S4 of the fourth planetary gear set 438 connected to each other, the second rotary element RM2 is composed of the ring gear R2 of the second planetary gear set 434, the carrier CA3 of the third planetary gear set 436 and the carrier CA4 of the fourth planetary gear set 438 connected to each other, the third rotary element RM3 is composed of the ring gear R3 of the third planetary gear set 436, the fourth rotary element RM4 is composed of the ring gear R4 of the fourth planetary gear set 438, and the fifth rotary element RM5 is composed of the carrier CA2 of the second planetary gear set 434. Also, mutual connections between the respective rotary elements RM1 through RM5 by means of the clutches C1 through C4 and brakes B1 through B3, and connections between the casing 32, input shaft 24, that is, the first intermediate output path PA1, the ring gear R1 of the first planetary gear set 12, that is, the second intermediate output path PA2 and the output gear 26 are the same as those of the embodiment of FIG. 1 and FIG. 2 described above. However, as shown in the collinear chart of FIG. 276, the intervals between the respective vertical lines of the first transmission portion 14 and five vertical lines of the second transmission portion 432-1 differ from those of the embodiment shown in FIG. 2. The intervals between these vertical lines are determined by respective gear ratios ρ1 through ρ4 of the first planetary gear set 12, the second planetary gear set 434, the third planetary gear set 436 and the fourth planetary gear set 438 as in FIG. 2, and FIG. 276 shows a case where ρ1 is 0.435, ρ2 is 0.533, ρ3 is 0.324, and ρ4 is 0.600.

In this case, as shown in FIG. 275(*b*), eight forward gear stages from the first gear stage [1st] to the eighth gear stage [8th] and one reverse gear stage [Rev1] are established in accordance with the same operation table as that in FIG. 1(*b*) described above. Also, transmission ratios of the respective gear stages are appropriately determined by respective gear ratios ρ1 through ρ4 of the first planetary gear set 12, the second planetary gear set 434, the third planetary gear set 436 and the fourth planetary gear set 438. For example, where ρ1 is 0.435, ρ2 is 0.533, ρ3 is 0.324 and ρ4 is 0.600, the transmission ratios shown in FIG. 275(*b*) can be obtained, wherein values of the gear ratio steps (ratios of the transmission ratios between the respective gear stages) are substantially appropriate, and the total range (=5.238/0.625) of the transmission ratios is large to become 8.381, and further the transmission ratio of the reverse gear stage [Rev1] is adequate. Appropriate transmission ratio characteristics can be obtained as a whole. Therefore, since it is considered that the transmission ratio characteristics are substantially identical to those of the embodiment in FIG. 1 through FIG. 2, actions and effects similar to those of the embodiment in FIG. 1 and FIG. 2 can be obtained.

FIG. 277 and FIG. 278 show one embodiment according to the first aspect through the fifth aspect, the forty-second aspect, the fifty-first aspect, the fifty-third aspect through the fifty-fifth aspect of the invention. FIG. 277 is a view corresponding to FIG. 1 described above, and FIG. 278 is a view corresponding to FIG. 2 described above. The automatic transmission 430-3 for vehicle differs from the automatic transmission 430-1 for vehicle, which is shown in FIG. 275 and FIG. 276, in that the first rotary element RM1 (Sun gears S2, S3 and S4) of the second transmission portion 432-2 is selectively connected to the input shaft 24, that is, the first intermediate output path PA1 via the fourth clutch C4. However, as shown in FIG. 277(*b*), eight forward gear stages from the first gear stage [1st] to the eighth gear stage [8th) and one reverse gear stage [Rev1] are established in accordance with the same operation table as that in FIG. 275(*b*), and the same collinear chart as that in FIG. 276 can be obtained as shown in FIG. 278, wherein similar actions and effects can be brought about. In addition, in the automatic transmission 430-2 for vehicle, as shown in FIG. 277(*b*) and FIG. 278, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element RM4 is reversed at a rotation speed [Rev2], and the second reverse gear stage [Rev2] maybe established in addition to the first reverse gear stage [Rev1]

FIG. 279 and FIG. 280 show one embodiment according to the first aspect through the fifth aspect, the forty-second aspect, the fifty-first aspect, and the fifty-third aspect through the fifty-fifth aspect of the invention. FIG. 279 is a view corresponding to FIG. 1 described above, and FIG. 280 is a view corresponding to FIG. 2 described above. The automatic transmission 430-3 for vehicle differs from the automatic transmission 430-1 for vehicle, which is shown in FIG. 275 and FIG. 276, in that the fifth rotary element RM5 (Carrier CA2) of the second transmission portion 432-3 is selectively connected to the input shaft 24, that is, the first intermediate output path PA1 via the clutch C4. However, as shown in FIG. 279(*b*), eight forward gear stages from the first gear stage [1st] to the eighth gear stage [8th] and one reverse gear stage [Rev1] are established in accordance with the same operation table as that in FIG. 275(*b*), and the same collinear chart as that in FIG. 276 can be obtained as shown in FIG. 280, wherein similar actions and effects can be brought about.

FIG. 281 and FIG. 282 show one embodiment according to the first aspect through the fourth aspect, the sixth aspect, the forty-second aspect, the fifty-second aspect through the fifty-fifth aspect of the invention. FIG. 281 is a view corresponding to FIG. 1 described above, and FIG. 282 is a view corresponding to FIG. 2 described above. The automatic transmission 430-4 for vehicle differs from the automatic transmission 430-1 for vehicle, which is shown in FIG. 275 and FIG. 276, in that the first rotary element RM1 (Sun gears S2, S3 and S4) of the second transmission portion 432-4 and the fifth rotary element RM5 (Carrier CA2) thereof are selectively connected to be integral with each other via the clutch C4. However, as shown in FIG. 281(*b*), eight forward gear stages from the first gear stage [1st] to the eighth gear stage [8th] and one reverse gear stage [Rev1] are established in accordance with the same operation table as that in FIG. 275(*b*), and the same collinear chart as that in FIG. 276 can be obtained as shown in FIG. 282, wherein similar actions and effects can be brought about.

FIG. 283 and FIG. 284 show one embodiment according to the first aspect through the fifth aspect, the forty-third aspect, the fifty-first aspect, and the fifty-third aspect through the fifty-fifth aspect of the invention. FIG. 283 is a view corresponding to FIG. 1 described above, and FIG. 284 is a view corresponding to FIG. 2 described above. The automatic transmission 440-2 for vehicle differs from the automatic transmission 380-2 for vehicle, which is shown in FIG. 245 and FIG. 246, in the construction of the second transmission portion 442-2, and is preferably used for lateral installation in an FF or RR vehicle or the like. That is, the second transmission portion 442-2 is composed mainly of a double-pinion type second planetary gear set 444, a single-pinion type third planetary gear set 446 and a single-pinion type fourth planetary gear set 448, wherein the first rotary member RM1 is composed of the sun gear S2 of the second planetary gear set 444, the second rotary element RM2 is composed of the ring gear R2 of the second planetary gear set 444 and the ring gear R3 of the third planetary gear set 446 connected to each other, the third rotary element RM3 is composed of the carrier CA3 of the third planetary gear set 446 and the ring gear R4 of the fourth planetary gear set 448 connected to each other, the fourth rotary element RM4 is composed of the carrier CA4 of the fourth planetary gear set 448, and the fifth rotary element RM5 is composed of the carrier CA2 of the second planetary gear set 444, the sun gear S3 of the third planetary gear set 446 and the sun gear S4 of the fourth planetary gear set 448 connected to each other. Also, an output gear 26 is provided instead of the above-described output shaft 27, and the fourth rotary element RM4 (Carrier CA4) is connected to be integral with the output gear 26. In addition, mutual connections between the respective rotary elements RM1 through RM5 by means of the clutches C1 through C4 and brakes B1 through B3, and connections between the casing 32, input shaft 24, that is, the first intermediate output path PA1 and the ring gear R1 of the first planetary gear set 12, that is, the second intermediate output path PA2 are the same as those of the embodiment of FIG. 245 and FIG. 246 described above.

In this case, as shown in FIG. 283(*b*), eight forward gear stages from the first gear stage [1st] to the eighth gear stage [8th] and one reverse gear stage [Rev1] are established in accordance with the same operation table as that in FIG. 245(*b*) described above. Also, transmission ratios of the respective gear stages are appropriately determined by respective gear ratios ρ1 through ρ4 of the first planetary gear set 12, the second planetary gear set 444, the third planetary gear set 446 and the fourth planetary gear set 448. For example, where ρ1 is 0.435, ρ2 is 0.533, ρ3 is 0.397 and ρ4 is 0.510, the same collinear chart as that in FIG. 246 can be obtained as shown in FIG. 284. And, the same transmission ratios as those shown in FIG. 245(*b*) can be obtained as shown in FIG. 283(*b*), wherein actions and effects similar to those of the embodiment of FIG. 245 and FIG. 246, that is, actions and effects similar to those of the embodiment of FIG. 1 and FIG. 2 are brought about. Further, in the automatic transmission 440-2 for vehicle, as shown in FIG. 283(*b*) and FIG. 284, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element RM4 is reversed at a rotation speed [Rev2], and the second reverse gear stage [Rev2] can be obtained in addition to the first reverse gear stage [Rev1].

FIG. 285 and FIG. 286 show one embodiment according to the first aspect through the fifth aspect, the forty-third aspect, the fifty-first aspect, the fifty-third aspect through the fifty-fifth aspect of the invention. FIG. 285 is a view corresponding to FIG. 1 described above, and FIG. 286 is a view corresponding to FIG. 2 described above. The automatic transmission 440-3 for vehicle differs from the automatic transmission 440-2 for vehicle, which is shown in FIG. 283 and FIG. 284, in that the fifth rotary element RM5 (Carrier CA2, sun gears S3 and S4) of the second transmission portion 442-3 is selectively connected to the input shaft 24, that is, the first intermediate output path PA1 via the fourth clutch C4. However, as shown in FIG. 285(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 283(*b*), and the same collinear chart (excluding the second reverse gear stage [Rev2]) as that in FIG. 284 can be obtained as shown in FIG. 286, wherein similar actions and effects can be brought about.

FIG. 287 and FIG. 288 show one embodiment according to the first aspect through the fourth aspect, the sixth aspect, the forty-third aspect, the fifty-second aspect through the fifty-fifth aspect of the invention. FIG. 287 is a view corresponding to FIG. 1 described above, and FIG. 288 is a view corresponding to FIG. 2 described above. The automatic transmission 440-4 for vehicle differs from the automatic transmission 440-2 for vehicle, which is shown in FIG. 283 and FIG. 284, in that the first rotary element RM1 (Sun gear S2) of the second transmission portion 442-4 and the fifth rotary element RM5 (Carrier CA2, sun gears S3 and S4) thereof are selectively connected to be integral with each other via the clutch C4. However, as shown in FIG. 287(*b*), eight forward gear stages from the first gear stage [1st] to the eighth gear stage. [8th] and one reverse gear stage [Rev1] are established in accordance with the same operation table (excluding the second reverse gear stage [Rev2]) as that in FIG. 283(*b*), and the same collinear chart (excluding the second reverse gear stage [Rev2]) as that in FIG. 284 can be obtained as shown in FIG. 288, wherein similar actions and effects can be brought about.

FIG. 289 and FIG. 290 show one embodiment according to the first aspect through the fifth aspect, the forty-fourth aspect, the fifty-first aspect, and the fifty-third aspect through the fifty-fifth aspect of the invention. FIG. 289 is a view corresponding to FIG. 1 described above, and FIG. 290 is a view corresponding to FIG. 2 described above. The automatic transmission 450-2 for vehicle differs from the automatic transmission 380-2 for vehicle, which is shown in FIG. 245 and FIG. 246, in the construction of the second transmission portion 452-2, and is preferably used for lateral installation in an FF or RR vehicle or the like. That is, the second transmission portion 452-2 is composed mainly of a double-pinion type second planetary gear set 454, a single-pinion type third planetary gear set 456 and a single-pinion type fourth planetary gear set 458, wherein the first rotary member RM1 is composed of the sun gear S4 of the fourth planetary gear set 458, the second rotary element RM2 is composed of the carrier CA2 of the second planetary gear set 454, the third rotary element RM3 is composed of the ring gear R3 of the third planetary gear set 456, the fourth rotary element RM4 is composed of the ring gear R2 of the second planetary gear set 454, the carrier CA3 of the third planetary gear set 456, and the carrier CA4 of the fourth planetary gear set 458 connected to each other, and the fifth rotary element RM5 is composed of the sun gear S2 of the second planetary gear set 454, the sun gear S3 of the third planetary gear set 456 and the ring gear R4 of the fourth planetary gear set 458 connected to each other. Also, an output gear 26 is provided instead of the output shaft 27, and the fourth rotary element RM4 (Ring gear R2, and carriers CA3 and CA4) is connected to be integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1 and the ring gear R1 of the first planetary gear set 12, that is, the second intermediate output path PA2 are the same as those of the embodiment of FIG. 245 and FIG. 246 described above.

In this case, as shown in FIG. 289(*b*), eight forward gear stages from the first gear stage [1st] to the eighth gear stage [8th] and one reverse gear stage [Rev1] are established in accordance with the same operation table as that in FIG. 245(*b*) described above. Also, transmission ratios of the respective gear stages are appropriately determined by respective gear ratios ρ1 through ρ4 of the first planetary gear set 12, the second planetary gear set 454, the third planetary gear set 456 and the fourth planetary gear set 458. For example, where ρ1 is 0.435, ρ2 is 0.526, ρ3 is 0.510 and ρ4 is 0.338, the same collinear chart as that in FIG. 246 can be obtained as shown in FIG. 290, wherein actions and effects similar to those of the embodiment in FIG. 245 and FIG. 246, that is, actions and effects similar to those of the embodiment in FIG. 1 and FIG. 2 can be obtained. Further, in the automatic transmission 450-2 for vehicle, as shown in FIG. 289(*b*) and FIG. 290, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element RM4 is reversed at a rotation speed [Rev2], and the second reverse gear stage [Rev2] can be obtained in addition to the first reverse gear stage [Rev1].

FIG. 291 and FIG. 292 show one embodiment according to the first aspect through the fifth aspect, the forty-fourth aspect, the fifty-first aspect, the fifty-third aspect through the fifty-fifth aspect of the invention. FIG. 291 is a view corresponding to FIG. 1 described above, and FIG. 292 is a view corresponding to FIG. 2 described above. The automatic transmission 450-3 for vehicle differs from the automatic transmission 450-2 for vehicle, which is shown in FIG. 289 and FIG. 290, in that the fifth rotary element RM5 (Sun gears S3 and S4, and ring gear R4) of the second transmission portion 452-3 is selectively connected to the input shaft 24, that is, the first intermediate output path PA1 via the fourth clutch C4. However, as shown in FIG. 291(*b*), eight forward gear stages from the first gear stage [1st] to the eighth gear stage [8th] and one reverse gear stage (Rev1] are established in accordance with the same operation table (excluding the second reverse gear stage [Rev2]) as that in FIG. 289(*b*), and the same collinear chart (excluding the second reverse gear stage [Rev2]) as that in FIG. 290 can be obtained as shown in FIG. 292, wherein similar actions and effects can be brought about.

FIG. 293 and FIG. 294 show one embodiment according to the first aspect through the fourth aspect, the sixth aspect, the forty-fourth aspect, the fifty-second aspect through the fifty-fifth aspect of the invention. FIG. 293 is a view corresponding to FIG. 1 described above, and FIG. 294 is a view corresponding to FIG. 2 described above. The automatic transmission 450-4 for vehicle differs from the automatic transmission 450-2 for vehicle, which is shown in FIG. 289 and FIG. 290, in that the second rotary element RM2 (Carrier CA2) of the second transmission portion 452-4 and the fifth rotary element RM5 (Sun gears S2 and S3, and ring gear R4) thereof are selectively connected to be integral with each other via the clutch C4. However, as shown in FIG. 293(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 289(*b*), and the same collinear chart (excluding the second reverse gear stage [Rev2]) as that in FIG. 290 can be obtained as shown in FIG. 294, wherein similar actions and effects can be brought about.

FIG. 295 and FIG. 296 show one embodiment according to the first aspect through the fifth aspect, the forty-fifth aspect, the fifty-first aspect, and the fifty-third aspect through the fifty-fifth aspect of the invention. FIG. 295 is a view corresponding to FIG. 1 described above, and FIG. 296 is a view corresponding to FIG. 2 described above. The automatic transmission 460-2 for vehicle differs from the automatic transmission 380-2 for vehicle, which is shown in FIG. 245 and FIG. 246, in the construction of the second transmission portion 462-2, and is preferably used for lateral installation in an FF or RR vehicle or the like. That is, the second transmission portion 462-2 is composed mainly of a single-pinion type second planetary gear set 464, a single-pinion type third planetary gear set 466 and a double-pinion type fourth planetary gear set 468, wherein the first rotary member RM1 is composed of the sun gear S2 of the second planetary gear set 464, the second rotary element RM2 is composed of the sun gear S4 of the fourth planetary gear set 468, the third rotary element RM3 is composed of the ring gear R3 of the third planetary gear set 466, the fourth rotary element RM4 is composed of the carrier CA2 of the second planetary gear set 464, the carrier CA3 of the third planetary gear set 466 and the ring gear R4 of the fourth planetary gear set 468 connected to each other, and the fifth rotary element RM5 is composed of the ring gear R2 of the second planetary gear set 464, the sun gear S3 of the third planetary gear set 466 and the carrier CA4 of the fourth planetary gear set 468 connected to each other. Also, an output gear 26 is provided instead of the output shaft 27, and the fourth rotary element RM4 (Carriers CA2 and CA3 and ring gear R4) is connected to be integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1 and the ring gear R1 of the first planetary gear set 12, that is, the second intermediate output path PA2 are the same as those of the embodiment of FIG. 245 and FIG. 246 described above.

In this case, as shown in FIG. 295(*b*), eight forward gear stages from the first gear stage [1st] to the eighth gear stage [8th] and one reverse gear stage [Rev1] are established in accordance with the same operation table as that in FIG. 245(*b*) described above. Also, transmission ratios of the respective gear stages are appropriately determined by respective gear ratios ρ1 through ρ4 of the first planetary gear set 12, the second planetary gear set 464, the third planetary gear set 466 and the fourth planetary gear set 468. For example, where ρ1 is 0.435, ρ2 is 0.338, ρ3 is 0.510 and ρ4 is 0.474, the same collinear chart as that in FIG. 246 can be obtained as shown in FIG. 296, wherein actions and effects similar to those of the embodiment in FIG. 245 and FIG. 246, that is, actions and effects similar to those of the embodiment in FIG. 1 and FIG. 2 can be obtained. Further, in the automatic transmission 460-2 for vehicle, as shown in FIG. 295(*b*) and FIG. 296, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element RM4 is reversed at a rotation speed [Rev2], and the second reverse gear stage [Rev2] can be obtained in addition to the first reverse gear stage [Rev1].

FIG. 297 and FIG. 298 show one embodiment according to the first aspect through the fifth aspect, the forty-fifth aspect, the fifty-first aspect, the fifty-third aspect through the fifty-fifth aspect of the invention. FIG. 297 is a view corresponding to FIG. 1 described above, and FIG. 298 is a view corresponding to FIG. 2 described above. The automatic transmission 460-3 for vehicle differs from the automatic transmission 460-2 for vehicle, which is shown in FIG. 295 and FIG. 296, in that the fifth rotary element RM5 (Ring gear R2, sun gear S3 and carrier CA4) of the second transmission portion 462-3 is selectively connected to the input shaft 24, that is, the first intermediate output path PA1 via the fourth clutch C4. However, as shown in FIG. 297(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 295(*b*), and the same collinear chart (excluding the second reverse gear stage [Rev2]) as that in FIG. 296 can be obtained as shown in FIG. 298, wherein similar actions and effects can be brought about.

FIG. 299 and FIG. 300 show one embodiment according to the first aspect through the fourth aspect, the sixth aspect, the forty-fifth aspect, the fifty-second aspect through the fifty-fifth aspect of the invention. FIG. 299 is a view corresponding to FIG. 1 described above, and FIG. 300 is a view corresponding to FIG. 2 described above. The automatic transmission 460-4 for vehicle differs from the automatic transmission 460-2 for vehicle, which is shown in FIG. 295 and FIG. 296, in that the first rotary element RM1 (Sun gear S2) of the second transmission portion 462-4 and the fourth rotary element RM4 (Carriers CA2 and CA3 and ring gear R4) thereof are selectively connected to be integral with each other via the clutch C4. However, as shown in FIG. 299(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 295(*b*), and the same collinear chart (excluding the second reverse gear stage [Rev2]) as that in FIG. 296 can be obtained as shown in FIG. 300, wherein similar actions and effects can be brought about.

FIG. 301 and FIG. 302 show one embodiment according to the first aspect through the fifth aspect, the forty-sixth aspect, the fifty-first aspect, and the fifty-third aspect through the fifty-fifth aspect of the invention. FIG. 301 is a view corresponding to FIG. 1 described above, and FIG. 302 is a view corresponding to FIG. 2 described above. The automatic transmission 470-2 for vehicle differs from the automatic transmission 380-2 for vehicle, which is shown in FIG. 245 and FIG. 246, in the construction of the second transmission portion 472-2, and is preferably used for lateral installation in an FF or RR vehicle or the like. That is, the second transmission portion 472-2 is composed mainly of a double-pinion type second planetary gear set 474, a single-pinion type third planetary gear set 476 and a single-pinion type fourth planetary gear set 478, wherein the first rotary member RM1 is composed of the sun gear S4 of the fourth planetary gear set 478, the second rotary element RM2 is composed of the carrier CA2 of the second planetary gear set 474, the third rotary element RM3 is composed of the ring gear R2 of the second planetary gear set 474 and the ring gear R3 of the third planetary gear set 476 connected to each other, the fourth rotary element RM4 is composed of the sun gear S2 of the second planetary gear set 474, the carrier CA3 of the third planetary gear set 476 and the carrier CA4 of the fourth planetary gear set 478 connected to each other, and the fifth rotary element RM5 is composed of the sun gear S3 of the third planetary gear set 476 and the ring gear R4 of the fourth planetary gear set 478 connected to each other. Also, an output gear 26 is provided instead of the output shaft 27, and the fourth rotary element RM4 (Sun gear S2, carrier CA3 and carrier CA4) is connected to be integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1 and the ring gear R1 of the first planetary gear set 12, that is, the second intermediate output path PA2 are the same as those of the embodiment of FIG. 245 and FIG. 246 described above.

In this case, as shown in FIG. 301(*b*), eight forward gear stages from the first gear stage [1st] to the eighth gear stage [8th] and one reverse gear stage [Rev1] are established in accordance with the same operation table as that in FIG. 245(*b*) described above. Also, transmission ratios of the respective gear stages are appropriately determined by respective gear ratios ρ1 through ρ4 300 of the first planetary gear set 12, the second planetary gear set 474, the third planetary gear set 476 and the fourth planetary gear set 478. For example, where ρ1 is 0.435, ρ2 is 0.541, ρ3 is 0.510 and ρ4 is 0.338, the same collinear chart as that in FIG. 246 can be obtained as shown in FIG. 302, and the same transmission ratios as those in FIG. 245(*b*) can be obtained as shown in FIG. 301(*b*), wherein actions and effects similar to those of the embodiment in FIG. 245 and FIG. 246, that is, actions and effects similar to those of the embodiment in FIG. 1 and FIG. 2 can be obtained. Further, in the automatic transmission 470-2 for vehicle, as shown in FIG. 301(*b*) and FIG. 302, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element RM4 is reversed at a rotation speed [Rev2], and the second reverse gear stage [Rev2] can be obtained in addition to the first reverse gear stage [Rev1]

FIG. 303 and FIG. 304 show one embodiment according to the first aspect through the fifth aspect, the forty-sixth aspect, the fifty-first aspect, the fifty-third aspect through the fifty-fifth aspect of the invention. FIG. 303 is a view corresponding to FIG. 1 described above, and FIG. 304 is a view corresponding to FIG. 2 described above. The automatic transmission 470-3 for vehicle differs from the automatic transmission 470-2 for vehicle, which is shown in FIG. 301 and FIG. 302, in that the fifth rotary element RM5 (Sun gear S3 and ring gear R4) of the second transmission portion 472-3 is selectively connected to the input shaft 24, that is, the first intermediate output path PA1 via the fourth clutch C4. However, as shown in FIG. 303(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 301(*b*), and the same collinear chart (excluding the second reverse gear stage [Rev2]) as that in FIG. 302 can be obtained as shown in FIG. 304, wherein similar actions and effects can be brought about.

FIG. 305 and FIG. 306 show one embodiment according to the first aspect through the fourth aspect, the sixth aspect, the forty-sixth aspect, the fifty-second aspect through the fifty-fifth aspect of the invention. FIG. 305 is a view corresponding to FIG. 1 described above, and FIG. 306 is a view corresponding to FIG. 2 described above. The automatic transmission 470-4 for vehicle differs from the automatic transmission 470-2 for vehicle, which is shown in FIG. 301 and FIG. 302, in that the second rotary element RM2 (Carrier CA2) of the second transmission portion 472-4 and the fourth rotary element RM4 (Sun gear S2 and carriers CA3 and CA4) thereof are selectively connected to be integral with each other via the clutch C4. However, as shown in FIG. 305(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 301(*b*), and the same collinear chart (excluding the second reverse gear stage [Rev2]) as that in FIG. 302 can be obtained as shown in FIG. 306, wherein similar actions and effects can be brought about.

FIG. 307 and FIG. 308 show one embodiment according to the first aspect through the fifth aspect, the forty-seventh aspect, the fifty-first aspect, and the fifty-third aspect through the fifty-fifth aspect of the invention. FIG. 307 is a view corresponding to FIG. 1 described above, and FIG. 308 is a view corresponding to FIG. 2 described above. The automatic transmission 480-2 for vehicle differs from the automatic transmission 380-2 for vehicle, which is shown in FIG. 245 and FIG. 246, in the construction of the second transmission portion 482-2, and is preferably used for lateral installation in an FF or RR vehicle or the like. That is, the second transmission portion 482-2 is composed mainly of a double-pinion type second planetary gear set 484, a single-pinion type third planetary gear set 486 and a single-pinion type fourth planetary gear set 488, wherein the first rotary member RM1 is composed of the sun gear S2 of the second planetary gear set 484 and the sun gear S3 of the third planetary gear set 486 connected to each other, the second rotary element RM2 is composed of the ring gear R2 of the second planetary gear set 484, the third rotary element RM3 is composed of the ring gear R4 of the fourth planetary gear set 488, the fourth rotary element RM4 is composed of the carrier CA3 of the third planetary gear set 486 and the carrier CA4 of the fourth planetary gear set 488 connected to each other, and the fifth rotary element RM5 is composed of the carrier CA2 of the second planetary gear set 484, the ring gear R3 of the third planetary gear set 486 and the sun gear S4 of the fourth planetary gear set 488 connected to each other. Also, an output gear 26 is provided instead of the output shaft 27, and the fourth rotary element RM4 (Carriers CA3 and CA4) is connected to be integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1 and the ring gear R1 of the first planetary gear set 12, that is, the second intermediate output path PA2 are the same as those of the embodiment of FIG. 245 and FIG. 246 described above.

In this case, as shown in FIG. 307(*b*), eight forward gear stages from the first gear stage [1st] to the eighth gear stage [8th] and one reverse gear stage [Rev1] are established in accordance with the same operation table as that in FIG. 245(*b*) described above. Also, transmission ratios of the respective gear stages are appropriately determined by respective gear ratios ρ1 through ρ4 of the first planetary gear set 12, the second planetary gear set 484, the third planetary gear set 486 and the fourth planetary gear set 488. For example, where ρ1 is 0.435, ρ2 is 0.533, ρ3 is 0.338 and ρ4 is 0.510, the same collinear chart as that in FIG. 246 can be obtained as shown in FIG. 308, and the same transmission ratios as those in FIG. 245(*b*) can be obtained as shown in FIG. 307(*b*), wherein actions and effects similar to those of the embodiment in FIG. 245 and FIG. 246, that is, actions and effects similar to those of the embodiment in FIG. 1 and FIG. 2 can be obtained. Further, in the automatic transmission 480-2 for vehicle, as shown in FIG. 307(*b*) and FIG. 308, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element RM4 is reversed at a rotation speed [Rev2], and the second reverse gear stage [Rev2] can be obtained in addition to the first reverse gear stage [Rev1]

FIG. 309 and FIG. 310 show one embodiment according to the first aspect through the fifth aspect, the forty-seventh aspect, the fifty-first aspect, the fifty-third aspect through the fifty-fifth aspect of the invention. FIG. 309 is a view corresponding to FIG. 1 described above, and FIG. 310 is a view corresponding to FIG. 2 described above. The automatic transmission 480-3 for vehicle differs from the automatic transmission 480-2 for vehicle, which is shown in FIG. 307 and FIG. 308, in that the fifth rotary element RM5 (Carrier CA2, ring gear R3 and sun gear S4) of the second transmission portion 482-3 is selectively connected to the input shaft 24, that is, the first intermediate output path PA1 via the fourth clutch C4. However, as shown in FIG. 309(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 307(*b*), and the same collinear chart (excluding the second reverse gear stage [Rev2]) as that in FIG. 308 can be obtained as shown in FIG. 310, wherein similar actions and effects can be brought about.

FIG. 311 and FIG. 312 show one embodiment according to the first aspect through the fourth aspect, the sixth aspect, the forty-seventh aspect, the fifty-second aspect through the fifty-fifth aspect of the invention. FIG. 311 is a view corresponding to FIG. 1 described above, and FIG. 312 is a view corresponding to FIG. 2 described above. The automatic transmission 480-4 for vehicle differs from the automatic transmission 480-2 for vehicle, which is shown in FIG. 307 and FIG. 308, in that the first rotary element RM1 (Sun gears S2 and S3) of the second transmission portion 482-4 and the fifth rotary element RM5 (Carrier CA2, ring gear R3 and sun gear S4) thereof are selectively connected to be integral with each other via the clutch C4. However, as shown in FIG. 311(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 307(*b*), and the same collinear chart (excluding the second reverse gear stage [Rev2]) as that in FIG. 308 can be obtained as shown in FIG. 312, wherein similar actions and effects can be brought about.

FIG. 313 and FIG. 314 show one embodiment according to the first aspect through the fifth aspect, the forty-eighth aspect, the fifty-first aspect, and the fifty-third aspect through the fifty-fifth aspect of the invention. FIG. 313 is a view corresponding to FIG. 1 described above, and FIG. 314 is a view corresponding to FIG. 2 described above. The automatic transmission 490-2 for vehicle differs from the automatic transmission 380-2 for vehicle, which is shown in FIG. 245 and FIG. 246, in the construction of the second transmission portion 492-2, and is preferably used for lateral installation in an FF or RR vehicle or the like. That is, the second transmission portion 492-2 is composed mainly of a single-pinion type second planetary gear set 494, a single-pinion type third planetary gear set 496 and a double-pinion type fourth planetary gear set 498, wherein the first rotary member RM1 is composed of the sun gear S2 of the second planetary gear set 494, the second rotary element RM2 is composed of the sun gear S4 of the fourth planetary gear set 498, the third rotary element RM3 is composed of the ring gear R3 of the third planetary gear set 496 and the ring gear R4 of the fourth planetary gear set 498 connected to each other, the fourth rotary element RM4 is composed of the carrier CA2 of the second planetary gear set 494, the carrier CA3 of the third planetary gear set 496 and the carrier CA4 of the fourth planetary gear set 498 connected to each other, and the fifth rotary element RM5 is composed of the ring gear R2 of the second planetary gear set 494 and the sun gear S3 of the third planetary gear set 496 connected to each other. Also, an output gear 26 is provided instead of the output shaft 27, and the fourth rotary element RM4 (Carriers CA2, CA3 and CA4) is connected to be integral with the output gear 26. Further, mutual connections between the respective rotary elements RM1 through RM5 by means of the clutches C1 through C4 and brakes B1 through B3, and connections between the casing 32, input shaft 24, that is, the first intermediate output path PA1 and the ring gear RI of the first planetary gear set 12, that is, the second intermediate output path PA2 are the same as those of the embodiment of FIG. 245 and FIG. 246 described above.

In this case, as shown in FIG. 313(*b*), eight forward gear stages from the first gear stage [1st) to the eighth gear stage [8th] and one reverse gear stage [Rev1] are established in accordance with the same operation table as that in FIG. 245(*b*) described above. Also, transmission ratios of the respective gear stages are appropriately determined by respective gear ratios ρ1 through ρ4 of the first planetary gear set 12, the second planetary gear set 494, the third planetary gear set 496 and the fourth planetary gear set 498. For example, where ρ1 is 0.435, ρ2 is 0.338, ρ3 is 0.510 and ρ4 is 0.459, the same collinear chart as that in FIG. 246 can be obtained as shown in FIG. 314, and the same transmission ratios as those in FIG. 245(*b*) can be obtained as shown in FIG. 313(*b*), wherein actions and effects similar to those of the embodiment in FIG. 245 and FIG. 246, that is, actions and effects similar to those of the embodiment in FIG. 1 and FIG. 2 can be obtained. Further, in the automatic transmission 490-2 for vehicle, as shown in FIG. 313(*b*) and FIG. 314, the fourth clutch C4 and the third brake B3 are engaged with each other as in FIG. 245(*b*) and FIG. 246, the first rotary element RM1 is rotated integral with the input shaft 24, and simultaneously the third rotary element RM3 is brought to a stationary state, wherein the fourth rotary element RM4 is reversed at a rotation speed [Rev2], and the second reverse gear stage [Rev2] can be obtained in addition to the first reverse gear stage [Rev1]

FIG. 315 and FIG. 316 show one embodiment according to the first aspect through the fifth aspect, the forty-eighth aspect, the fifty-first aspect, the fifty-third aspect through the fifty-fifth aspect of the invention. FIG. 315 is a view corresponding to FIG. 1 described above, and FIG. 316 is a view corresponding to FIG. 2 described above. The automatic transmission 490-3 for vehicle differs from the automatic transmission 490-2 for vehicle, which is shown in FIG. 313 and FIG. 314, in that the fifth rotary element RM5 (Ring gear R2 and sun gear S3) of the second transmission portion 492-3 is selectively connected to the input shaft 24, that is, the first intermediate output path PA1 via the fourth clutch C4. However, as shown in FIG. 315(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 313(*b*), and the same collinear chart (excluding the second reverse gear stage [Rev2]) as that in FIG. 314 can be obtained as shown in FIG. 316, wherein similar actions and effects can be brought about.

Figure 318:
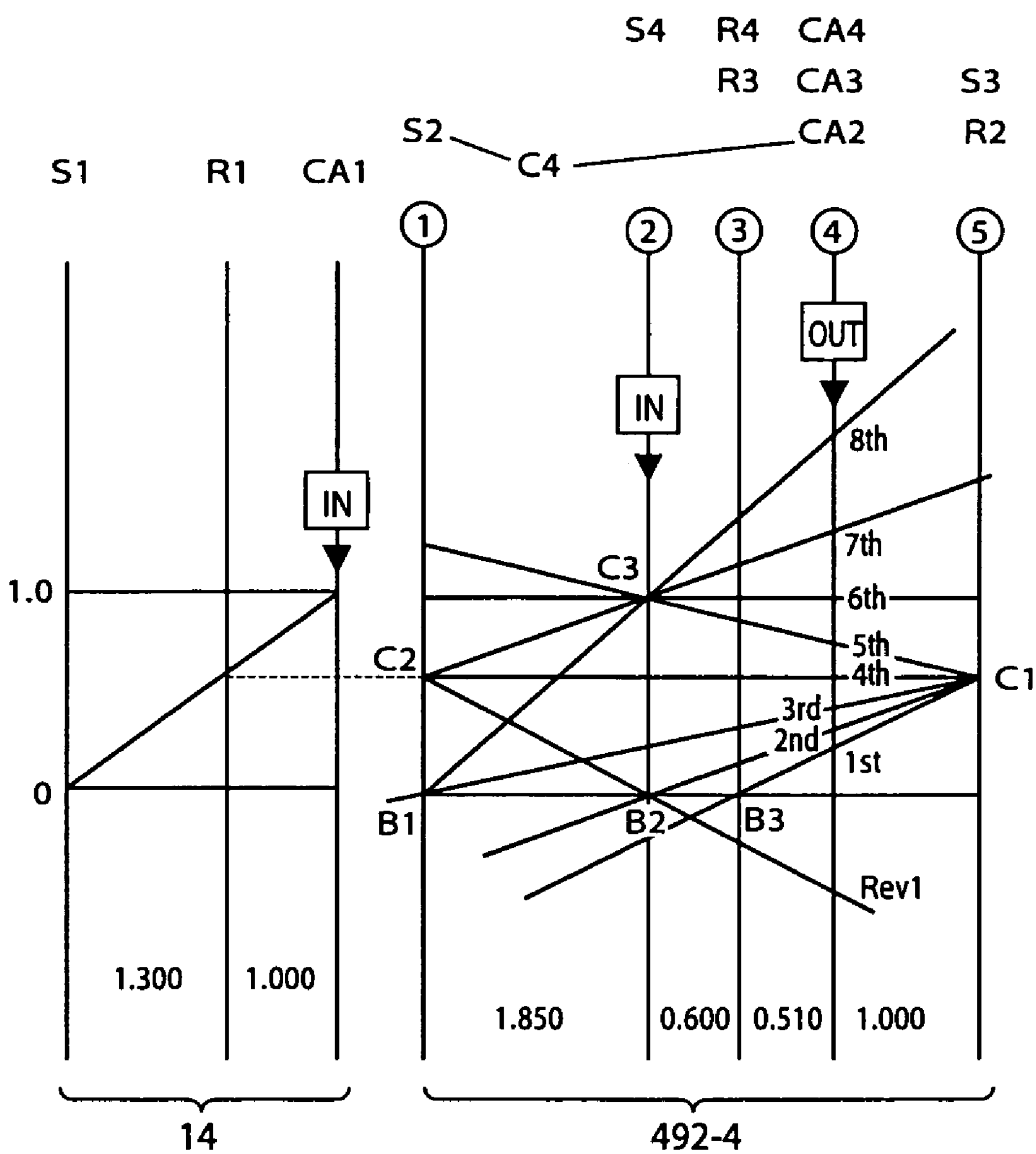

FIG. 317 and FIG. 318 show one embodiment according to the first aspect through the fourth aspect, the sixth aspect, the forty-eighth aspect, the fifty-second aspect through the fifty-fifth aspect of the invention. FIG. 317 is a view corresponding to FIG. 1 described above, and FIG. 318 is a view corresponding to FIG. 2 described above. The automatic transmission 490-4 for vehicle differs from the automatic transmission 490-2 for vehicle, which is shown in FIG. 313 and FIG. 314, in that the first rotary element RM1 (Sun gear S2) of the second transmission portion 492-4 and the fourth rotary element RM4 (Carriers CA2, CA3 and CA4) thereof are selectively connected to be integral with each other via the clutch C4. However, as shown in FIG. 317(*b*), eight forward gear stages from the first gear stage [1st] to the eighth gear stage [8th] and one reverse gear stage [Rev1] are established in accordance with the same operation table (excluding the second reverse gear stage [Rev2]) as that in FIG. 313(*b*), and the same collinear chart (excluding the second reverse gear stage [Rev2]) as that in FIG. 314 can be obtained as shown in FIG. 318, wherein similar actions and effects can be brought about.

FIG. 319 and FIG. 320 show one embodiment according to the first aspect through the fifth aspect, the forty-ninth aspect, the fifty-first aspect, and the fifty-third aspect through the fifty-fifth aspect of the invention. FIG. 319 is a view corresponding to FIG. 1 described above, and FIG. 320 is a view corresponding to FIG. 2 described above. The automatic transmission 500-1 for vehicle differs from the automatic transmission 430-1 for vehicle, which is shown in FIG. 275 and FIG. 276, in the construction of the second transmission portion 502-1, and is preferably used for lateral installation in an FF or RR vehicle or the like. That is, the second transmission portion 502-1 is composed mainly of a single-pinion type second planetary gear set 504, a double-pinion type third planetary gear set 506 and a single-pinion type fourth planetary gear set 508, wherein the first rotary member RM1 is composed of the sun gear S4 of the fourth planetary gear set 508, the second rotary element RM2 is composed of the ring gear R2 of the second planetary gear set 504, the third rotary element RM3 is composed of the carrier CA2 of the second planetary gear set 504 and the carrier CA3 of the third planetary gear set 506 connected to each other, the fourth rotary element RM4 is composed of the ring gear R3 of the third planetary gear set 506 and the carrier CA4 of the fourth planetary gear set 508 connected to each other, and the fifth rotary element RM5 is composed of the sun gear S2 of the second planetary gear set 504, the sun gear S3 of the third planetary gear set 506 and the ring gear R4 of the fourth planetary gear set 508 connected to each other. Further, mutual connections between the respective rotary elements RM1 through RM5 by means of the clutches C1 through C4 and brakes B1 through B3, and connections between the casing 32, input shaft 24, that is, the first intermediate output path PA1, the ring gear R1 of the first planetary gear set 12, that is, the second intermediate output path PA2 and the output gear 26 are the same as those of the embodiment of FIG. 275 and FIG. 276 described above.

In this case, as shown in FIG. 319(*b*), eight forward gear stages from the first gear stage (1st] to the eighth gear stage [8th] and one reverse gear stage [Rev1] are established in accordance with the same operation table as that in FIG.

275(*b*) described above. Also, transmission ratios of the respective gear stages are appropriately determined by respective gear ratios ρ1 through ρ4 of the first planetary gear set 12, the second planetary gear set 504, the third planetary gear set 506 and the fourth planetary gear set 508. For example, where ρ1 is 0.435, ρ2 is 0.397, ρ3 is 0.338 and ρ4 is 0.338, the same collinear chart as that in FIG. 276 can be obtained as shown in FIG. 320, and the same transmission ratios as those in FIG. 275(*b*) can be obtained as shown in FIG. 319(*b*), wherein actions and effects similar to those of the embodiment in FIG. 275 and FIG. 276, that is, actions and effects similar to those of the embodiment in FIG. 1 and FIG. 2 can be obtained.

FIG. 321 and FIG. 322 show one embodiment according to the first aspect through the fifth aspect, the forty-ninth aspect, the fifty-first aspect, the fifty-third aspect through the fifty-fifth aspect of the invention. FIG. 321 is a view corresponding to FIG. 1 described above, and FIG. 322 is a view corresponding to FIG. 2 described above. The automatic transmission 500-2 for vehicle differs from the automatic transmission 500-1 for vehicle, which is shown in FIG. 319 and FIG. 320, in that the first rotary element RM1 (Sun gear S4) of the second transmission portion 502-2 is selectively connected to the input shaft 24, that is, the first intermediate output path PA1 via the fourth clutch C4. However, as shown in FIG. 321(*b*), eight forward gear stages from the first gear stage [1st) to the eighth gear stage [8th] and one reverse gear stage (Rev1] are established in accordance with the same operation table as that in FIG. 319(*b*), and the same collinear chart as that in FIG. 320(*b*) can be obtained as shown in FIG. 322(*b*), wherein similar actions and effects can be brought about. In addition, in the automatic transmission 500-2 for vehicle, as shown in FIG. 321(*b*) and FIG. 322, the fourth clutch C4 and the brake B3 are engaged with each other as in FIG. 277(*b*) and FIG. 278, the first rotary element RM1 is rotated integral with the input shaft 24, and simultaneously the third rotary element RM3 is brought to a stationary state, wherein the fourth rotary element RM4 is reversed at a rotation speed [Rev2], and the second reverse gear stage [Rev2] may be established in addition to the first reverse gear stage [Rev1].

FIG. 323 and FIG. 324 show one embodiment according to the first aspect through the fifth aspect, the forty-ninth aspect, the fifty-first aspect, the fifty-third aspect through the fifty-fifth aspect of the invention. FIG. 323 is a view corresponding to FIG. 1 described above, and FIG. 324 is a view corresponding to FIG. 2 described above. The automatic transmission 500-3 for vehicle differs from the automatic transmission 500-1 for vehicle, which is shown in FIG. 319 and FIG. 320, in that the fifth rotary element RM5 (Sun gears S2 and S3, and ring gear R4) of the second transmission portion 502-3 is selectively connected to the input shaft 24, that is, the first intermediate output path PA1 via the fourth clutch C4. However, as shown in FIG. 323(*b*), eight forward gear stages from the first gear stage [1st] to the eighth gear stage [8th] and one reverse gear stage [Rev1] are established in accordance with the same operation table as that in FIG. 319(*b*), and the same collinear chart as that in FIG. 320 can be obtained as shown in FIG. 324, wherein similar actions and effects can be brought about.

FIG. 325 and FIG. 326 show one embodiment according to the first aspect through the fourth aspect, the sixth aspect, the forty-ninth aspect, the fifty-second aspect through the fifty-fifth aspect of the invention. FIG. 325 is a view corresponding to FIG. 1 described above, and FIG. 326 is a view corresponding to FIG. 2 described above. The automatic transmission 500-4 for vehicle differs from the automatic transmission 500-1 for vehicle, which is shown in FIG. 319 and FIG. 320, in that the third rotary element RM3 (Carriers CA2 and CA3) of the second transmission portion 502-4 and the fifth rotary element RM5 (Sun gears S2 and S3, and ring gear R4) thereof are selectively connected to be integral with each other via the clutch C4. However, as shown in FIG. 325(*b*), eight forward gear stages from the first gear stage [1st] to the eighth gear stage [8th] and one reverse gear stage [Rev1] are established in accordance with the same operation table as that in FIG. 319(*b*), and the same collinear chart as that in FIG. 320 can be obtained as shown in FIG. 326, wherein similar actions and effects can be brought about.

FIG. 327 and FIG. 328 show one embodiment according to the first aspect through the fifth aspect, the fiftieth aspect, the fifty-first aspect, and the fifty-third aspect through the fifty-fifth aspect of the invention. FIG. 327 is a view corresponding to FIG. 1 described above, and FIG. 328 is a view corresponding to FIG. 2 described above. The automatic transmission 510-1 for vehicle differs from the automatic transmission 430-1 for vehicle, which is shown in FIG. 275 and FIG. 276, in the construction of the second transmission portion 512-1, and is preferably used for lateral installation in an FF or RR vehicle or the like. That is, the second transmission portion 512-1 is composed mainly of a single-pinion type second planetary gear set 514, a single-pinion type third planetary gear set 516 and a single-pinion type fourth planetary gear set 518, wherein the first rotary member RM1 is composed of the sun gear S4 of the fourth planetary gear set 518, the second rotary element RM2 is composed of the ring gear R2 of the second planetary gear set 514, the third rotary element RM3 is composed of the carrier CA2 of the second planetary gear set 514 and the ring gear R3 of the third planetary gear set 516 connected to each other, the fourth rotary element RM4 is composed of the carrier CA3 of the third planetary gear set 516 and the carrier CA4 of the fourth planetary gear set 518 connected to each other, and the fifth rotary element RM5 is composed of the sun gear S2 of the second planetary gear set 514, the sun gear S3 of the third planetary gear set 516 and the ring gear R4 of the fourth planetary gear set 518 connected to each other. Further, mutual connections between the respective rotary elements RM1 through RM5 by means of the clutches C1 through C4 and brakes B1 through B3, and connections between the casing 32, input shaft 24, that is, the first intermediate output path PA1, the ring gear R1 of the first planetary gear set 12, that is, the second intermediate output path PA2 and the output gear 26 are the same as those of the embodiment of FIG. 275 and FIG. 276 described above.

In this case, as shown in FIG. 327(*b*), eight forward gear stages from the first gear stage [1st] to the eighth gear stage [8th] and one reverse gear stage [Rev1] are established in accordance with the same operation table as that in FIG. 275(*b*) described above. Also, transmission ratios of the respective gear stages are appropriately determined by respective gear ratios ρ1 through ρ4 of the first planetary gear set 12, the second planetary gear set 514, the third planetary gear set 516 and the fourth planetary gear set 518. For example, where ρ1 is 0.435, ρ2 is 0.397, ρ3 is 0.510 and ρ4 is 0.338, the same collinear chart as that in FIG. 276 can be obtained as shown in FIG. 328, and the same transmission ratios as those in FIG. 275(*b*) can be obtained as shown in FIG. 327(*b*), wherein actions and effects similar to those of the embodiment in FIG. 275 and FIG. 276, that is, actions and effects similar to those of the embodiment in FIG. 1 and FIG. 2 can be obtained.

FIG. 329 and FIG. 330 show one embodiment according to the first aspect through the fifth aspect, the fiftieth aspect, the fifty-first aspect, the fifty-third aspect through the fifty-fifth aspect of the invention. FIG. 329 is a view corresponding to FIG. 1 described above, and FIG. 330 is a view corresponding to FIG. 2 described above. The automatic transmission 510-2 for vehicle differs from the automatic transmission 510-1 for vehicle, which is shown in FIG. 327 and FIG. 328, in that the first rotary element RM1 (Sun gear S4) of the second transmission portion 512-2 is selectively connected to the input shaft 24, that is, the first intermediate output path PA1 via the fourth clutch C4. However, as shown in FIG. 329(*b*), eight forward gear stages from the first gear stage [1st] to the eighth gear stage [8th] and one reverse gear stage [Rev1] are established in accordance with the same operation table as that in FIG. 327(*b*), and the same collinear chart as that in FIG. 327(*b*) can be obtained as shown in FIG. 329(*b*), wherein the same collinear chart as that shown in FIG. 328 is obtained as shown in FIG. 330 and similar actions and effects can be brought about. In addition, in the automatic transmission 510-2 for vehicle, as shown in FIG. 329(*b*) and FIG. 330, the fourth clutch C4 and the brake B3 are engaged with each other as in FIG. 277(*b*) and FIG. 278, the first rotary element RM1 is rotated integral with the input shaft 24, and simultaneously the third rotary element RM3 is brought to a stationary state, wherein the fourth rotary element RM4 is reversed at a rotation speed [Rev2], and the second reverse gear stage [Rev2] may be established in addition to the first reverse gear stage [Rev1].

FIG. 331 and FIG. 332 show one embodiment according to the first aspect through the fifth aspect, the fiftieth aspect, the fifty-first aspect, the fifty-third aspect through the fifty-fifth aspect of the invention. FIG. 331 is a view corresponding to FIG. 1 described above, and FIG. 332 is a view corresponding to FIG. 2 described above. The automatic transmission 510-3 for vehicle differs from the automatic transmission 510-1 for vehicle, which is shown in FIG. 327 and FIG. 328, in that the fifth rotary element RM5 (Sun gears S2 and S3, and ring gear R4) of the second transmission portion 512-3 is selectively connected to the input shaft 24, that is, the first intermediate output path PA1 via the fourth clutch C4. However, as shown in FIG. 331(*b*), eight forward gear stages from the first gear stage [1st] to the eighth gear stage [8th] and one reverse gear stage [Rev1] are established in accordance with the same operation table as that in FIG. 327(*b*), and the same collinear chart as that in FIG. 328 can be obtained as shown in FIG. 332, wherein similar actions and effects can be brought about.

FIG. 333 and FIG. 334 show one embodiment according to the first aspect through the fourth aspect, the sixth aspect, the fiftieth aspect, the fifty-second aspect through the fifty-fifth aspect of the invention. FIG. 333 is a view corresponding to FIG. 1 described above, and FIG. 334 is a view corresponding to FIG. 2 described above. The automatic transmission 510-4 for vehicle differs from the automatic transmission 510-1 for vehicle, which is shown in FIG. 327 and FIG. 328, in that the third rotary element RM3 (Carrier CA2 and ring gear R3) of the second transmission portion 512-4 and the fifth rotary element RM5 (Sun gears S2 and S3, and ring gear R4) thereof are selectively connected to be integral with each other via the clutch C4. However, as shown in FIG. 333(*b*), eight forward gear stages from the first gear stage [1st] to the eighth gear stage [8th] and one reverse gear stage [Rev1] are established in accordance with the same operation table as that in FIG. 327(*b*), and the same collinear chart as that in FIG. 328 can be obtained as shown in FIG. 334, wherein similar actions and effects can be brought about.

Also, although a description was given of the case of the eight forward gear stages in any one of the above-described embodiments, transmission is enabled in the seven forward gear stages such as, for example, the first gear stage [1st] through the seventh gear stage [7th], the second gear stage [2nd] through the eighth gear stage [8th], and the first gear stage [1st] through the sixth gear stage [6th] ρ1 us the eighth gear stage [8th].

In addition, the automatic transmission 360 for vehicle, which is shown in FIG. 234, is such that, while the automatic transmission 10-1 for vehicle in FIG. 1 is newly provided with the fifth planetary gear set 369 to compose the sixth rotary element, the fourth clutch C4 is constructed so that the sixth rotary element RM6 is selectively connected to the first intermediate output path PA1, and the gear stages at the accelerating side are changed over. However, the above-described construction may be applicable to the other embodiments illustrated as an automatic transmission for vehicle.

Further, gear stages may be established on the basis of combinations of engagement operations of the first clutch C1 through the fourth clutch C4 and the first brake B1 through the third brake B3, which are other than that shown in the embodiment of FIG. 243 and FIG. 244. Furthermore, the engagement operation described in the embodiment shown in FIG. 243 and FIG. 244 may be applicable to other above-described embodiments constructed so that the above-described fourth clutch C4 causes the above-described third rotary element RM3 to be selectively connected to the above-described first intermediate output path (PA1 or M1).

As described above, the embodiment according to the present invention was described by reference to the accompanying drawings. This embodiment is merely one mode of the invention, and it is a matter of course that the invention may be embodied with various alternations and improvements added thereto on the basis of knowledge of those skilled in the same art.

What is claimed is:

1. A multistage transmission comprising:

a first transmission portion including a first intermediate output path for outputting rotations of an input member at a fixed transmission ratio determined in advance, and a second intermediate output path for outputting rotations of said input member after reducing the rotations at a greater transmission ratio than said first intermediate output path; and a second transmission portion in which a first rotary element, a second rotary element, a third rotary element, a fourth rotary element and a fifth rotary elements are respectively composed of one of or connected plural of respective sun gears, carriers and ring gears of a second planetary gear set, a third planetary gear set and a fourth planetary gear set each one of the five rotary elements configured to rotate integrally, and each one of the five rotary elements configured to rotate mutually independently with respect to the remaining rotary elements;

and in which said first rotary element being selectively brought to a stationary state by a first brake, said second rotary element being selectively brought to a stationary state by a second brake, said third rotary element being selectively brought to a stationary state by a third brake, said fifth rotary element being selectively connected to said second intermediate output path via a first clutch, said first rotary element being selectively connected to said second intermediate output path via a second clutch, said second rotary element being selectively connected to said first intermediate output path via a third clutch directly connected thereto; and having a fourth clutch for causing said five rotary elements to rotate integral with said first intermediate output path by being engaged with said third clutch; and outputting rotations by said fourth rotary element being connected to an output member;

wherein a plurality of gear stages are established by changing engagement and disengagement of said clutches and brakes.

2. A multistage transmission according to claim 1, wherein at least 7 forward gear stages are established by changing engagement and disengagement of said clutch and brake.

3. A multistage transmission according to claim 1, wherein said fourth clutch selectively connects any one of said first, third and fifth rotary elements to said first intermediate output path.

4. A multistage transmission according to claim 1, wherein said fourth clutch selectively connects any two of said five rotary elements to each other.

5. A multistage transmission comprising:

a first transmission portion including a first intermediate output path for outputting rotations of an input member at a fixed transmission ratio determined in advance, and a second intermediate output path for outputting rotations of said input member after reducing the rotations at a greater transmission ratio than said first intermediate output path; and a second transmission portion in which five rotary elements are composed of parts of respective sun gears, carriers and ring gears of a second planetary gear set, a third planetary gear set and a fourth planetary gear set connected to each other and in which, where it is assumed that said five rotary elements are first, second, third, fourth and fifth rotary elements from one end thereof to the other end thereof in order in a collinear chart in which rotation speeds of said five rotary elements can be represented by straight lines, said first rotary element being selectively brought to a stationary state by a first brake, said second rotary element being selectively brought to a stationary state by a second brake, said third rotary element being selectively brought to a stationary state by a third brake, said fifth rotary element being selectively connected to said second intermediate output path via a first clutch, said first rotary element being selectively connected to said second intermediate output path via a second clutch, said second rotary element being selectively connected to said first intermediate output path via a third clutch; and having a fourth clutch for causing said five rotary elements to rotate integral with said first intermediate output path by being engaged with said third clutch; and outputting rotations by said fourth rotary element being connected to an output member;

wherein a first gear stage of the highest transmission ratio is established by engaging said first clutch with said third brake;

a second gear stage having a smaller transmission ratio than said first gear stage is established by engaging said first clutch with said second brake;

a third gear stage having a smaller transmission ratio than said second gear stage is established by engaging said first clutch with said first brake;

a fourth gear stage having a smaller transmission ratio than said third gear stage is established by engaging said first clutch with said second clutch;

a fifth gear stage having a smaller transmission ratio than said fourth gear stage is established by engaging said first clutch with said third clutch;

a sixth gear stage having a smaller transmission ratio than said fifth gear stage is established by engaging said third clutch with said fourth clutch;

a seventh gear stage having a smaller transmission ratio than said sixth gear stage is established by engaging said second clutch with said third clutch; and an eighth gear stage having a smaller transmission ratio than said seventh gear stage is established by engaging said third clutch with said first brake; and wherein a drive speed is changed by using seven or more gear stages of said first through eighth gear stages.

6. A multistage transmission according to claim 5, wherein said fourth clutch selectively connects any one of said first, third and fifth rotary elements to said first intermediate output path.

7. A multistage transmission according to claim 5, wherein said fourth clutch selectively connects any two of said five rotary elements to each other.

8. A multistage transmission comprising:

a first transmission portion including a first intermediate output path for outputting rotations of an input member at a fixed transmission ratio determined in advance, and a second intermediate output path for outputting rotations of said input member after reducing the rotations at a greater transmission ratio than said first intermediate output path; and a second transmission portion having a single-pinion type second planetary gear set, a single-pinion type third planetary gear set, and a double-pinion type fourth planetary gear set, in which a first rotary element being composed of a sun gear of said second planetary gear set and a sun gear of said third planetary gear set connected to each other, a second rotary element being composed of a carrier of said second planetary gear set, a carrier of said third planetary gear set and a carrier of said fourth planetary gear set connected to each other, a third rotary element being composed of a ring gear of said second planetary gear set, a fourth rotary element being composed of a ring gear of said third planetary gear set and a ring gear of said fourth planetary gear set connected to each other, a fifth rotary element being composed of a sun gear of said fourth planetary gear set; and said first rotary element being selectively brought to a stationary state by a first brake, said second rotary element being selectively brought to a stationary state by a second brake, said third rotary element being selectively brought to a stationary state by a third brake, said fifth rotary element being selectively connected to said second intermediate output path via a first clutch, said first rotary element being selectively connected to said second intermediate output path via a second clutch, said second rotary element being selectively connected to said first intermediate output path via a third clutch; and having a fourth clutch for causing said five rotary elements to rotate integral with said first intermediate output path by being engaged with said third clutch; and outputting rotations by said fourth rotary element being connected to an output member;

wherein a plurality of gear stages are established by changing engagement and disengagement of said clutches and brakes.

* * * * *